US012646458B2

(12) United States Patent
Liu et al.

(10) Patent No.: US 12,646,458 B2
(45) Date of Patent: Jun. 2, 2026

(54) PIXEL CIRCUIT, DRIVING METHOD AND DISPLAY DEVICE

(71) Applicant: BOE TECHNOLOGY GROUP CO., LTD., Beijing (CN)

(72) Inventors: Dongni Liu, Beijing (CN); Minghua Xuan, Beijing (CN); Zhenyu Zhang, Beijing (CN); Haoliang Zheng, Beijing (CN); Li Xiao, Beijing (CN); Jiao Zhao, Beijing (CN); Ying Zhou, Beijing (CN); Xuan Feng, Beijing (CN); Seungwoo Han, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 31 days.

(21) Appl. No.: 18/861,863

(22) PCT Filed: Dec. 25, 2023

(86) PCT No.: PCT/CN2023/141542
§ 371 (c)(1),
(2) Date: Oct. 30, 2024

(87) PCT Pub. No.: WO2025/137818
PCT Pub. Date: Jul. 3, 2025

(65) Prior Publication Data

US 2026/0051289 A1 Feb. 19, 2026

(51) Int. Cl.

| | |
|---|---|
| ***G09G 3/3233*** | (2016.01) |
| ***G09G 3/20*** | (2006.01) |
| ***G09G 3/32*** | (2016.01) |

(52) U.S. Cl.
CPC ......... *G09G 3/3233* (2013.01); *G09G 3/2007* (2013.01); *G09G 3/32* (2013.01);
(Continued)

(58) Field of Classification Search
CPC ...... G09G 3/3233; G09G 3/2007; G09G 3/32; G09G 2300/0842; G09G 2310/08; G09G 2320/0233
See application file for complete search history.

(56) References Cited

U.S. PATENT DOCUMENTS

2021/0201760 A1* 7/2021 Wang .................. G09G 3/3233

FOREIGN PATENT DOCUMENTS

CN 109872680 A 6/2019
CN 109920371 A 6/2019
(Continued)

*Primary Examiner* — Robin J Mishler
(74) *Attorney, Agent, or Firm* — MUNCY, GEISSLER, OLDS & LOWE, P.C.

(57) ABSTRACT

A pixel circuit, a driving method and a display device are provided. The pixel circuit includes a driving circuit, a first reset circuit and a data writing-in circuit; the data writing-in circuit sequentially provides a display data voltage and a light emitting time control data voltage to the writing-in node under the control of a writing-in control signal; the first reset circuit writes a first initial voltage into the first electrode of the light emitting element under the control of a first reset control signal during a reset time period set between a time period for writing the display data voltage and a time period for writing the light emitting time control data voltage.

20 Claims, 177 Drawing Sheets

(52) U.S. Cl.
CPC . *G09G 2300/0842* (2013.01); *G09G 2310/08* (2013.01); *G09G 2320/0233* (2013.01)

(56) References Cited

FOREIGN PATENT DOCUMENTS

| | | | |
|---|---|---|---|
| CN | 112767873 | A | 5/2021 |
| CN | 113990241 | A | 1/2022 |
| KR | 20220002799 | A | 1/2022 |
| WO | WO2022204982 | A1 | 10/2022 |

* cited by examiner

PIXEL CIRCUIT, DRIVING METHOD AND DISPLAY DEVICE

CROSS-REFERENCE TO RELATED APPLICATION

The present disclosure is the U.S. national phase of PCT Application No. PCT/CN2023/141542 filed on Dec. 25, 2023, which is incorporated herein by reference in its entirety.

TECHNICAL FIELD

The present disclosure relates to the field of display technology, in particular to a pixel circuit, a driving method and a display device.

BACKGROUND

Micro Light Emitting Diode (Micro LED) and Mini Light Emitting Diode (Mini LED) will be widely used in the future display field due to its high brightness and high reliability. As a self-light emitting device, the light emitting efficiency, brightness and color coordinates of LED will change with the current density at low current density. To achieve grayscale display, LED needs to be under high current density, that is, high current to achieve grayscale display. Traditional current control driving circuits cannot meet the requirements of grayscale display requirements of Micro LED and Mini LED.

SUMMARY

In one aspect, the present disclosure provides in some embodiments a pixel circuit including a light emitting element, a driving circuit, a first reset circuit and a data writing-in circuit; wherein a control terminal of the driving circuit is electrically connected to a first node, the driving circuit is electrically connected to a first electrode of the light emitting element, and the driving circuit is configured to generate a driving current to drive the light emitting element under the control of a potential of the first node; the data writing-in circuit is electrically connected to a writing-in control terminal and a writing-in node respectively, and is configured to sequentially provide a display data voltage and a light emitting time control data voltage to the writing-in node under the control of a writing-in control signal provided by the writing-in control terminal; the first reset circuit is electrically connected to a first reset control terminal, a first initial voltage terminal and the first electrode of the light emitting element, respectively, and is configured to write a first initial voltage provided by the first initial voltage terminal into the first electrode of the light emitting element under the control of a first reset control signal provided by the first reset control terminal during a reset time period set between a time period for writing the display data voltage and a time period for writing the light emitting time control data voltage.

Optionally, the first terminal of the driving circuit is electrically connected to the first electrode of the light emitting element, and the writing-in node is electrically connected to the second terminal of the driving circuit; or the second terminal of the driving circuit is electrically connected to the first electrode of the light emitting element, and the writing-in node is electrically connected to the first terminal of the driving circuit.

Optionally, the writing-in node comprises a first writing-in node and a second writing-in node; the first writing-in node is electrically connected to the first terminal of the driving circuit; the pixel circuit also includes a switch control circuit; the second terminal of the driving circuit is electrically connected to the first electrode of the light emitting element through the switch control circuit, and the switch control circuit is electrically connected to a switch control terminal, and the switch control circuit is configured to control the connection between the second terminal of the driving circuit and the first electrode of the light emitting element under the control of a potential of the switch control terminal; the second writing-in node is electrically connected to the switch control terminal.

Optionally, the writing-in node comprises a first writing-in node and a second writing-in node; the first writing-in node is electrically connected to the second terminal of the driving circuit; the pixel circuit also includes a switch control circuit; the first terminal of the driving circuit is electrically connected to the first electrode of the light emitting element through the switch control circuit, and the switch control circuit is electrically connected to the switch control terminal, and the switch control circuit is configured to control the connection between the first terminal of the driving circuit and the first electrode of the light emitting element under the control of the potential of the switch control terminal; the second writing-in node is electrically connected to the switch control terminal.

Optionally, the pixel circuit further includes a second reset circuit; wherein the second reset circuit is electrically connected to a second reset control terminal, a second initial voltage terminal and the first node respectively, and is configured to write a second initial voltage provided by the second initial voltage terminal into the first node during the reset time period under the control of the second reset control signal provided by the second reset control terminal.

Optionally, the first reset control terminal and the second reset control terminal are a same reset control terminal.

Optionally, the writing-in control terminal comprises a first control terminal and a second control terminal, the data writing-in circuit is also electrically connected to a first data line and a second data line respectively; the display cycle of the pixel circuit comprises a first writing-in time period and a second writing-in time period which are set successively; the data writing-in circuit is configured to write a display data voltage provided by the second data line to the writing-in node under the control of a second control signal provided by the second control terminal during the first writing-in time period, and is configured to write the light emitting time control data voltage provided by the first data line into the writing-in node under the control of the first control signal provided by the first control terminal during the second writing-in time period.

Optionally, the pixel circuit further includes a first light emitting control circuit, a second light emitting control circuit and a compensation control circuit; the first light emitting control circuit is electrically connected to the light emitting control terminal, the first voltage terminal and the first terminal of the driving circuit respectively, and is configured to control the connection between the first voltage terminal and the first terminal of the driving circuit under the control of the light emitting control signal provided by the light emitting control terminal; the second light emitting control circuit is electrically connected to the light emitting control terminal, the second terminal of the driving circuit and the first electrode of the light emitting element respectively, and is configured to control the second terminal of the driving circuit to be connected to the first electrode of the light emitting element under the control of the light emitting control signal; the second electrode of the light emitting element is electrically connected to the second voltage terminal; the compensation control circuit is electrically connected to a scanning terminal, the control terminal of the driving circuit and the second terminal of the driving circuit respectively, and is configured to control the communication between the control terminal of the driving circuit and the second terminal of the driving circuit under the control of a scanning signal provided by the scanning terminal; the first electrode of the light emitting element is the first electrode of the light emitting element.

Optionally, the pixel circuit further includes a first light emitting control circuit, a second light emitting control circuit and a compensation control circuit; the first electrode of the light emitting element is electrically connected to the first voltage terminal; the first light emitting control circuit is electrically connected to the light emitting control terminal, the second electrode of the light emitting element and the first terminal of the driving circuit respectively, and is configured to control the second electrode of the light emitting element to be connected to the first terminal of the driving circuit under the control of the light emitting control signal provided by the light emitting control terminal; the second light emitting control circuit is electrically connected to the light emitting control terminal, the second terminal of the driving circuit and the second voltage terminal respectively, and is configured to control the second terminal of the driving circuit to be connected to the second voltage terminal under the control of the light emitting control signal; the compensation control circuit is electrically connected to the scanning terminal, the control terminal of the driving circuit and the first terminal of the driving circuit respectively, and is configured to control the communication between the control terminal of the driving circuit and the first terminal of the driving circuit under the control of the scanning signal provided by the scanning terminal; the first electrode of the light emitting element is the second electrode of the light emitting element.

Optionally, the data writing-in circuit comprises a first writing-in sub-circuit and a second writing-in sub-circuit; the writing-in control terminal comprises a scanning terminal and a first control terminal; the first writing-in sub-circuit is electrically connected to the first control terminal, the first data line and the second writing-in node respectively, and is configured to write the light emitting time control data voltage provided by the first data line into the second writing-in node under the control of the first control signal provided by the first control terminal; the second writing-in sub-circuit is electrically connected to the scanning terminal, the second data line and the first writing-in node respectively, and is configured to write the display data voltage provided by the second data line into the first writing-in node under the control of the scanning signal provided by the scanning terminal.

Optionally, the pixel circuit further includes a second reset circuit, an initialization circuit and a voltage maintenance circuit; the second reset circuit is electrically connected to a second reset control terminal, a second initial voltage terminal and the first node respectively, and is configured to write a second initial voltage provided by the second initial voltage terminal into the first node under the control of the second reset control signal provided by the second reset control terminal; the initialization circuit is electrically connected to a second control terminal, a third initial voltage terminal and a second writing-in node respectively, and is configured to write a third initial voltage provided by the third initial voltage terminal into the second writing-in node under the control of a second control signal provided by the second control terminal; the voltage maintaining circuit is electrically connected to the switch control terminal and is configured to maintain the potential of the switch control terminal.

Optionally, the pixel circuit further includes a first light emitting control circuit, a second light emitting control circuit and a compensation control circuit; the first light emitting control circuit is electrically connected to the light emitting control terminal, the first voltage terminal and the first terminal of the driving circuit respectively, and is configured to control the connection between the first voltage terminal and the first terminal of the driving circuit under the control of the light emitting control signal provided by the light emitting control terminal; the second light emitting control circuit is electrically connected to the light emitting control terminal, the second terminal of the driving circuit and the first terminal of the switch control circuit respectively, and is configured to control the second terminal of the driving circuit to be connected to the first terminal of the switch control circuit under the control of the light emitting control signal; the second terminal of the switch control circuit is electrically connected to the first electrode of the light emitting element; the second electrode of the light emitting element is electrically connected to the second voltage terminal; the switch control circuit is configured to control the second light emitting control circuit to be connected to the first electrode of the light emitting element under the control of the potential of the switch control terminal; the compensation control circuit is electrically connected to the scanning terminal, the control terminal of the driving circuit and the second terminal of the driving circuit respectively, and is configured to control the connection between the control terminal of the driving circuit and the second terminal of the driving circuit under the control of the scanning signal provided by the scanning terminal.

Optionally, the pixel circuit further includes a first light emitting control circuit, a second light emitting control circuit and a compensation control circuit; the first electrode of the light emitting element is electrically connected to the first voltage terminal; the first terminal of the switch control circuit is electrically connected to the second pole of the light emitting element, and the second terminal of the switch control circuit is electrically connected to the first light emitting control circuit; the switch control circuit is configured to control the second electrode of the light emitting element to be connected to the first light emitting control circuit under the control of the potential of the switch control terminal; the first light emitting control circuit is electrically connected to the light emitting control terminal, the second terminal of the switch control circuit and the first terminal of the driving circuit respectively, and is configured to control the second terminal of the switch control circuit to be connected to the first terminal of the driving circuit under the control of the light emitting control signal provided by the light emitting control terminal; the second light emitting control circuit is electrically connected to the light emitting control terminal, the second terminal of the driving circuit and the second voltage terminal respectively, and is configured to control the second terminal of the driving circuit to be connected to the second voltage terminal under the control of the light emitting control signal; the compensation control circuit is electrically connected to the scanning terminal, the control terminal of the driving circuit and the first terminal of the driving circuit respectively, and is configured to control the connection between the control terminal of the driving circuit and the first terminal of the driving circuit under the control of the scanning signal provided by the scanning terminal.

Optionally, the light emitting element is an inorganic light emitting diode, a width-to-length ratio of a transistor included in the first light emitting control circuit is greater than 1, a width-to-length ratio of a transistor included in the second light emitting control circuit is greater than 1, and a width-to-length ratio of a transistor included in the driving circuit is greater than 0.5.

Optionally, the light emitting element is an inorganic light emitting diode, a width-to-length ratio of a transistor included in the switch control circuit is greater than 1, and a width-to-length ratio of a transistor included in the driving circuit is greater than 0.5.

Optionally, the pixel circuit further includes an energy storage circuit; wherein the energy storage circuit is electrically connected to the first node and is configured to store electric energy.

Optionally, the energy storage circuit comprises a storage capacitor; the light emitting element is an inorganic light emitting diode; a capacitance value of the storage capacitor is greater than 3 times a gate-source capacitance of the transistor in the driving circuit.

Optionally, the first reset circuit comprises a first transistor, and the second reset circuit comprises a second transistor; a gate electrode of the first transistor is electrically connected to the first reset control terminal, a first electrode of the first transistor is electrically connected to the first initial voltage terminal, and a second electrode of the first transistor is electrically connected to the first electrode of the light emitting element; a gate electrode of the second transistor is electrically connected to the second reset control terminal, a first electrode of the second transistor is electrically connected to the second initial voltage terminal, and a second electrode of the second transistor is electrically connected to the first node.

Optionally, the data writing-in circuit comprises a third transistor and a fourth transistor; a gate electrode of the third transistor is electrically connected to the first control terminal, a first electrode of the third transistor is electrically connected to the first data line, and a second electrode of the third transistor is electrically connected to the writing-in node; a gate electrode of the fourth transistor is electrically connected to the scanning terminal, a first electrode of the fourth transistor is electrically connected to the second data line, and a second electrode of the fourth transistor is electrically connected to the writing-in node.

Optionally, the driving circuit comprises a driving transistor, the first light emitting control circuit comprises a fifth transistor, the second light emitting control circuit comprises a sixth transistor, and the compensation control circuit comprises a seventh transistor; a gate electrode of the fifth transistor is electrically connected to the light emitting control terminal, a first electrode of the fifth transistor is electrically connected to the first voltage terminal, and a second electrode of the fifth transistor is electrically connected to the first electrode of the driving transistor; a gate electrode of the sixth transistor is electrically connected to the light emitting control terminal, a first electrode of the sixth transistor is electrically connected to the second electrode of the driving transistor, and a second electrode of the sixth transistor is electrically connected to the first electrode of the light emitting element; a gate electrode of the driving transistor is electrically connected to the first node; a gate electrode of the seventh transistor is electrically connected to the scanning terminal, a first electrode of the seventh transistor is electrically connected to the first node, and a second electrode of the seventh transistor is electrically connected to a second electrode of the driving transistor.

Optionally, the driving circuit comprises a driving transistor, the first light emitting control circuit comprises a fifth transistor, the second light emitting control circuit comprises a sixth transistor, and the compensation control circuit comprises a seventh transistor; a gate electrode of the fifth transistor is electrically connected to the light emitting control terminal, a first electrode of the fifth transistor is electrically connected to the second electrode of the light emitting element, and a second electrode of the fifth transistor is electrically connected to the first electrode of the driving transistor; a gate electrode of the sixth transistor is electrically connected to the light emitting control terminal, a first electrode of the sixth transistor is electrically connected to the second electrode of the driving transistor, and a second electrode of the sixth transistor is electrically connected to the second voltage terminal; a gate electrode of the driving transistor is electrically connected to the first node; a gate electrode of the seventh transistor is electrically connected to the scanning terminal, a first electrode of the seventh transistor is electrically connected to the first node, and a second electrode of the seventh transistor is electrically connected to the first electrode of the driving transistor.

Optionally, the first writing-in sub-circuit comprises a third transistor, and the second writing-in sub-circuit comprises a fourth transistor; a gate electrode of the third transistor is electrically connected to the first control terminal, a first electrode of the third transistor is electrically connected to the first data line, and a second electrode of the third transistor is electrically connected to the second writing-in node; a gate electrode of the fourth transistor is electrically connected to the second control terminal, a first electrode of the fourth transistor is electrically connected to the second data line, and a second electrode of the fourth transistor is electrically connected to the first writing-in node.

Optionally, the initialization circuit comprises an eighth transistor; a gate electrode of the eighth transistor is electrically connected to the second control terminal, a first electrode of the eighth transistor is electrically connected to the third initial voltage terminal, and a second electrode of the eighth transistor is electrically connected to the second writing-in node.

Optionally, the switch control circuit comprises a ninth transistor; the driving circuit comprises a driving transistor, the first light emitting control circuit comprises a fifth transistor, the second light emitting control circuit comprises a sixth transistor, and the compensation control circuit comprises a seventh transistor; a gate electrode of the fifth transistor is electrically connected to the light emitting control terminal, a first electrode of the fifth transistor is electrically connected to the first voltage terminal, and a second electrode of the fifth transistor is electrically connected to the first electrode of the driving transistor; a gate electrode of the sixth transistor is electrically connected to the light emitting control terminal, and a first electrode of the sixth transistor is electrically connected to the second electrode of the driving transistor; a gate electrode of the ninth transistor is electrically connected to the switch control terminal, a first electrode of the ninth transistor is electrically connected to a second electrode of the sixth transistor, and a second electrode of the ninth transistor is electrically connected to the first electrode of the light emitting element; a gate electrode of the driving transistor is electrically connected to the first node; a gate electrode of the seventh transistor is electrically connected to the scanning terminal, a first electrode of the seventh transistor is electrically connected to the first node, and a second electrode of the seventh transistor is electrically connected to the second electrode of the driving transistor.

Optionally, the switch control circuit comprises a ninth transistor; the driving circuit comprises a driving transistor, the first light emitting control circuit comprises a fifth transistor, the second light emitting control circuit comprises a sixth transistor, and the compensation control circuit comprises a seventh transistor; a gate electrode of the ninth transistor is electrically connected to the switch control terminal, a first electrode of the ninth transistor is electrically connected to the second electrode of the light emitting element, and a second electrode of the ninth transistor is electrically connected to a first electrode of the fifth transistor; a gate electrode of the fifth transistor is electrically connected to the light emitting control terminal, and a second electrode of the fifth transistor is electrically connected to a first electrode of the driving transistor; a gate electrode of the driving transistor is electrically connected to the first node, and a second electrode of the driving transistor is electrically connected to a first electrode of the sixth transistor; a gate electrode of the sixth transistor is electrically connected to the light emitting control terminal, and a second electrode of the sixth transistor is electrically connected to the second voltage terminal; a gate electrode of the seventh transistor is electrically connected to the scanning terminal, a first electrode of the seventh transistor is electrically connected to the first node, and a second electrode of the seventh transistor is electrically connected to the first electrode of the driving transistor.

In a second aspect, an embodiment of the present disclosure provides a driving method, applied to the pixel circuit, wherein a display cycle comprises a first display phase and a second display phase which are arranged successively, the first display phase comprises a first writing-in time period; and the second display phase comprises a reset time period and a second writing-in time period which are arranged successively; the driving method comprises: in the first writing-in period, providing, by the data writing-in circuit, the display data voltage to the writing-in node under the control of the writing-in control signal; in the reset time period, writing, by the first reset circuit, the first initial voltage into the first electrode of the light emitting element under the control of the first reset control signal; in the second writing-in period, providing, by the data writing-in circuit, the light emitting time control data voltage to the writing-in node under the control of the writing-in control signal.

Optionally, the pixel circuit further comprises a second reset circuit; the driving method further comprises: in the reset period, writing, by the second reset circuit, the second initial voltage into the first node under the control of a second reset control signal.

Optionally, the reset time period is a second reset time period, the first display stage further comprises a first reset time period arranged before the first writing-in time period; the driving method further comprises: in the first reset period, writing, by the first reset circuit, the first initial voltage into the first electrode of the light emitting element under the control of the first reset control signal, and writing, by the second reset circuit, the second initial voltage into the first node under the control of the second reset control signal.

In a third aspect, an embodiment of the present disclosure provides a display device comprising the pixel circuit.

BRIEF DESCRIPTION OF THE DRAWINGS

FIG. 83 is a timing diagram of the pixel circuit shown in FIG. 82;

FIG. 84A is a schematic diagram showing simulation results of the pixel circuit shown in FIG. 83 when performing high grayscale display;

FIG. 84B is a schematic diagram showing simulation results of the pixel circuit shown in FIG. 83 when performing low grayscale display;

FIG. 85 is a circuit diagram of a pixel circuit according to at least one embodiment of the present disclosure;

FIG. 86 is a first timing diagram of the pixel circuit shown in FIG. 85;

FIG. 87 is a second timing diagram of the pixel circuit shown in FIG. 85;

FIG. 88 is a circuit diagram of a pixel circuit according to at least one embodiment of the present disclosure;

FIG. 89 is a first timing diagram of the pixel circuit shown in FIG. 88;

FIG. 90 is a second timing diagram of the pixel circuit shown in FIG. 88;

FIG. 91A is a schematic diagram showing the working state of the pixel circuit shown in FIG. 88 in a first reset time period S11;

FIG. 91B is a schematic diagram showing the working state of the pixel circuit shown in FIG. 88 in the first writing-in time period S12;

FIG. 91C is a schematic diagram showing the working state of the pixel circuit shown in FIG. 88 in the first light emitting time period S13;

Figure 88:
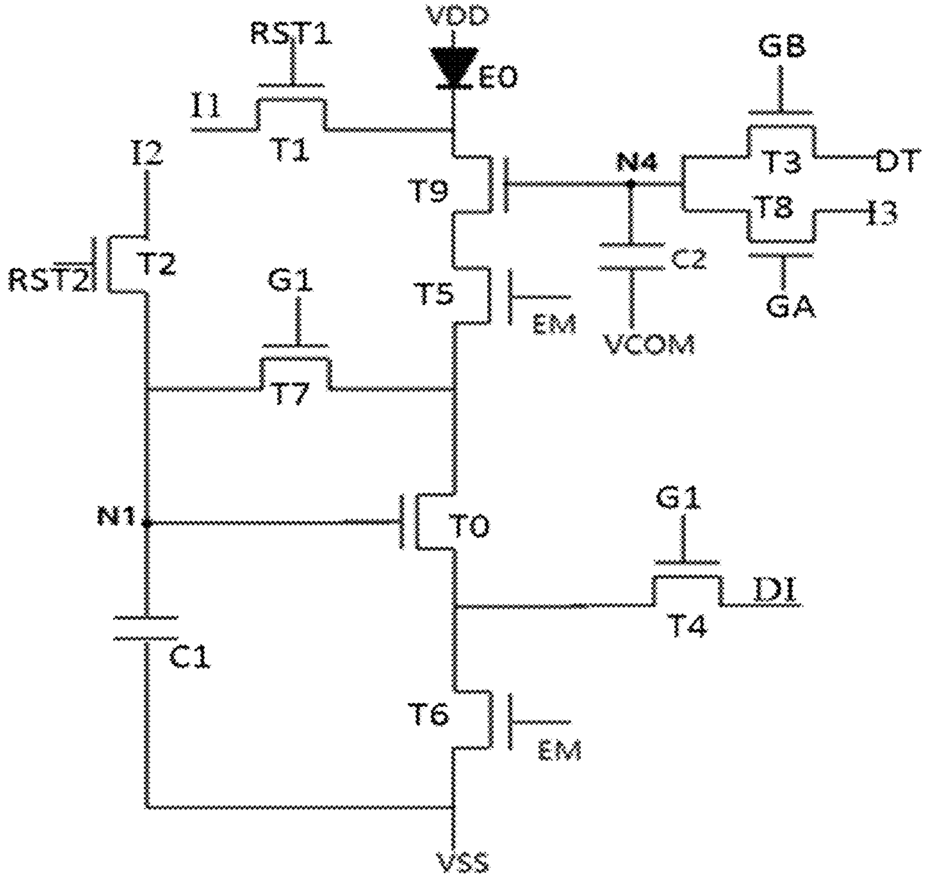
Figure 91A:
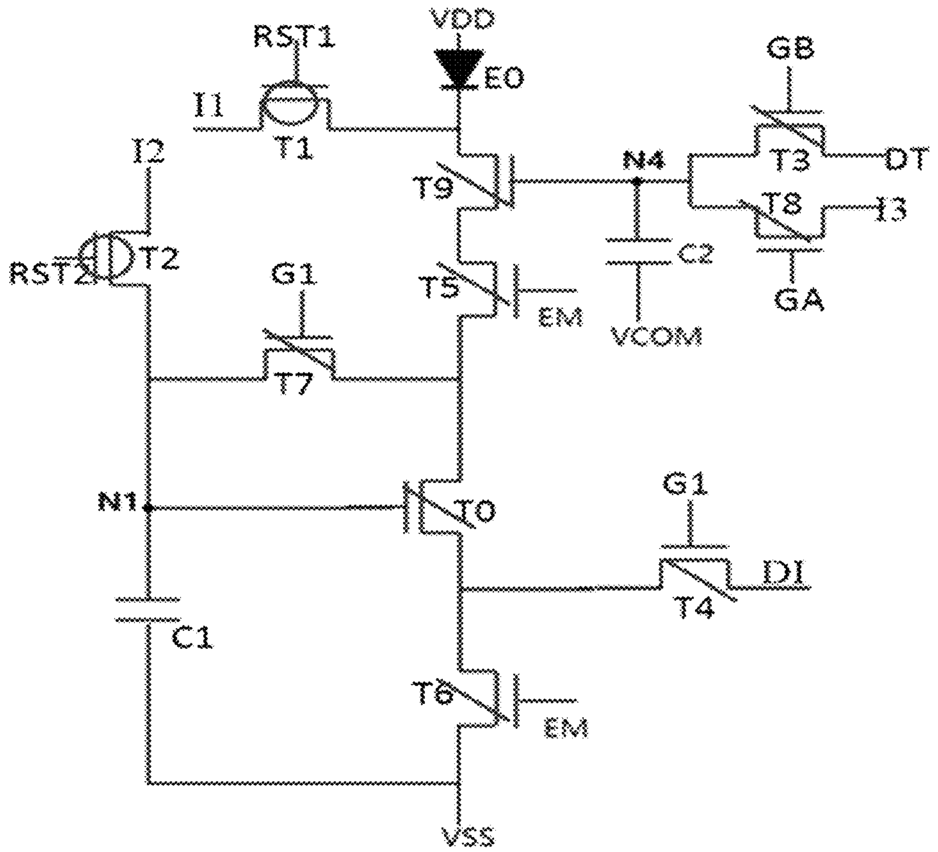
Figure 91B:
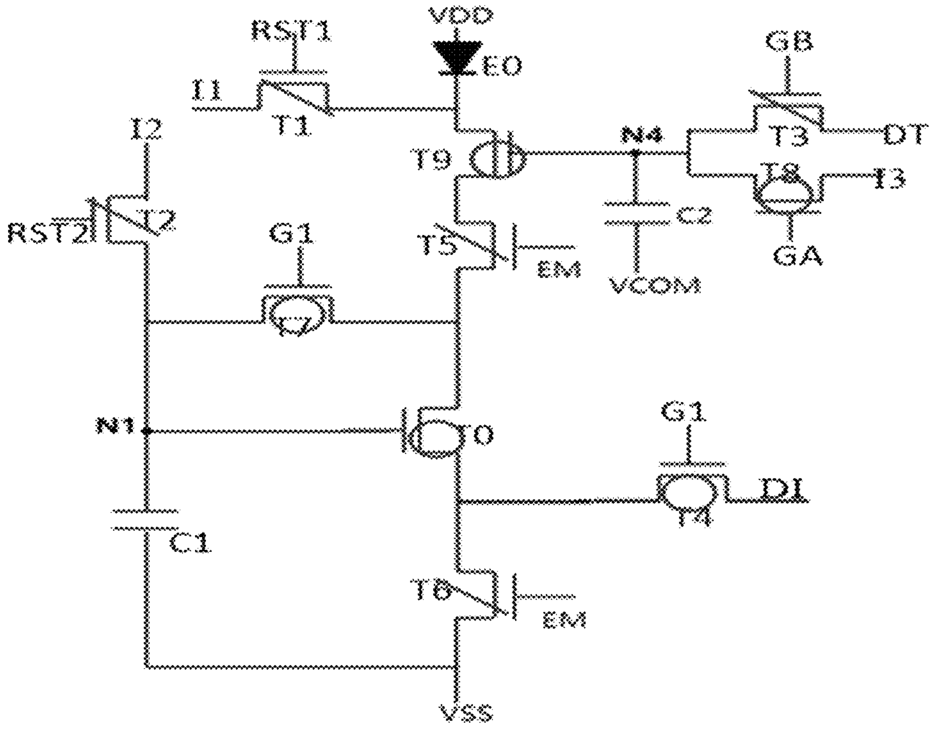
Figure 91C:
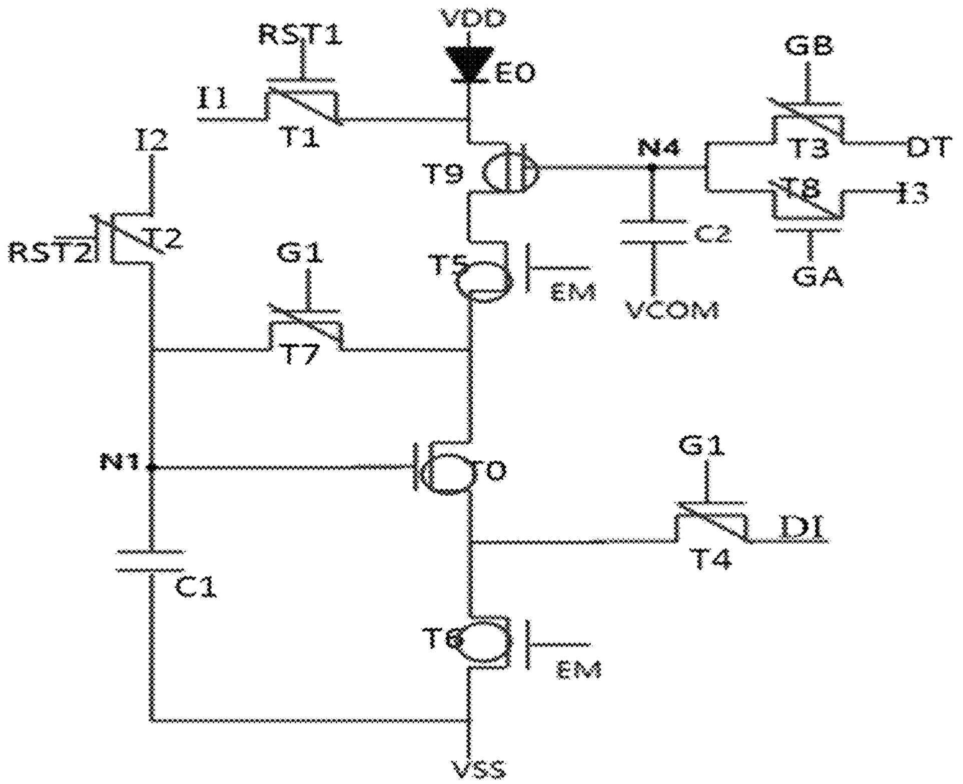
Figure 91D:
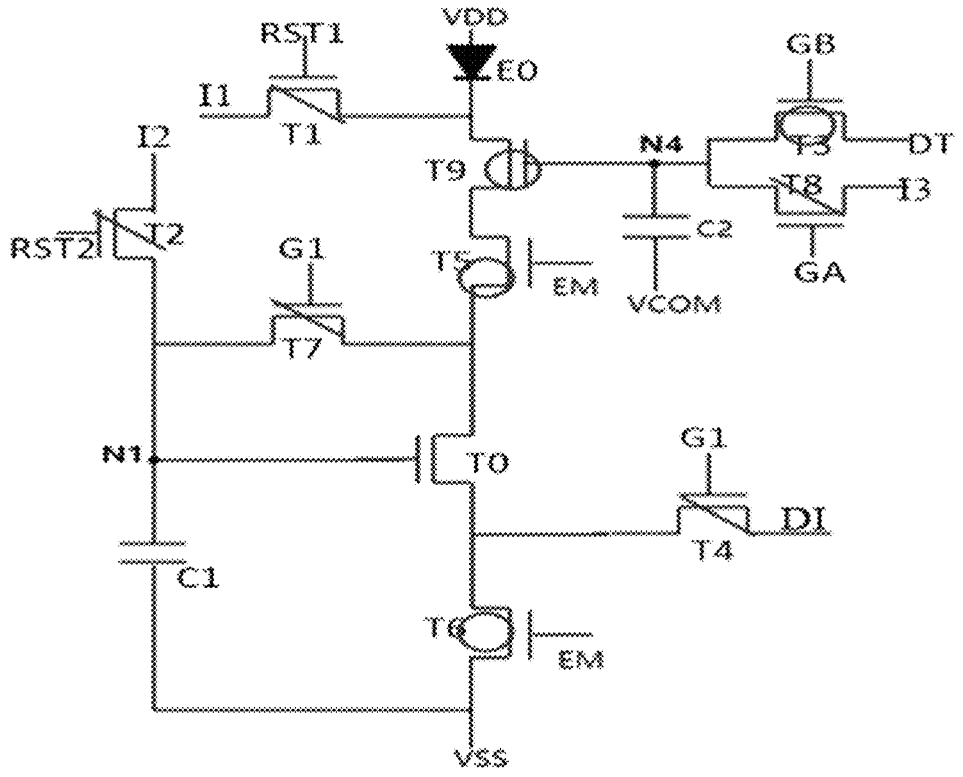
Figure 91E:
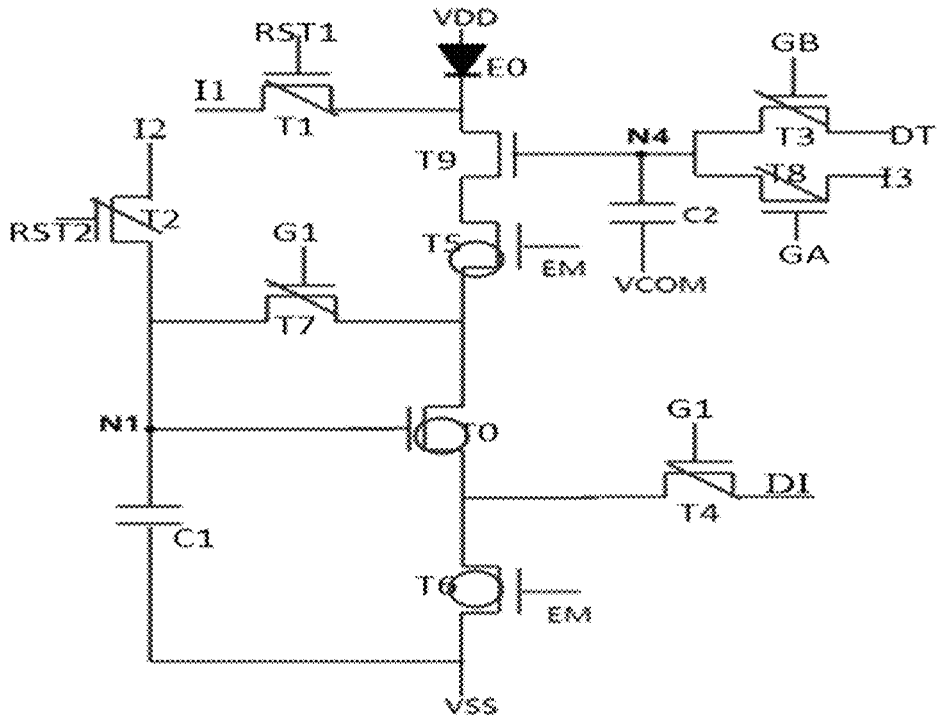
Figure 92:
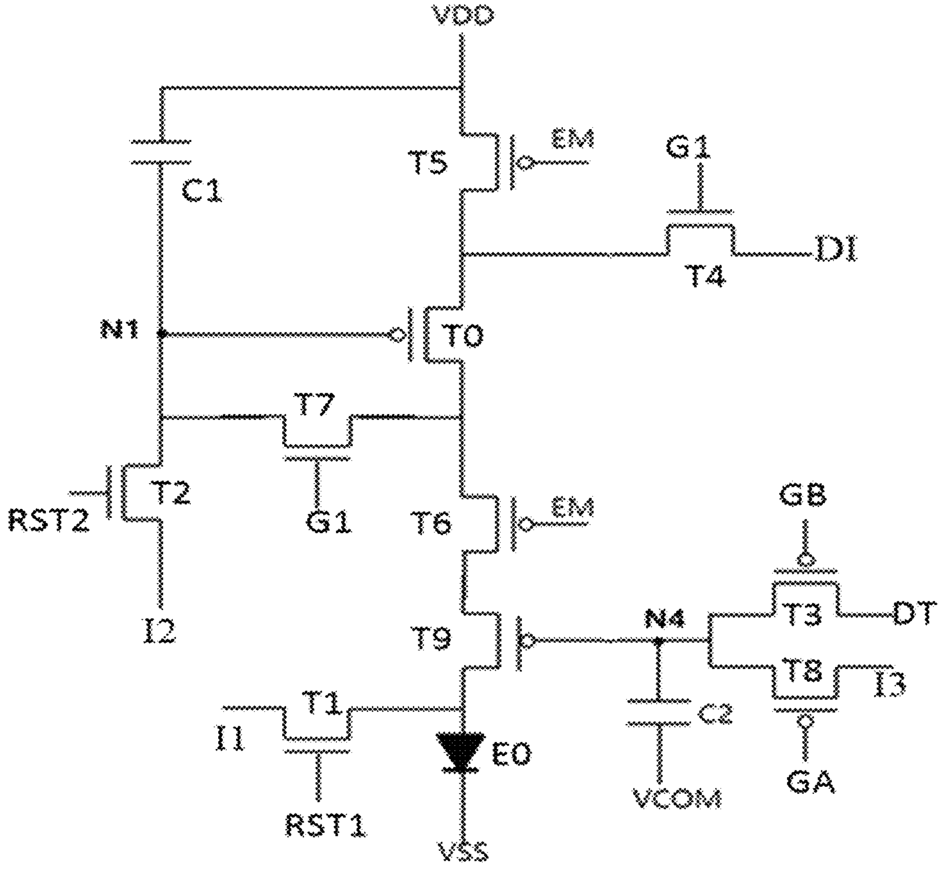
Figure 93:
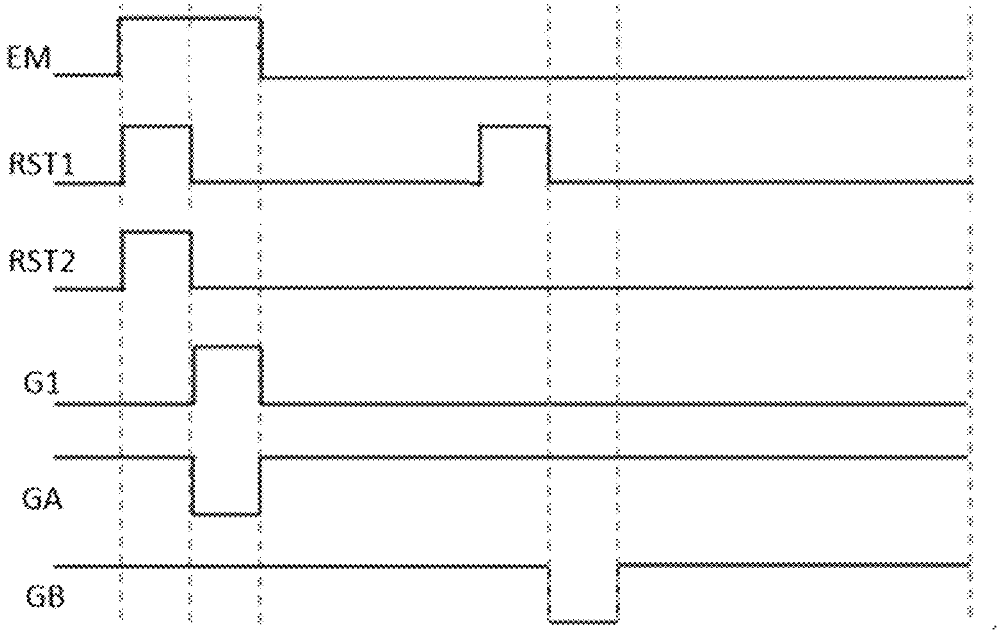
Figure 94:
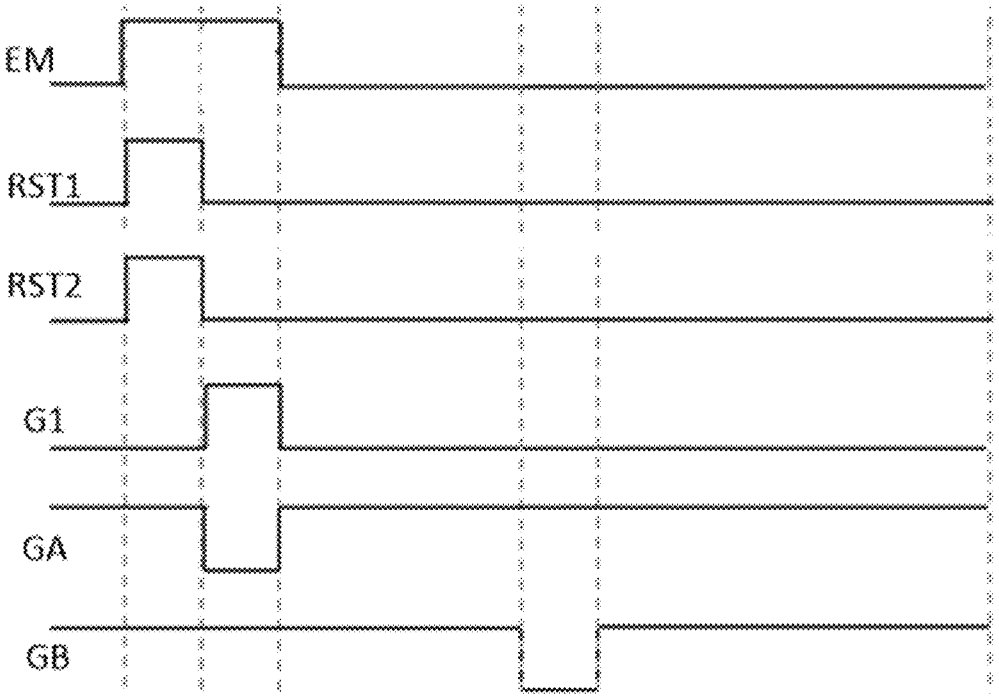
Figure 95:
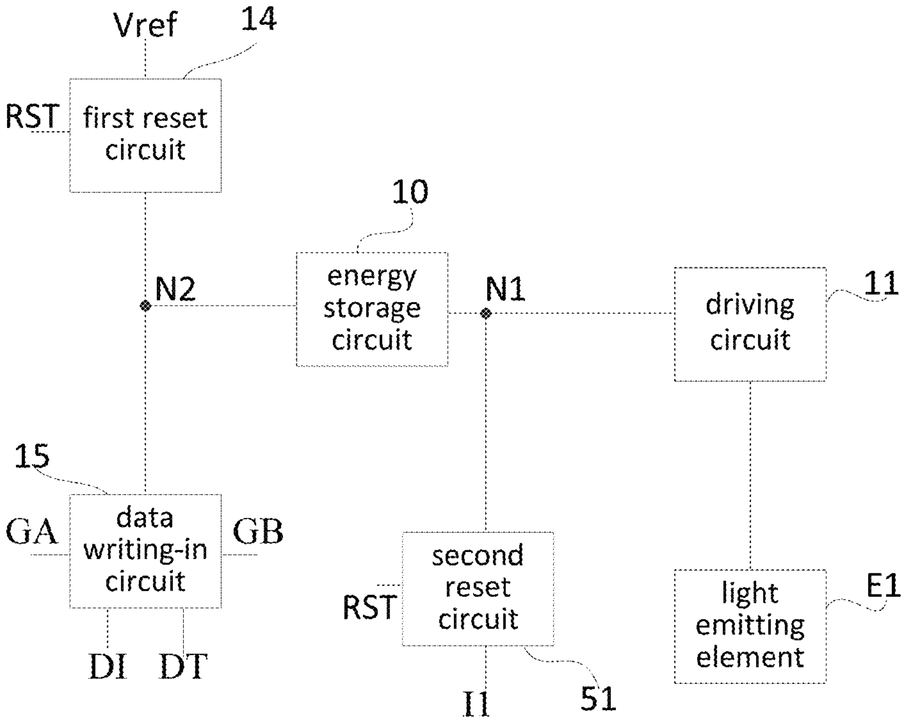
Figure 96:
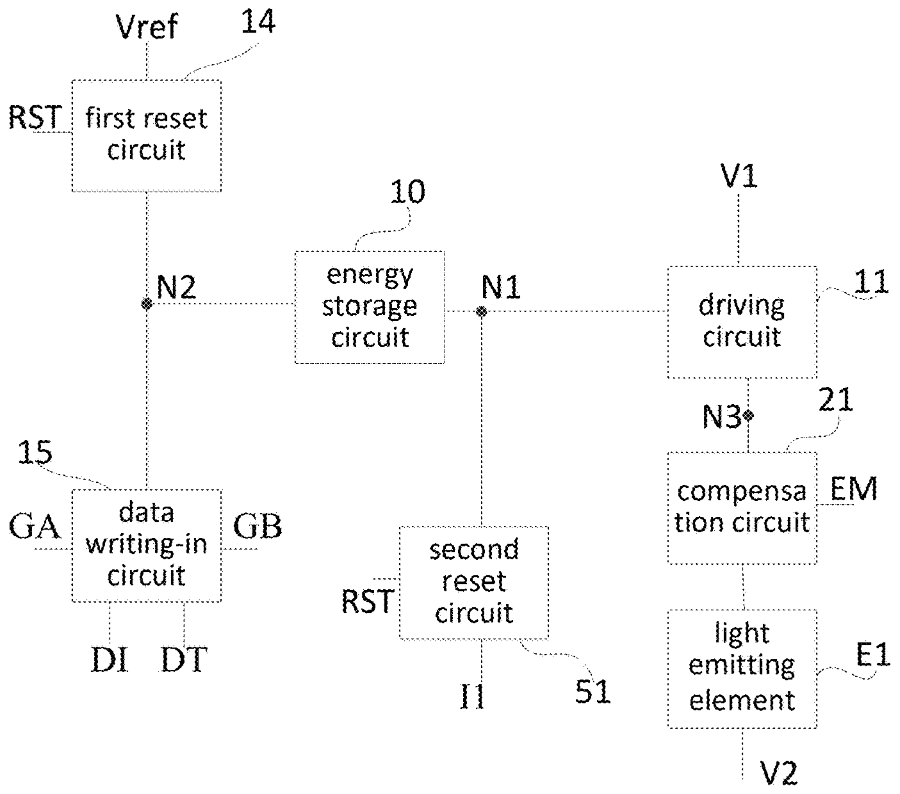
Figure 97:
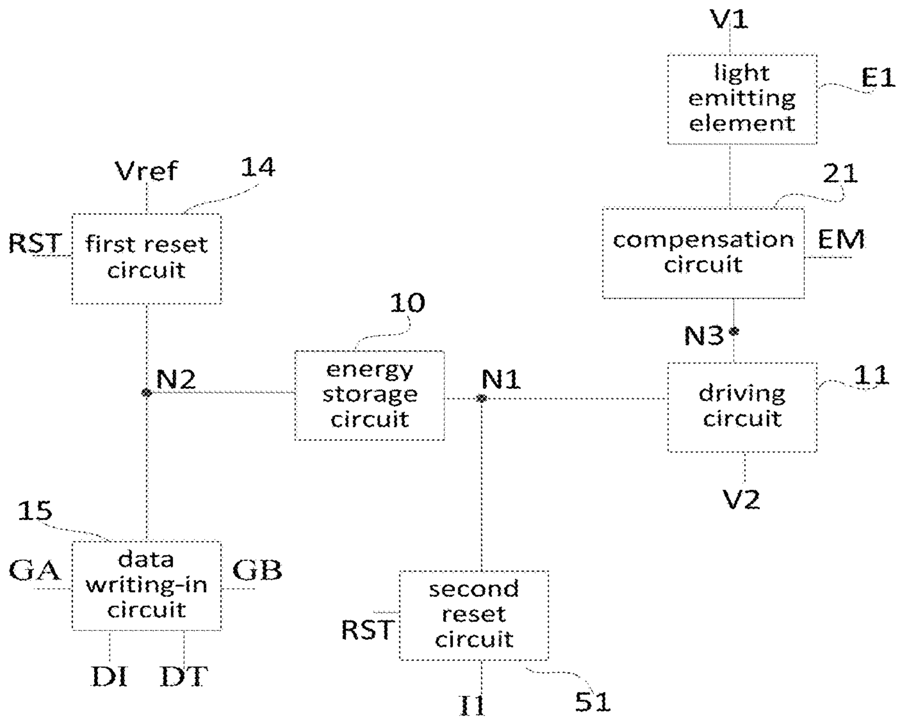
Figure 98:
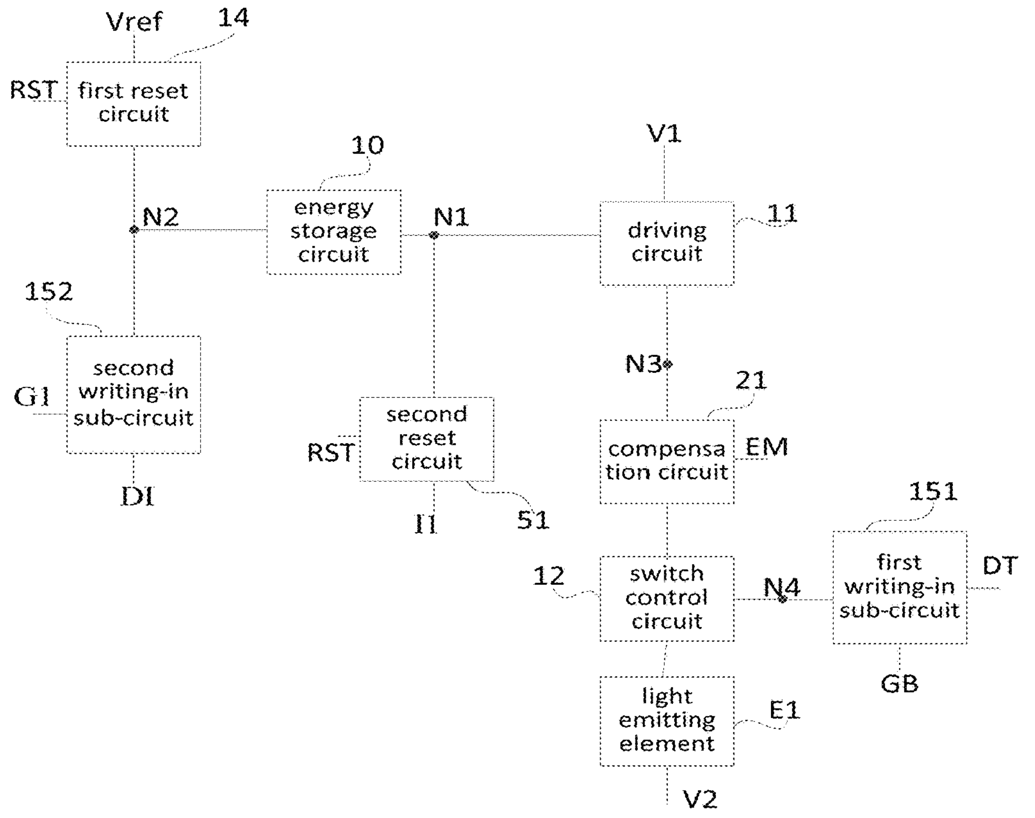
Figure 99:
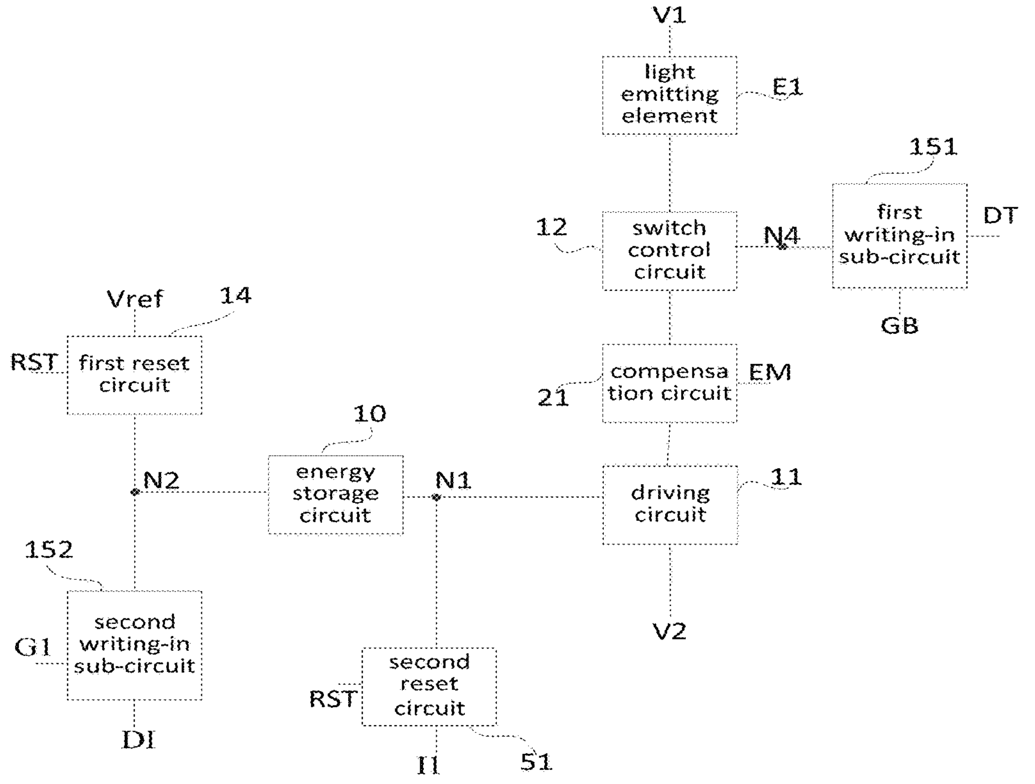
Figure 100:
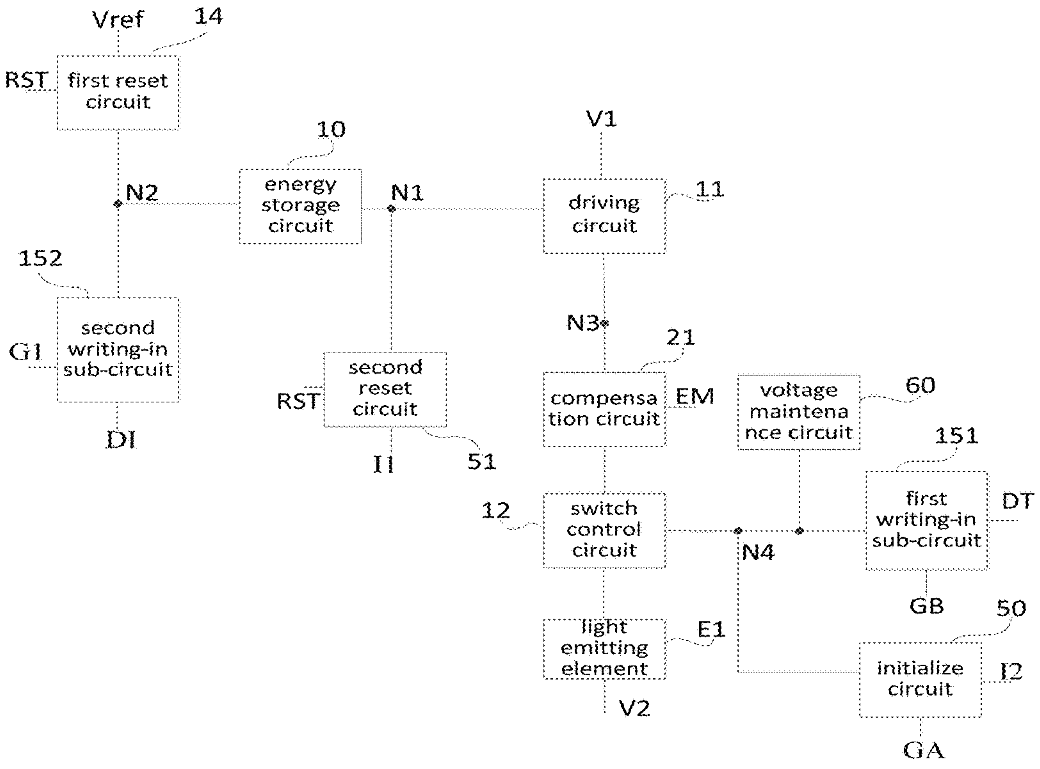
Figure 101:
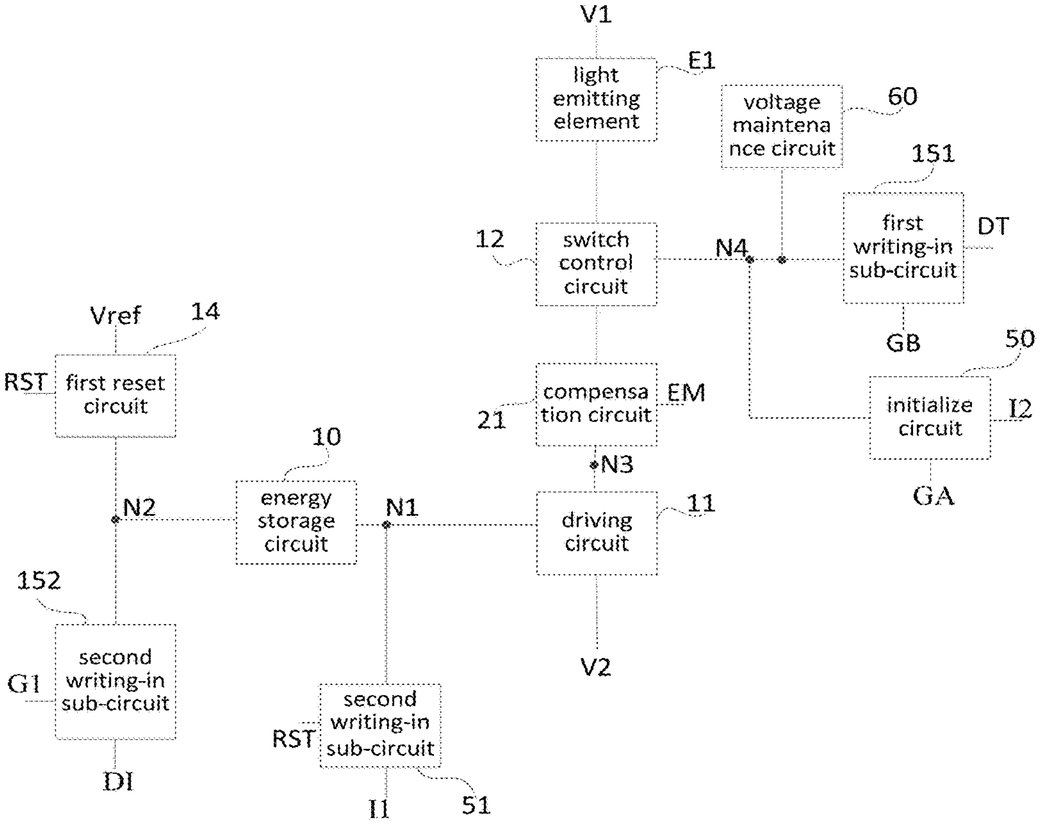
Figure 102:
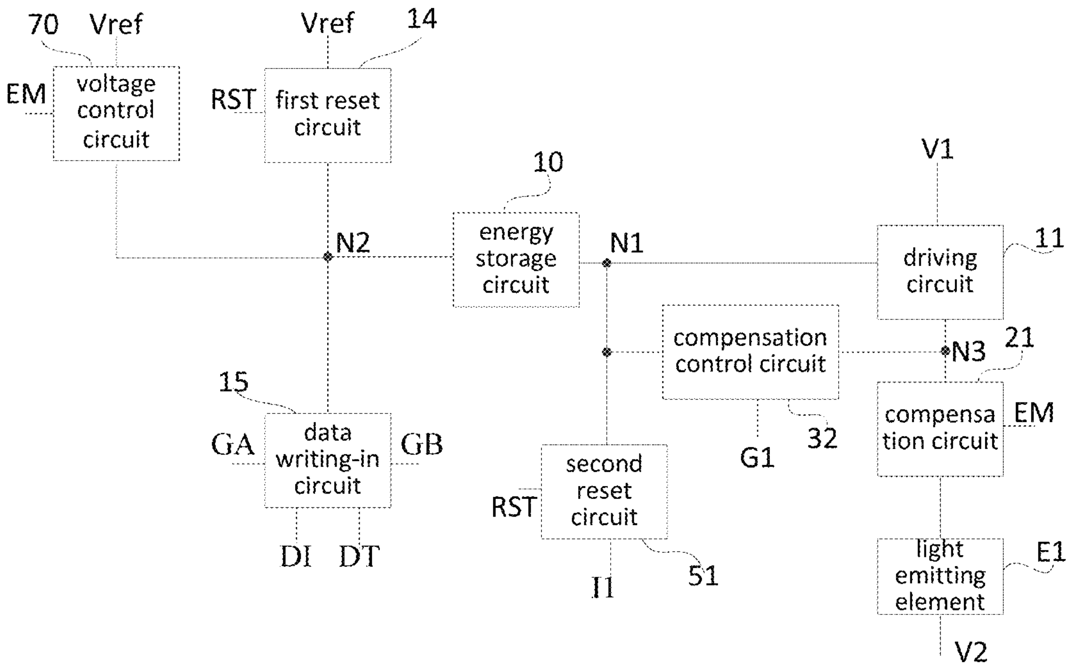
Figure 103:
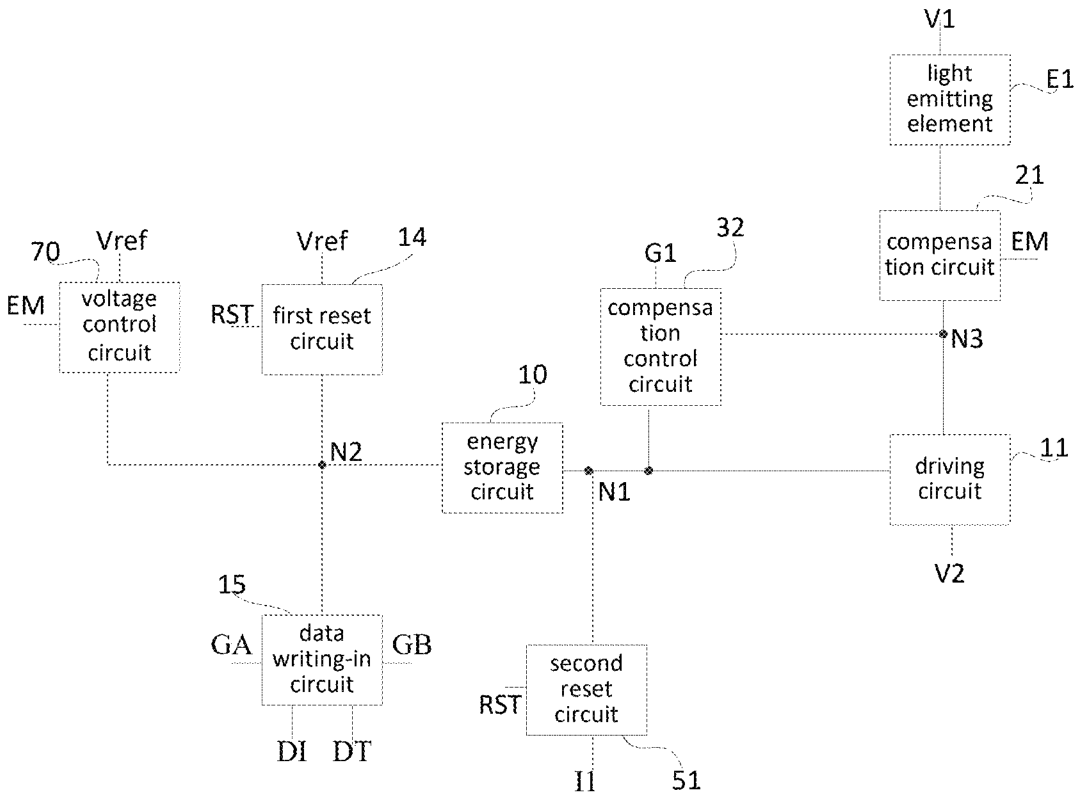
Figure 104:
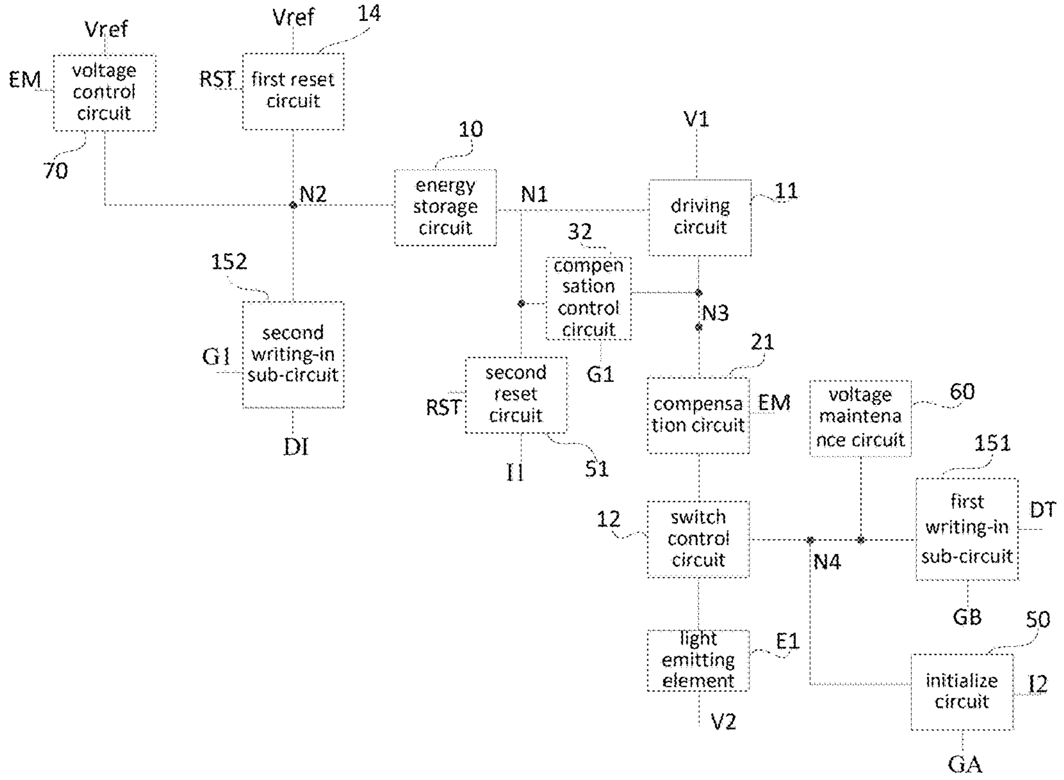
Figure 105:
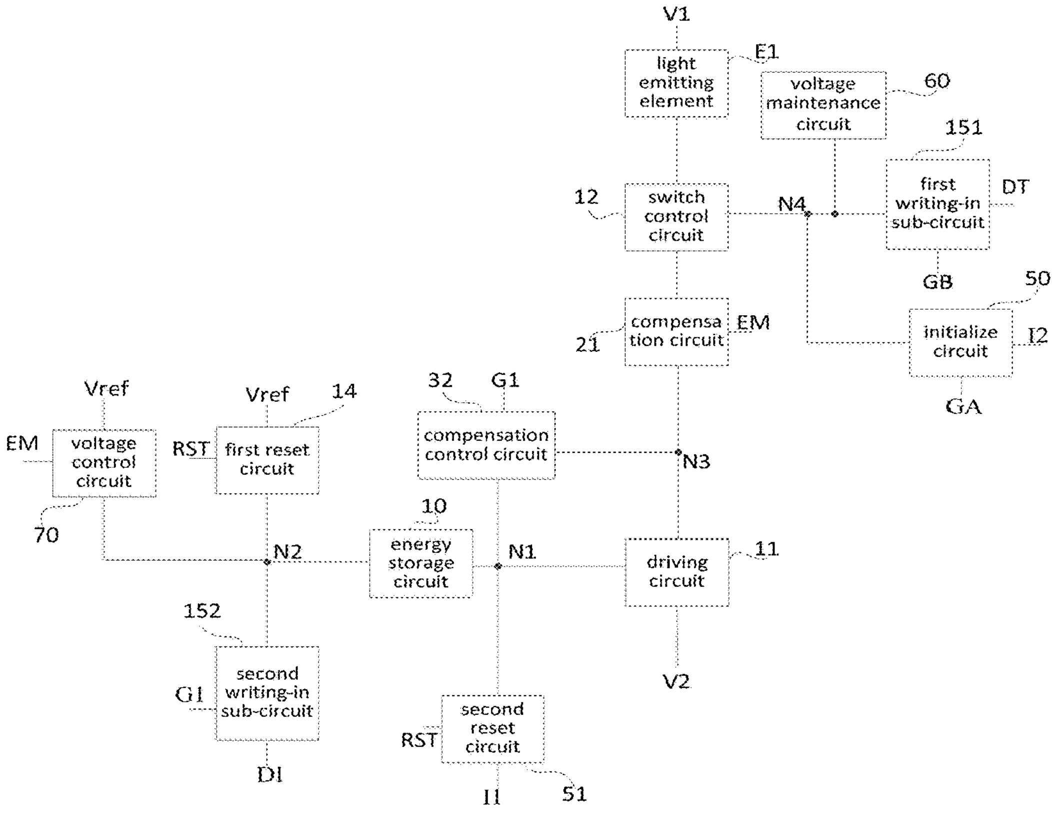
Figure 106:
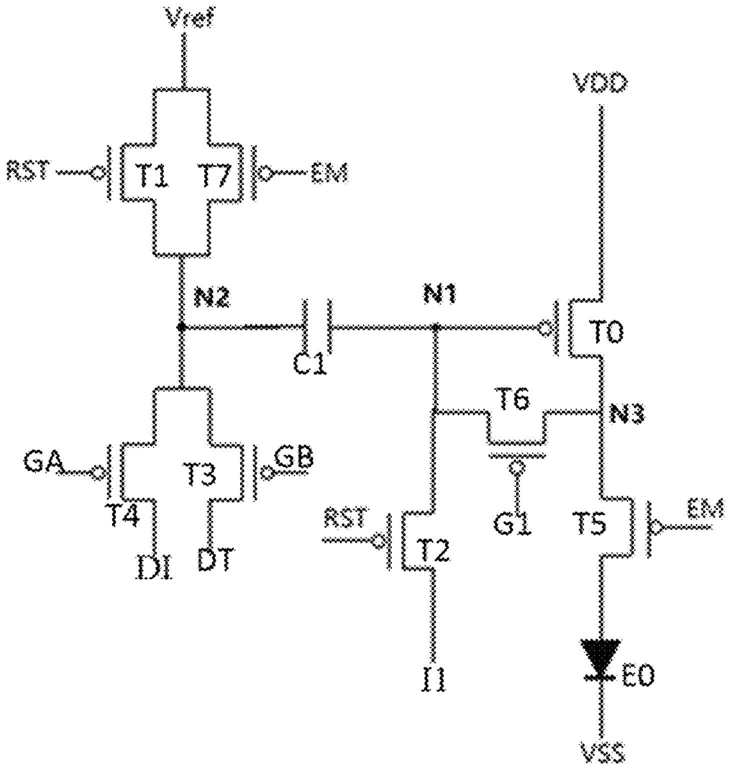
Figure 107:
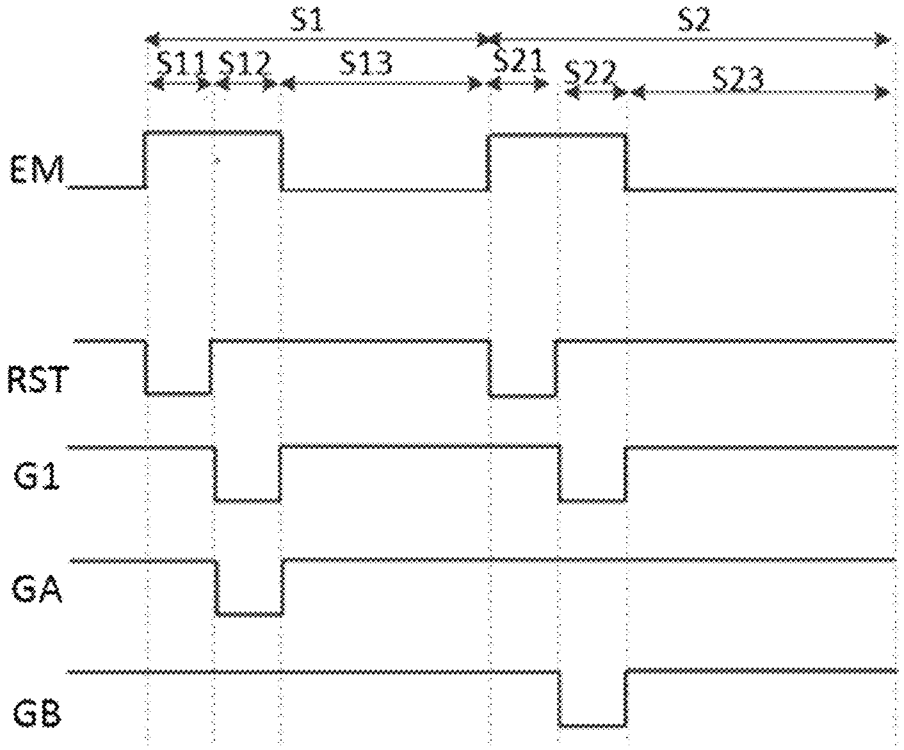
Figure 108A:
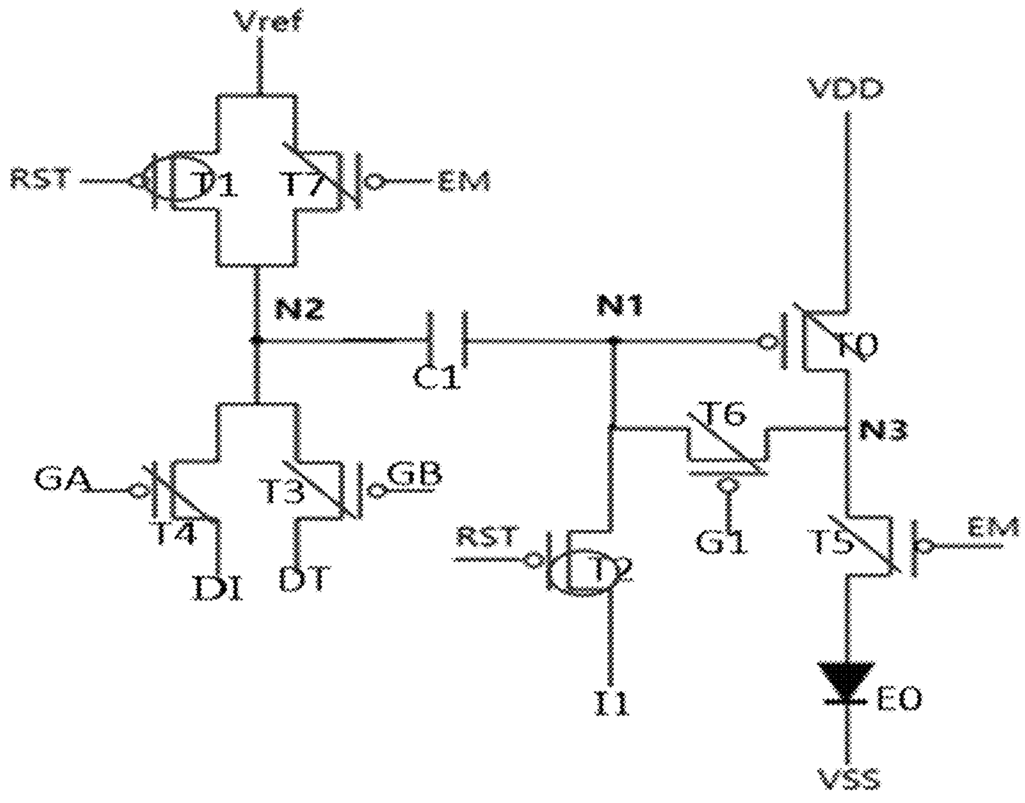
Figure 108B:
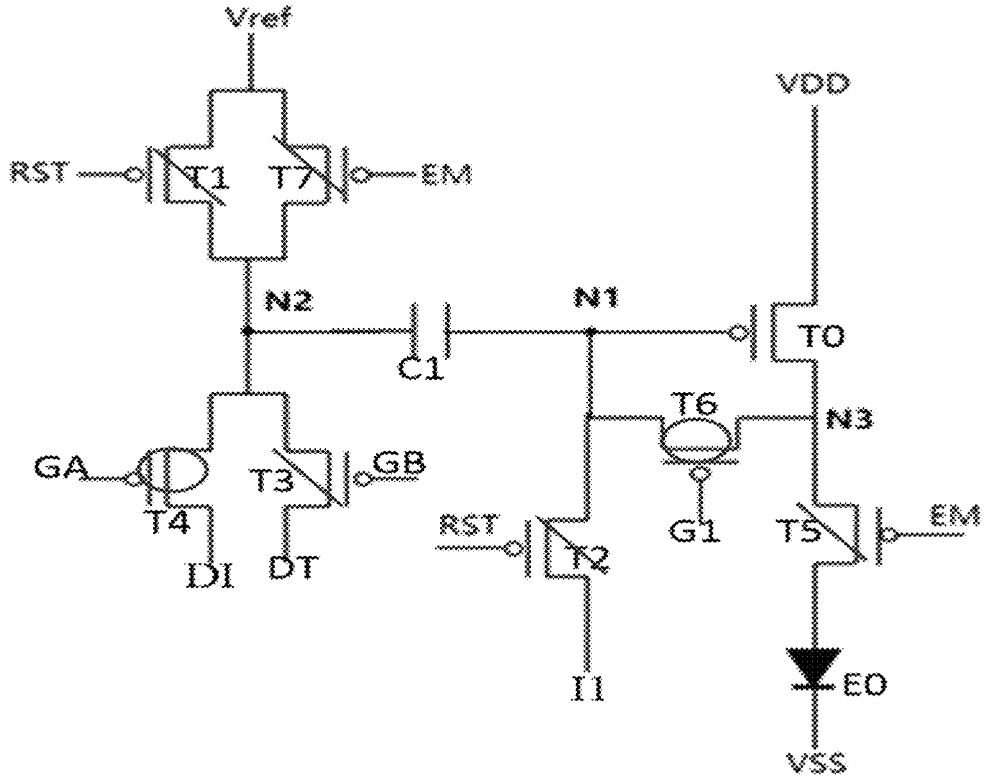
Figure 108C:
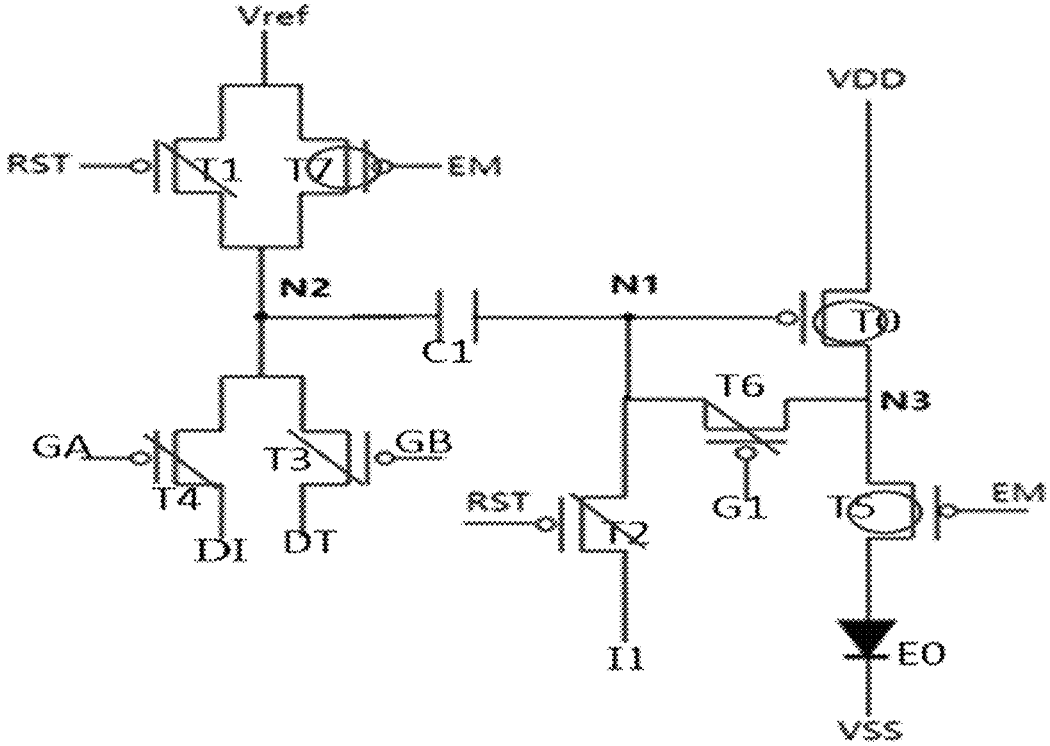
Figure 108D:
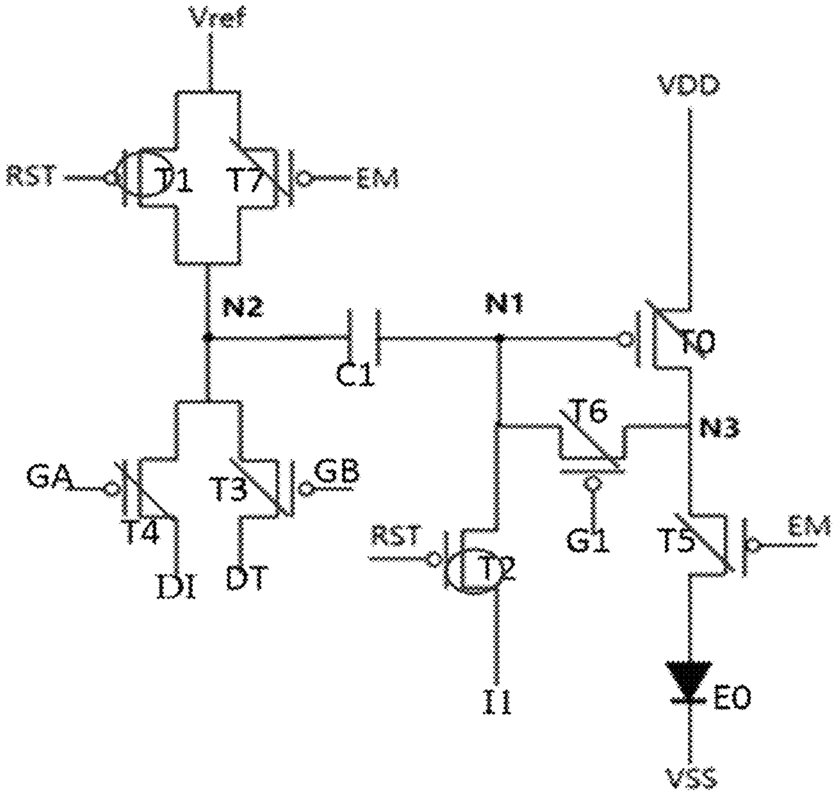
Figure 108E:
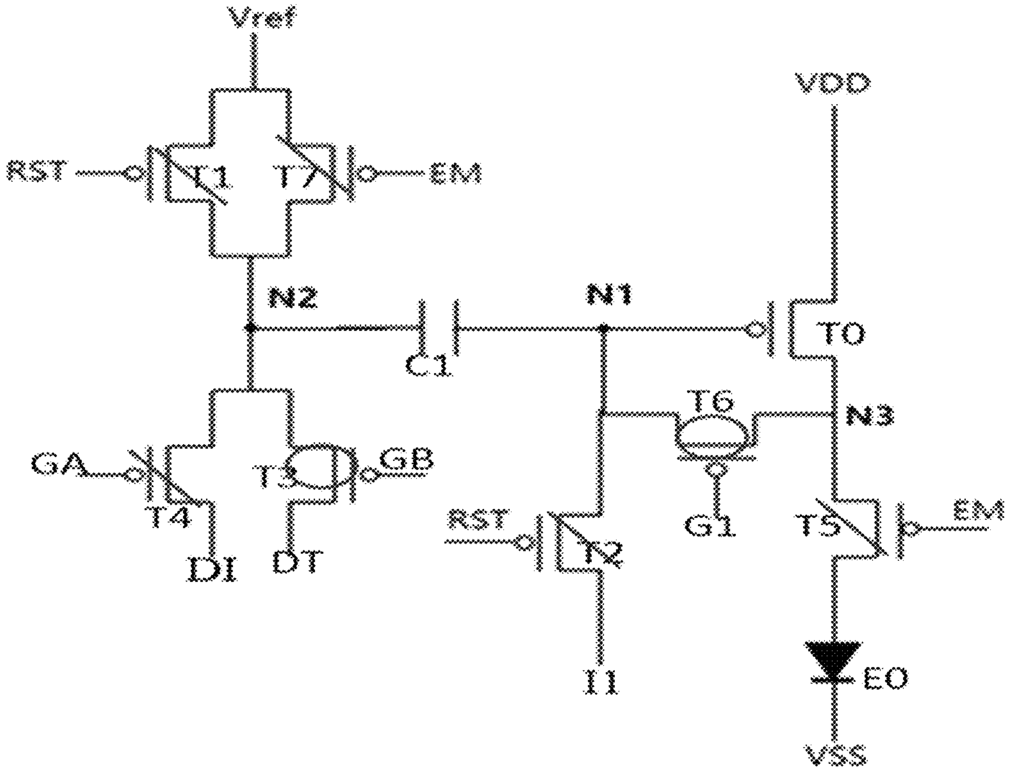
Figure 108F:
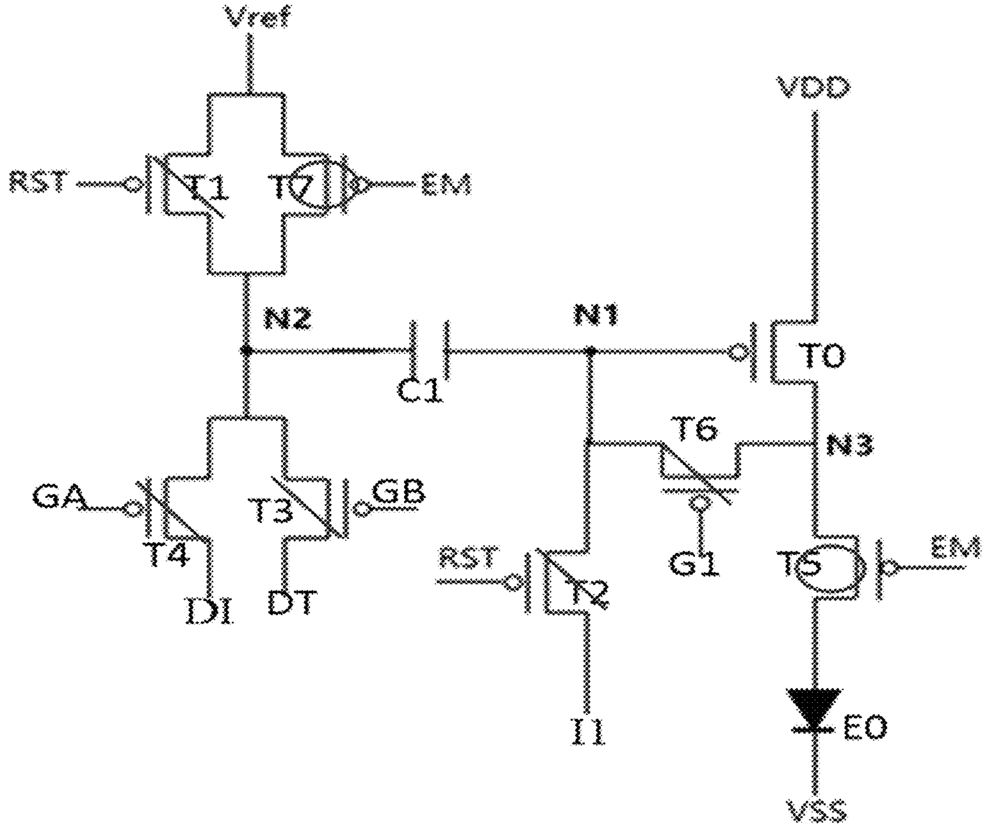
Figure 109A:
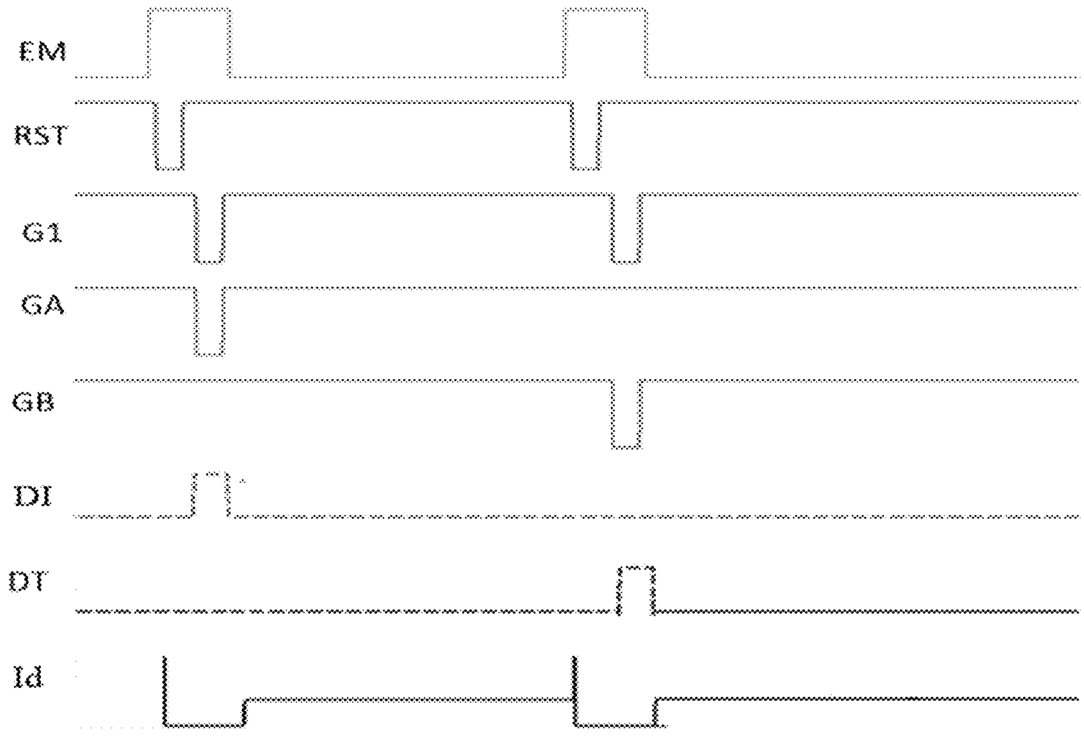
Figure 109B:
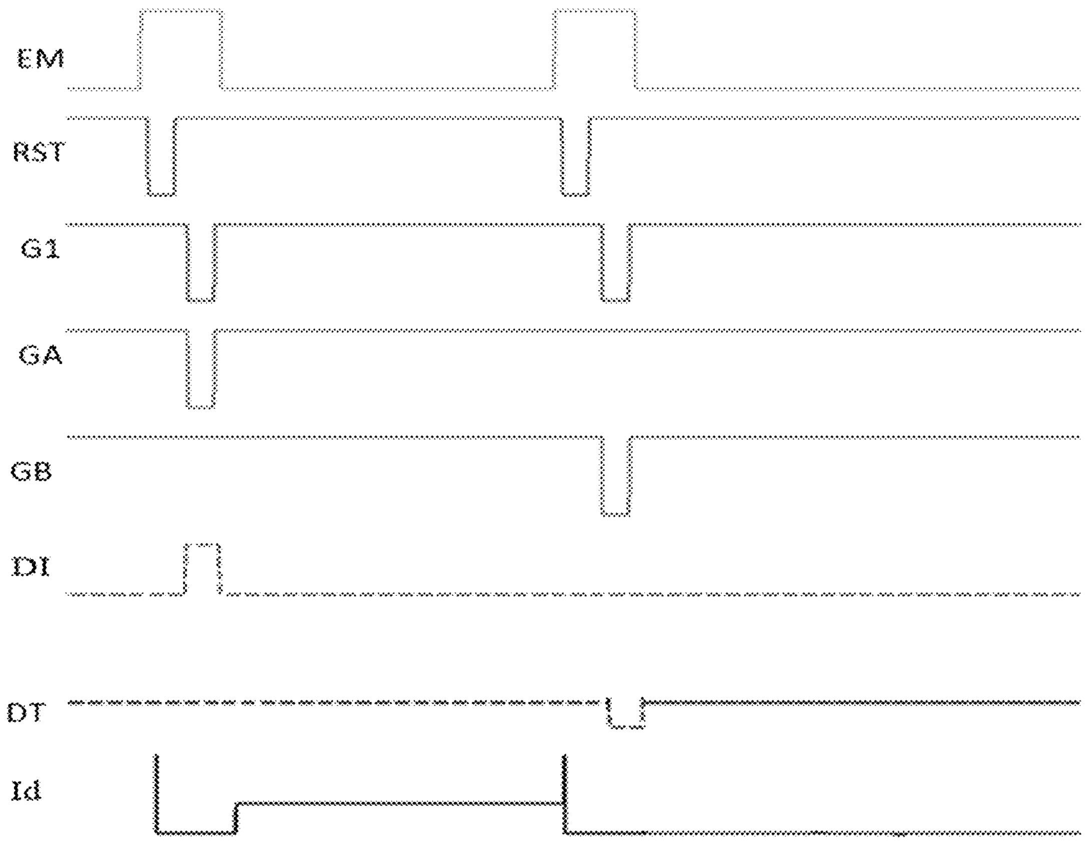
Figure 110:
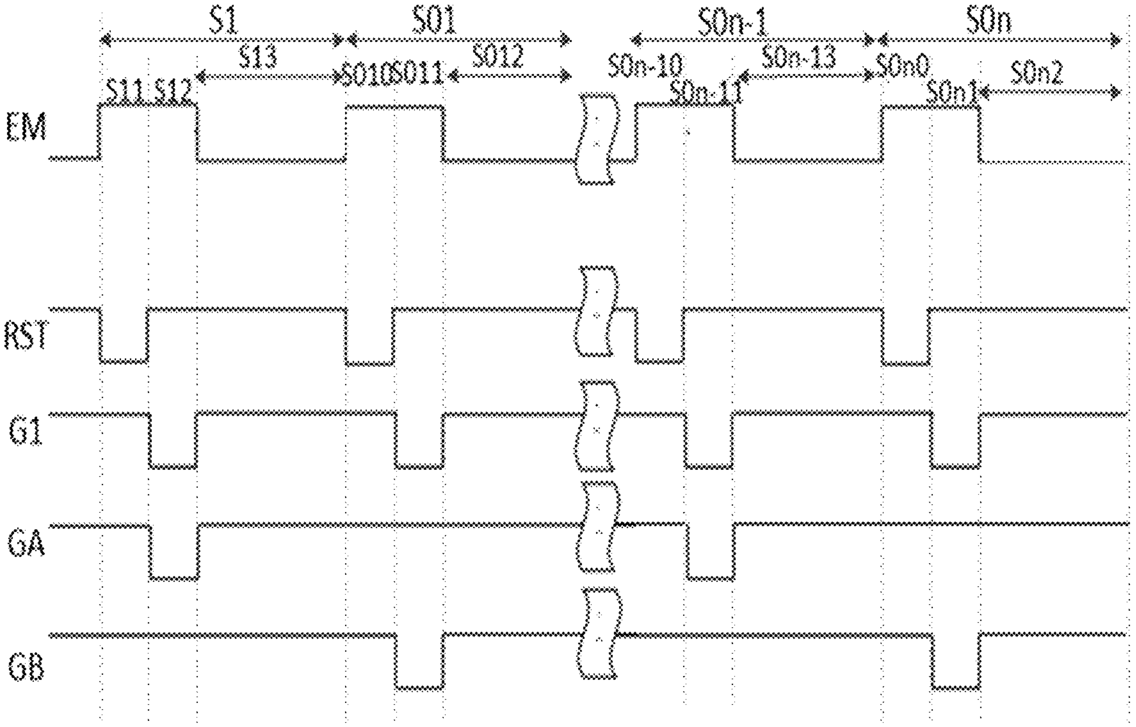
Figure 111:
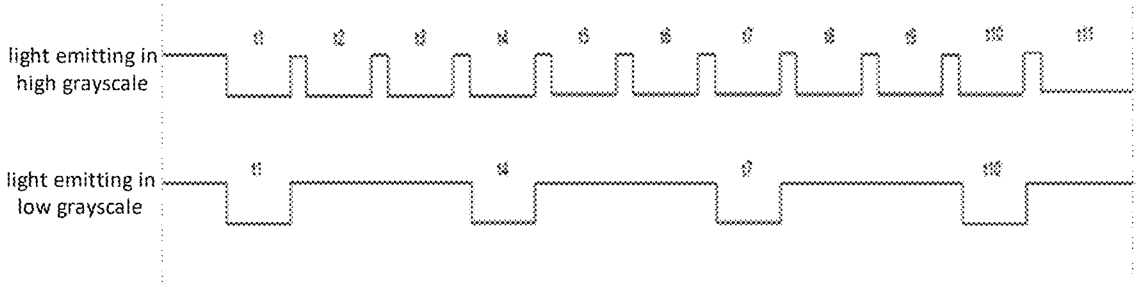
Figure 112:
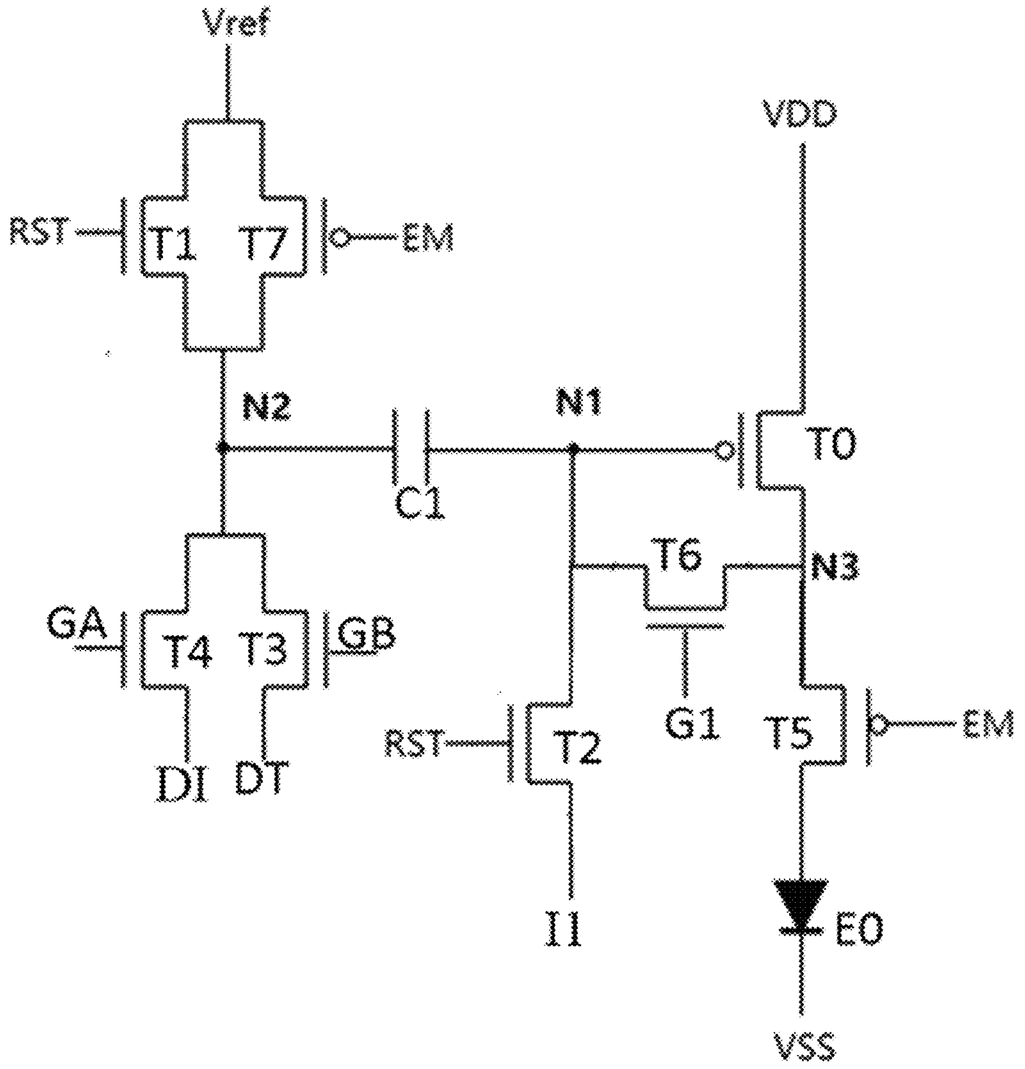
Figure 113:
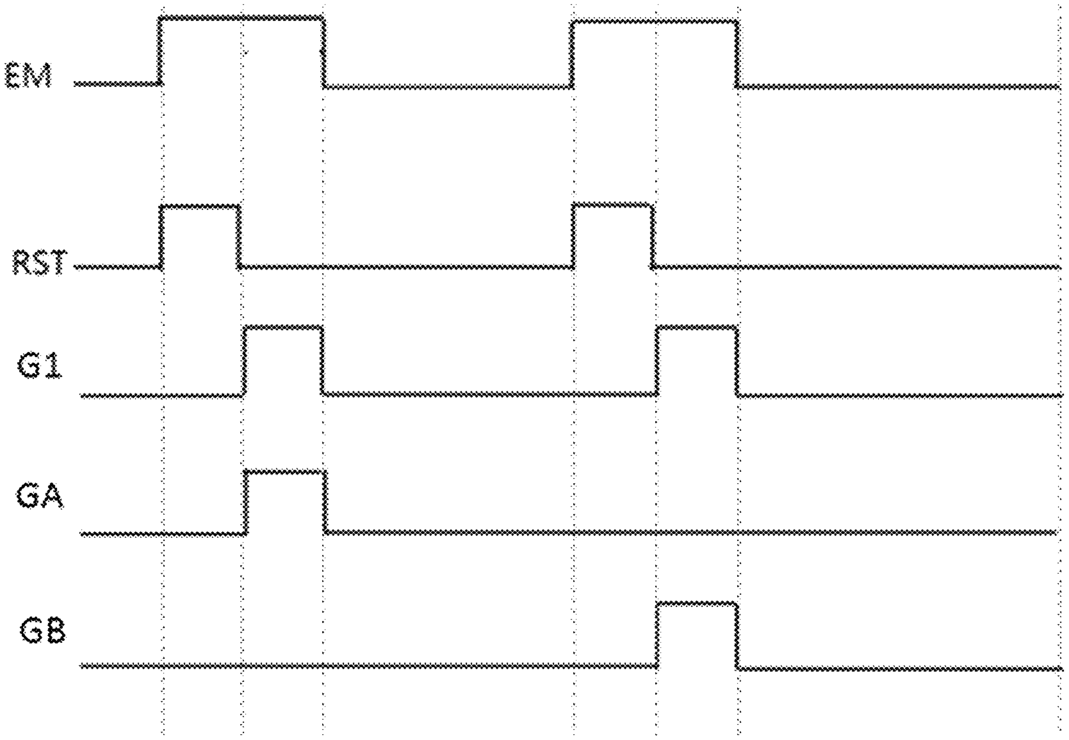
Figure 114:
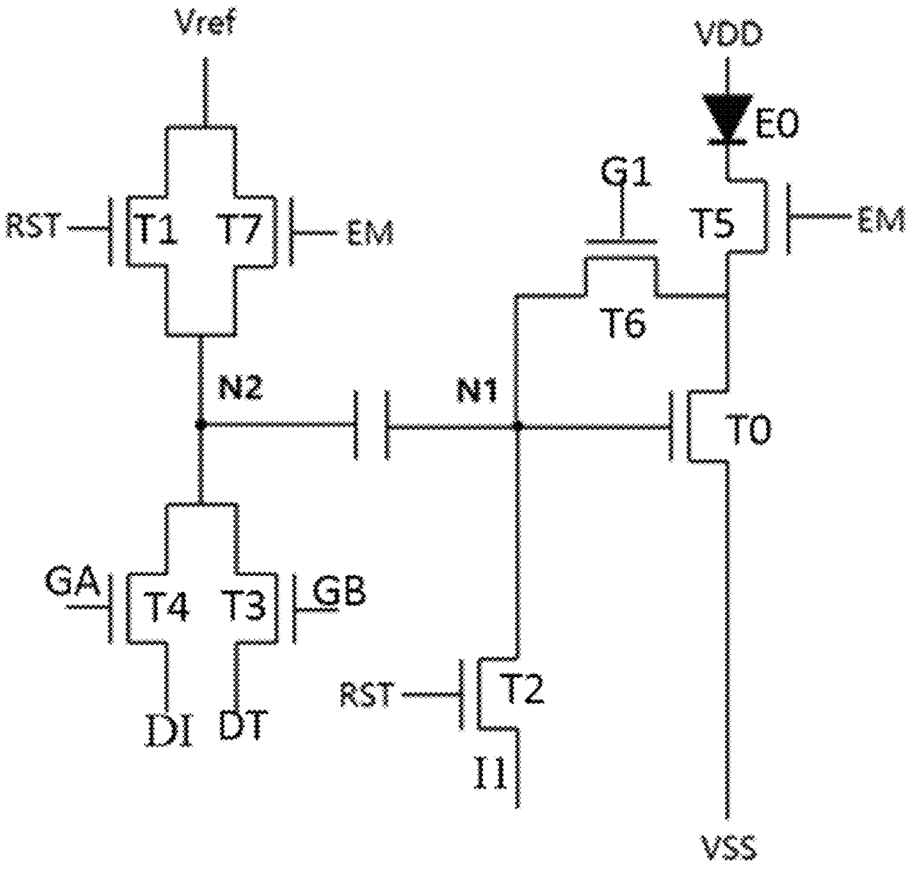
Figure 115A:
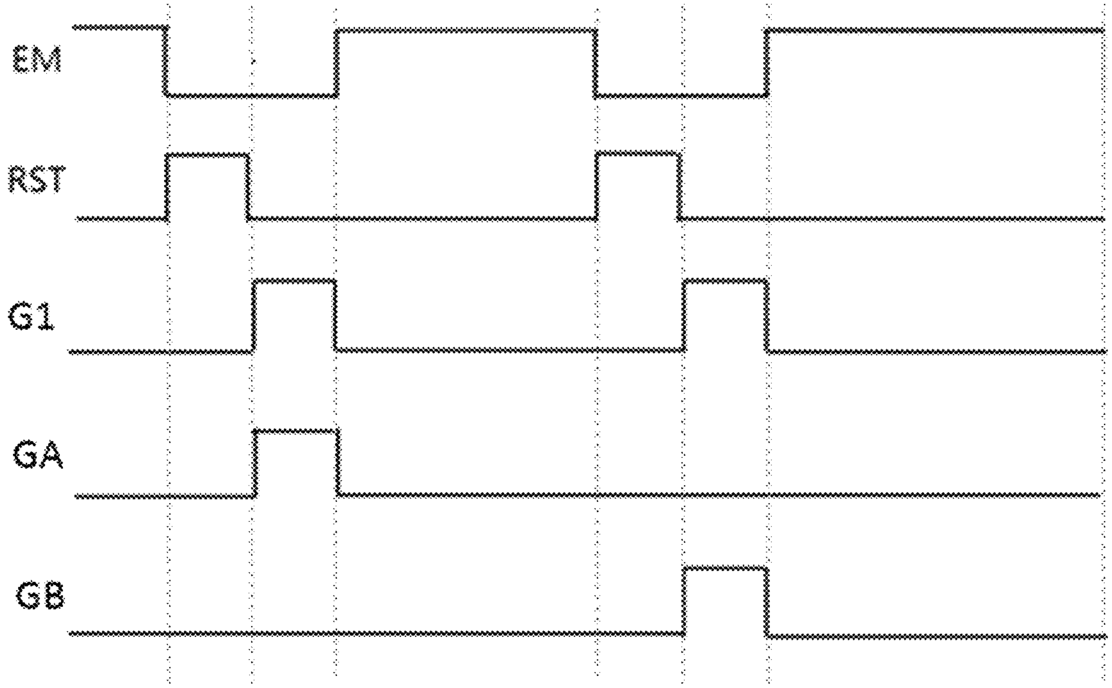
Figure 115B:
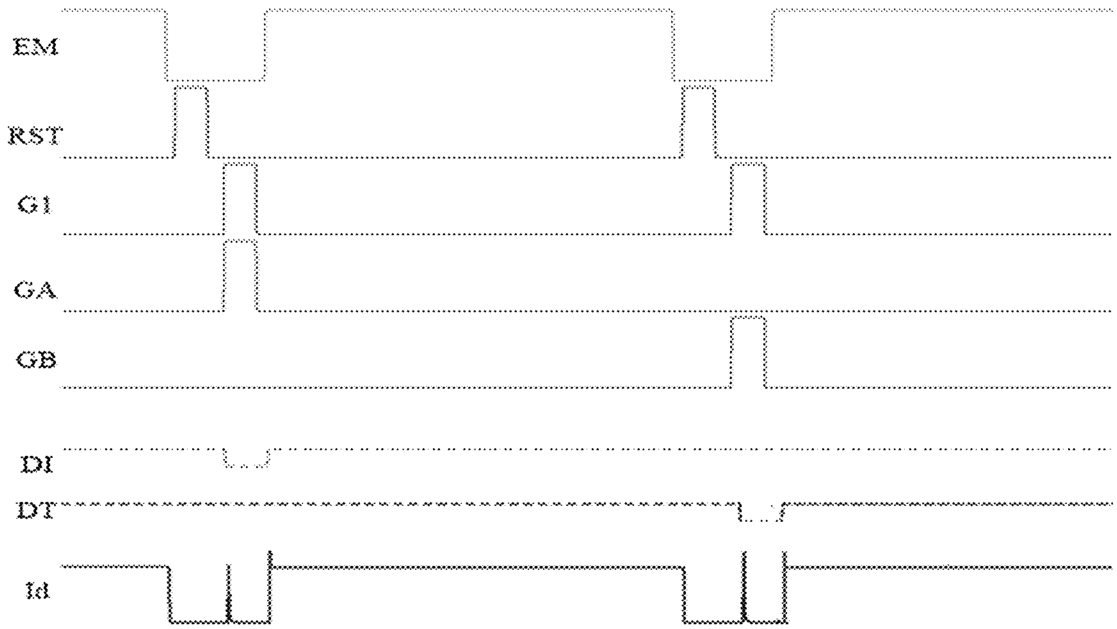
Figure 115C:
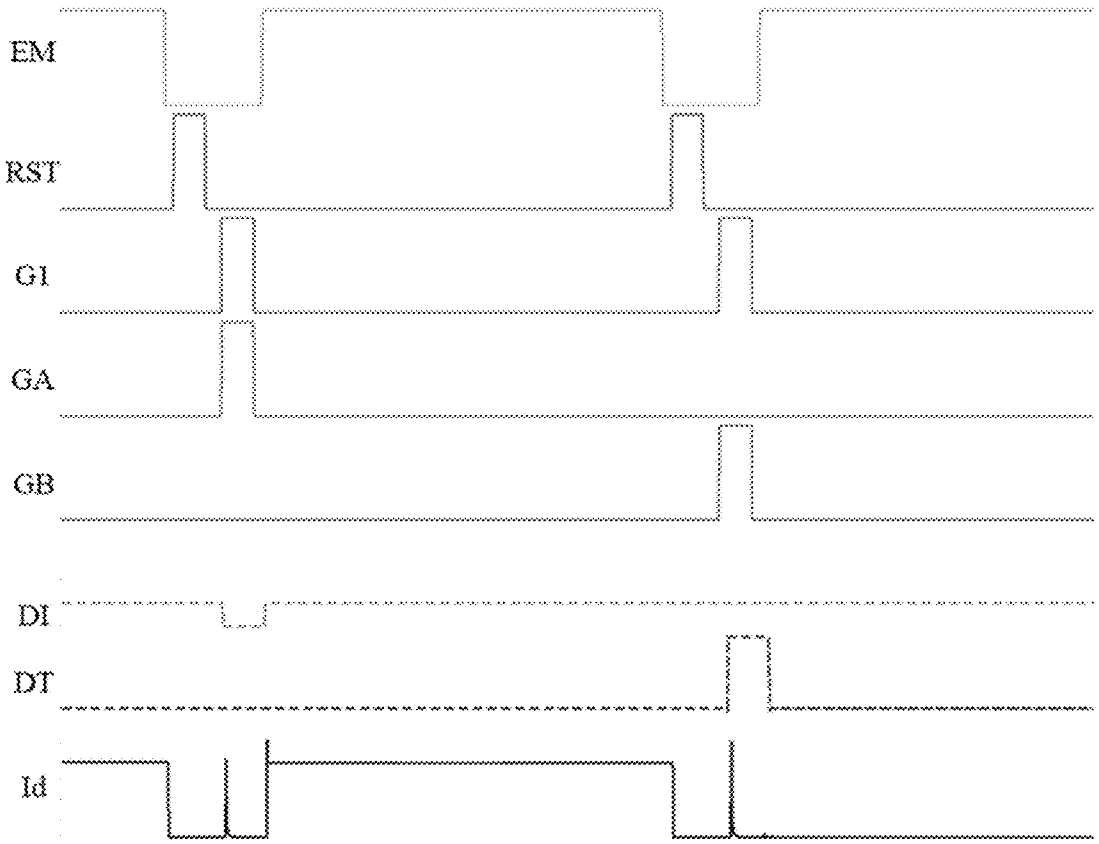
Figure 116:
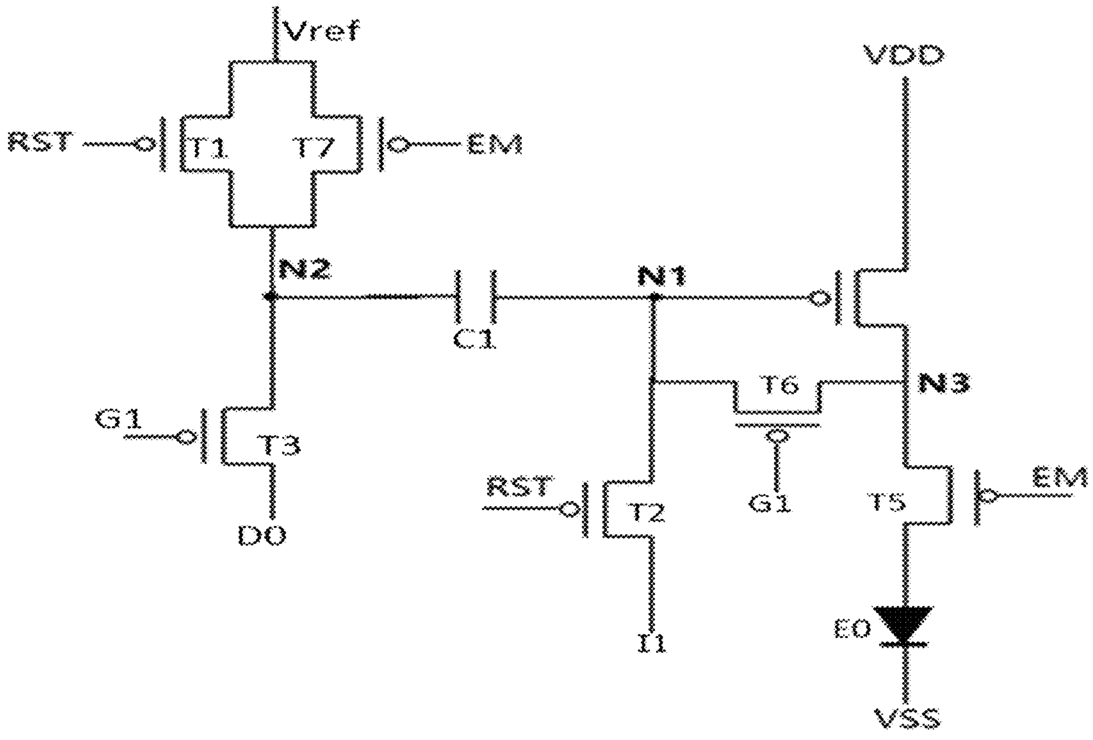
Figure 117:
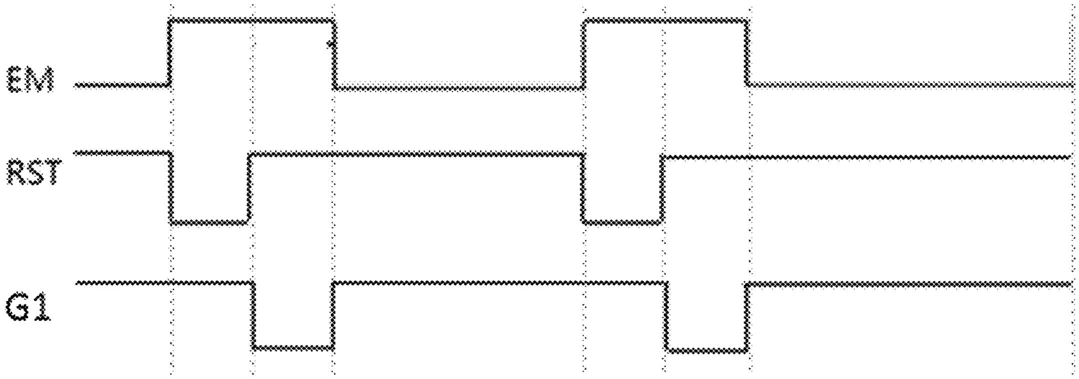
Figure 118:
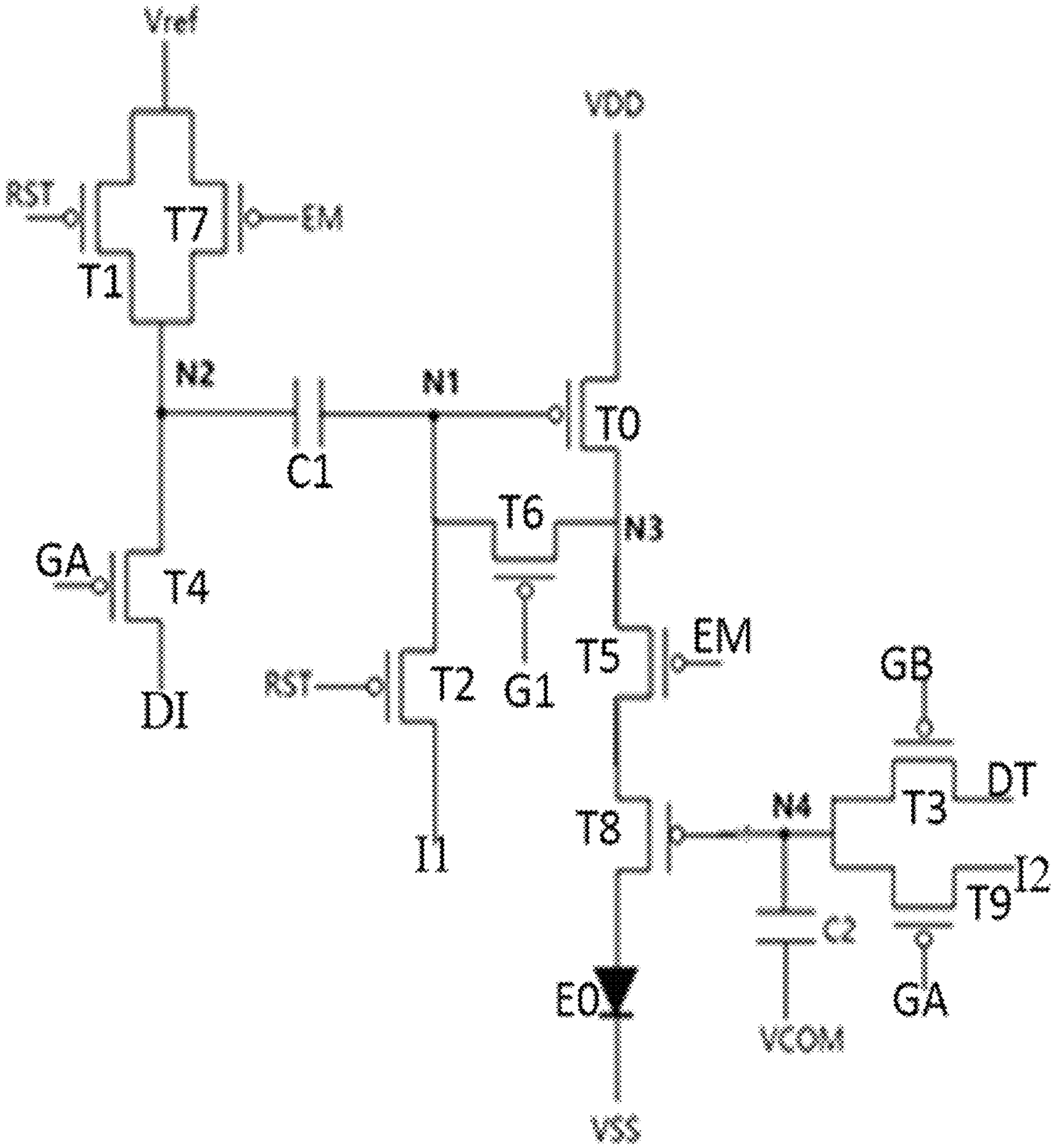
Figure 119:
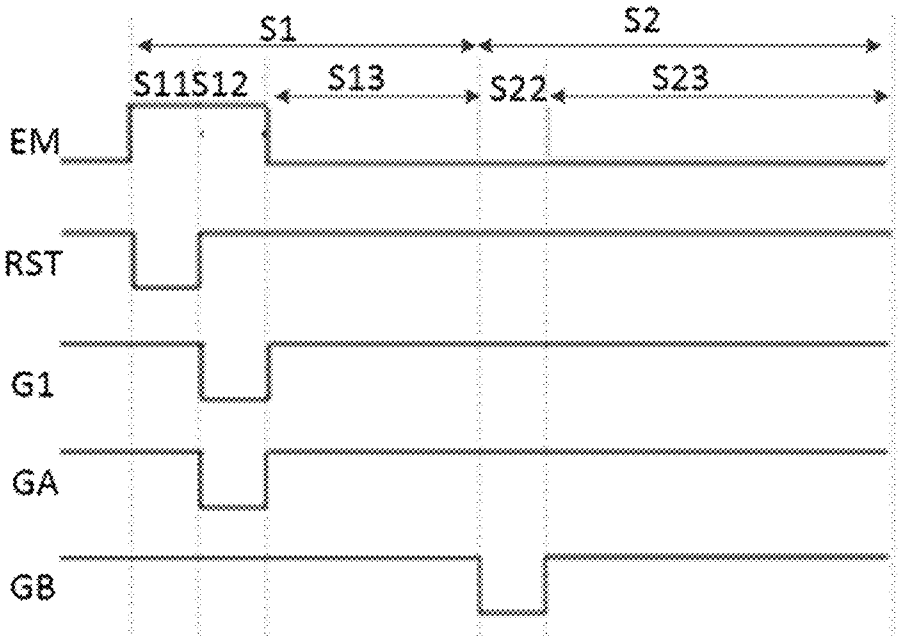
Figure 120A:
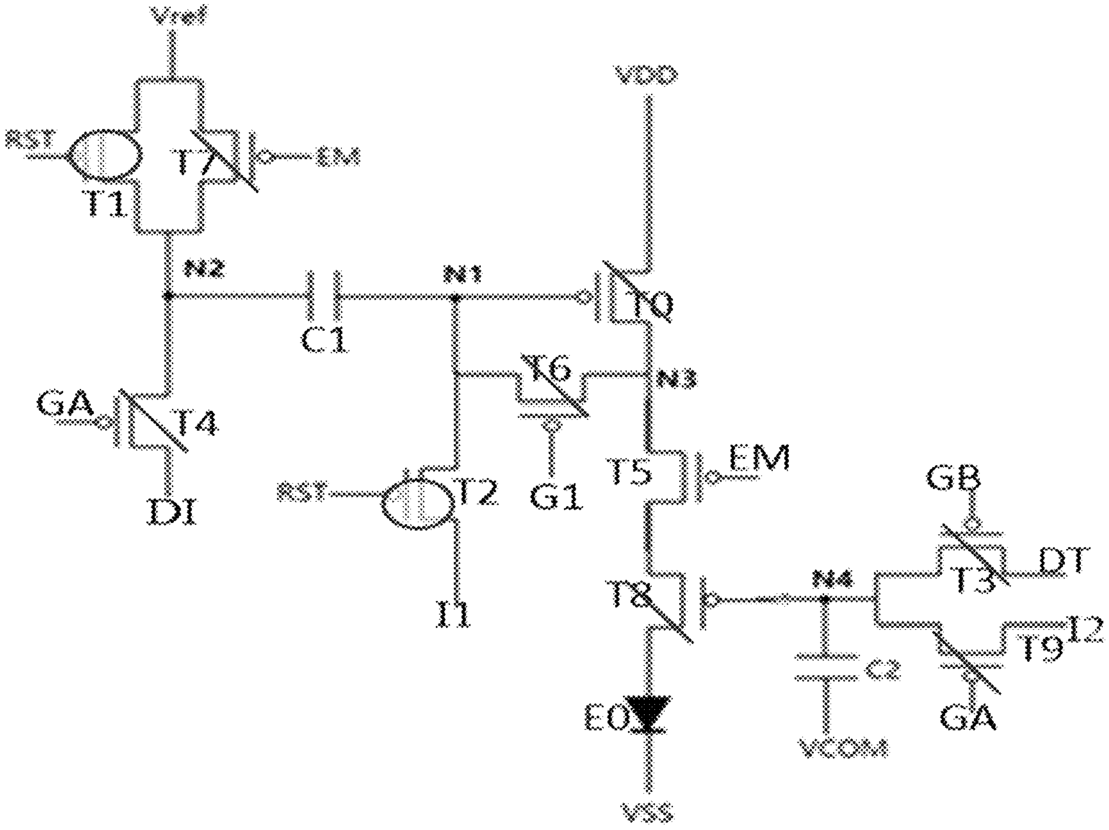
Figure 120B:
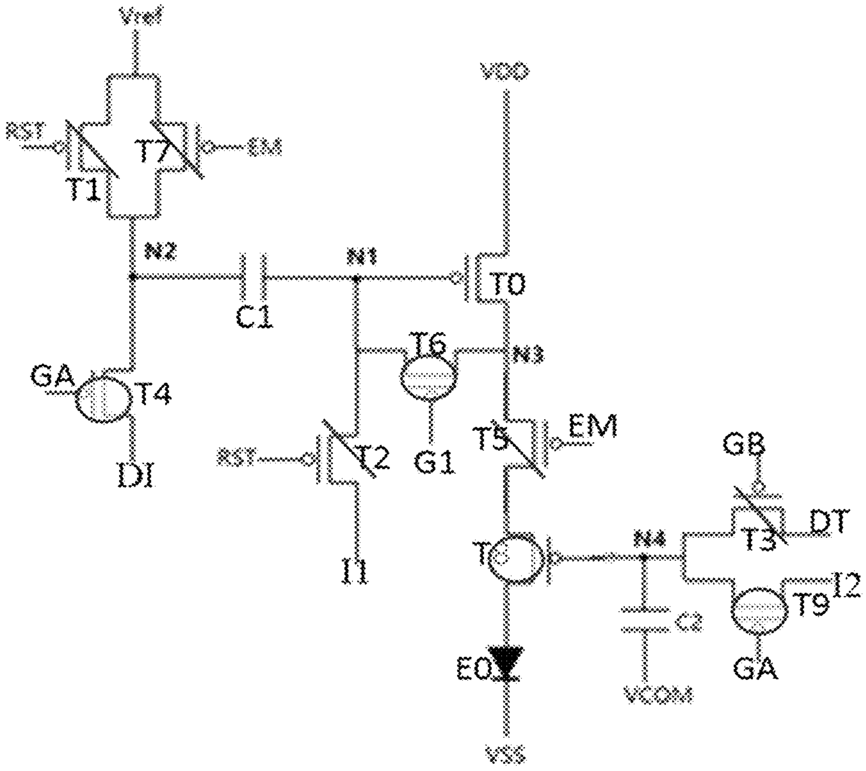
Figure 120C:
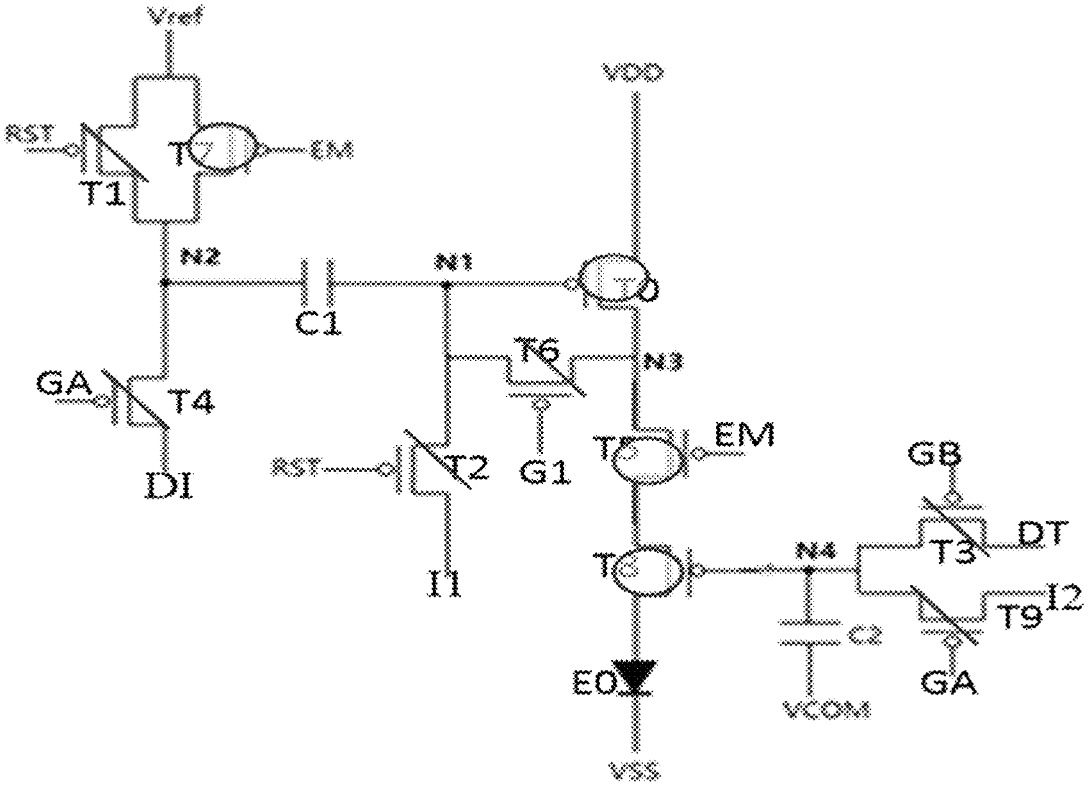
Figure 120D:
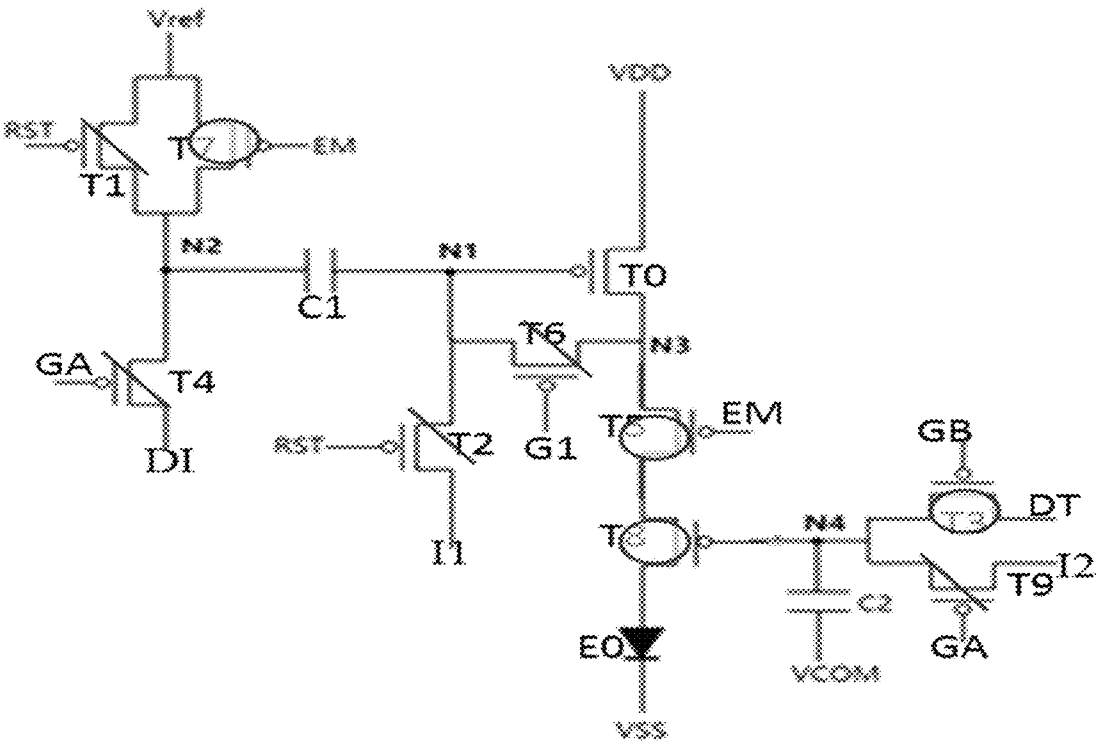
Figure 120E:
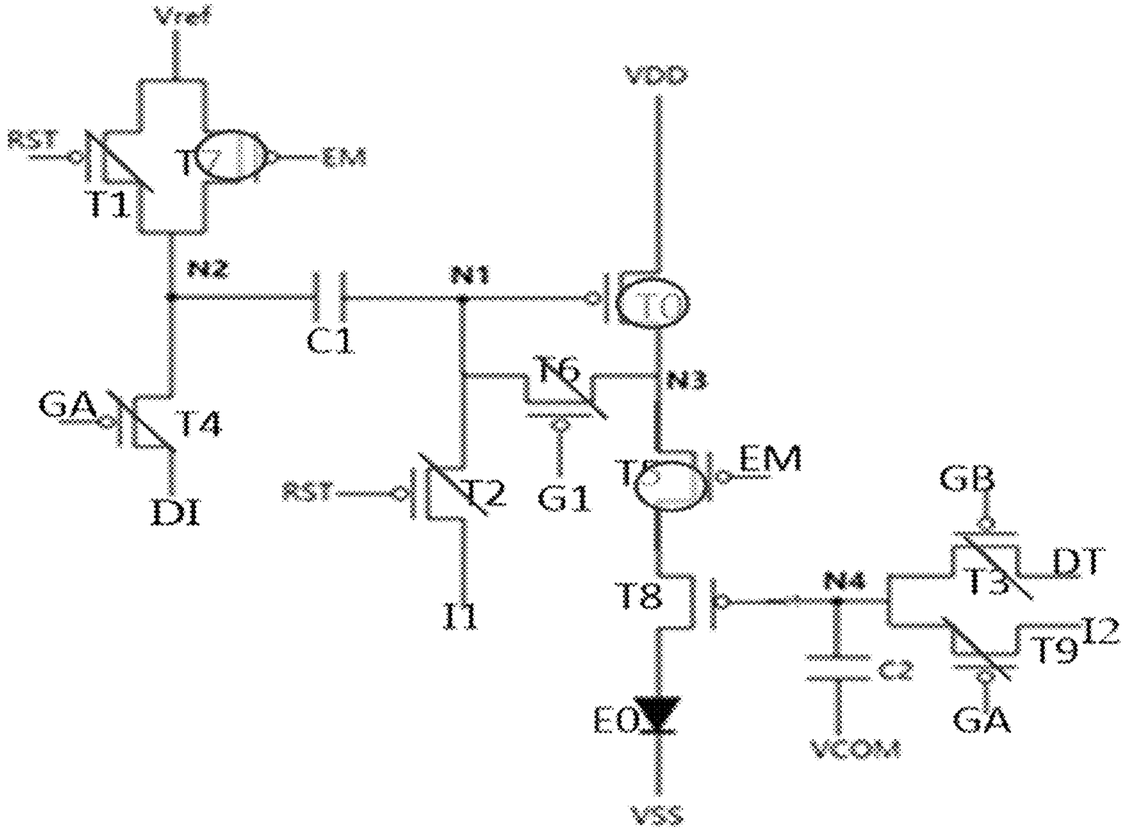
Figure 121A:
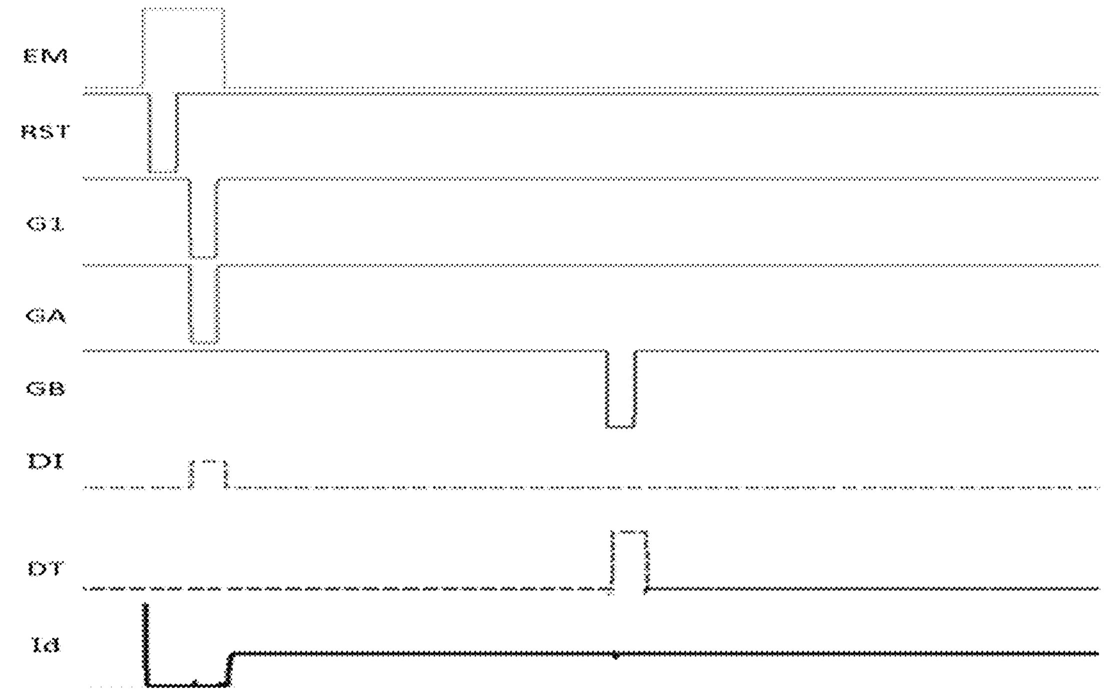
Figure 121B:
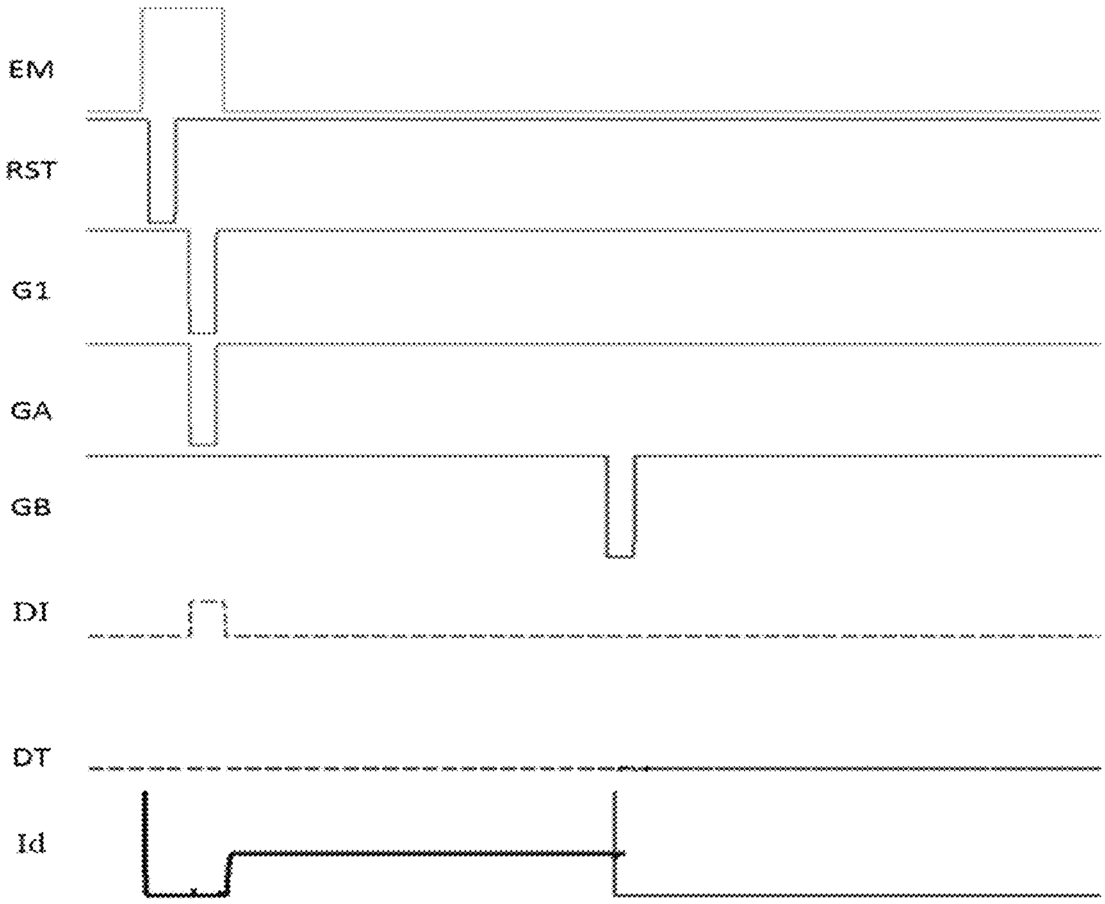
Figure 122:
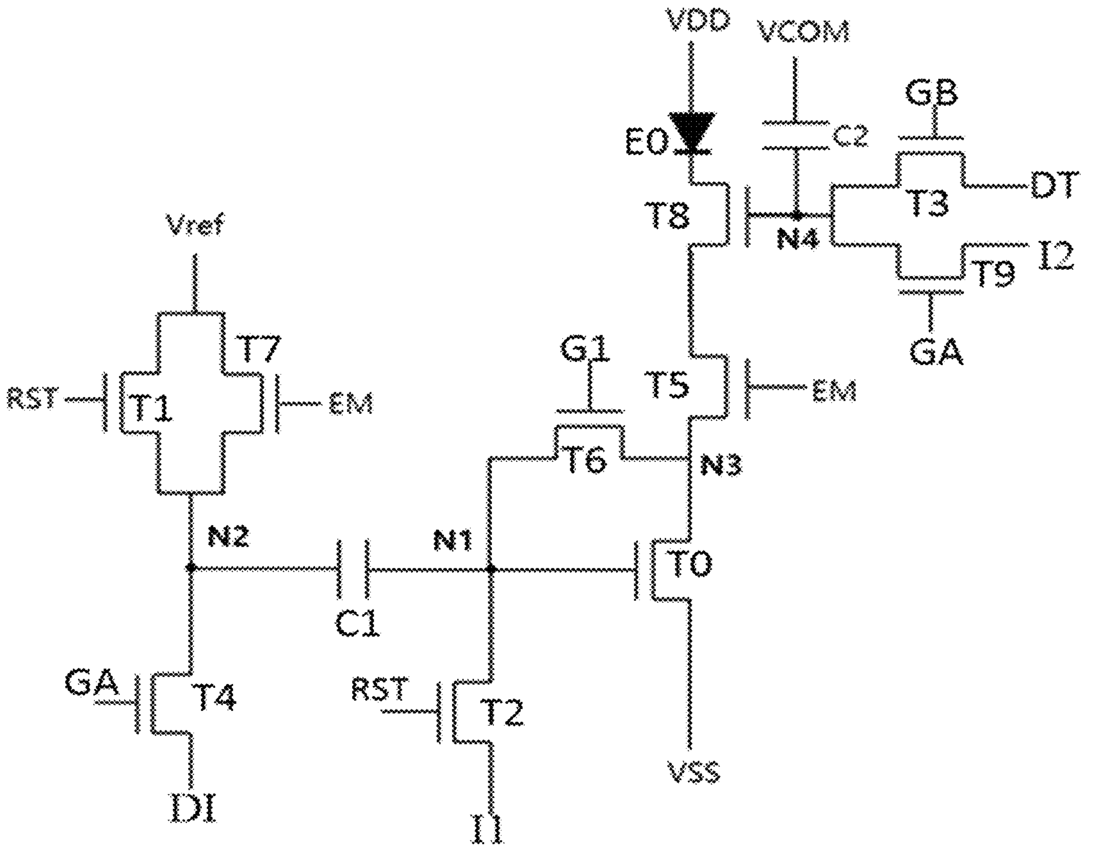
Figure 123:
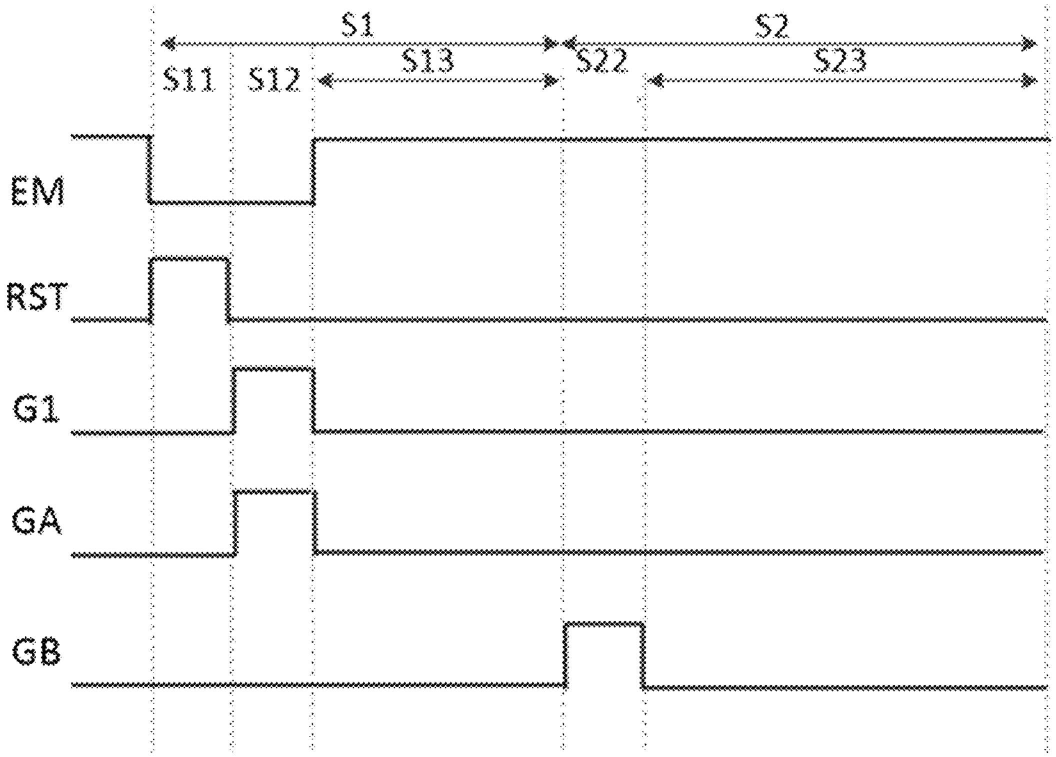
Figure 124A:
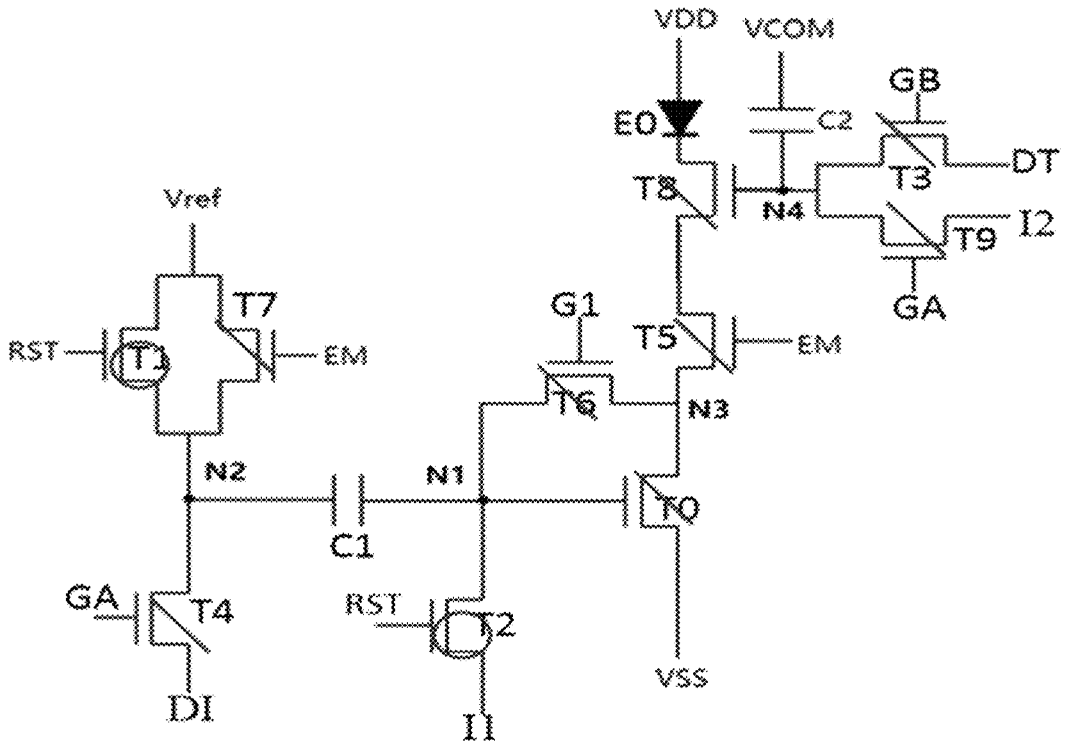
Figure 124B:
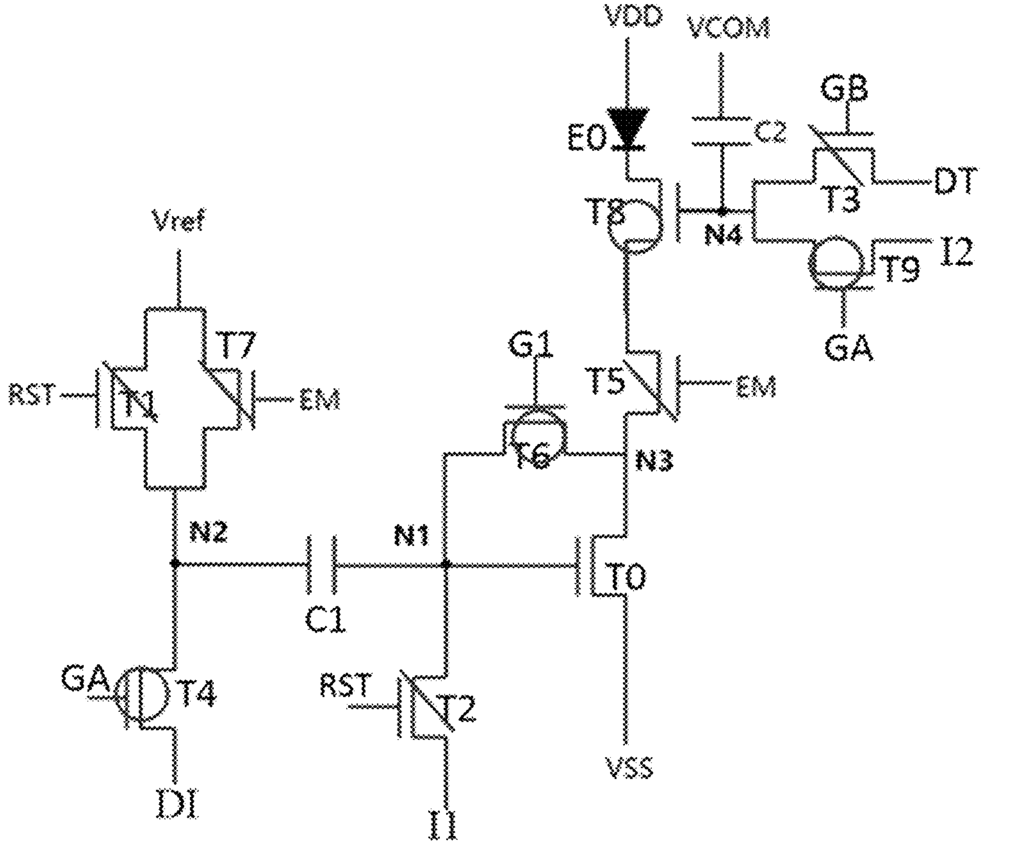
Figure 124C:
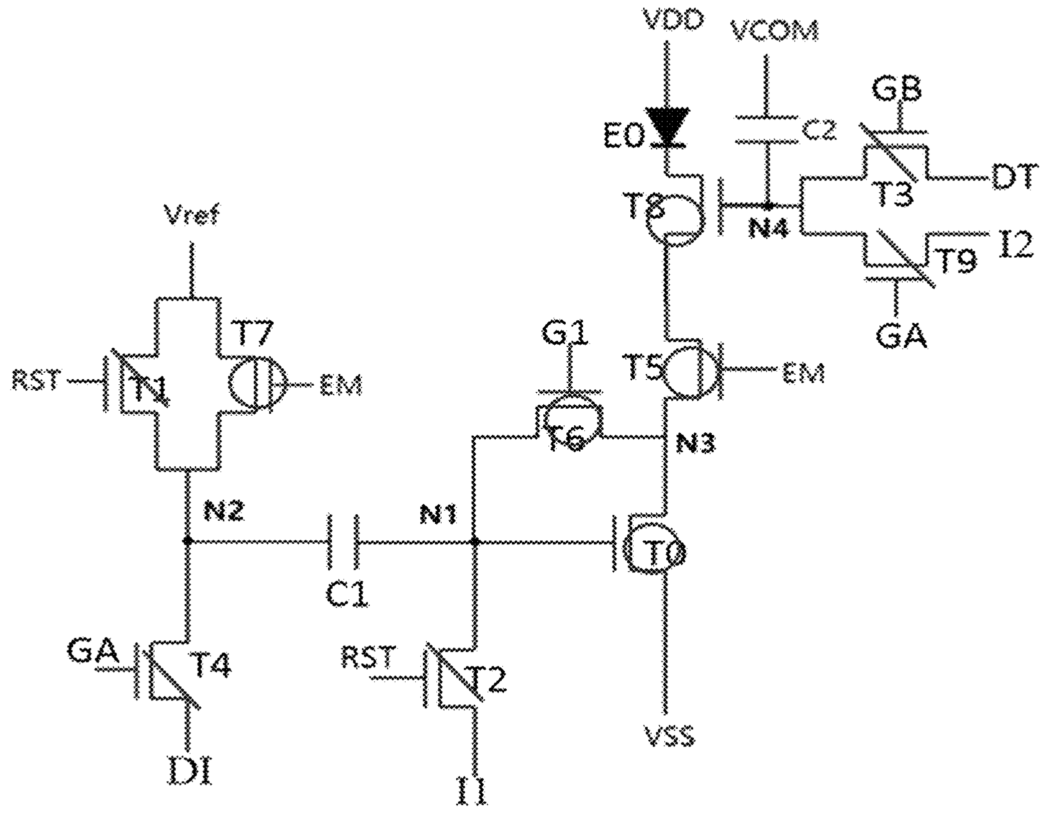
Figure 124D:
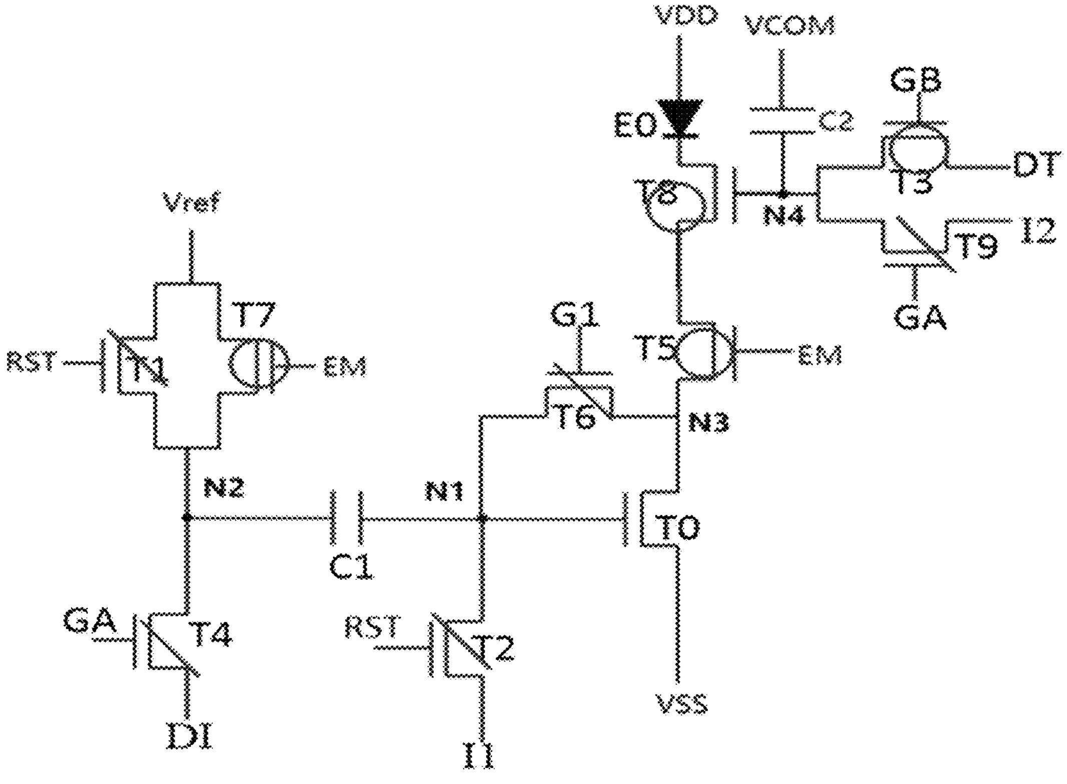
Figure 124E:
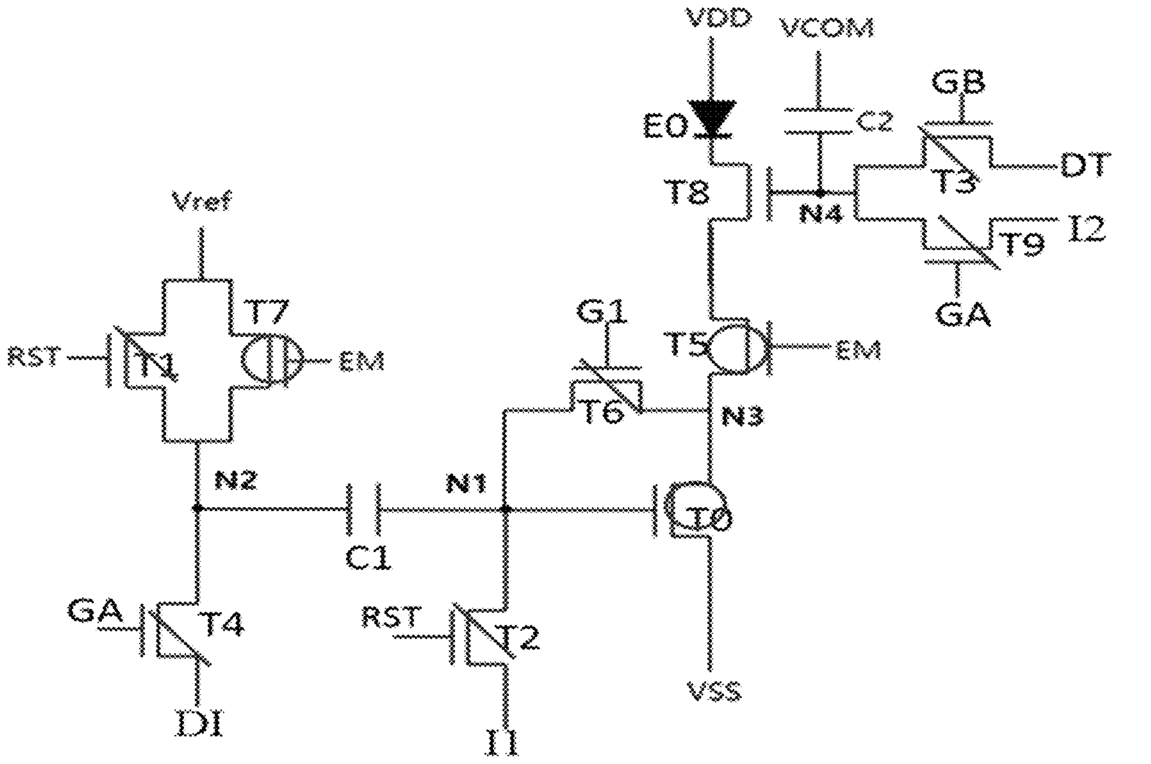
Figure 125A:
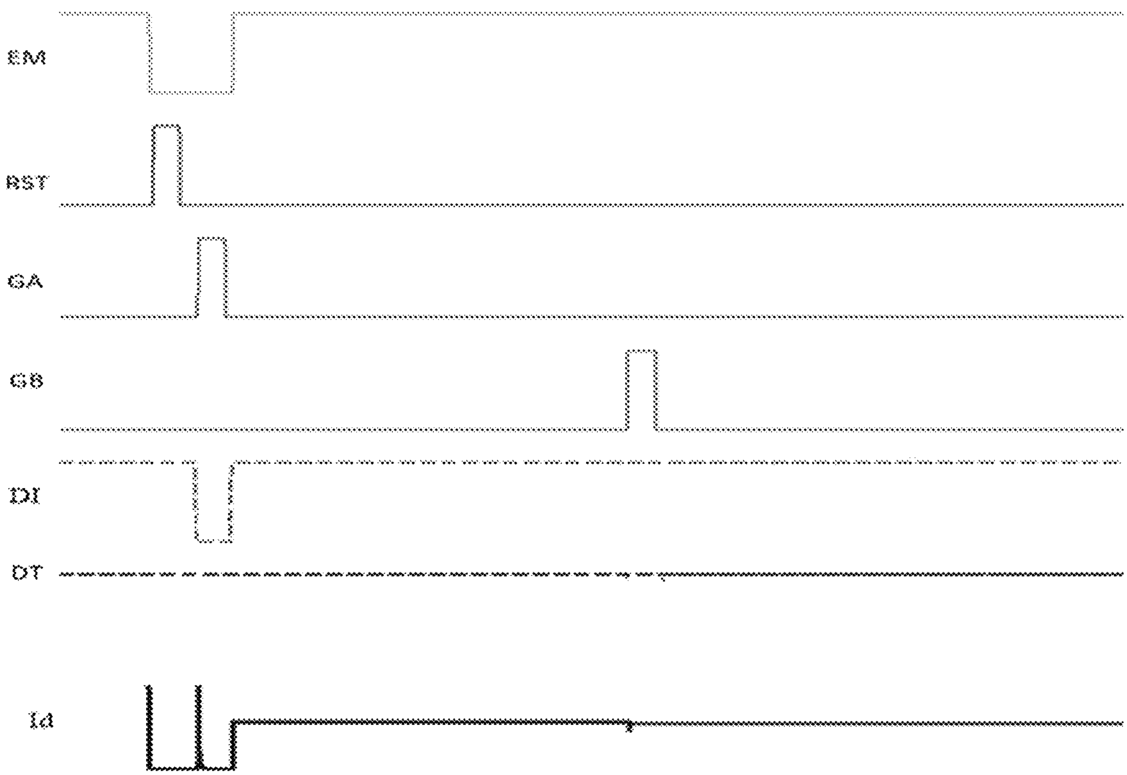
Figure 125B:
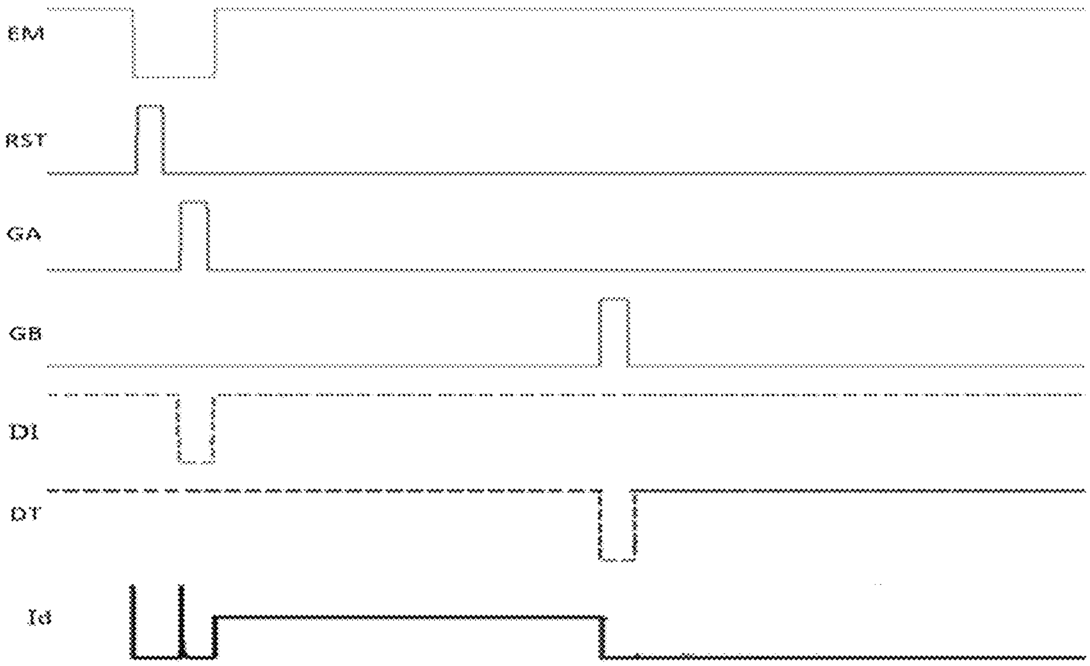
Figure 126:
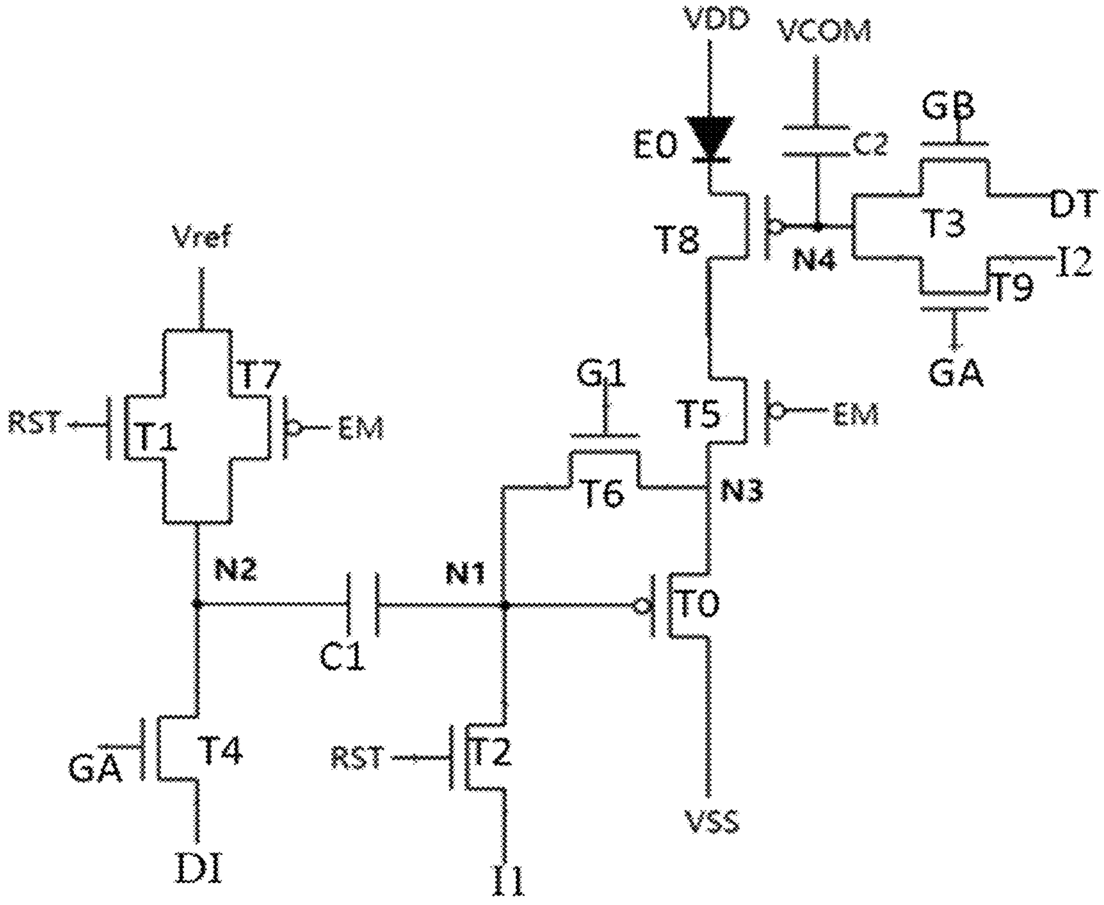
Figure 127:
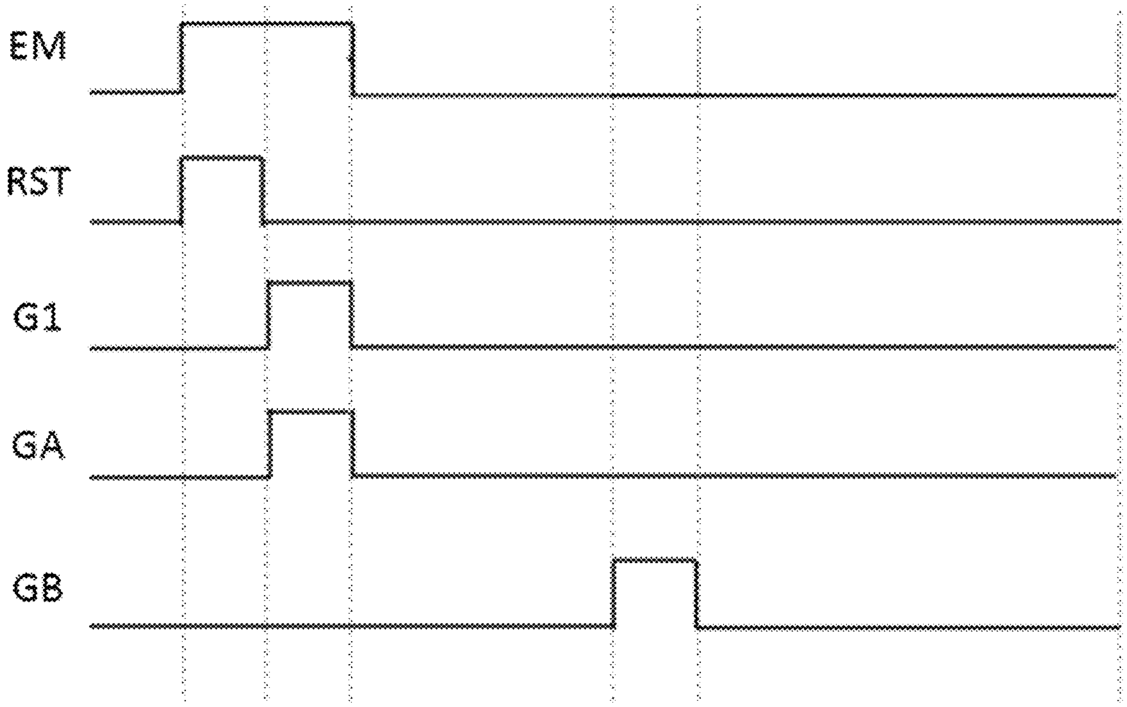
Figure 128:
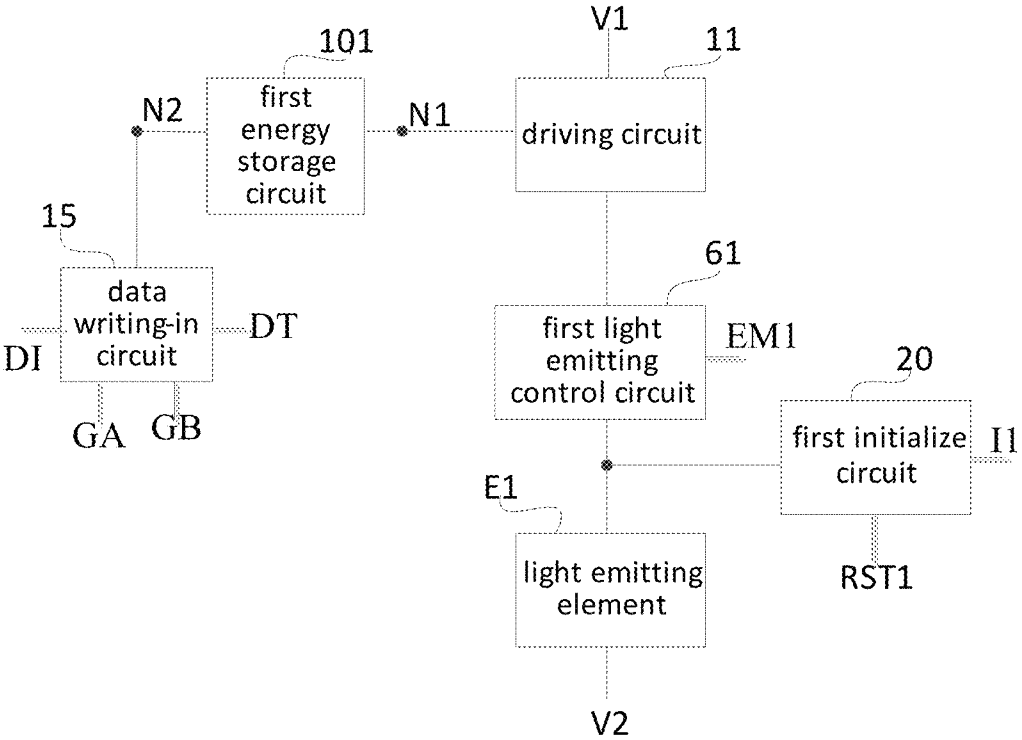
Figure 129:
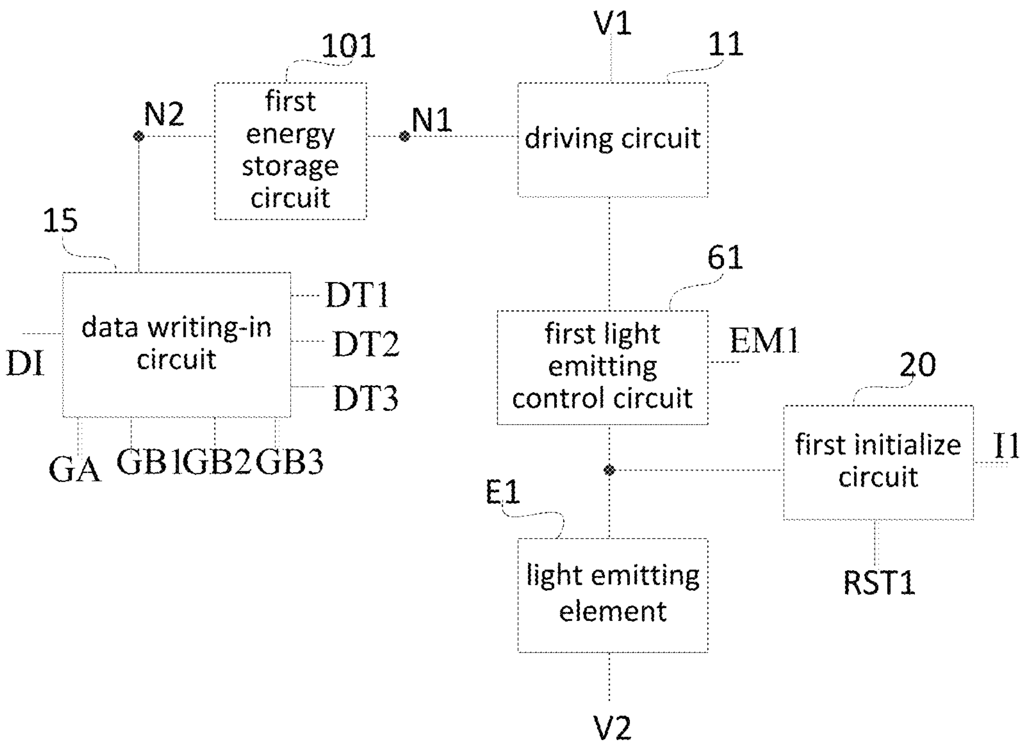
Figure 130:
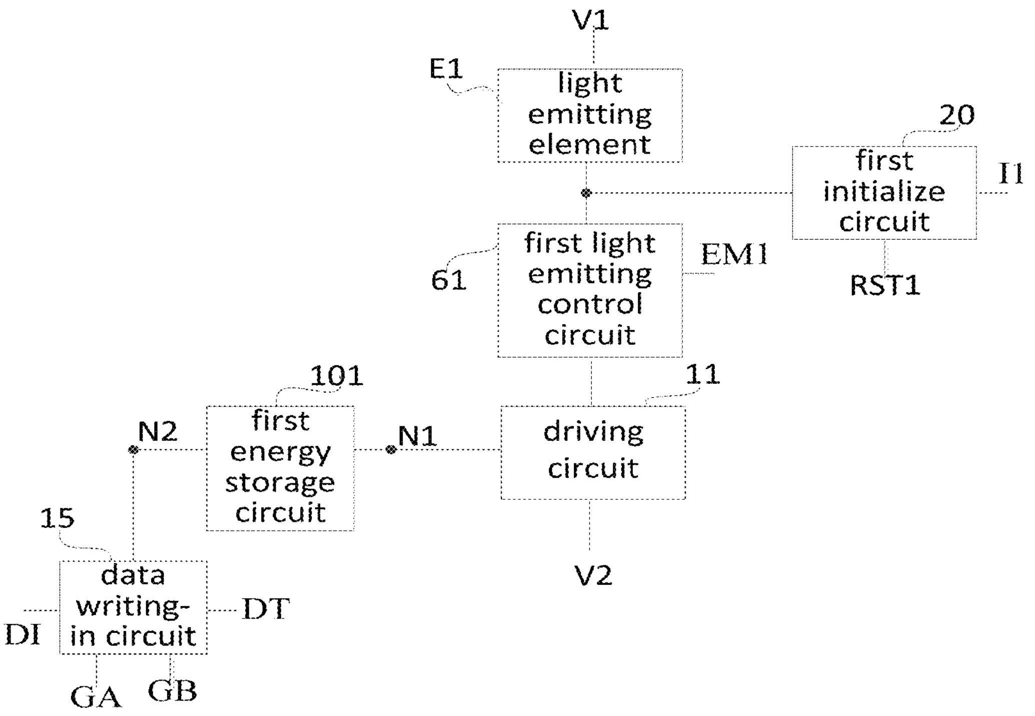
Figure 131:
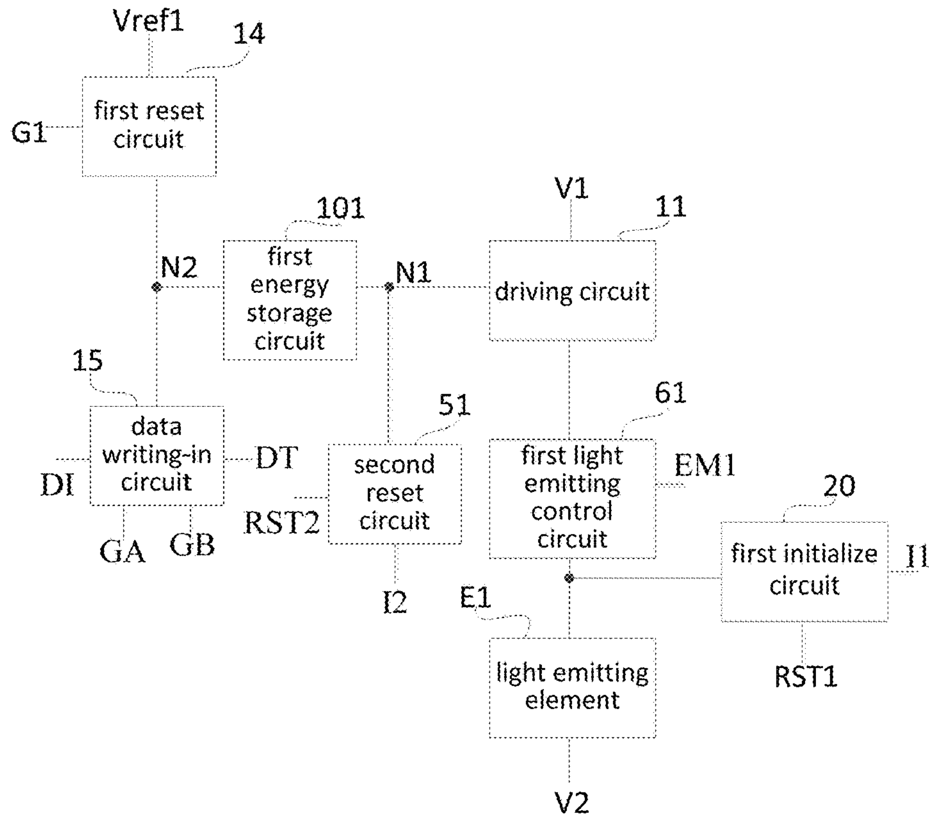
Figure 132:
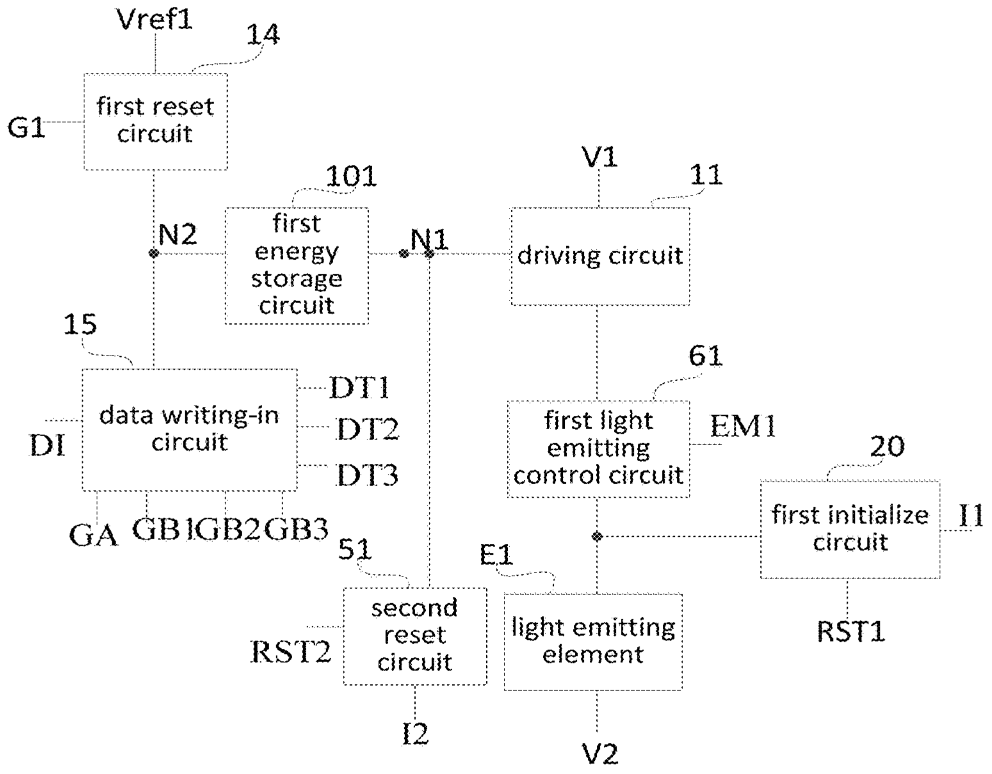
Figure 133:
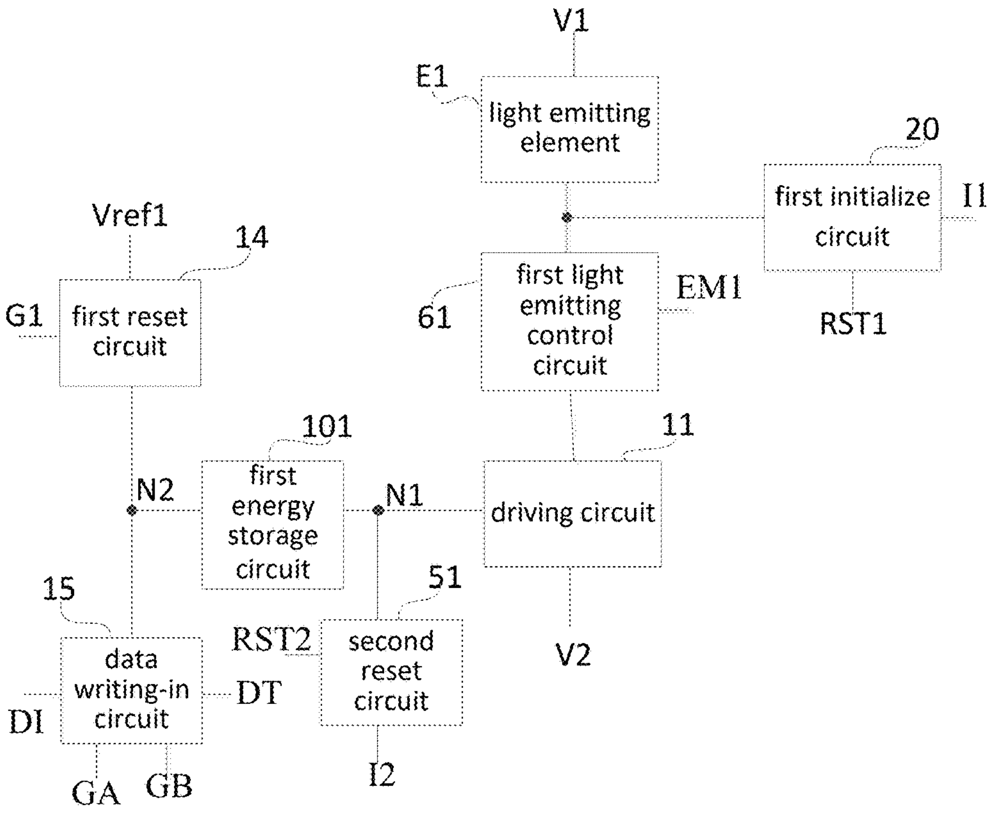
Figure 134:
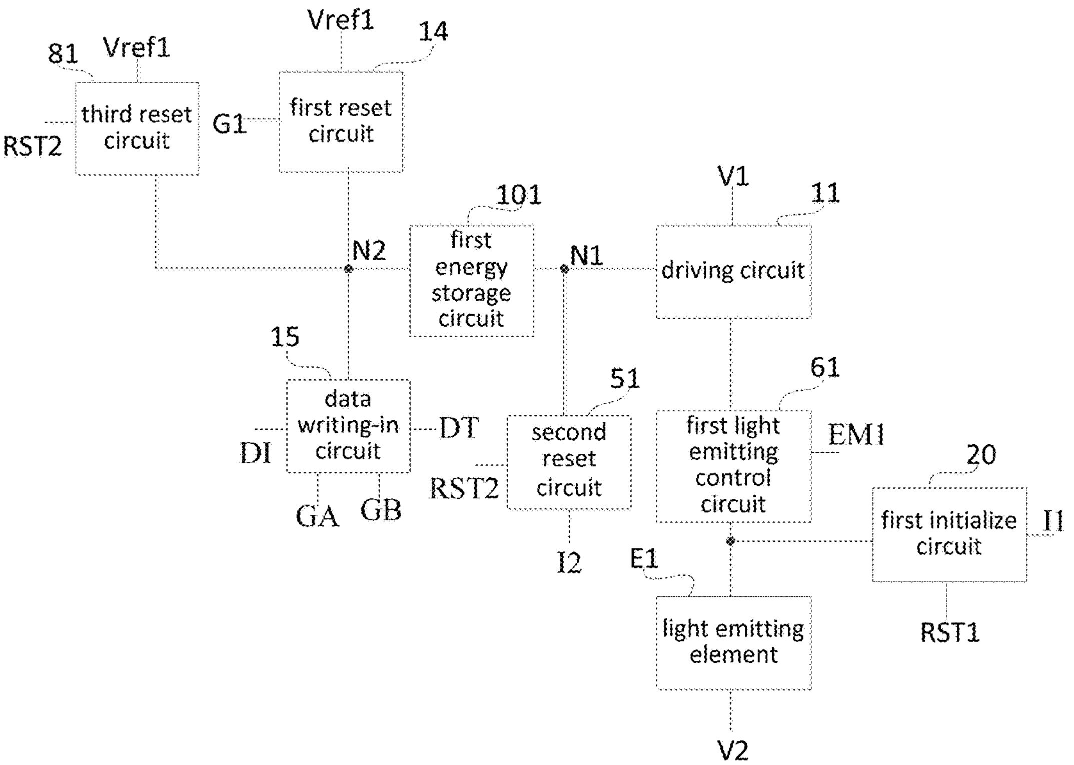
Figure 135:
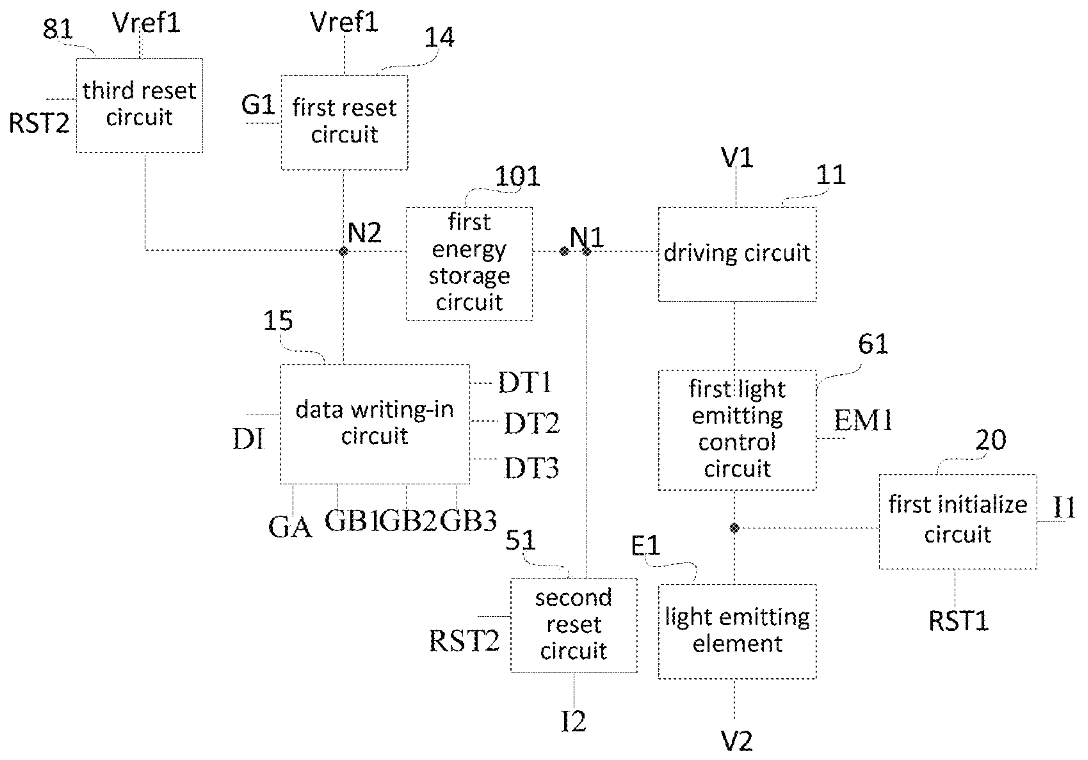
Figure 136:
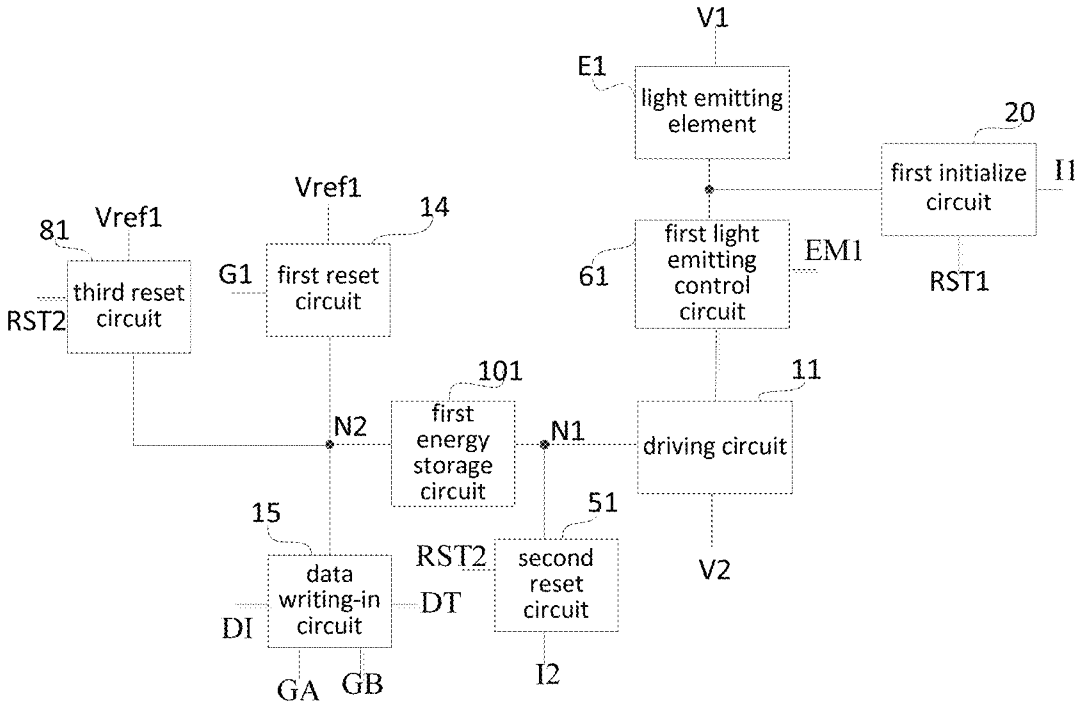
Figure 137:
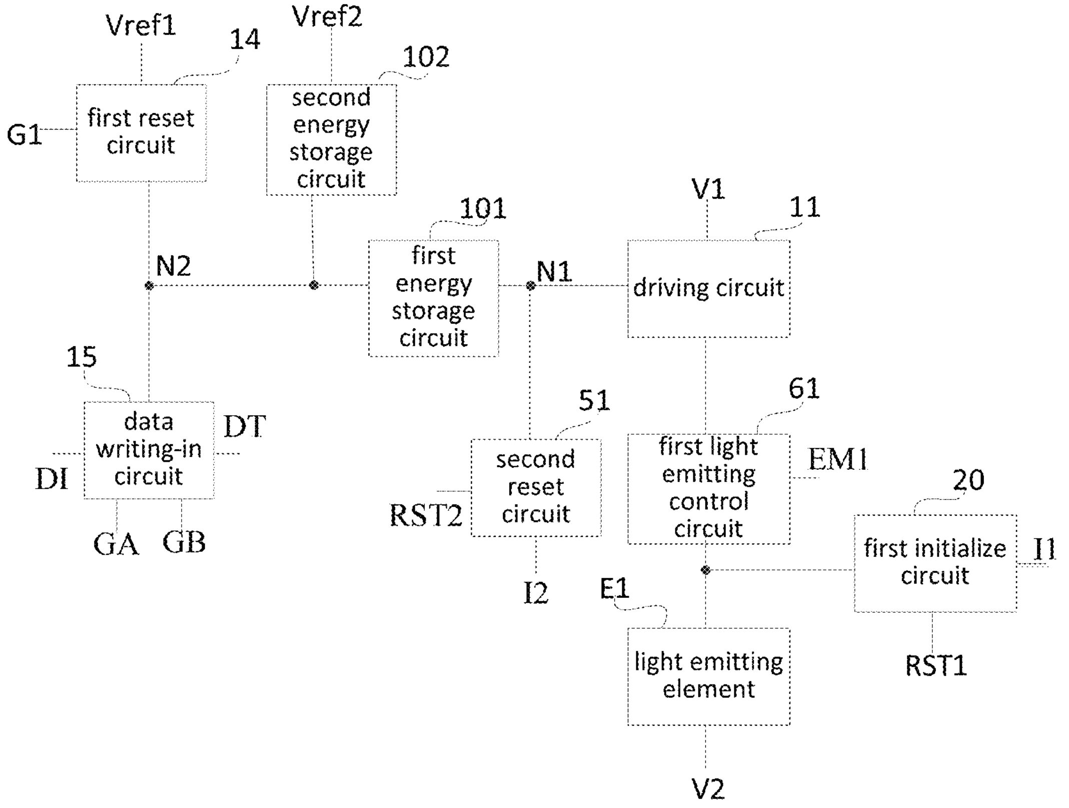
Figure 138:
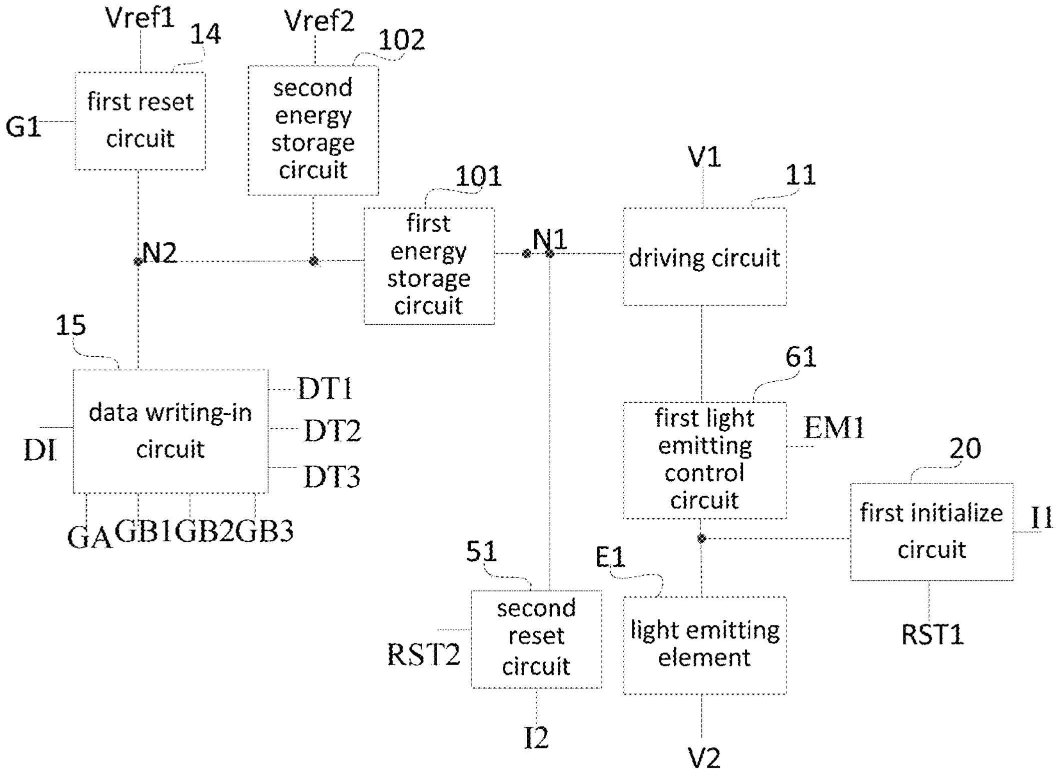
Figure 139:
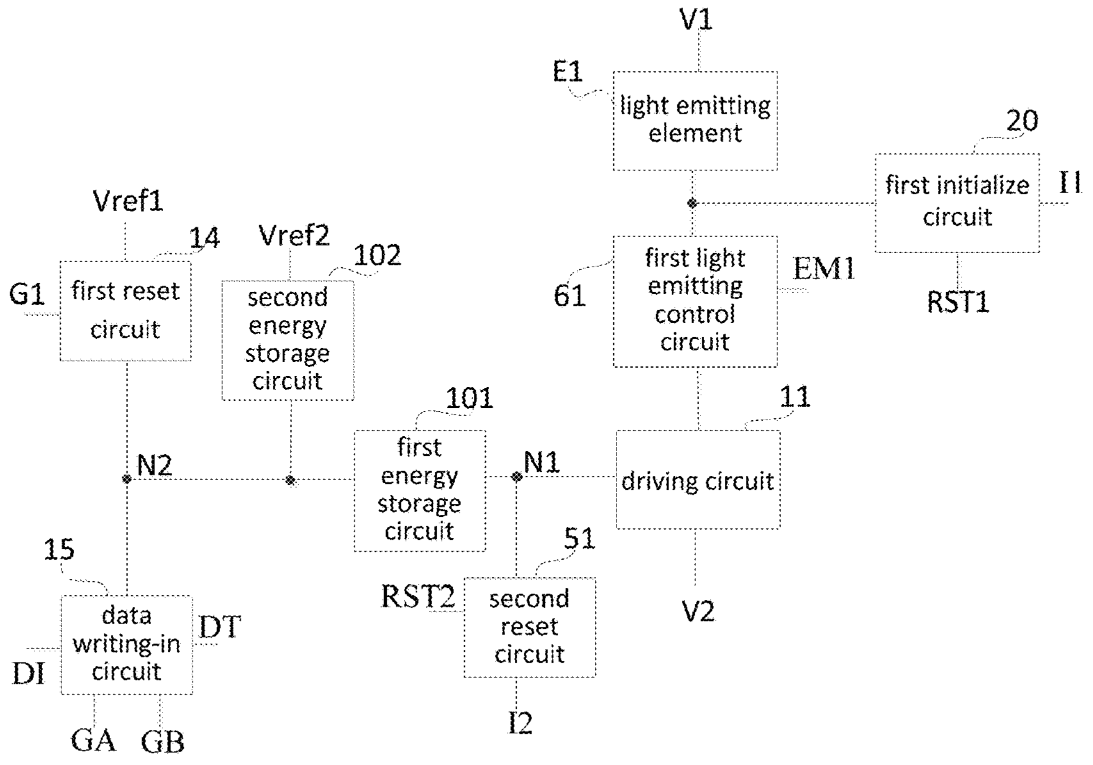
Figure 140:
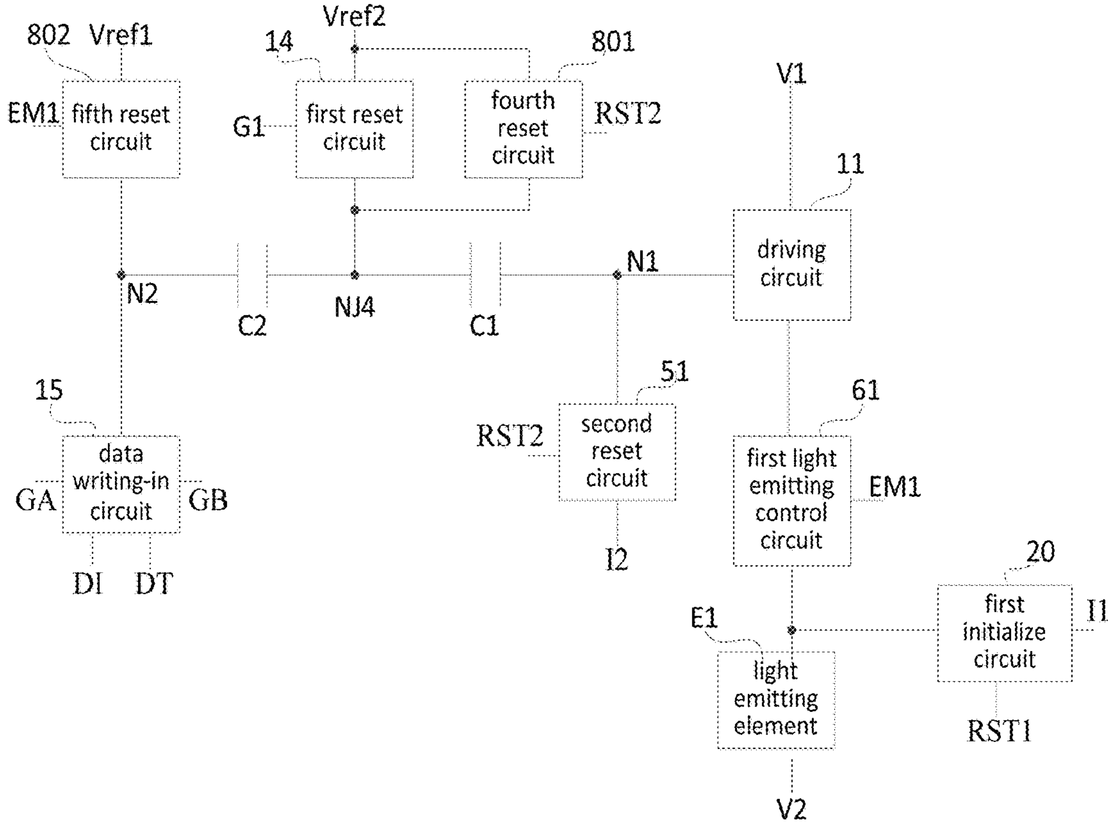
Figure 141:
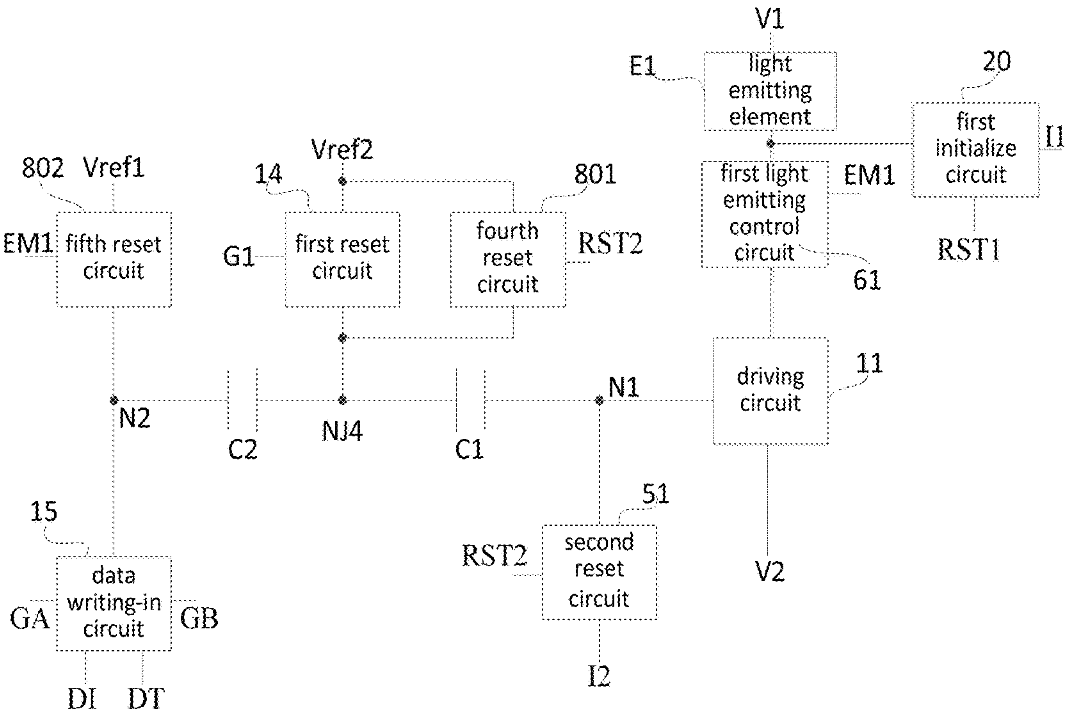
Figure 142:
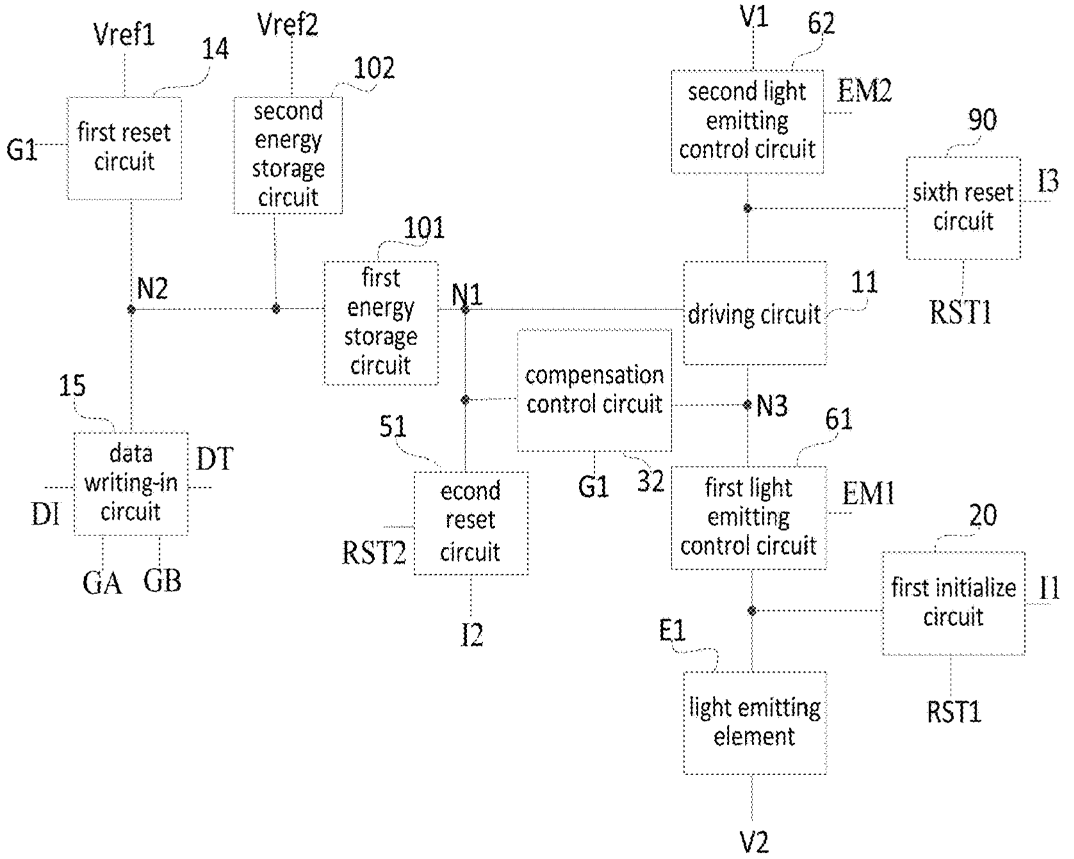
Figure 143:
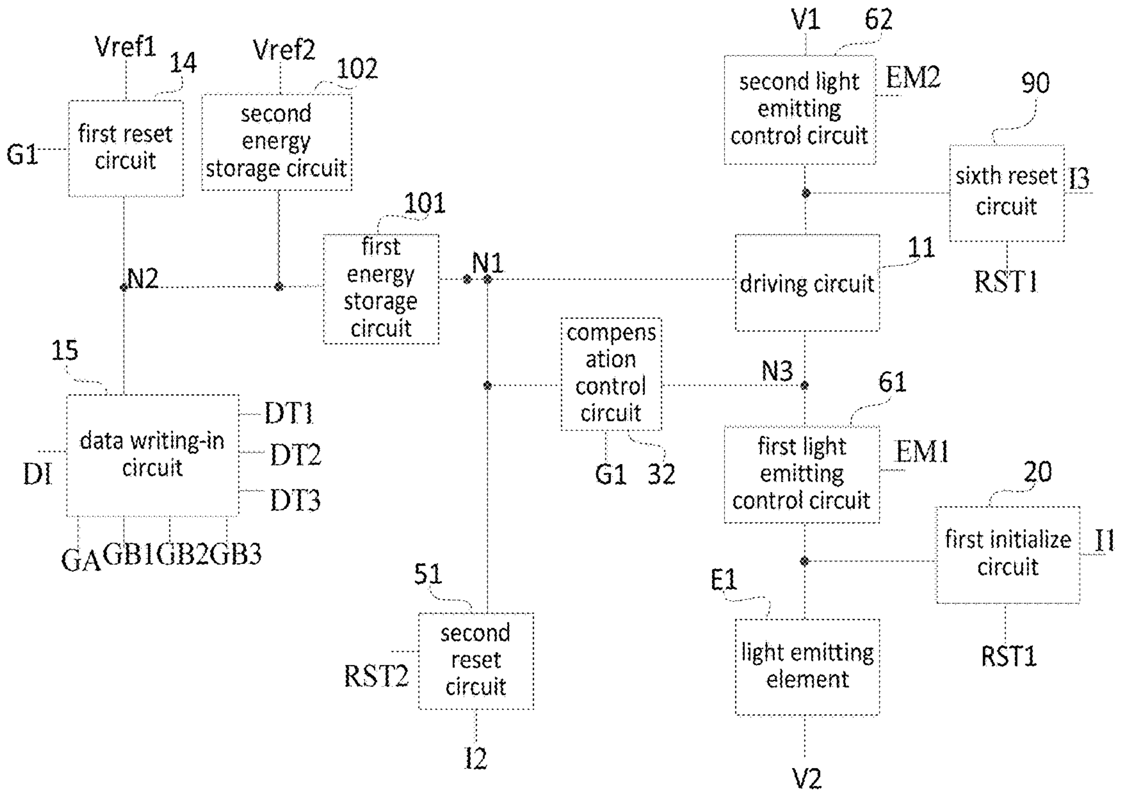
Figure 144:
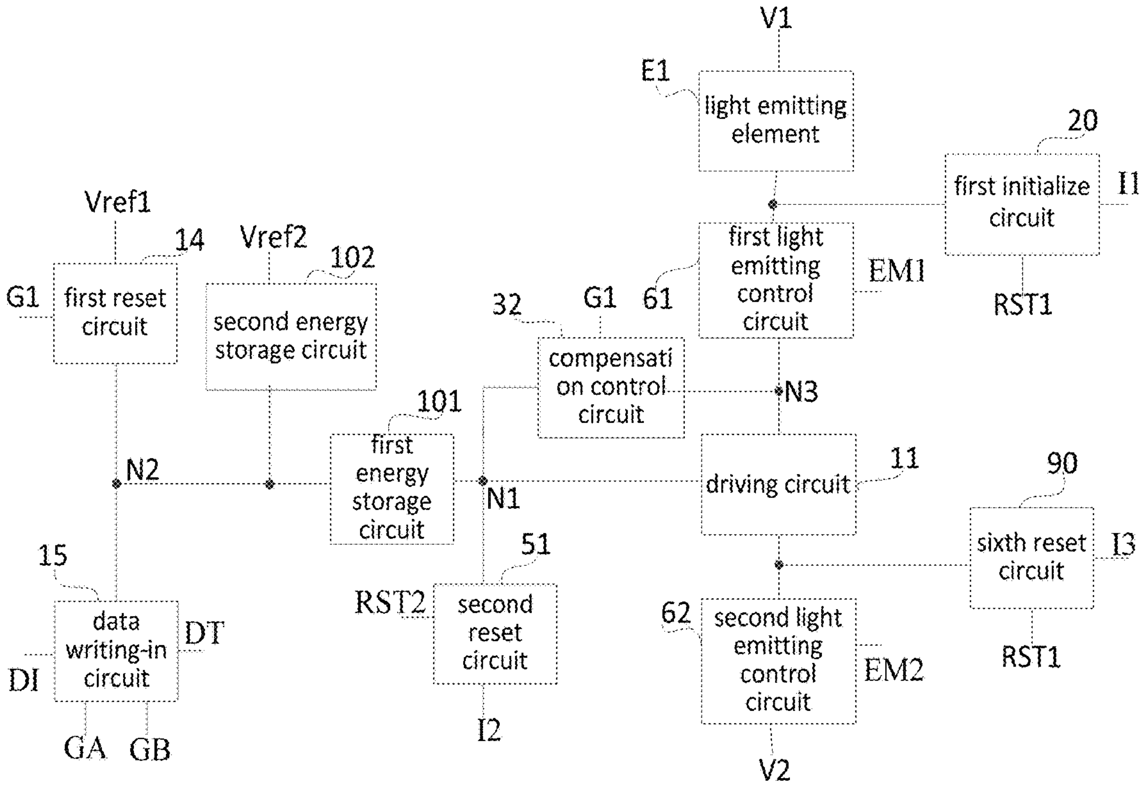
Figure 145:
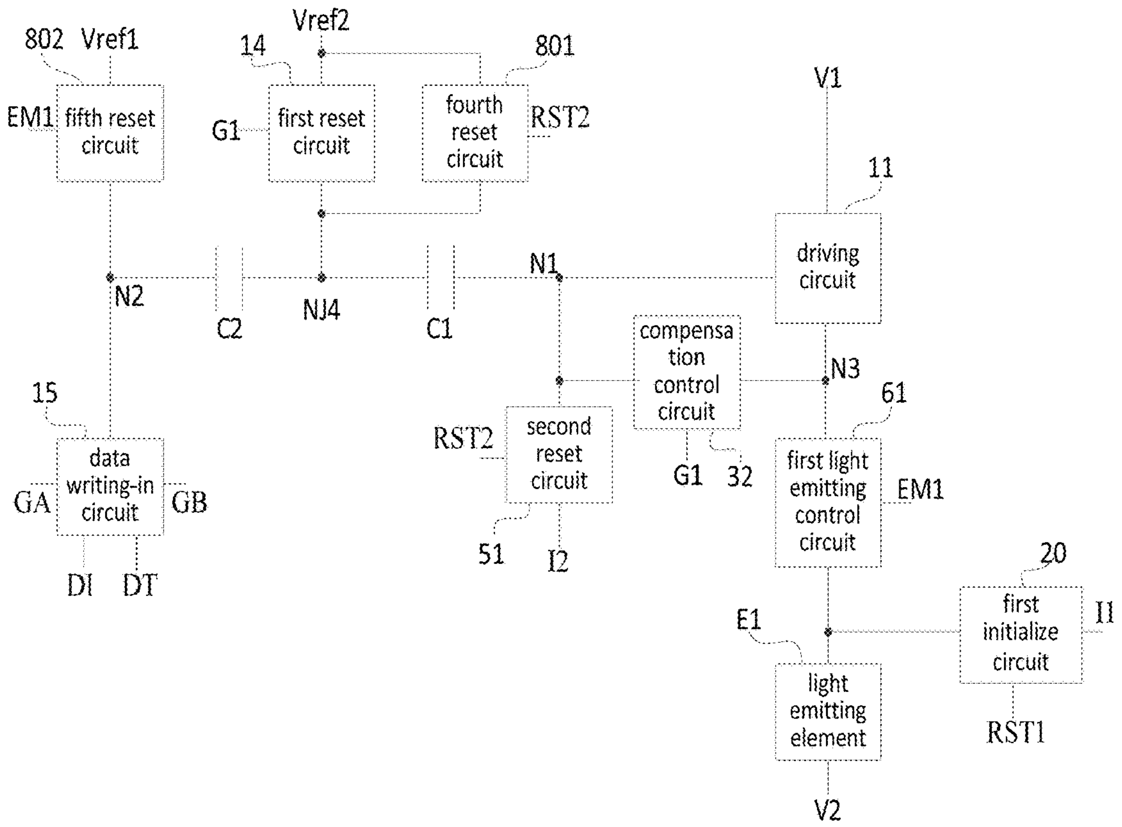
Figure 146:
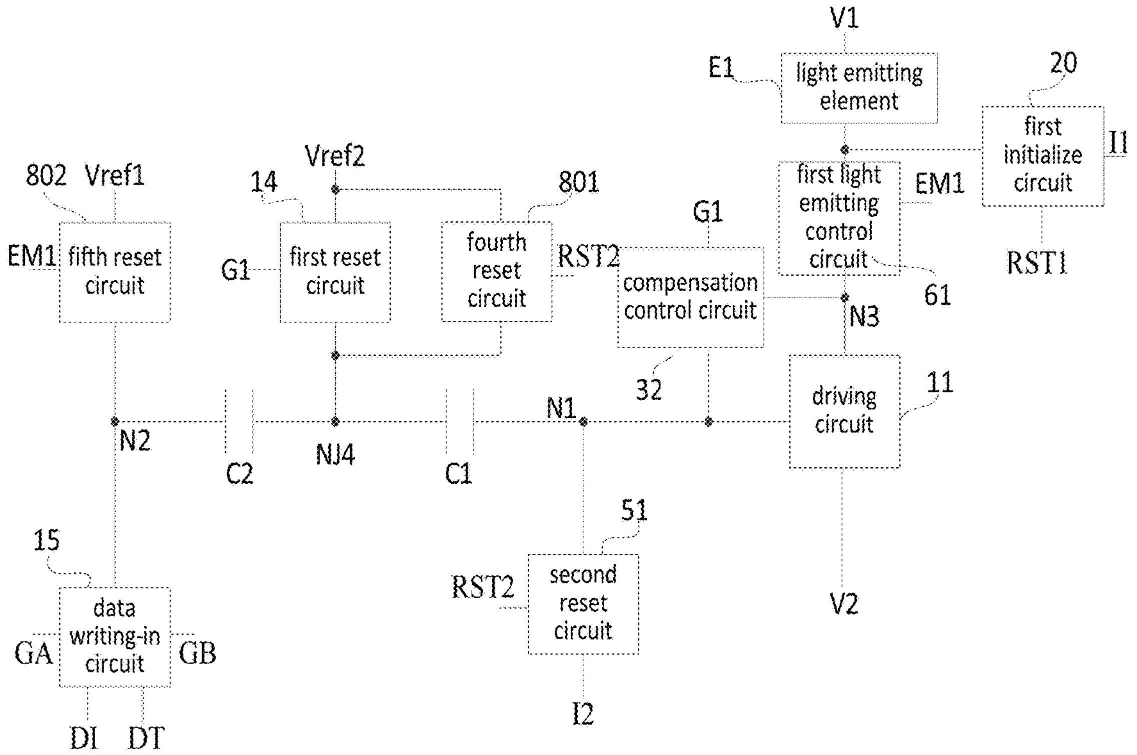
Figure 147:
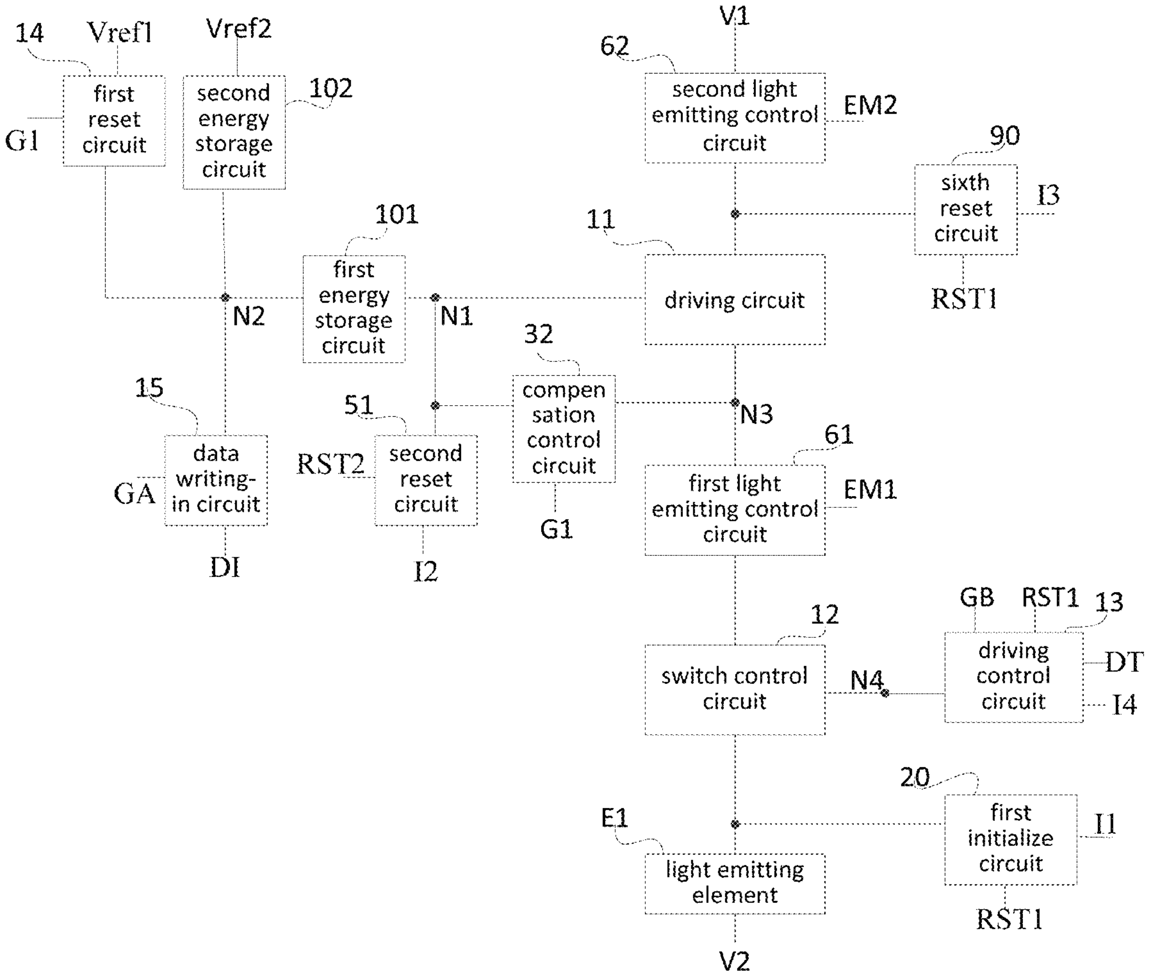
Figure 148:
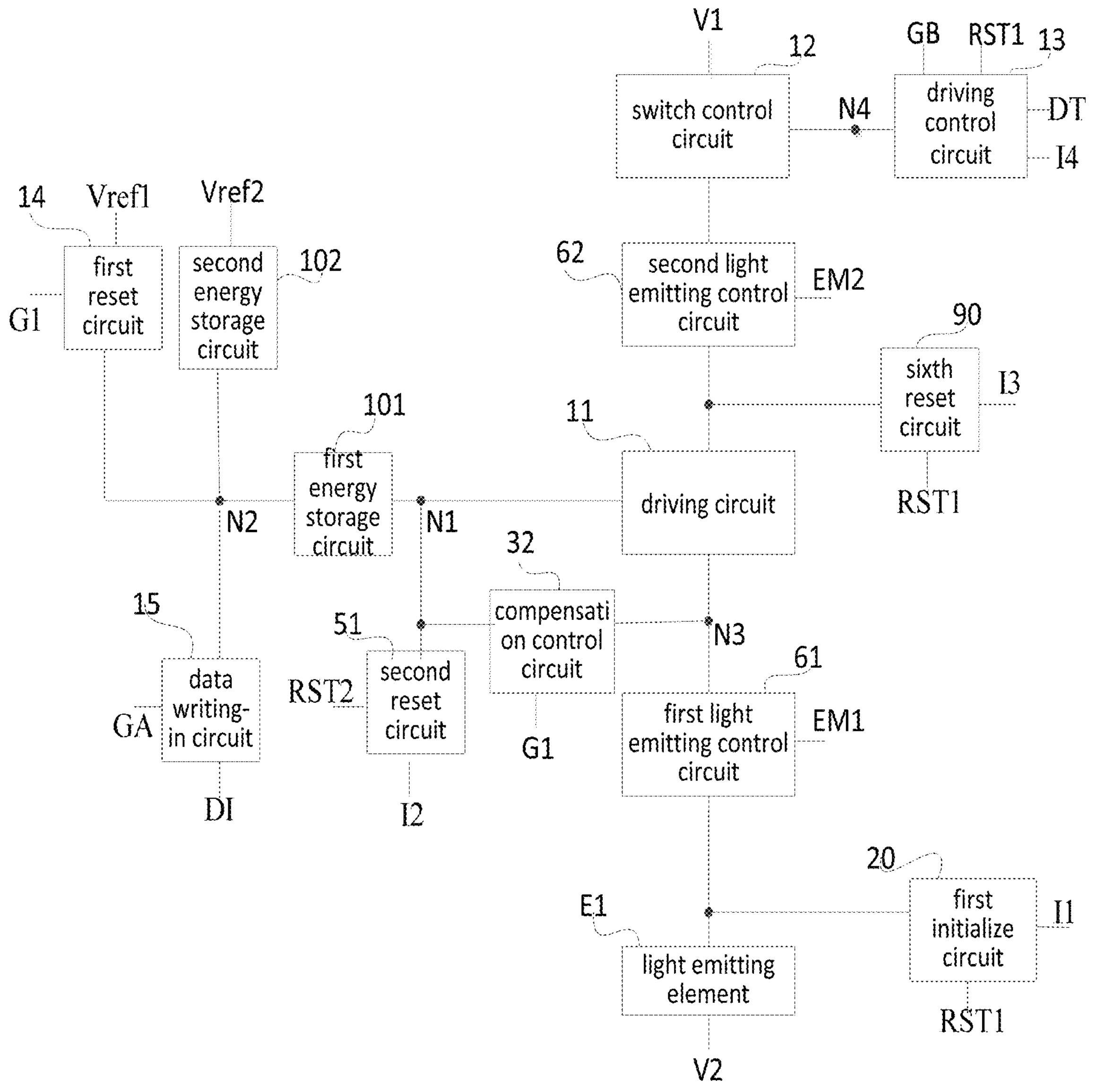
Figure 149:
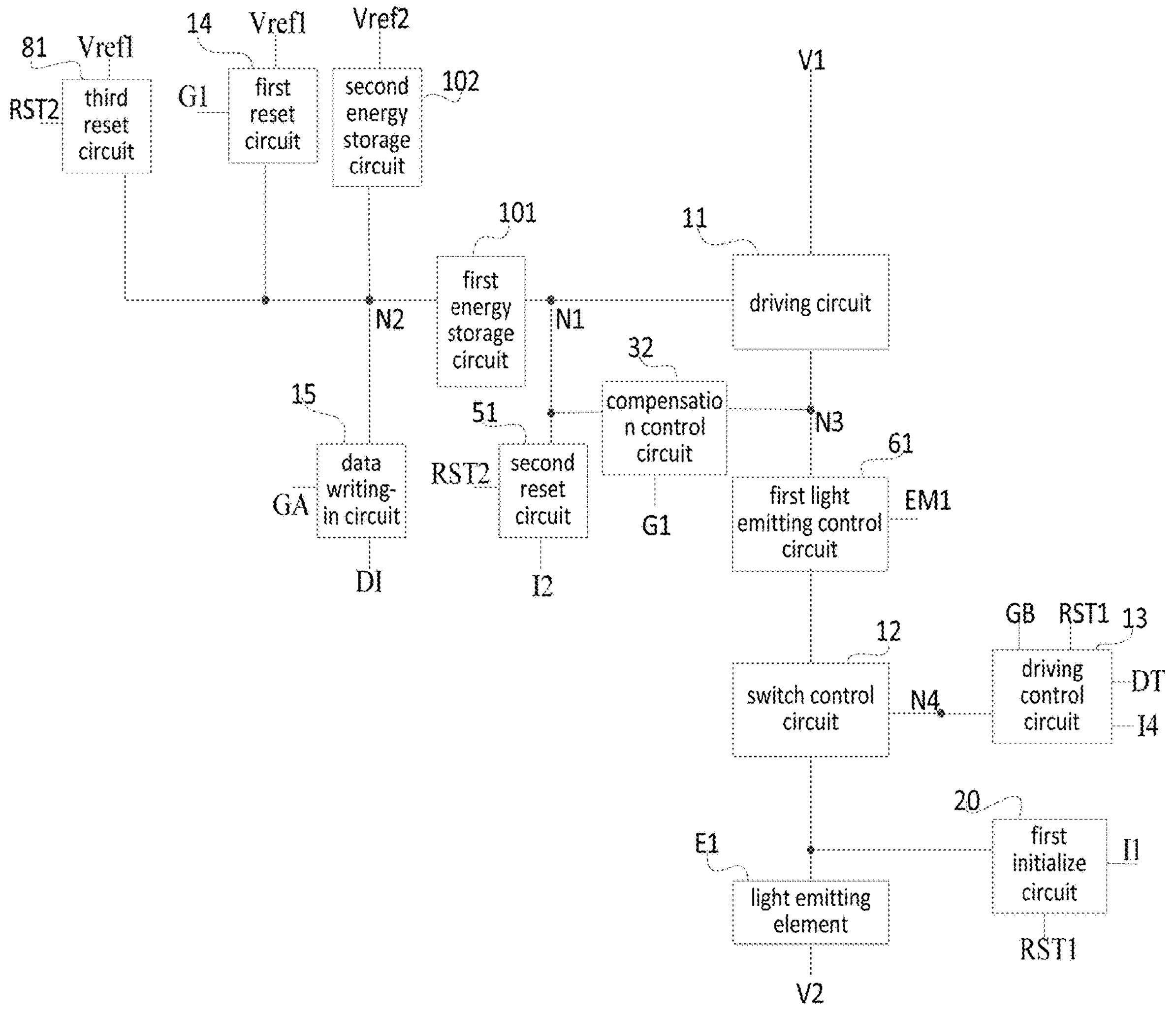
Figure 150:
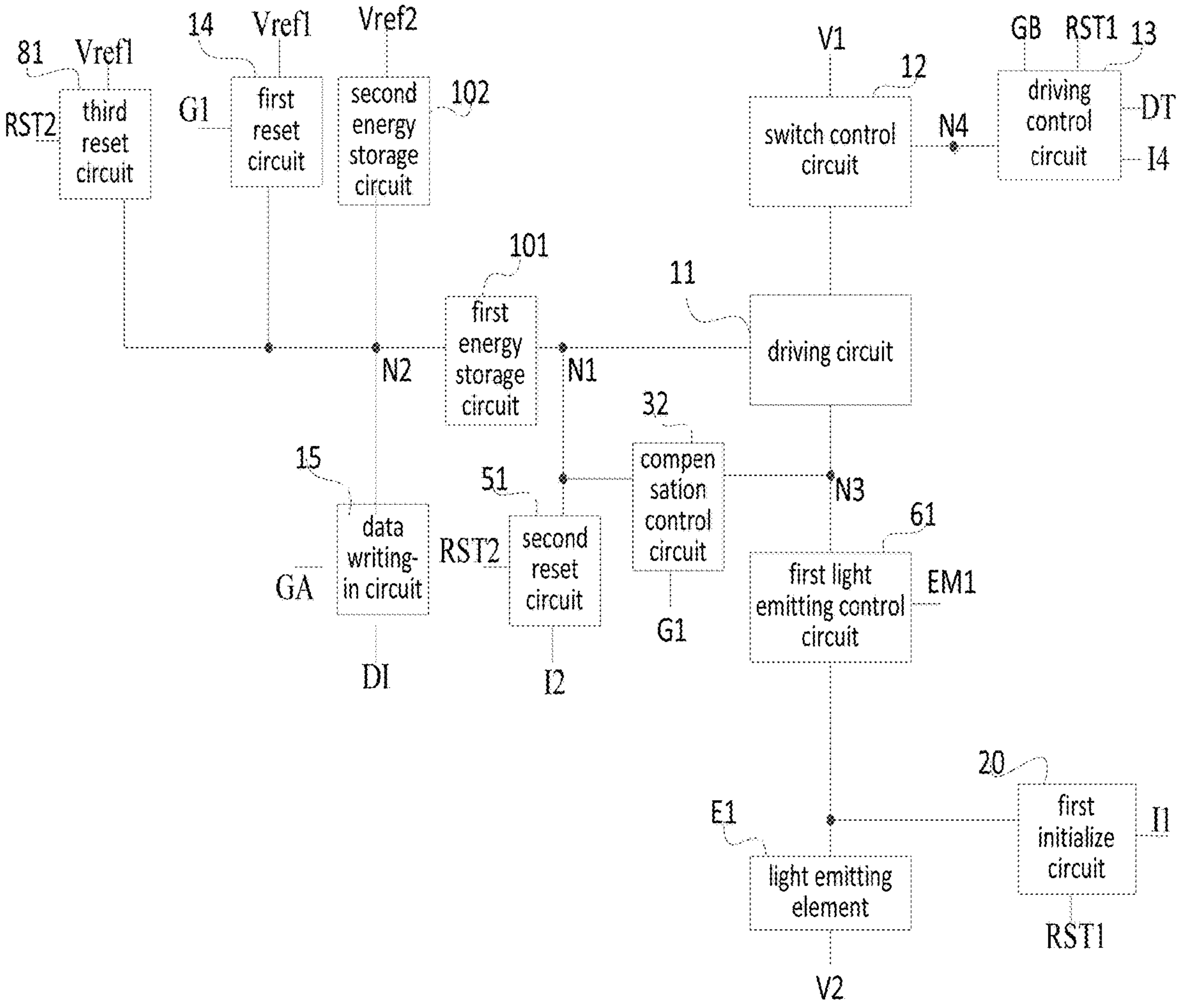
Figure 151:
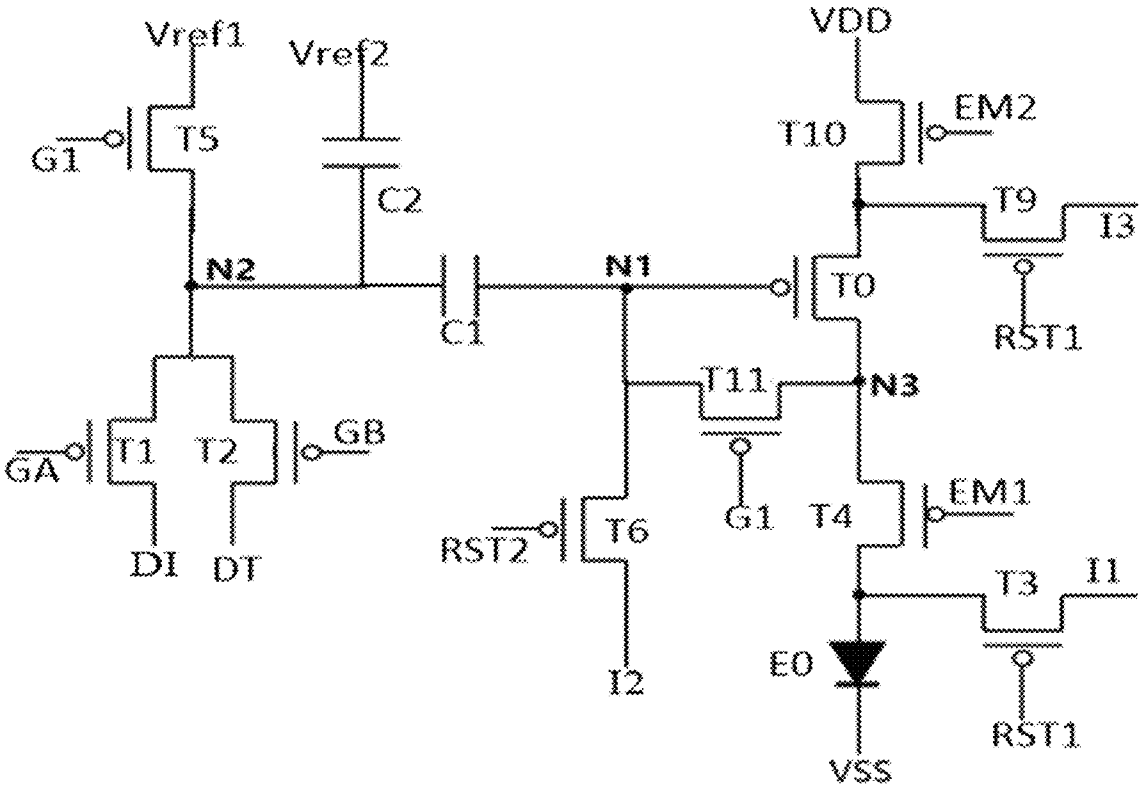
Figure 152:
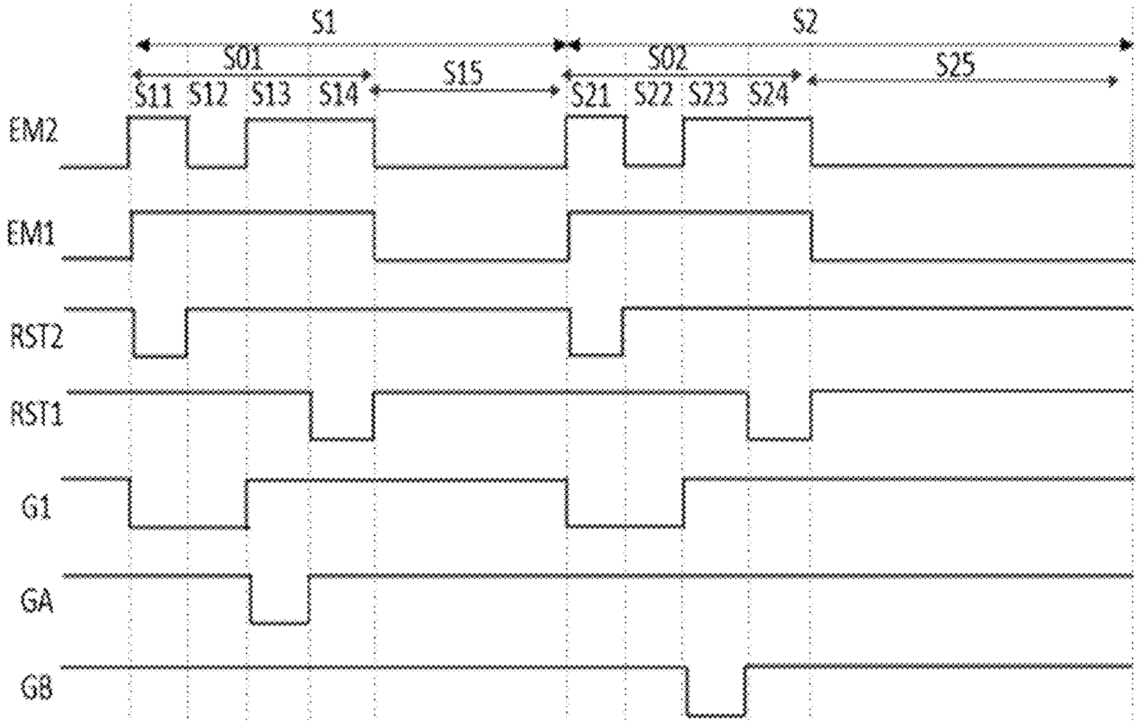
Figure 153A:
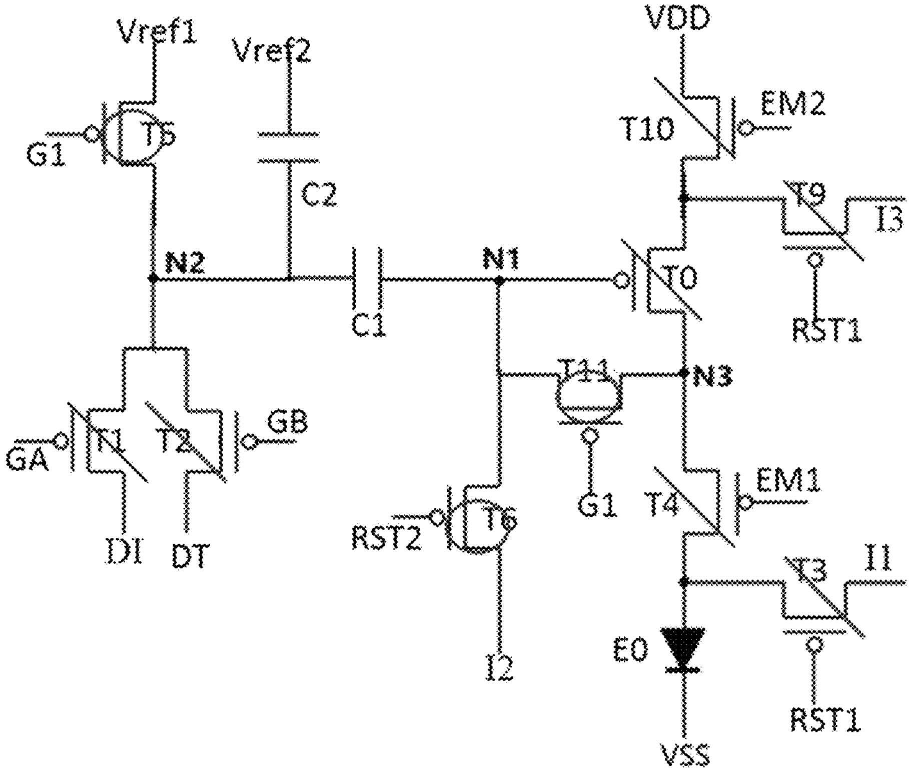
Figure 153B:
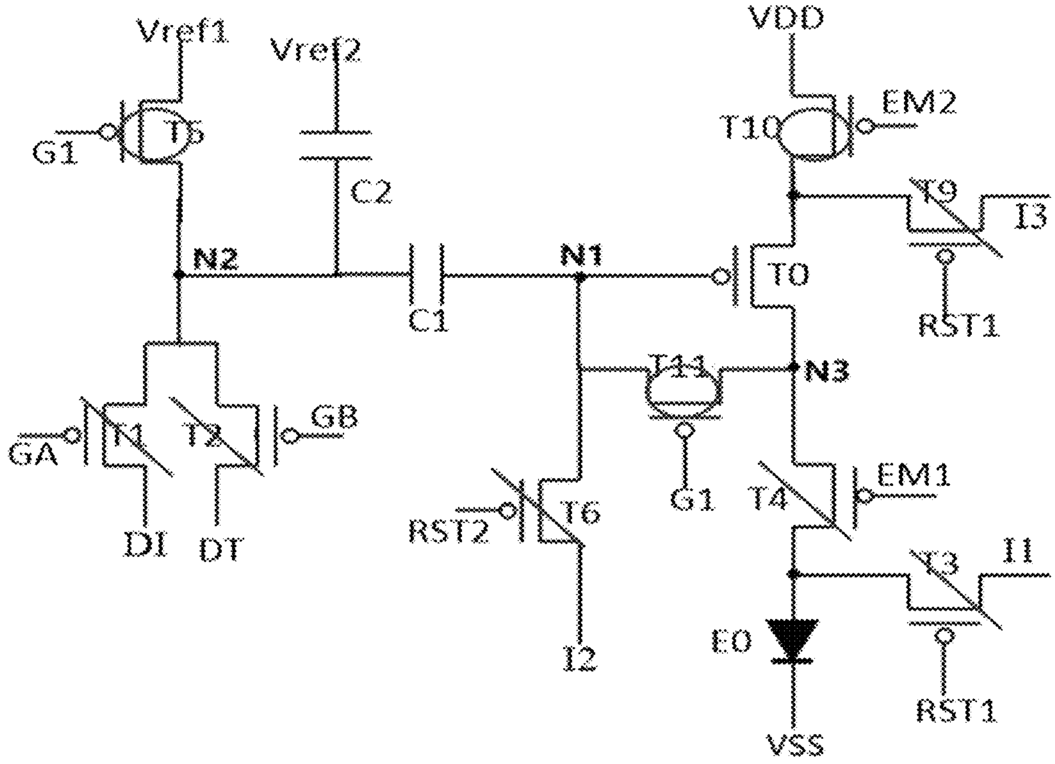
Figure 153C:
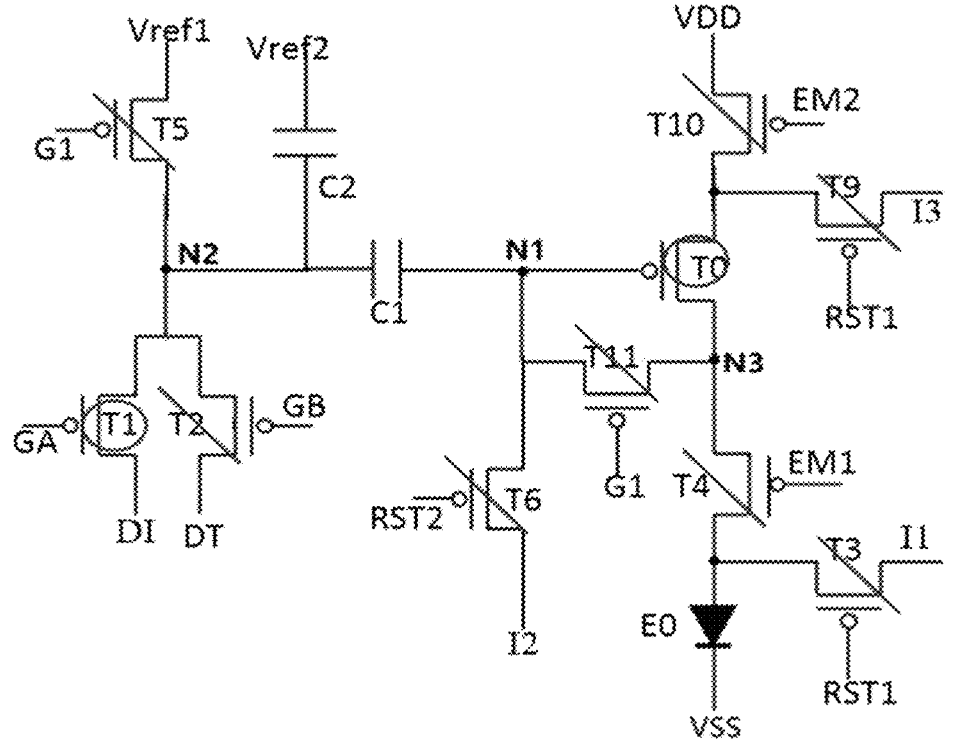
Figure 153D:
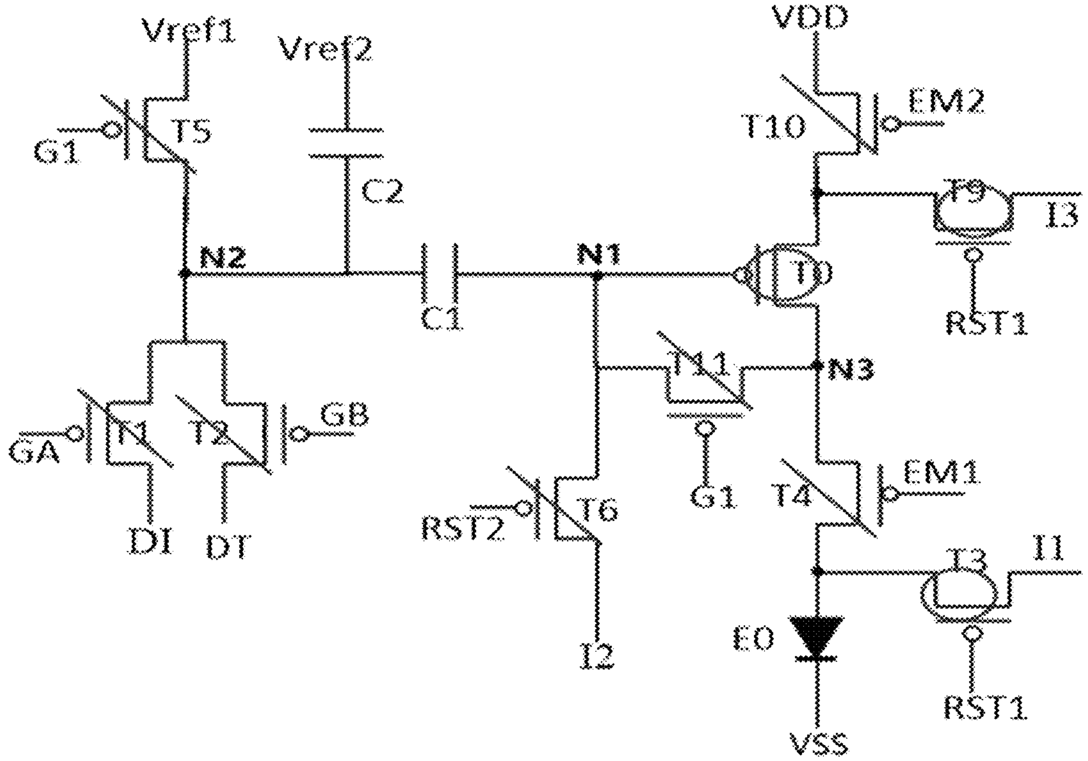
Figure 153E:
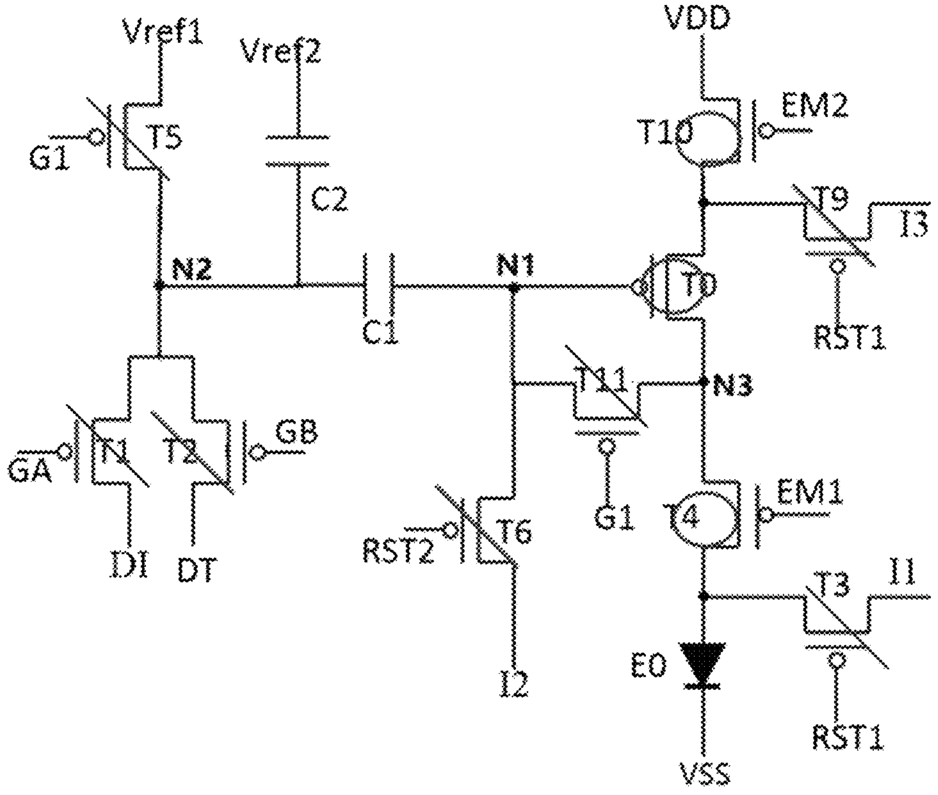
Figure 153F:
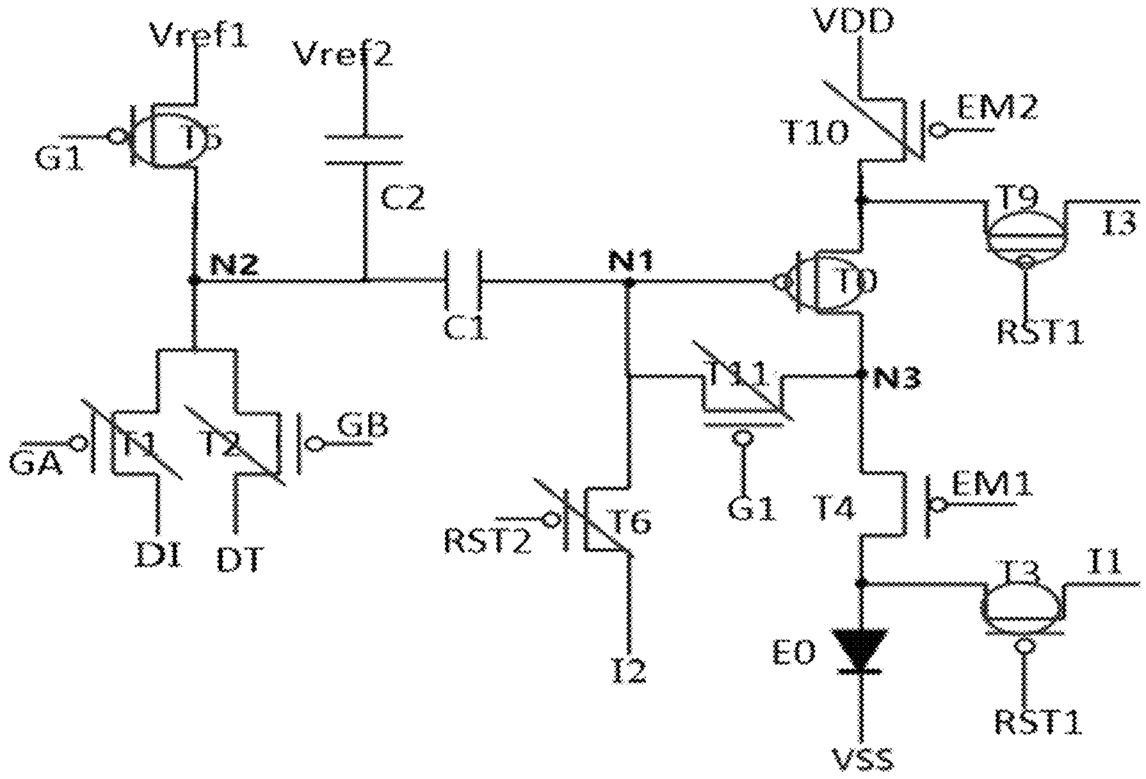
Figure 153G:
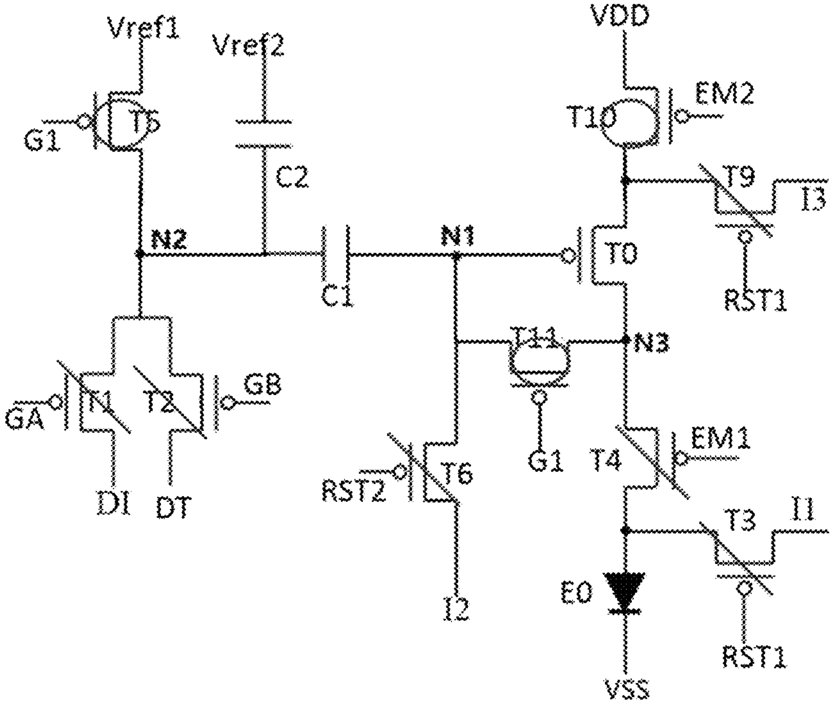
Figure 153H:
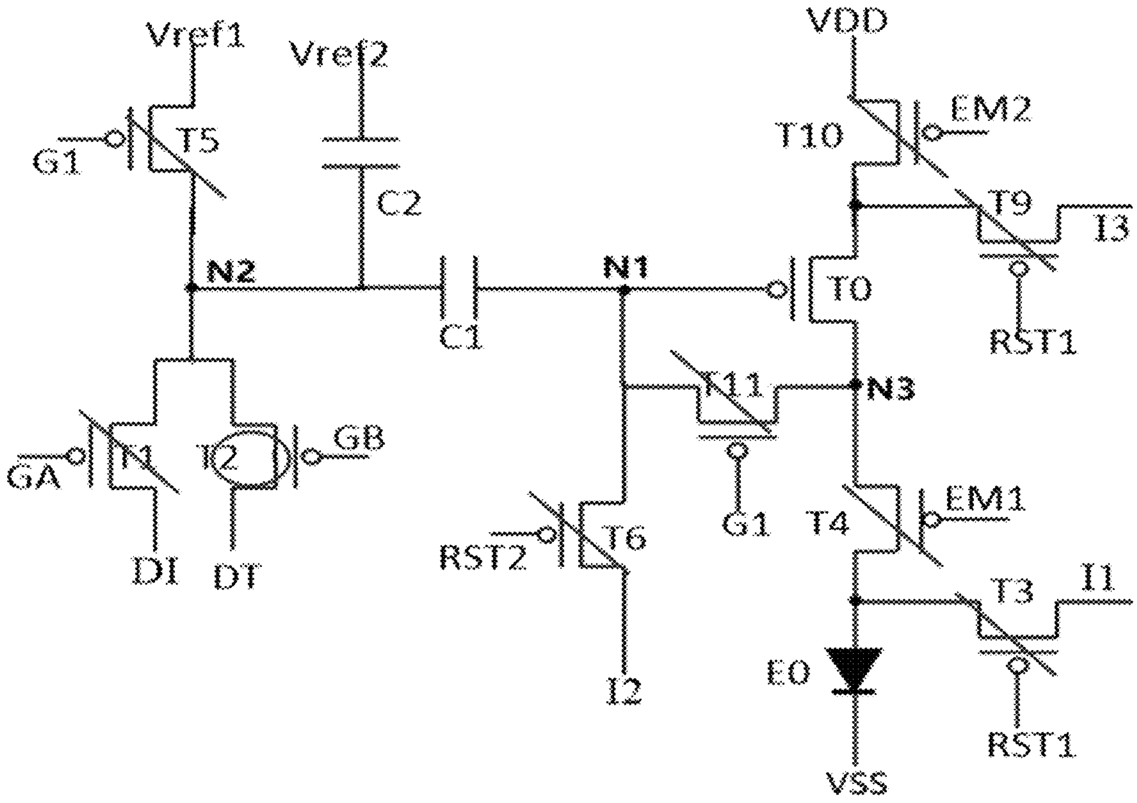
Figure 153I:
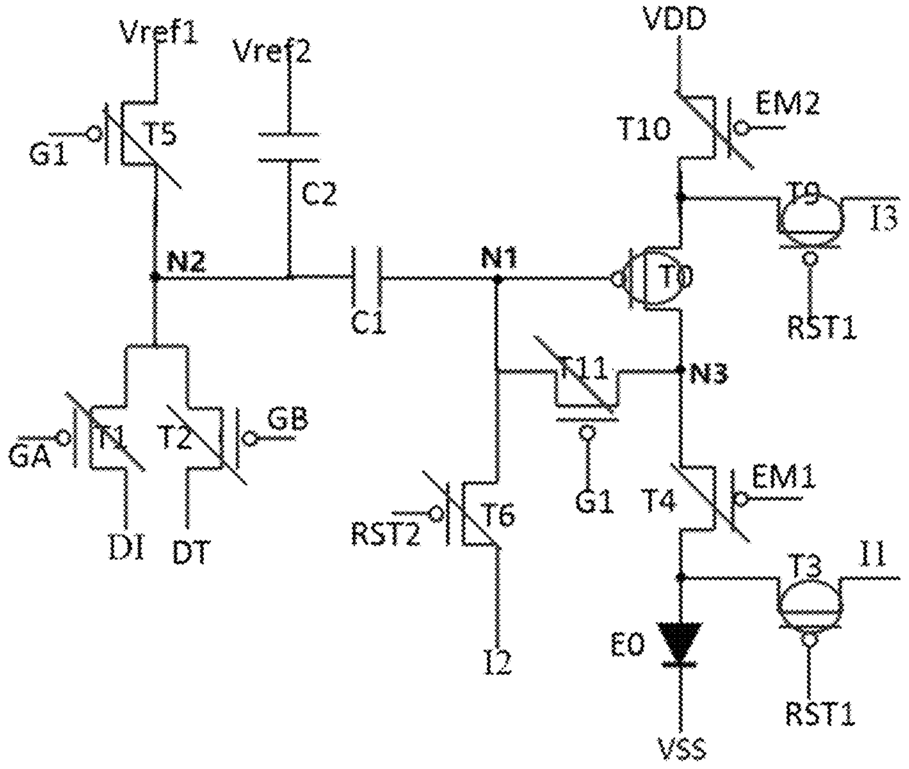
Figure 153J:
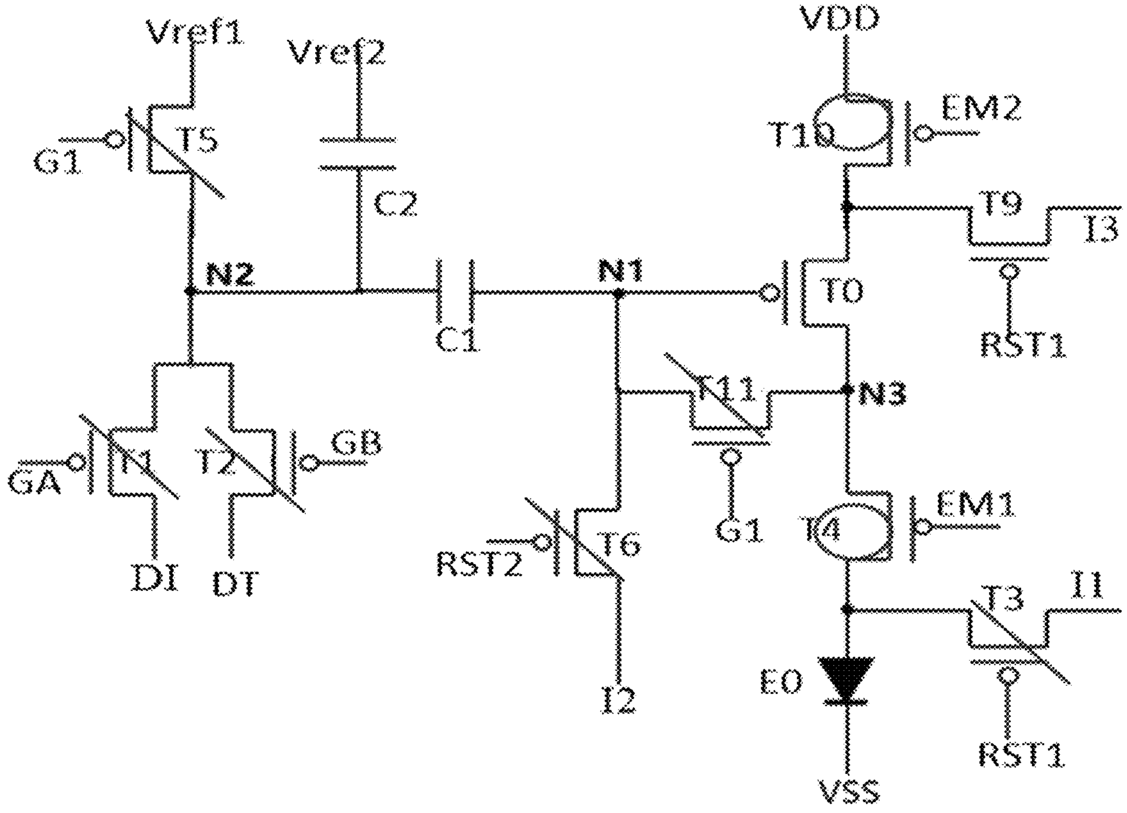
Figure 154A:
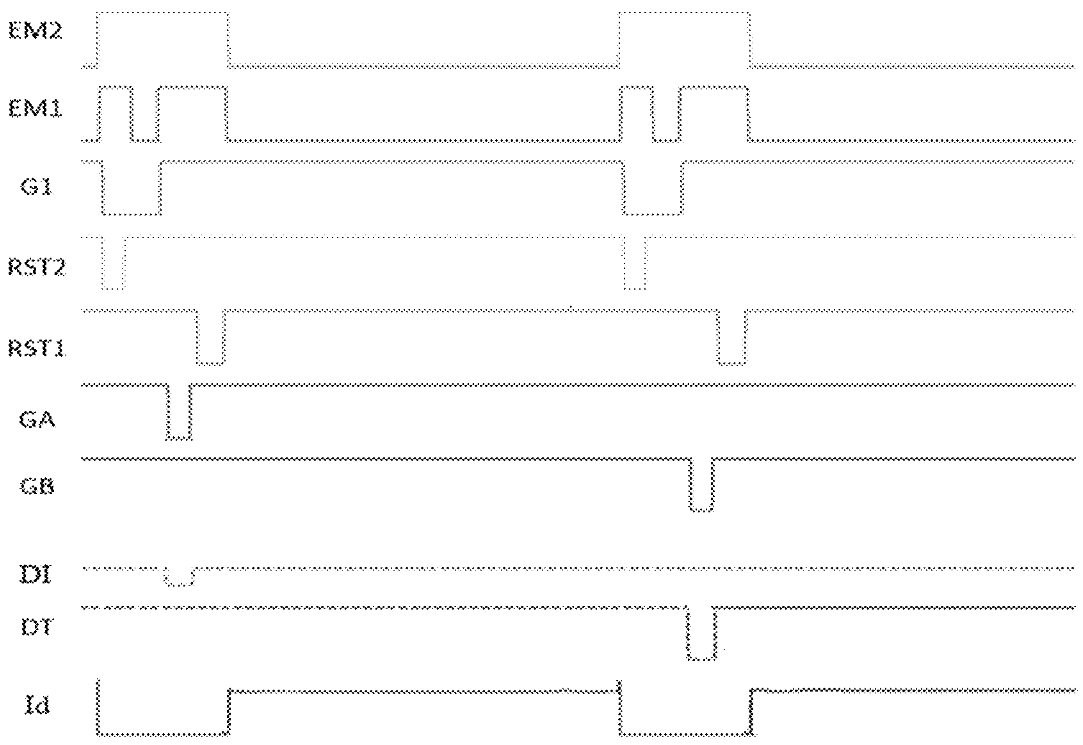
Figure 154B:
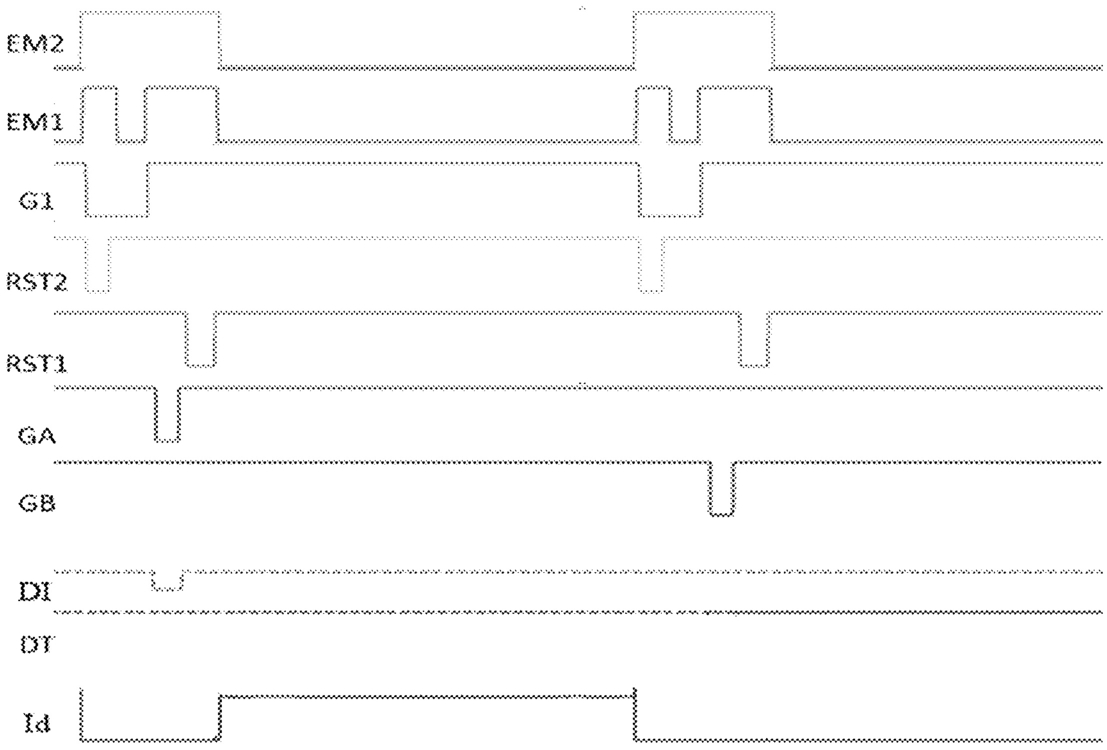
Figure 155:
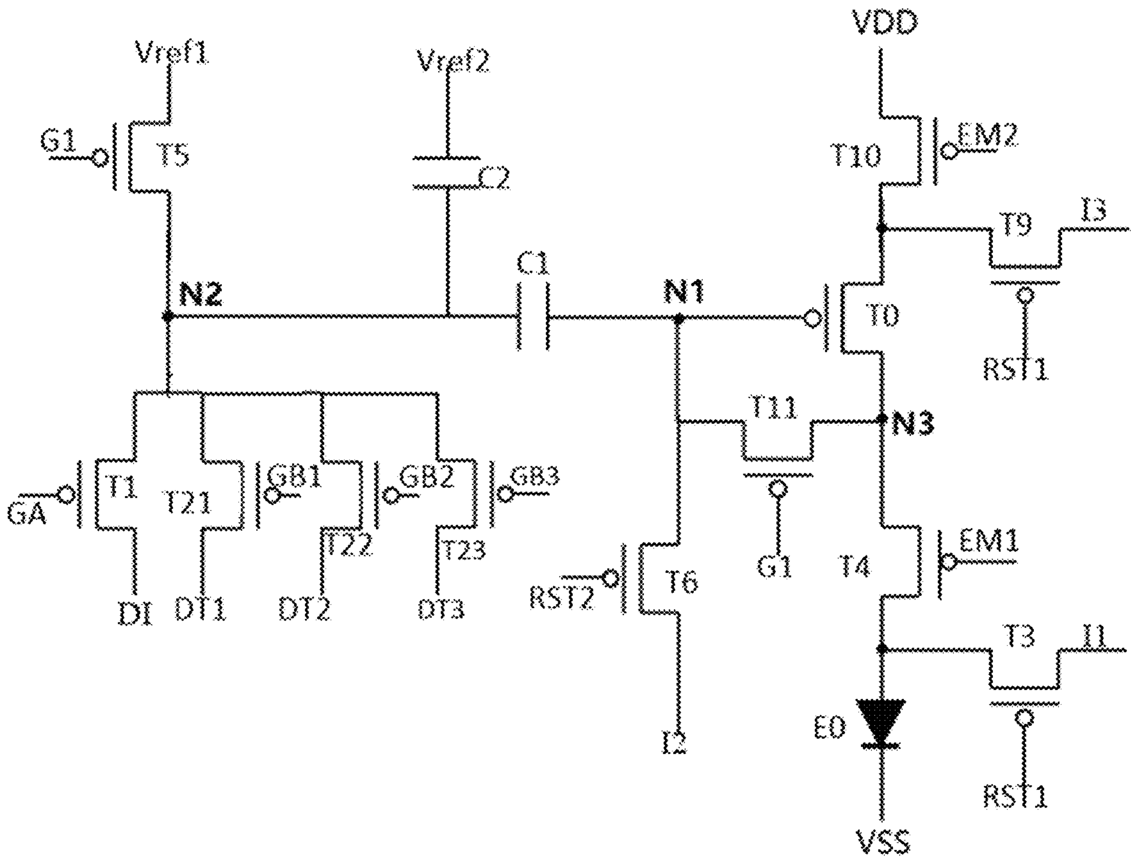
Figure 156:
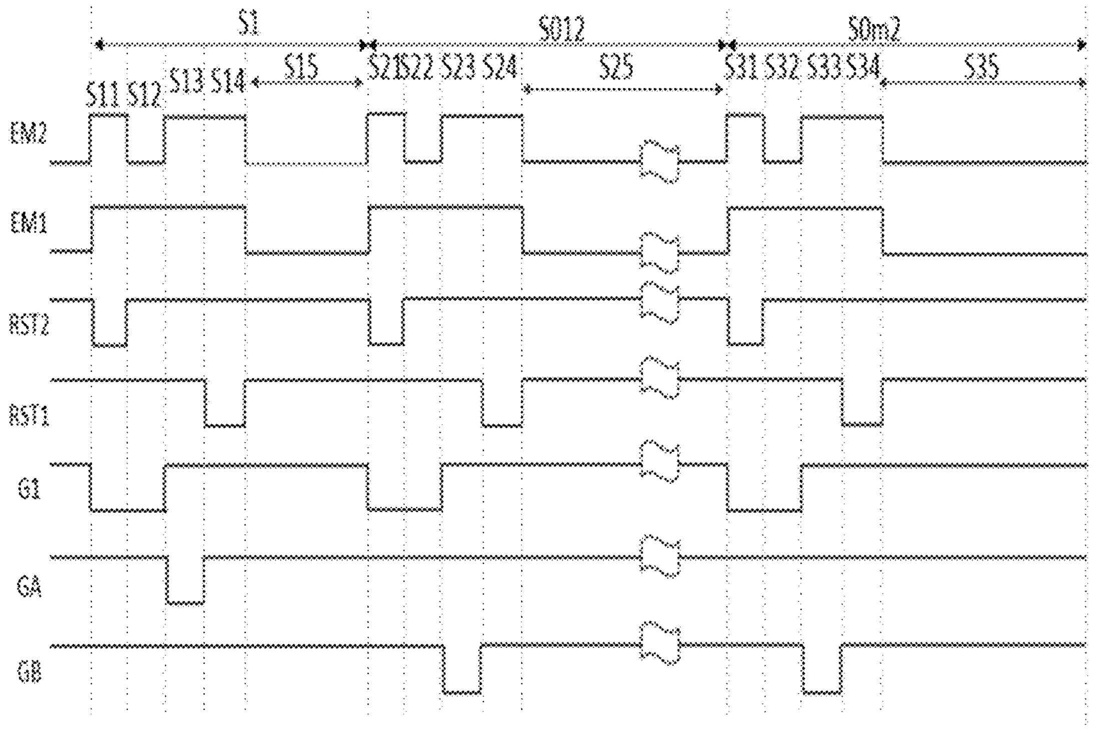
Figure 157:
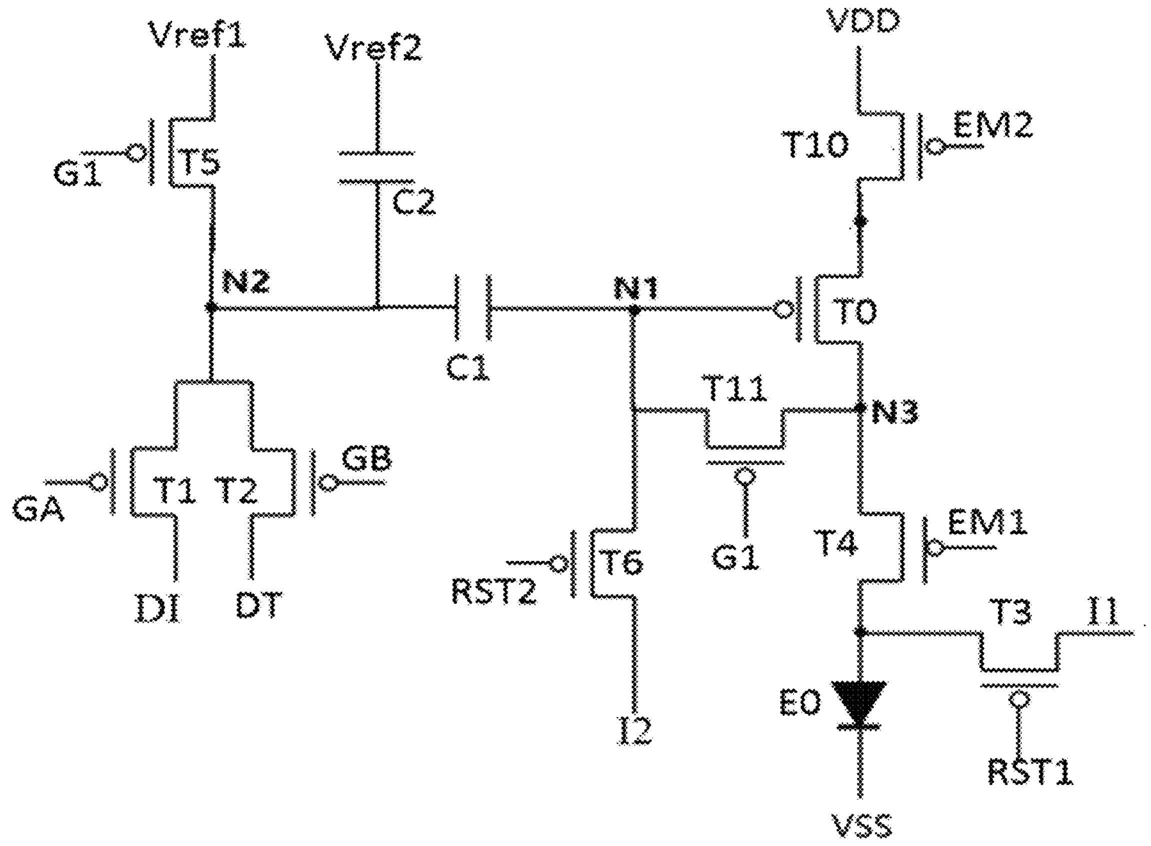
Figure 158:
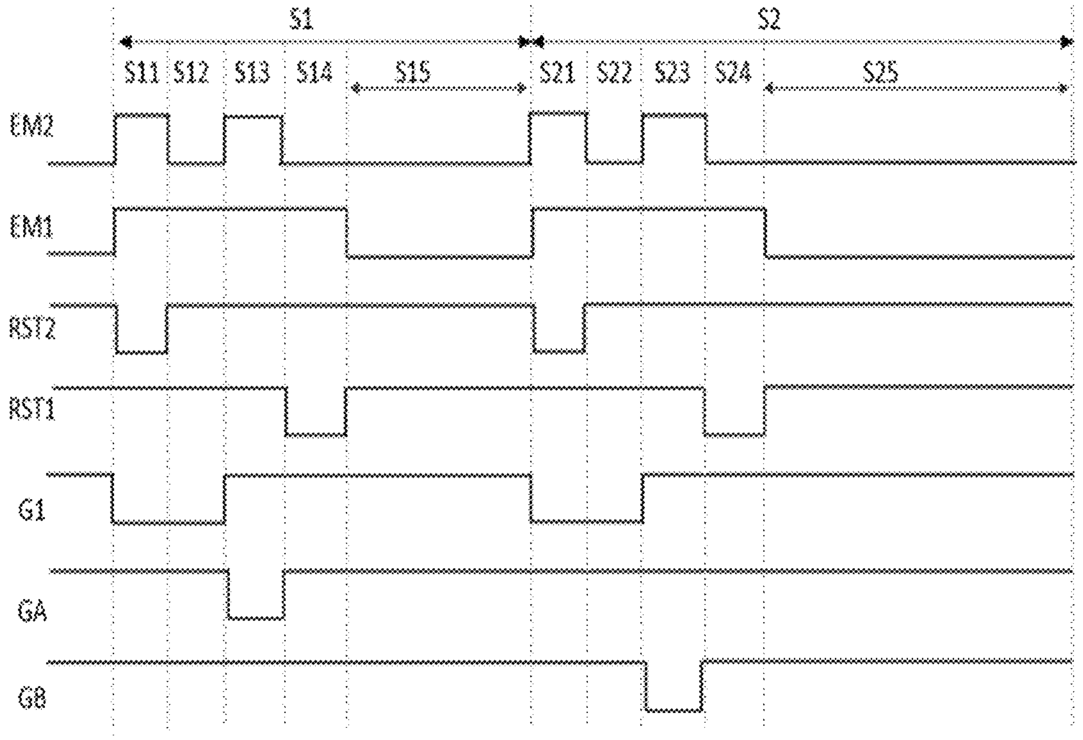
Figure 159:
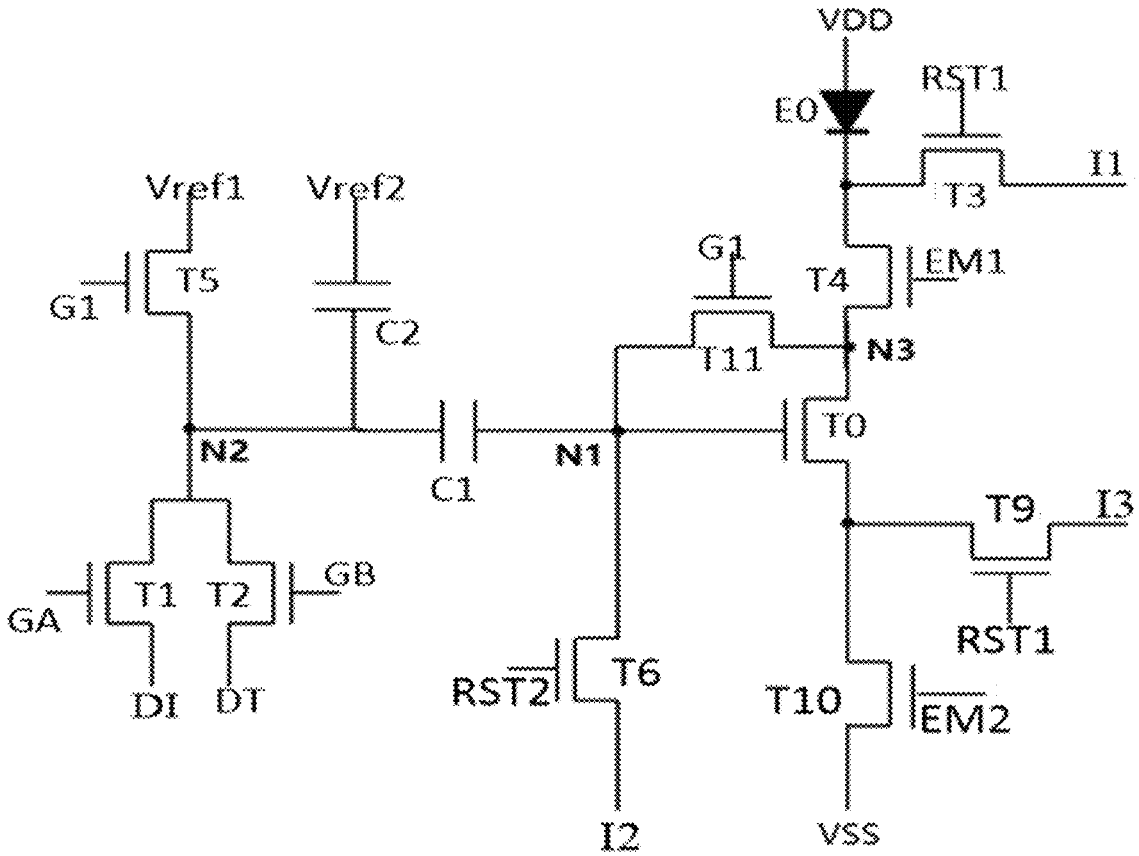
Figure 160:
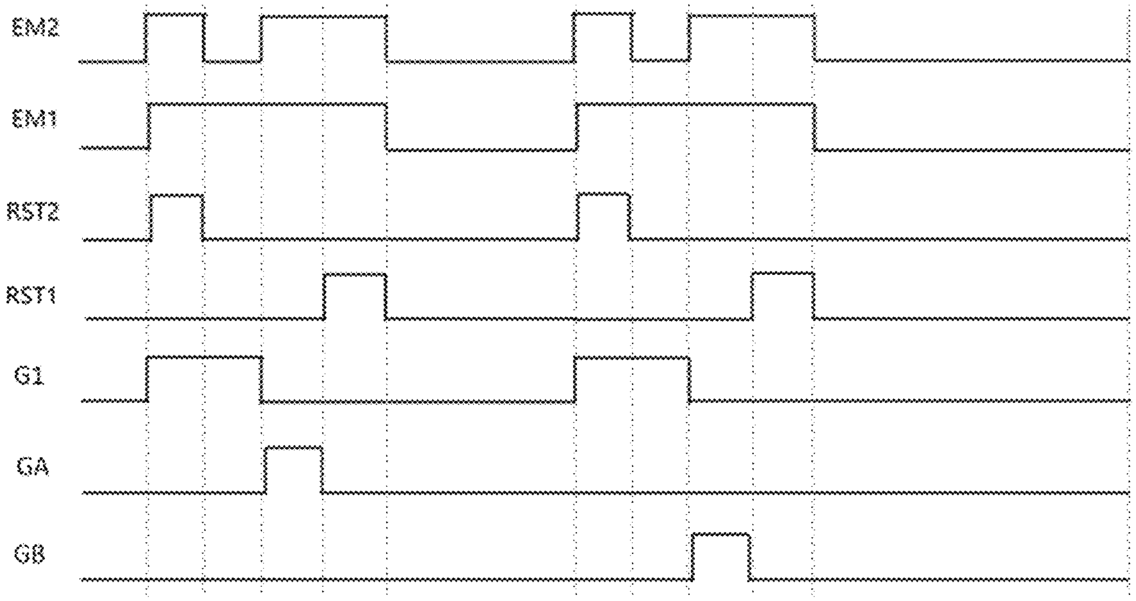
Figure 161:
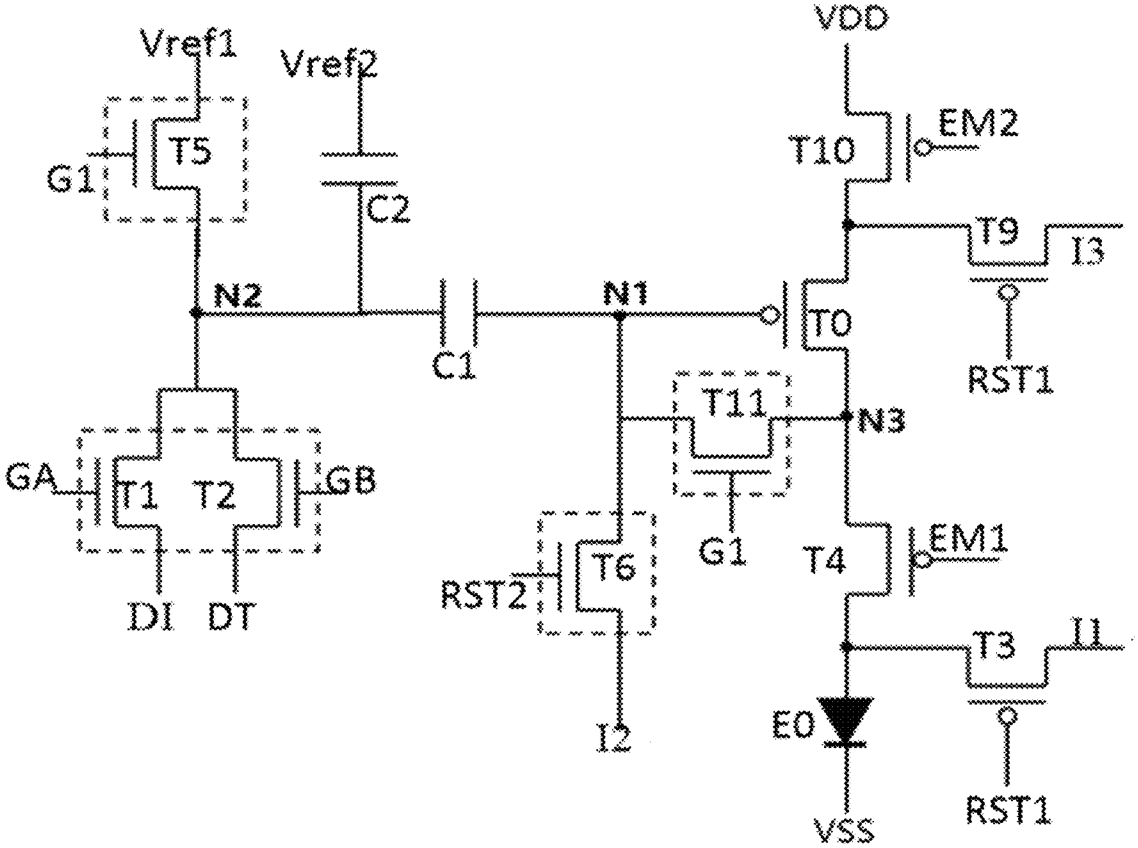
Figure 162:
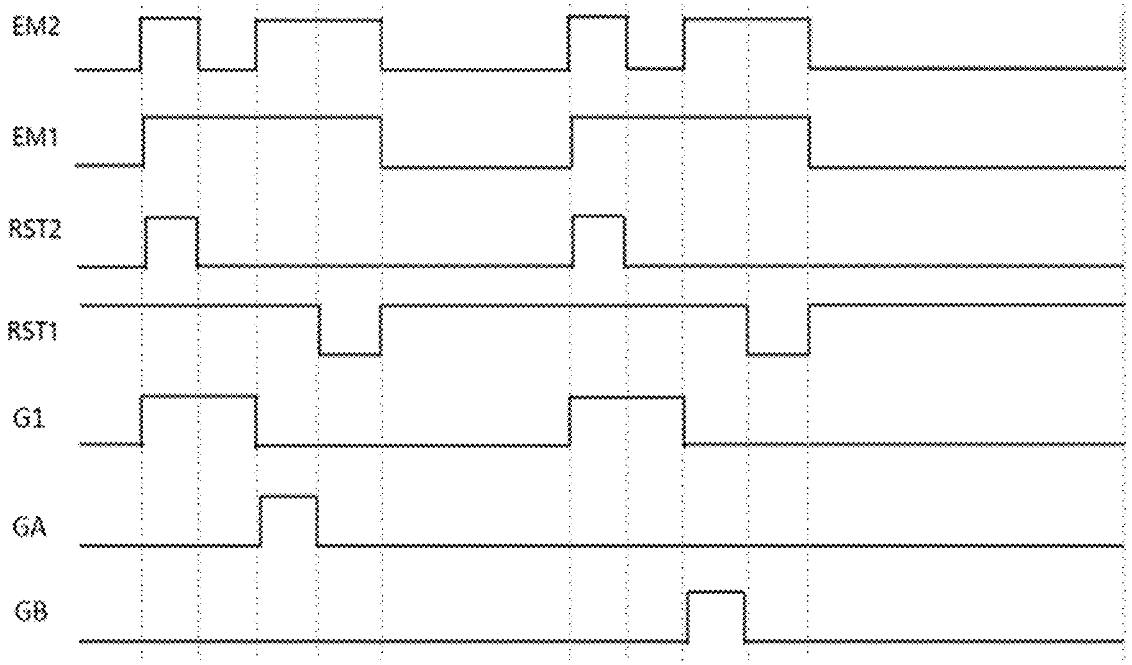
Figure 163:
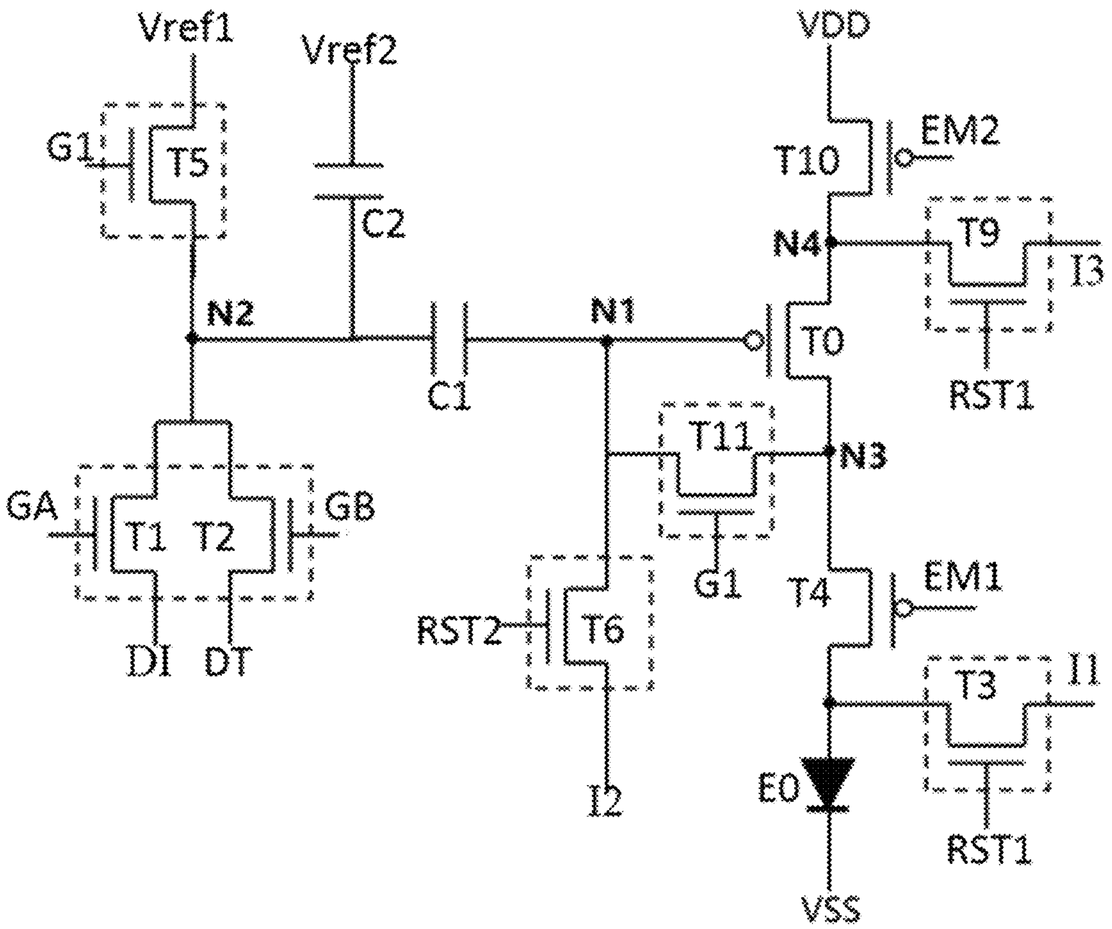
Figure 164:
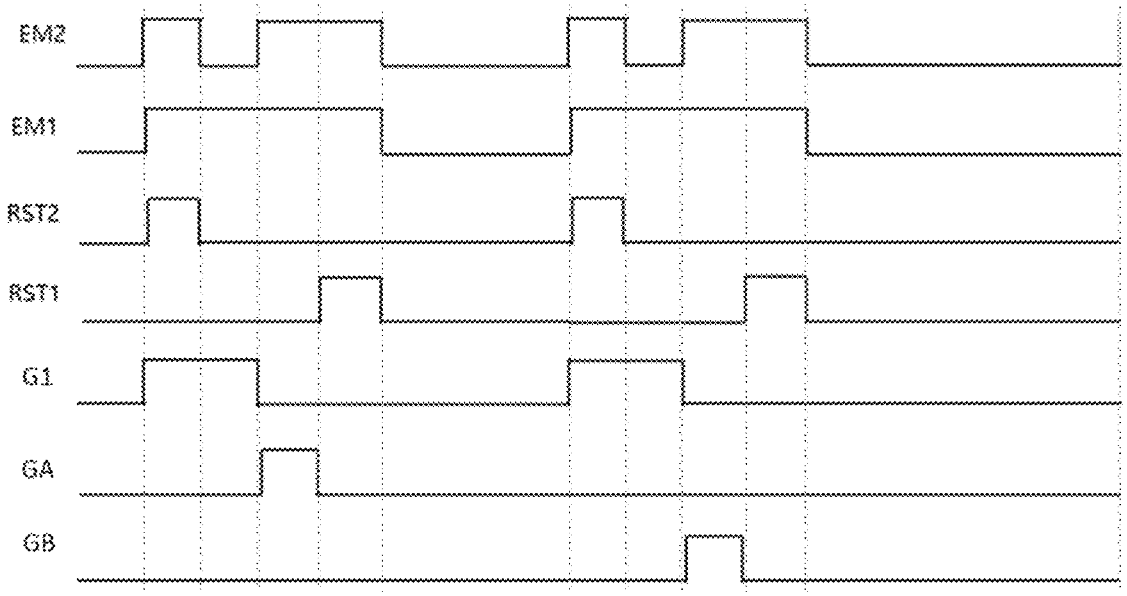
Figure 165:
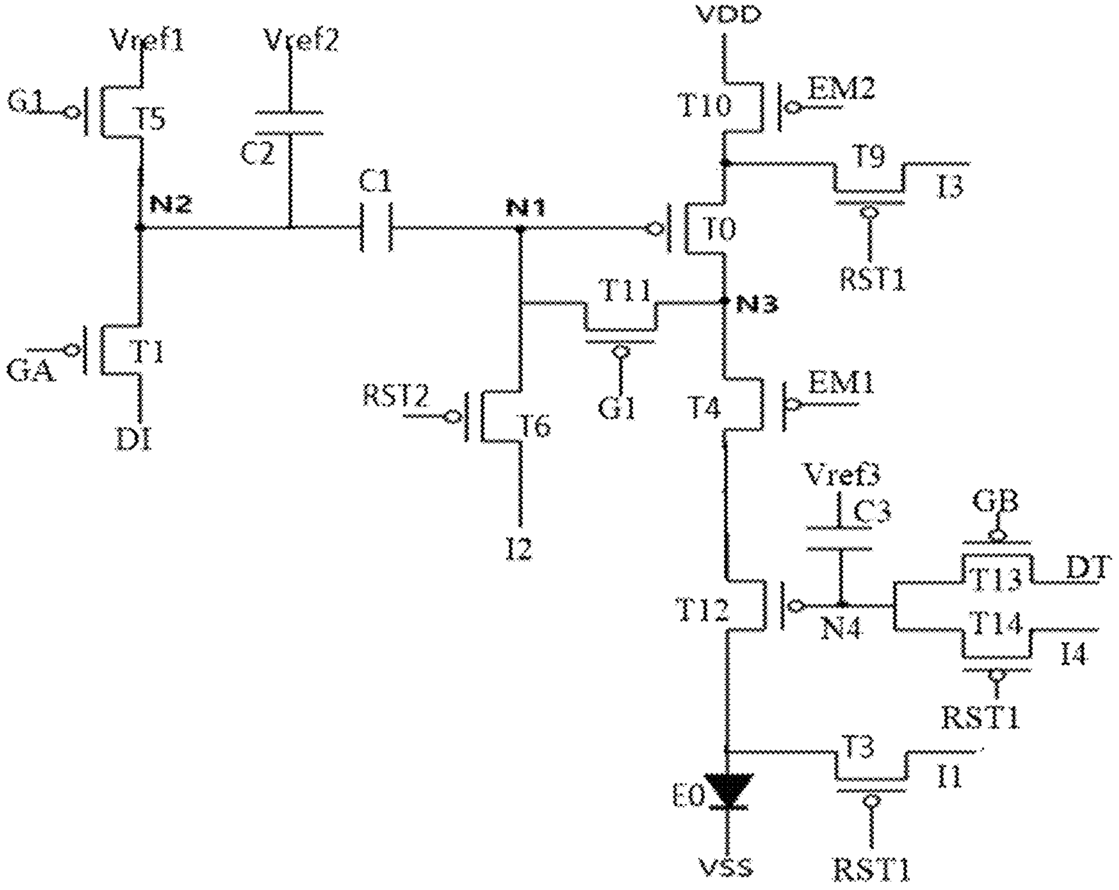
Figure 166:
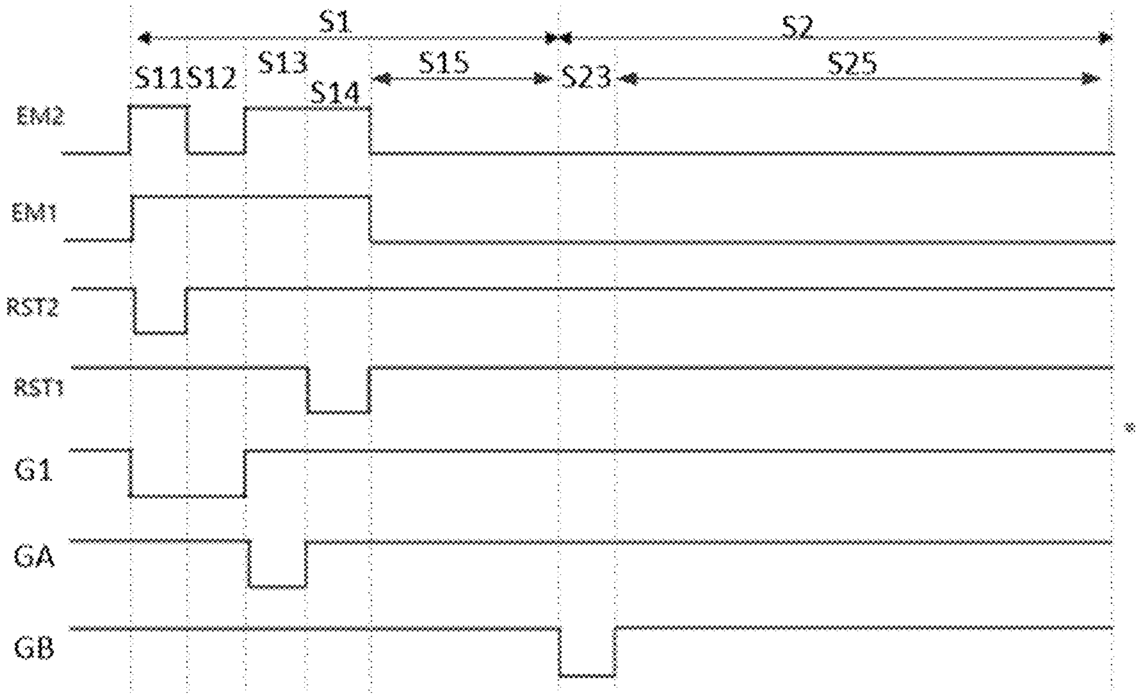
Figure 167:
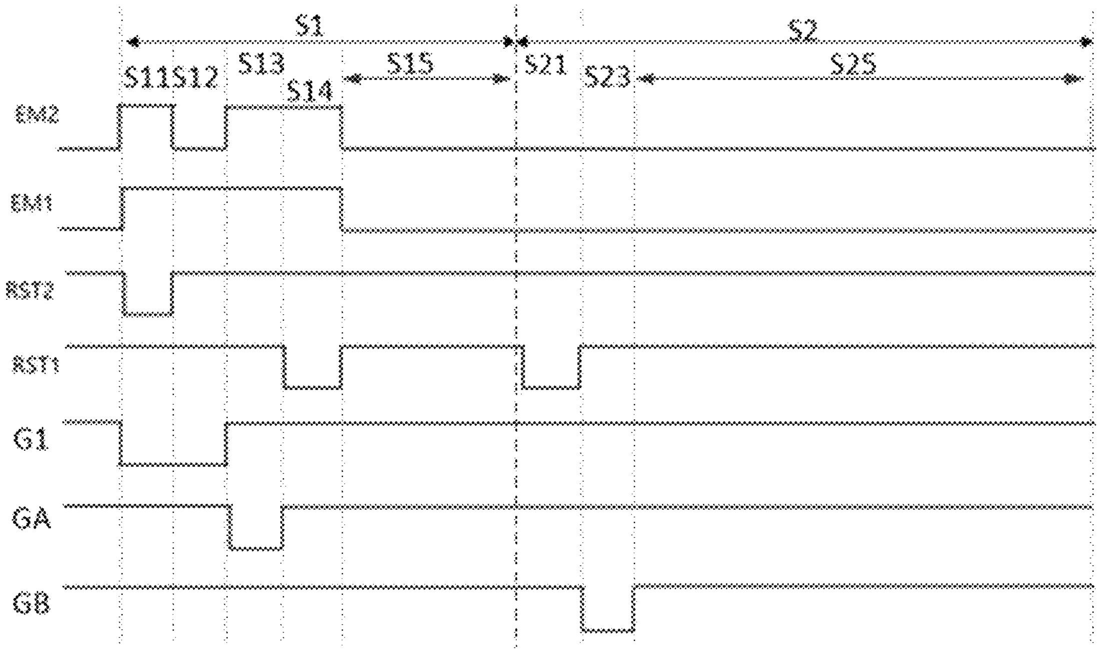
Figure 168:
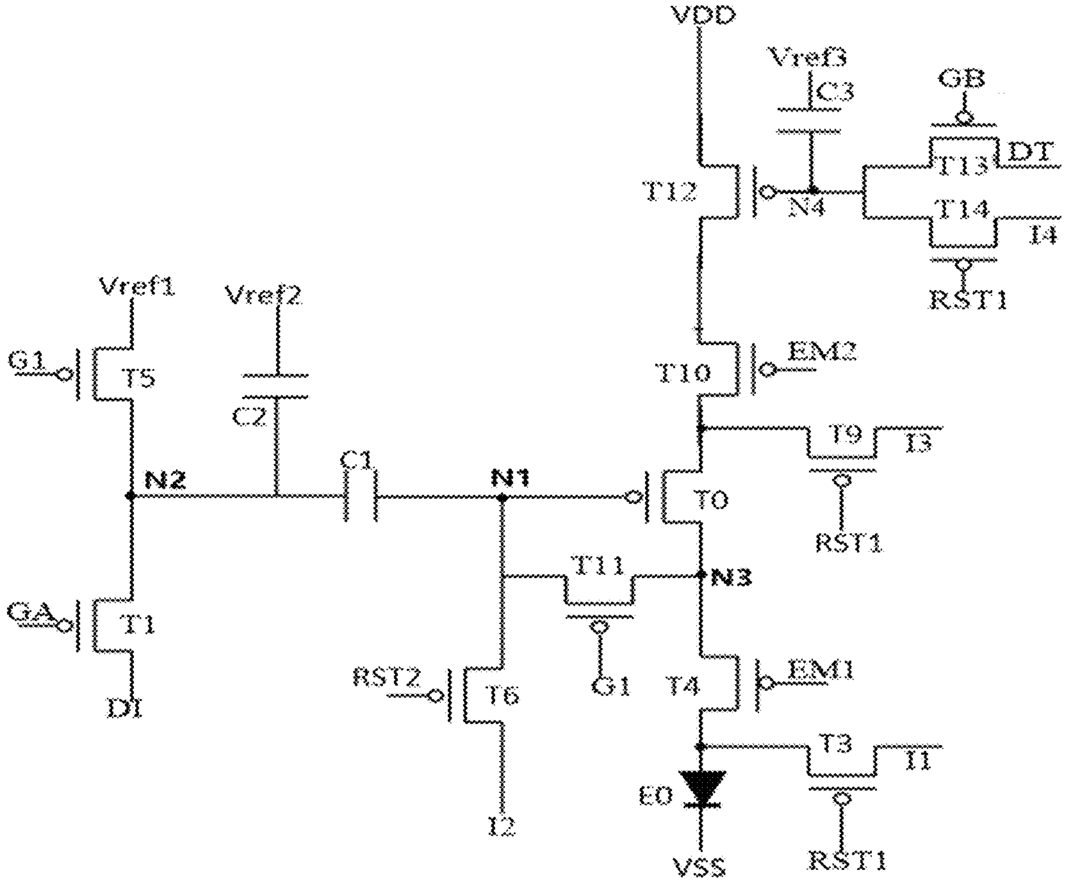
Figure 169:
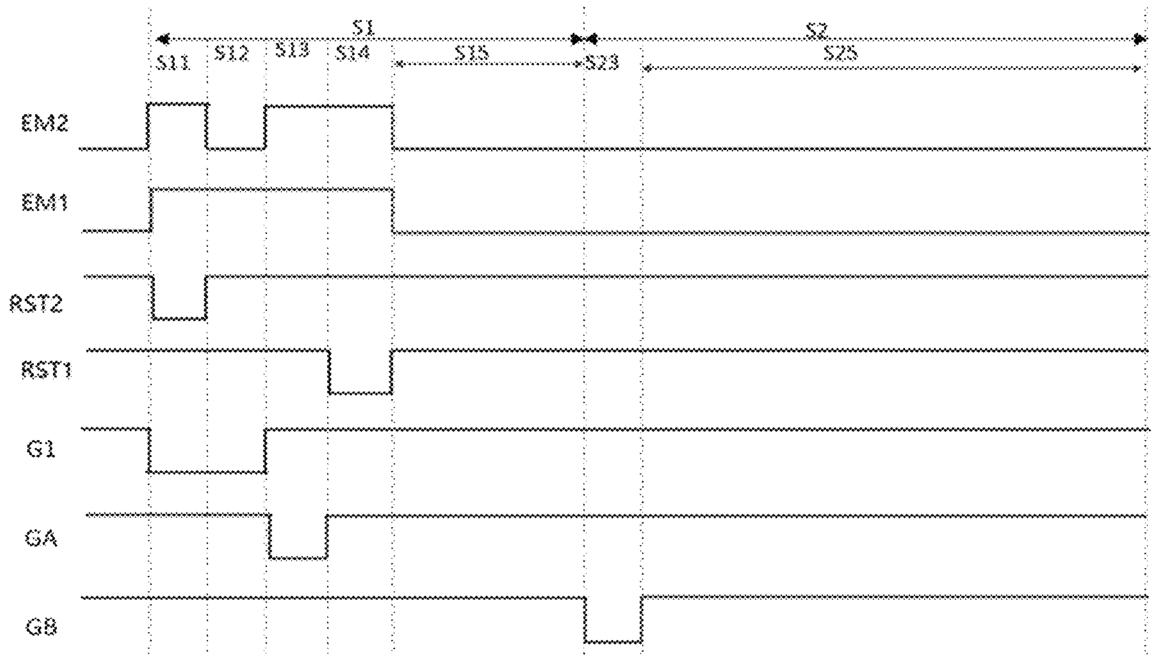
Figure 170:
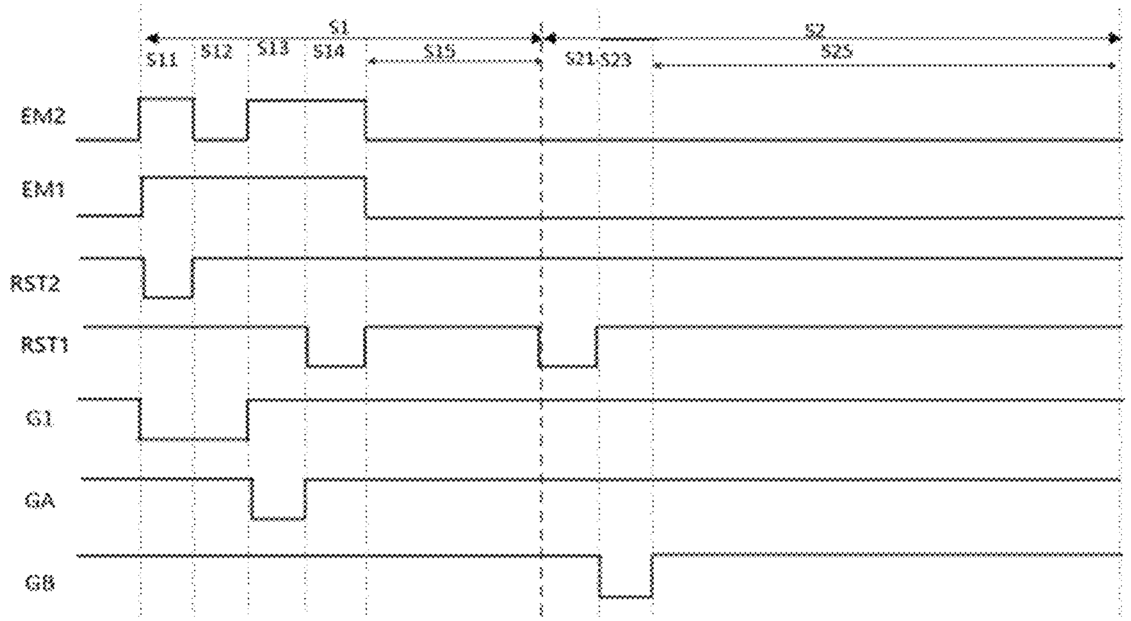
Figure 171:
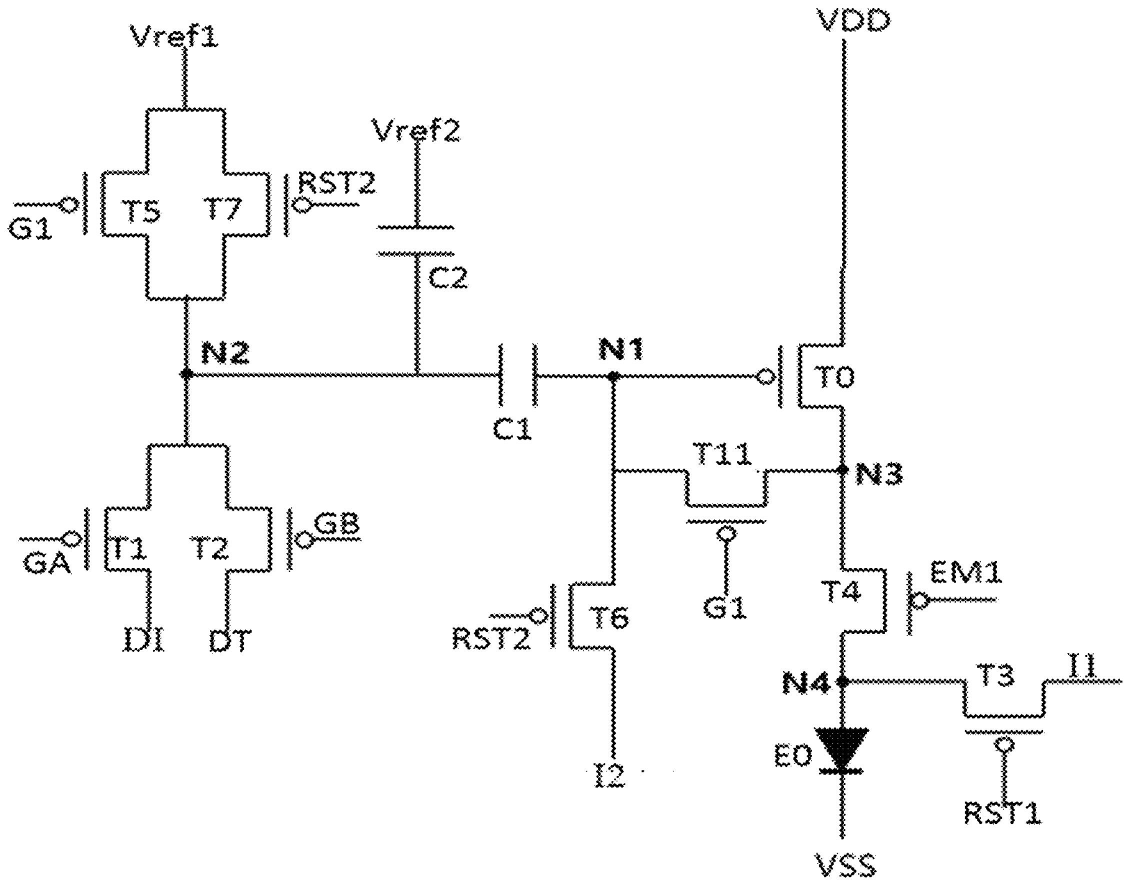
Figure 172:
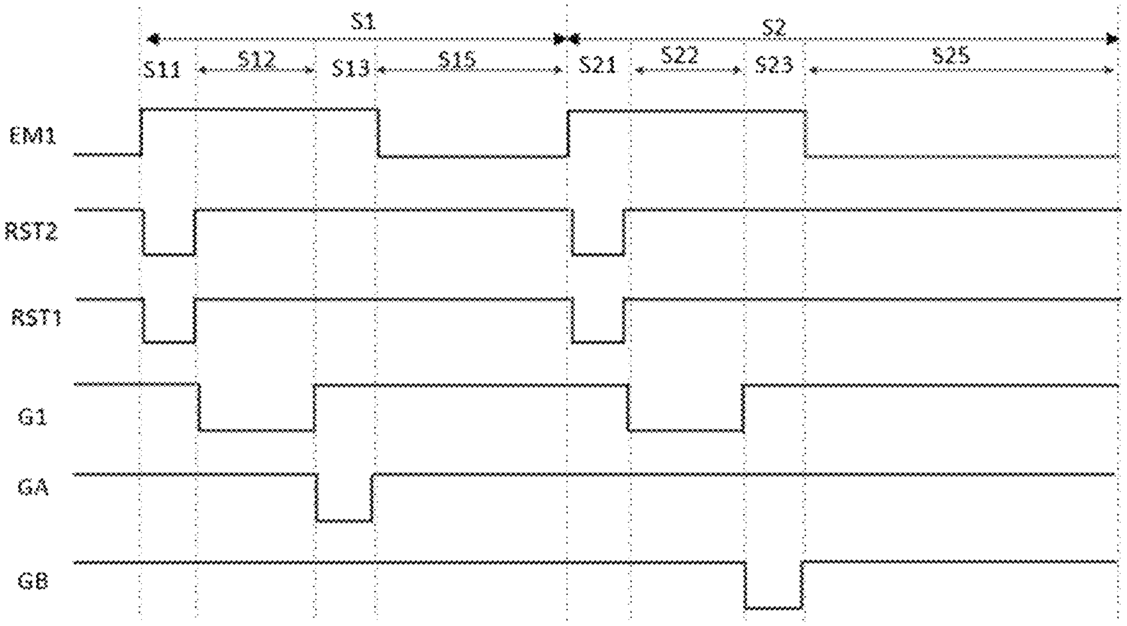
Figure 173A:
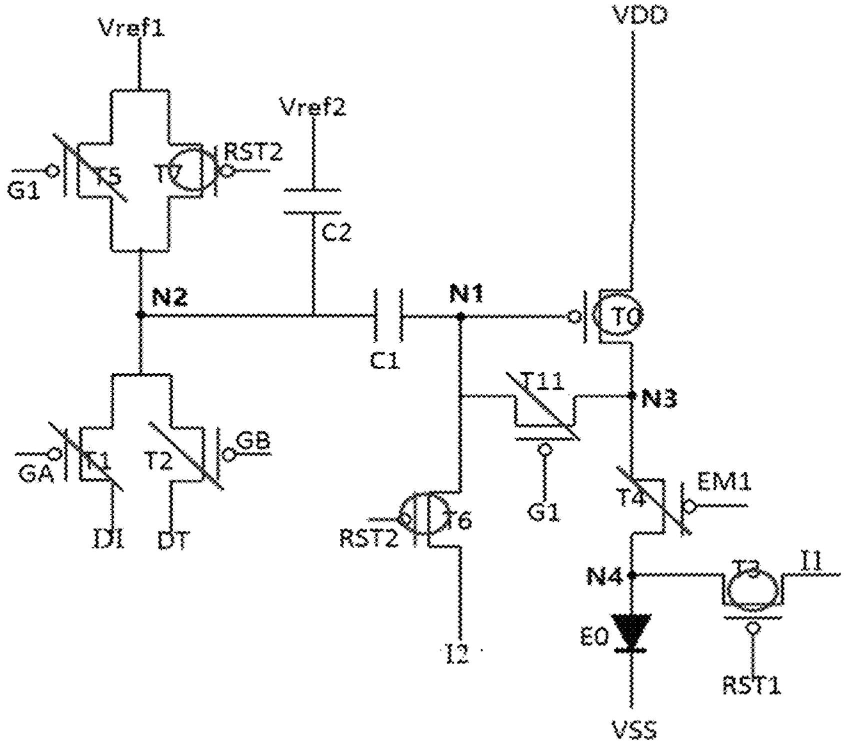
Figure 173B:
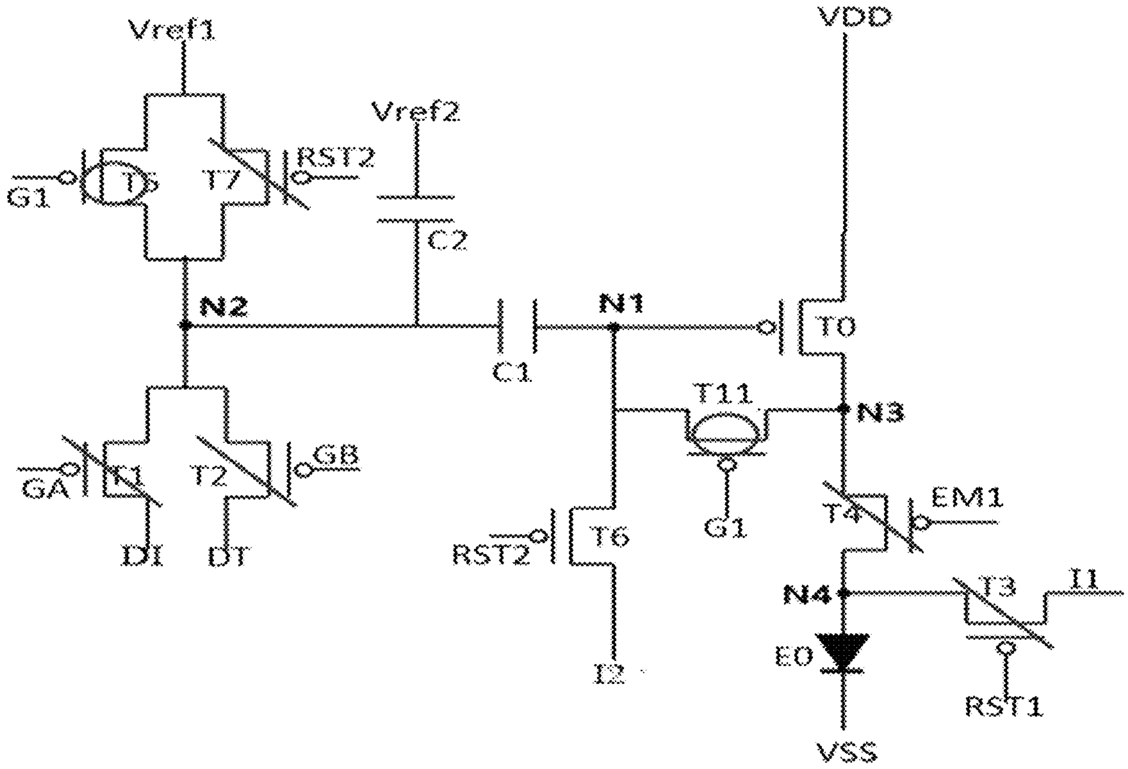
Figure 173C:
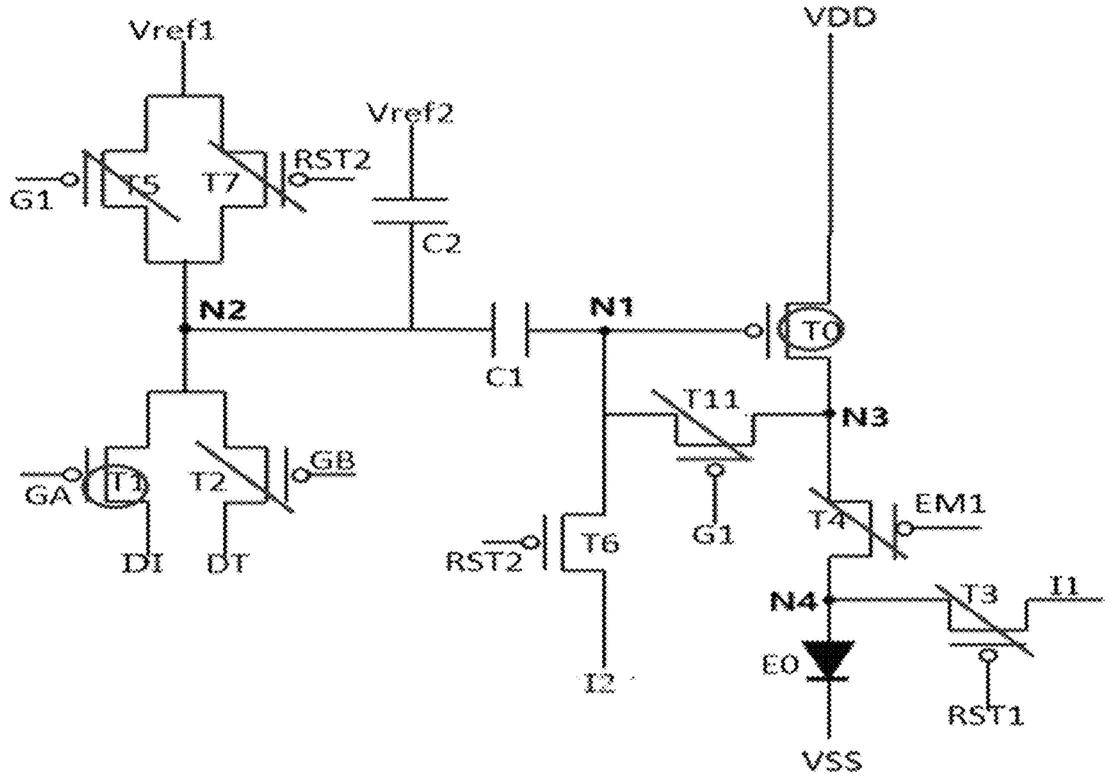
Figure 173D:
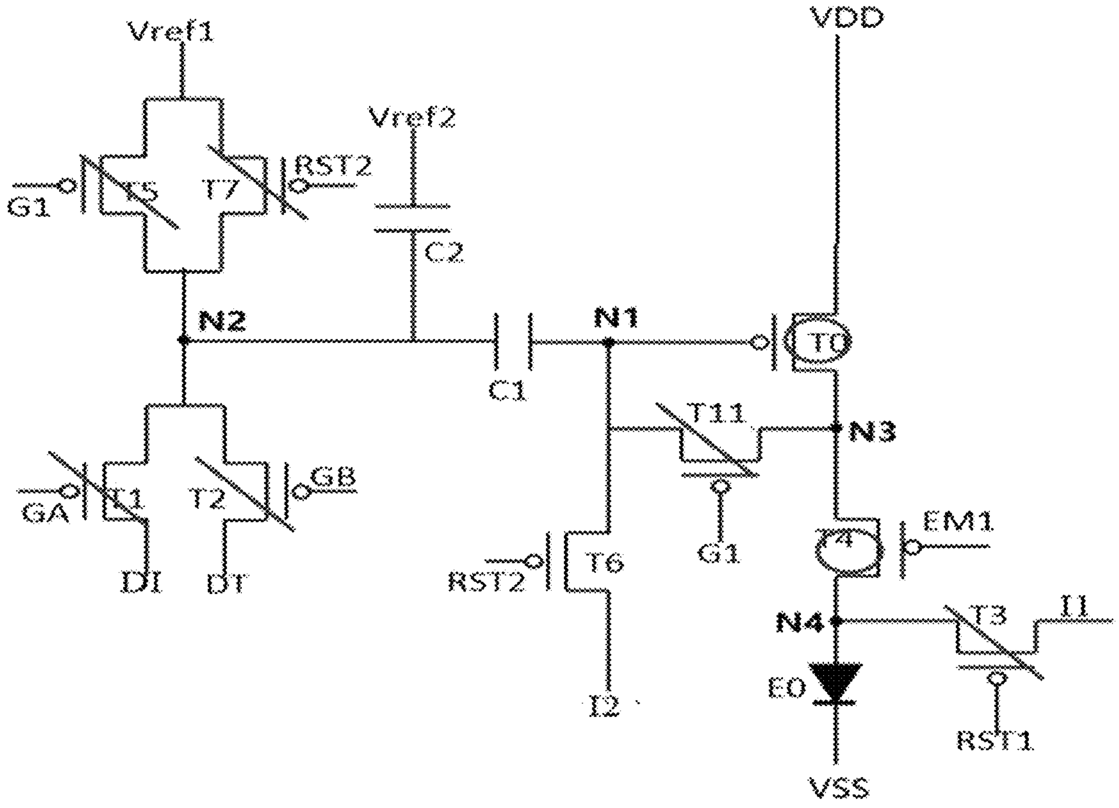
Figure 173E:
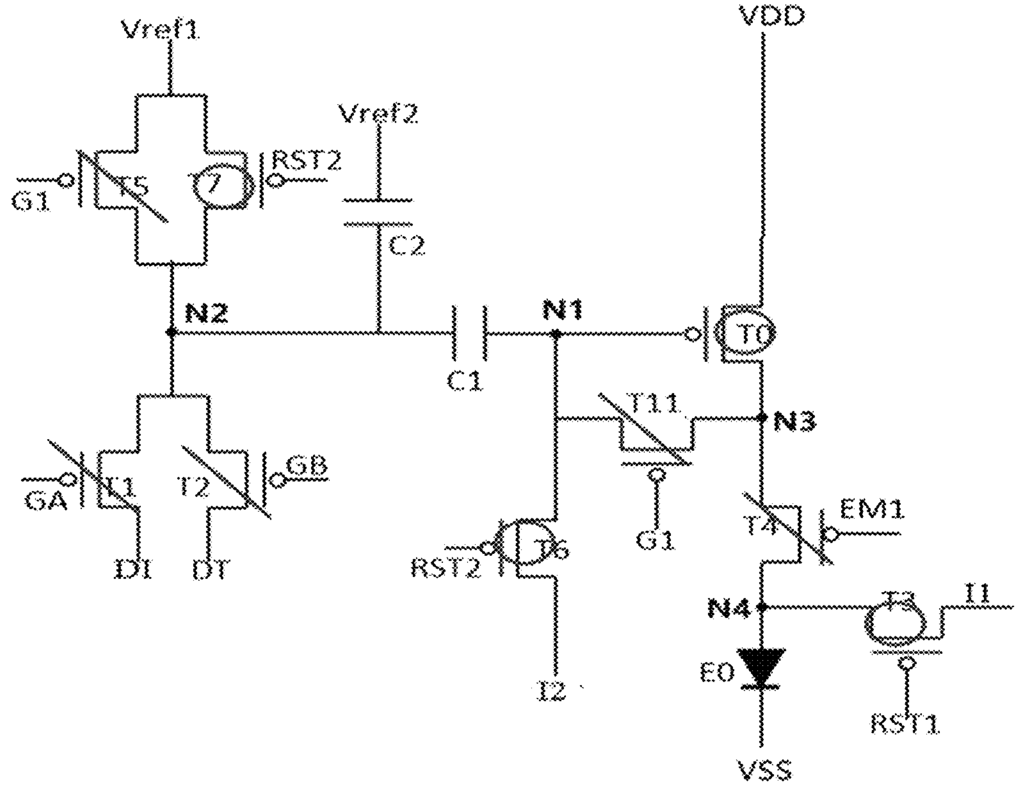
Figure 173F:
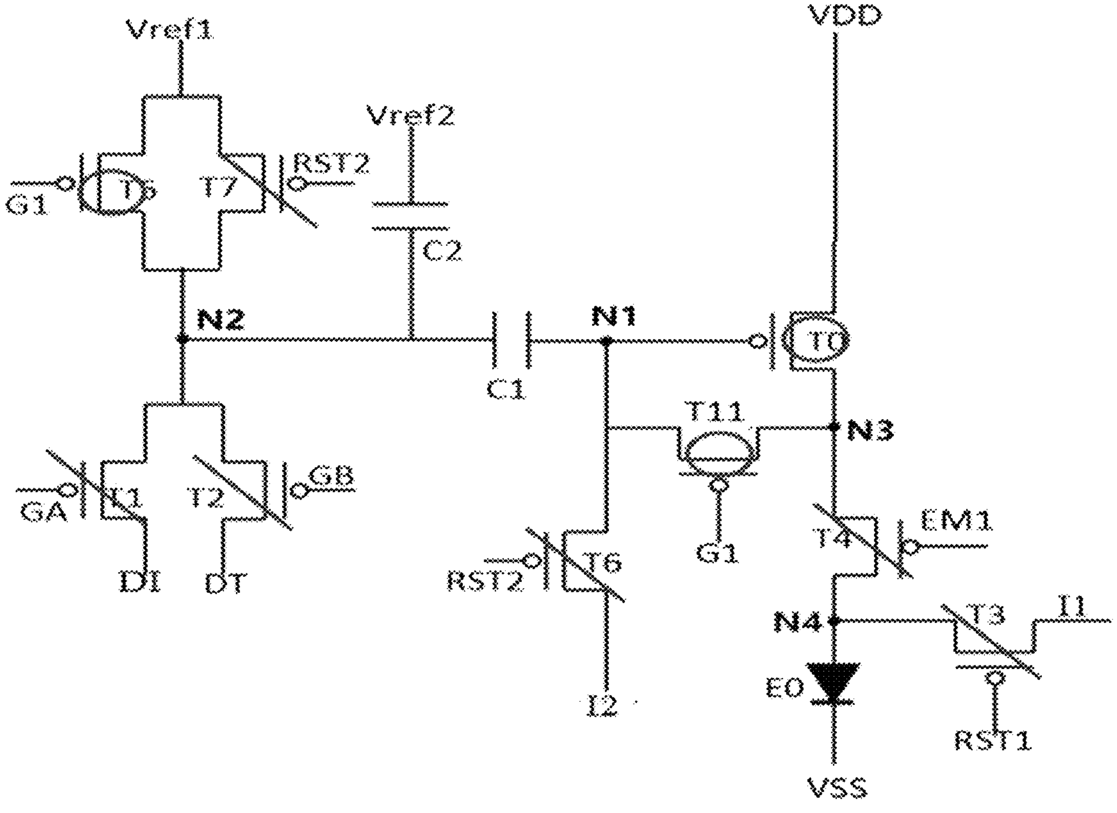
Figure 173G:
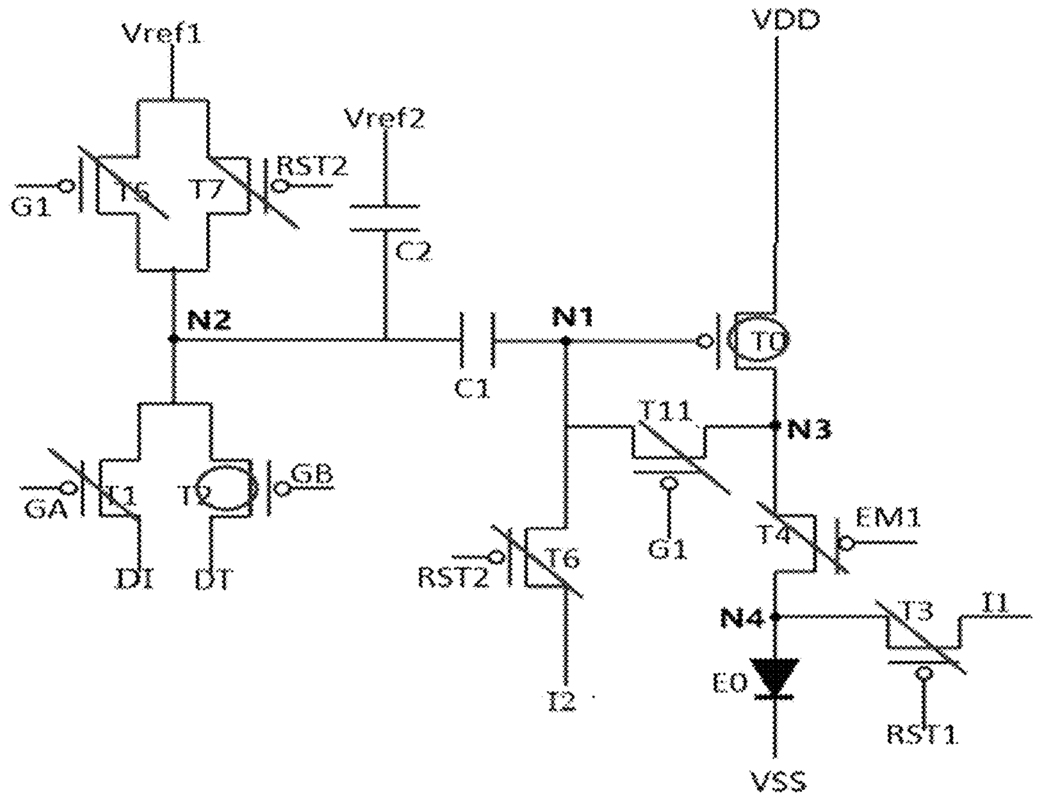
Figure 173H:
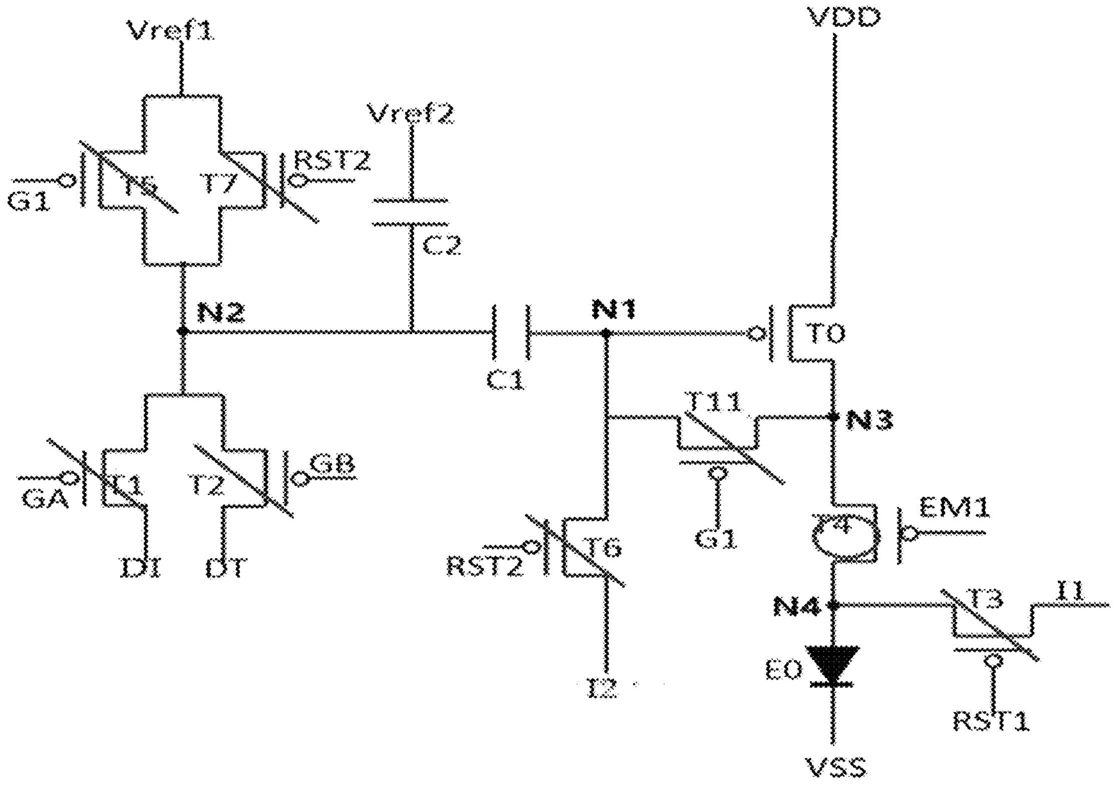
Figure 174A:
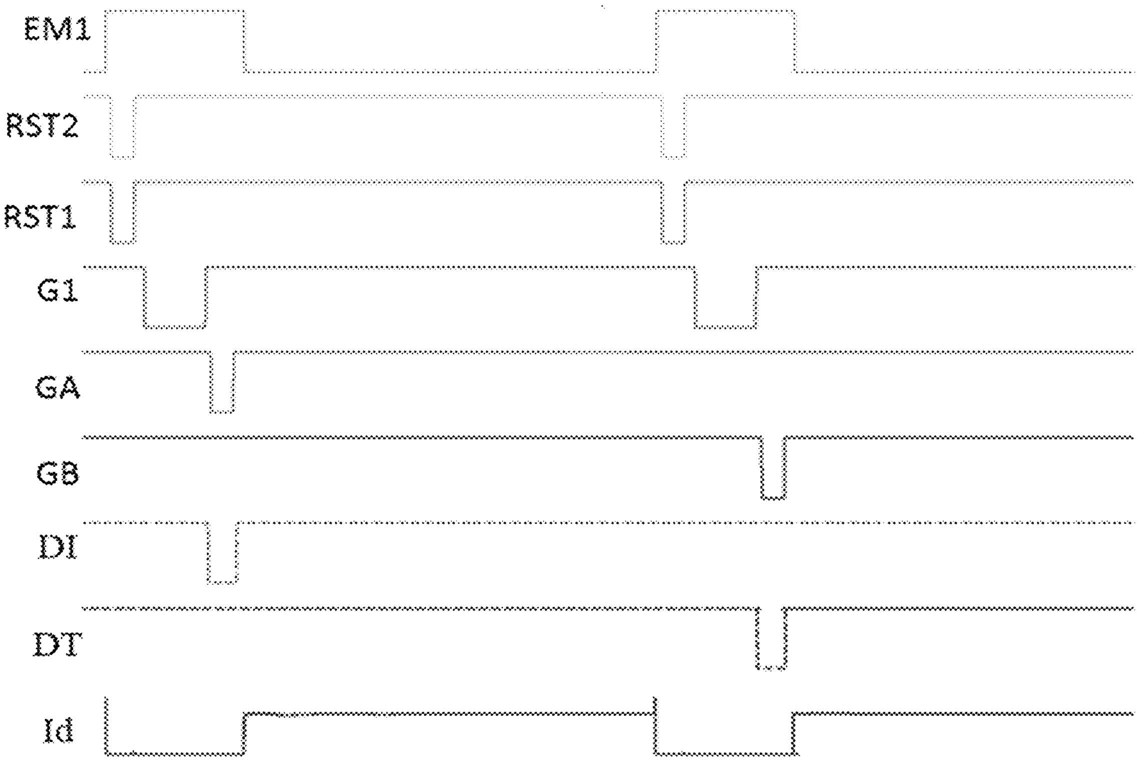
Figure 174B:
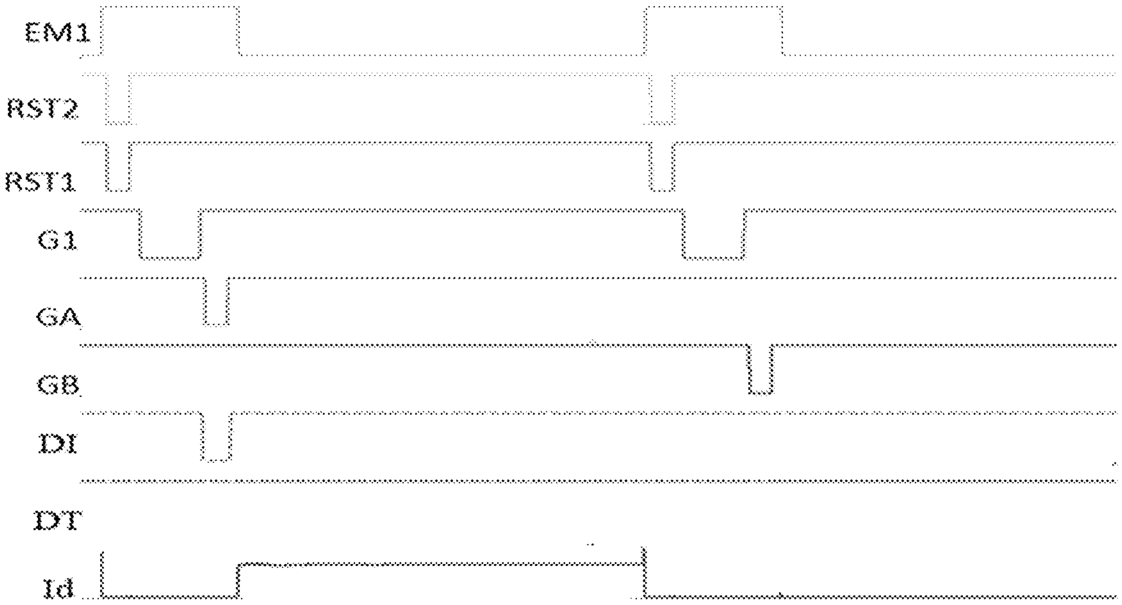
Figure 175:
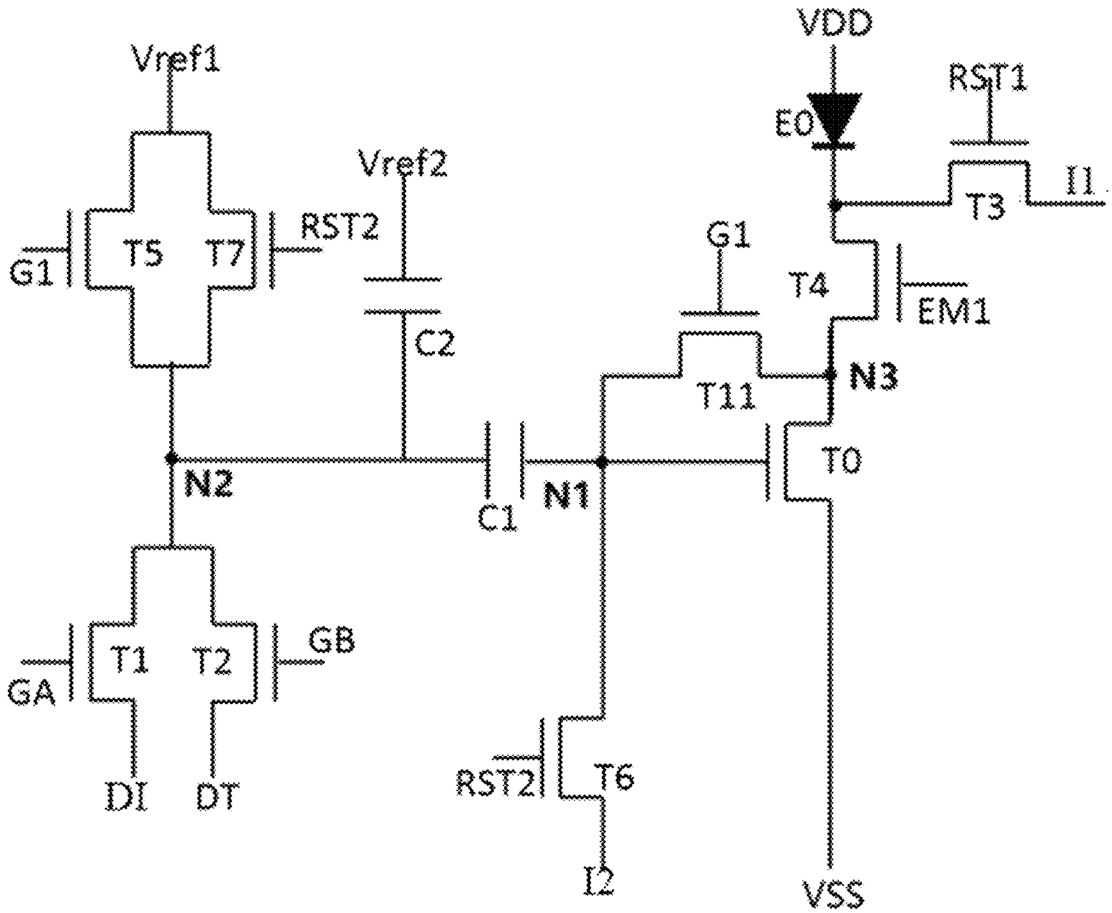
Figure 176:
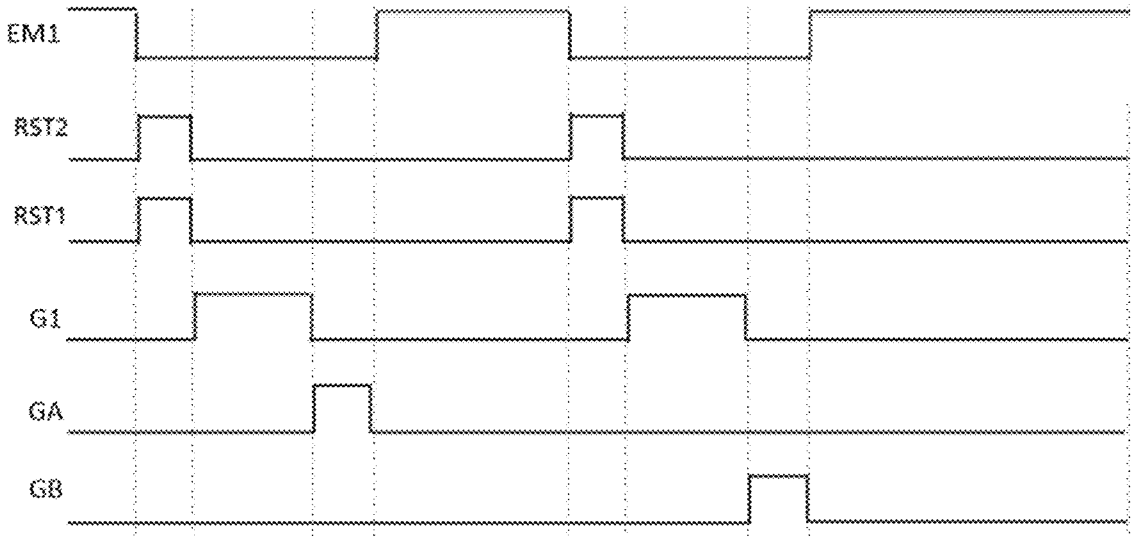
Figure 177:
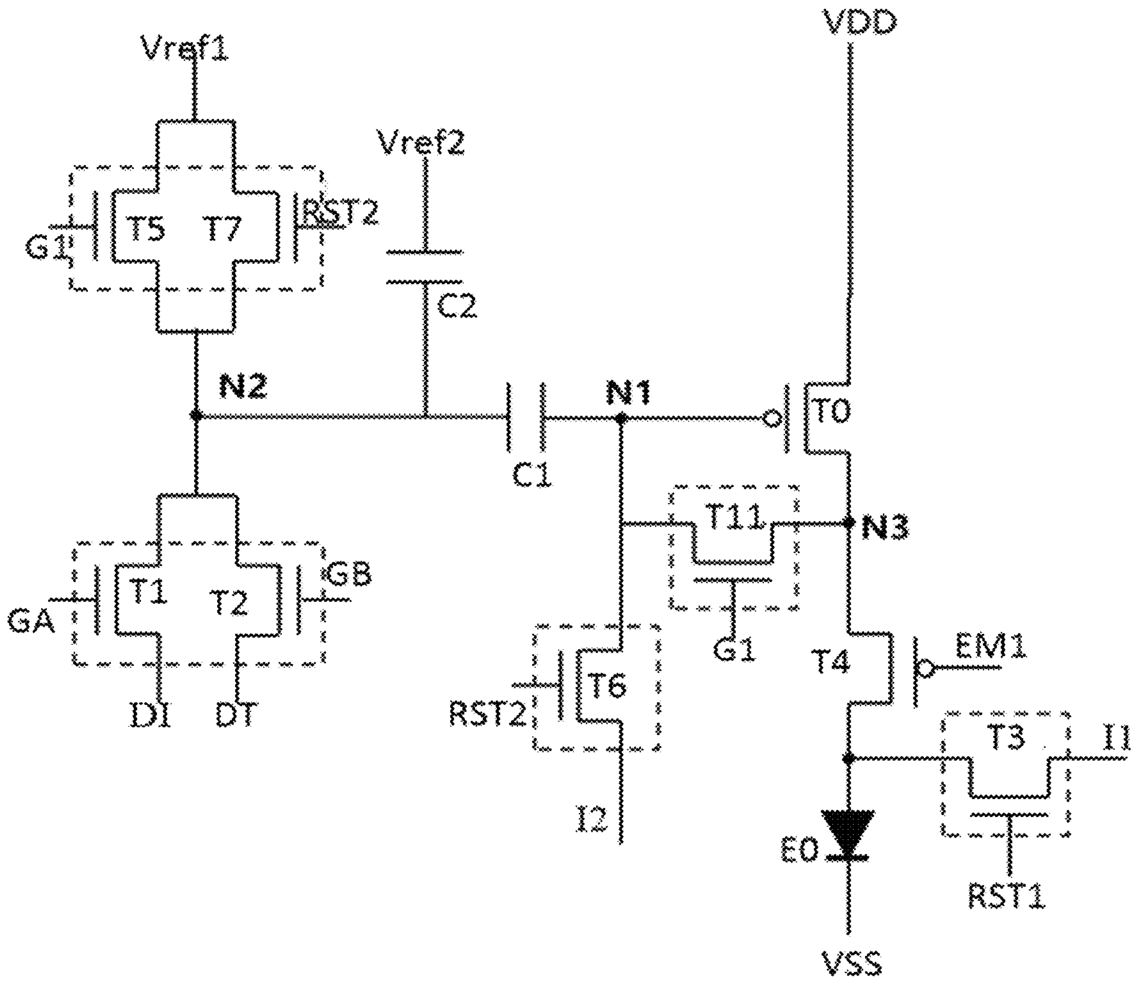
Figure 178:
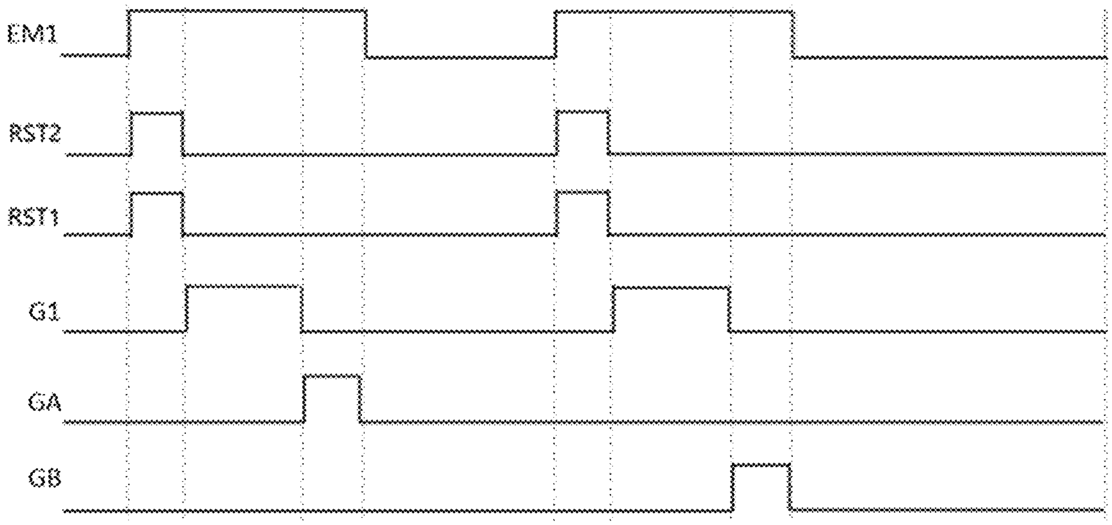
Figure 179:
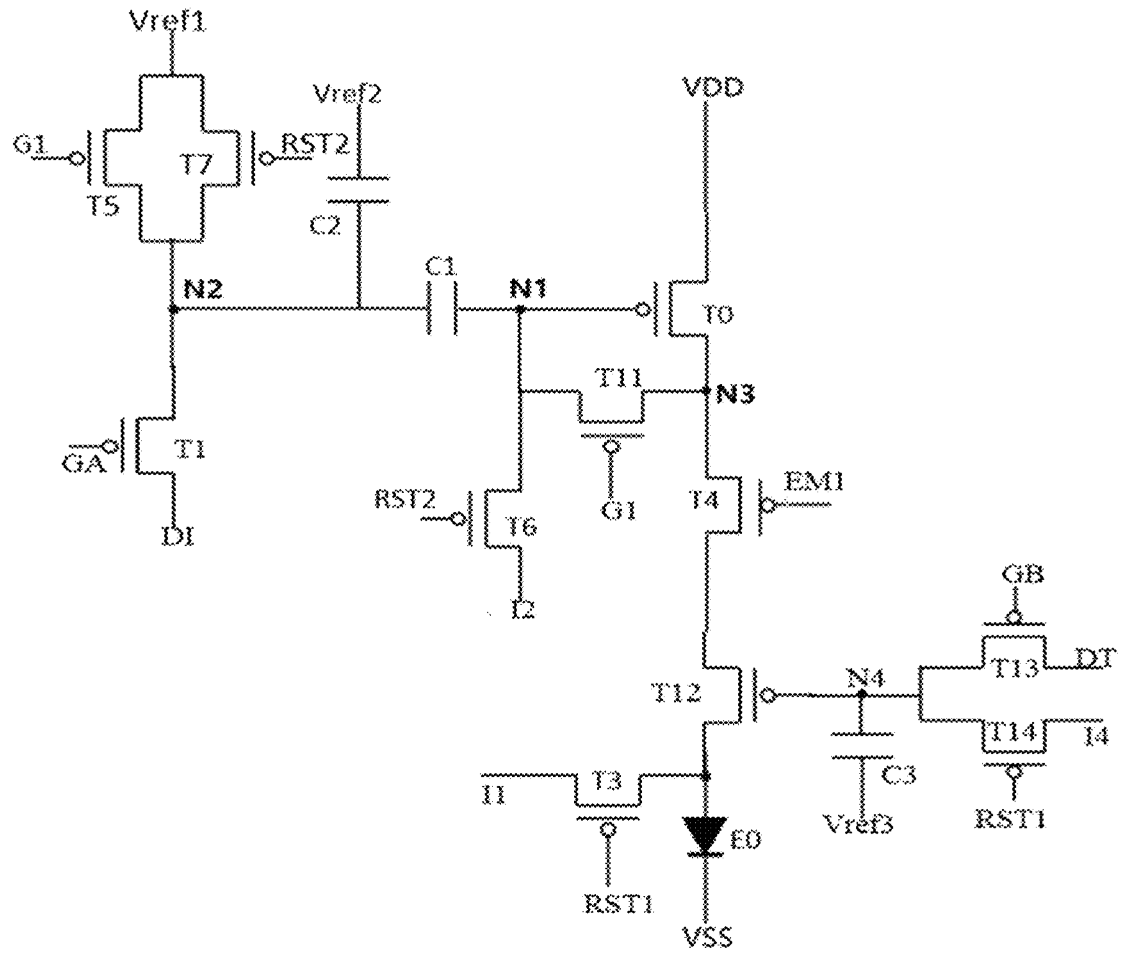
Figure 180:
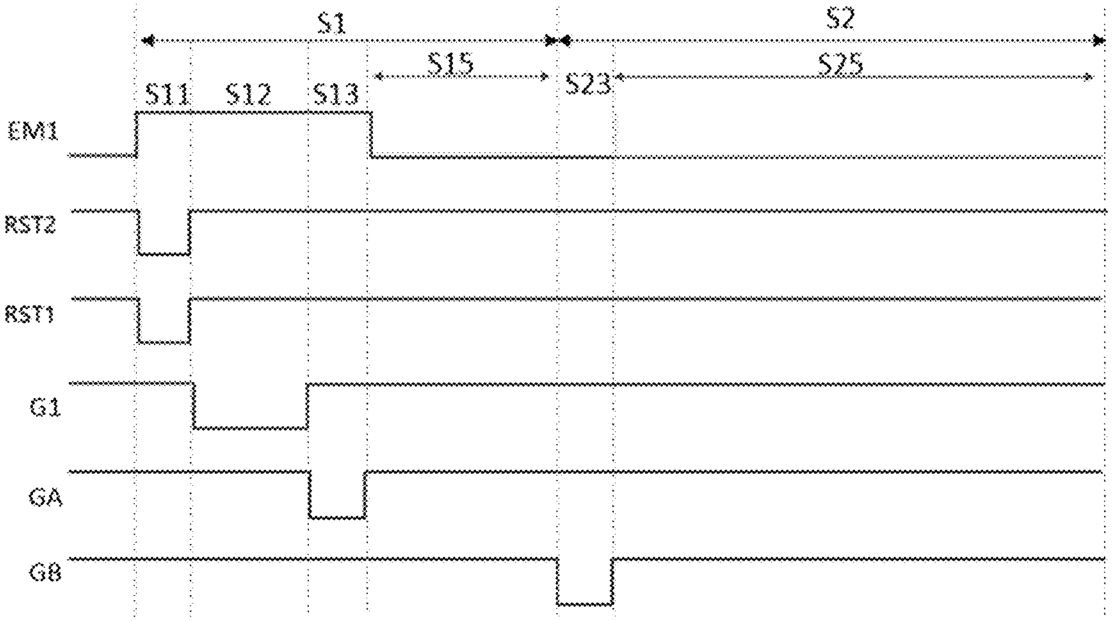
Figure 181:
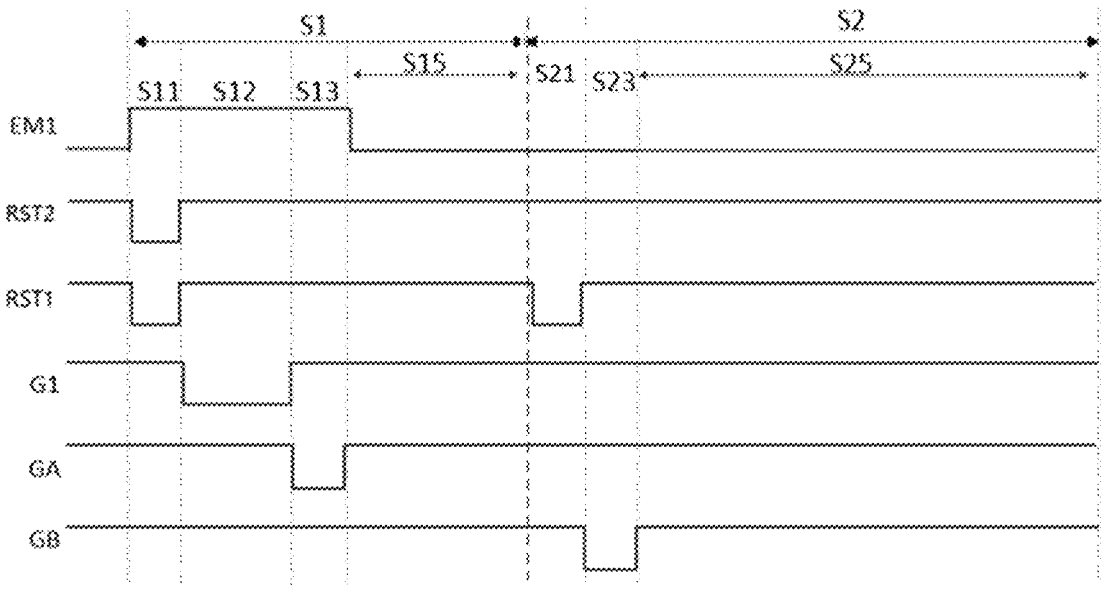
Figure 182:
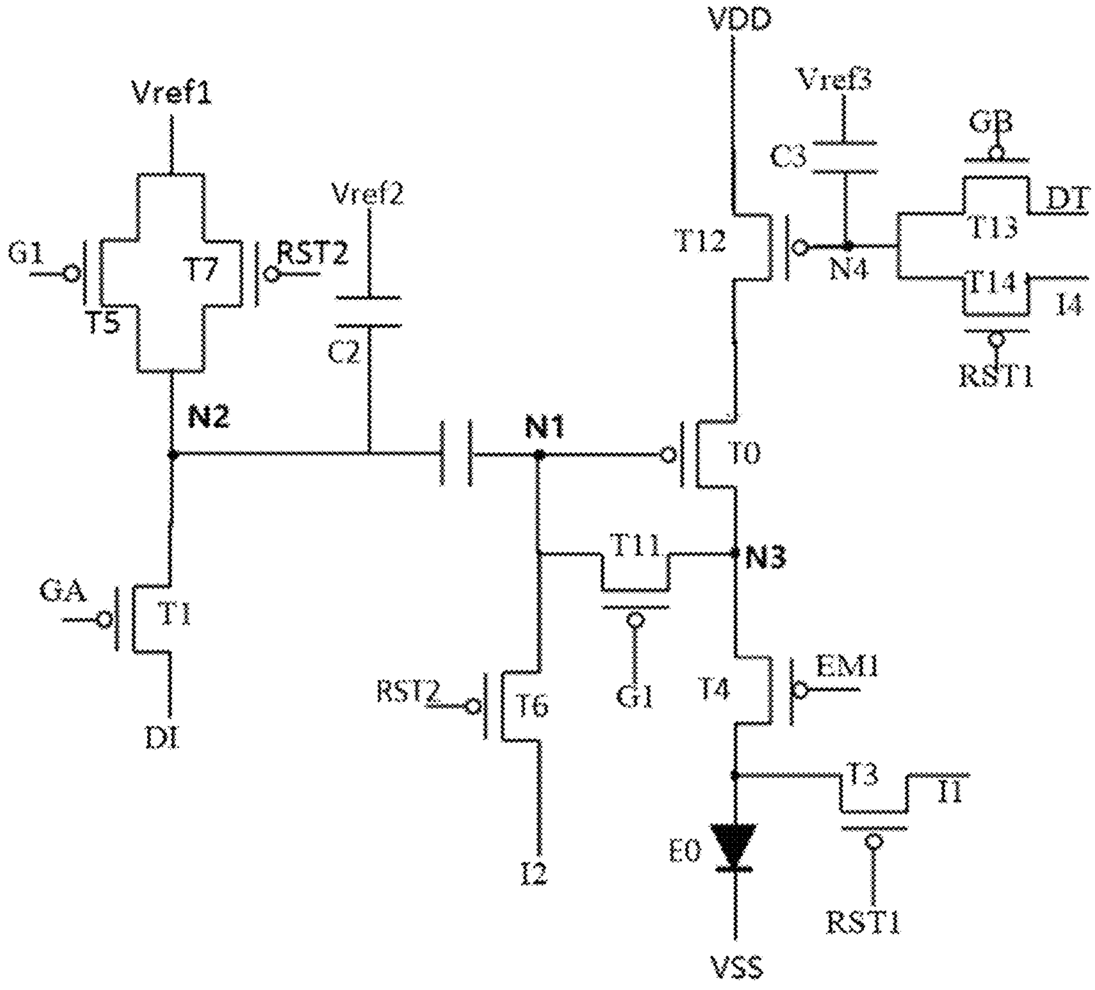
Figure 183:
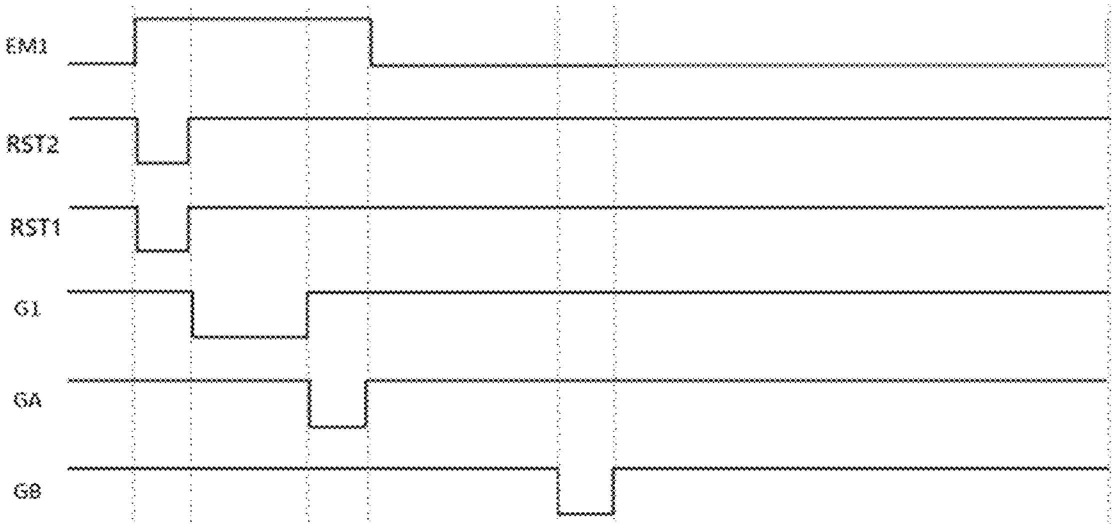
Figure 184:
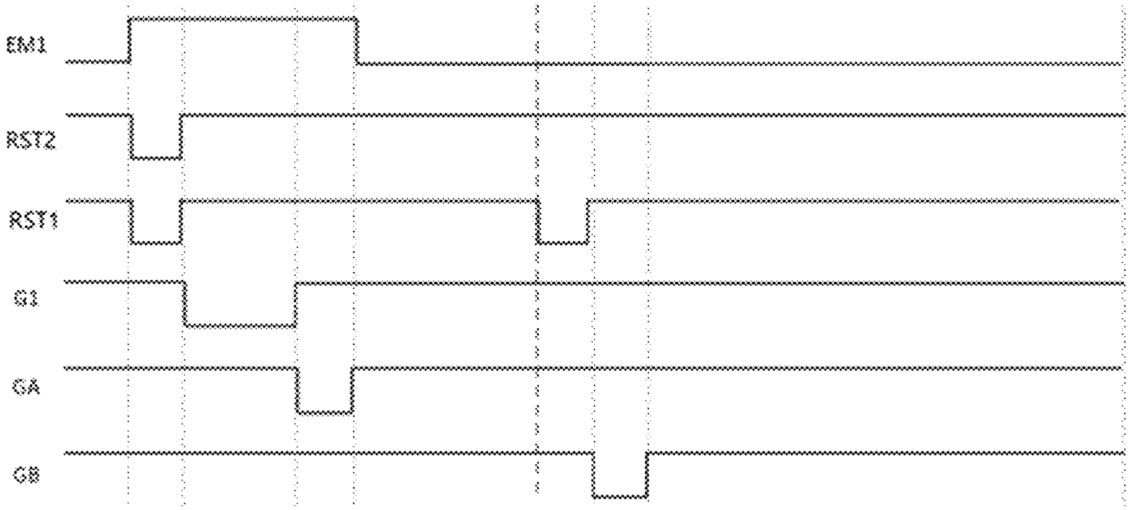
Figure 185:
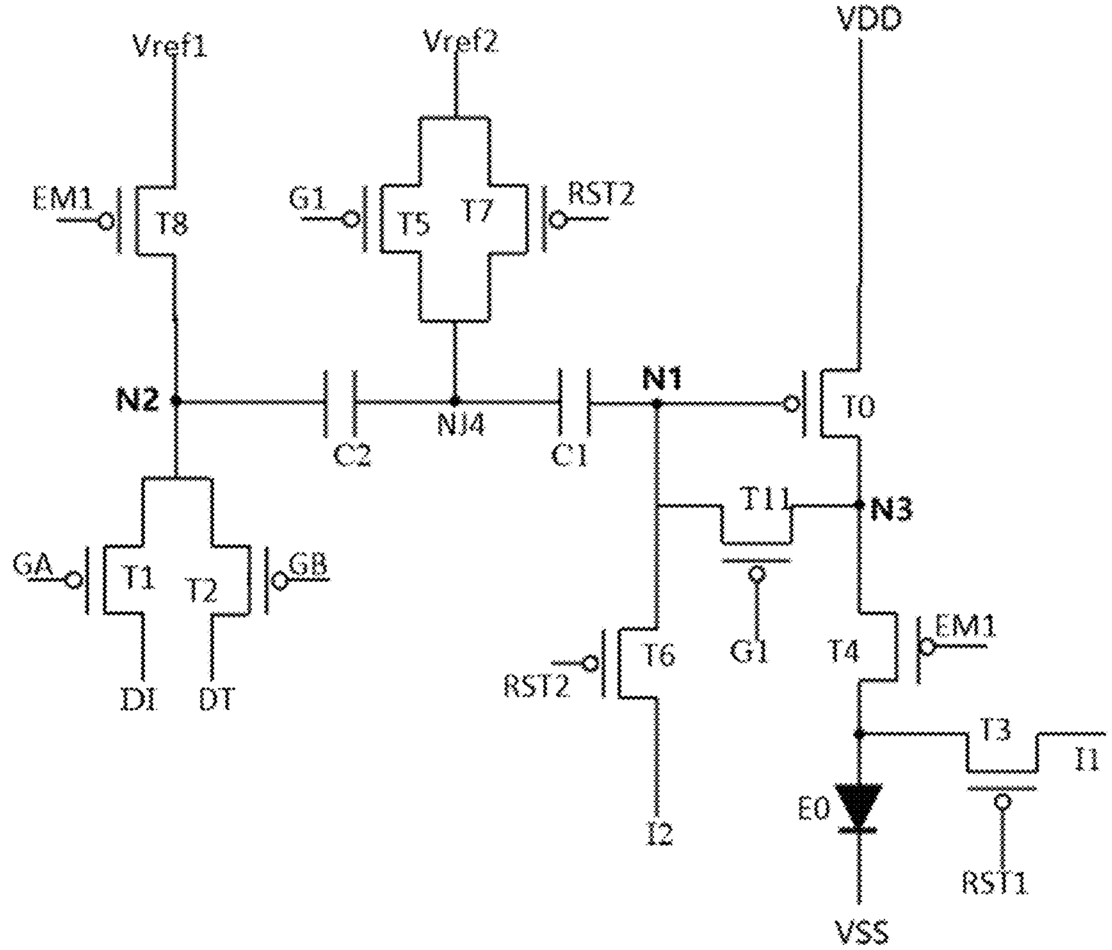
Figure 186:
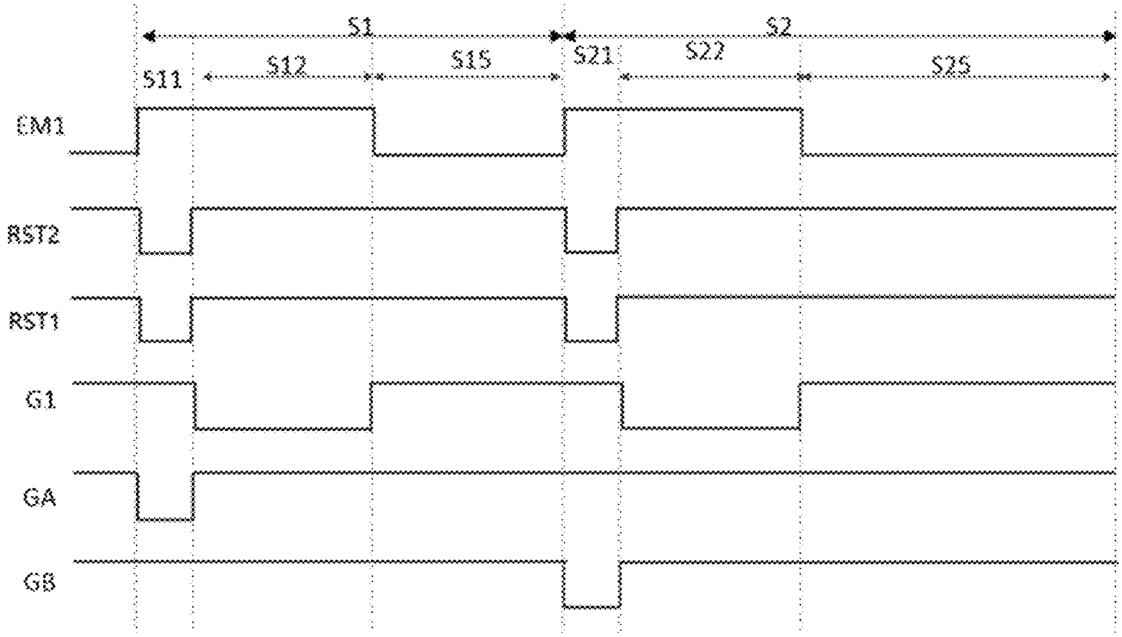
Figure 187A:
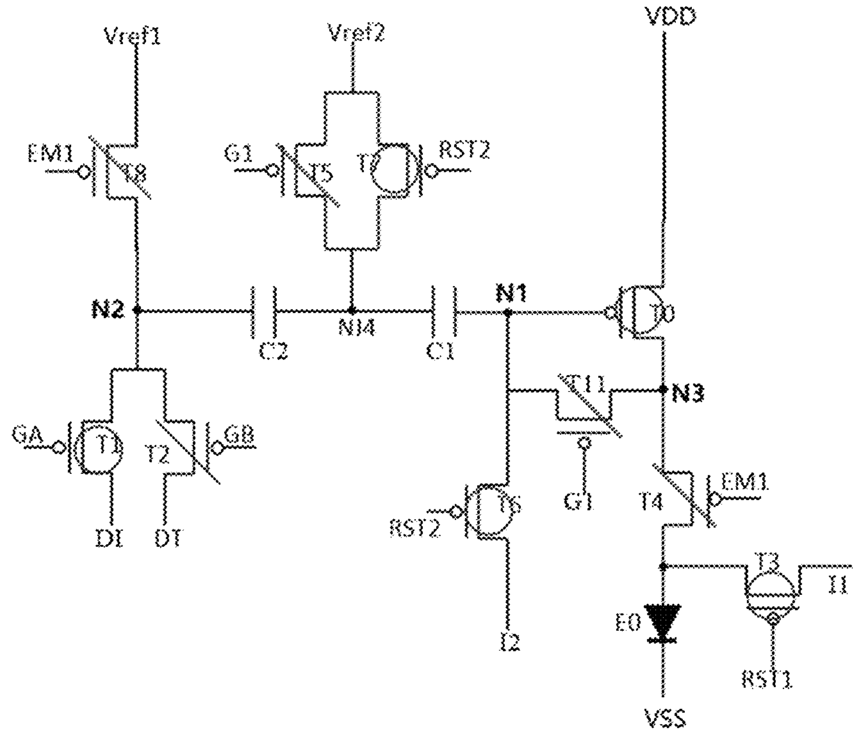
Figure 187B:
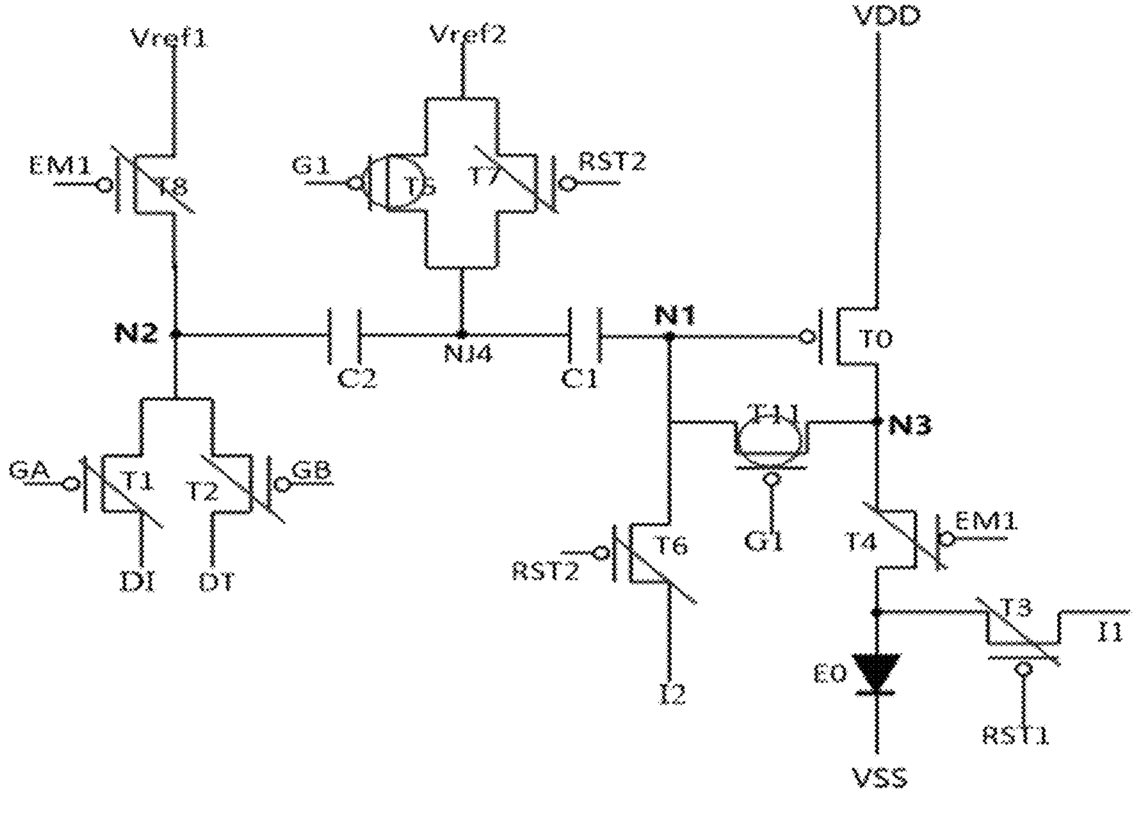
Figure 187C:
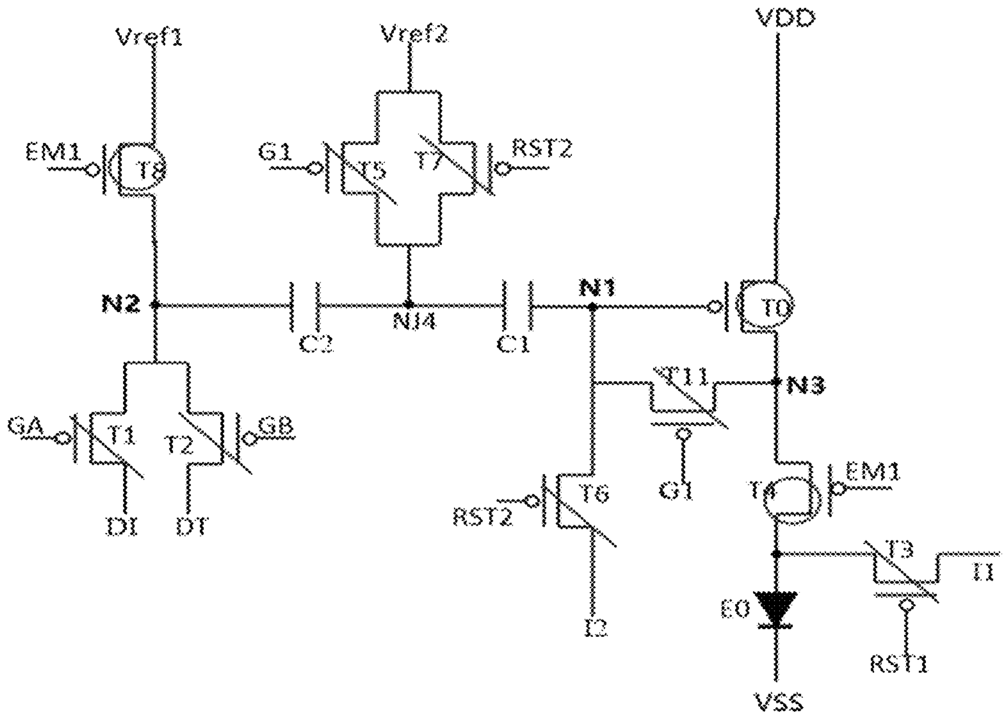
Figure 187D:
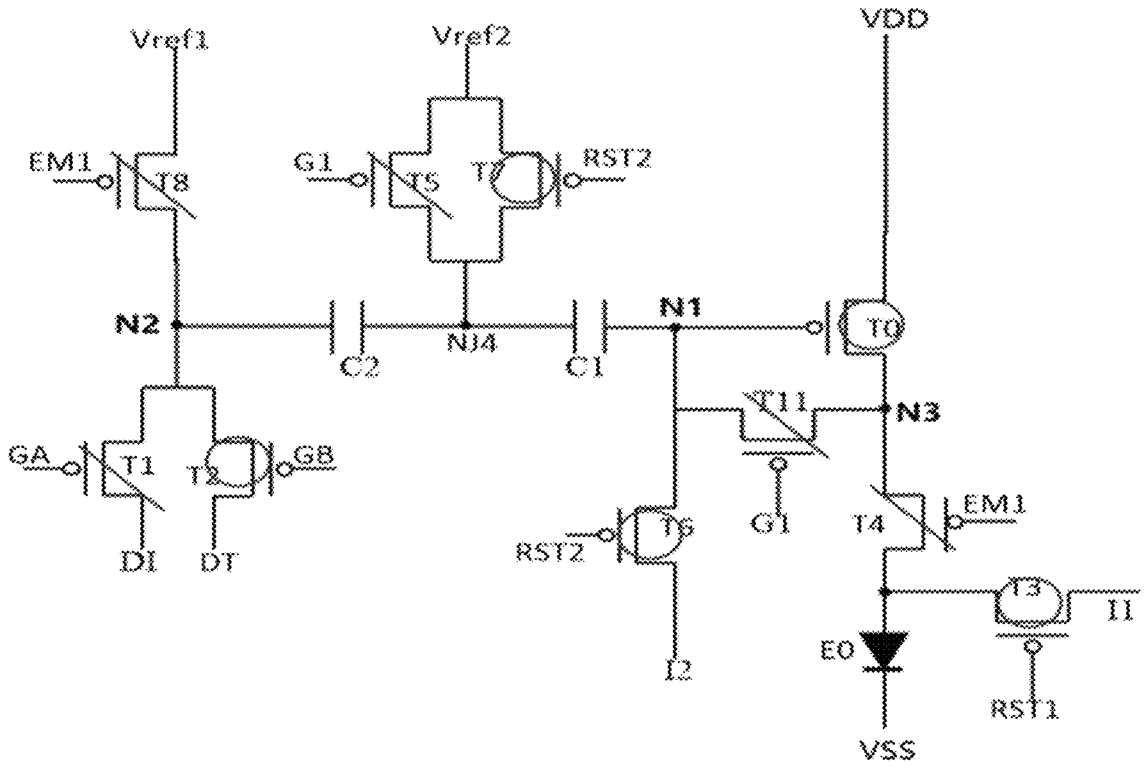
Figure 187E:
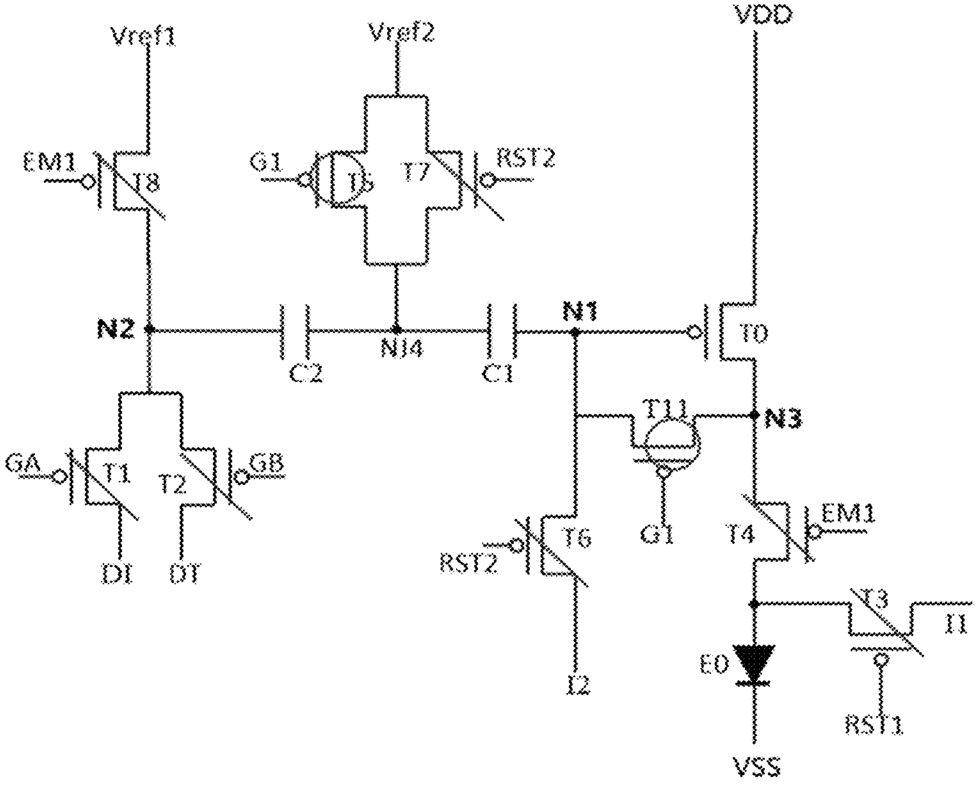
Figure 187F:
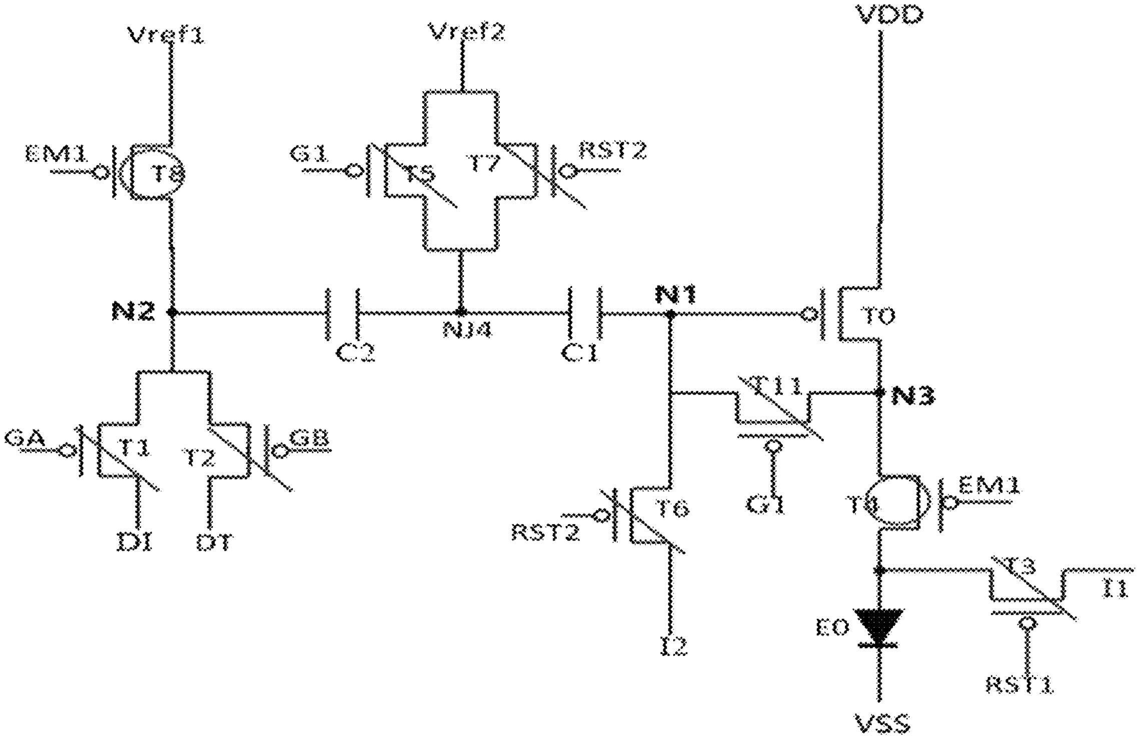
Figure 188A:
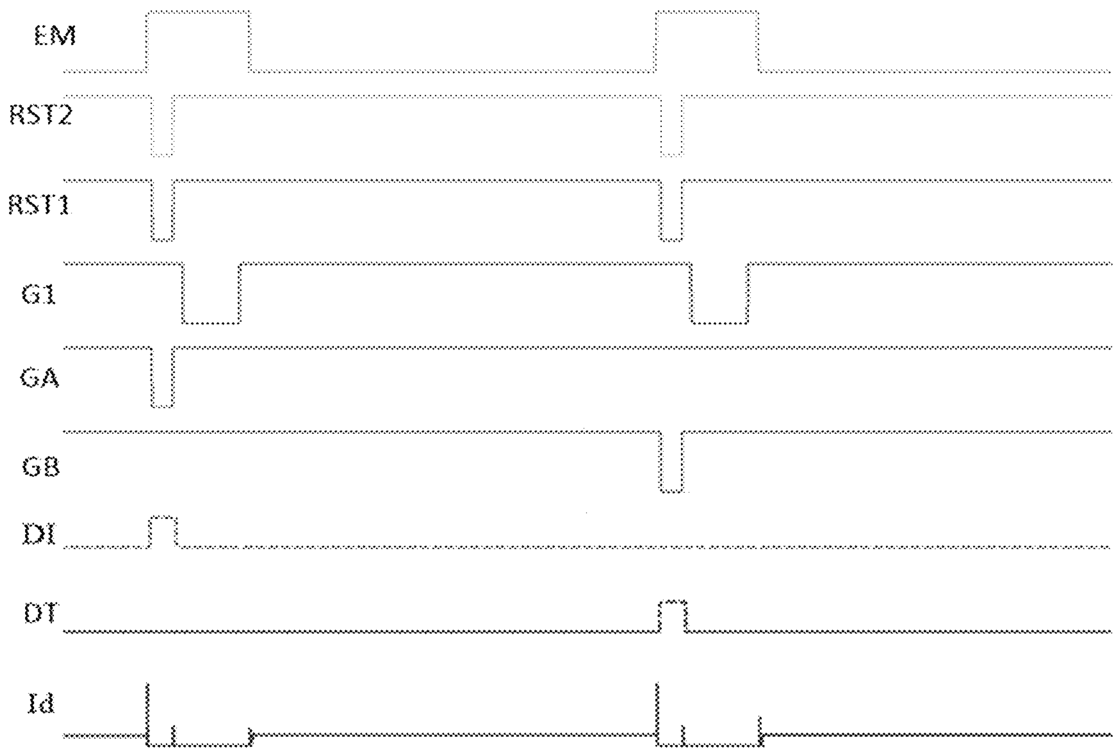
Figure 188B:
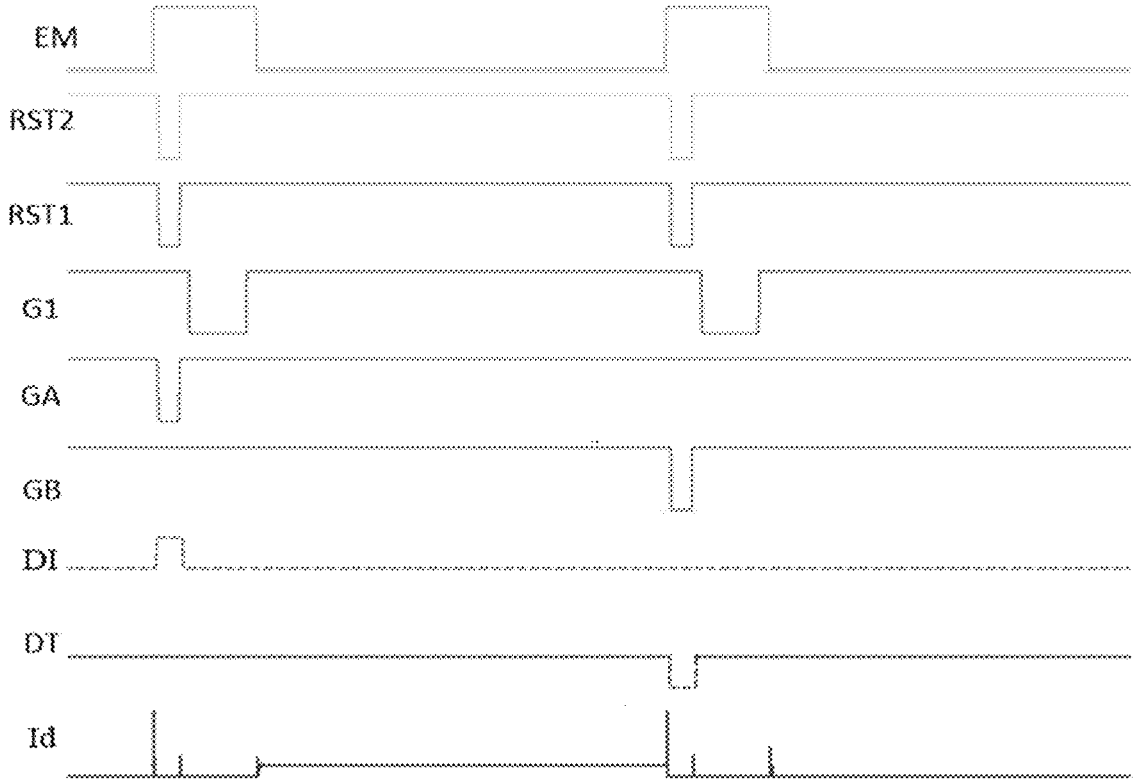
Figure 189:
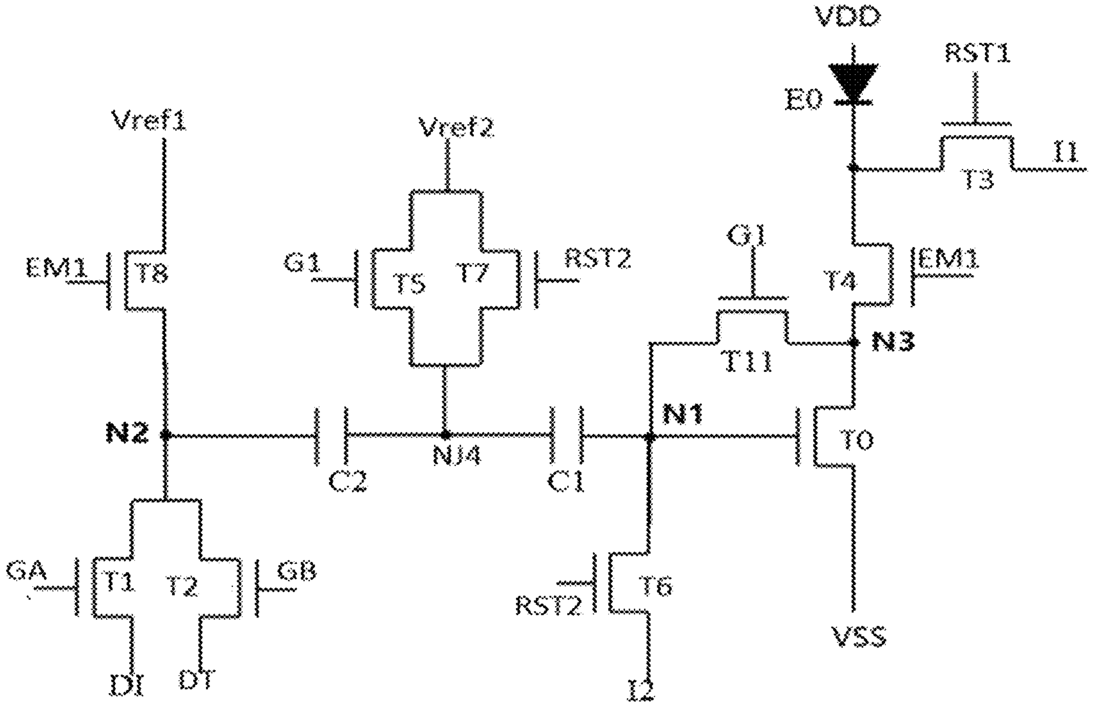
Figure 190:
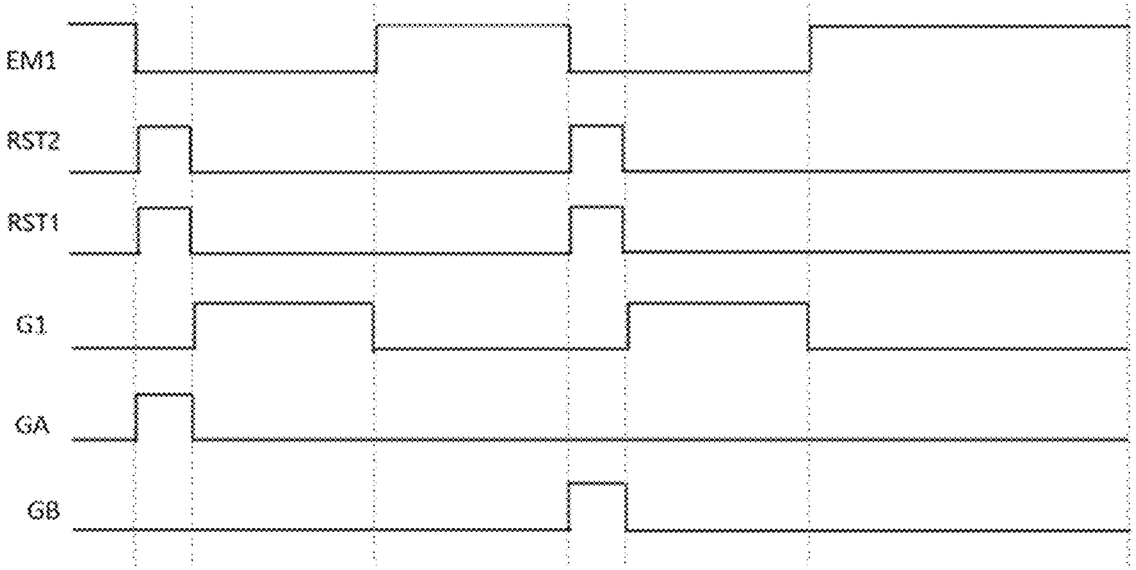
Figure 191:
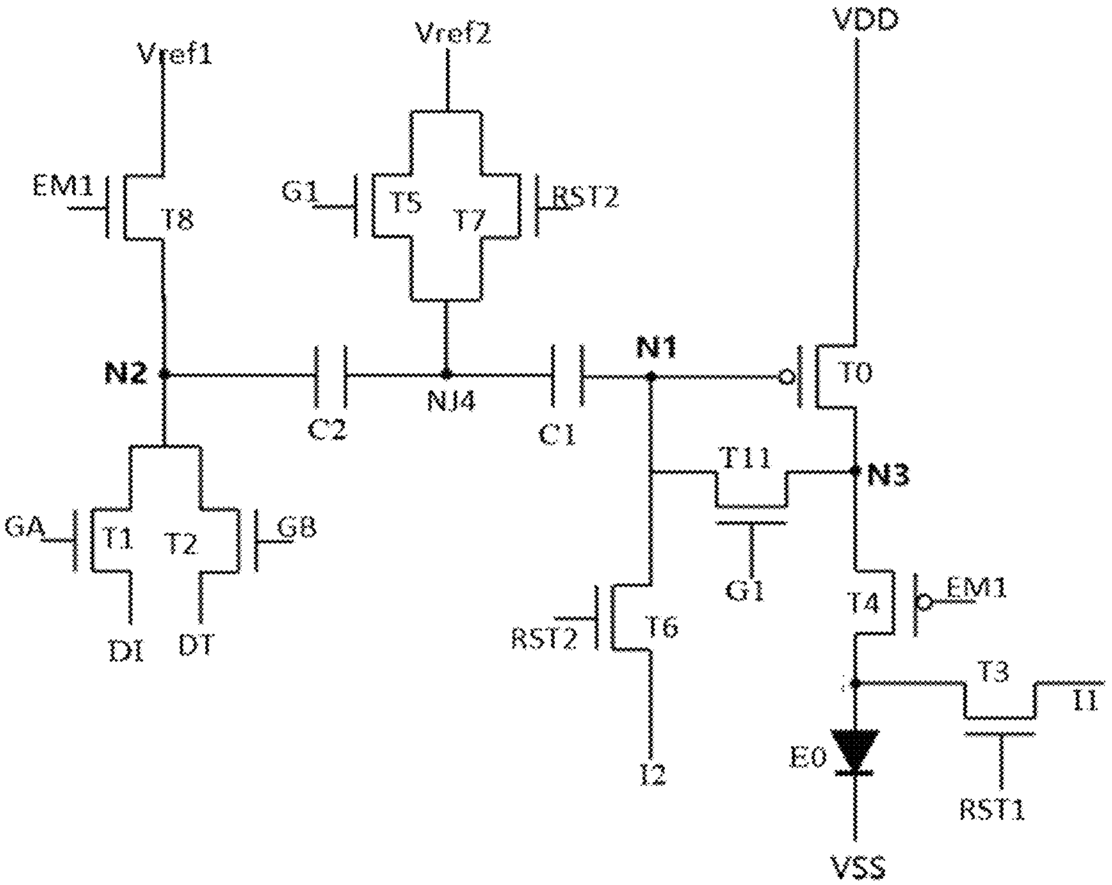
Figure 192:
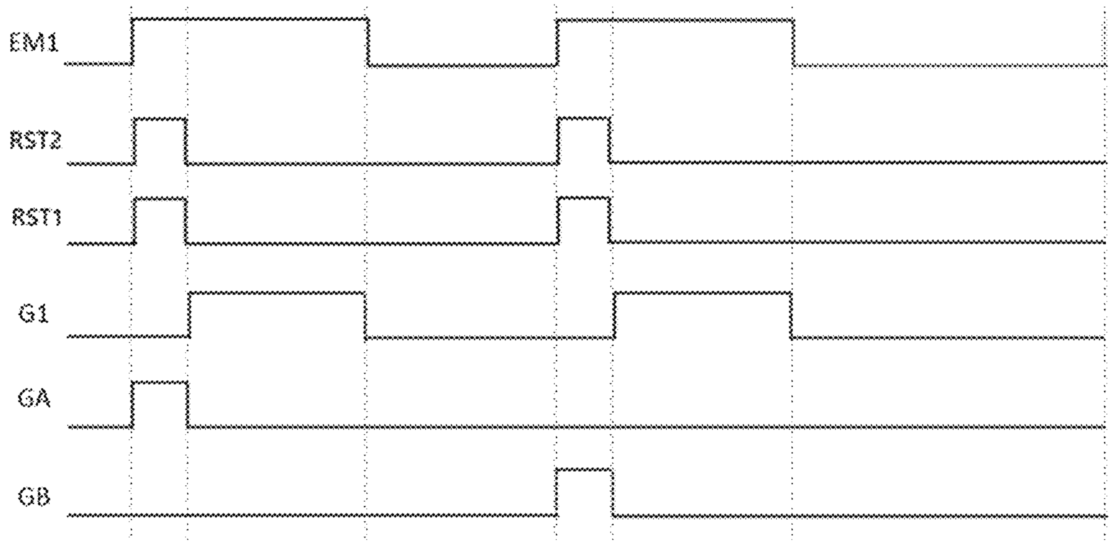
Figure 193:
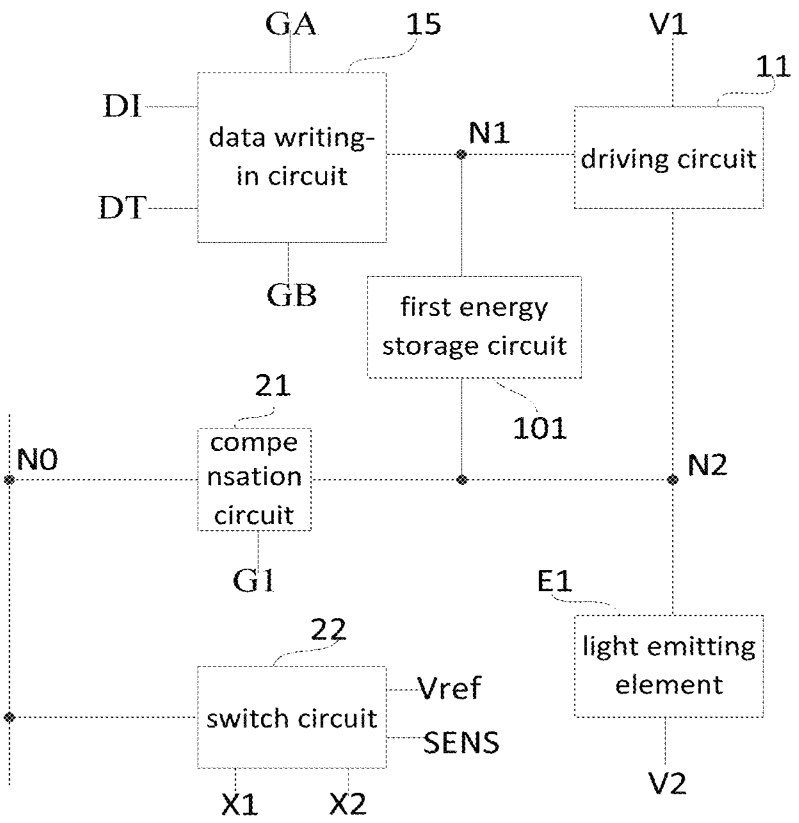
Figure 194:
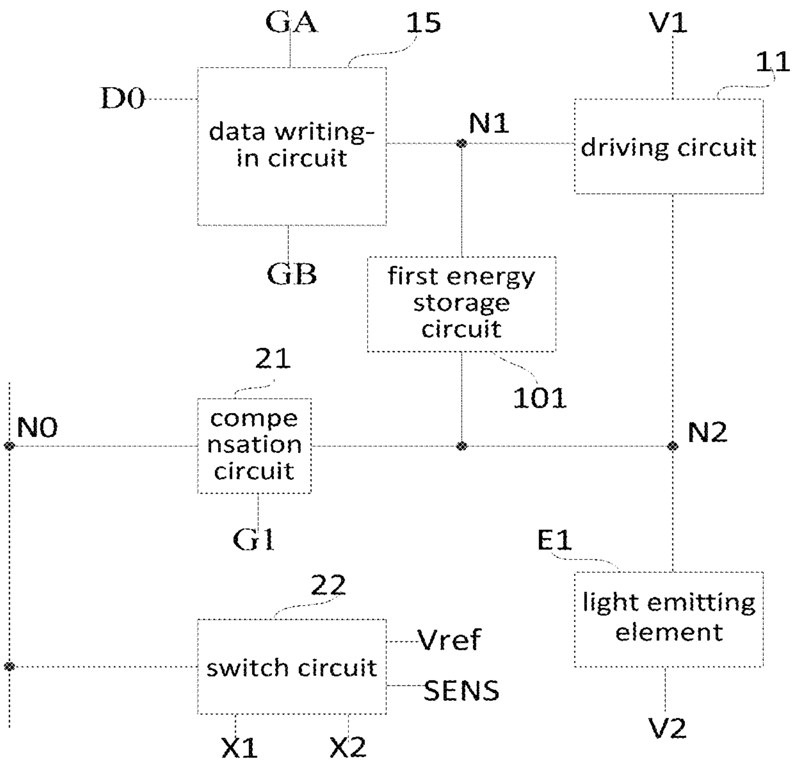
Figure 195:
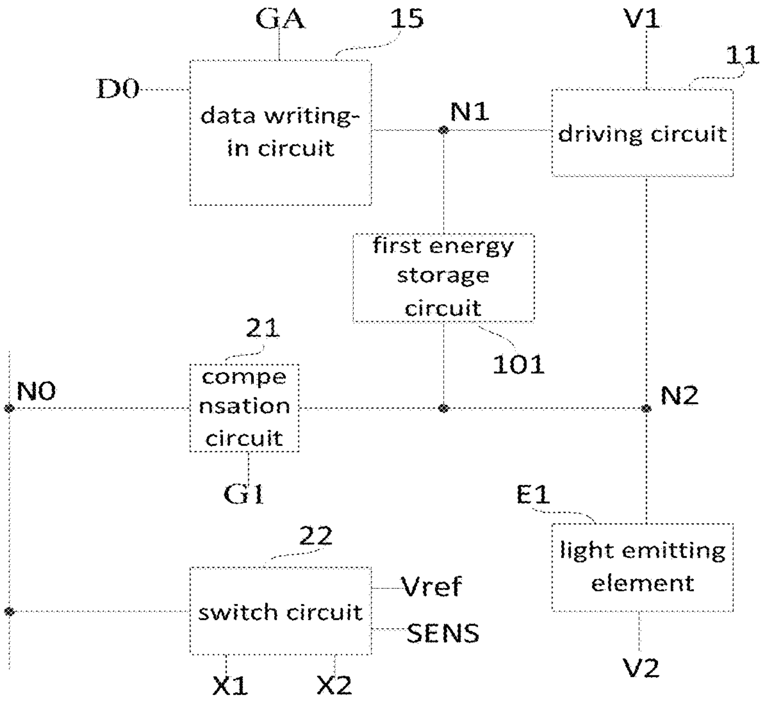
Figure 196:
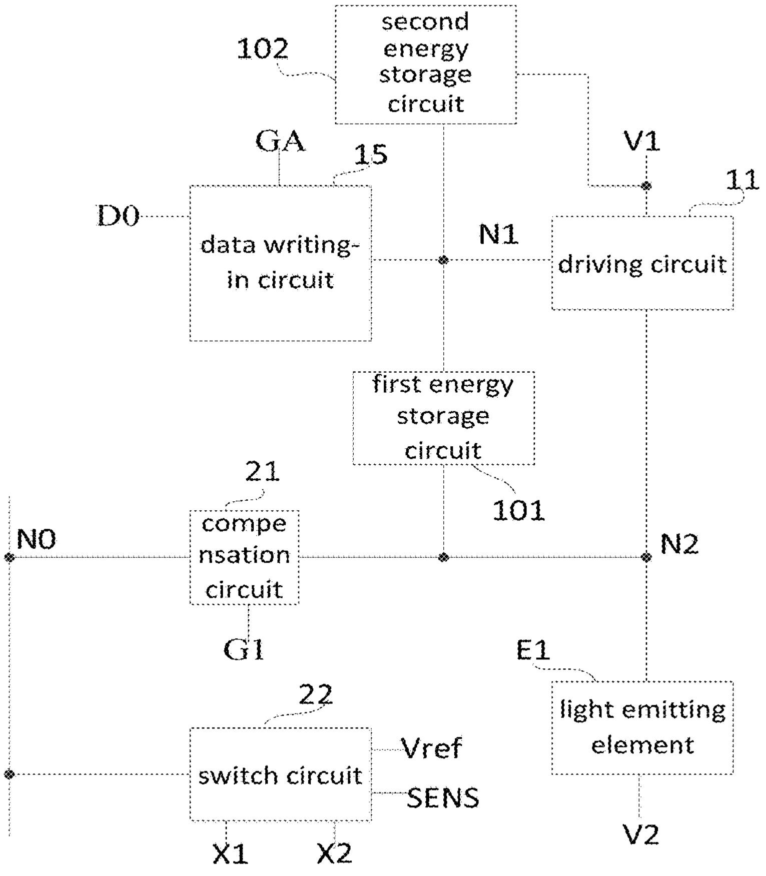
Figure 197:
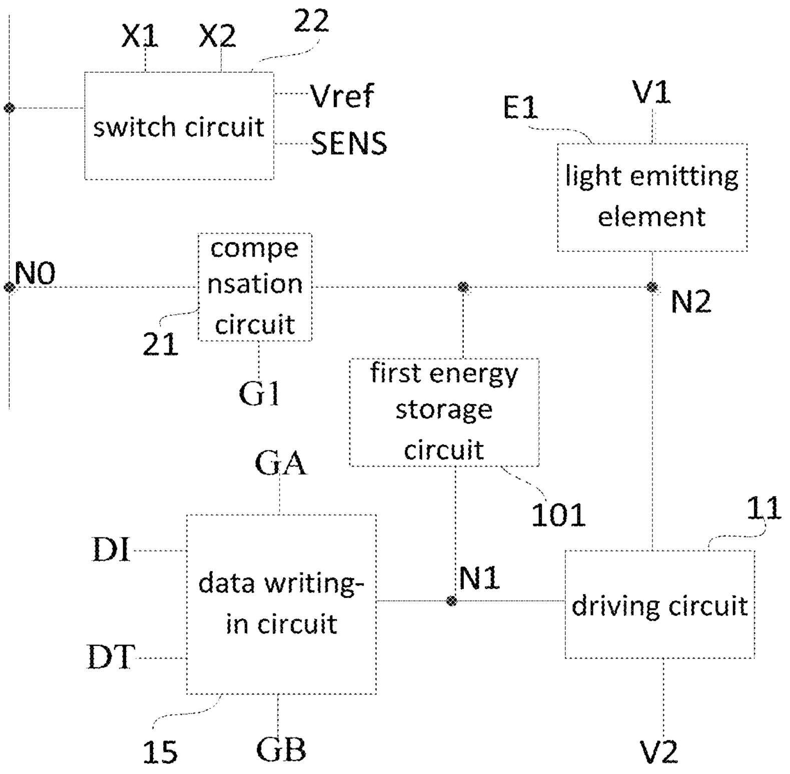
Figure 198:
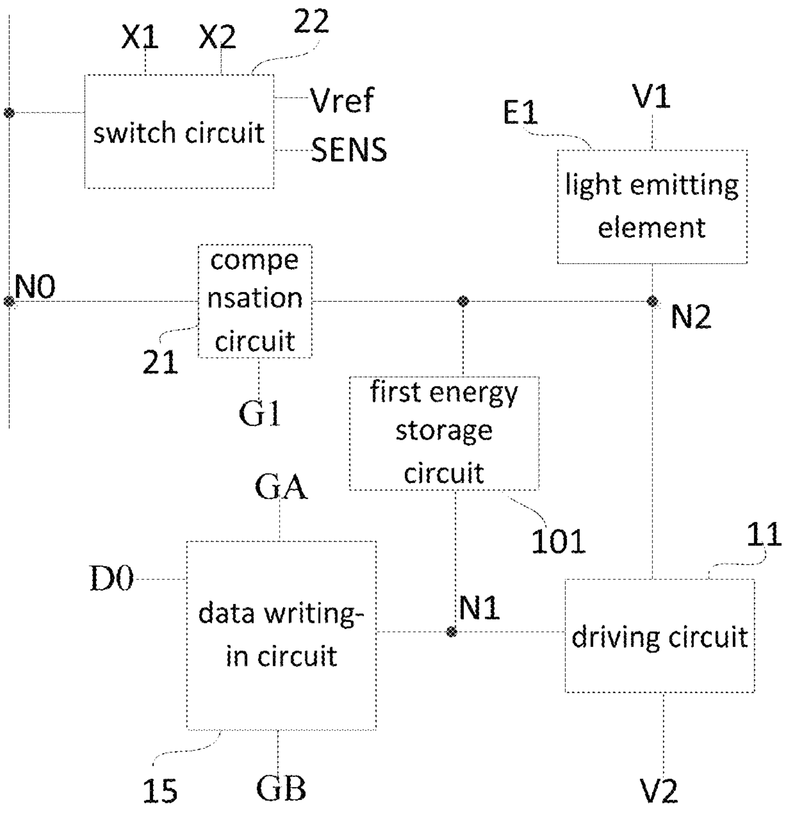
Figure 199:
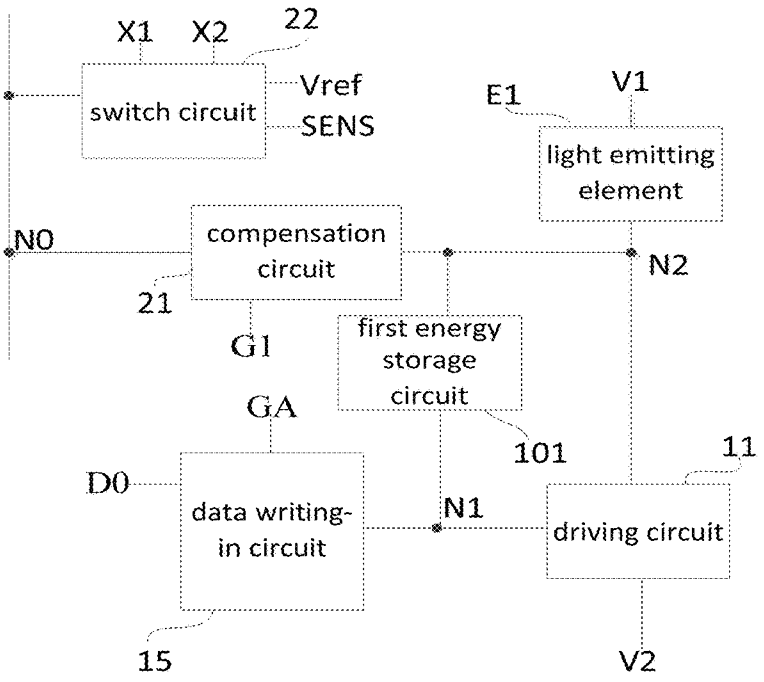
Figure 200:
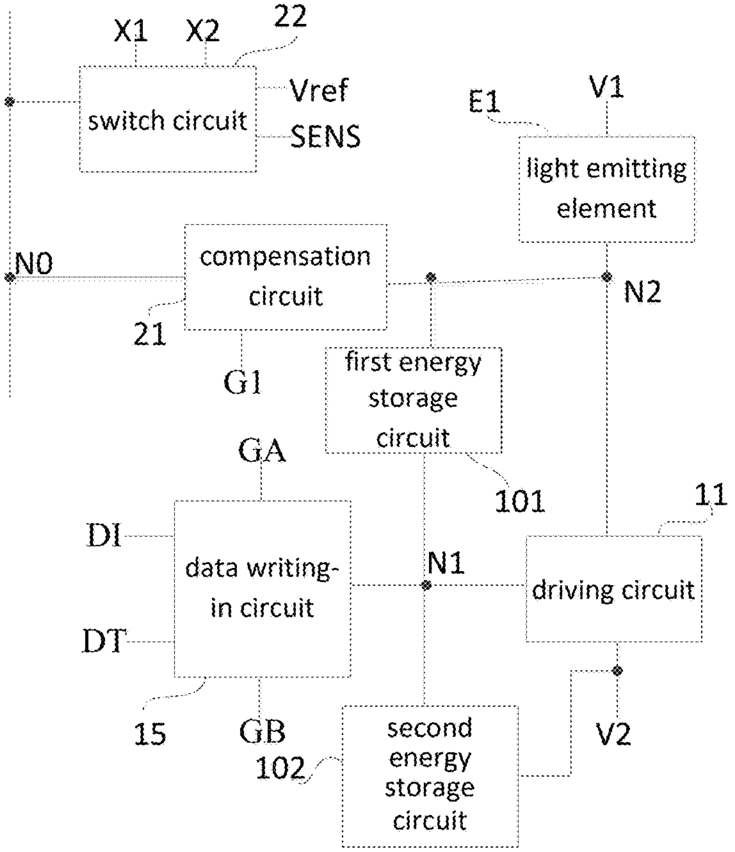
Figure 201:
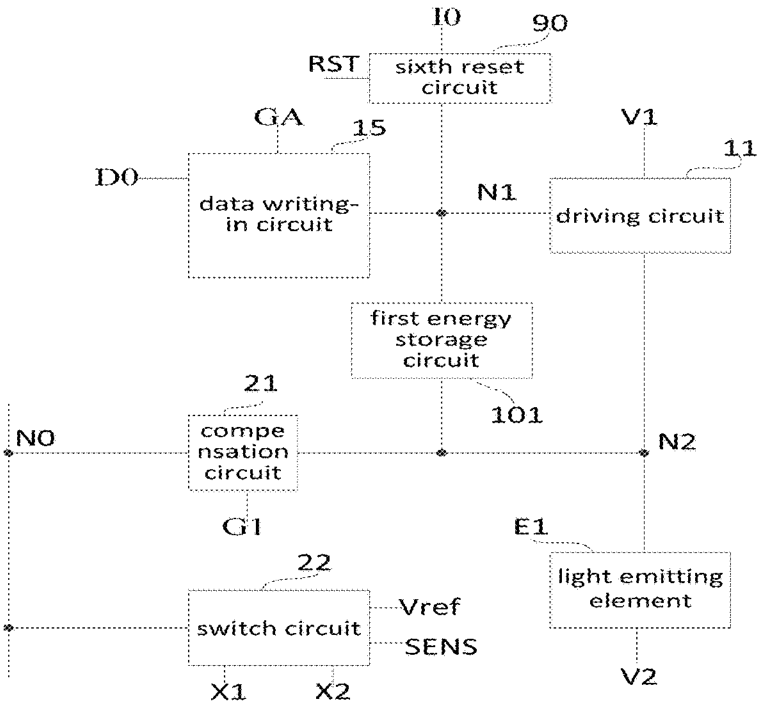
Figure 202:
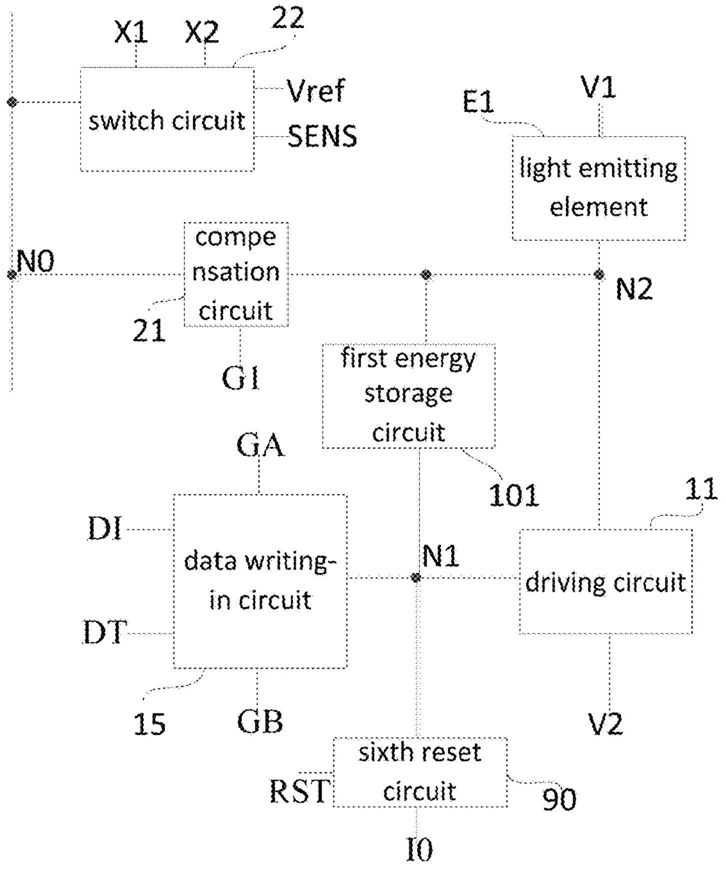
Figure 203:
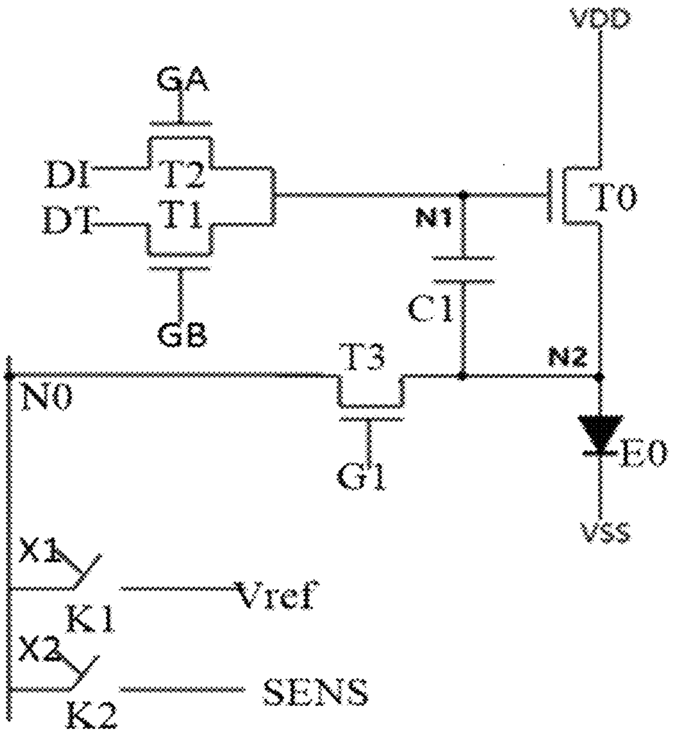
Figure 204:
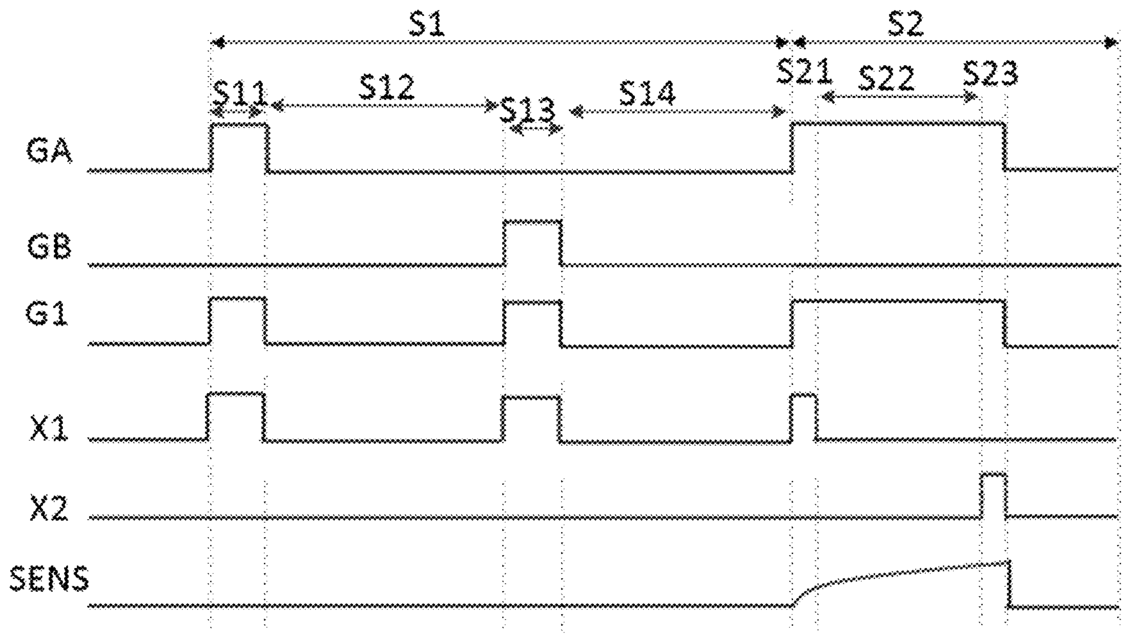
Figure 205A:
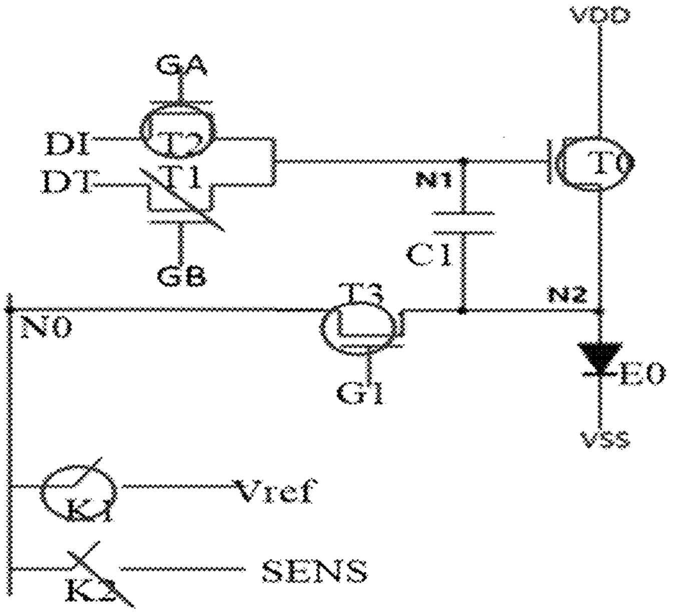
Figure 205B:
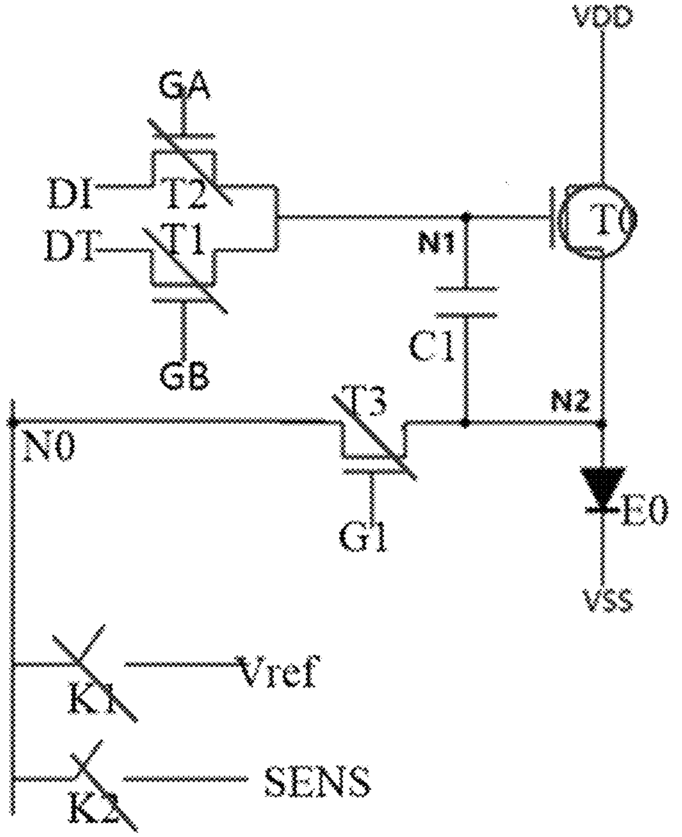
Figure 205C:
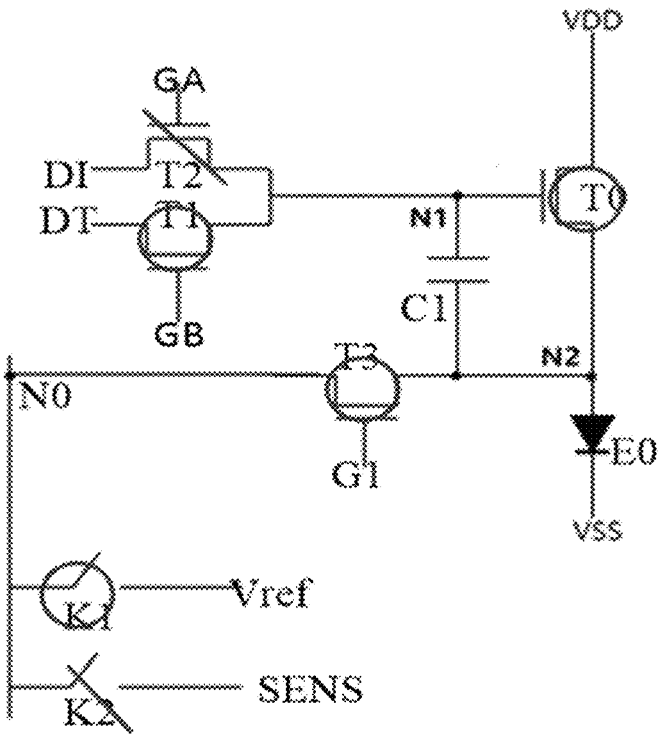
Figure 205D:
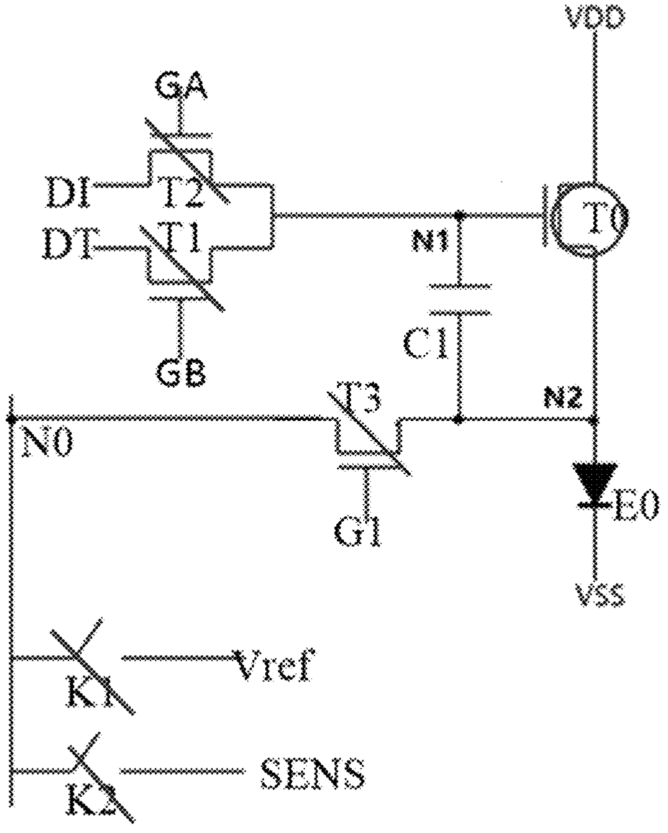
Figure 205E:
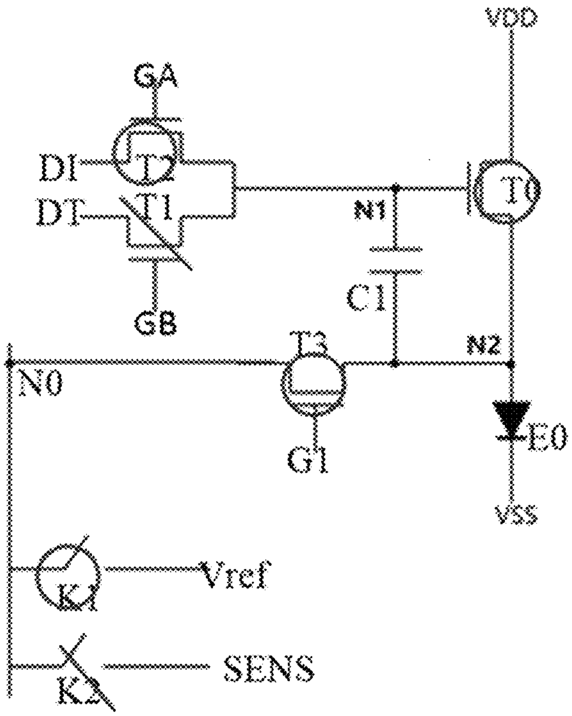
Figure 205F:
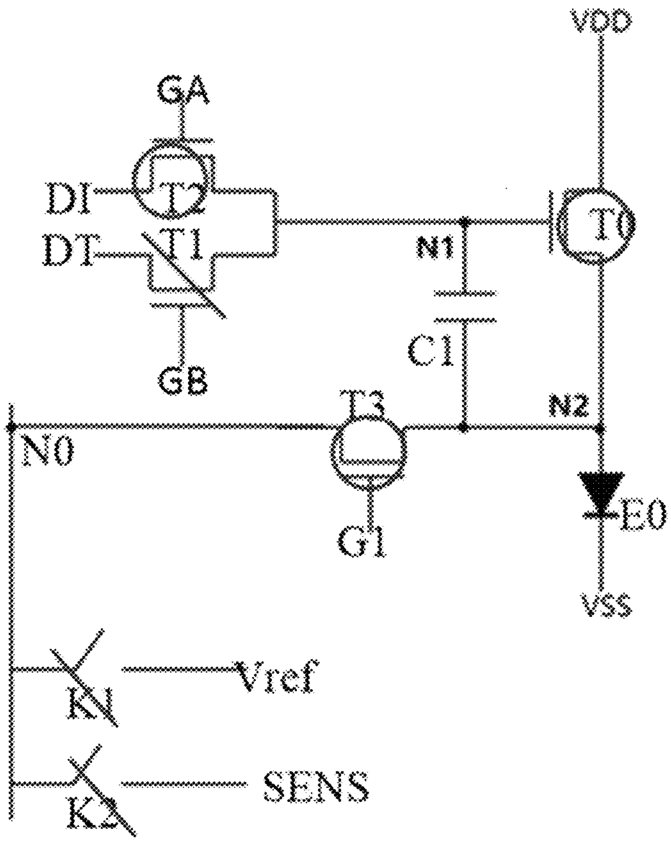
Figure 205G:
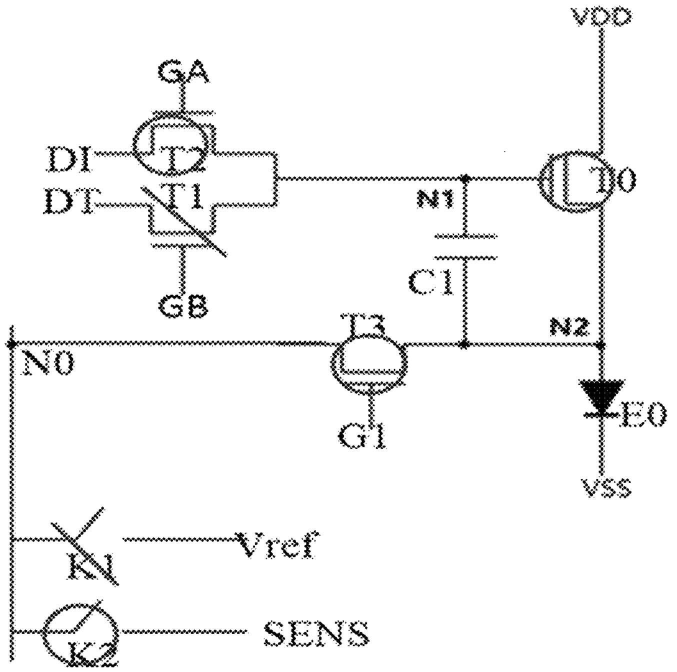
Figure 206A:
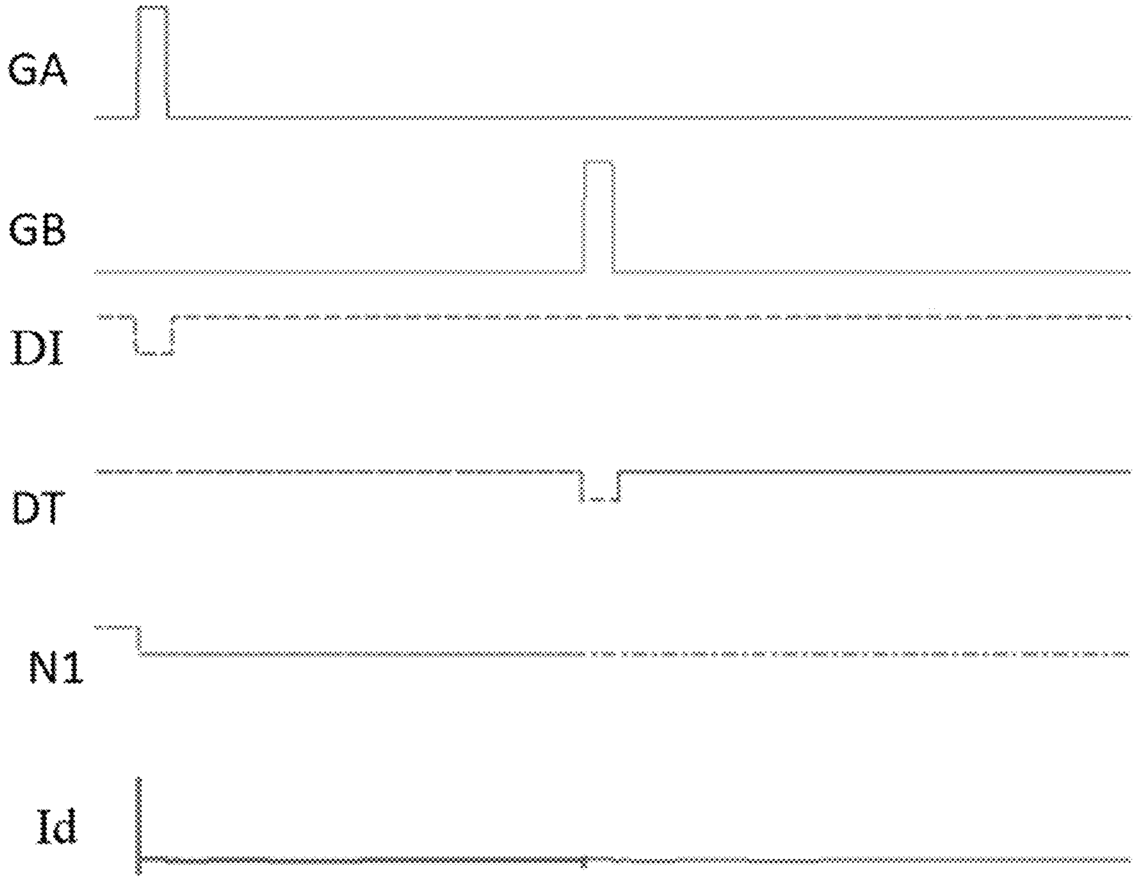
Figure 206B:
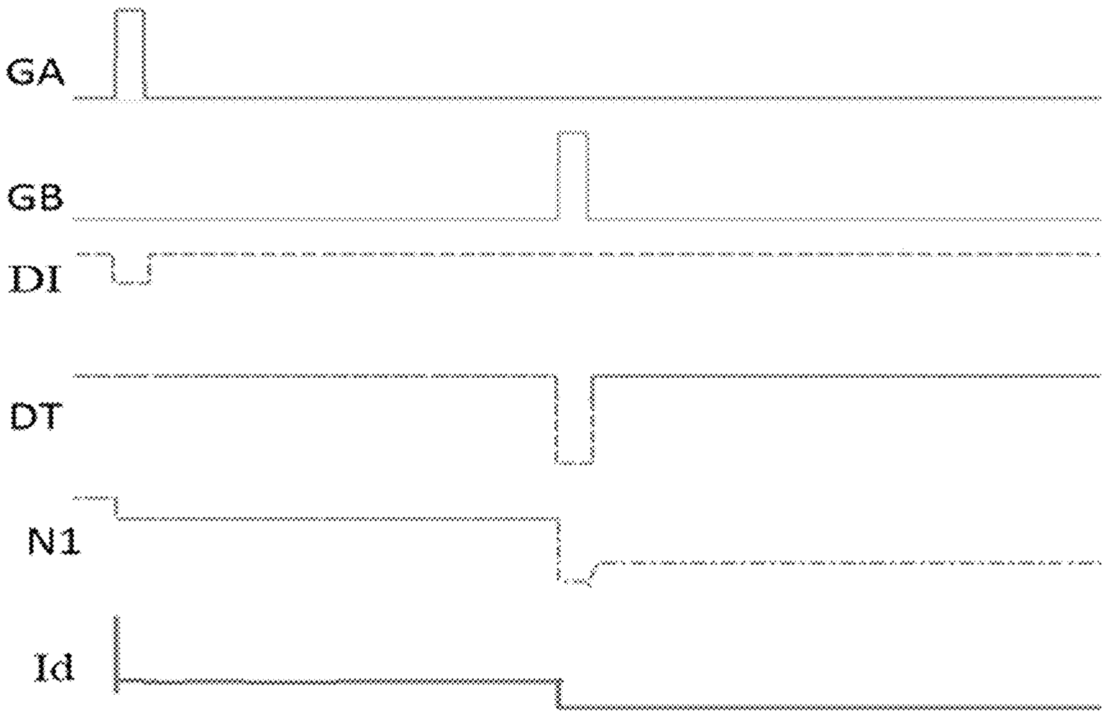
Figure 207:
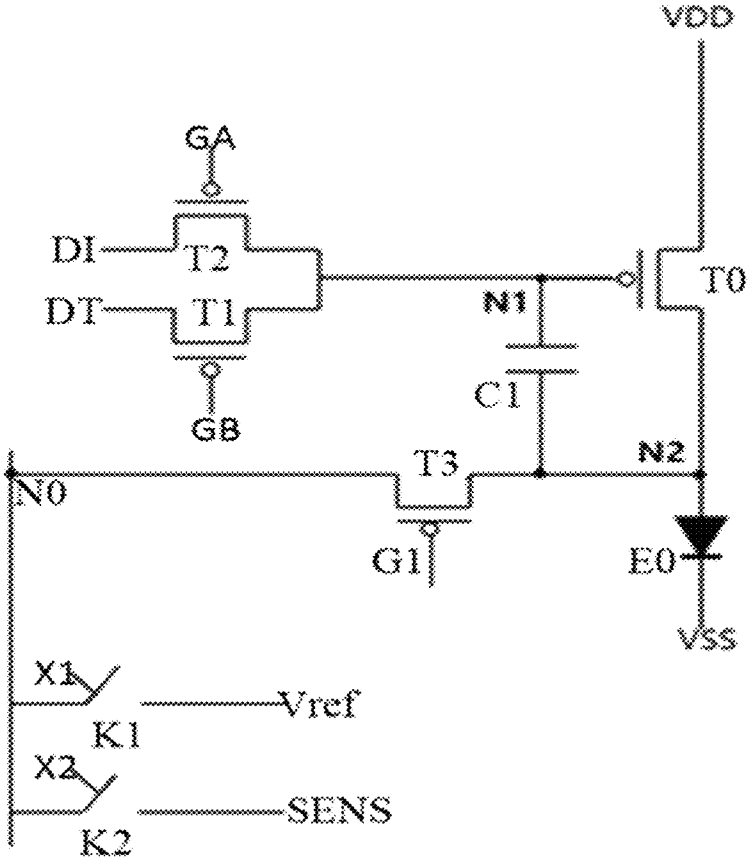
Figure 208:
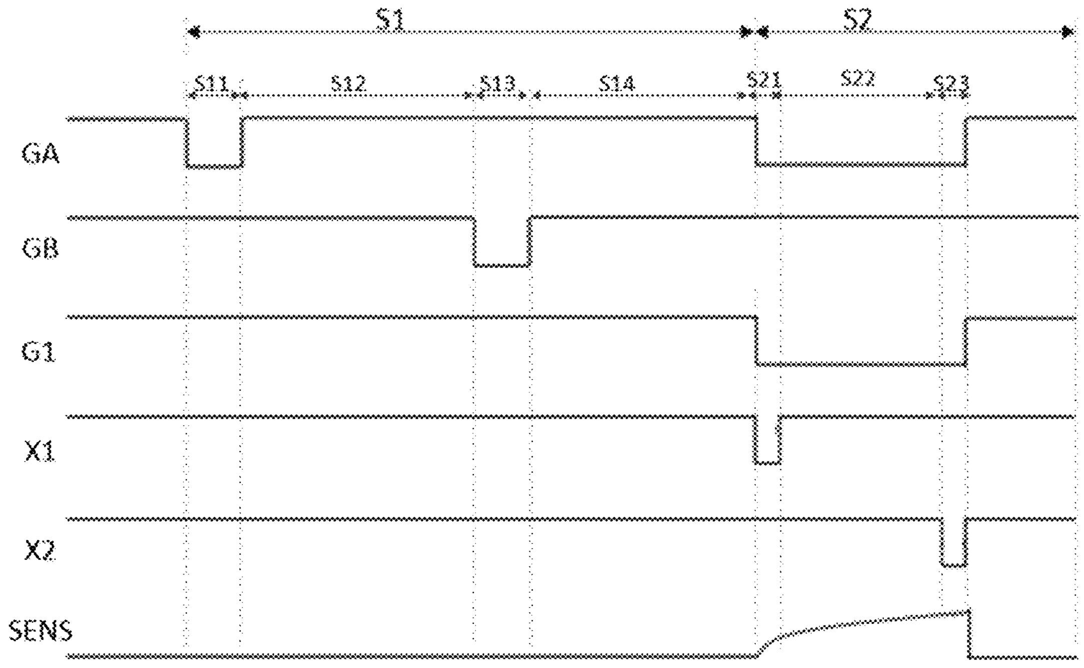
Figure 209A:
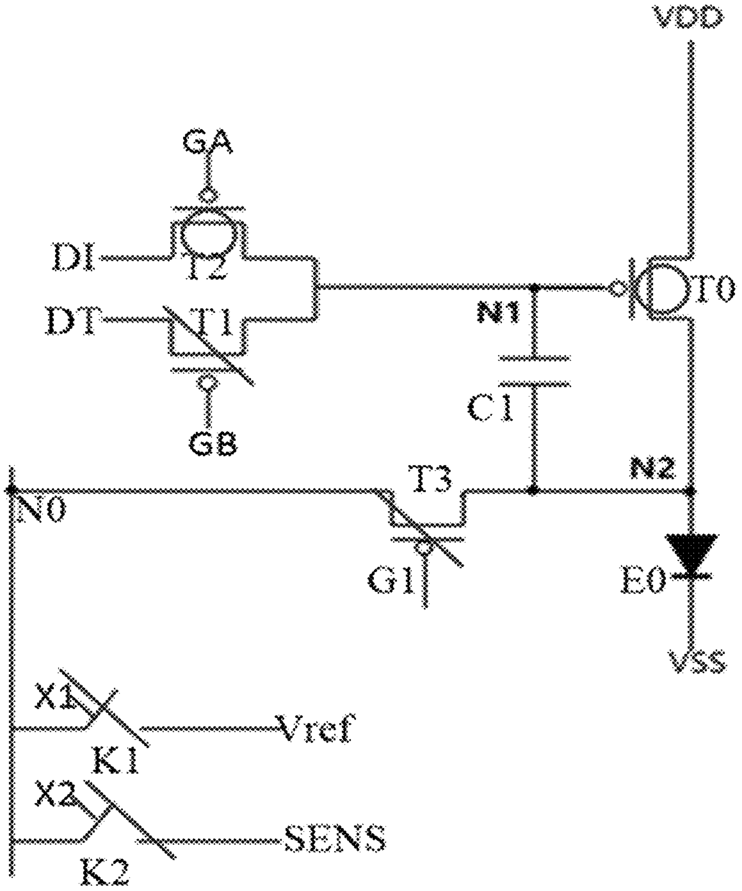
Figure 209B:
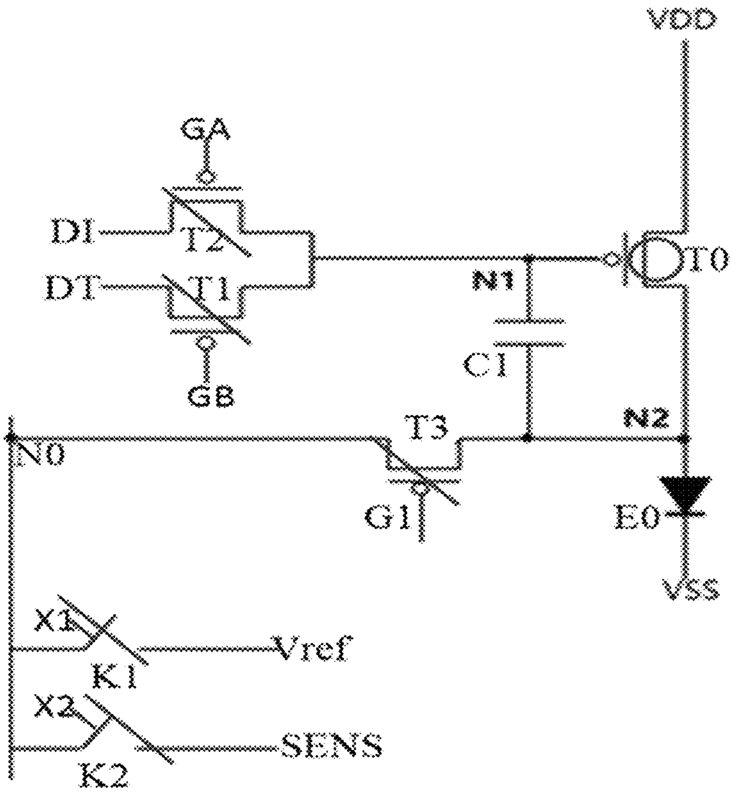
Figure 209C:
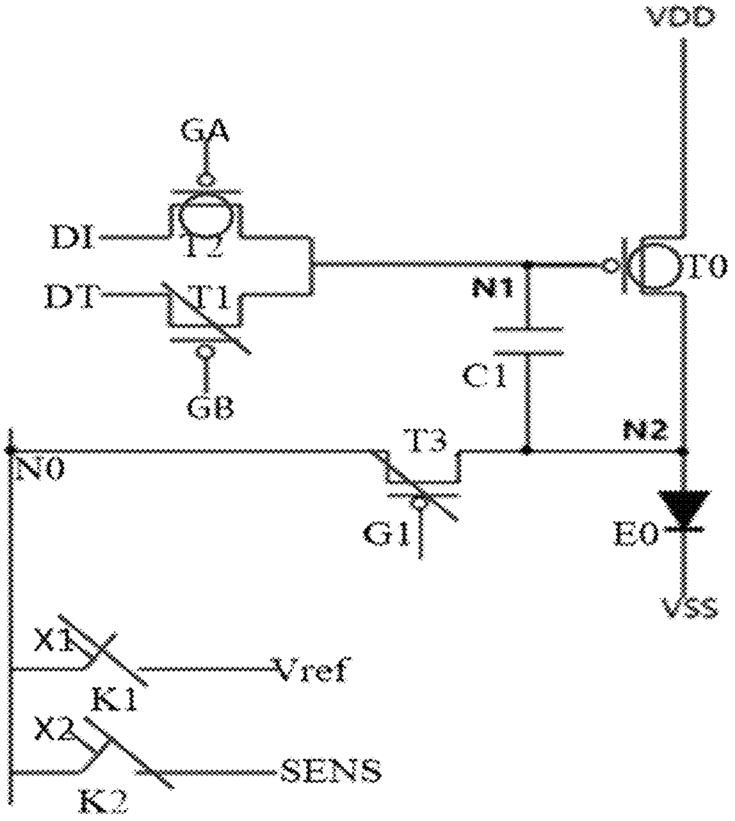
Figure 209D:
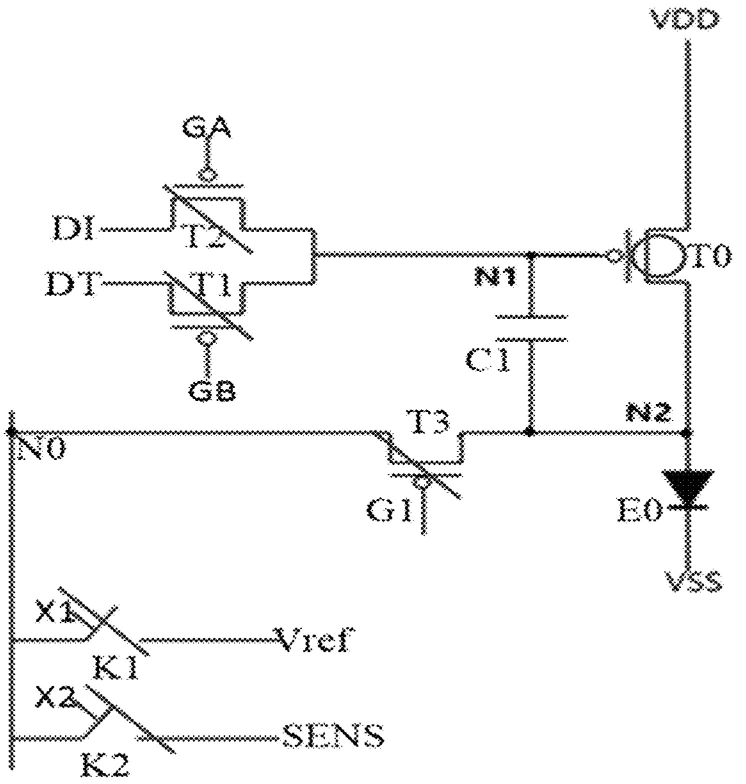
Figure 209E:
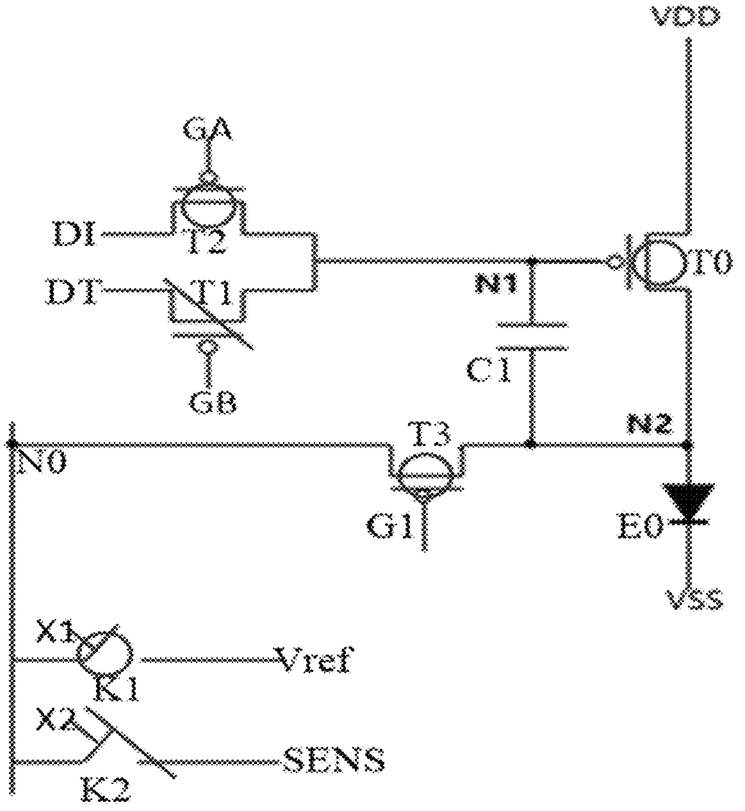
Figure 209F:
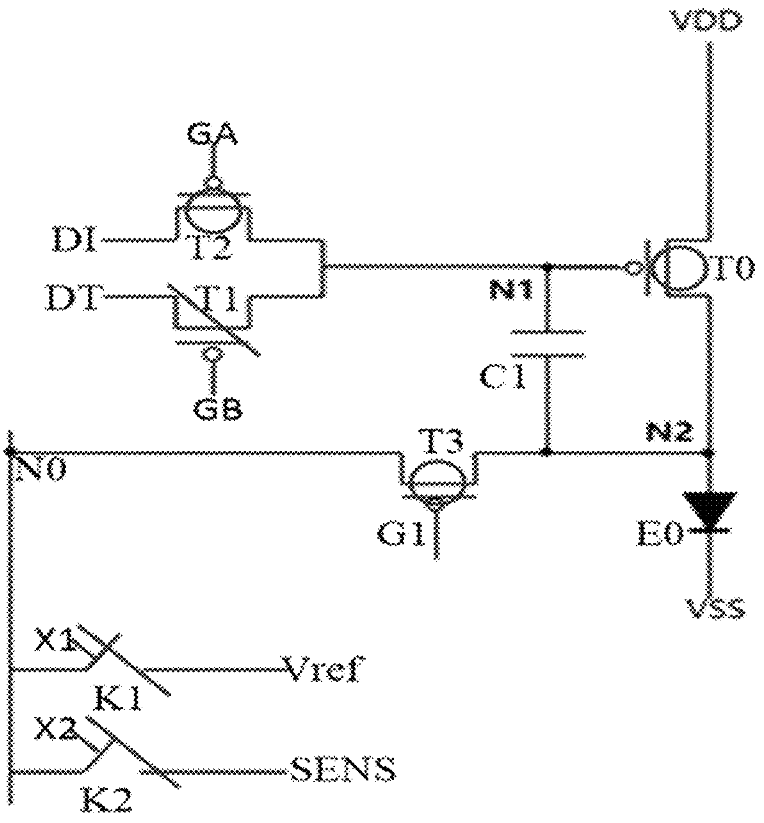
Figure 209G:
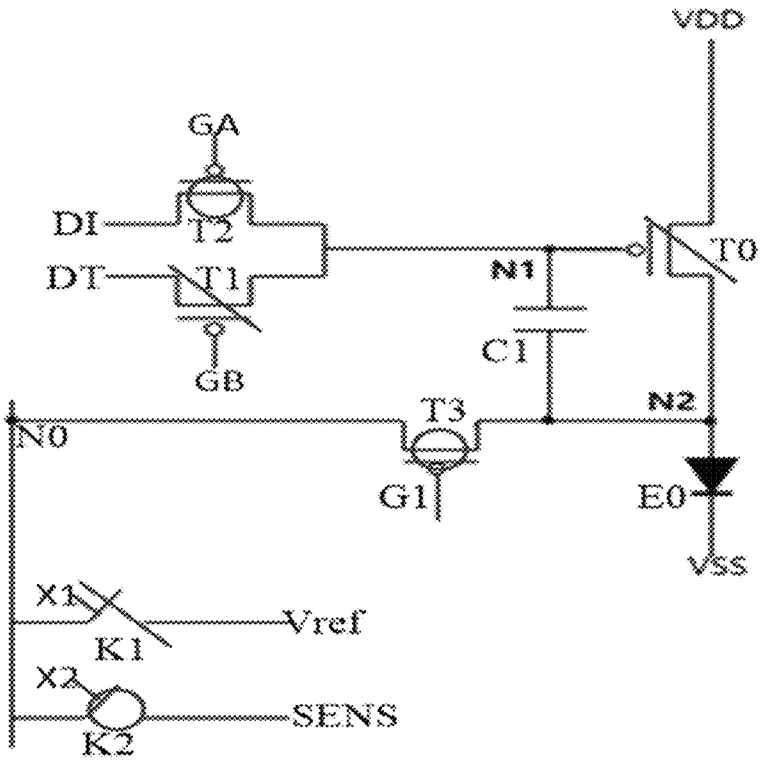
Figure 210A:
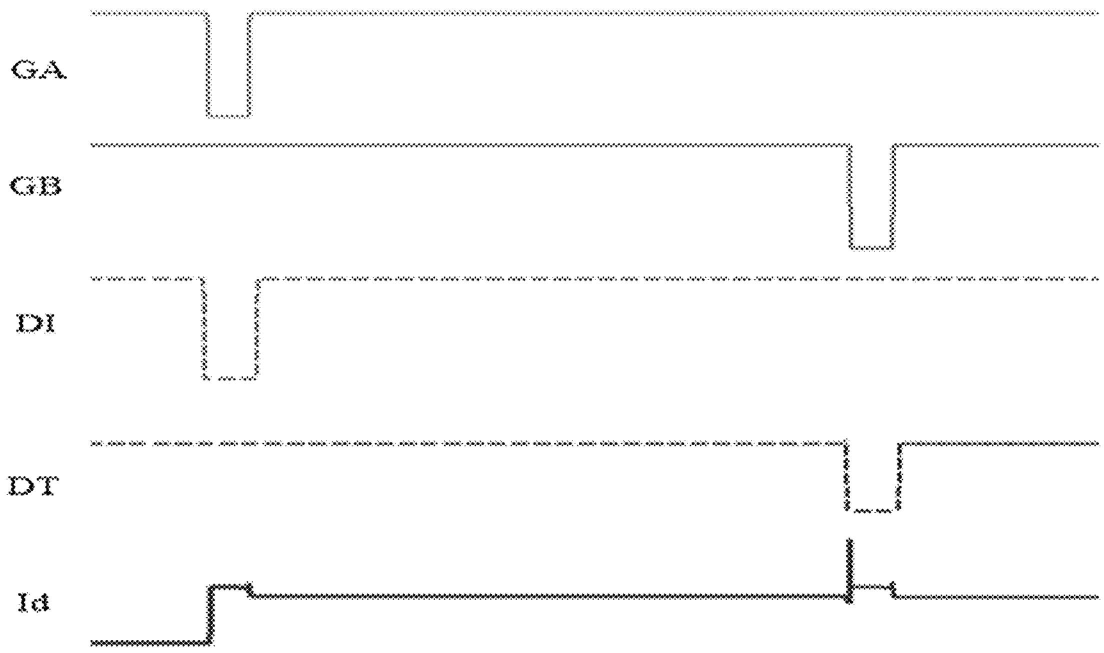
Figure 210B:
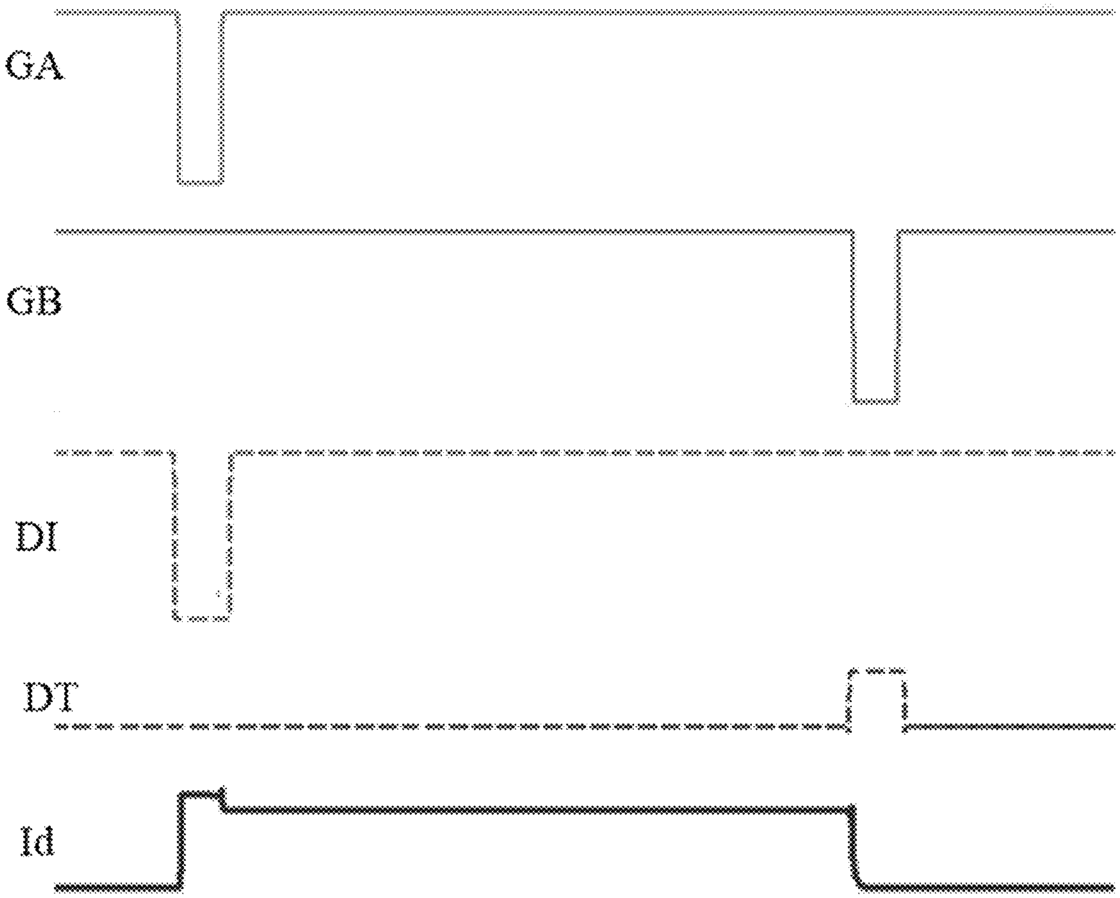
Figure 211:
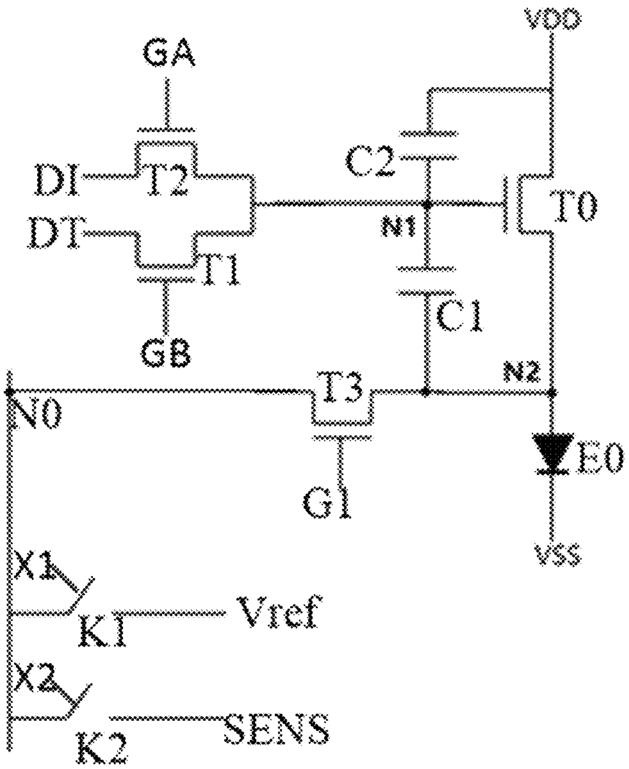
Figure 212:
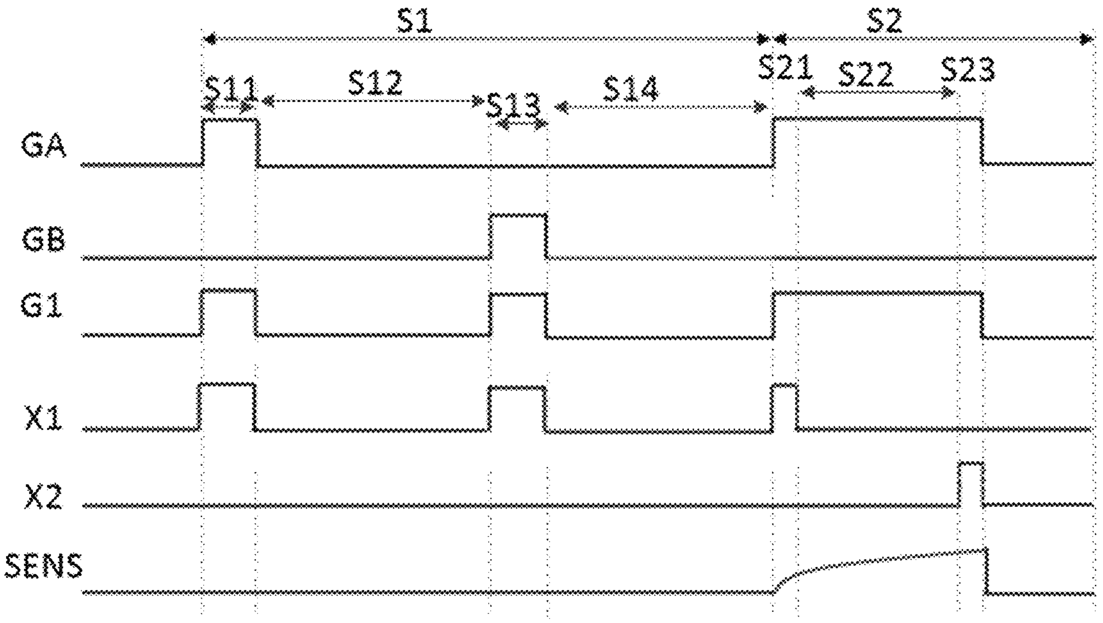
Figure 213A:
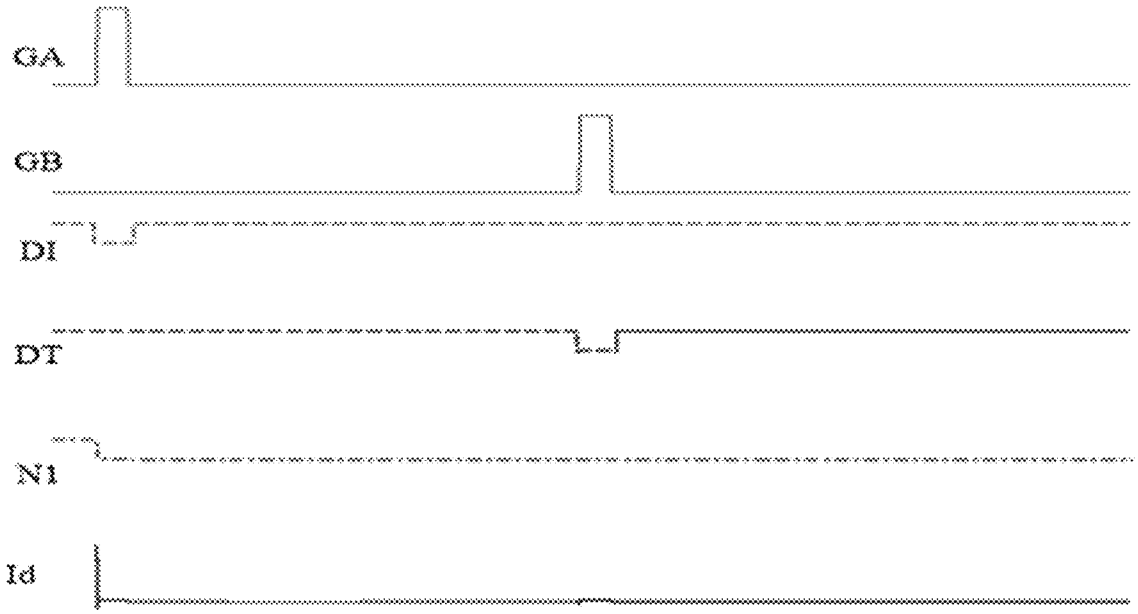
Figure 213B:
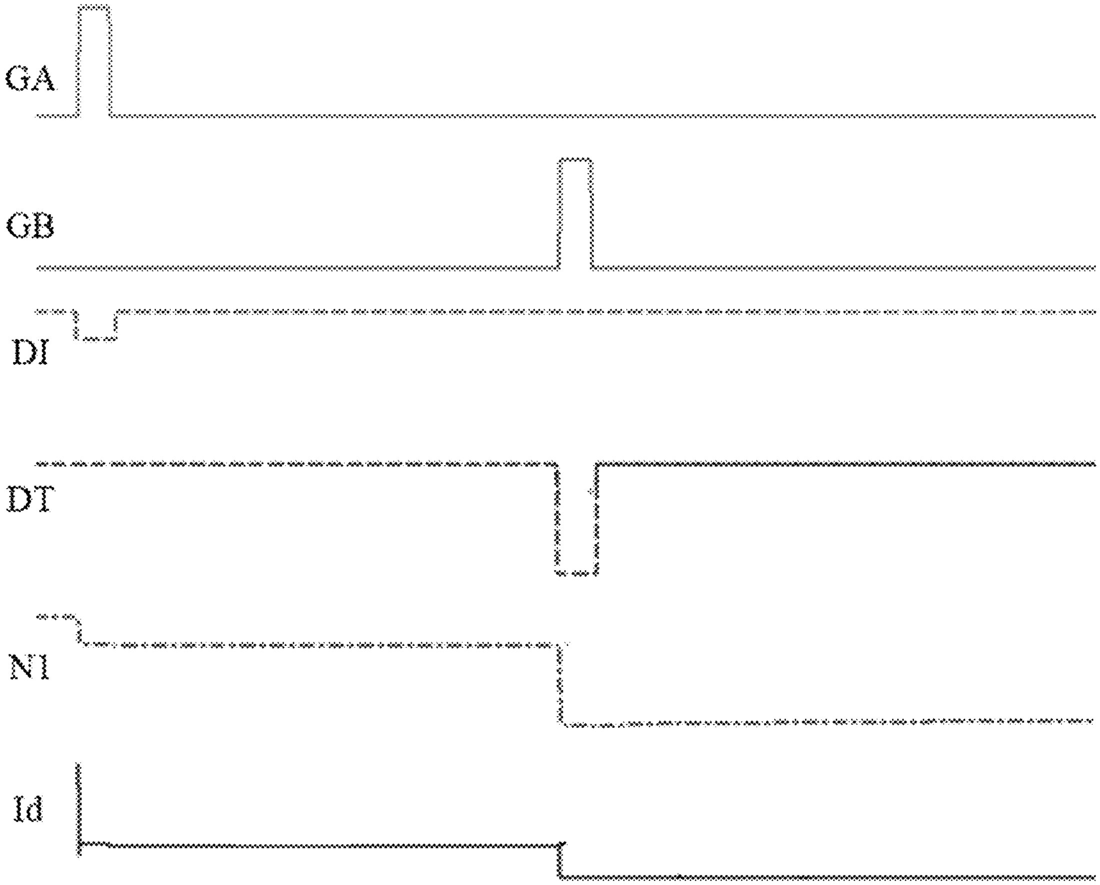
Figure 214:
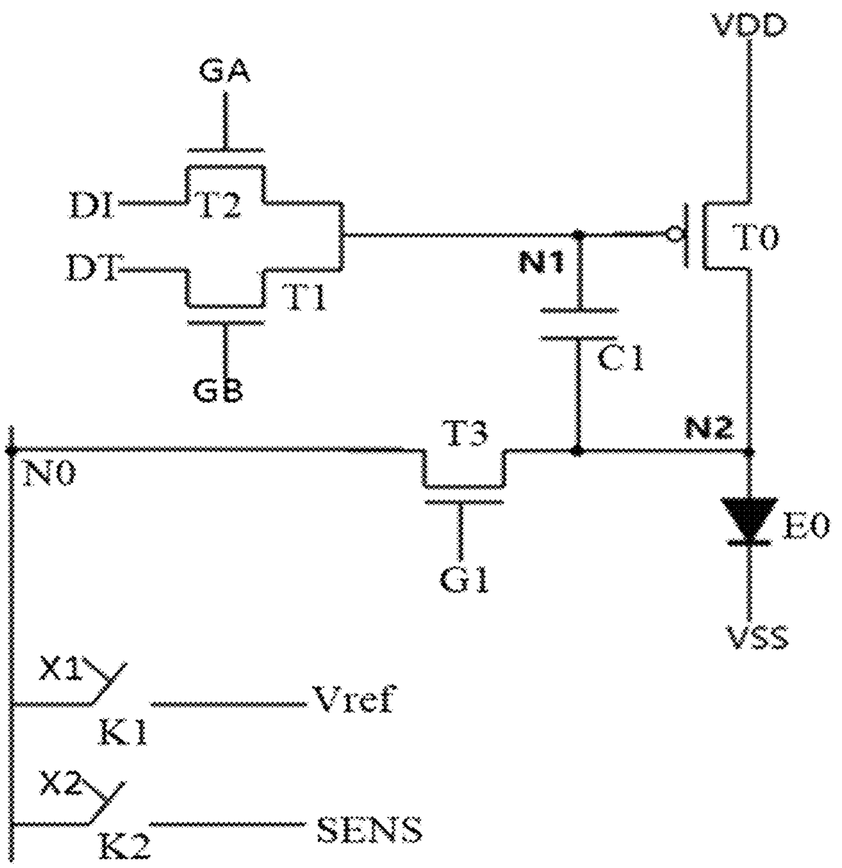
Figure 215:
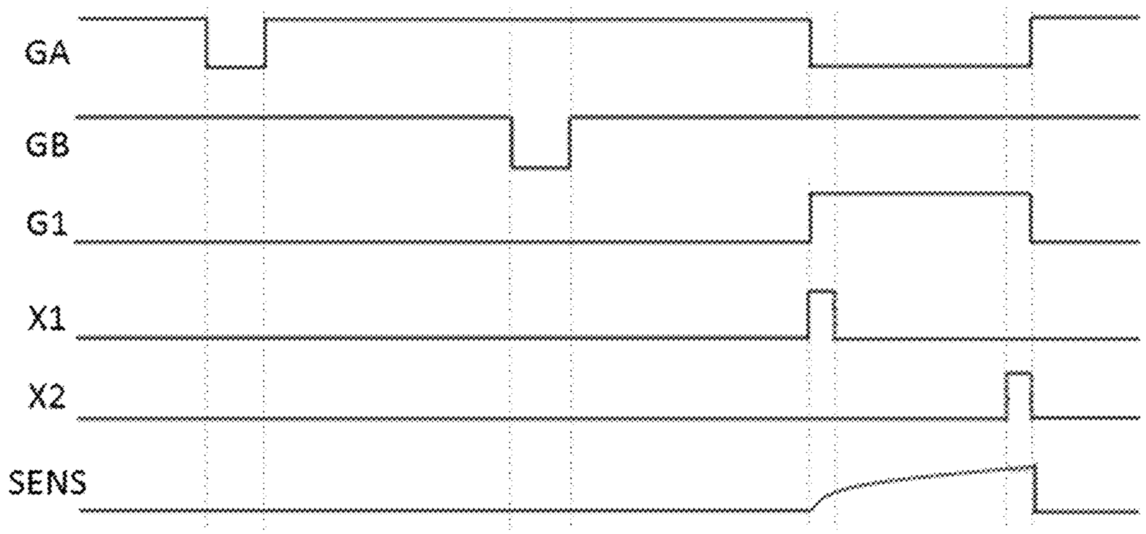
Figure 216:
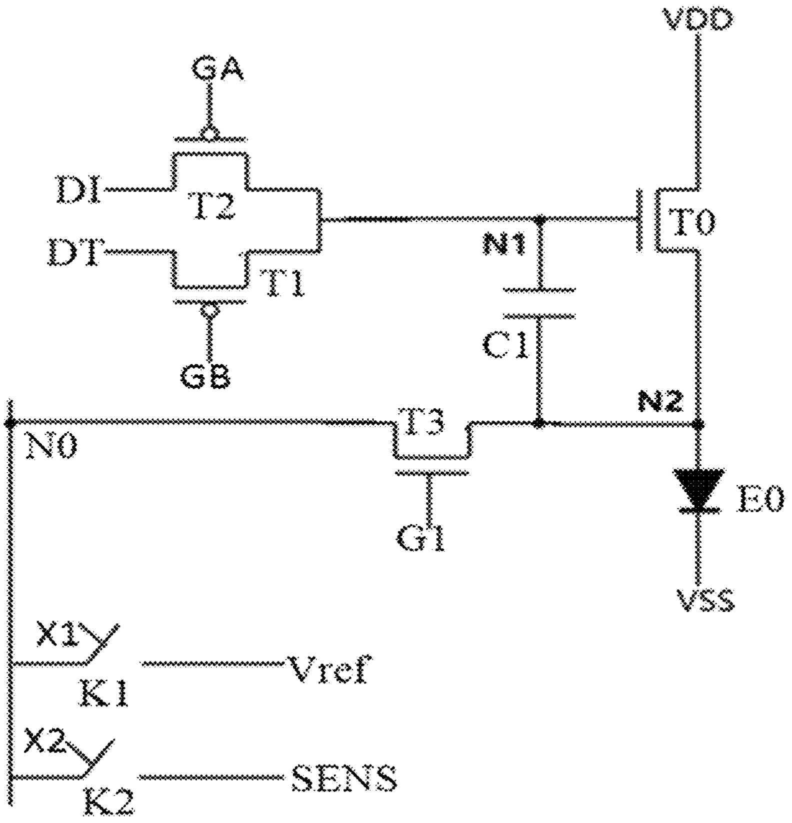
Figure 217:
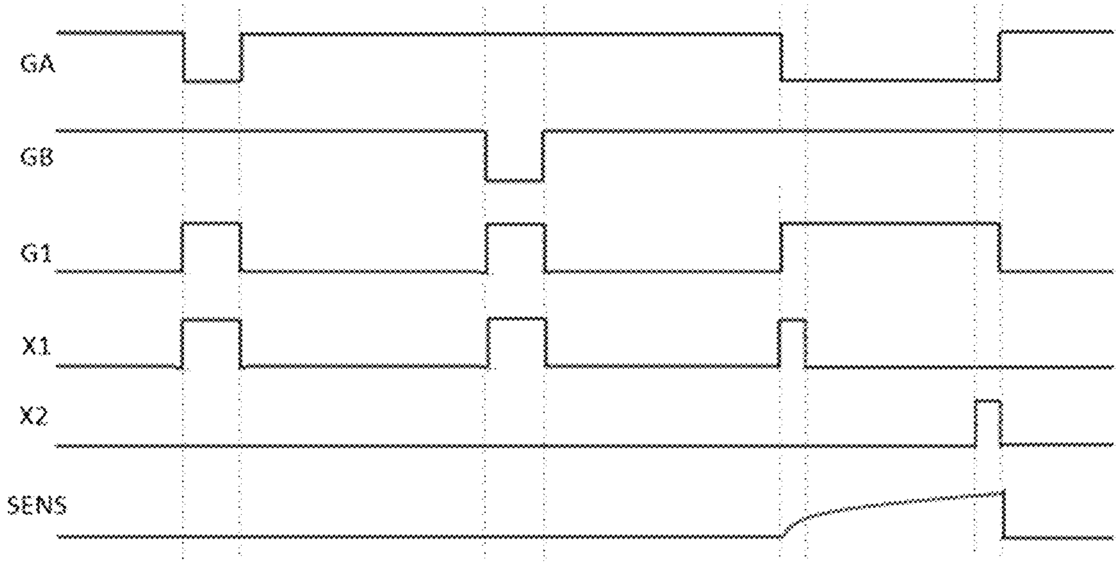
Figure 218:
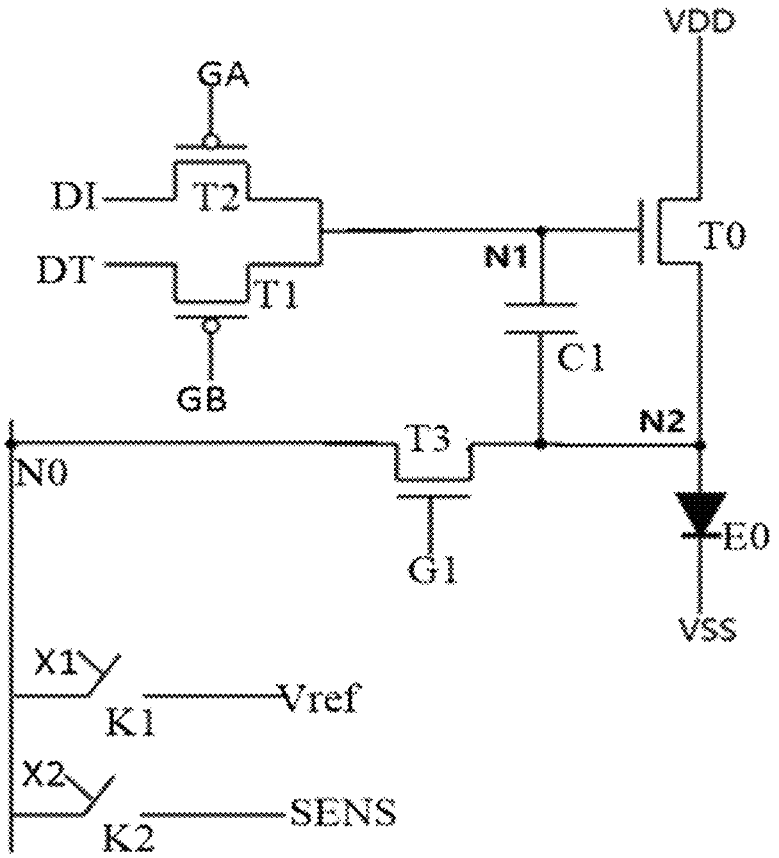
Figure 219:
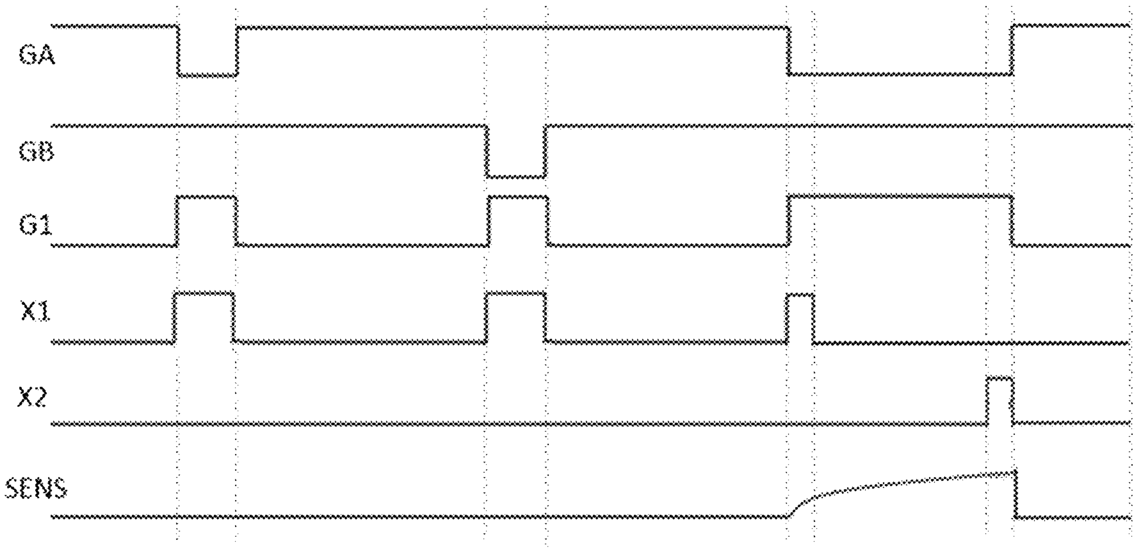
Figure 220:
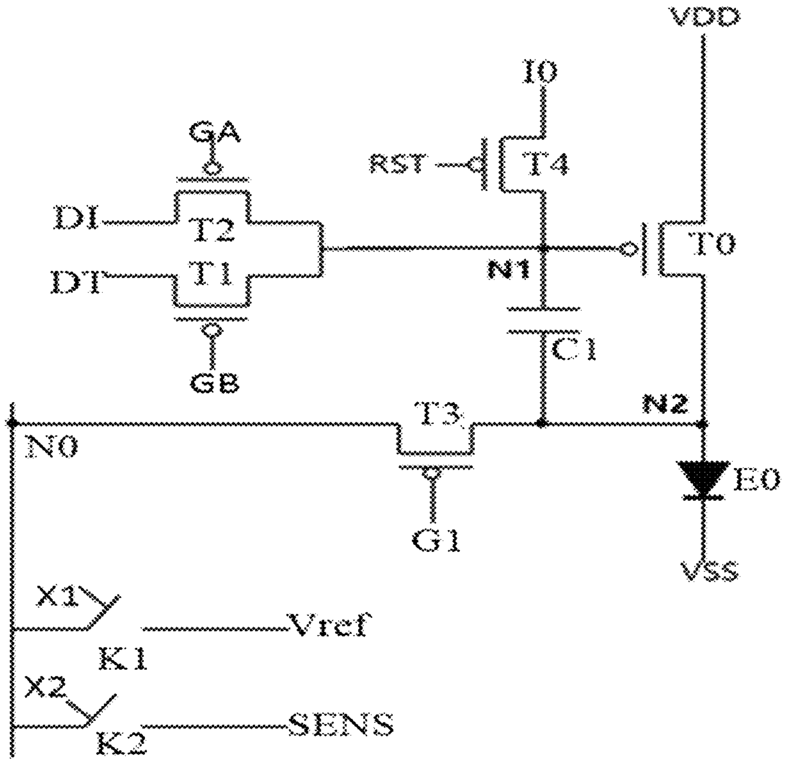
Figure 221:
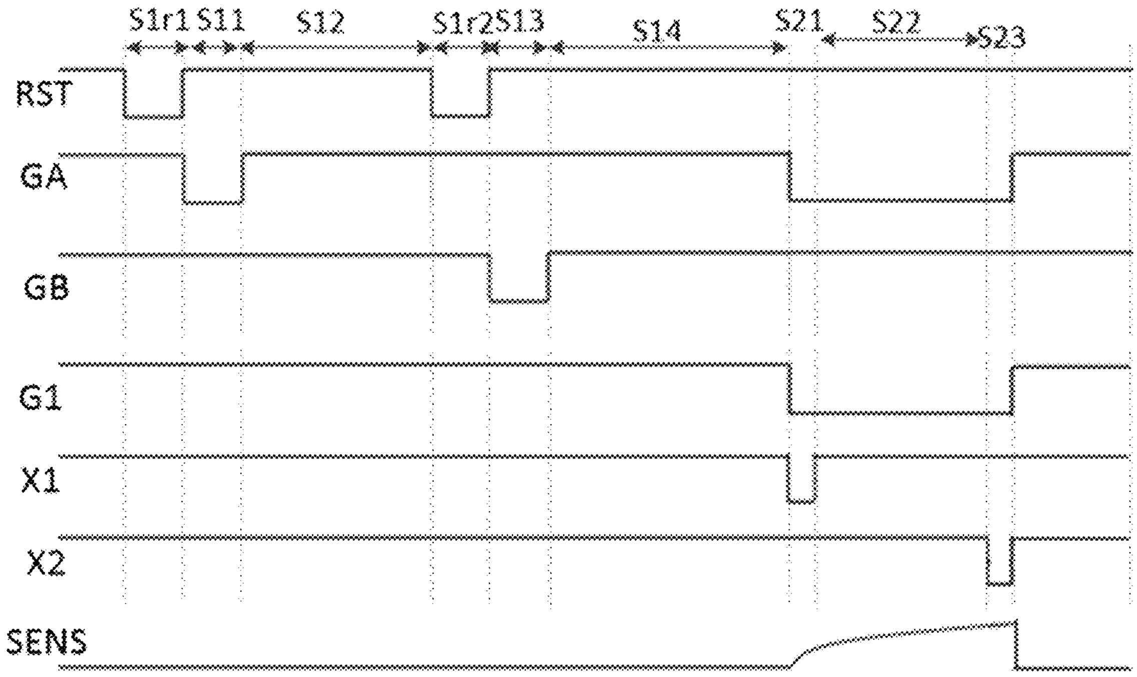
Figure 222:
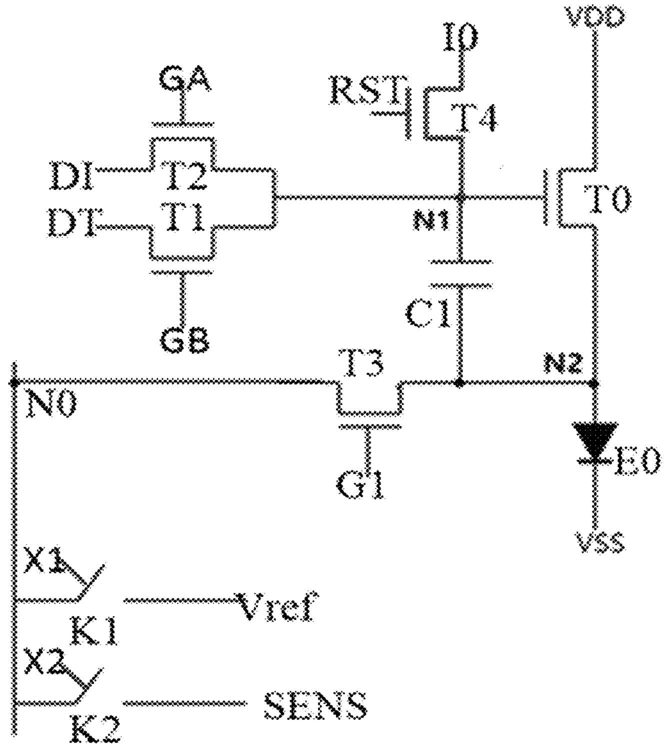
Figure 223:
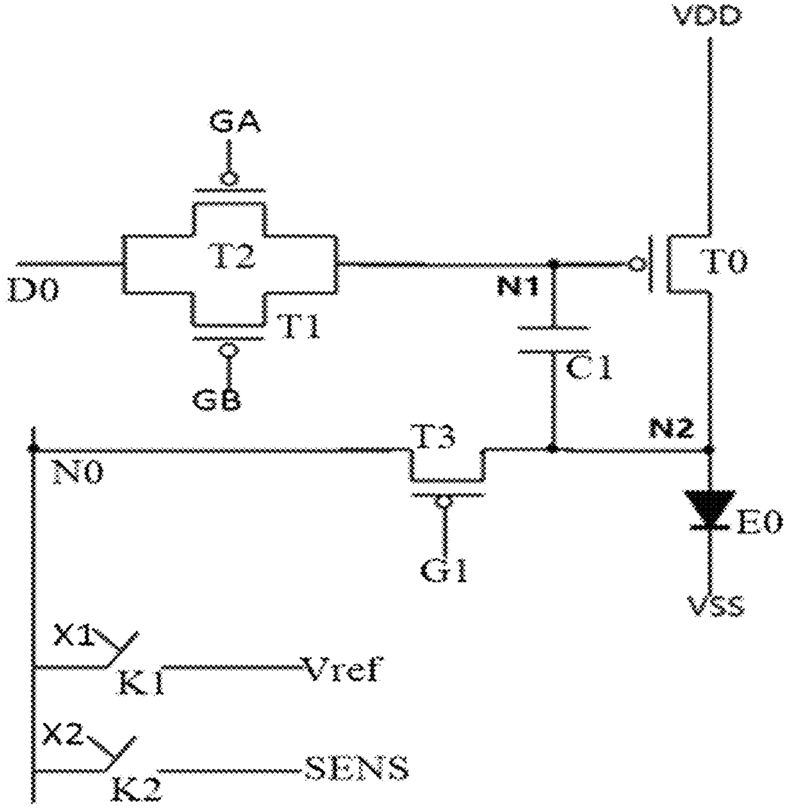
Figure 224:
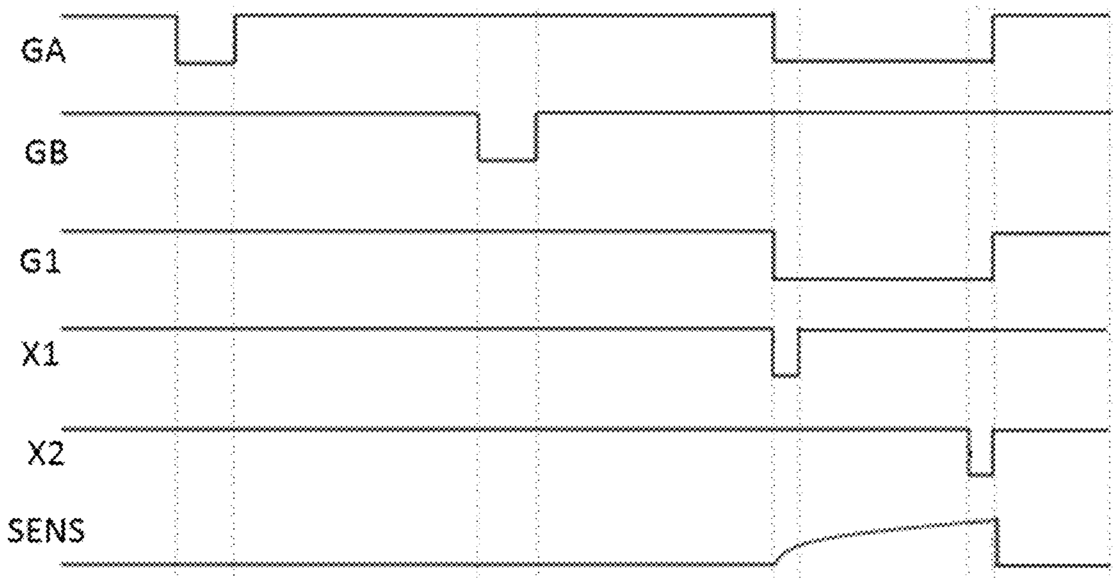
Figure 225:
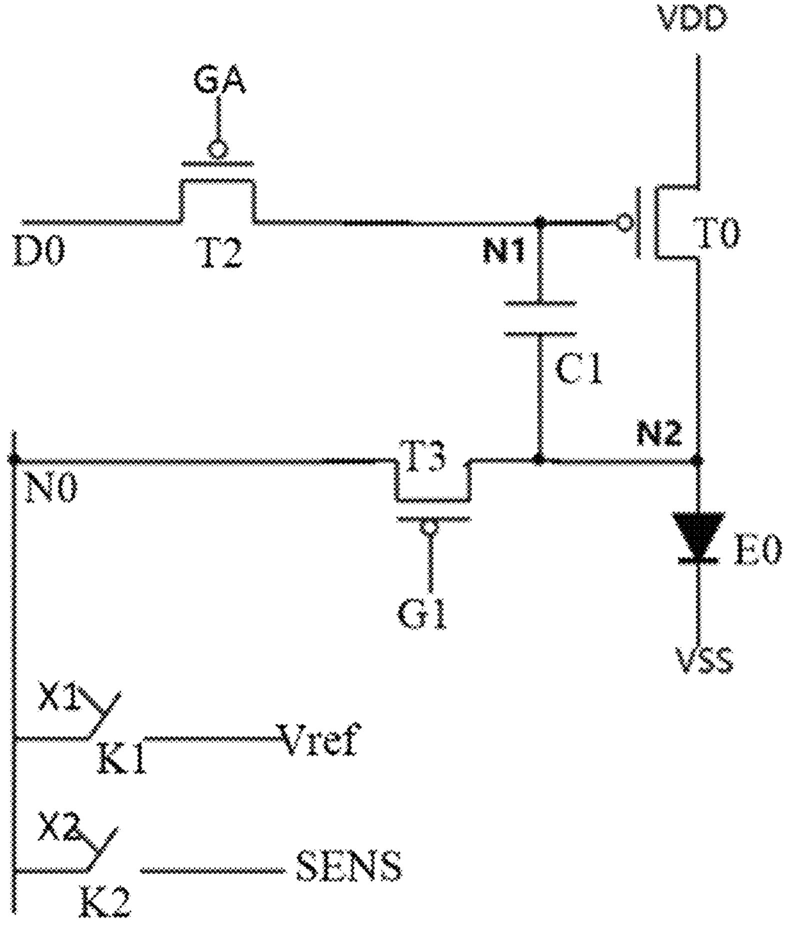
Figure 226:
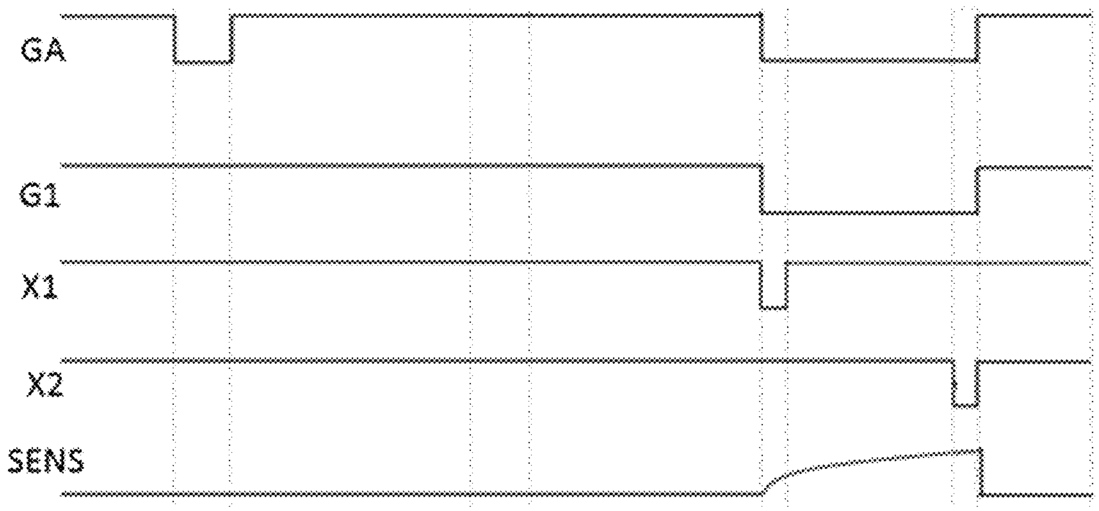
Figure 227:
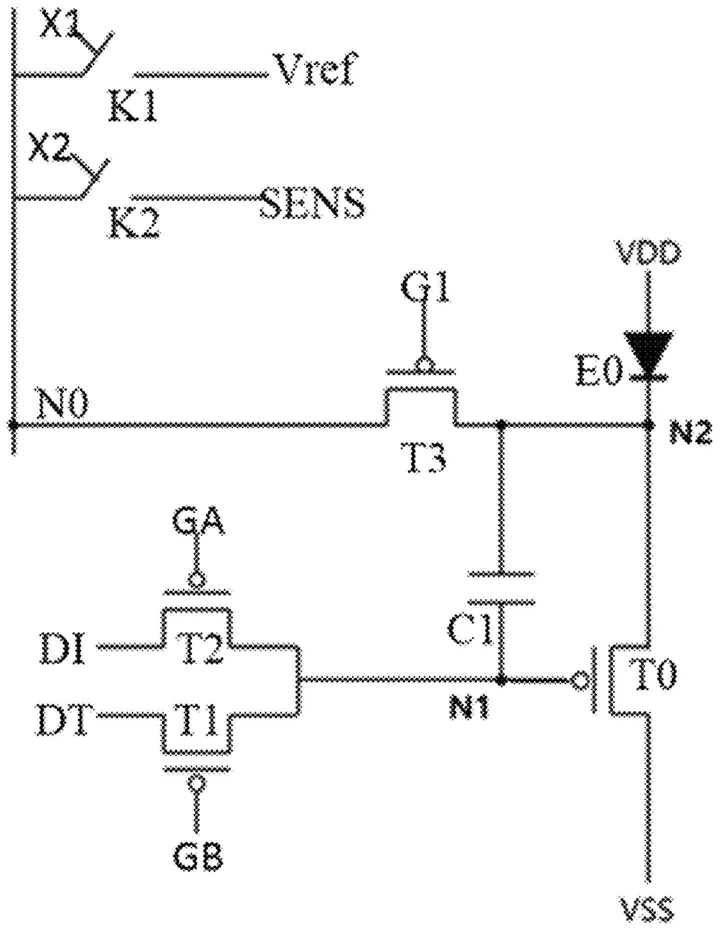
Figure 228:
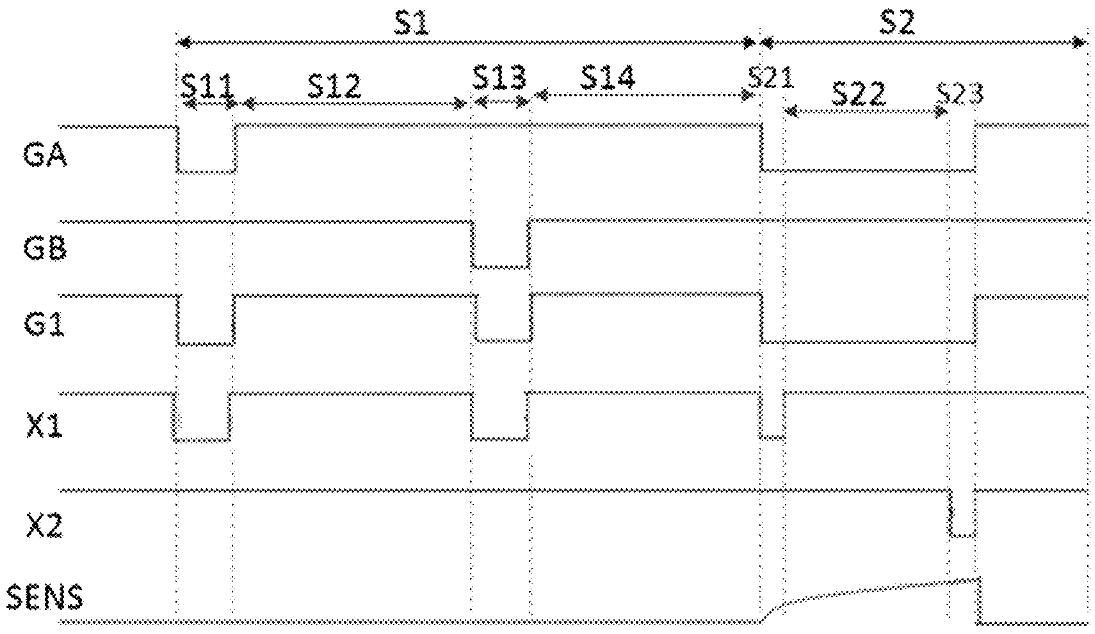
Figure 229A:
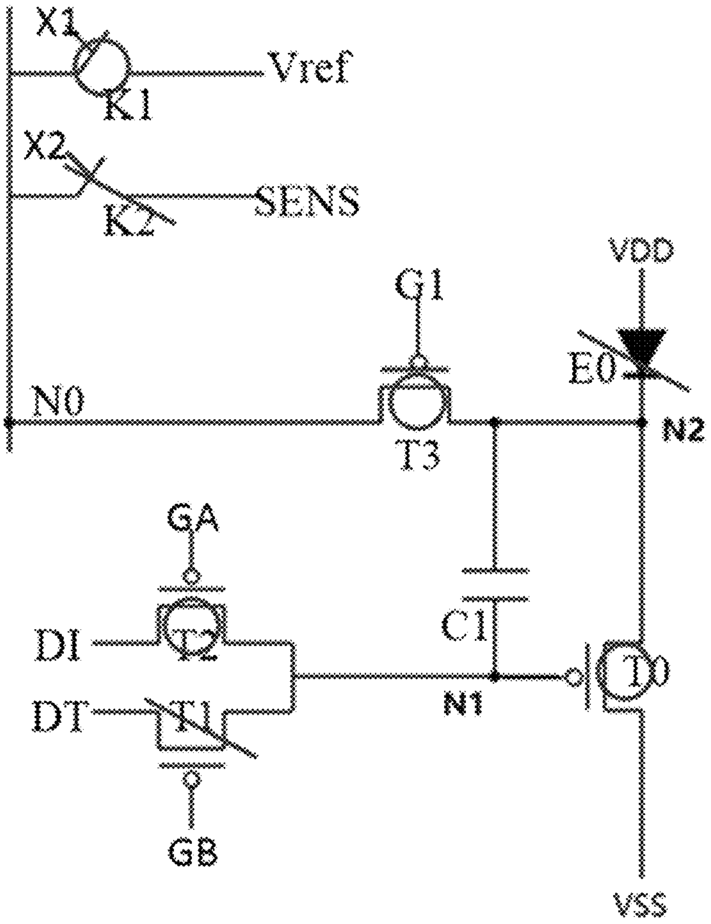
Figure 229B:
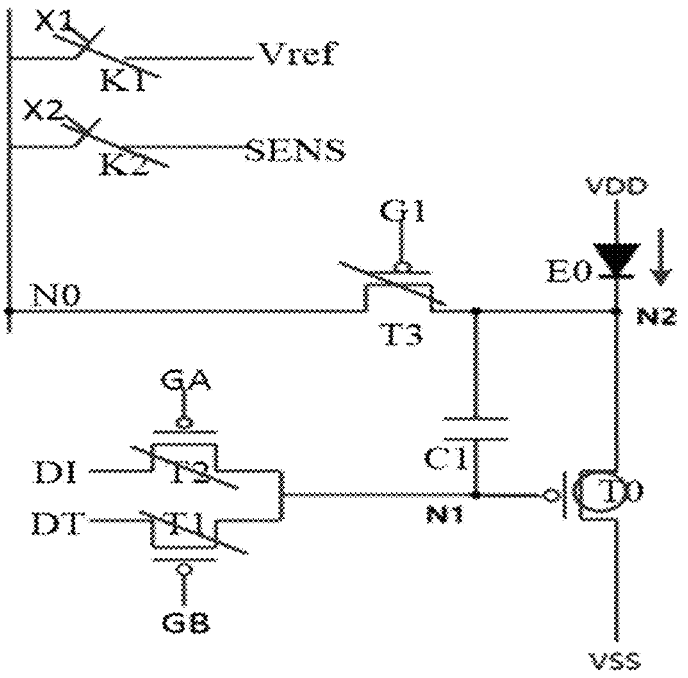
Figure 229C:
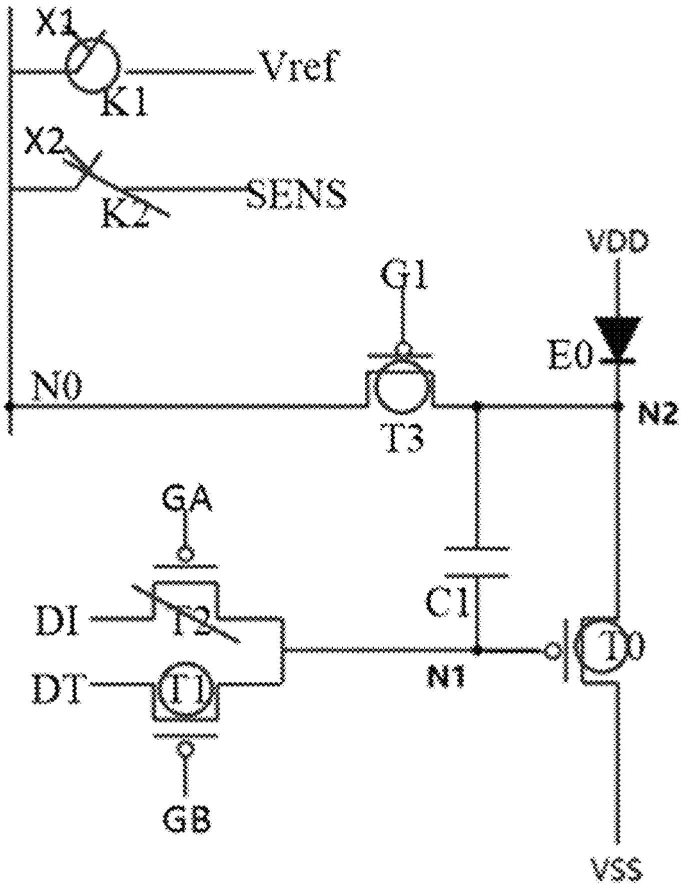
Figure 229D:
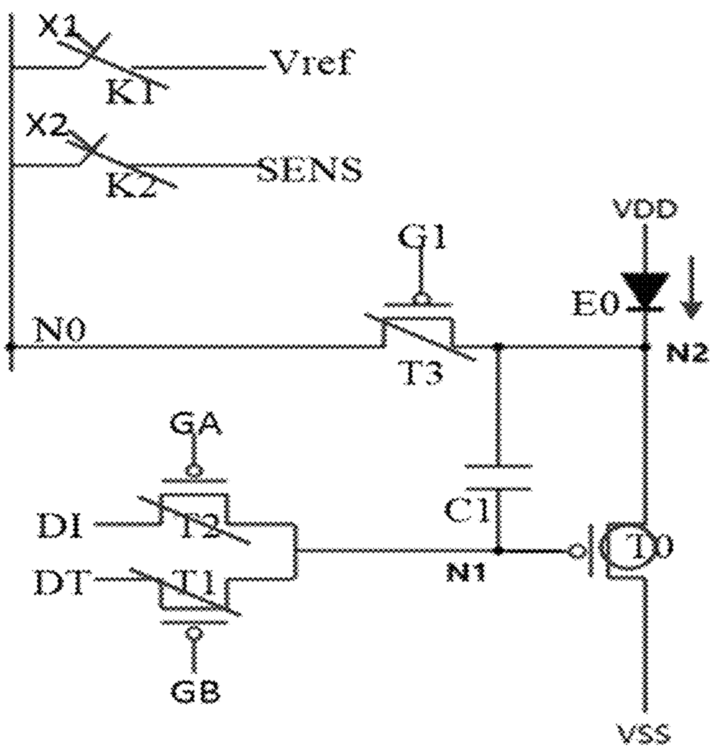
Figure 229E:
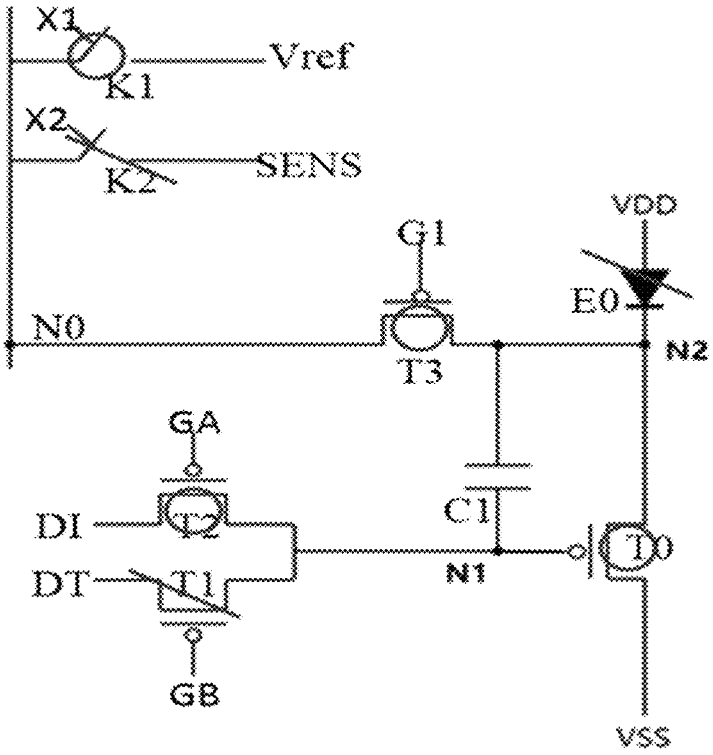
Figure 229F:
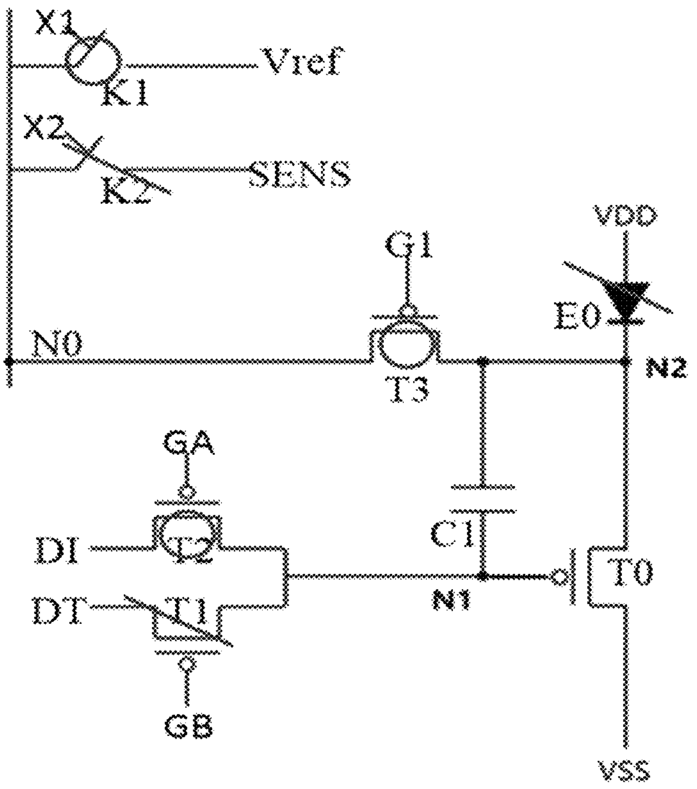
Figure 229G:
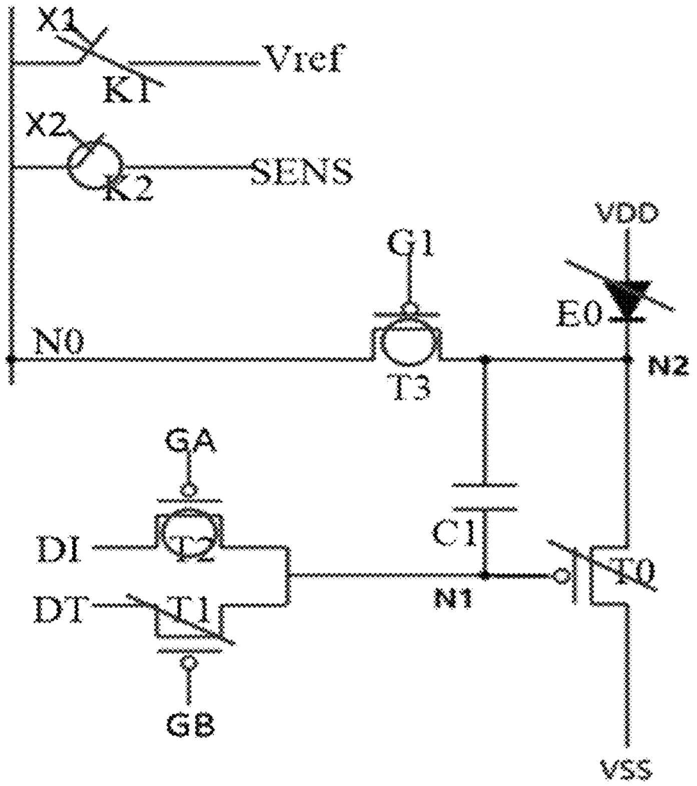
Figure 230:
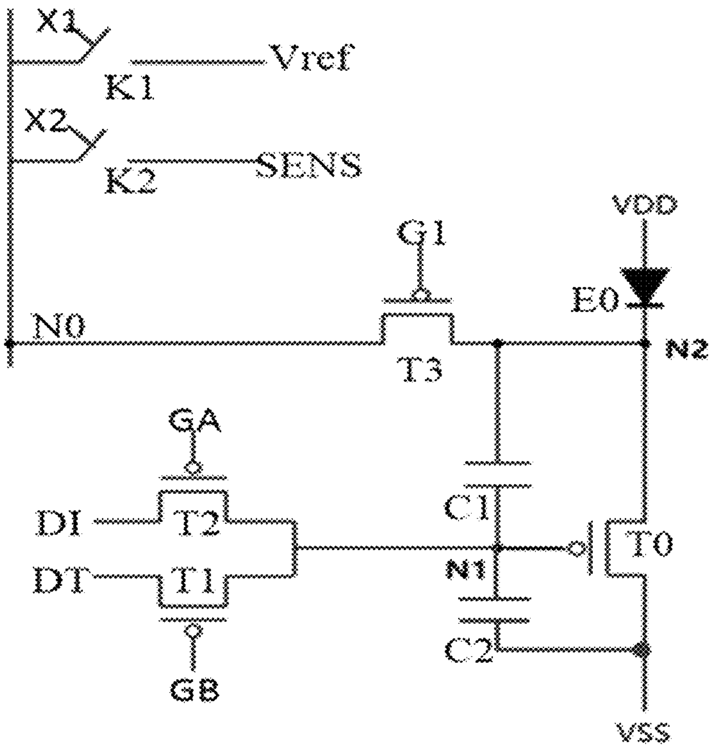
Figure 231:
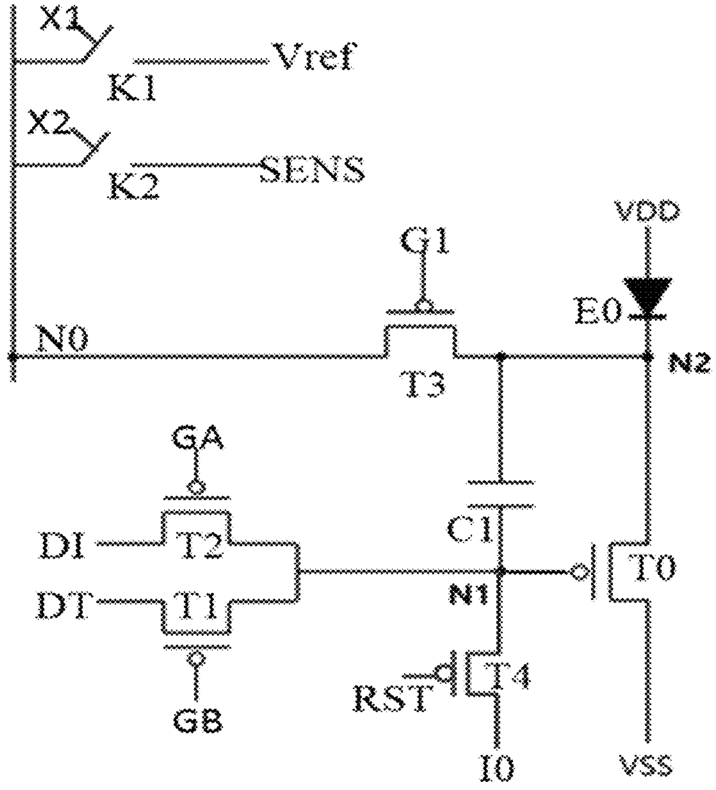

FIG. 91D is a schematic diagram showing the working state of the pixel circuit shown in FIG. 88 in the second writing-in time period S22;

FIG. 91E is a schematic diagram showing the working state of the pixel circuit shown in FIG. 88 in the second light emitting time period S23;

FIG. 92 is a circuit diagram of a pixel circuit according to at least one embodiment of the present disclosure;

FIG. 93 is a first timing diagram of the pixel circuit shown in FIG. 92;

FIG. 94 is a second timing diagram of the pixel circuit shown in FIG. 92;

FIG. 95 is a structural diagram of a pixel circuit according to at least one embodiment of the present disclosure;

FIG. 96 is a structural diagram of a pixel circuit according to at least one embodiment of the present disclosure;

FIG. 97 is a structural diagram of a pixel circuit according to at least one embodiment of the present disclosure;

FIG. 98 is a structural diagram of a pixel circuit according to at least one embodiment of the present disclosure;

FIG. 99 is a structural diagram of a pixel circuit according to at least one embodiment of the present disclosure;

FIG. 100 is a structural diagram of a pixel circuit according to at least one embodiment of the present disclosure;

FIG. 101 is a structural diagram of a pixel circuit according to at least one embodiment of the present disclosure;

FIG. 102 is a structural diagram of a pixel circuit according to at least one embodiment of the present disclosure;

FIG. 103 is a structural diagram of a pixel circuit according to at least one embodiment of the present disclosure;

FIG. 104 is a structural diagram of a pixel circuit according to at least one embodiment of the present disclosure;

FIG. 105 is a structural diagram of a pixel circuit according to at least one embodiment of the present disclosure;

FIG. 106 is a circuit diagram of a pixel circuit according to at least one embodiment of the present disclosure;

FIG. 107 is a timing diagram of the pixel circuit shown in FIG. 106;

FIG. 108A is a schematic diagram showing the working state of the pixel circuit shown in FIG. 106 in a first reset time period;

FIG. 108B is a schematic diagram showing the working state of the pixel circuit shown in FIG. 106 in the first writing-in time period;

FIG. 108C is a schematic diagram showing the working state of the pixel circuit shown in FIG. 106 in the first light emitting time period;

FIG. 108D is a schematic diagram showing the working state of the pixel circuit shown in FIG. 106 in a second reset time period;

FIG. 108E is a schematic diagram showing the working state of the pixel circuit shown in FIG. 106 during a second writing-in time period;

FIG. 108F is a schematic diagram showing the working state of the pixel circuit shown in FIG. 106 in a second light emitting time period;

FIG. 109A is a schematic diagram showing simulation results of the pixel circuit shown in FIG. 106 of the present disclosure when performing a low grayscale display;

FIG. 109B is a schematic diagram of simulation results of the pixel circuit shown in FIG. 106 of the present disclosure when performing a high grayscale display;

FIG. 110 is a timing diagram of the pixel circuit shown in FIG. 106;

FIG. 111 is a schematic diagram of the light emitting time of the pixel circuit shown in FIG. 106 when emitting light at a high grayscale and at a low grayscale;

FIG. 112 is a circuit diagram of a pixel circuit according to at least one embodiment of the present disclosure;

FIG. 113 is a timing diagram of the pixel circuit shown in FIG. 112;

FIG. 114 is a circuit diagram of a pixel circuit according to at least one embodiment of the present disclosure;

FIG. 115A is a timing diagram of the pixel circuit shown in FIG. 114;

FIG. 115B is a schematic diagram showing simulation results of the pixel circuit shown in FIG. 114 when performing high grayscale display;

FIG. 115C is a schematic diagram showing simulation results of the pixel circuit shown in FIG. 114 when performing high grayscale display;

FIG. 116 is a circuit diagram of a pixel circuit according to at least one embodiment of the present disclosure;

FIG. 117 is a timing diagram of the pixel circuit shown in FIG. 116;

FIG. 118 is a circuit diagram of a pixel circuit according to at least one embodiment of the present disclosure;

FIG. 119 is a timing diagram of the pixel circuit shown in FIG. 118;

FIG. 120A is a schematic diagram showing the working state of the pixel circuit shown in FIG. 118 in a first reset time period;

FIG. 120B is a schematic diagram showing the working state of the pixel circuit shown in FIG. 118 in a first writing-in time period;

FIG. 120C is a schematic diagram showing the working state of the pixel circuit shown in FIG. 118 in the first light emitting time period;

FIG. 120D is a schematic diagram showing the working state of the pixel circuit shown in FIG. 118 during a second writing-in time period;

FIG. 120E is a schematic diagram showing the working state of the pixel circuit shown in FIG. 118 in the second light emitting time period;

FIG. 121A is a schematic diagram showing simulation results of the pixel circuit shown in FIG. 118 when performing high grayscale display;

FIG. 121B is a schematic diagram showing simulation results of the pixel circuit shown in FIG. 118 when performing low grayscale display;

FIG. 122 is a circuit diagram of a pixel circuit according to at least one embodiment of the present disclosure;

FIG. 123 is a timing diagram of the pixel circuit shown in FIG. 122;

FIG. 124A is a schematic diagram showing the working state of the pixel circuit shown in FIG. 122 in a first reset time period S11;

FIG. 124B is a schematic diagram showing the working state of the pixel circuit shown in FIG. 122 in the first writing-in time period S12;

FIG. 124C is a schematic diagram showing the working state of the pixel circuit shown in FIG. 122 in the first light emitting time period S13;

FIG. 124D is a schematic diagram showing the working state of the pixel circuit shown in FIG. 122 in the second writing-in time period S22;

FIG. 124E is a schematic diagram showing the working state of the pixel circuit shown in FIG. 122 in the second light emitting time period S23;

FIG. 125A is a schematic diagram showing simulation results of the pixel circuit shown in FIG. 122 when performing high grayscale display;

FIG. 125B is a schematic diagram showing simulation results of the pixel circuit shown in FIG. 122 when performing low grayscale display;

FIG. 126 is a circuit diagram of a pixel circuit according to at least one embodiment of the present disclosure;

FIG. 127 is a timing diagram of the pixel circuit shown in FIG. 126;

FIG. 128 is a structural diagram of a pixel circuit according to at least one embodiment of the present disclosure;

FIG. 129 is a structural diagram of a pixel circuit according to at least one embodiment of the present disclosure;

FIG. 130 is a structural diagram of a pixel circuit according to at least one embodiment of the present disclosure;

FIG. 131 is a structural diagram of a pixel circuit according to at least one embodiment of the present disclosure;

FIG. 132 is a structural diagram of a pixel circuit according to at least one embodiment of the present disclosure;

FIG. 133 is a structural diagram of a pixel circuit according to at least one embodiment of the present disclosure;

FIG. 134 is a structural diagram of a pixel circuit according to at least one embodiment of the present disclosure;

FIG. 135 is a structural diagram of a pixel circuit according to at least one embodiment of the present disclosure;

FIG. 136 is a structural diagram of a pixel circuit according to at least one embodiment of the present disclosure;

FIG. 137 is a structural diagram of a pixel circuit according to at least one embodiment of the present disclosure;

FIG. 138 is a structural diagram of a pixel circuit according to at least one embodiment of the present disclosure;

FIG. 139 is a structural diagram of a pixel circuit according to at least one embodiment of the present disclosure;

FIG. 140 is a structural diagram of a pixel circuit according to at least one embodiment of the present disclosure;

FIG. 141 is a structural diagram of a pixel circuit according to at least one embodiment of the present disclosure;

FIG. 142 is a structural diagram of a pixel circuit according to at least one embodiment of the present disclosure;

FIG. 143 is a structural diagram of a pixel circuit according to at least one embodiment of the present disclosure;

FIG. 144 is a structural diagram of a pixel circuit according to at least one embodiment of the present disclosure;

FIG. 145 is a structural diagram of a pixel circuit according to at least one embodiment of the present disclosure;

FIG. 146 is a structural diagram of a pixel circuit according to at least one embodiment of the present disclosure;

FIG. 147 is a structural diagram of a pixel circuit according to at least one embodiment of the present disclosure;

FIG. 148 is a structural diagram of a pixel circuit according to at least one embodiment of the present disclosure;

FIG. 149 is a structural diagram of a pixel circuit according to at least one embodiment of the present disclosure;

FIG. 150 is a structural diagram of a pixel circuit according to at least one embodiment of the present disclosure;

FIG. 151 is a circuit diagram of a pixel circuit according to at least one embodiment of the present disclosure;

FIG. 152 is a timing diagram of the pixel circuit shown in FIG. 151;

FIG. 153A is a schematic diagram showing the working state of the pixel circuit shown in FIG. 151 in a first reset time period;

FIG. 153B is a schematic diagram showing the working state of the pixel circuit shown in FIG. 151 during a first compensation time period;

FIG. 153C is a schematic diagram showing the working state of the pixel circuit shown in FIG. 151 during a first writing-in time period;

FIG. 153D is a schematic diagram showing the working state of the pixel circuit shown in FIG. 151 in a second reset time period;

FIG. 153E is a schematic diagram of the working state of the pixel circuit shown in FIG. 151 in the first light emitting time period;

FIG. 153F is a schematic diagram of the working state of the pixel circuit shown in FIG. 151 in a third reset time period;

FIG. 153G is a schematic diagram showing the working state of the pixel circuit shown in FIG. 151 during a second compensation time period;

FIG. 153H is a schematic diagram showing the working state of the pixel circuit shown in FIG. 151 during a second writing-in time period;

FIG. 153I is a schematic diagram of the working state of the pixel circuit shown in FIG. 151 in a fourth reset time period;

FIG. 153J is a schematic diagram of the working state of the pixel circuit shown in FIG. 151 in the second light emitting time period;

FIG. 154A is a schematic diagram showing simulation results of the pixel circuit shown in FIG. 151 of the present disclosure when performing high grayscale display;

FIG. 154B is a schematic diagram of simulation results of the pixel circuit shown in FIG. 151 of the present disclosure when performing low grayscale display;

FIG. 155 is a circuit diagram of a pixel circuit according to at least one embodiment of the present disclosure;

FIG. 156 is a timing diagram of the pixel circuit shown in FIG. 155;

FIG. 157 is a circuit diagram of a pixel circuit according to at least one embodiment of the present disclosure;

FIG. 158 is a timing diagram of the pixel circuit shown in FIG. 157;

FIG. 159 is a circuit diagram of a pixel circuit according to at least one embodiment of the present disclosure;

FIG. 160 is a timing diagram of the pixel circuit shown in FIG. 159;

FIG. 161 is a circuit diagram of a pixel circuit according to at least one embodiment of the present disclosure;

FIG. 162 is a timing diagram of the pixel circuit shown in FIG. 161;

FIG. 163 is a circuit diagram of a pixel circuit according to at least one embodiment of the present disclosure;

FIG. 164 is a timing diagram of the pixel circuit shown in FIG. 163;

FIG. 165 is a circuit diagram of a pixel circuit according to at least one embodiment of the present disclosure;

FIG. 166 is a timing diagram of the pixel circuit shown in FIG. 165;

FIG. 167 is a timing diagram of the pixel circuit shown in FIG. 165;

FIG. 168 is a circuit diagram of a pixel circuit according to at least one embodiment of the present disclosure;

FIG. 169 is a first timing diagram of the pixel circuit shown in FIG. 168;

FIG. 170 is a second timing diagram of the pixel circuit shown in FIG. 168;

FIG. 171 is a circuit diagram of a pixel circuit according to at least one embodiment of the present disclosure;

FIG. 172 is a timing diagram of the pixel circuit shown in FIG. 171;

FIG. 173A is a schematic diagram showing the working state of the pixel circuit shown in FIG. 171 in a first reset time period;

FIG. 173B is a schematic diagram showing the working state of the pixel circuit shown in FIG. 171 during a first compensation time period;

FIG. 173C is a schematic diagram showing the working state of the pixel circuit shown in FIG. 171 during a first writing-in time period;

FIG. 173D is a schematic diagram showing the working state of the pixel circuit shown in FIG. 171 in the first light emitting time period;

FIG. 173E is a schematic diagram of the working state of the pixel circuit shown in FIG. 171 during a second reset time period;

FIG. 173F is a schematic diagram showing the working state of the pixel circuit shown in FIG. 171 during a second compensation time period;

FIG. 173G is a schematic diagram of the working state of the pixel circuit shown in FIG. 171 during a second writing-in time period;

FIG. 173H is a schematic diagram showing the working state of the pixel circuit shown in FIG. 171 in the second light emitting time period;

FIG. 174A is a schematic diagram showing simulation results of the pixel circuit shown in FIG. 171 when performing high grayscale display;

FIG. 174B is a schematic diagram of simulation results of the pixel circuit shown in FIG. 171 when performing low grayscale display;

FIG. 175 is a circuit diagram of a pixel circuit according to at least one embodiment of the present disclosure;

FIG. 176 is a timing diagram of the pixel circuit shown in FIG. 175 of the present disclosure;

FIG. 177 is a circuit diagram of a pixel circuit according to at least one embodiment of the present disclosure;

FIG. 178 is a timing diagram of the pixel circuit shown in FIG. 177 of the present disclosure;

FIG. 179 is a circuit diagram of a pixel circuit according to at least one embodiment of the present disclosure;

FIG. 180 is a first timing diagram of the pixel circuit shown in FIG. 179 of the present disclosure;

FIG. 181 is a second timing diagram of the pixel circuit shown in FIG. 179 of the present disclosure;

FIG. 182 is a circuit diagram of a pixel circuit according to at least one embodiment of the present disclosure;

FIG. 183 is a first timing diagram of the pixel circuit shown in FIG. 182 of the present disclosure;

FIG. 184 is a second timing diagram of the pixel circuit shown in FIG. 182 of the present disclosure;

FIG. 185 is a circuit diagram of a pixel circuit according to at least one embodiment of the present disclosure;

FIG. 186 is a timing diagram of the pixel circuit shown in FIG. 185;

FIG. 187A is a schematic diagram showing the working state of the pixel circuit shown in FIG. 185 in a first reset time period;

FIG. 187B is a schematic diagram showing the working state of the pixel circuit shown in FIG. 185 during a first compensation time period;

FIG. 187C is a schematic diagram showing the working state of the pixel circuit shown in FIG. 185 in the first light emitting time period;

FIG. 187D is a schematic diagram of the working state of the pixel circuit shown in FIG. 185 in a third reset time period;

FIG. 187E is a schematic diagram showing the working state of the pixel circuit shown in FIG. 185 during a second compensation time period;

FIG. 187F is a schematic diagram showing the working state of the pixel circuit shown in FIG. 185 in the second light emitting time period;

FIG. 188A is a schematic diagram showing simulation results of the pixel circuit shown in FIG. 185 when performing high grayscale display;

FIG. 188B is a schematic diagram of simulation results of the pixel circuit shown in FIG. 185 when performing low grayscale display;

FIG. 189 is a circuit diagram of a pixel circuit according to at least one embodiment of the present disclosure;

FIG. 190 is a timing diagram of the pixel circuit shown in FIG. 189 of the present disclosure;

FIG. 191 is a circuit diagram of a pixel circuit according to at least one embodiment of the present disclosure;

FIG. 192 is a timing diagram of the pixel circuit shown in FIG. 191 of the present disclosure;

FIG. 193 is a structural diagram of a pixel circuit according to at least one embodiment of the present disclosure;

FIG. 194 is a structural diagram of a pixel circuit according to at least one embodiment of the present disclosure;

FIG. 195 is a structural diagram of a pixel circuit according to at least one embodiment of the present disclosure;

FIG. 196 is a structural diagram of a pixel circuit according to at least one embodiment of the present disclosure;

FIG. 197 is a structural diagram of a pixel circuit according to at least one embodiment of the present disclosure;

FIG. 198 is a structural diagram of a pixel circuit according to at least one embodiment of the present disclosure;

FIG. 199 is a structural diagram of a pixel circuit according to at least one embodiment of the present disclosure;

FIG. 200 is a structural diagram of a pixel circuit according to at least one embodiment of the present disclosure;

FIG. 201 is a structural diagram of a pixel circuit according to at least one embodiment of the present disclosure;

FIG. 202 is a structural diagram of a pixel circuit according to at least one embodiment of the present disclosure;

FIG. 203 is a circuit diagram of a pixel circuit according to at least one embodiment of the present disclosure;

FIG. 204 is a timing diagram of the pixel circuit shown in FIG. 203;

FIG. 205A is a schematic diagram showing the working state of the pixel circuit shown in FIG. 203 in a first writing-in time period;

FIG. 205B is a schematic diagram showing the working state of the pixel circuit shown in FIG. 203 in the first light emitting time period;

FIG. 205C is a schematic diagram showing the working state of the pixel circuit shown in FIG. 203 during a second writing-in time period;

FIG. 205D is a schematic diagram showing the working state of the pixel circuit shown in FIG. 203 in the second light emitting time period;

FIG. 205E is a schematic diagram showing the working state of the pixel circuit shown in FIG. 203 during a sensing reset time period;

FIG. 205F is a schematic diagram showing the working state of the pixel circuit shown in FIG. 203 during a compensation time period;

FIG. 205G is a schematic diagram of the working state of the pixel circuit shown in FIG. 203 during an extraction time period;

FIG. 206A is a schematic diagram showing simulation results of the pixel circuit shown in FIG. 203 when performing high grayscale display;

FIG. 206B is a schematic diagram showing simulation results of the pixel circuit shown in FIG. 203 when performing low grayscale display;

FIG. 207 is a circuit diagram of a pixel circuit according to at least one embodiment of the present disclosure;

FIG. 208 is a timing diagram of the pixel circuit shown in FIG. 207;

FIG. 209A is a schematic diagram showing the working state of the pixel circuit shown in FIG. 207 in a first writing-in time period;

FIG. 209B is a schematic diagram showing the working state of the pixel circuit shown in FIG. 207 in the first light emitting time period;

FIG. 209C is a schematic diagram showing the working state of the pixel circuit shown in FIG. 207 during a second writing-in time period;

FIG. 209D is a schematic diagram showing the working state of the pixel circuit shown in FIG. 207 in the second light emitting time period;

FIG. 209E is a schematic diagram showing the working state of the pixel circuit shown in FIG. 207 during a sensing reset time period;

FIG. 209F is a schematic diagram showing the working state of the pixel circuit shown in FIG. 207 during a compensation time period;

FIG. 209G is a schematic diagram showing the working state of the pixel circuit shown in FIG. 207 during an extraction time period;

FIG. 210A is a schematic diagram showing simulation results of the pixel circuit shown in FIG. 207 when performing high grayscale display;

FIG. 210B is a schematic diagram showing simulation results of the pixel circuit shown in FIG. 207 when performing low grayscale display;

FIG. 211 is a circuit diagram of a pixel circuit according to at least one embodiment of the present disclosure;

FIG. 212 is a timing diagram of the pixel circuit shown in FIG. 211;

FIG. 213A is a schematic diagram showing simulation results of the pixel circuit shown in FIG. 211 when performing high grayscale display;

FIG. 213B is a schematic diagram showing simulation results of the pixel circuit shown in FIG. 211 when performing low grayscale display;

FIG. 214 is a circuit diagram of a pixel circuit according to at least one embodiment of the present disclosure;

FIG. 215 is a timing diagram of the pixel circuit shown in FIG. 214;

FIG. 216 is a circuit diagram of a pixel circuit according to at least one embodiment of the present disclosure;

FIG. 217 is a timing diagram of the pixel circuit shown in FIG. 216;

FIG. 218 is a circuit diagram of a pixel circuit according to at least one embodiment of the present disclosure;

FIG. 219 is a timing diagram of the pixel circuit shown in FIG. 218;

FIG. 220 is a circuit diagram of a pixel circuit according to at least one embodiment of the present disclosure;

FIG. 221 is a timing diagram of the pixel circuit shown in FIG. 220;

FIG. 222 is a circuit diagram of a pixel circuit according to at least one embodiment of the present disclosure;

FIG. 223 is a circuit diagram of a pixel circuit according to at least one embodiment of the present disclosure;

FIG. 224 is a timing diagram of the pixel circuit shown in FIG. 223;

FIG. 225 is a circuit diagram of a pixel circuit according to at least one embodiment of the present disclosure;

FIG. 226 is a timing diagram of the pixel circuit shown in FIG. 225;

FIG. 227 is a circuit diagram of a pixel circuit according to at least one embodiment of the present disclosure;

FIG. 228 is a timing diagram of the pixel circuit shown in FIG. 227;

FIG. 229A is a schematic diagram showing the working state of the pixel circuit shown in FIG. 227 during a first writing-in time period;

FIG. 229B is a schematic diagram showing the working state of the pixel circuit shown in FIG. 227 in the first light emitting time period;

FIG. 229C is a schematic diagram showing the working state of the pixel circuit shown in FIG. 227 during a second writing-in time period;

FIG. 229D is a schematic diagram showing the working state of the pixel circuit shown in FIG. 227 in the second light emitting time period;

FIG. 229E is a schematic diagram of the working state of the pixel circuit shown in FIG. 227 during a sensing reset time period;

FIG. 229F is a schematic diagram showing the working state of the pixel circuit shown in FIG. 227 during a compensation time period;

FIG. 229G is a schematic diagram showing the working state of the pixel circuit shown in FIG. 227 during an extraction time period;

FIG. 230 is a circuit diagram of a pixel circuit according to at least one embodiment of the present disclosure;

FIG. 231 is a circuit diagram of a pixel circuit described in at least one embodiment of the present disclosure.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, rather than all of the embodiments. Based on the embodiments in the present disclosure, all other embodiments obtained by those of ordinary skill in the art without making creative efforts fall within the scope of protection of the present disclosure.

The transistors used in all embodiments of the present disclosure may be transistors, thin film transistors, field effect transistors, or other devices with the same characteristics. In the embodiment of the present disclosure, in order to distinguish the two electrodes of the transistor except the control electrode, one electrode is called the first electrode and the other electrode is called the second electrode.

In actual operation, when the transistor is a thin film transistor or a field effect transistor, the control electrode may be a gate electrode, the first electrode may be a drain electrode, and the second electrode may be a source electrode; or, the control electrode may be a gate electrode, the first electrode may be a source electrode, and the second electrode may be a drain electrode.

The pixel circuit described in the embodiment of the present disclosure includes a driving circuit, a switch control circuit, a light emitting element, a driving control circuit and a first reset circuit;

a control terminal of the driving circuit is electrically connected to a first node, and is configured to generate a driving current to drive the light emitting element under the control of a potential of the first node;

The driving circuit is electrically connected to the light emitting element or a first voltage terminal through the switch control circuit, and the switch control circuit is electrically connected to a switch control terminal, and the switch control circuit is configured to control the connection between the driving circuit and the light emitting element or the first voltage terminal under the control of a potential of the switch control terminal;

The driving control circuit is electrically connected to a first control terminal and a first data line respectively, and is configured to write a light emitting time control data voltage provided by the first data line into the switch control terminal under the control of a first control signal provided by the first control terminal;

The first reset circuit is configured to write a set voltage into a second node, a first electrode of the light emitting element or a second electrode of the light emitting element under the control of a set control signal provided by a set control terminal.

In at least one embodiment of the present disclosure, the pixel circuit may include a driving circuit, a switch control circuit, a light emitting element, a driving control circuit and a first reset circuit; the driving control circuit writes a light emitting time control data voltage into the switch control terminal under the control of a first control signal; the first reset circuit writes a set voltage into a second node, a first electrode of the light emitting element or a second electrode of the light emitting element under the control of a set control signal, so as to initialize the potential of the second node, the potential of the first electrode of the light emitting element or the potential of the second electrode of the light emitting element before the light emitting phase;

At least one embodiment of the present disclosure writes a light emitting time control data voltage into a switch control terminal through the driving control circuit in a second data writing-in time period included in a second display phase arranged after the first display phase, so as to control the light emitting time of the light emitting element according to the light emitting time control data voltage during the light emitting time period included in the second display phase, so as to delay writing-in the light emitting time control data voltage into the pixel circuit, control the pixel circuit with a driving current+light emitting time, and improve the display effect of the light emitting element.

Optionally, the light emitting element is an inorganic light emitting diode, a width-to-length ratio of a transistor included in the switch control circuit is greater than 1, and a width-to-length ratio of a transistor included in the driving circuit is greater than 0.5.

In at least one embodiment of the present disclosure, the light emitting element may be an inorganic light emitting diode, for example, the light emitting element may be a micro light emitting diode or a mini light emitting diode.

In a specific implementation, when the light emitting element is an inorganic light emitting diode, the width-to-length ratio of the driving transistor included in the driving circuit is greater than 0.5, and the width-to-length ratio of the transistor included in the switch control circuit is greater than 1.

Optionally, the light emitting element may also be an organic light emitting diode.

In at least one embodiment of the present disclosure, the width-to-length ratio of a transistor is a ratio of a channel width W to a channel length L of the transistor.

In at least one embodiment of the present disclosure, the set voltage may be a reference voltage, a first initial voltage, or a second initial voltage, but is not limited thereto.

Optionally, the set control terminal may be a reset control terminal, but is not limited thereto.

Optionally, the light emitting element may be an OLED (organic light emitting diode), a Mini LED (mini light emitting diode) or a Micro-LED (micro light emitting diode), but is not limited thereto.

Optionally, the first electrode of the light emitting element may be an anode, and the second electrode of the light emitting element may be a cathode.

Optionally, the pixel circuit described in at least one embodiment of the present disclosure further includes an energy storage circuit;

The first terminal of the energy storage circuit is electrically connected to the first node, the second terminal of the energy storage circuit is electrically connected to the second node, and the energy storage circuit is configured to store electrical energy;

The first reset circuit is configured to write a set voltage into the second node under the control of the set control signal.

Optionally, the first voltage terminal may be a high voltage terminal, and the second voltage terminal may be a low voltage terminal, but is not limited thereto.

In at least one embodiment of the present disclosure, the energy storage circuit may include a storage capacitor; the light emitting element may be an inorganic light emitting diode;

The capacitance value of the storage capacitor is greater than 3 times the gate-source capacitance of the transistor in the driving circuit. In a specific implementation, the capacitance value of the storage capacitor is set to be greater than 3 times the gate-source capacitance of the transistor in the driving circuit, so that when the source potential of the transistor in the driving circuit changes, the potential of the gate electrode of the transistor in the driving circuit can be maintained to ensure display accuracy.

In at least one embodiment of the present disclosure, the gate-source capacitance of the transistor in the driving circuit may be a parasitic capacitance between the gate electrode and the source electrode of the transistor in the driving circuit, which may be calculated based on the facing area of the gate electrode and the source electrode of the transistor in the driving circuit, and a dielectric constant, wherein the dielectric constant may be calculated based on the material and thickness of the insulating layer between the gate electrode and the source electrode of the transistor in the driving circuit.

Figure 1:
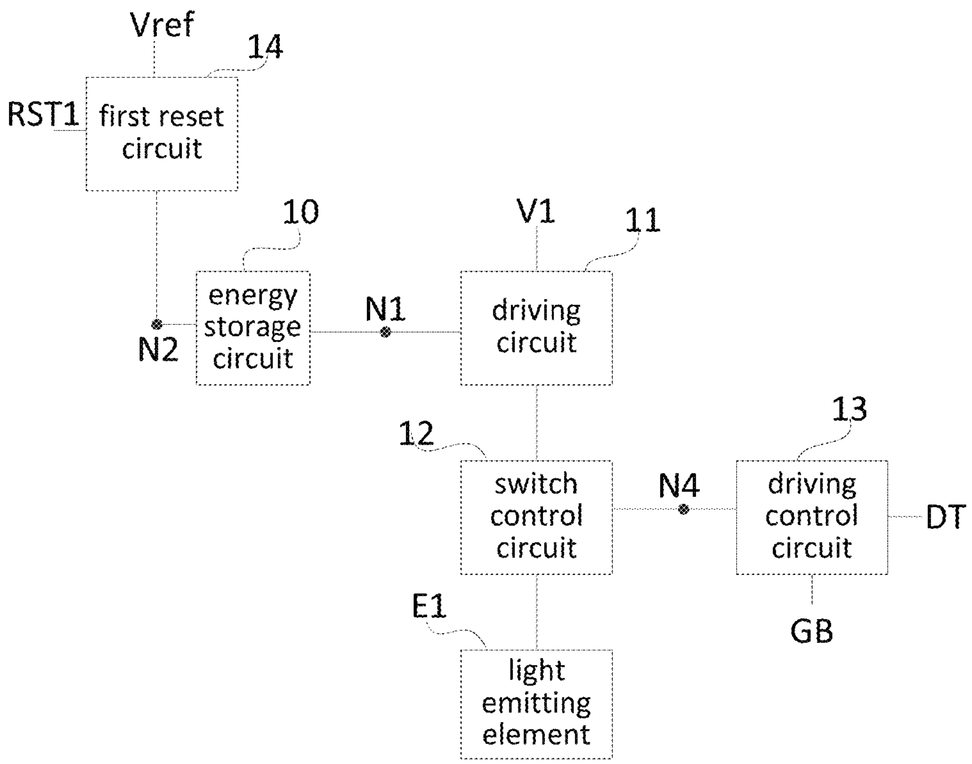
FIG. 1 is a structural diagram of a pixel circuit according to at least one embodiment of the present disclosure.

As shown in FIG. 1, the pixel circuit described in the embodiment of the present disclosure includes an energy storage circuit 10, a driving circuit 11, a switch control circuit 12, a light emitting element E1, a driving control circuit 13 and a first reset circuit 14;

The control terminal of the driving circuit 11 is electrically connected to the first node N1, and is configured to generate a driving current for driving the light emitting element E1 under the control of the potential of the first node N1;

The driving circuit 11 is electrically connected to the first electrode of the light emitting element E1 through the switch control circuit 12;

The first terminal of the driving circuit 11 is electrically connected to the first voltage terminal V1;

The switch control circuit 12 is electrically connected to the switch control terminal N4, the second terminal of the driving circuit 11 and the first electrode of the light emitting element E1 respectively. The switch control circuit is configured to control the second terminal of the driving circuit 11 to be connected to the first electrode of the light emitting element E1 under the control of the potential of the switch control terminal N4; the second electrode of the light emitting element E1 is electrically connected to the second voltage terminal V2;

The driving control circuit 13 is electrically connected to the first control terminal GB, the first data line DT and the switch control terminal N4 respectively, and is configured to write the light emitting time control data voltage provided by the first data line DT into the switch control terminal N4 under the control of the first control signal provided by the first control terminal GB;

The first reset circuit 14 is electrically connected to the first reset control terminal RST1, the reference voltage terminal and the second node N2 respectively, and is configured to write the reference voltage Vref provided by the reference voltage terminal into the second node N2 under the control of the reset control signal provided by the first reset control terminal RST1;

The first terminal of the energy storage circuit 10 is electrically connected to the first node N1, and the second terminal of the energy storage circuit 10 is electrically connected to the second node N2. The energy storage circuit 10 is configured to store electrical energy.

Figure 2:
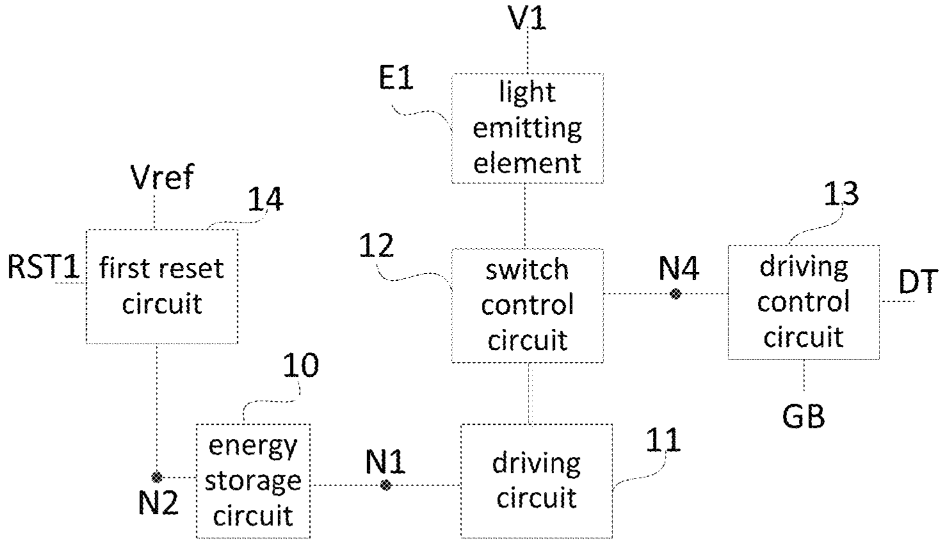
FIG. 2 is a structural diagram of a pixel circuit according to at least one embodiment of the present disclosure.

As shown in FIG. 2, the pixel circuit described in the embodiment of the present disclosure includes a storage circuit 10, a driving circuit 11, a switch control circuit 12, a light emitting element E1, a driving control circuit 13 and a first reset circuit 14;

The control terminal of the driving circuit 11 is electrically connected to the first node N1, and is configured to generate a driving current for driving the light emitting element E1 under the control of the potential of the first node N1;

The driving circuit 11 is electrically connected to the second electrode of the light emitting element E1 through the switch control circuit 12;

The first electrode of the light emitting element E1 is electrically connected to the first voltage terminal V1;

The switch control circuit 12 is electrically connected to the switch control terminal N4, the first terminal of the driving circuit 11 and the second electrode of the light emitting element E1 respectively, and the switch control circuit 12 is configured to control the connection between the first terminal of the driving circuit 11 and the second electrode of the light emitting element E1 under the control of the potential of the switch control terminal N4;

The driving control circuit 13 is electrically connected to the first control terminal GB, the first data line DT and the switch control terminal N4 respectively, and is configured to write the light emitting time control data voltage provided by the first data line DT into the switch control terminal N4 under the control of the first control signal provided by the first control terminal GB;

The first reset circuit 14 is electrically connected to the first reset control terminal RST1, the reference voltage terminal and the second node N2 respectively, and is configured to write the reference voltage Vref provided by the reference voltage terminal into the second node N2 under the control of the first reset control signal provided by the first reset control terminal RST1;

The first terminal of the energy storage circuit 10 is electrically connected to the first node N1, and the second terminal of the energy storage circuit 10 is electrically connected to the second node N2. The energy storage circuit 10 is configured to store electrical energy.

Figure 3:
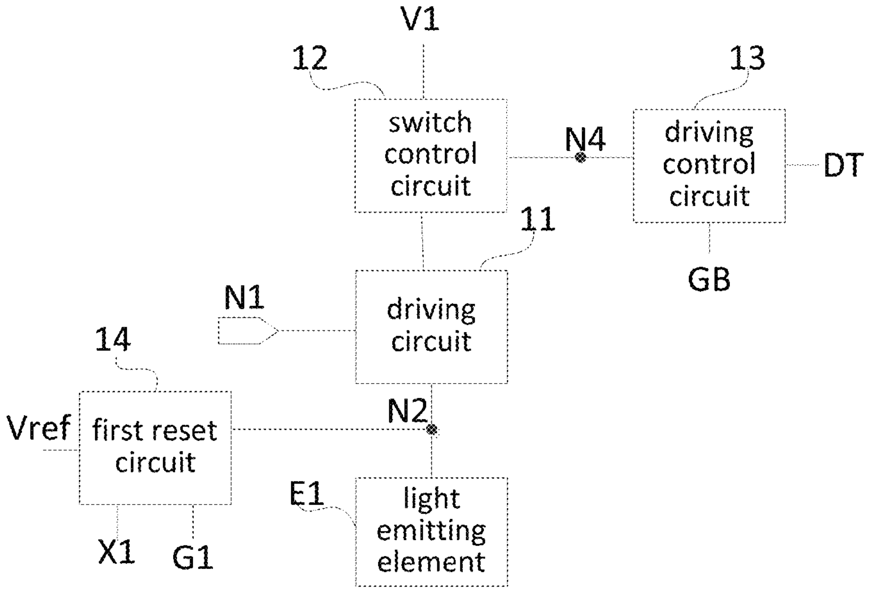
FIG. 3 is a structural diagram of a pixel circuit according to at least one embodiment of the present disclosure.

As shown in FIG. 3, the pixel circuit described in the embodiment of the present disclosure includes a driving circuit 11, a switch control circuit 12, a light emitting element E1, a driving control circuit 13 and a first reset circuit 14;

The control terminal of the driving circuit 11 is electrically connected to the first node N1, and is configured to generate a driving current for driving the light emitting element E1 under the control of the potential of the first node N1;

The driving circuit 11 is electrically connected to the first voltage terminal V1 through the switch control circuit 12;

The control terminal of the switch control circuit 12 is electrically connected to the switch control terminal N4, the first terminal of the switch control circuit 12 is electrically connected to the first voltage terminal V1, the second terminal of the switch control circuit 12 is electrically connected to the first terminal of the driving circuit 11, and the switch control circuit 12 is configured to control the connection between the first voltage terminal V1 and the first terminal of the driving circuit 11 under the control of the potential of the switch control terminal N4;

The second electrode of the light emitting element E1 is electrically connected to the second voltage terminal V2;

The driving control circuit 13 is electrically connected to the first control terminal GB, the first data line DT and the switch control terminal N4 respectively, and is configured to write the light emitting time control data voltage provided by the first data line DT into the switch control terminal N4 under the control of the first control signal provided by the first control terminal GB;

The first reset circuit 14 is electrically connected to the first selection control terminal X1, the scanning terminal G1, the reference voltage terminal and the first electrode of the light emitting element E1, respectively, and is configured to write the reference voltage Vref provided by the reference voltage terminal into the second node N2 under the control of the first selection control signal provided by the first selection control terminal X1 and the scanning signal provided by the scanning terminal G1;

The first electrode of the light emitting element E1 is electrically connected to the second node N2.

Figure 4:
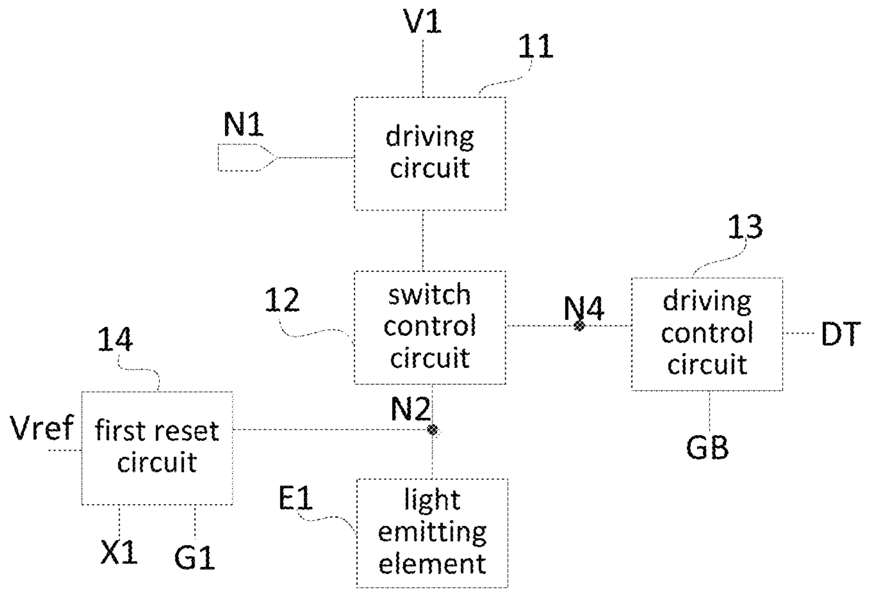
FIG. 4 is a structural diagram of a pixel circuit according to at least one embodiment of the present disclosure.

As shown in FIG. 4, the pixel circuit described in the embodiment of the present disclosure includes a driving circuit 11, a switch control circuit 12, a light emitting element E1, a driving control circuit 13 and a first reset circuit 14;

The first terminal of the driving circuit 11 is electrically connected to the first voltage terminal;

The control terminal of the driving circuit 11 is electrically connected to the first node N1, and is configured to generate a driving current for driving the light emitting element E1 under the control of the potential of the first node N1;

The control terminal of the switch control circuit 12 is electrically connected to the switch control terminal N4, the first terminal of the switch control circuit 12 is electrically connected to the second terminal of the driving circuit 11, the second terminal of the switch control circuit 12 is electrically connected to the first electrode of the light emitting element E1, and the second electrode of the light emitting element E1 is electrically connected to the second voltage terminal V2;

The switch control circuit 12 is configured to control the second terminal of the driving circuit 11 to be connected to the first electrode of the light emitting element E1 under the control of the potential of the switch control terminal N4;

The driving control circuit 13 is electrically connected to the first control terminal GB, the first data line DT and the switch control terminal N4 respectively, and is configured to write the light emitting time control data voltage provided by the first data line DT into the switch control terminal N4 under the control of the first control signal provided by the first control terminal GB;

The first reset circuit 14 is electrically connected to the first selection control terminal X1, the scanning terminal G1, the reference voltage terminal and the first electrode of the light emitting element E1, respectively, and is configured to write the reference voltage Vref provided by the reference voltage terminal into the second node N2 under the control of the first selection control signal provided by the first selection control terminal X1 and the scanning signal provided by the scanning terminal G1;

The first electrode of the light emitting element E1 is electrically connected to the second node.

In at least one embodiment of the present disclosure, the driving circuit is electrically connected to the first electrode of the light emitting element through the switch control circuit, and the switch control circuit is configured to control the connection between the driving circuit and the first electrode of the light emitting element under the control of the potential of the switch control terminal; the second electrode of the light emitting element is electrically connected to the second voltage terminal;

The first reset circuit is configured to write a set voltage into the first electrode of the light emitting element under the control of the set control signal during a reset time period set between the time period for writing-in the display data voltage and the time period for writing-in the light emitting time control data voltage.

In a specific implementation, the driving circuit can be electrically connected to the first electrode of the light emitting element through the switch control circuit. At this time, the first reset circuit can write the set voltage into the first electrode of the light emitting element under the control of the set control signal during the reset time period, so as to initialize the potential of the first electrode of the light emitting element before emitting light in each display cycle, clear the residual charge in the first electrode of the light emitting element, and improve the flicker phenomenon.

In at least one embodiment of the present disclosure, when the potential of the first electrode of the light emitting element is initialized, the light emitting element does not emit light.

When the pixel circuit described in at least one embodiment of the present disclosure is in operation, a display cycle may include a first display phase and a second display phase which are set in sequence; the first display phase may include a first reset time period, a first writing-in time period and a first light emitting time period which are set in sequence, and the second display phase may include a second reset time period, a second writing-in time period and a second light emitting time period which are set in sequence;

In the first reset time period and the second reset time period, the first reset circuit writes a set voltage into the first electrode of the light emitting element under the control of the set control signal;

In a first writing-in time period, writing-in a display data voltage;

In the first light emitting time period, the driving circuit drives the light emitting element to emit light according to the display data voltage;

In the second writing-in time period, writing-in the light emitting time control data voltage;

In the second light emitting time period, the driving circuit controls the data voltage according to the light emitting time to control whether the light emitting element emits light.

The reset time period provided between the time period for writing-in the display data voltage and the time period for writing-in the light emitting time control data voltage may be the second reset time period.

Optionally, the first electrode of the light emitting element is electrically connected to the first voltage terminal;

The driving circuit is electrically connected to the second electrode of the light emitting element through the switch control circuit, and the switch control circuit is configured to control the connection between the driving circuit and the first voltage terminal under the control of the potential of the switch control terminal;

The first reset circuit is configured to write a set voltage into the second electrode of the light emitting element under the control of the set control signal.

In a specific implementation, the first electrode of the light emitting element can be electrically connected to the first voltage terminal, and the driving circuit can be electrically connected to the second electrode of the light emitting element through the switch control circuit. At this time, the first reset circuit can write the set voltage into the second electrode of the light emitting element under the control of the set control signal during the reset time period, so as to initialize the potential of the second electrode of the light emitting element before emitting light in each display cycle, clear the residual charge at the second electrode of the light emitting element, and improve the flicker phenomenon.

In at least one embodiment of the present disclosure, when the potential of the second electrode of the light emitting element is initialized, the light emitting element does not emit light.

When the pixel circuit described in at least one embodiment of the present disclosure is in operation, a display cycle may include a first display phase and a second display phase which are set in sequence; the first display phase may include a first reset time period, a first writing-in time period and a first light emitting time period which are set in sequence, and the second display phase may include a second reset time period, a second writing-in time period and a second light emitting time period which are set in sequence.

In the first reset time period and the second reset time period, the first reset circuit writes a set voltage into the second electrode of the light emitting element under the control of the set control signal;

In a first writing-in time period, writing-in a display data voltage;

In the first light emitting time period, the driving circuit drives the light emitting element to emit light according to the display data voltage;

In the second writing-in time period, writing-in the light emitting time control data voltage;

In the second light emitting time period, the driving circuit controls the data voltage according to the light emitting time to control whether the light emitting element emits light.

The reset time period provided between the time period for writing-in the display data voltage and the time period for writing-in the light emitting time control data voltage may be the second reset time period.

In at least one embodiment of the present disclosure, the pixel circuit further includes an energy storage circuit;

The first terminal of the energy storage circuit is electrically connected to the first node, the second terminal of the energy storage circuit is electrically connected to the first electrode of the light emitting element, and the energy storage circuit is configured to store electrical energy;

The first terminal of the switch control circuit is electrically connected to the first voltage terminal, the second terminal of the switch control circuit is electrically connected to the first terminal of the driving circuit, the second terminal of the driving circuit is electrically connected to the first electrode of the light emitting element, and the second electrode of the light emitting element is electrically connected to the second voltage terminal; the switch control circuit is configured to control the connection between the first voltage terminal and the first terminal of the driving circuit under the control of the potential of the switch control terminal; or the first terminal of the driving circuit is electrically connected to the first voltage terminal; the first terminal of the switch control circuit is electrically connected to the second terminal of the driving circuit, the second terminal of the switch control circuit is electrically connected to the first electrode of the light emitting element, and the second terminal of the light emitting element is electrically connected to the second voltage terminal; the switch control circuit is configured to control the connection between the second terminal of the driving circuit and the first electrode of the light emitting element under the control of the potential of the switch control terminal;

The first reset circuit includes a compensation circuit and a switch circuit; the set control terminal includes a scanning terminal and a first selection control terminal;

The compensation circuit is electrically connected to the scanning terminal, the first electrode of the light emitting element and the control node respectively, and is configured to control the first electrode of the light emitting element to be connected to the control node under the control of the scanning signal provided by the scanning terminal; or, the compensation circuit is electrically connected to the scanning terminal, the second terminal of the driving circuit and the control node respectively, and is configured to control the second terminal of the driving circuit to be connected to the control node under the control of the scanning signal;

The switch circuit is connected to the first selection control terminal, the control node and the set voltage terminal respectively, and is configured to provide the set voltage written by the set voltage terminal provided to the control node under the control of the first selection control signal provided by the first selection control terminal.

Figure 5:
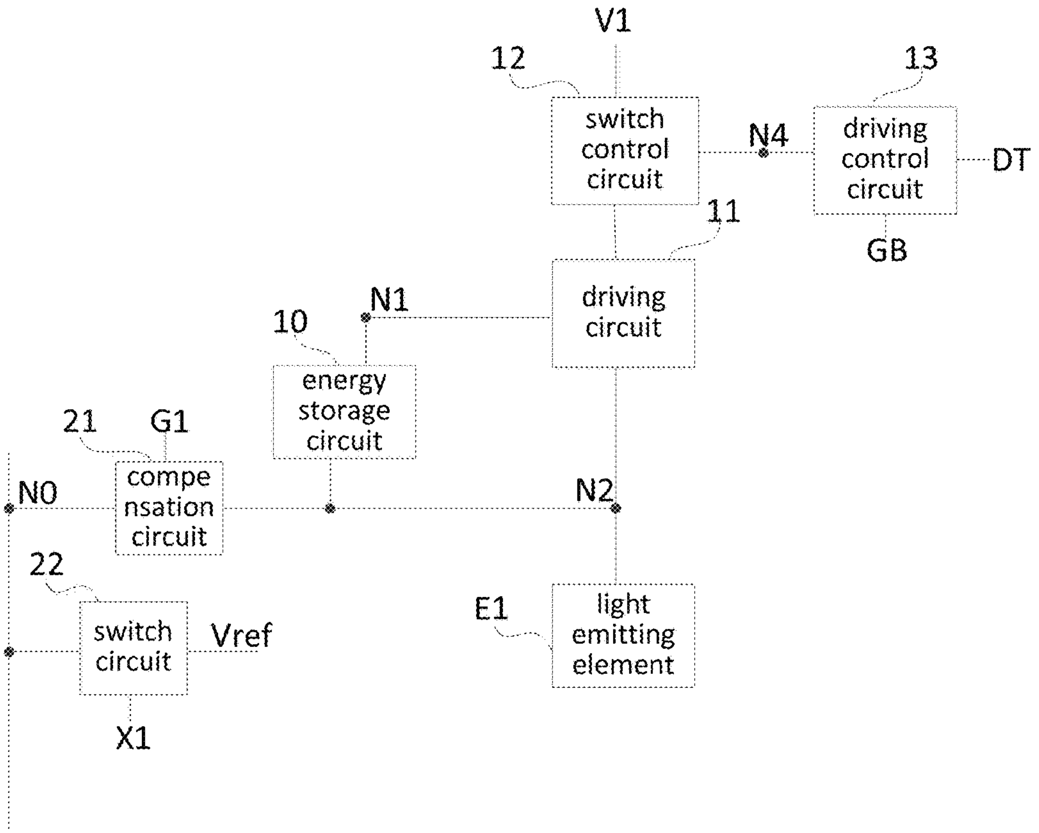
FIG. 5 is a structural diagram of a pixel circuit according to at least one embodiment of the present disclosure.

As shown in FIG. 5, based on the pixel circuit shown in FIG. 3, the pixel circuit further includes a storage circuit 10 and a first reset circuit;

The first terminal of the energy storage circuit 10 is electrically connected to the first node N1, the second terminal of the energy storage circuit 10 is electrically connected to the first electrode of the light emitting element E1, and the energy storage circuit 10 is configured to store electrical energy;

The first reset circuit includes a compensation circuit 21 and a switch circuit 22; the set control terminal includes a scanning terminal G1 and a first selection control terminal X1;

The compensation circuit 21 is electrically connected to the scanning terminal G1, the first electrode of the light emitting element E1 and the control node NO respectively, and is configured to control the connection between the first electrode of the light emitting element E1 and the control node NO under the control of the scanning signal provided by the scanning terminal G1;

The switch circuit 22 is connected to the first selection control terminal X1, the control node N0 and the reference voltage terminal respectively, and is configured to provide the reference voltage Vref written by the reference voltage terminal to the control node N0 under the control of the first selection control signal provided by the first selection control terminal X1.

Figure 6:
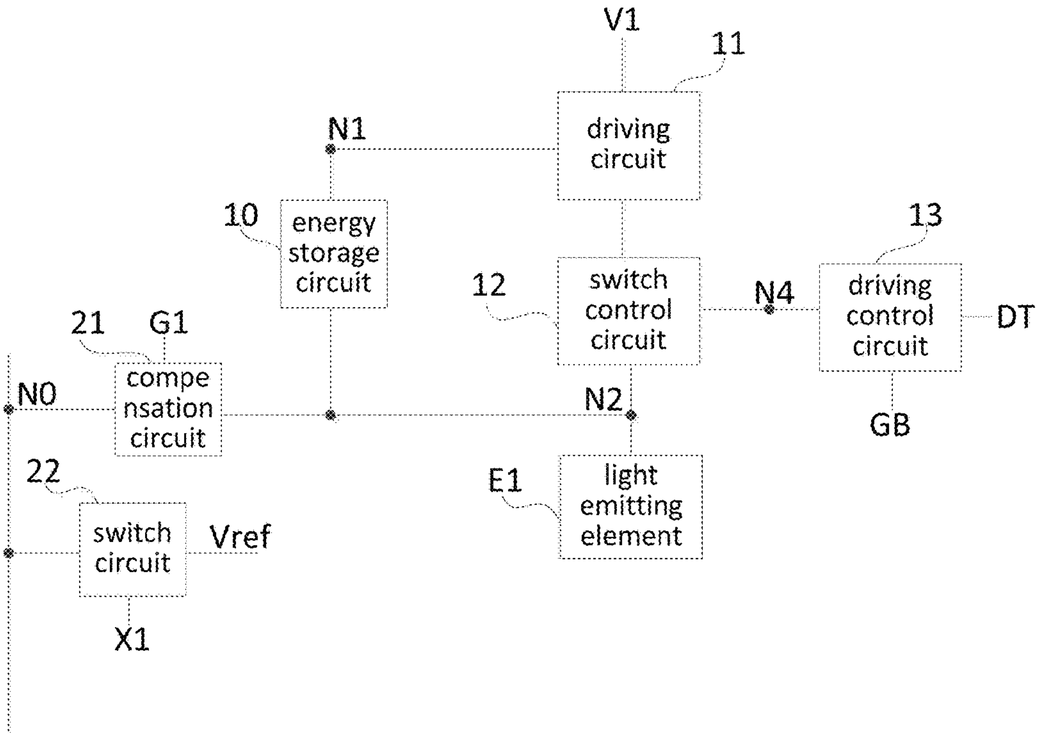
FIG. 6 is a structural diagram of a pixel circuit according to at least one embodiment of the present disclosure.

As shown in FIG. 6, based on the pixel circuit shown in FIG. 4, the pixel circuit further includes a storage circuit 10 and a first reset circuit;

The first terminal of the energy storage circuit 10 is electrically connected to the first node N1, the second terminal of the energy storage circuit 10 is electrically connected to the first electrode of the light emitting element E1, and the energy storage circuit 10 is configured to store electrical energy;

The first reset circuit includes a compensation circuit 21 and a switch circuit 22; the set control terminal includes a scanning terminal G1 and a first selection control terminal X1;

The compensation circuit 21 is electrically connected to the scanning terminal G1, the first electrode of the light emitting element E1 and the control node N0 respectively, and is configured to control the second terminal of the driving circuit 11 to be connected to the control node N0 under the control of the scanning signal provided by the scanning terminal G1;

The switch circuit 22 is connected to the first selection control terminal X1, the control node N0 and the reference voltage terminal respectively, and is configured to provide the reference voltage Vref provided by the reference voltage terminal to the control node N0 under the control of the first selection control signal provided by the first selection control terminal X1.

In at least one embodiment of the present disclosure, the pixel circuit further includes an energy storage circuit;

a first terminal of the energy storage circuit is electrically connected to the first node, a second terminal of the energy storage circuit is electrically connected to the second electrode of the light emitting element, and the energy storage circuit is configured to store electrical energy;

the first electrode of the light emitting element is electrically connected to the first voltage terminal, the first terminal of the switch control circuit is electrically connected to the second electrode of the light emitting element, the second terminal of the switch control circuit is electrically connected to the first terminal of the driving circuit, and the second terminal of the driving circuit is electrically connected to the second voltage terminal; the switch control circuit is configured to control the second electrode of the light emitting element to be connected to the first terminal of the driving circuit under the control of the potential of the switch control terminal; or the first electrode of the light emitting element is electrically connected to the first voltage terminal, and the second electrode of the light emitting element is electrically connected to the first terminal of the driving circuit; the first terminal of the switch control circuit is electrically connected to the second terminal of the driving circuit, and the second terminal of the switch control circuit is electrically connected to the second voltage terminal; the switch control circuit is configured to control the second terminal of the driving circuit to be connected to the first electrode of the light emitting element under the control of the potential of the switch control terminal;

The first reset circuit includes a compensation circuit and a switch circuit; the set control terminal includes a scanning terminal and a first selection control terminal;

The compensation circuit is electrically connected to the scanning terminal, the second electrode of the light emitting element and the control node respectively, and is configured to control the second electrode of the light emitting element to be connected to the control node under the control of the scanning signal; or the compensation circuit is electrically connected to the scanning terminal, the first terminal of the driving circuit and the control node respectively, and is configured to control the first terminal of the driving circuit to be connected to the control node under the control of the scanning signal;

The switch circuit is connected to the first selection control terminal, the control node and the set voltage terminal respectively, and is configured to write the set voltage provided by the set voltage terminal to the control node under the control of the first selection control signal provided by the first selection control terminal.

Figure 7:
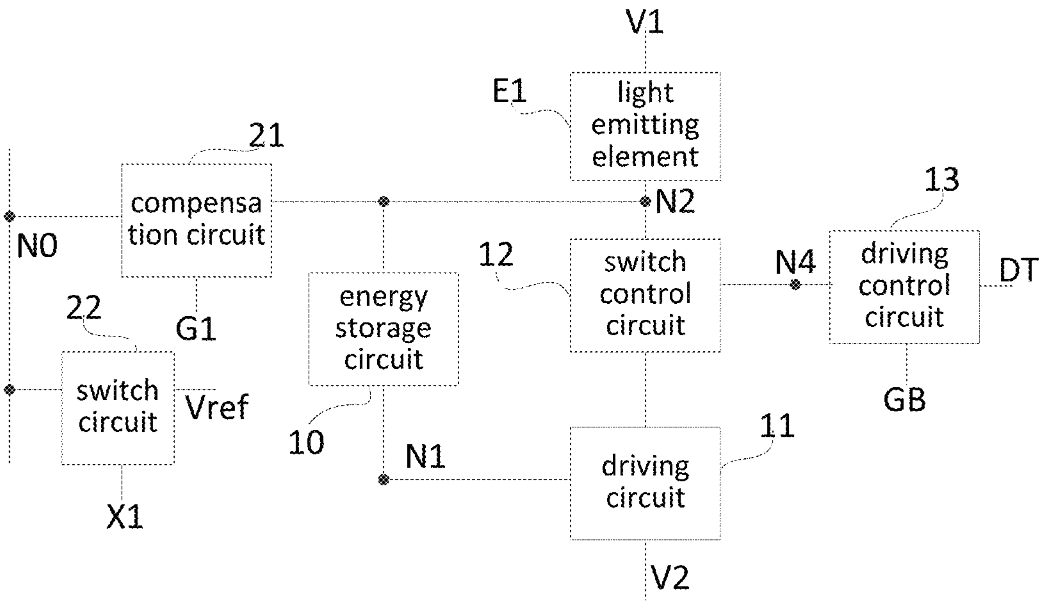
FIG. 7 is a structural diagram of a pixel circuit according to at least one embodiment of the present disclosure.

As shown in FIG. 7, the pixel circuit according to at least one embodiment of the present disclosure includes a driving circuit 11, a switch control circuit 12, a light emitting element E1, a driving control circuit 13, an energy storage circuit 10 and a first reset circuit;

The first terminal of the energy storage circuit 10 is electrically connected to the first node N1, the second terminal of the energy storage circuit 10 is electrically connected to the second electrode of the light emitting element E1, and the energy storage circuit 10 is configured to store electric energy; the second electrode of the light emitting element E1 is electrically connected to the second node N2;

The first electrode of the light emitting element E1 is electrically connected to the first voltage terminal V1, the first terminal of the switch control circuit 12 is electrically connected to the second electrode of the light emitting element E1, the second terminal of the switch control circuit 12 is electrically connected to the first terminal of the driving circuit 11, and the second terminal of the driving circuit 11 is electrically connected to the second voltage terminal V2;

The control terminal of the switch control circuit 12 is electrically connected to the switch control terminal N4; the switch control circuit 12 is configured to control the second electrode of the light emitting element E1 to be connected to the first terminal of the driving circuit 11 under the control of the potential of the switch control terminal N4;

The control terminal of the driving circuit 11 is electrically connected to the first node N1, and is configured to generate a driving current for driving the light emitting element E1 under the control of the potential of the first node N1;

The driving control circuit 13 is electrically connected to the first control terminal GB, the first data line DT and the switch control terminal N4 respectively, and is configured to write the light emitting time control data voltage provided by the first data line DT into the switch control terminal N4 under the control of the first control signal provided by the first control terminal GB;

The first reset circuit includes a compensation circuit 21 and a switch circuit 22; the set control terminal includes a scanning terminal G1 and a first selection control terminal;

The compensation circuit 21 is electrically connected to the scanning terminal G1, the second electrode of the light emitting element E1 and the control node N0 respectively, and is configured to control the second electrode of the light emitting element E1 to be connected to the control node N0 under the control of the scanning signal provided by the scanning terminal G1;

The switch circuit 22 is connected to the first selection control terminal X1, the control node N0 and the reference voltage terminal respectively, and is configured to write the reference voltage Vref provided by the reference voltage terminal into the control node N0 under the control of the first selection control signal provided by the first selection control terminal X1.

Figure 8:
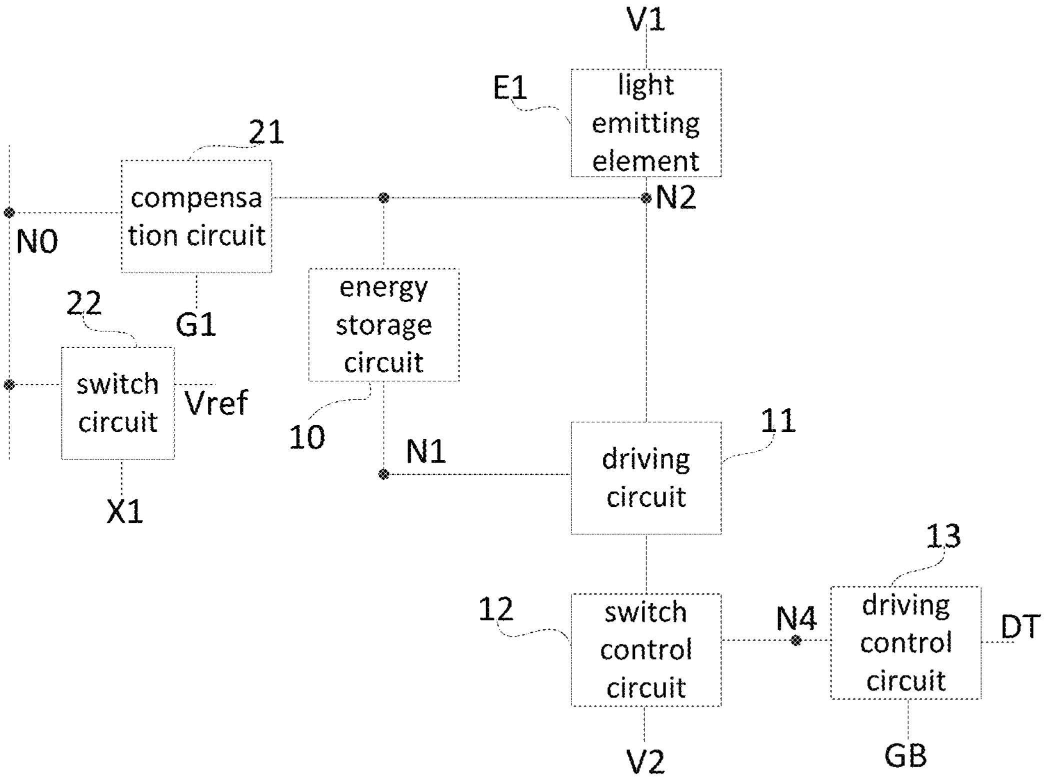
FIG. 8 is a structural diagram of a pixel circuit according to at least one embodiment of the present disclosure.

As shown in FIG. 8, the pixel circuit according to at least one embodiment of the present disclosure includes a driving circuit 11, a switch control circuit 12, a light emitting element E1, a driving control circuit 13, a storage circuit 10 and a first reset circuit;

The first terminal of the energy storage circuit 10 is electrically connected to the first node N1, the second terminal of the energy storage circuit 10 is electrically connected to the second electrode of the light emitting element E1, and the energy storage circuit 10 is configured to store electric energy; the second electrode of the light emitting element E1 is electrically connected to the second node N2;

The first electrode of the light emitting element E1 is electrically connected to the first voltage terminal V1, and the second electrode of the light emitting element E1 is electrically connected to the first terminal of the driving circuit 11; the first terminal of the switch control circuit 12 is electrically connected to the second terminal of the driving circuit 11, and the second terminal of the switch control circuit 12 is electrically connected to the second voltage terminal V2;

The control terminal of the switch control circuit 12 is electrically connected to the switch control terminal N4; the switch control circuit 12 is configured to control the second terminal of the driving circuit 11 to be connected to the first electrode of the light emitting element E1 under the control of the potential of the switch control terminal N4;

The control terminal of the driving circuit 11 is electrically connected to the first node N1, and is configured to generate a driving current for driving the light emitting element E1 under the control of the potential of the first node N1;

The driving control circuit 13 is electrically connected to the first control terminal GB, the first data line DT and the switch control terminal N4 respectively, and is configured to write the light emitting time control data voltage provided by the first data line DT into the switch control terminal N4 under the control of the first control signal provided by the first control terminal GB;

The first reset circuit includes a compensation circuit 21 and a switch circuit 22; the set control terminal includes a scanning terminal G1 and a first selection control terminal X1;

The compensation circuit 21 is electrically connected to the scanning terminal G1, the second electrode of the light emitting element E1 and the control node N0 respectively, and is configured to control the connection between the first terminal of the driving circuit 11 and the control node N0 under the control of the scanning signal provided by the scanning terminal G1;

The switch circuit 22 is connected to the first selection control terminal X1, the control node N0 and the reference voltage terminal respectively, and is configured to write the reference voltage Vref provided by the reference voltage terminal into the control node N0 under the control of the first selection control signal provided by the first selection control terminal X1.

In at least one embodiment of the present disclosure, the driving control circuit is also electrically connected to the second control terminal and the second initial voltage terminal, respectively, and is configured to write the second initial voltage provided by the second initial voltage terminal into the switch control terminal under the control of a second control signal provided by the second control terminal, and to maintain the potential of the switch control terminal.

In a specific implementation, the driving control circuit may also write the second initial voltage into the switch control terminal and maintain the potential of the switch control terminal under the control of the second control signal.

Figure 9:
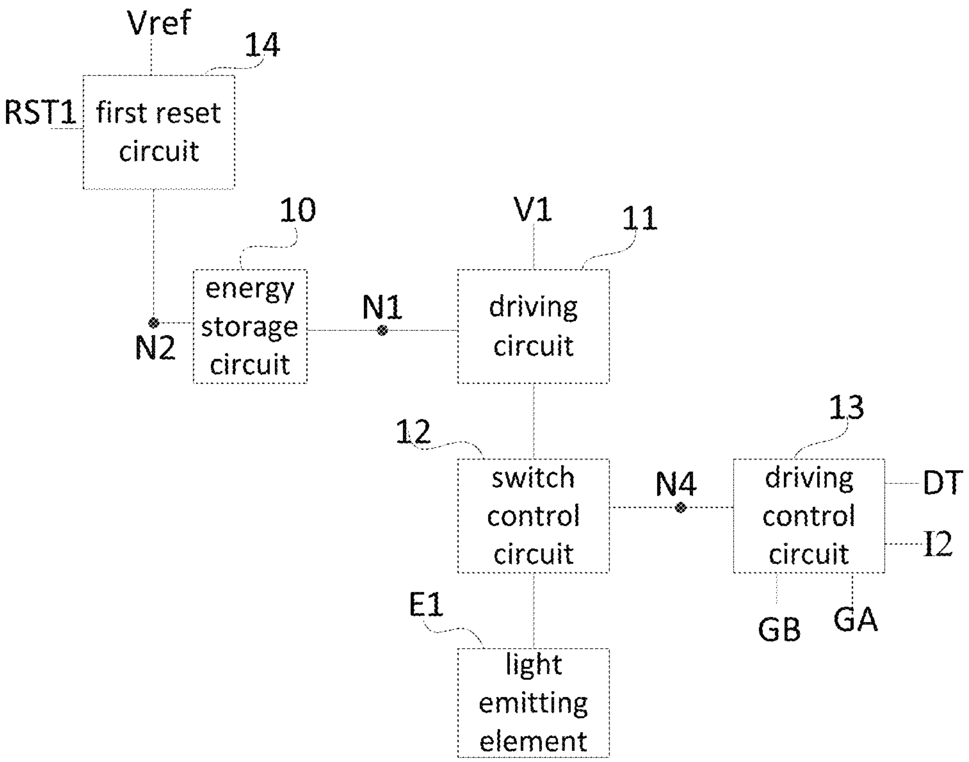
FIG. 9 is a structural diagram of a pixel circuit according to at least one embodiment of the present disclosure.

As shown in FIG. 9, based on the pixel circuit shown in FIG. 1, the driving control circuit 12 is also electrically connected to the second control terminal GA and the second initial voltage terminal I2, respectively, and is configured to write the second initial voltage provided by the second initial voltage terminal I2 into the switch control terminal N4 under the control of the second control signal provided by the second control terminal GA, and to maintain the potential of the switch control terminal N4.

Figure 10:
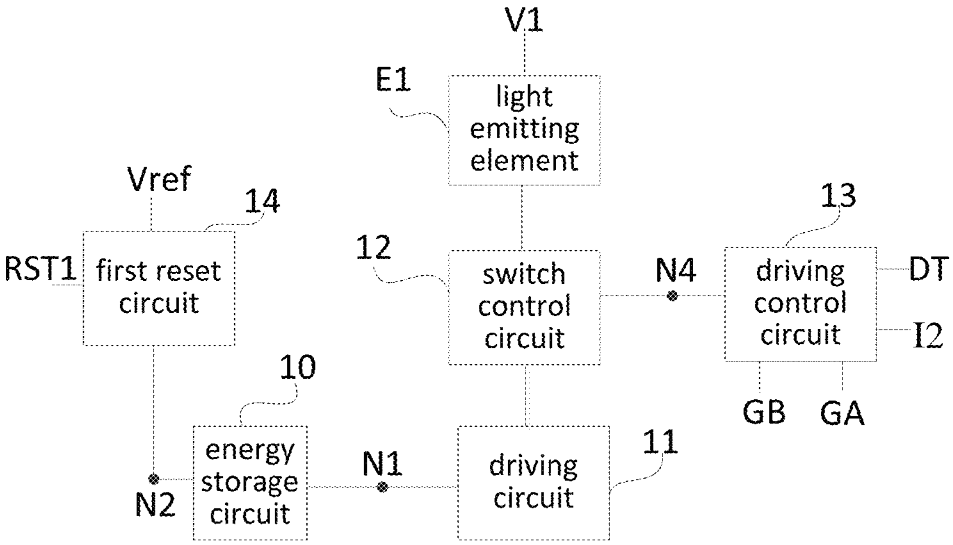
FIG. 10 is a structural diagram of a pixel circuit according to at least one embodiment of the present disclosure.

As shown in FIG. 10, based on the pixel circuit shown in FIG. 2, the driving control circuit 12 is also electrically connected to the second control terminal GA and the second initial voltage terminal I2, respectively, and is configured to write the second initial voltage provided by the second initial voltage terminal I2 into the switch control terminal N4 under the control of the second control signal provided by the second control terminal GA, and to maintain the potential of the switch control terminal N4.

Figure 11:
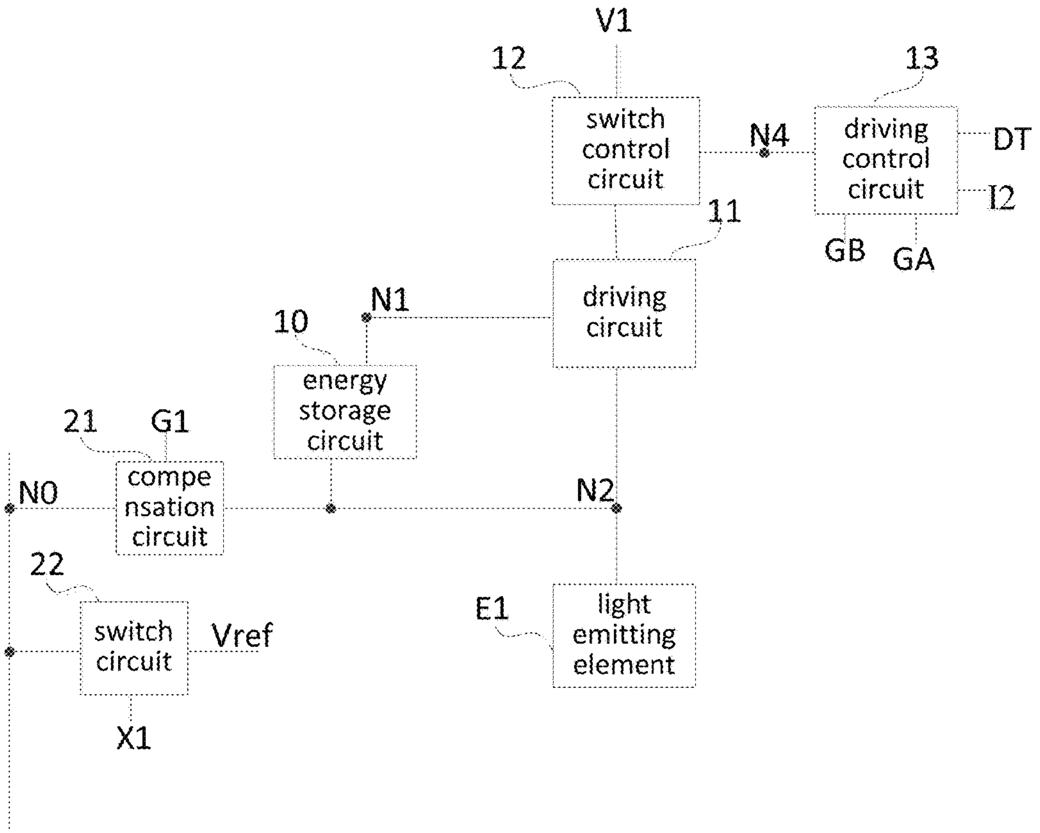
FIG. 11 is a structural diagram of a pixel circuit according to at least one embodiment of the present disclosure.

As shown in FIG. 11, based on the pixel circuit shown in FIG. 5, the driving control circuit 12 is also electrically connected to the second control terminal GA and the second initial voltage terminal I2, respectively, and is configured to write the second initial voltage provided by the second initial voltage terminal I2 into the switch control terminal N4 under the control of the second control signal provided by the second control terminal GA, and to maintain the potential of the switch control terminal N4.

Figure 12:
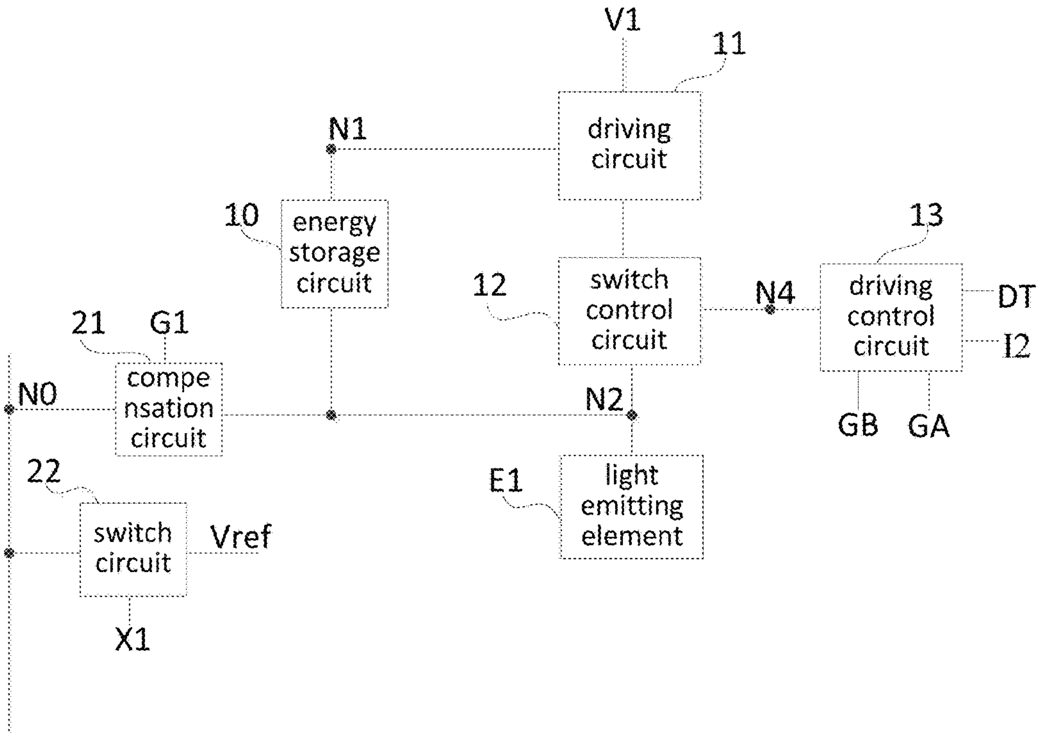
FIG. 12 is a structural diagram of a pixel circuit according to at least one embodiment of the present disclosure.

As shown in FIG. 12, based on the pixel circuit shown in FIG. 6, the driving control circuit 12 is also electrically connected to the second control terminal GA and the second initial voltage terminal I2, respectively, and is configured to write the second initial voltage provided by the second initial voltage terminal I2 into the switch control terminal N4 under the control of the second control signal provided by the second control terminal GA, and to maintain the potential of the switch control terminal N4.

Figure 13:
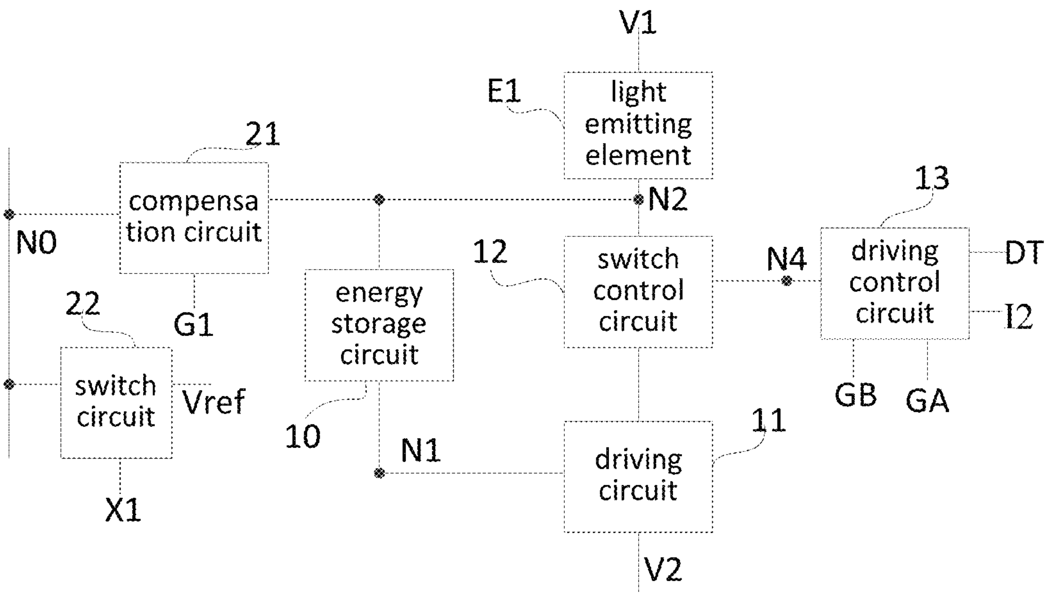
FIG. 13 is a structural diagram of a pixel circuit according to at least one embodiment of the present disclosure.

As shown in FIG. 13, based on the pixel circuit shown in FIG. 7, the driving control circuit 12 is also electrically connected to the second control terminal GA and the second initial voltage terminal I2, respectively, and is configured to write the second initial voltage provided by the second initial voltage terminal I2 into the switch control terminal N4 under the control of the second control signal provided by the second control terminal GA, and to maintain the potential of the switch control terminal N4.

Figure 14:
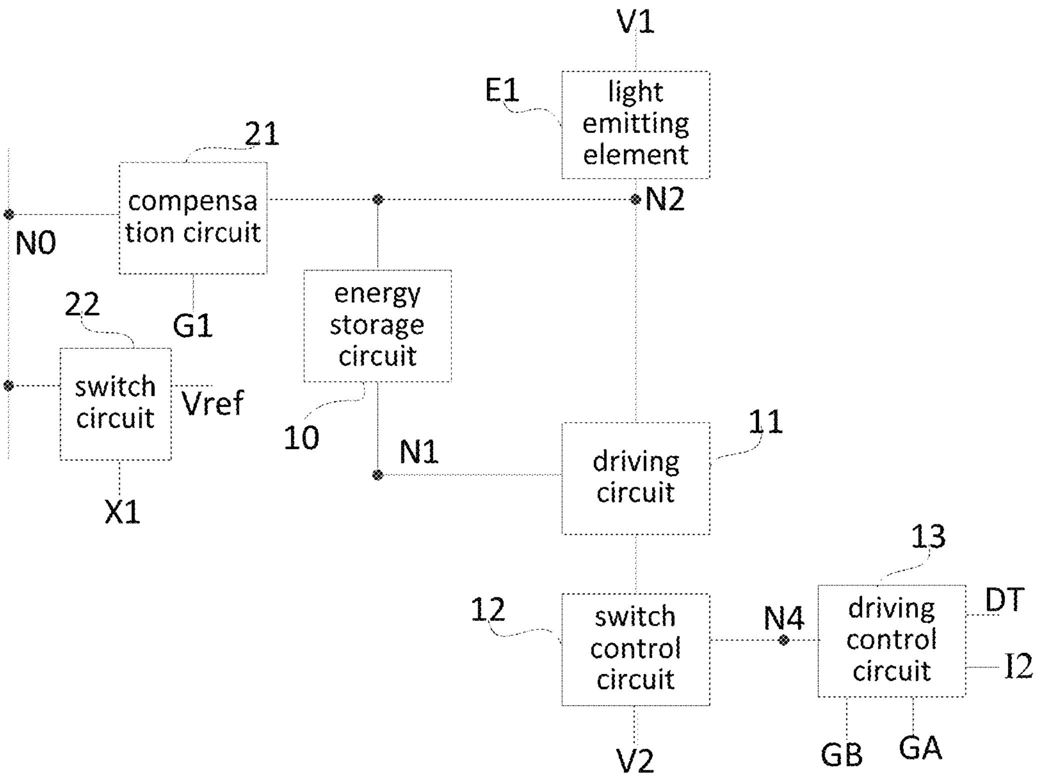
FIG. 14 is a structural diagram of a pixel circuit according to at least one embodiment of the present disclosure.

As shown in FIG. 14, based on the pixel circuit shown in FIG. 8, the driving control circuit 12 is also electrically connected to the second control terminal GA and the second initial voltage terminal I2, respectively, and is configured to write the second initial voltage provided by the second initial voltage terminal I2 into the switch control terminal N4 under the control of the second control signal provided by the second control terminal GA, and to maintain the potential of the switch control terminal N4.

Optionally, the first terminal of the driving circuit is electrically connected to the first voltage terminal;

The switch control circuit is electrically connected to the second terminal of the driving circuit and the first electrode of the light emitting element respectively, and the second electrode of the light emitting element is electrically connected to the second voltage terminal;

The switch control circuit is configured to control the connection between the second terminal of the driving circuit and the first terminal of the light emitting element under the control of the potential of the switch control terminal.

In a specific implementation, the switch control circuit can control the connection between the second terminal of the driving circuit and the first terminal of the light emitting element under the control of the potential of the switch control terminal.

The pixel circuit described in at least one embodiment of the present disclosure further includes a light emitting control circuit and a compensation control circuit;

The switch control circuit is electrically connected to the first electrode of the light emitting element through the light emitting control circuit;

The light emitting control circuit is also electrically connected to the light emitting control terminal, and is configured to control the connection between the switch control circuit and the first electrode of the light emitting element under the control of the light emitting control signal provided by the light emitting control terminal;

The compensation control circuit is electrically connected to the scanning terminal, the control terminal of the driving circuit and the second terminal of the driving circuit respectively, and is configured to control the connection between the control terminal of the driving circuit and the second terminal of the driving circuit under the control of the scanning signal provided by the scanning terminal.

In a specific implementation, the pixel circuit may further include a light emitting control circuit and a compensation control circuit. The light emitting control circuit controls the switch control circuit to be connected to the first electrode of the light emitting element under the control of a light emitting control signal, to perform light emitting control; and the compensation control circuit controls the control terminal of the driving circuit to be connected to the second terminal of the driving circuit under the control of a scanning signal, to perform threshold voltage compensation.

Optionally, the light emitting element is an inorganic light emitting diode, the width-to-length ratio of the transistor included in the switch control circuit is greater than 1, the width-to-length ratio of the transistor included in the light emitting control circuit is greater than 1, and the width-to-length ratio of the transistor included in the driving circuit is greater than 0.5.

In a specific implementation, the light emitting element may be an inorganic light emitting diode, the width-to-length ratio of the transistor included in the switch control circuit may be greater than 1, the width-to-length ratio of the transistor included in the light emitting control circuit may be greater than 1, and the width-to-length ratio of the transistor included in the driving circuit may be greater than 0.5.

Figure 15:
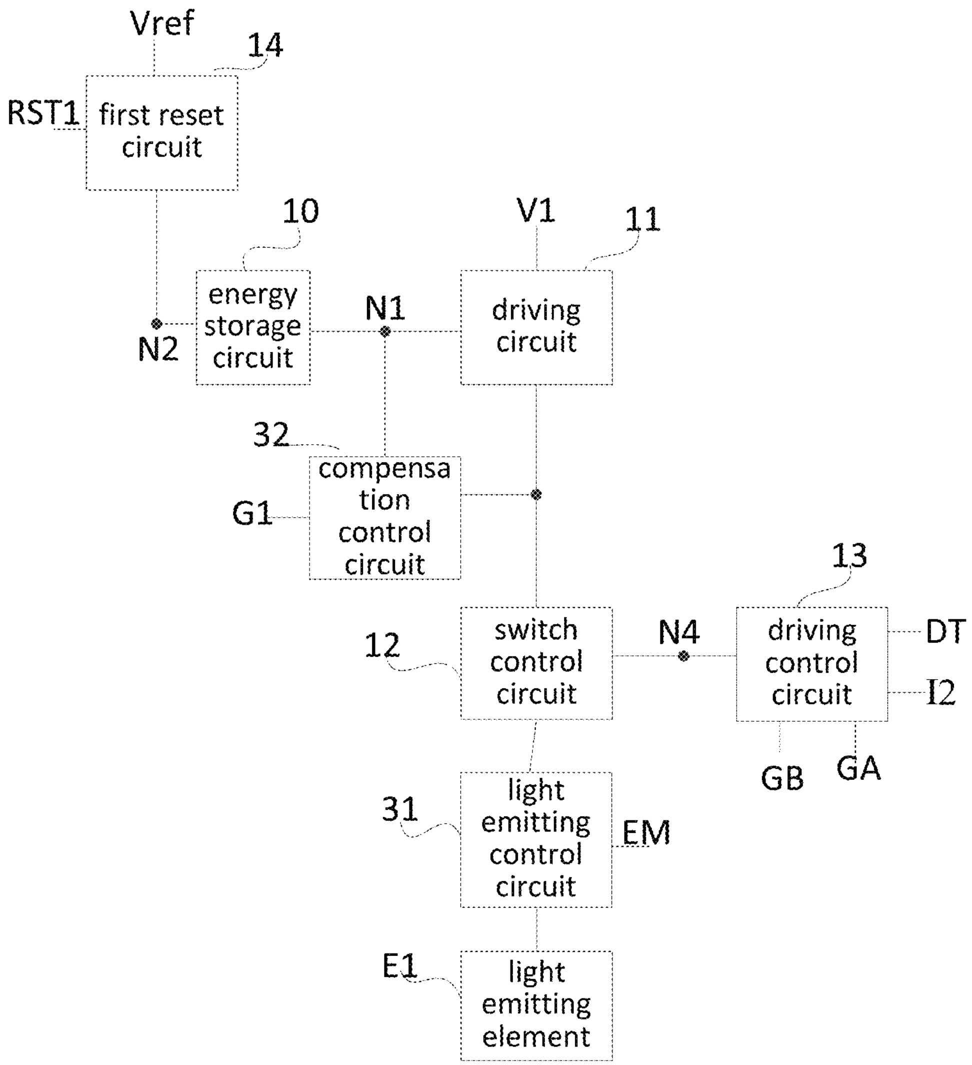
FIG. 15 is a structural diagram of a pixel circuit according to at least one embodiment of the present disclosure.

As shown in FIG. 15, based on at least one embodiment of the driving circuit shown in FIG. 9, the pixel circuit according to at least one embodiment of the present disclosure further includes a light emitting control circuit 31 and a compensation control circuit 32 (T5);

The switch control circuit 12 is electrically connected to the first electrode of the light emitting element E1 through the light emitting control circuit 31;

The light emitting control circuit E1 is also electrically connected to the light emitting control terminal EM, and is configured to control the connection between the switch control circuit 12 and the first electrode of the light emitting element E1 under the control of the light emitting control signal provided by the light emitting control terminal EM;

The compensation control circuit 32 is electrically connected to the scanning terminal G1, the control terminal of the driving circuit 11 and the second terminal of the driving circuit 11 respectively, and is configured to control the connection between the control terminal of the driving circuit 11 and the second terminal of the driving circuit 11 under the control of the scanning signal provided by the scanning terminal G1.

In at least one embodiment of the present disclosure, the first electrode of the light emitting element is electrically connected to the first voltage terminal, the switch control circuit is electrically connected to the second electrode of the light emitting element and the first terminal of the driving circuit respectively, and the second terminal of the driving circuit is electrically connected to the second voltage terminal;

The switch control circuit is configured to control the connection between the second electrode of the light emitting element and the first terminal of the driving circuit under the control of the potential of the switch control terminal.

The pixel circuit described in at least one embodiment of the present disclosure further includes a light emitting control circuit and a compensation control circuit;

The switch control circuit is electrically connected to the first terminal of the driving circuit through the light emitting control circuit;

The light emitting control circuit is also electrically connected to the light emitting control terminal, and is configured to control the connection between the switch control circuit and the first terminal of the driving circuit under the control of the light emitting control signal provided by the light emitting control terminal;

The compensation control circuit is electrically connected to the scanning terminal, the control terminal of the driving circuit and the first terminal of the driving circuit respectively, and is configured to control the connection between the control terminal of the driving circuit and the first terminal of the driving circuit under the control of the scanning signal provided by the scanning terminal.

In a specific implementation, the pixel circuit may further include a light emitting control circuit and a compensation control circuit. The light emitting control circuit controls the switch control circuit to be connected to the first terminal of the driving circuit under the control of a light emitting control signal, to perform light emitting control; the compensation control circuit controls the control terminal of the driving circuit to be connected to the first terminal of the driving circuit under the control of a scanning signal, to perform threshold voltage compensation.

Figure 16:
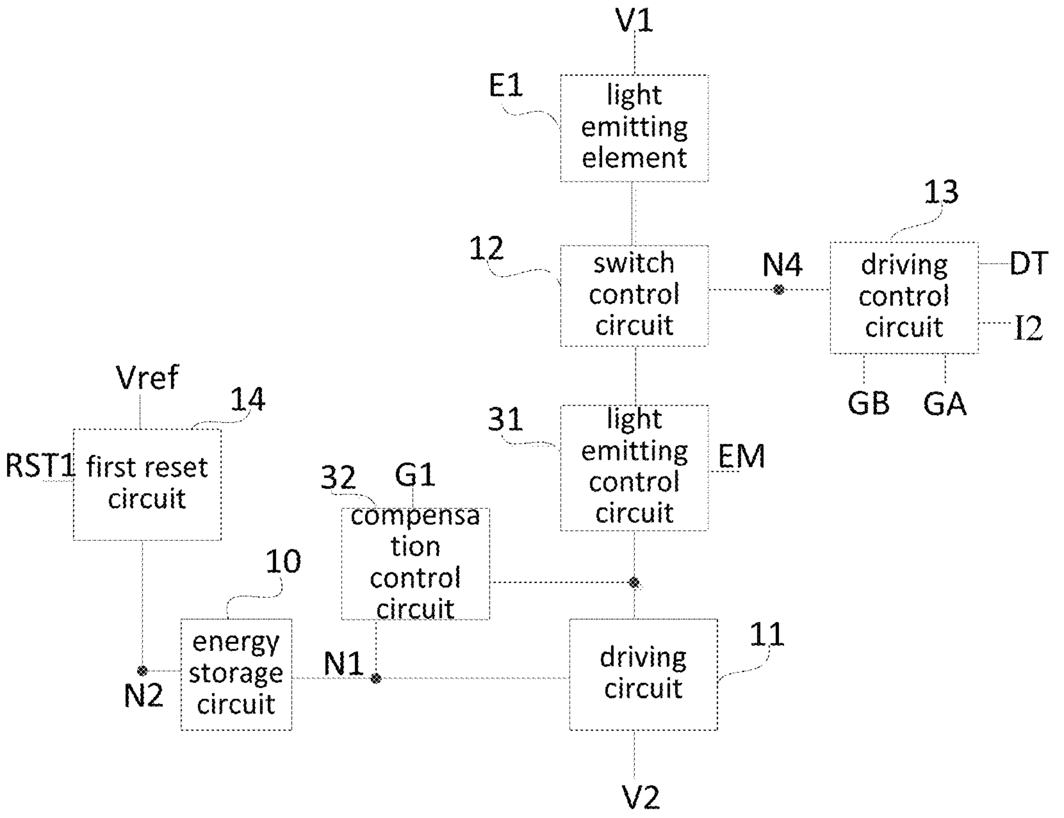
FIG. 16 is a structural diagram of a pixel circuit according to at least one embodiment of the present disclosure.

As shown in FIG. 16, based on at least one embodiment of the driving circuit shown in FIG. 10, the pixel circuit according to at least one embodiment of the present disclosure further includes a light emitting control circuit 31 and a compensation control circuit 32 (T5);

The switch control circuit 12 is electrically connected to a first terminal of the driving circuit 11 through the light emitting control circuit 31; a second terminal of the driving circuit 11 is electrically connected to a second voltage terminal V2;

The light emitting control circuit 31 is also electrically connected to the light emitting control terminal EM, and is configured to control the connection between the switch control circuit 12 and the first terminal of the driving circuit 11 under the control of the light emitting control signal provided by the light emitting control terminal EM;

The compensation control circuit 32 is electrically connected to the scanning terminal G1, the control terminal of the driving circuit 11 and the first terminal of the driving circuit 11 respectively, and is configured to control the connection between the control terminal of the driving circuit 11 and the first terminal of the driving circuit 11 under the control of the scanning signal provided by the scanning terminal G1.

The pixel circuit described in at least one embodiment of the present disclosure further includes a display data writing-in circuit and a first control circuit;

The control terminal of the driving circuit is electrically connected to the first node;

The display data writing-in circuit is electrically connected to the scanning terminal, the second data line and the second node respectively, and is configured to write the display data voltage provided by the second data line into the second node under the control of the scanning signal provided by the scanning terminal;

The first control circuit is electrically connected to the light emitting control terminal, the reference voltage terminal and the second node respectively, and is configured to write the reference voltage provided by the reference voltage terminal into the second node under the control of the light emitting control signal provided by the light emitting control terminal.

In a specific implementation, the pixel circuit described in at least one embodiment of the present disclosure may also include a display data writing-in circuit and a first control circuit; the display data writing-in circuit writes the display data voltage provided by the second data line into the second node under the control of the scanning signal; the first control circuit writes the reference voltage into the second node under the control of the light emitting control signal.

Figure 17:
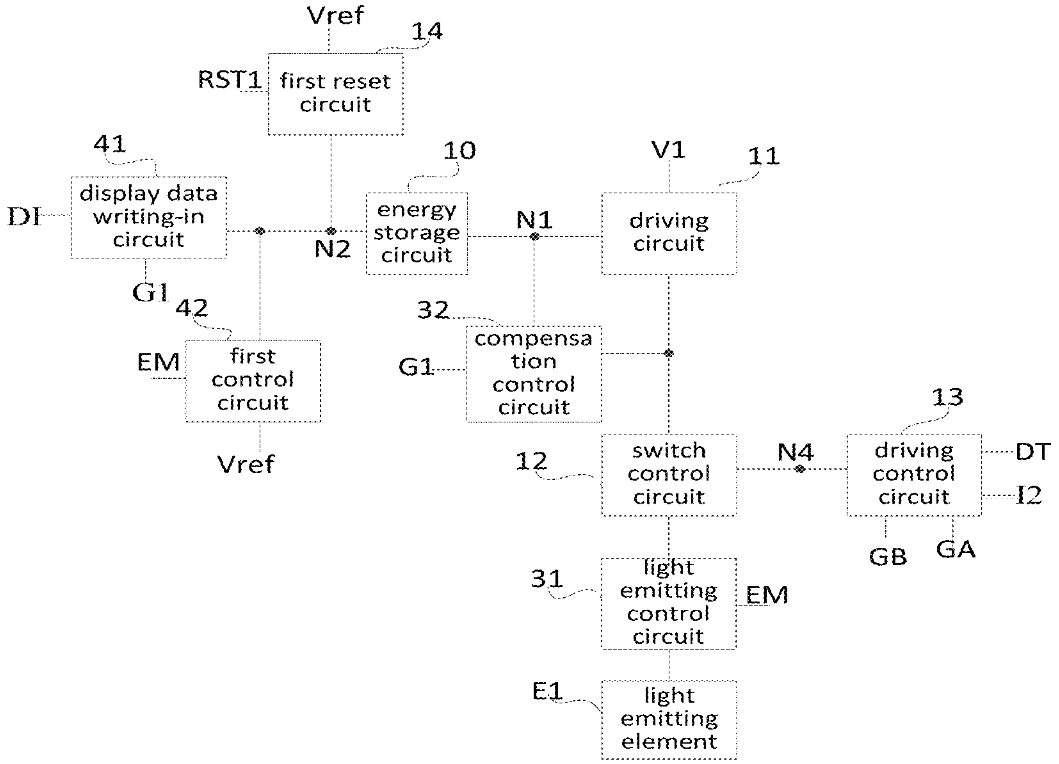
FIG. 17 is a structural diagram of a pixel circuit according to at least one embodiment of the present disclosure.

As shown in FIG. 17, based on the pixel circuit shown in FIG. 15, the pixel circuit described in at least one embodiment of the present disclosure further includes a display data writing-in circuit 41 and a first control circuit 42;

The control terminal of the driving circuit 11 is electrically connected to the first node N1;

The display data writing-in circuit 41 is electrically connected to the scanning terminal G1, the second data line DI and the second node N2 respectively, and is configured to write the display data voltage provided by the second data line DI into the second node N2 under the control of the scanning signal provided by the scanning terminal G1;

The first control circuit 42 is electrically connected to the light emitting control terminal EM, the reference voltage terminal and the second node N2 respectively, and is configured to write the reference voltage Vref provided by the reference voltage terminal into the second node N2 under the control of the light emitting control signal provided by the light emitting control terminal EM.

Figure 18:
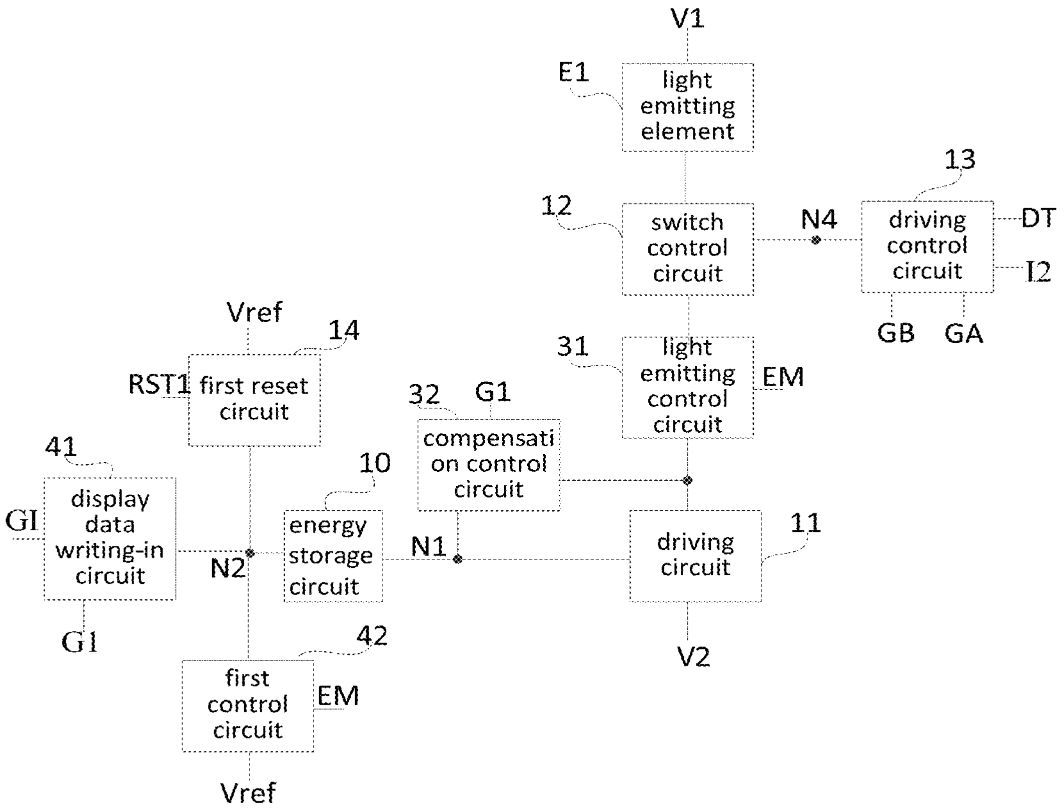
FIG. 18 is a structural diagram of a pixel circuit according to at least one embodiment of the present disclosure.

As shown in FIG. 18, based on the pixel circuit shown in FIG. 16, the pixel circuit described in at least one embodiment of the present disclosure further includes a display data writing-in circuit 41 and a first control circuit 42;

The control terminal of the driving circuit 11 is electrically connected to the first node N1;

The display data writing-in circuit 41 is electrically connected to the scanning terminal G1, the second data line DI and the second node N2 respectively, and is configured to write the display data voltage provided by the second data line DI into the second node N2 under the control of the scanning signal provided by the scanning terminal G1;

The first control circuit 42 is electrically connected to the light emitting control terminal EM, the reference voltage terminal and the second node N2 respectively, and is configured to write the reference voltage Vref provided by the reference voltage terminal into the second node N2 under the control of the light emitting control signal provided by the light emitting control terminal EM.

The pixel circuit described in at least one embodiment of the present disclosure further includes a second reset circuit;

The second reset circuit is electrically connected to the first reset control terminal, the first initial voltage terminal and the first node respectively, and is configured to write the first initial voltage provided by the first initial voltage terminal into the first node under the control of the first reset control signal.

In a specific implementation, the pixel circuit may further include a second reset circuit; the second reset circuit writes a first initial voltage into the first node under the control of the first reset control signal.

Figure 19:
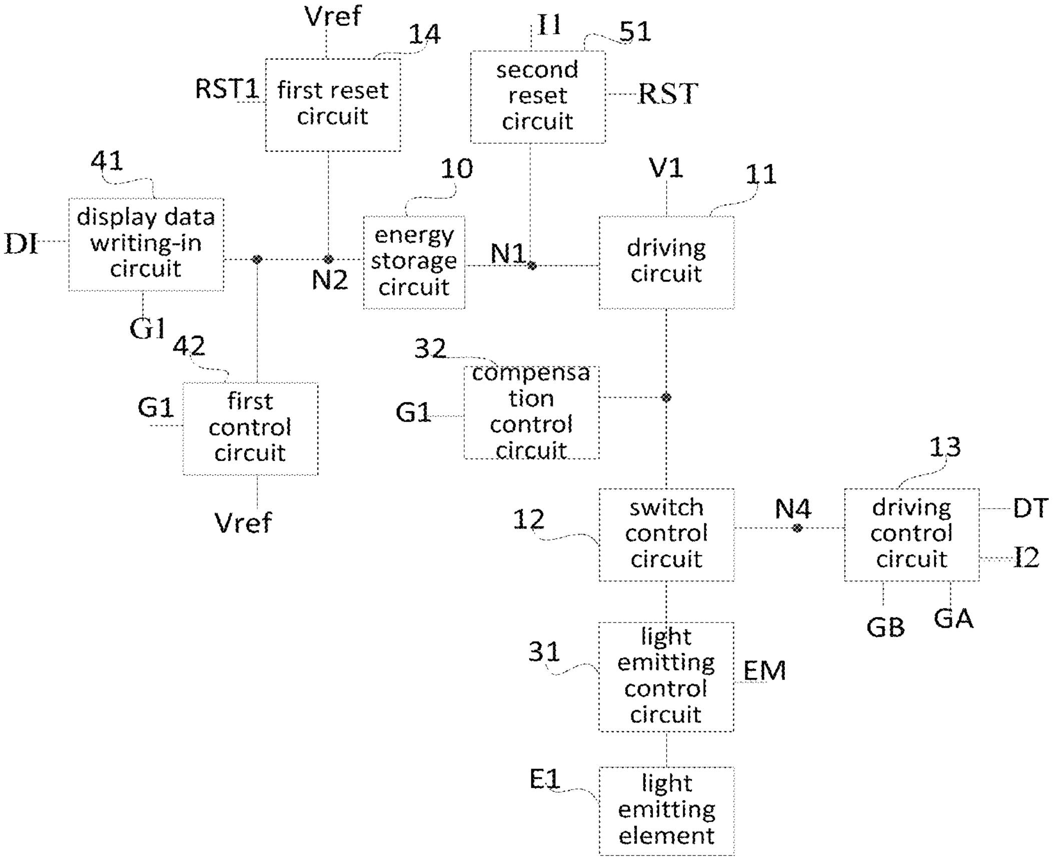
FIG. 19 is a structural diagram of a pixel circuit according to at least one embodiment of the present disclosure.

As shown in FIG. 19, based on the pixel circuit shown in FIG. 17, the pixel circuit described in at least one embodiment of the present disclosure further includes a second reset circuit 51;

The second reset circuit 51 is electrically connected to the first reset control terminal RST1, the first initial voltage terminal I1 and the first node N1 respectively, and is configured to write the first initial voltage Vi1 provided by the first initial voltage terminal I1 into the first node N1 under the control of the first reset control signal.

Figure 20:
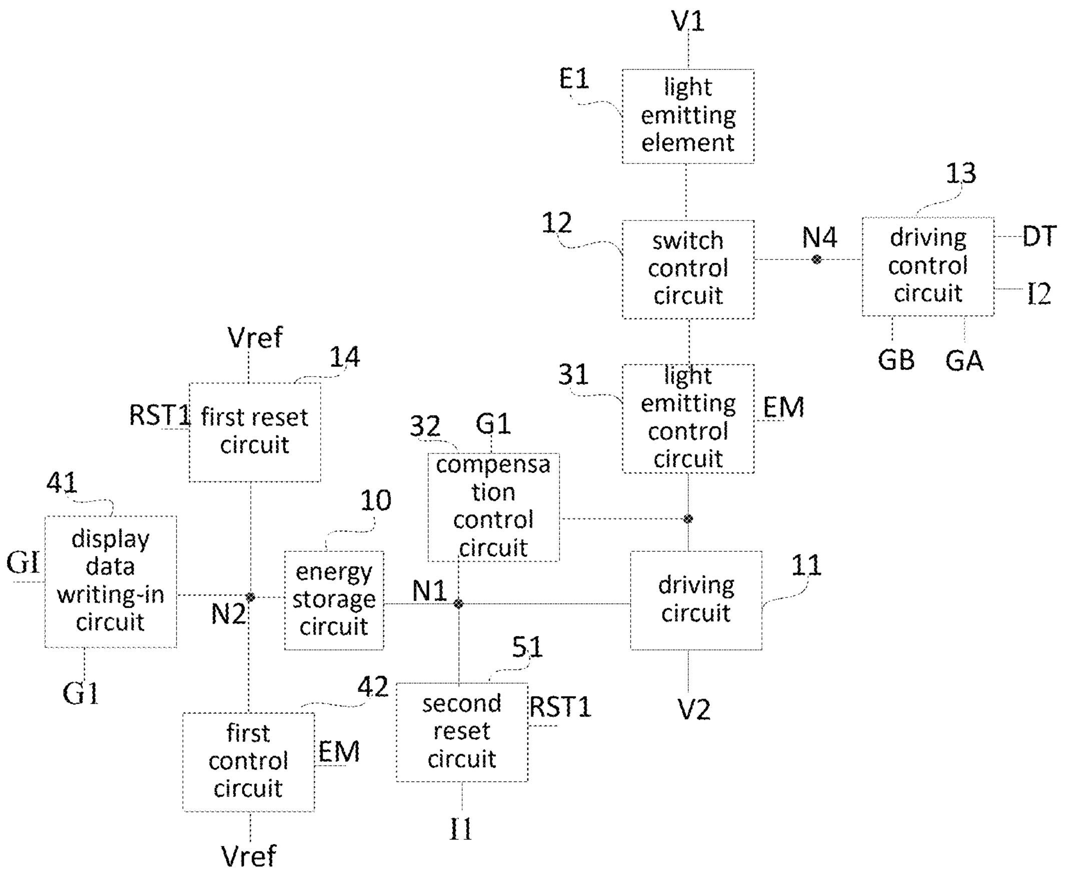
FIG. 20 is a structural diagram of a pixel circuit according to at least one embodiment of the present disclosure.

As shown in FIG. 20, based on the pixel circuit shown in FIG. 19, the pixel circuit described in at least one embodiment of the present disclosure further includes a second reset circuit 51;

The second reset circuit 51 is electrically connected to the first reset control terminal RST, the first initial voltage terminal I1 and the first node N1 respectively, and is configured to write the first initial voltage Vi1 provided by the first initial voltage terminal I1 into the first node N1 under the control of the first reset control signal.

The pixel circuit described in at least one embodiment of the present disclosure further includes an energy storage circuit, a first light emitting control circuit, a second light emitting control circuit, a compensation control circuit, and a display data writing-in circuit;

The first terminal of the energy storage circuit is electrically connected to the control terminal of the driving circuit, the second terminal of the energy storage circuit is electrically connected to the first voltage terminal, and the energy storage circuit is configured to store electrical energy;

The first terminal of the driving circuit is electrically connected to the first voltage terminal through the first light emitting control circuit;

The second terminal of the driving circuit is electrically connected to the switch control circuit through the second light emitting control circuit;

The first light emitting control circuit is also electrically connected to the light emitting control terminal, and is configured to control the connection between the first voltage terminal and the first terminal of the driving circuit under the control of the light emitting control signal provided by the light emitting control terminal;

The second light emitting control circuit is also electrically connected to the light emitting control terminal, and is configured to control the second terminal of the driving circuit to be connected to the switch control circuit under the control of the light emitting control signal;

The compensation control circuit is electrically connected to the scanning terminal, the control terminal of the driving circuit and the second terminal of the driving circuit respectively, and is configured to control the communication between the control terminal of the driving circuit and the second terminal of the driving circuit under the control of the scanning signal provided by the scanning terminal;

The display data writing-in circuit is electrically connected to the scanning terminal, the second data line and the first terminal of the driving circuit respectively, and is configured to write the display data voltage provided by the second data line into the first terminal of the driving circuit under the control of the scanning signal.

In a specific implementation, the pixel circuit may further include a storage circuit, a first light emitting control circuit, a second light emitting control circuit, a compensation control circuit and a display data writing-in circuit; the first light emitting control circuit controls the first voltage terminal to be connected to the first terminal of the driving circuit under the control of a light emitting control signal; the second light emitting control circuit controls the second terminal of the driving circuit to be connected to the switch control circuit under the control of the light emitting control signal, to perform light emitting control; the compensation control circuit controls the control terminal of the driving circuit to be connected to the second terminal of the driving circuit under the control of a scanning signal, to perform threshold voltage compensation; the display data writing-in circuit writes the display data voltage provided by the second data line into the first terminal of the driving circuit under the control of the scanning signal, to perform display data voltage writing-in.

In at least one embodiment of the present disclosure, the light emitting element is an inorganic light emitting diode, the width-to-length ratio of the transistor included in the switch control circuit is greater than 1, the width-to-length ratio of the transistor included in the first light emitting control circuit is greater than 1, the width-to-length ratio of the transistor included in the second light emitting control circuit is greater than 1, and the width-to-length ratio of the transistor included in the driving circuit is greater than 0.5.

In a specific implementation, the light emitting element may be an inorganic light emitting diode, the width-to-length ratio of the transistor included in the switch control circuit may be greater than 1, the width-to-length ratio of the transistor included in the first light emitting control circuit may be greater than 1, the width-to-length ratio of the transistor included in the second light emitting control circuit may be greater than 1, and the width-to-length ratio of the transistor included in the driving circuit may be greater than 0.5.

Figure 21:
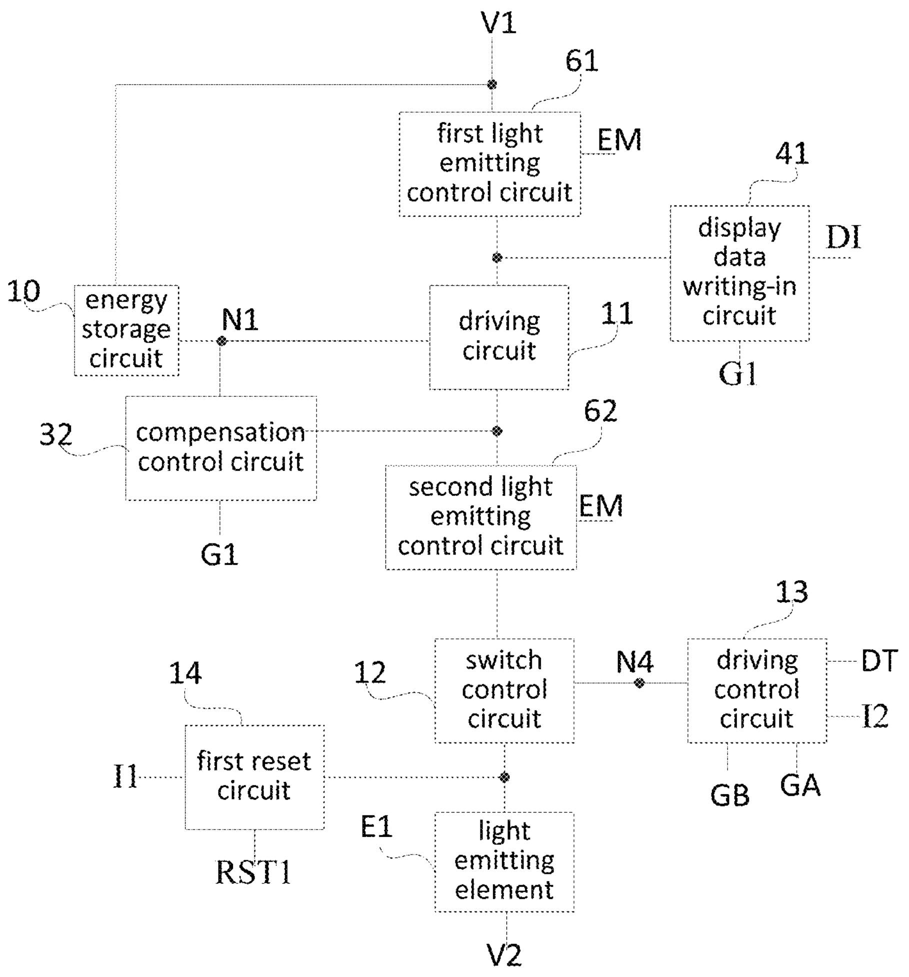
FIG. 21 is a structural diagram of a pixel circuit according to at least one embodiment of the present disclosure.

As shown in FIG. 21, the pixel circuit according to at least one embodiment of the present disclosure includes a driving circuit 11, a switch control circuit 12, a light emitting element E1, a driving control circuit 13, a first reset circuit 14, a storage circuit 10, a first light emitting control circuit 61, a second light emitting control circuit 62, a compensation control circuit 32, and a display data writing-in circuit 41;

The control terminal of the driving circuit 11 is electrically connected to the first node N1, and is configured to generate a driving current for driving the light emitting element E1 under the control of the potential of the first node N1;

The first reset circuit 14 is electrically connected to the first reset control terminal RST, the first initial voltage terminal I1 and the first electrode of the light emitting element E1 respectively, and is configured to write the first initial voltage Vi1 provided by the first initial voltage terminal I1 into the first electrode of the light emitting element E1 under the control of the first reset control signal provided by the first reset control terminal RST;

The first terminal of the energy storage circuit 10 is electrically connected to the control terminal of the driving circuit 11, the second terminal of the energy storage circuit 10 is electrically connected to the first voltage terminal V1, and the energy storage circuit 10 is configured to store electric energy;

The first terminal of the driving circuit 11 is electrically connected to the first voltage terminal V1 through the first light emitting control circuit 61;

The second terminal of the driving circuit 11 is electrically connected to the switch control circuit 12 through the second light emitting control circuit 62;

The first light emitting control circuit 61 is also electrically connected to the light emitting control terminal EM, and is configured to control the connection between the first voltage terminal V1 and the first terminal of the driving circuit 11 under the control of the light emitting control signal provided by the light emitting control terminal EM;

The second light emitting control circuit 62 is also electrically connected to the light emitting control terminal EM, and is configured to control the second terminal of the driving circuit 11 to be connected to the switch control circuit 12 under the control of the light emitting control signal;

The switch control circuit 12 is electrically connected to the switch control terminal N4, the second light emitting control circuit 62 and the first electrode of the light emitting element E1 respectively. The switch control circuit 12 is configured to control the second light emitting control circuit 62 to be connected to the first electrode of the light emitting element E1 under the control of the potential of the switch control terminal N4; the second electrode of the light emitting element E1 is electrically connected to the second voltage terminal V2;

The driving control circuit 13 is electrically connected to the first control terminal GB, the second control terminal GA, the first data line DT, the second initial voltage terminal I2 and the switch control terminal N4 respectively, and is configured to write the light emitting time control data voltage provided by the first data line DT into the switch control terminal N4 under the control of the first control signal provided by the first control terminal GB, and write the second initial voltage provided by the second initial voltage terminal I2 into the switch control terminal N4 under the control of the second control signal provided by the second control terminal GA;

The compensation control circuit 32 is electrically connected to the scanning terminal G1, the control terminal of the driving circuit 11 and the second terminal of the driving circuit 11 respectively, and is configured to control the control terminal of the driving circuit 11 to communicate with the second terminal of the driving circuit 11 under the control of the scanning signal provided by the scanning terminal G1;

The display data writing-in circuit 41 is electrically connected to the scanning terminal G1, the second data line DI and the first terminal of the driving circuit 11 respectively, and is configured to write the display data voltage provided by the second data line DI into the first terminal of the driving circuit 11 under the control of the scanning signal.

In at least one embodiment of the present disclosure, the pixel circuit further includes an energy storage circuit, a first light emitting control circuit, a second light emitting control circuit, a compensation control circuit, and a display data writing-in circuit;

The first terminal of the energy storage circuit is electrically connected to the control terminal of the driving circuit, the second terminal of the energy storage circuit is electrically connected to the second voltage terminal, and the energy storage circuit is configured to store electrical energy;

The first light emitting control circuit is electrically connected to the light emitting control terminal, the switch control circuit and the first terminal of the driving circuit respectively, and is configured to control the connection between the switch control circuit and the first terminal of the driving circuit under the control of the light emitting control signal provided by the light emitting control terminal;

The second light emitting control circuit is electrically connected to the light emitting control terminal, the second terminal of the driving circuit and the second voltage terminal respectively, and is configured to control the second terminal of the driving circuit to be electrically connected to the second voltage terminal under the control of the light emitting control signal;

The compensation control circuit is electrically connected to the scanning terminal, the control terminal of the driving circuit and the first terminal of the driving circuit respectively, and is configured to control the communication between the control terminal of the driving circuit and the first terminal of the driving circuit under the control of the scanning signal provided by the scanning terminal;

The display data writing-in circuit is electrically connected to the scanning terminal, the second data line and the second terminal of the driving circuit respectively, and is configured to write the display data voltage provided by the second data line into the second terminal of the driving circuit under the control of the scanning signal.

In a specific implementation, the pixel circuit may further include an energy storage circuit, a first light emitting control circuit, a second light emitting control circuit, a compensation control circuit and a display data writing-in circuit; the first light emitting control circuit controls the connection between the switch control circuit and the first terminal of the driving circuit under the control of a light emitting control signal; the second light emitting control circuit controls the second terminal of the driving circuit to be electrically connected to the first electrode of the light emitting element under the control of the light emitting control signal; the compensation control circuit controls the connection between the control terminal of the driving circuit and the first terminal of the driving circuit under the control of a scanning signal; the display data writing-in circuit writes the display data voltage provided by the second data line into the second terminal of the driving circuit under the control of the scanning signal.

Figure 22:
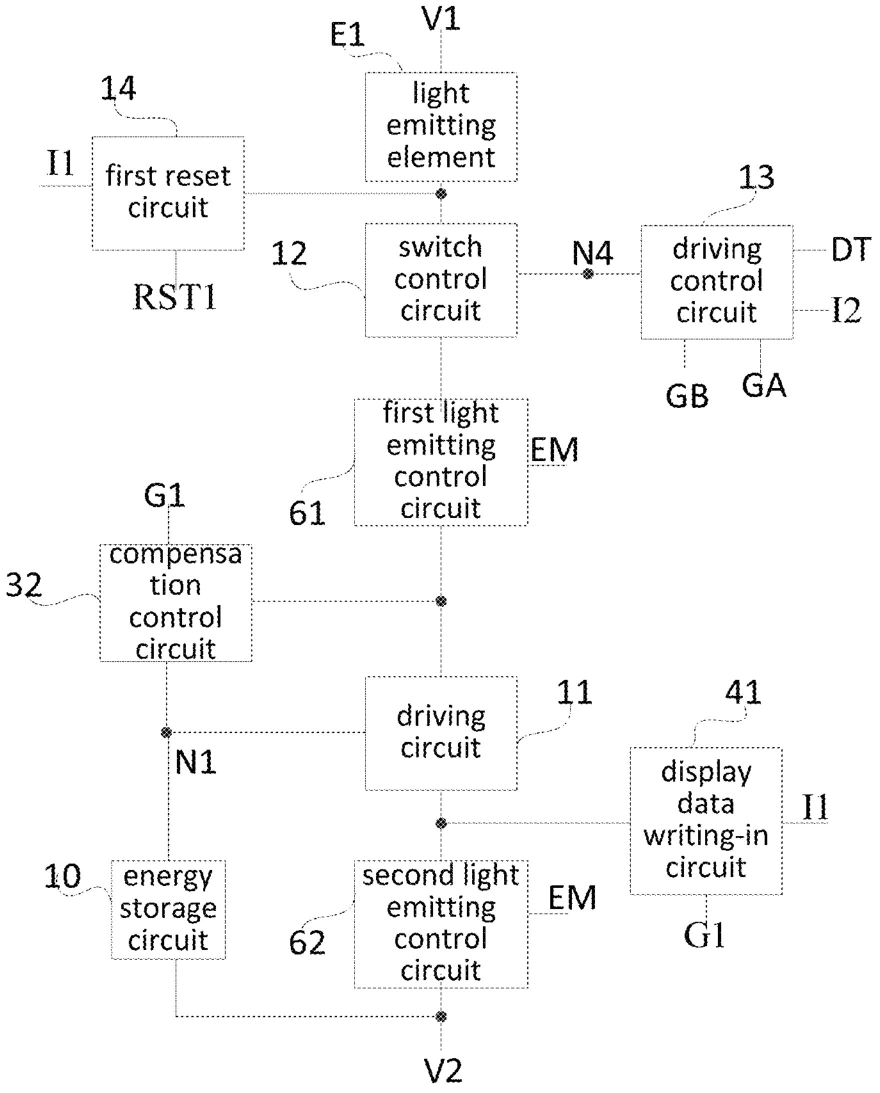
FIG. 22 is a structural diagram of a pixel circuit according to at least one embodiment of the present disclosure.

As shown in FIG. 22, the pixel circuit according to at least one embodiment of the present disclosure includes a driving circuit 11, a switch control circuit 12, a light emitting element E1, a driving control circuit 13, a first reset circuit 14, an energy storage circuit 10, a first light emitting control circuit 61, a second light emitting control circuit 62, a compensation control circuit 32, and a display data writing-in circuit 41;

The first electrode of the light emitting element E1 is electrically connected to the first voltage terminal V1;

The switch control circuit 12 is electrically connected to the switch control terminal N4, the first light control circuit 61 and the second electrode of the light emitting element E1 respectively, and the switch control circuit 12 is configured to control the second electrode of the light emitting element E1 to be connected to the first light control circuit 61 under the control of the potential of the switch control terminal N4;

The driving control circuit 13 is electrically connected to the first control terminal GB, the second control terminal GA, the first data line DT, the second initial voltage terminal I2 and the switch control terminal N4 respectively, and is configured to write the light emitting time control data voltage provided by the first data line DT into the switch control terminal N4 under the control of the first control signal provided by the first control terminal GB, and write the second initial voltage provided by the second initial voltage terminal I2 into the switch control terminal N4 under the control of the second control signal provided by the second control terminal GA;

The first reset circuit 14 is electrically connected to the first reset control terminal RST1, the first initial voltage terminal I1 and the second electrode of the light emitting element E1 respectively, and is configured to write the first initial voltage Vi1 provided by the first initial voltage terminal I1 into the second electrode of the light emitting element E1 under the control of the first reset control signal provided by the first reset control terminal RST1, so as to clear the residual charge of the second electrode of the light emitting element E1;

The first terminal of the energy storage circuit 10 is electrically connected to the control terminal of the driving circuit 11, the second terminal of the energy storage circuit 10 is electrically connected to the second voltage terminal V2, and the energy storage circuit 10 is configured to store electrical energy;

The first light emitting control circuit 61 is electrically connected to the light emitting control terminal EM, the switch control circuit 12 and the first terminal of the driving circuit 11 respectively, and is configured to control the connection between the switch control circuit 12 and the first terminal of the driving circuit 11 under the control of the light emitting control signal provided by the light emitting control terminal EM;

The second light emitting control circuit 62 is electrically connected to the light emitting control terminal EM, the second terminal of the driving circuit 11 and the second voltage terminal V2 respectively, and is configured to control the second terminal of the driving circuit 11 to be electrically connected to the second voltage terminal V2 under the control of the light emitting control signal;

The compensation control circuit 32 is electrically connected to the scanning terminal G1, the control terminal of the driving circuit 11 and the first terminal of the driving circuit 11 respectively, and is configured to control the connection between the control terminal of the driving circuit 11 and the first terminal of the driving circuit 11 under the control of the scanning signal provided by the scanning terminal G1;

The display data writing-in circuit 41 is electrically connected to the scanning terminal G1, the second data line DI and the second terminal of the driving circuit 11 respectively, and is configured to write the display data voltage provided by the second data line DI into the second terminal of the driving circuit 11 under the control of the scanning signal.

The pixel circuit described in at least one embodiment of the present disclosure further includes a second reset circuit;

The second reset circuit is electrically connected to the first reset control terminal, the first initial voltage terminal and the first node respectively, and is configured to write the first initial voltage provided by the first initial voltage terminal into the first node under the control of a first reset control signal provided by the first reset control terminal.

In a specific implementation, the pixel circuit may further include a second reset circuit, and the second reset circuit writes the first initial voltage into the first node under the control of a reset control signal.

Figure 23:
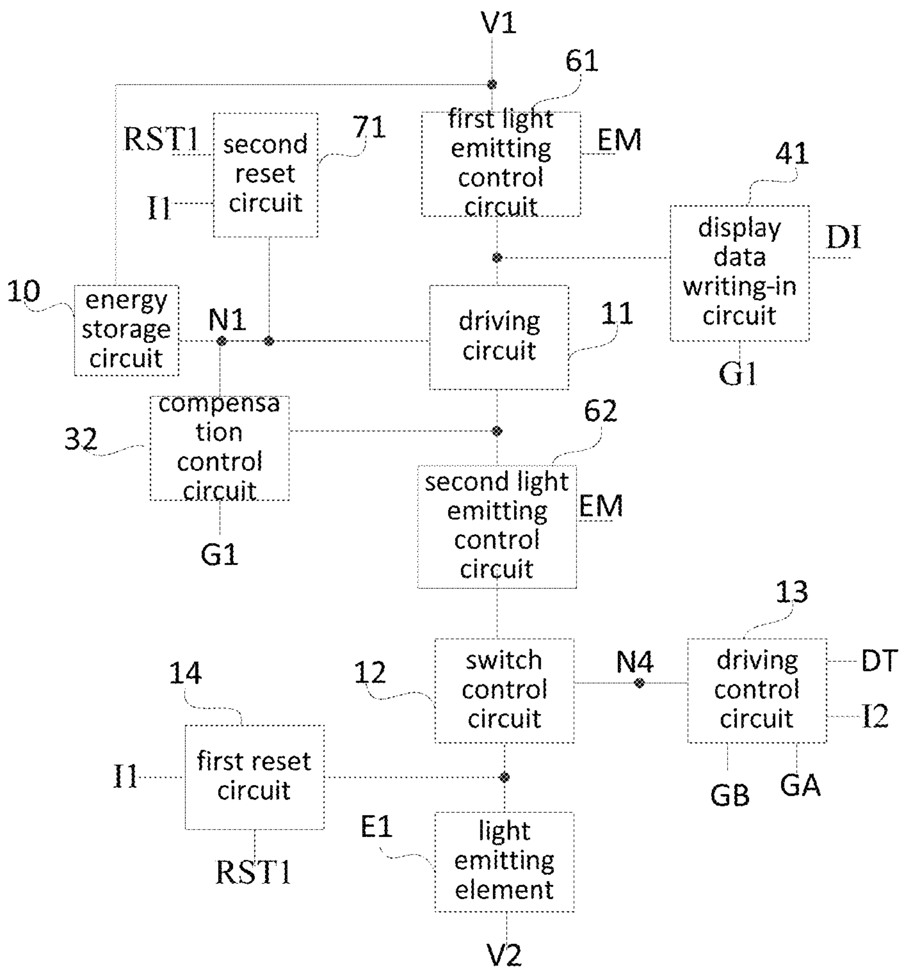
FIG. 23 is a structural diagram of a pixel circuit according to at least one embodiment of the present disclosure.

As shown in FIG. 23, based on the pixel circuit shown in FIG. 21, the pixel circuit described in at least one embodiment of the present disclosure further includes a second reset circuit 71;

The second reset circuit 71 is electrically connected to the first reset control terminal RST1, the first initial voltage terminal I1 and the first node N1 respectively, and is configured to write the first initial voltage Vi1 provided by the first initial voltage terminal I1 into the first node N1 under the control of the first reset control signal provided by the first reset control terminal RST1.

Figure 24:
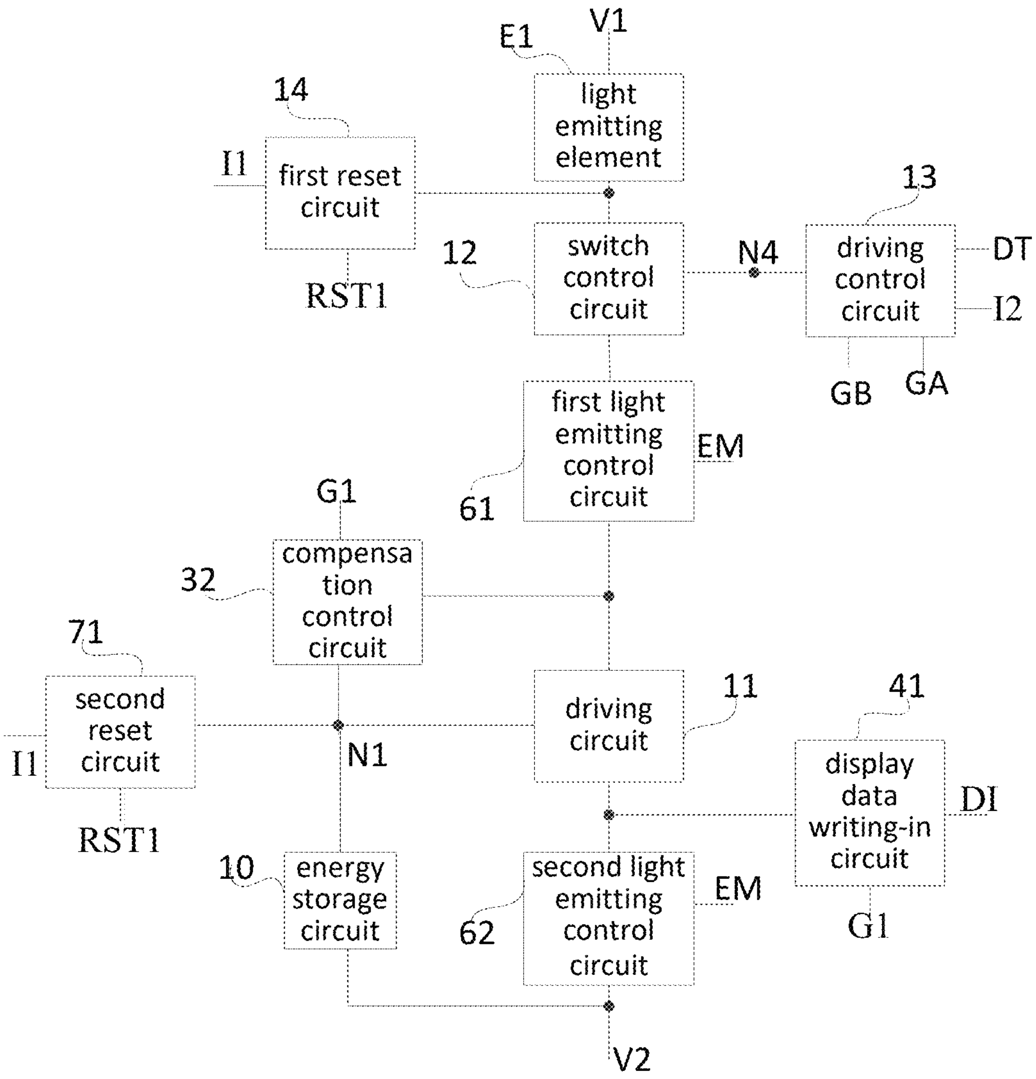
FIG. 24 is a structural diagram of a pixel circuit according to at least one embodiment of the present disclosure.

As shown in FIG. 24, based on the pixel circuit shown in FIG. 22, the pixel circuit described in at least one embodiment of the present disclosure further includes a second reset circuit 71;

The second reset circuit 71 is electrically connected to the first reset control terminal RST1, the first initial voltage terminal I1 and the first node N1 respectively, and is configured to write the first initial voltage Vi1 provided by the first initial voltage terminal I1 into the first node N1 under the control of the first reset control signal provided by the first reset control terminal RST1.

The pixel circuit described in at least one embodiment of the present disclosure further includes a display data writing-in circuit;

The display data writing-in circuit is electrically connected to the scanning terminal, the second data line and the control terminal of the driving circuit respectively, and is configured to write the display data voltage provided by the second data line into the control terminal of the driving circuit under the control of the scanning signal provided by the scanning terminal.

In at least one embodiment of the present disclosure, the switch circuit is also connected to a second selection control terminal and a compensation terminal, and is configured to control the connection between the control node and the compensation terminal under the control of a second selection control signal provided by the second selection control terminal.

In a specific implementation, the switch circuit can control the connection between the control node and the compensation terminal under the control of the second selection control signal to transmit the potential of the control node to the compensation terminal, so as to perform threshold voltage compensation according to the potential of the compensation terminal.

Figure 25:
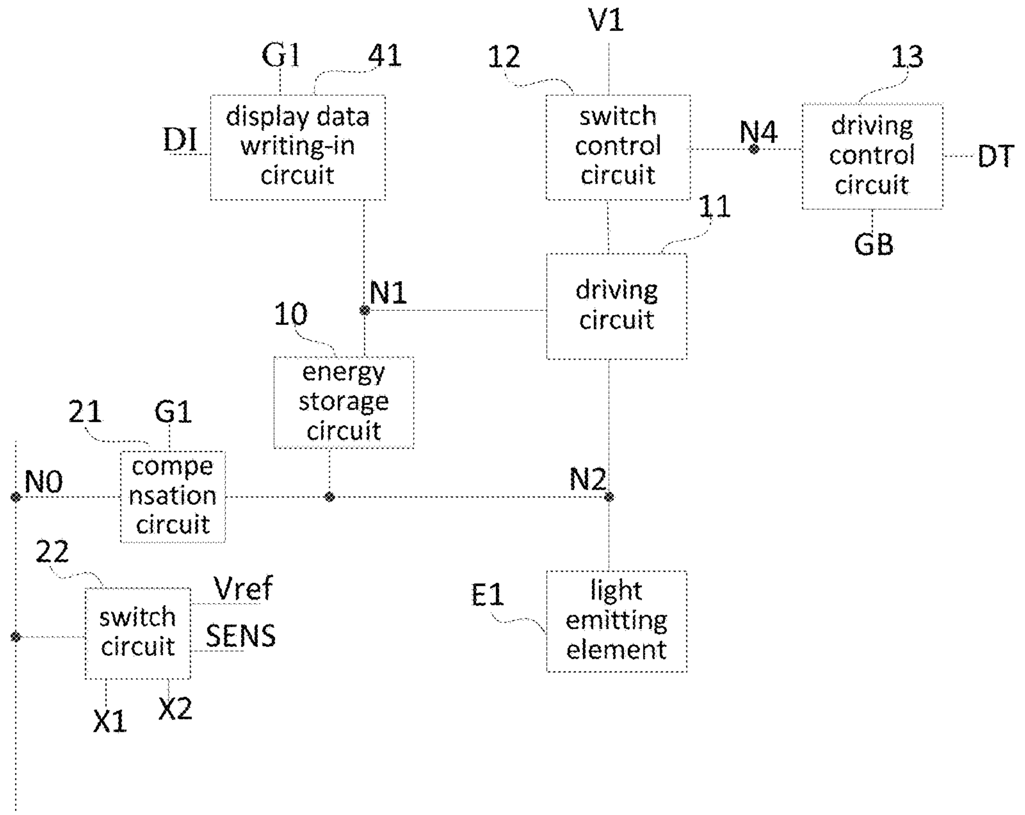
FIG. 25 is a structural diagram of a pixel circuit according to at least one embodiment of the present disclosure.

As shown in FIG. 25, based on the pixel circuit shown in FIG. 5, the pixel circuit described in at least one embodiment of the present disclosure further includes a display data writing-in circuit 41;

The display data writing-in circuit 41 is electrically connected to the scanning terminal G1, the second data line DI and the control terminal of the driving circuit 11 respectively, and is configured to write the display data voltage provided by the second data line DI into the control terminal of the driving circuit 11 under the control of the scanning signal provided by the scanning terminal G1;

The switch circuit 22 is also connected to the second selection control terminal X2 and the compensation terminal SENS respectively, and is configured to control the connection between the control node N0 and the compensation terminal SENS under the control of the second selection control signal provided by the second selection control terminal X2.

Figure 26:
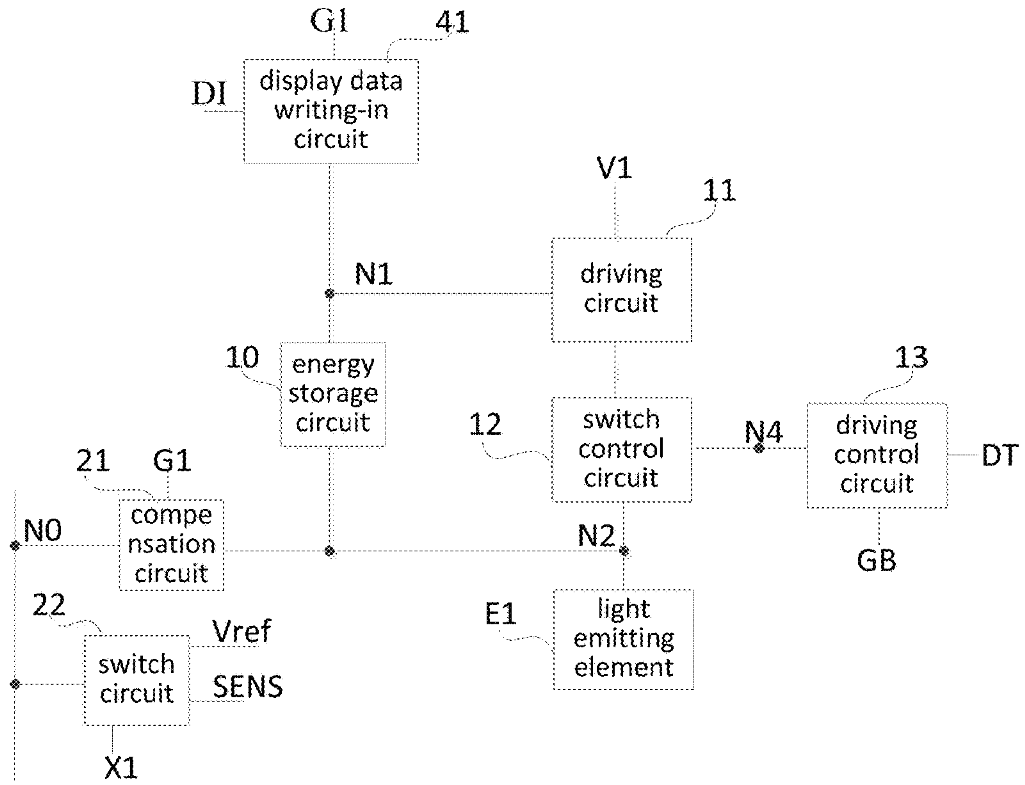
FIG. 26 is a structural diagram of a pixel circuit according to at least one embodiment of the present disclosure.

As shown in FIG. 26, based on the pixel circuit shown in FIG. 6, the pixel circuit described in at least one embodiment of the present disclosure further includes a display data writing-in circuit 41;

The display data writing-in circuit 41 is electrically connected to the scanning terminal G1, the second data line DI and the control terminal of the driving circuit 11 respectively, and is configured to write the display data voltage provided by the second data line DI into the control terminal of the driving circuit 11 under the control of the scanning signal provided by the scanning terminal G1;

The switch circuit 22 is also connected to the second selection control terminal X2 and the compensation terminal SENS, and is configured to control the connection between the control node N0 and the compensation terminal SENS under the control of a second selection control signal provided by the second selection control terminal X2.

Figure 27:
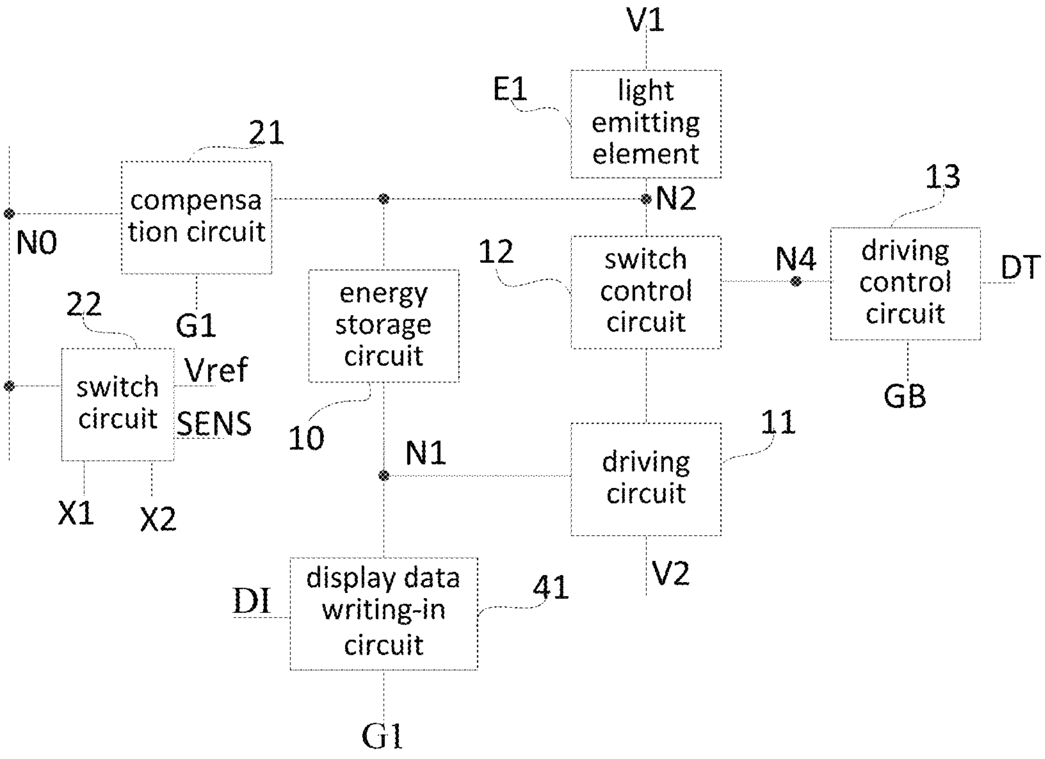
FIG. 27 is a structural diagram of a pixel circuit according to at least one embodiment of the present disclosure.

As shown in FIG. 27, based on the pixel circuit shown in FIG. 7, the pixel circuit described in at least one embodiment of the present disclosure further includes a display data writing-in circuit 41;

The display data writing-in circuit 41 is electrically connected to the scanning terminal G1, the second data line DI and the control terminal of the driving circuit 11 respectively, and is configured to write the display data voltage provided by the second data line DI into the control terminal of the driving circuit 11 under the control of the scanning signal provided by the scanning terminal G1;

The switch circuit 22 is also connected to the second selection control terminal X2 and the compensation terminal SENS, and is configured to control the connection between the control node N0 and the compensation terminal SENS under the control of a second selection control signal provided by the second selection control terminal X2.

Figure 28:
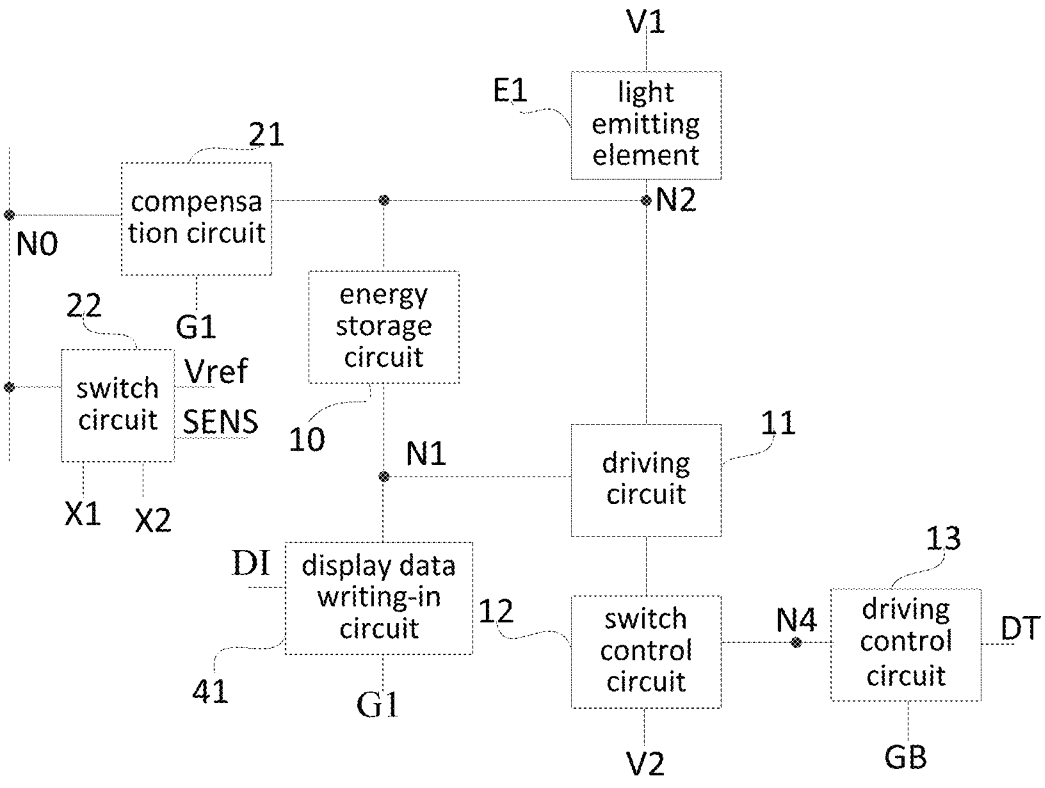
FIG. 28 is a structural diagram of a pixel circuit according to at least one embodiment of the present disclosure.

As shown in FIG. 28, based on the pixel circuit shown in FIG. 8, the pixel circuit described in at least one embodiment of the present disclosure further includes a display data writing-in circuit 41;

The display data writing-in circuit 41 is electrically connected to the scanning terminal G1, the second data line DI and the control terminal of the driving circuit 11 respectively, and is configured to write the display data voltage provided by the second data line DI into the control terminal of the driving circuit 11 under the control of the scanning signal provided by the scanning terminal G1;

The switch circuit 22 is also connected to the second selection control terminal X2 and the compensation terminal SENS, and is configured to control the connection between the control node N0 and the compensation terminal SENS under the control of a second selection control signal provided by the second selection control terminal X2.

The pixel circuit described in at least one embodiment of the present disclosure may further include a third reset circuit;

The third reset circuit is electrically connected to the second reset control terminal, the third initial voltage terminal and the first electrode of the light emitting element, respectively, and is configured to write the third initial voltage provided by the third initial voltage terminal into the first electrode of the light emitting element under the control of the reset control signal provided by the second reset control terminal during a reset time period set between a time period for writing-in the display data voltage and a time period for writing-in the light emitting time control data voltage.

Figure 29:
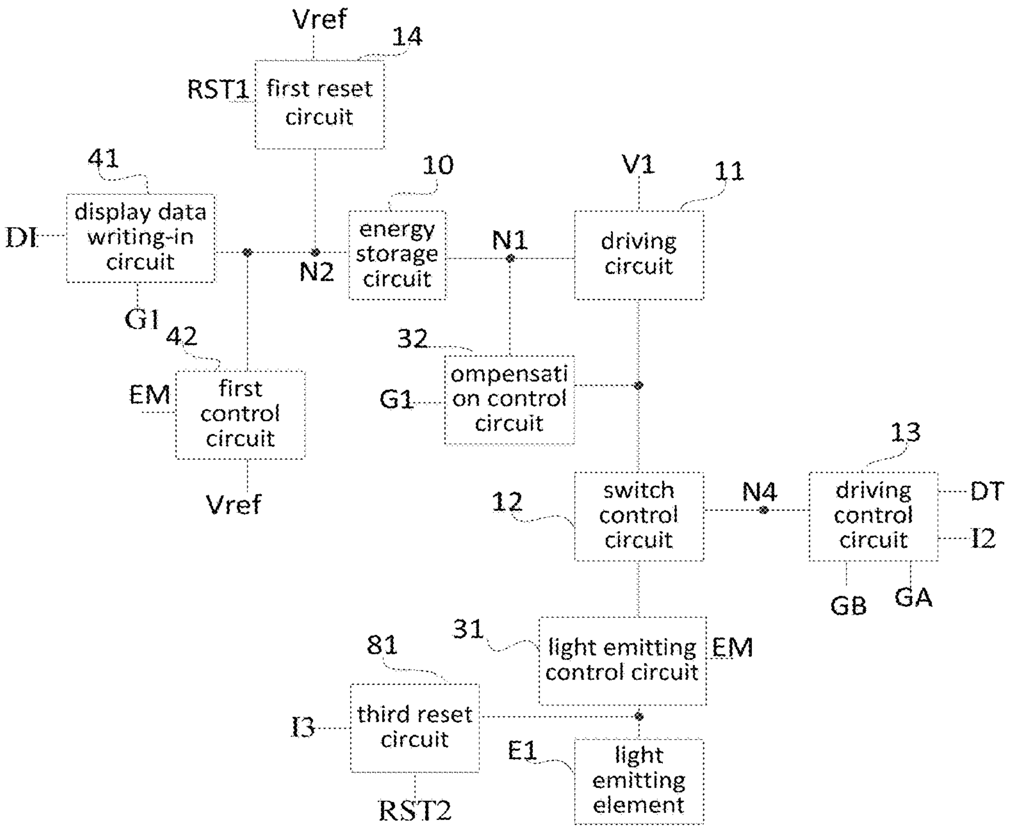
FIG. 29 is a structural diagram of a pixel circuit according to at least one embodiment of the present disclosure.

As shown in FIG. 29, based on the pixel circuit shown in FIG. 17, the pixel circuit described in at least one embodiment of the present disclosure may further include a third reset circuit 81;

The third reset circuit 81 is electrically connected to the second reset control terminal RST2, the third initial voltage terminal I3 and the first electrode of the light emitting element E1, respectively, and is configured to write the third initial voltage Vi3 provided by the third initial voltage terminal I3 into the first electrode of the light emitting element E1 under the control of the second reset control signal provided by the second reset control terminal RST2.

When the pixel circuit described in at least one embodiment of the present disclosure is in operation, a display cycle may include a first display phase and a second display phase which are set in sequence; the first display phase may include a first reset time period, a first writing-in time period and a first light emitting time period which are set in sequence, and the second display phase may include a second reset time period, a second writing-in time period and a second light emitting time period which are set in sequence.

In the first reset time period and the second reset time period, the third reset circuit writes a third initial voltage into the first electrode of the light emitting element under the control of the second reset control signal;

In a first writing-in time period, writing-in a display data voltage;

In the first light emitting time period, the driving circuit drives the light emitting element to emit light according to the display data voltage;

In the second writing-in time period, writing-in the light emitting time control data voltage;

In the second light emitting time period, the driving circuit controls the data voltage according to the light emitting time to control whether the light emitting element emits light.

The reset time period provided between the time period for writing-in the display data voltage and the time period for writing-in the light emitting time control data voltage may be the second reset time period.

The pixel circuit described in at least one embodiment of the present disclosure may further include a third reset circuit;

The third reset circuit is electrically connected to the second reset control terminal, the third initial voltage terminal and the first electrode of the light emitting element, respectively, and is configured to write the third initial voltage provided by the third initial voltage terminal into the second electrode of the light emitting element under the control of the second reset control signal provided by the second reset control terminal during a reset time period set between the time period for writing-in the display data voltage and the time period for writing-in the light emitting time control data voltage.

When the pixel circuit described in at least one embodiment of the present disclosure is in operation, a display cycle may include a first display phase and a second display phase which are set in sequence; the first display phase may include a first reset time period, a first writing-in time period and a first light emitting time period which are set in sequence, and the second display phase may include a second reset time period, a second writing-in time period and a second light emitting time period which are set in sequence.

In the first reset time period and the second reset time period, the third reset circuit writes a third initial voltage into the second electrode of the light emitting element under the control of the second reset control signal;

In a first writing-in time period, writing-in a display data voltage;

In the first light emitting time period, the driving circuit drives the light emitting element to emit light according to the display data voltage;

In the second writing-in time period, writing-in the light emitting time control data voltage;

In the second light emitting time period, the driving circuit controls the data voltage according to the light emitting time to control whether the light emitting element emits light.

The reset time period provided between the time period for writing-in the display data voltage and the time period for writing-in the light emitting time control data voltage may be the second reset time period.

Figure 30:
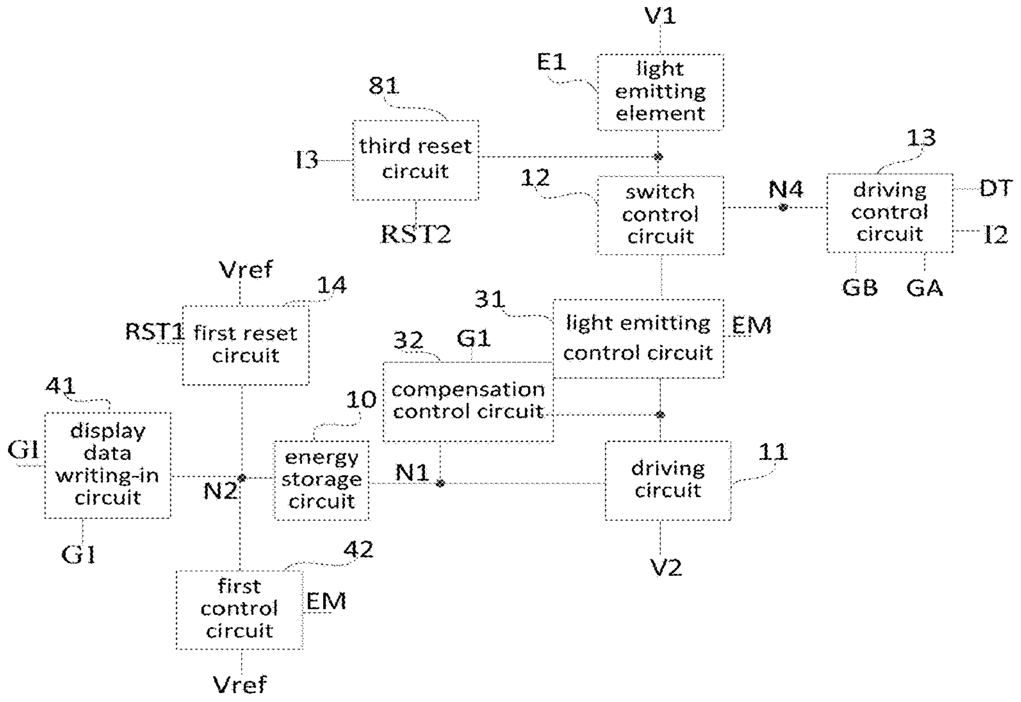
FIG. 30 is a structural diagram of a pixel circuit according to at least one embodiment of the present disclosure.

As shown in FIG. 30, based on the pixel circuit shown in FIG. 18, the pixel circuit described in at least one embodiment of the present disclosure may further include a third reset circuit 81;

The third reset circuit 81 is electrically connected to the second reset control terminal RST2, the third initial voltage terminal I3 and the second electrode of the light emitting element E1, respectively, and is configured to write the third initial voltage V13 provided by the third initial voltage terminal I3 into the second electrode of the light emitting element E1 under the control of the second reset control signal provided by the second reset control terminal RST2.

Optionally, the driving control circuit includes a first transistor, a second transistor and a first capacitor;

A gate electrode of the first transistor is electrically connected to the first control terminal, a first electrode of the first transistor is electrically connected to the first data line, and a second electrode of the first transistor is electrically connected to the switch control terminal;

a gate electrode of the second transistor is electrically connected to the second control terminal, a first electrode of the second transistor is electrically connected to the second initial voltage terminal, and a second electrode of the second transistor is electrically connected to the switch control terminal;

a first terminal of the first capacitor is electrically connected to the switch control terminal, and a second terminal of the first capacitor is electrically connected to the DC voltage terminal.

In at least one embodiment of the present disclosure, the DC voltage terminal may be, for example, a common electrode voltage terminal, a ground terminal, a high voltage terminal or a low voltage terminal, but is not limited thereto.

Optionally, the driving circuit includes a driving transistor, the switch control circuit includes a third transistor, the light emitting control circuit includes a fourth transistor, and the compensation control circuit includes a fifth transistor;

a gate electrode of the driving transistor is electrically connected to the first node, a first electrode of the driving transistor is electrically connected to the first voltage terminal, and a second electrode of the driving transistor is electrically connected to the third node;

a gate electrode of the fourth transistor is electrically connected to the light emitting control terminal, a first electrode of the fourth transistor is electrically connected to the third node, and a second electrode of the fourth transistor is electrically connected to the first electrode of the third transistor;

a gate electrode of the third transistor is electrically connected to the switch control terminal, and a second electrode of the third transistor is electrically connected to the first electrode of the light emitting element;

A gate electrode of the fifth transistor is electrically connected to the scanning terminal, a first electrode of the fifth transistor is electrically connected to the first node, and a second electrode of the fifth transistor is electrically connected to a third node.

Optionally, the driving circuit includes a driving transistor, the switch control circuit includes a third transistor, the light emitting control circuit includes a fourth transistor, and the compensation control circuit includes a fifth transistor;

a gate electrode of the third transistor is electrically connected to the switch control terminal, a first electrode of the third transistor is electrically connected to the second electrode of the light emitting element, and a second electrode of the third transistor is electrically connected to a first electrode of the fourth transistor;

a gate electrode of the fourth transistor is electrically connected to the light emitting control terminal, a second electrode of the fourth transistor is electrically connected to a first electrode of the driving transistor; a first electrode of the driving transistor is electrically connected to the third node;

a gate electrode of the driving transistor is electrically connected to the first node, and a second electrode of the driving transistor is electrically connected to the second voltage terminal;

A gate electrode of the fifth transistor is electrically connected to the scanning terminal, a first electrode of the fifth transistor is electrically connected to the first node, and a second electrode of the fifth transistor is electrically connected to the third node.

Optionally, the display data writing-in circuit includes a sixth transistor, and the first control circuit includes a seventh transistor;

a gate electrode of the sixth transistor is electrically connected to the scanning terminal, a first electrode of the sixth transistor is electrically connected to the second data line, and a second electrode of the sixth transistor is electrically connected to the second node;

A gate electrode of the seventh transistor is electrically connected to the light emitting control terminal, a first electrode of the seventh transistor is electrically connected to the reference voltage terminal, and a second electrode of the seventh transistor is electrically connected to the second node.

Optionally, the first reset circuit includes an eighth transistor;

a gate electrode of the eighth transistor is electrically connected to the set control terminal, a first electrode of the eighth transistor is electrically connected to the set voltage terminal, and a second electrode of the eighth transistor is electrically connected to the second node, a first electrode of the light emitting element, or a second electrode of the light emitting element;

The set voltage terminal is configured to provide the set voltage.

Optionally, the second reset circuit includes a ninth transistor,

A gate electrode of the ninth transistor is electrically connected to the first reset control terminal, a first electrode of the ninth transistor is electrically connected to the first initial voltage terminal, and a second electrode of the ninth transistor is electrically connected to the first node.

Optionally, the driving circuit includes a driving transistor; the energy storage circuit includes a storage capacitor, the first light emitting control circuit includes an eleventh transistor, the second light emitting control circuit includes a twelfth transistor, the switch control circuit includes a third transistor, the compensation control circuit includes a fifth transistor, and the display data writing-in circuit includes a sixth transistor;

a first terminal of the storage capacitor is electrically connected to the gate electrode of the driving transistor, and a second terminal of the storage capacitor is electrically connected to the first voltage terminal;

a gate electrode of the eleventh transistor is electrically connected to the light emitting control terminal, a first electrode of the eleventh transistor is electrically connected to the first voltage terminal, and a second electrode of the eleventh transistor is electrically connected to the first electrode of the driving transistor;

a gate electrode of the twelfth transistor is electrically connected to the light emitting control terminal, a first electrode of the twelfth transistor is electrically connected to the second electrode of the driving transistor, and a second electrode of the twelfth transistor is electrically connected to the first electrode of the third transistor;

a gate electrode of the third transistor is electrically connected to the switch control terminal, and a second electrode of the third transistor is electrically connected to the first electrode of the light emitting element;

a gate electrode of the fifth transistor is electrically connected to the scanning terminal, a first electrode of the fifth transistor is electrically connected to the gate electrode of the driving transistor, and a second electrode of the fifth transistor is electrically connected to the second electrode of the driving transistor;

A gate electrode of the sixth transistor is electrically connected to the scanning terminal, a first electrode of the sixth transistor is electrically connected to the second data line, and a second electrode of the sixth transistor is electrically connected to a first electrode of the driving transistor.

Optionally, the driving circuit includes a driving transistor; the energy storage circuit includes a storage capacitor, the first light emitting control circuit includes an eleventh transistor, the second light emitting control circuit includes a twelfth transistor, the switch control circuit includes a third transistor, the compensation control circuit includes a fifth transistor, and the display data writing-in circuit includes a sixth transistor;

a first terminal of the storage capacitor is electrically connected to the gate electrode of the driving transistor, and a second terminal of the storage capacitor is electrically connected to the second voltage terminal;

a gate electrode of the third transistor is electrically connected to the switch control terminal, a first electrode of the third transistor is electrically connected to the second electrode of the light emitting element, and a second electrode of the third transistor is electrically connected to a first electrode of the eleventh transistor;

a gate electrode of the eleventh transistor is electrically connected to the light emitting control terminal, and a second electrode of the eleventh transistor is electrically connected to the first electrode of the driving transistor;

a gate electrode of the twelfth transistor is electrically connected to the light emitting control terminal, a first electrode of the twelfth transistor is electrically connected to the second electrode of the driving transistor, and a second electrode of the twelfth transistor is electrically connected to the second voltage terminal;

a gate electrode of the fifth transistor is electrically connected to the scanning terminal, a first electrode of the fifth transistor is electrically connected to the gate electrode of the driving transistor, and a second electrode of the fifth transistor is electrically connected to the first electrode of the driving transistor;

A gate electrode of the sixth transistor is electrically connected to the scanning terminal, a first electrode of the sixth transistor is electrically connected to the second data line, and a second electrode of the sixth transistor is electrically connected to a second electrode of the driving transistor.

Optionally, the second reset circuit includes a ninth transistor;

A gate electrode of the ninth transistor is electrically connected to the first reset control terminal, a first electrode of the ninth transistor is electrically connected to the first initial voltage terminal, and a second electrode of the ninth transistor is electrically connected to the first node.

Optionally, the third reset circuit includes a tenth transistor;

a gate electrode of the tenth transistor is electrically connected to the second reset control terminal, a first electrode of the tenth transistor is electrically connected to the third initial voltage terminal, and a second electrode of the tenth transistor is electrically connected to the first electrode of the light emitting element.

Optionally, the third reset circuit includes a tenth transistor;

a gate electrode of the tenth transistor is electrically connected to the second reset control terminal, a first electrode of the tenth transistor is electrically connected to the third initial voltage terminal, and a second electrode of the tenth transistor is electrically connected to the second electrode of the light emitting element.

Optionally, the switch control circuit includes a third transistor, and the driving circuit includes a driving transistor;

a gate electrode of the third transistor is electrically connected to the switch control terminal, a first electrode of the third transistor is electrically connected to the first voltage terminal, and a second electrode of the third transistor is electrically connected to the first electrode of the driving transistor;

The second electrode of the driving transistor is electrically connected to the first electrode of the light emitting element.

Optionally, the switch control circuit includes a third transistor, and the driving circuit includes a driving transistor;

a gate electrode of the third transistor is electrically connected to the switch control terminal, a first electrode of the third transistor is electrically connected to the second electrode of the driving transistor, and a second electrode of the third transistor is electrically connected to the first electrode of the light emitting element;

The first electrode of the driving transistor is electrically connected to the first voltage terminal.

Optionally, the switch control circuit includes a third transistor, and the driving circuit includes a driving transistor;

a gate electrode of the third transistor is electrically connected to the switch control terminal, a first electrode of the third transistor is electrically connected to the second electrode of the light emitting element, a second electrode of the third transistor is electrically connected to the first electrode of the driving transistor, and the second electrode of the driving transistor is electrically connected to the second voltage terminal.

Optionally, the switch control circuit includes a third transistor, and the driving circuit includes a driving transistor; the second electrode of the light emitting element is electrically connected to the first electrode of the driving transistor;

a gate electrode of the third transistor is electrically connected to the switch control terminal, a first electrode of the third transistor is electrically connected to the second electrode of the driving transistor, and a second electrode of the third transistor is electrically connected to the first electrode of the light emitting element.

Optionally, the display data writing-in circuit includes a sixth transistor;

A gate electrode of the sixth transistor is electrically connected to the scanning terminal, a first electrode of the sixth transistor is electrically connected to the second data line, and a second electrode of the sixth transistor is electrically connected to the control terminal of the driving circuit.

Optionally, the energy storage circuit includes a storage capacitor, the compensation circuit includes a thirteenth transistor, and the switch circuit includes a first switch;

a first terminal of the storage capacitor is electrically connected to the control terminal of the driving circuit, and a second terminal of the storage capacitor is electrically connected to the second terminal of the driving circuit;

a gate electrode of the thirteenth transistor is electrically connected to the scanning terminal, a first electrode of the thirteenth transistor is electrically connected to the first electrode of the light emitting element or the second terminal of the driving circuit, and a second electrode of the thirteenth transistor is electrically connected to the control node;

a control terminal of the first switch is electrically connected to the first selection control terminal, a first terminal of the first switch is electrically connected to the control node, and a second terminal of the first switch is electrically connected to the reference voltage terminal.

Optionally, the energy storage circuit includes a storage capacitor, the compensation circuit includes a thirteenth transistor, and the switch circuit includes a first switch;

a first terminal of the storage capacitor is electrically connected to the control terminal of the driving circuit, and a second terminal of the storage capacitor is electrically connected to the first terminal of the driving circuit;

a gate electrode of the thirteenth transistor is electrically connected to the scanning terminal, a first electrode of the thirteenth transistor is electrically connected to the second electrode of the light emitting element or the first terminal of the driving circuit, and a second electrode of the thirteenth transistor is electrically connected to the control node;

a control terminal of the first switch is electrically connected to the first selection control terminal, a first terminal of the first switch is electrically connected to the control node, and a second terminal of the first switch is electrically connected to the reference voltage terminal.

Optionally, the switch circuit further includes a second switch;

a control terminal of the second switch is electrically connected to the second selection control terminal, a first terminal of the second switch is electrically connected to the control node, and a second terminal of the second switch is electrically connected to the compensation terminal.

Figure 31:
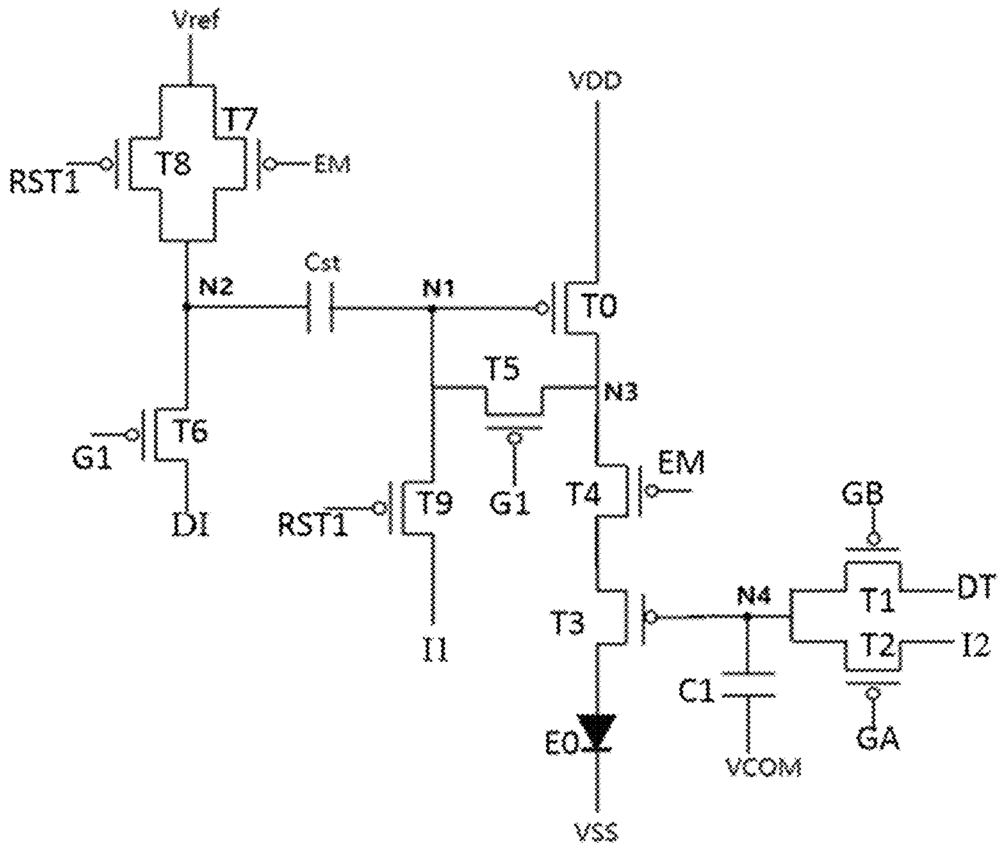
FIG. 31 is a circuit diagram of a pixel circuit according to at least one embodiment of the present disclosure.

As shown in FIG. 31, based on the pixel circuit shown in FIG. 17, the light emitting element is a light emitting diode E0; the cathode of the light emitting diode E0 is electrically connected to the low voltage terminal VSS;

The driving control circuit includes a first transistor T1, a second transistor T2 and a first capacitor C1;

The gate electrode of the first transistor T1 is electrically connected to the first control terminal GB, the source electrode of the first transistor T1 is electrically connected to the first data line DT, and the drain electrode of the first transistor T1 is electrically connected to the switch control terminal N4;

The gate electrode of the second transistor T2 is electrically connected to the second control terminal GA, the source electrode of the second transistor T2 is electrically connected to the second initial voltage terminal I2, and the drain electrode of the second transistor T2 is electrically connected to the switch control terminal N4; the second initial voltage terminal I2 is configured to provide a second initial voltage Vi2;

A first terminal of the first capacitor C1 is electrically connected to the switch control terminal N4, and a second terminal of the first capacitor C1 is electrically connected to the common electrode voltage terminal VCOM;

The driving circuit includes a driving transistor T0, the switch control circuit includes a third transistor T3, the light emitting control circuit includes a fourth transistor T4, and the compensation control circuit includes a fifth transistor T5;

The gate electrode of the driving transistor T0 is electrically connected to the first node N1, the source electrode of the driving transistor T0 is electrically connected to the high voltage terminal VDD, and the drain electrode of the driving transistor T0 is electrically connected to the third node N3;

The gate electrode of the fourth transistor T4 is electrically connected to the light emitting control terminal EM, the source electrode of the fourth transistor T4 is electrically connected to the third node N3, and the drain electrode of the fourth transistor T4 is electrically connected to the source electrode of the third transistor T3;

The gate electrode of the third transistor T3 is electrically connected to the switch control terminal N4, and the drain electrode of the third transistor T3 is electrically connected to the anode of the light emitting diode E0;

The gate electrode of the fifth transistor T5 is electrically connected to the scanning terminal G1, the source electrode of the fifth transistor T5 is electrically connected to the first node N1, and the drain electrode of the fifth transistor T5 is electrically connected to the third node N3;

The display data writing-in circuit includes a sixth transistor T6, and the first control circuit includes a seventh transistor T7;

The gate electrode of the sixth transistor T6 is electrically connected to the scanning terminal G1, the source electrode of the sixth transistor T6 is electrically connected to the second data line DI, and the drain electrode of the sixth transistor T6 is electrically connected to the second node N2;

The gate electrode of the seventh transistor T7 is electrically connected to the light emitting control terminal EM, the source electrode of the seventh transistor T7 is electrically connected to the reference voltage terminal, and the drain electrode of the seventh transistor T7 is electrically connected to the second node N2; the reference voltage terminal is configured to provide a reference voltage Vref;

The first reset circuit comprises an eighth transistor T8;

The gate electrode of the eighth transistor T8 is electrically connected to the first reset control terminal RST1, the source electrode of the eighth transistor T8 is electrically connected to the reference voltage terminal, and the drain electrode of the eighth transistor T8 is electrically connected to the second node N2;

The second reset circuit comprises a ninth transistor T9,

The gate electrode of the ninth transistor T9 is electrically connected to the first reset control terminal RST1, the source electrode of the ninth transistor T9 is electrically connected to the first initial voltage terminal I1, and the drain electrode of the ninth transistor T9 is electrically connected to the first node N1; the first initial voltage terminal I1 is configured to provide a first initial voltage Vi1;

The energy storage circuit includes a storage capacitor Cst;

A first terminal of the storage capacitor Cst is electrically connected to the first node N1, and a second terminal of the storage capacitor Cst is electrically connected to the second node N2.

In the pixel circuit shown in FIG. 31, all transistors are p-type transistors, but the present invention is not limited thereto.

In the pixel circuit shown in FIG. 31, E0 may be OLED (organic light emitting diode), Mini LED (mini light emitting diode) or Micro LED (micro light emitting diode), but is not limited thereto.

When the pixel circuit shown in FIG. 31 of the present disclosure is working, the pixel circuit delays writing-in the light emitting time control data voltage provided by the first data line DT into the pixel circuit to realize PAM (pulse amplitude modulation)+PWM (pulse width modulation) pixel driving.

In the pixel circuit shown in FIG. 31 of the present disclosure, Vi1 is less than Vdd+Vth, and when the second initial voltage Vi2 is written into N4, T3 can be turned on; wherein Vdd is the voltage value of the high voltage signal provided by VDD, and Vth is the threshold voltage of T0.

The value of Vdata_I and the value of Vref need to satisfy the driving current of E0 while Vref is less than or equal to Vdata_I to achieve grayscale display;

In high grayscale display, in a preferred case, Vdata_T is equal to Vdata_I;

In low grayscale display, when Vdata_T is written into N4, T3 can be turned off.

Figure 32:
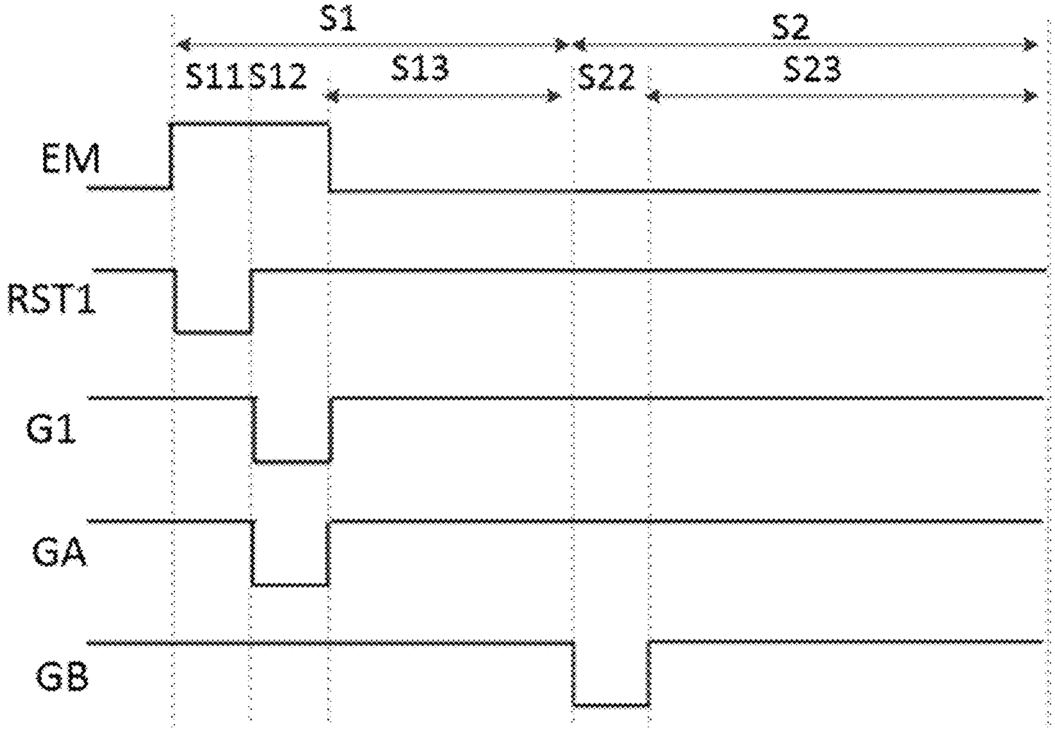
FIG. 32 is a timing diagram of the pixel circuit shown in FIG. 31.
Figure 33A:
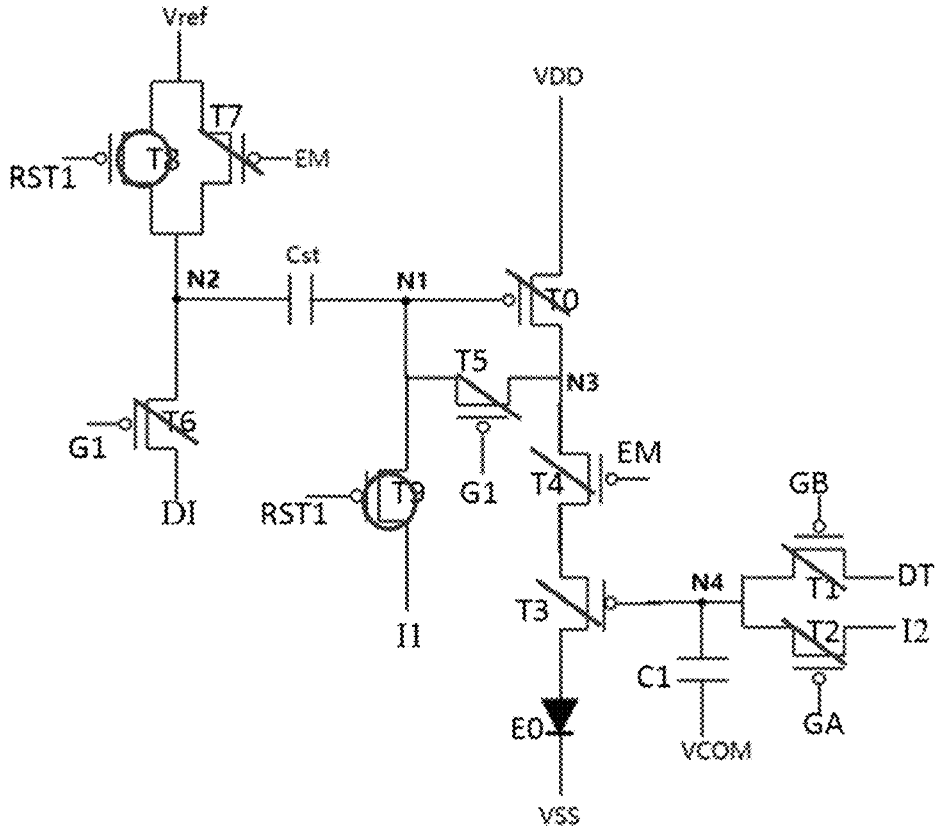
FIG. 33A is a schematic diagram showing the working state of the pixel circuit shown in FIG. 31 in a first reset time period S11.
Figure 33B:
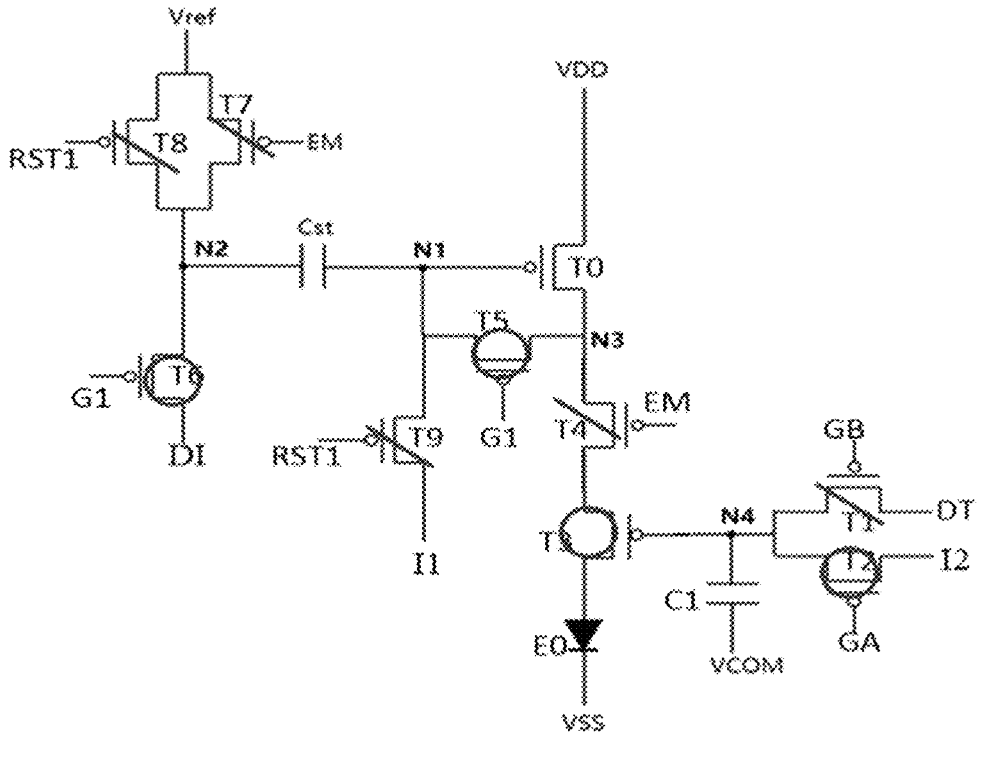
FIG. 33B is a schematic diagram showing the working state of the pixel circuit shown in FIG. 31 in the first writing-in time period S12.
Figure 33C:
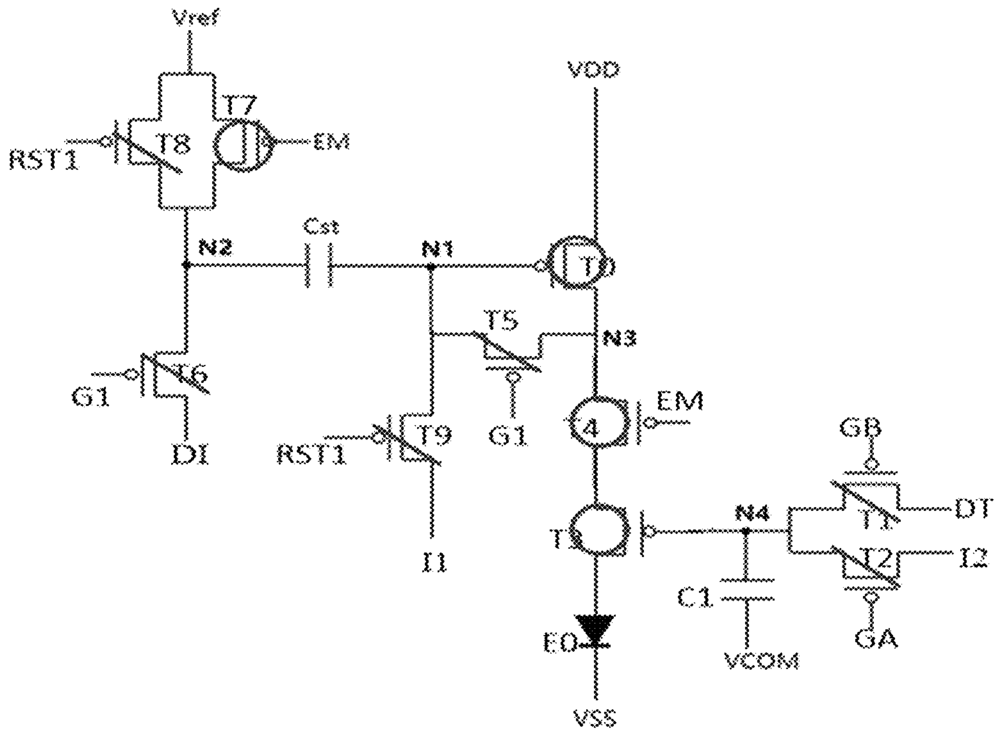
FIG. 33C is a schematic diagram showing the working state of the pixel circuit shown in FIG. 31 in the first light emitting time period S13.

As shown in FIG. 32, when the pixel circuit shown in FIG. 31 of the present disclosure is in operation, a display cycle (the display cycle may be a frame display time) includes a first display phase S1 and a second display phase S2 which are successively arranged;

The first display phase S1 includes a first reset time period S11, a first writing-in time period S12 and a first light emitting time period S13 which are set successively; the second display phase S2 includes a second writing-in time period S22 and a second light emitting time period S23 which are set successively;

In the first reset time period S11, RST provides a low voltage signal, as shown in FIG. 33A, T8 and T9 are turned on to write the reference voltage Vref into the second node N2, and write the first initial voltage Vi1 provided by I1 into the first node N1;

In the first writing-in time period S12, G1 provides a low voltage signal, as shown in FIG. 33B, T6 is turned on, DI provides a display data voltage Vdata_I to the second node N2, and T5 is turned on;

At the beginning of the first writing-in time period S12, T0 is turned on to charge Cst through Vdata_I until the first node N1 becomes Vdd+Vth, and T0 is turned off to perform threshold voltage compensation; Vth is the threshold voltage of T0, and Vdd is the voltage value of the high voltage signal provided by VDD;

In the first writing-in time period S12, the voltage signal provided by GA, T2 is turned on to write the second initial voltage Vi2 into the fourth node N4, T3 is turned on;

In the first light emitting time period S13, EM provides a low voltage signal, as shown in FIG. 33C, T7 and T4 are turned on, T3 is turned on, and T0 drives E0 to emit light;

In the first light emitting time period S13, the potential of N2 is Vref. Due to the capacitive coupling effect, the potential of N1 is Vdd+Vth+Vref−Vdata_I. The gate-source voltage Vgs of T0 is equal to Vth+Vref−Vdata_I. Id is equal to $K\times(Vref-Vdata\_I)^2$; K is the current coefficient of T0; Id is the driving current of T0 driving E0 to emit light.

Figure 33D:
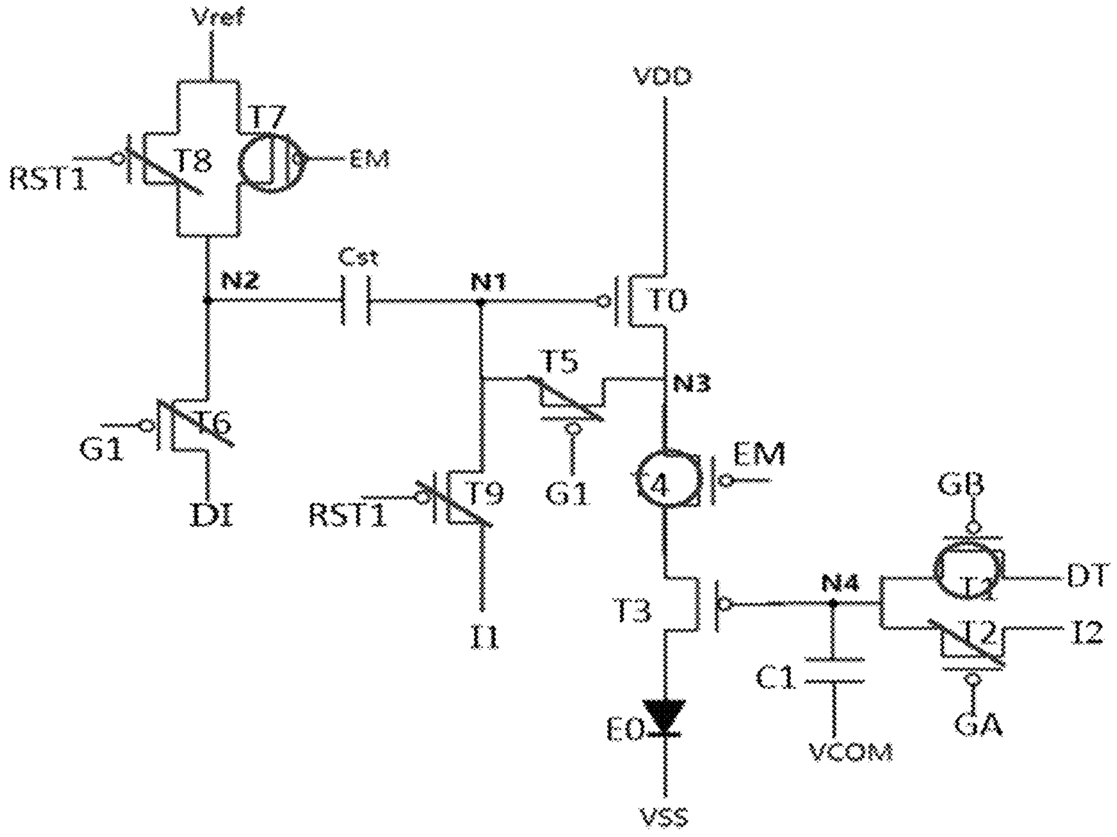
FIG. 33D is a schematic diagram showing the working state of the pixel circuit shown in FIG. 31 in a second reset time period S21.
Figure 33E:
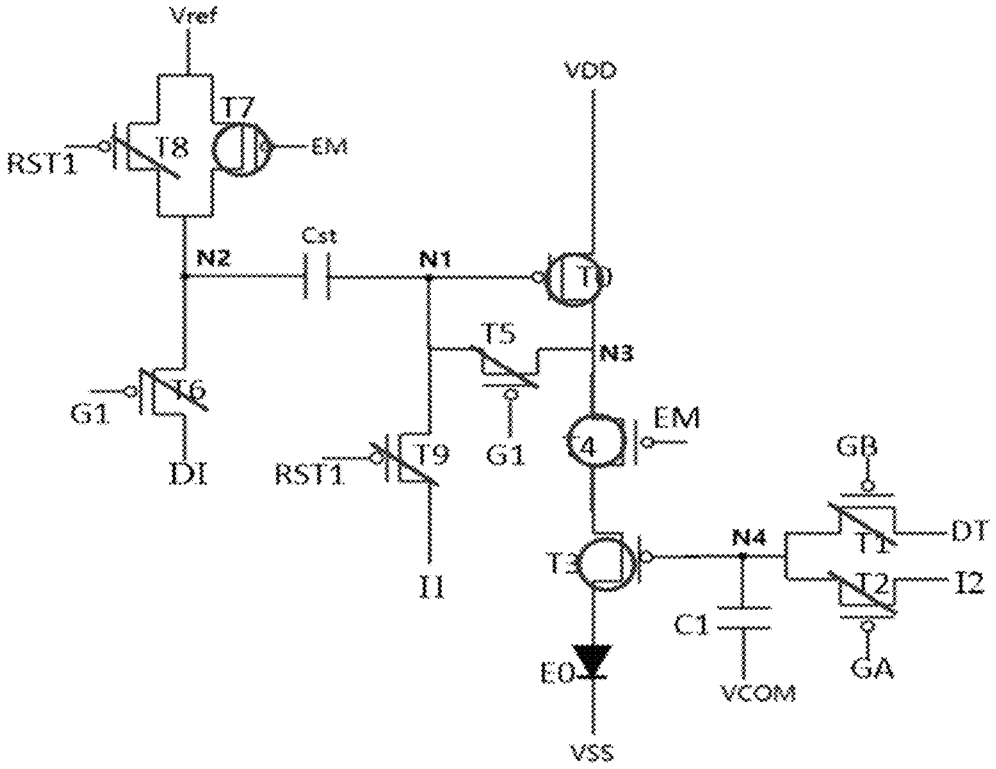
FIG. 33E is a schematic diagram showing the working state of the pixel circuit shown in FIG. 31 in a second writing-in time period S22.

In the second writing-in time period S22, the first time t1 is delayed (the first time t1 is the light emitting time required for the low grayscale), GB outputs a low voltage signal, as shown in FIG. 33D, T1 is turned on, and DT provides the light emitting time control data voltage Vdata_T to N4; t1 is the duration of the first light emitting time period S13;

FIG. 33E is a schematic diagram showing the working state of the pixel circuit shown in FIG. 31 in the second light emitting time period S23.

When Vdata_T is a high voltage signal, in the second light emitting time period S23, T3 is turned off, E0 does not emit light, and a short-time light emitting is achieved, and the light emitting duration is t1;

When Vdata_T is a low voltage signal, the optimal voltage value of Vdata_T is the same as the voltage value of Vi2, T3 is turned on, T0 drives E0 to emit light, E0 continues to emit light, and long-term light emitting is achieved. The light emitting duration is t1+t2, t2 is the second time, and t2 is the duration of the second writing-in time period S22.

When the pixel circuit shown in FIG. 31 is working, the second control signal provided by GA can be the same as the scanning signal provided by G1, or the second control signal provided by GA can be the same as the reset control signal provided by RST, that is, the second initial voltage Vi2 can be written into N4 in the first reset time period S11 or the first writing-in time period S12, and GA can share the GOA (Gate On Array, a gate driving circuit arranged on the array substrate) circuit with G1 or RST; in addition, since Vi2 is a DC voltage signal, GA can also not use a shift register, and can be turned on for one frame of time to reset the potential of N4 of all pixel circuits at once.

Figure 34A:
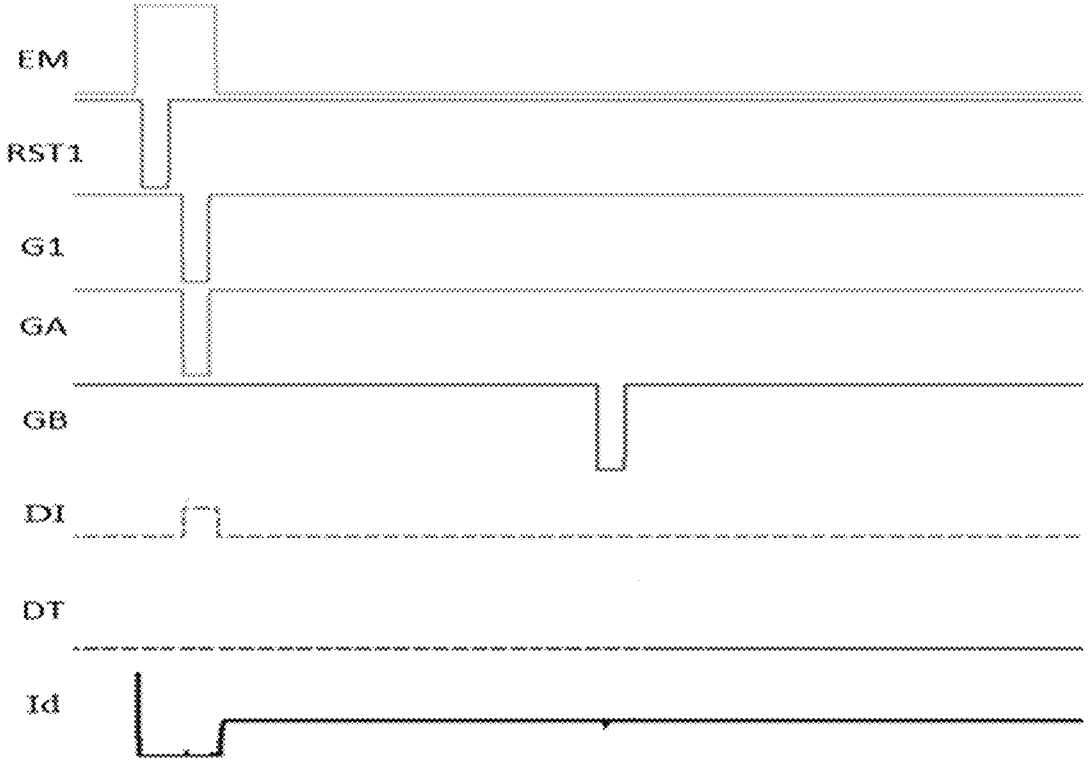
FIG. 34A is a schematic diagram of simulation results of a high grayscale display of the pixel circuit shown in FIG. 31.
Figure 34B:
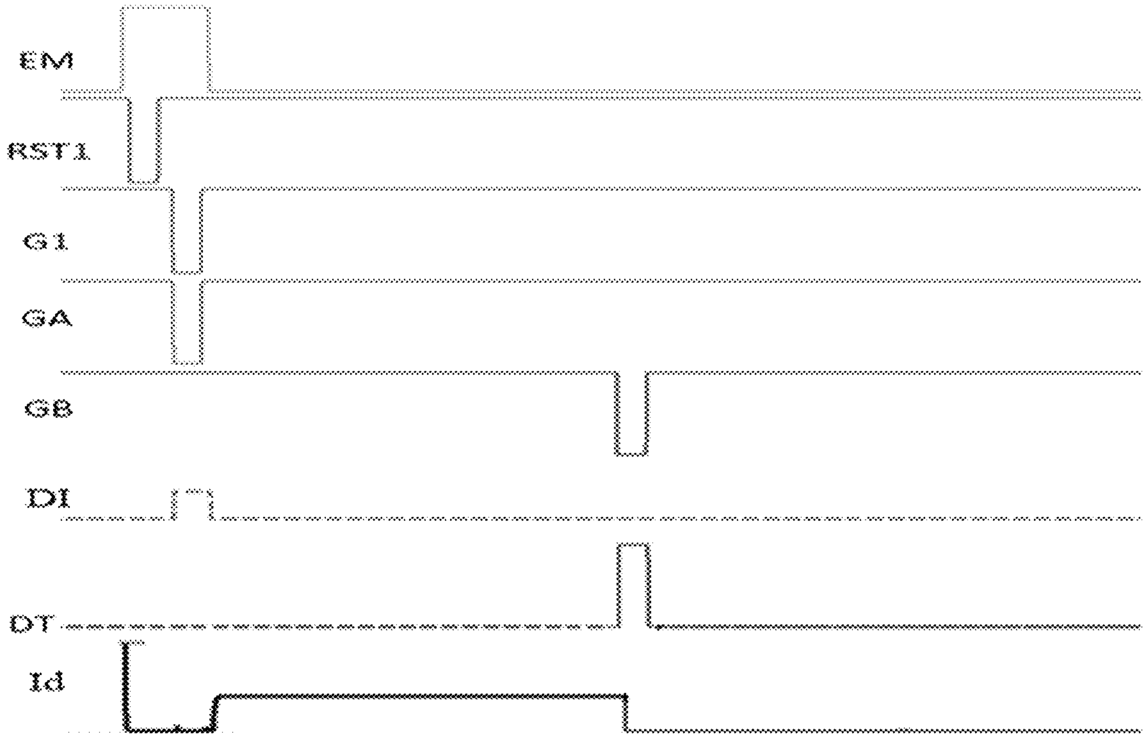
FIG. 34B is a schematic diagram showing simulation results of low grayscale display of the pixel circuit shown in FIG. 31.

FIG. 34A is a schematic diagram of simulation results of high grayscale display of the pixel circuit shown in FIG. 31; FIG. 34B is a schematic diagram of simulation results of low grayscale display of the pixel circuit shown in FIG. 31.

In at least one embodiment of the present disclosure, Id is the driving current generated at T0.

As shown in FIG. 34A, when displaying at a high gray scale, Vdd is equal to 4.6V, Vss is equal to −3V, Vi1 is equal to −3V, Vi2 is equal to −5V, Vdata_I is equal to 4V, Vref is equal to 2V, and Vdata_T is equal to −5V; wherein Vss is the voltage value of the low voltage signal provided by VSS;

As shown in FIG. 34B, in low grayscale display, Vdd is equal to 4.6V, Vss is equal to −3V, Vi1 is equal to −3V, Vi2 is equal to −5V, Vdata_I is equal to 4V, Vref is equal to 2V, and Vdata_T is equal to 5V.

Figure 35:
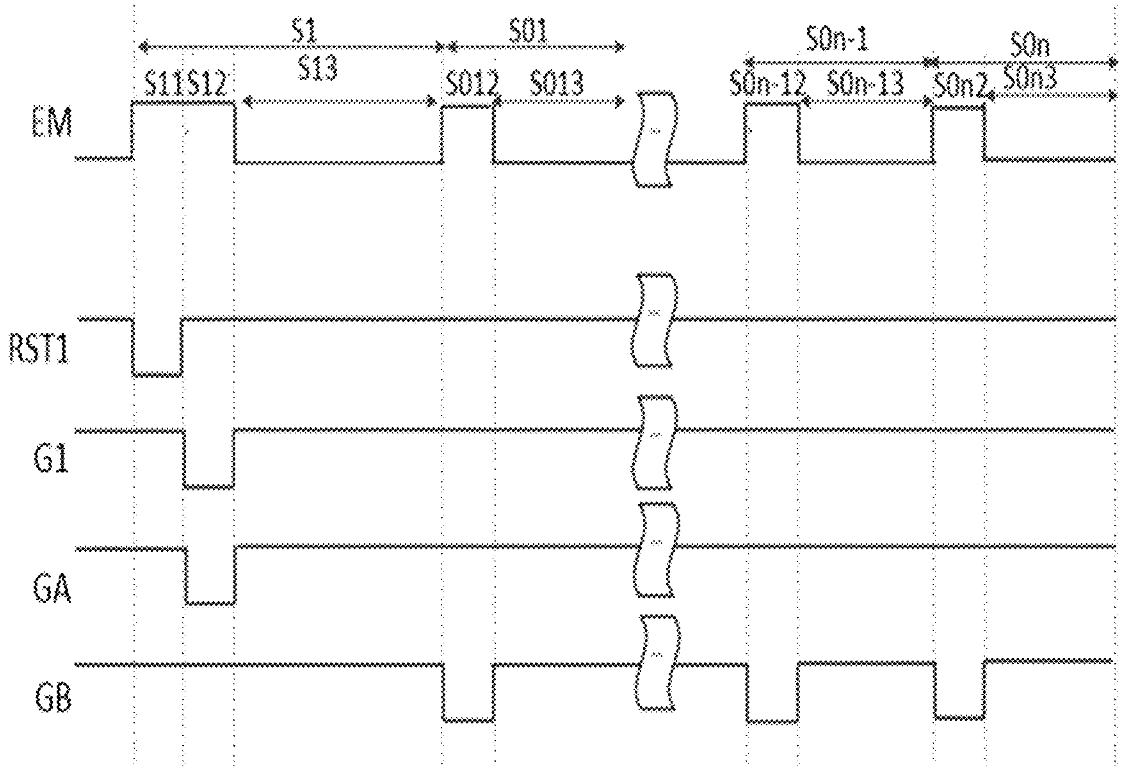
FIG. 35 is a timing diagram of the pixel circuit shown in FIG. 31.

As shown in FIG. 35, when the pixel circuit shown in FIG. 31 is working, a display cycle (the display cycle may be one frame of time) may include a first display phase and n second display phases that are arranged in sequence; in a writing-in time period in the first display phase, DI writes a display data voltage, and in a second display phase, DT writes a light emitting time control data voltage;

In FIG. 35, the first display phase is labeled S1, the first second display phase is labeled S01, the (n−1)th first display phase is labeled S0*n*−1, and the nth first display phase is labeled S0*n*; n is an integer greater than 2;

The first display phase S1 includes a first reset time period S11, a first writing-in time period S12 and a first light emitting time period S13 which are arranged successively;

The first second display phase S01 includes a first second writing-in time period S012 and a first second light emitting time period S013 which are successively arranged;

The (n−1)th second display phase S0*n*−1 includes the (n−1)th second writing-in time period S0*n*−12 and the (n−1)th second light emitting time period S0*n*−13 which are arranged successively;

The nth second display phase S0*n* includes an nth second writing-in time period S0*n*2 and an nth second light emitting time period S0*n*3 which are arranged successively;

In the first reset time period S11, RST provides a low voltage signal, T8 and T9 are turned on to write the reference voltage Vref into the second node N2, and write the first initial voltage Vi1 provided by I1 into the first node N1;

In the first writing-in time period S12, G1 provides a low voltage signal, T6 is turned on, DI provides a display data voltage Vdata_I to the second node N2, and T5 is turned on to charge Cst until the first node N1 becomes Vdd+Vth; Vth is the threshold voltage of T0, and Vdd is the voltage value of the high voltage signal provided by VDD;

In the first writing-in time period S12, the voltage signal provided by GA, T2 is turned on to write the second initial voltage Vi2 into the fourth node N4, T3 is turned on;

In the first light emitting time period S13, EM provides a low voltage signal, T7 and T4 are turned on, T3 is turned on, and T0 drives E0 to emit light;

In the first light emitting time period S13, the potential of N2 is Vref. Due to the capacitive coupling effect, the potential of N1 is Vdd+Vth+Vref−Vdata_I. The gate-source voltage Vgs of T0 is equal to Vth+Vref−Vdata_I. Id is equal to $K\times(Vref-Vdata\_I)^2$; K is the current coefficient of T0; Id is the driving current of T0 driving E0 to emit light.

In S012, EM provides a high voltage signal, RST provides a high voltage signal, G1 provides a high voltage signal, GA provides a high voltage signal, GB provides a low voltage signal, T1 is turned on, and DT provides a first light emitting time control data voltage to N4;

When DT provides a low voltage signal at S012, T3 is turned on, T4 is turned on, and T0 drives E0 to emit light at S013;

When DT provides a high voltage signal at S012, T3 is turned off at S013, and E0 does not emit light;

At S0*n*−12, EM provides a high voltage signal, RST provides a high voltage signal, G1 provides a high voltage signal, GA provides a high voltage signal, GB provides a low voltage signal, T1 is turned on, and DT provides the (n−1)th light emitting time control data voltage to N4;

When DT provides a low voltage signal at S0*n*−12, T3 is turned on at S0*n*−13, T4 is turned on, and T0 drives E0 to emit light;

When DT provides a high voltage signal at S0*n*−12, T3 is turned off at S0*n*−13, and E0 does not emit light;

At S0*n*2, EM provides a high voltage signal, RST provides a high voltage signal, G1 provides a high voltage signal, GA provides a high voltage signal, GB provides a low voltage signal, T1 is turned on, and DT provides the nth light emitting time control data voltage to N4;

When DT provides a low voltage signal at S0*n*2, T3 is turned on at S0*n*3, T4 is turned on, and T0 drives E0 to emit light;

When DT provides a high voltage signal at S0*n*2, T3 is turned off at S0*n*3, and E0 does not emit light;

According to the light emitting time control data voltage provided by DT in each second writing-in time period, it can be determined whether E0 emits light in each second light emitting time period.

As shown in FIG. 35, when the pixel circuit shown in FIG. 31 is working, the light emitting time control data voltage is written multiple times within one frame of time, and the light emitting time control data voltage is written at a high frequency, so that the low grayscale short-time light emitting is divided into multiple segments of short-time light emitting, so as to realize low grayscale short-time high-frequency light emitting, reduce the continuous non-light emitting time within one frame of time, and further reduce the low grayscale flicker, realize healthy display, and improve display performance.

In specific implementation, the high-frequency writing-in of the light emitting time control data voltage can be input by multiple groups of first data lines, or a frame is divided into multiple sub-frames and a single first data line is input multiple times, or the second initial voltage and the light emitting time control data voltage can be written alternately at high frequency.

Figure 36:
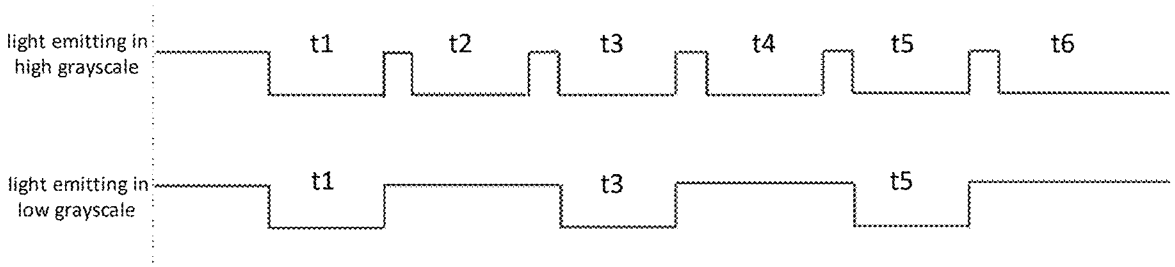
FIG. 36 is a schematic diagram of the light emitting time of the pixel circuit shown in FIG. 31 when emitting light at a high grayscale and a low grayscale.

FIG. 36 is a schematic diagram of the light emitting time of the pixel circuit shown in FIG. 31 when emitting light at a high grayscale and a low grayscale;

As shown in FIG. 36, n is equal to 5;

When high grayscale display is performed, the light emitting duration may be t1+t2+t3+t4+t5+t6;

When performing low grayscale display, the light emitting duration may be t1+t3+t5;

t1 is the first time, t2 is the second time, t3 is the third time, t4 is the fourth time, t5 is the fifth time, and t6 is the sixth time;

t1 is the duration of the first light emitting time period, t2 is the duration of the first second light emitting time period, t3 is the duration of the second second light emitting time period, t4 is the duration of the third second light emitting time period, t5 is the duration of the fourth second light emitting time period, and t6 is the duration of the fifth second light emitting time period.

Figure 37:
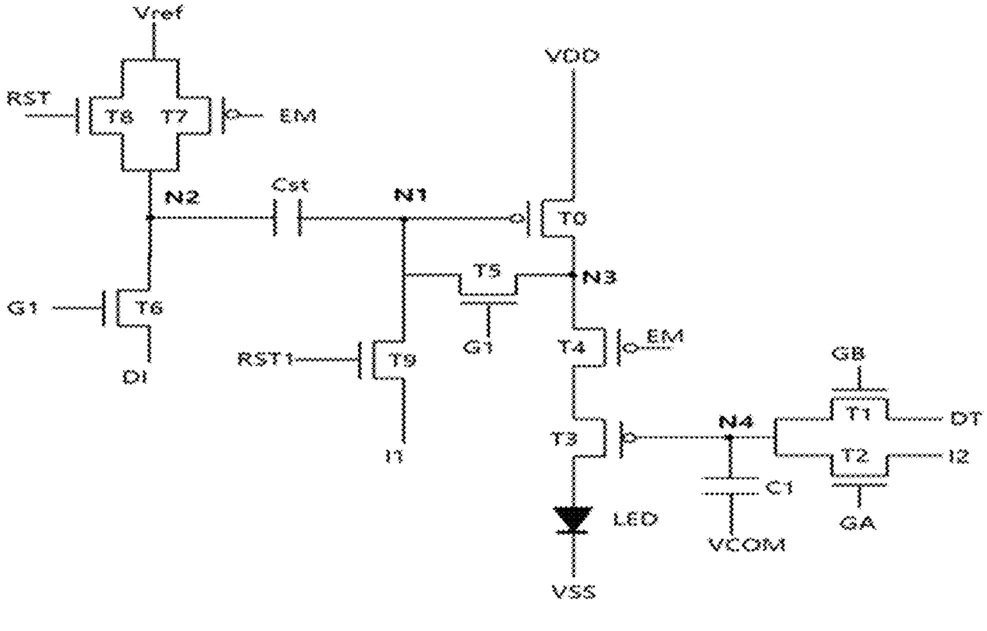
FIG. 37 is a circuit diagram of a pixel circuit according to at least one embodiment of the present disclosure.

The difference between the pixel circuit shown in FIG. 37 and the pixel circuit shown in FIG. 31 is that T1, T2, T5, T6, T8, and T9 are all NMOS transistors.

The pixel circuit shown in FIG. 37 utilizes the low leakage current advantage of oxide thin film transistors to change T8, T6, T9, T5, T1, T2 or part of them into NMOS (N-type metal-oxide-semiconductor) transistors to reduce the leakage of N1, N2, and N4; utilizing the high mobility of PMOS transistors, T0, T3, T4, and T7 are set to PMOS transistors to meet threshold voltage compensation, current driving requirements, and reduce charging time, thereby further improving display performance.

Figure 38:
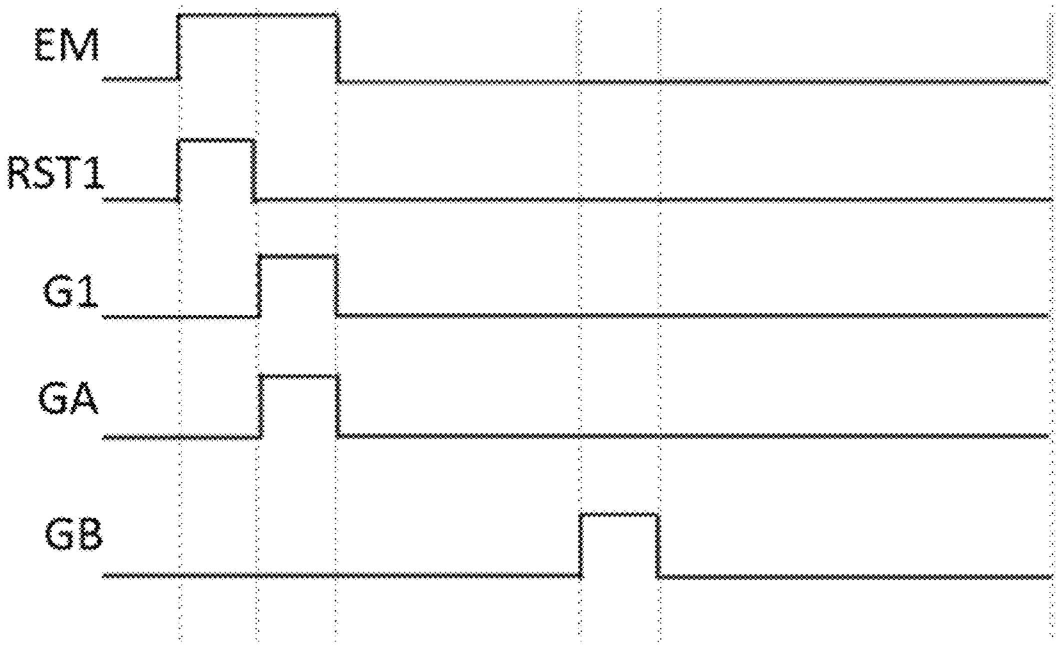
FIG. 38 is a timing diagram of the pixel circuit shown in FIG. 37.

FIG. 38 is a timing diagram of the pixel circuit shown in FIG. 37.

Figure 39:
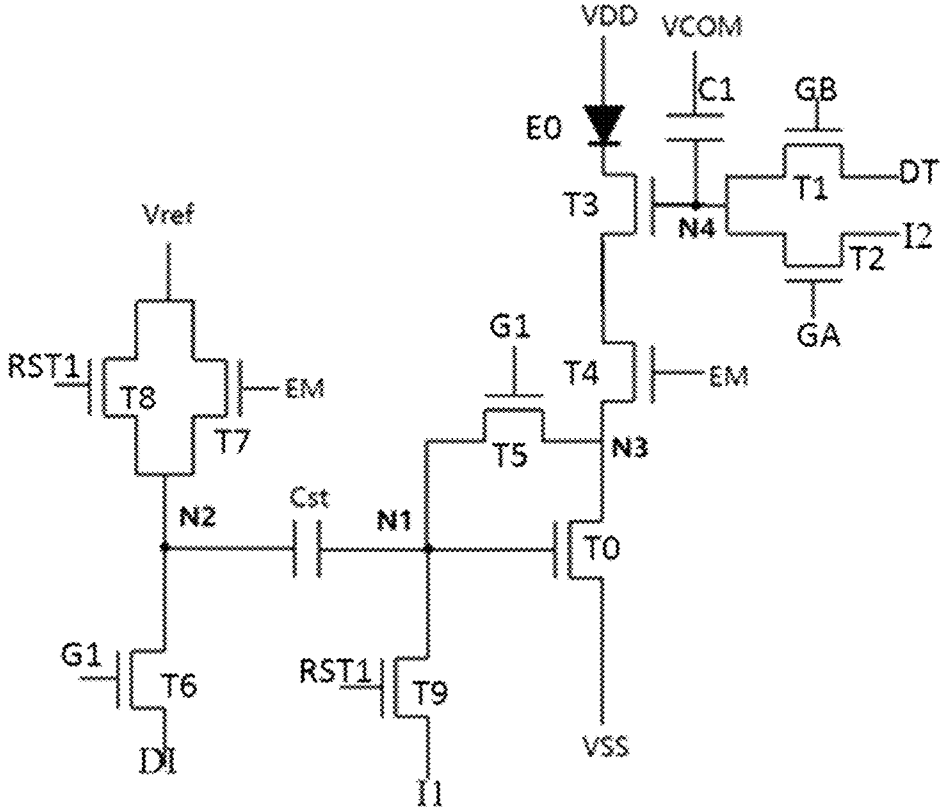
FIG. 39 is a circuit diagram of a pixel circuit according to at least one embodiment of the present disclosure.

The difference between the pixel circuit shown in FIG. 39 and the pixel circuit shown in FIG. 37 is that all transistors are NMOS transistors.

The pixel circuit shown in FIG. 39 adopts NMOS TFT technology to realize a pixel circuit of current control+light emitting duration control, and can be applied to oxide display products.

In the pixel circuit shown in FIG. 39, E0 may be a Mini LED or a Micro LED, but is not limited thereto.

In the pixel circuit shown in FIG. 39, Vi1 is greater than Vss+Vth, where Vss is the voltage value of the low voltage signal provided by VSS, and Vth is the threshold voltage of T0;

When Vi2 is written to N4, T3 can be turned on;

The values of Vdata_I and Vref need to satisfy the driving current of E0 while Vref needs to be greater than or equal to Vdata_I to achieve grayscale display;

In high grayscale display, in the preferred case, Vdata_T is equal to Vi2;

In low grayscale display, when Vdata_T is input to N4, T3 needs to be turned off.

Figure 40:
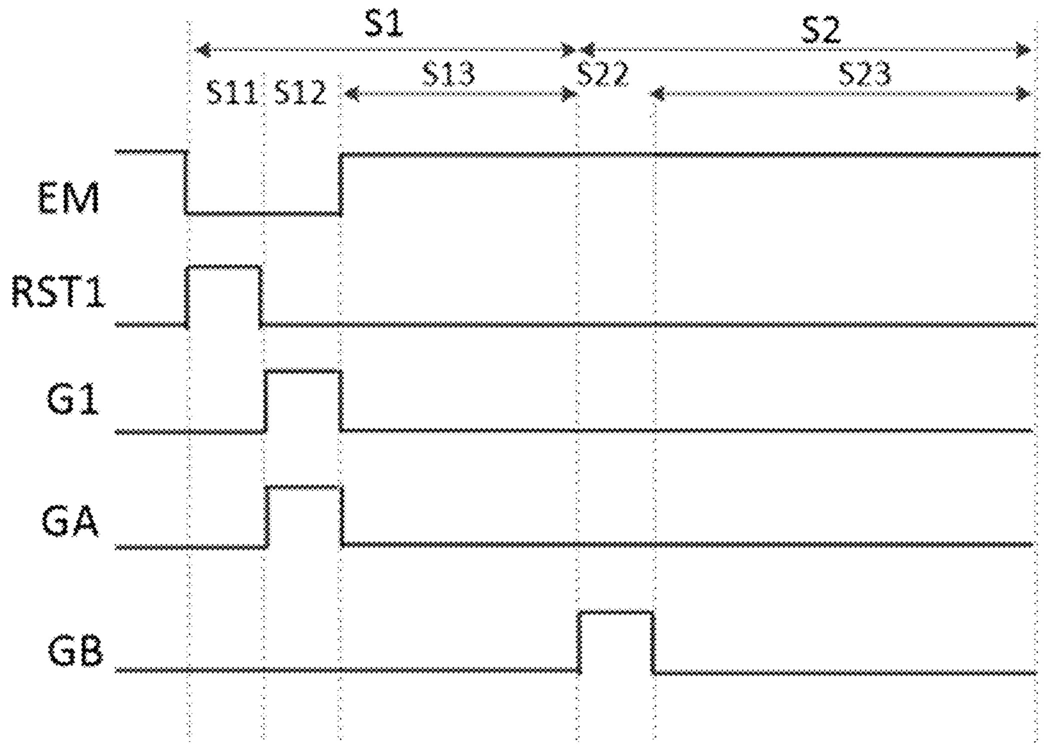
FIG. 40 is a timing diagram of the pixel circuit shown in FIG. 39.

FIG. 40 is a timing diagram of the pixel circuit shown in FIG. 39.

In FIG. 40, the first display phase is labeled S1, and the second display phase is labeled S2;

The time period labeled S11 is the first reset time period, the time period labeled S12 is the first writing-in time period, and the time period labeled S13 is the first light emitting time period;

The time period labeled S22 is the second writing-in time period, and the time period labeled S23 is the second light emitting time period.

Figure 41A:
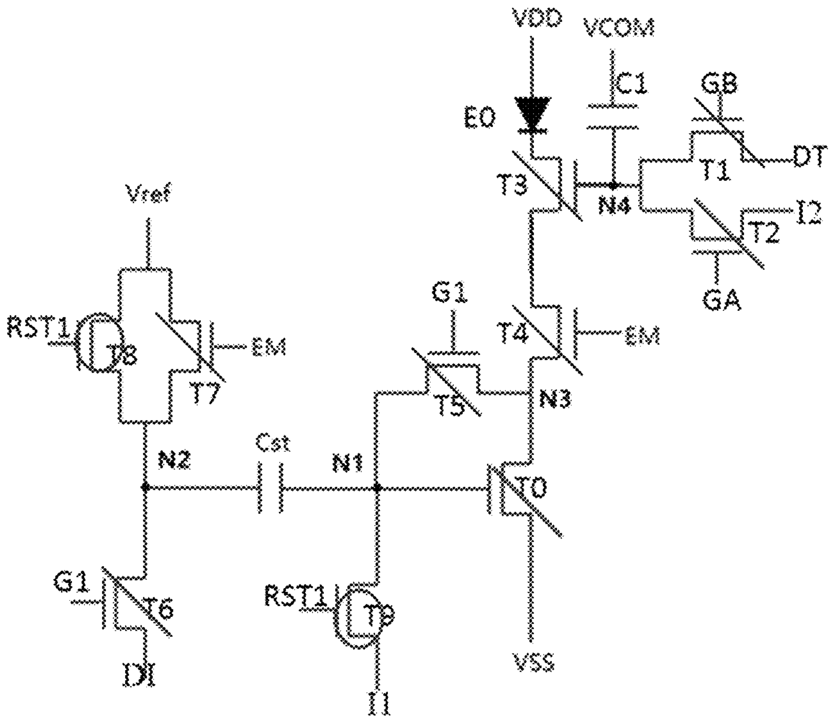
FIG. 41A is a schematic diagram showing the working state of the pixel circuit shown in FIG. 39 in a first reset time period S11.
Figure 41B:
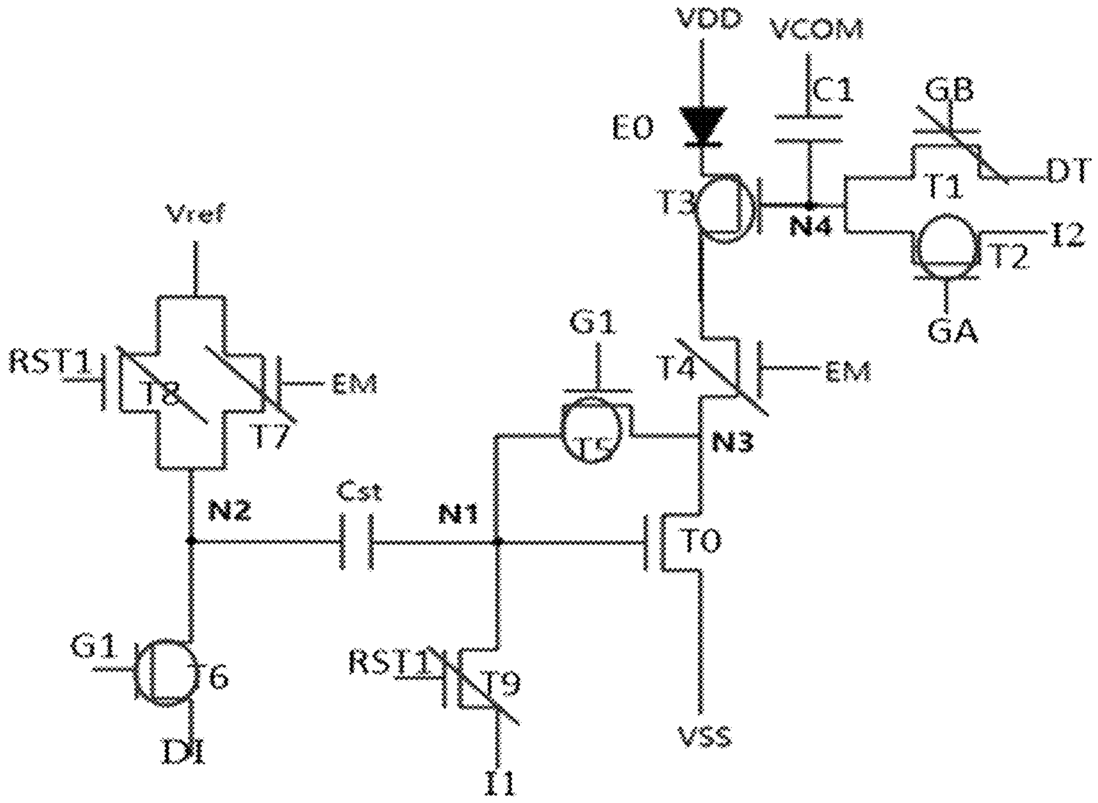
FIG. 41B is a schematic diagram showing the working state of the pixel circuit shown in FIG. 39 in the first writing-in time period S12.
Figure 41C:
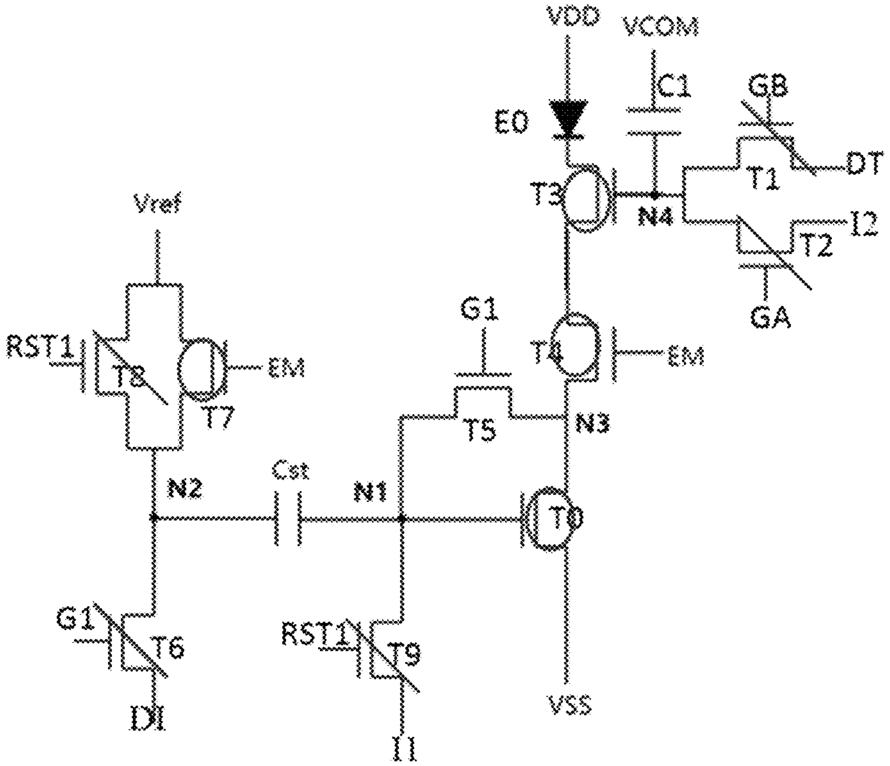
FIG. 41C is a schematic diagram showing the working state of the pixel circuit shown in FIG. 39 in the first light emitting time period S13.
Figure 41D:
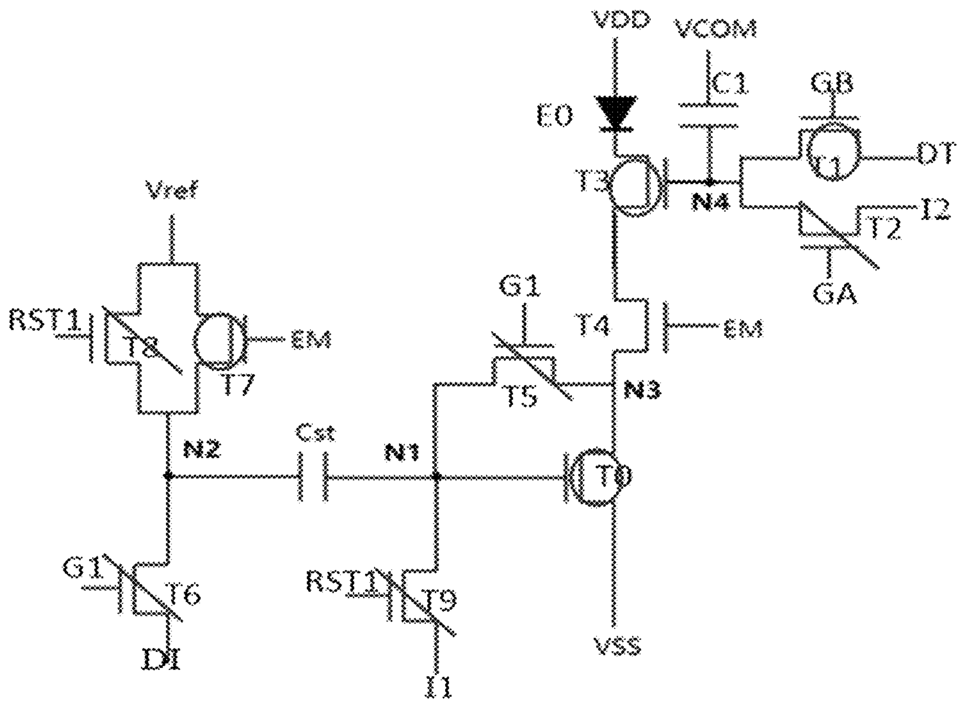
FIG. 41D is a schematic diagram showing the working state of the pixel circuit shown in FIG. 39 in a second writing-in time period S22.
Figure 41E:
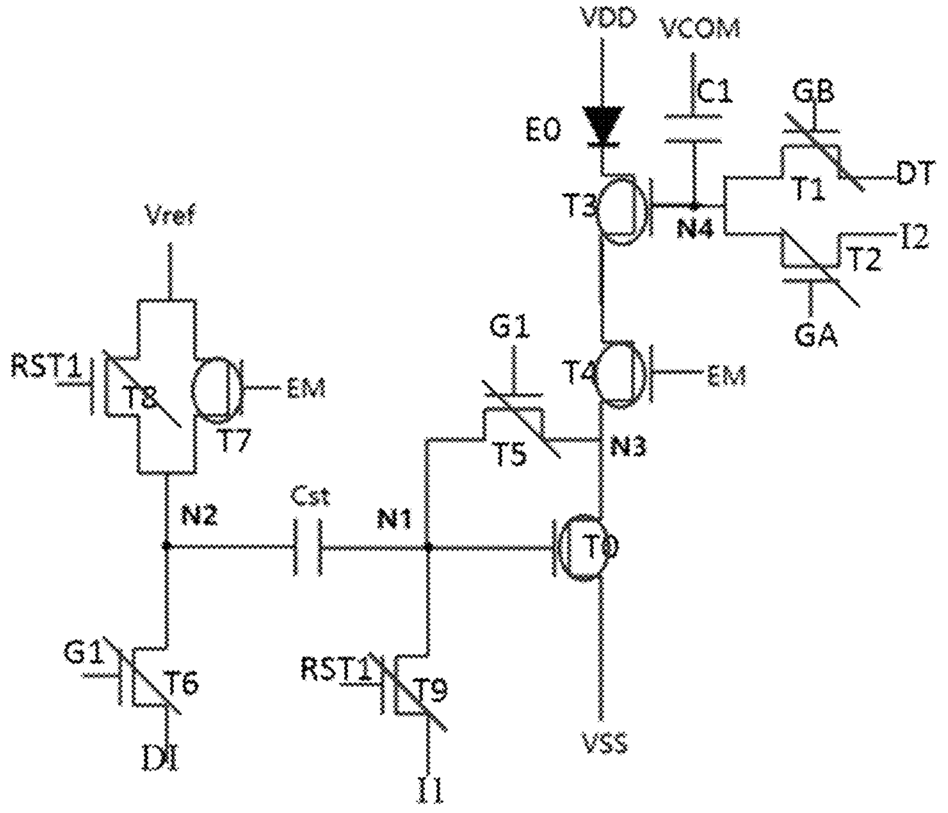
FIG. 41E is a schematic diagram showing the working state of the pixel circuit shown in FIG. 39 in the second light emitting time period S23.

FIG. 41A is a schematic diagram of the working state of the pixel circuit shown in FIG. 39 in the first reset time period S11; FIG. 41B is a schematic diagram of the working state of the pixel circuit shown in FIG. 39 in the first writing-in time period S12; FIG. 41C is a schematic diagram of the working state of the pixel circuit shown in FIG. 39 in the first light emitting time period S13; FIG. 41D is a schematic diagram of the working state of the pixel circuit shown in FIG. 39 in the second writing-in time period S22; FIG. 41E is a schematic diagram of the working state of the pixel circuit shown in FIG. 39 in the second light emitting time period S23.

Figure 42A:
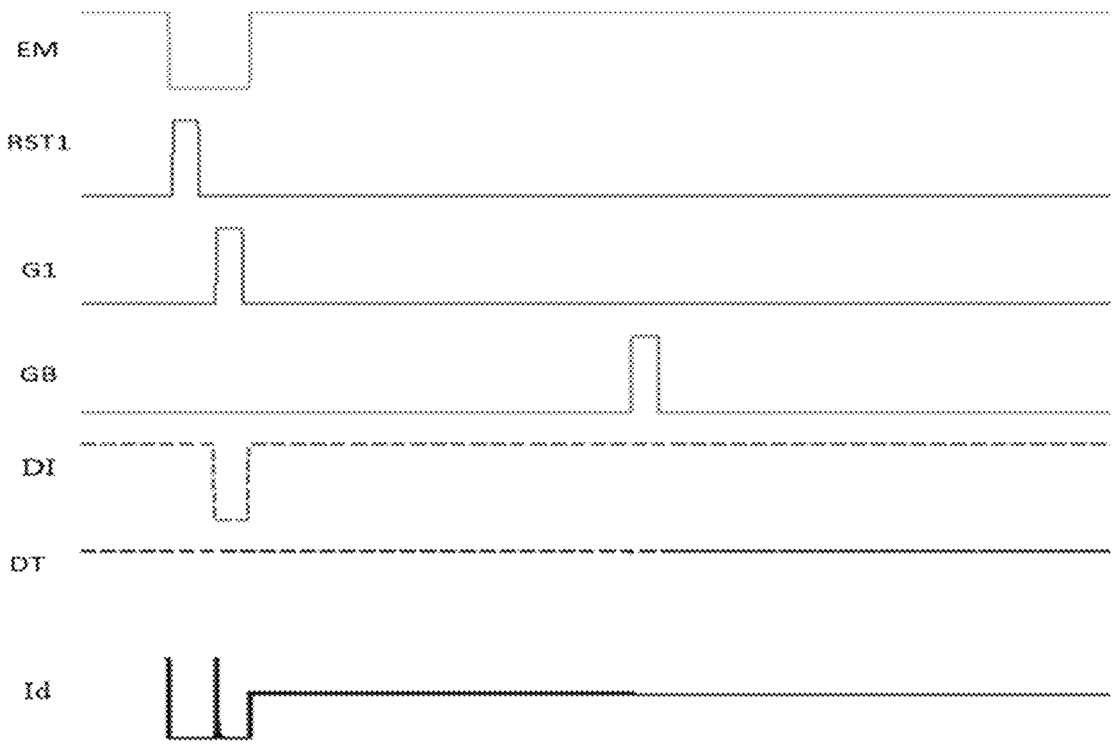
FIG. 42A is a schematic diagram showing simulation results of a high grayscale display of the pixel circuit shown in FIG. 39.
Figure 42B:
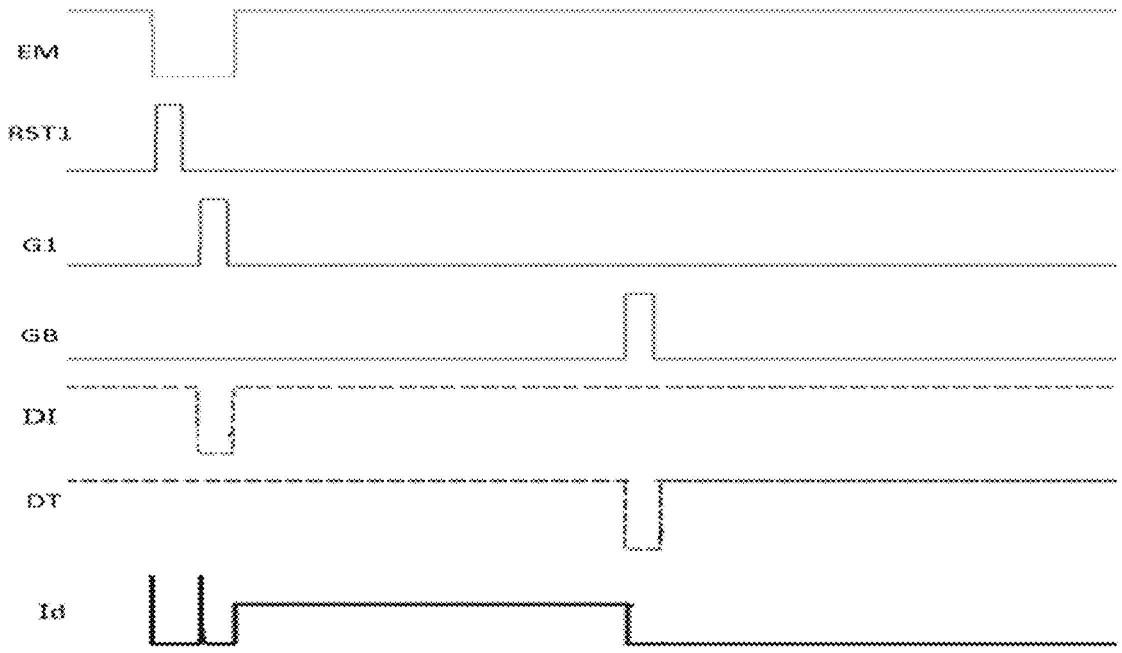
FIG. 42B is a schematic diagram showing simulation results of low grayscale display of the pixel circuit shown in FIG. 39.

FIG. 42A is a schematic diagram of simulation results of high grayscale display of the pixel circuit shown in FIG. 39; FIG. 42B is a schematic diagram of simulation results of low grayscale display of the pixel circuit shown in FIG. 39.

As shown in FIG. 42A, when displaying at a high gray scale, Vdd is equal to 7V, Vss is equal to 0V, Vi1 is equal to 8V, Vi2 is equal to 5V, Vdata_I is equal to 2V, Vref is equal to 6V, and Vdata_T is equal to 5V; wherein Vdd is the voltage value of the high voltage signal provided by VDD;

As shown in FIG. 42B, in low grayscale display, Vdd is equal to 7V, Vss is equal to 0V, Vi1 is equal to 8V, Vi2 is equal to 5V, Vdata_I is equal to 2V, Vref is equal to 6V, and Vdata_T is equal to −5V.

Figure 43A:
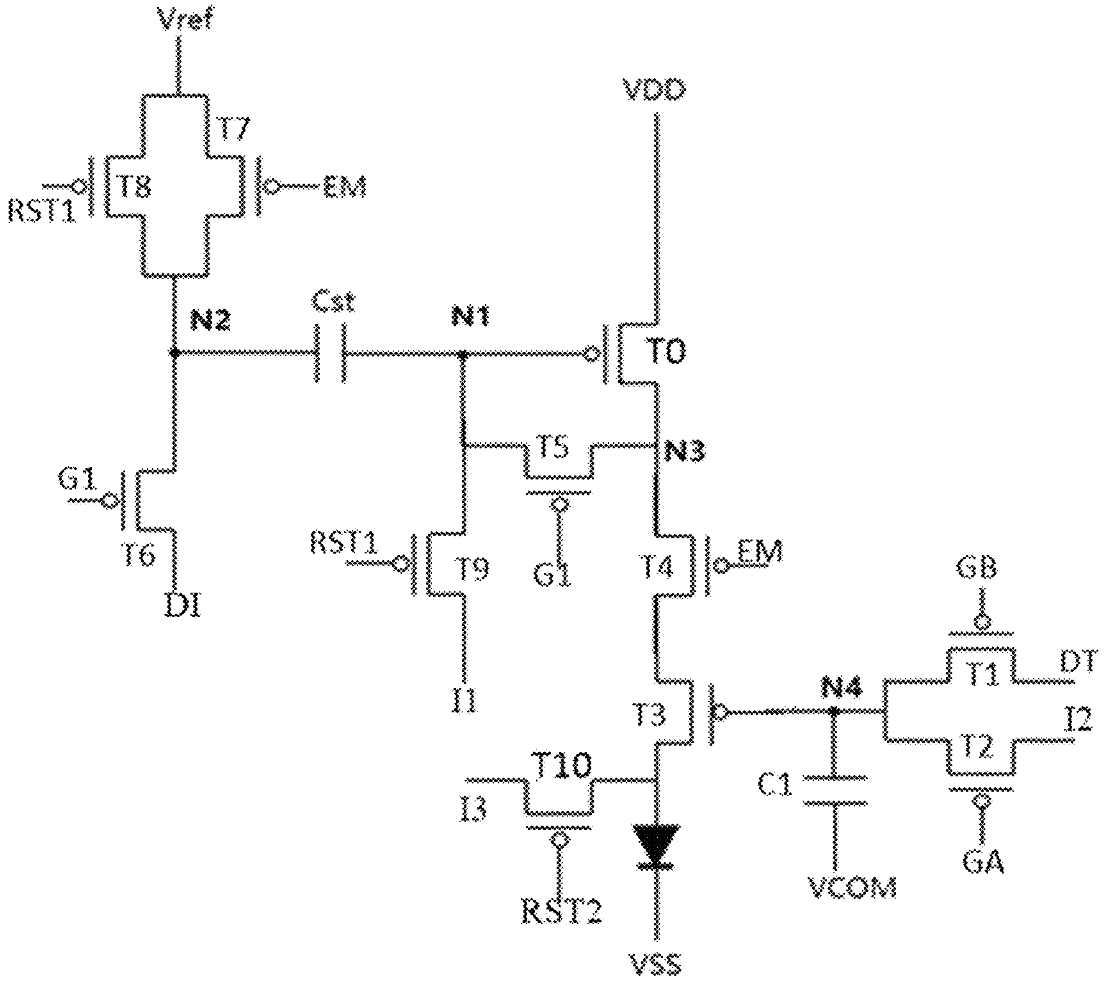
FIG. 43A is a circuit diagram of a pixel circuit according to at least one embodiment of the present disclosure.

The difference between the pixel circuit shown in FIG. 43A and the pixel circuit shown in FIG. 31 is that: a third reset circuit is further included;

The third reset circuit includes a tenth transistor T10;

the gate electrode of the tenth transistor T10 is electrically connected to the second reset control terminal RST2, the source electrode of the tenth transistor T10 is electrically connected to the third initial voltage terminal I3, and the drain electrode of the tenth transistor T10 is electrically connected to the anode of the light emitting diode E0; the third initial voltage terminal I3 is configured to provide a third initial voltage Vi3.

The pixel circuit shown in FIG. 43A of the present disclosure adds a tenth transistor T10 for resetting the potential of the anode of the light emitting diode E0, thereby improving the display contrast.

In the pixel circuit shown in FIG. 43A of the present disclosure, Vi3−Vss is smaller than Vled, ensuring that when Vi3 is written to the anode of E0, E0 does not emit light; wherein Vss is the voltage value of the low voltage signal provided by VSS, and Vled is the light emitting voltage of E0.

Figure 43B:
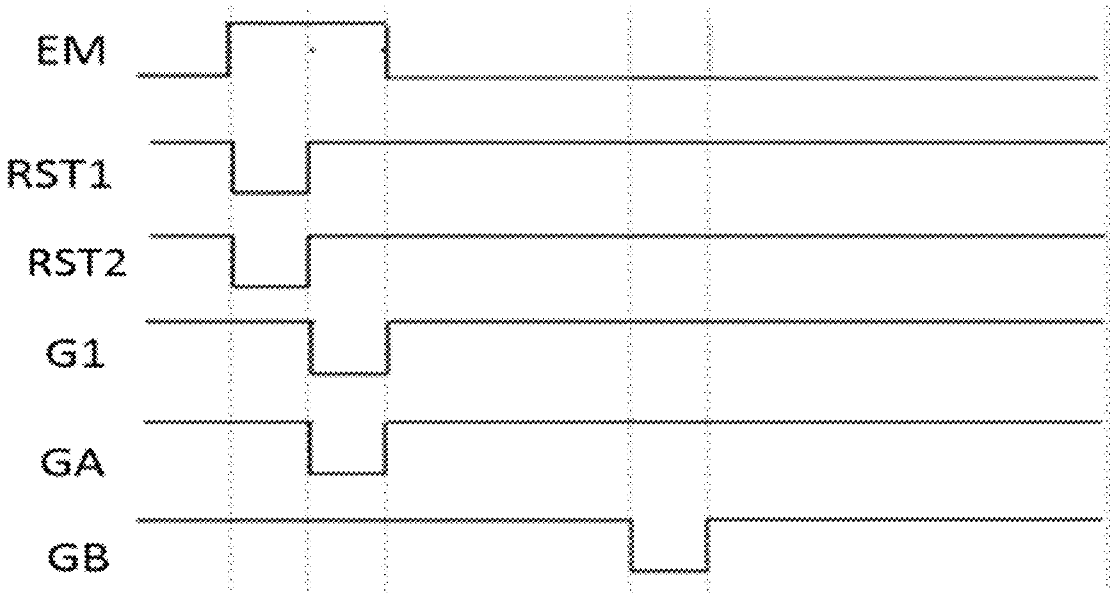
FIG. 43B is a first timing diagram of the pixel circuit shown in FIG. 43A of the present disclosure.

FIG. 43B is a first timing diagram of the pixel circuit shown in FIG. 43A of the present disclosure.

Figure 43C:
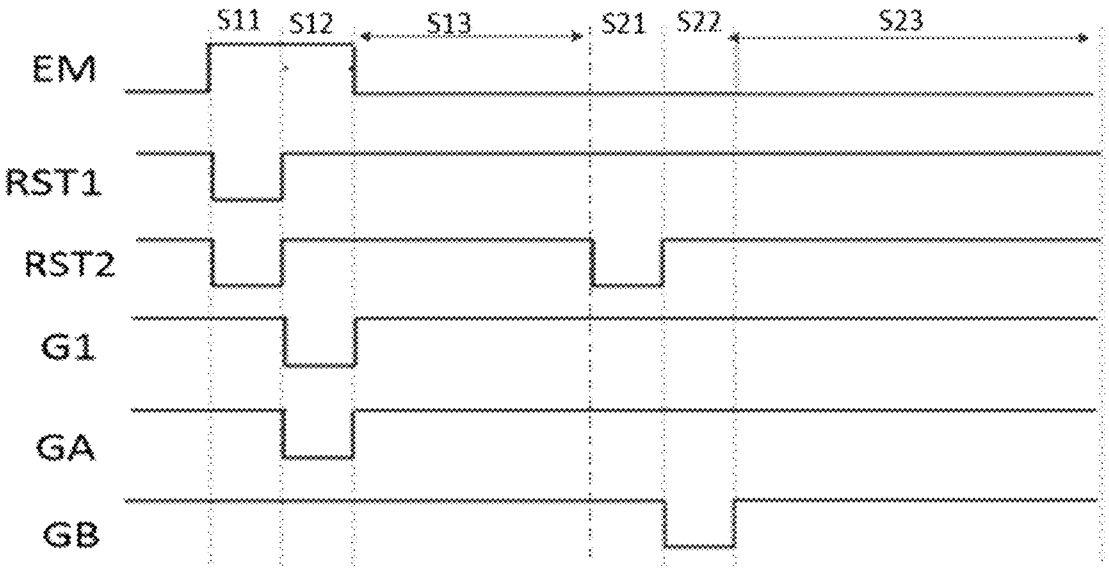
FIG. 43C is a second timing diagram of the pixel circuit shown in FIG. 43A of the present disclosure.

FIG. 43C is a second timing diagram of the pixel circuit shown in FIG. 43A of the present disclosure.

In FIG. 43C, the first display phase is labeled S1, and the second display phase is labeled S2;

The time period labeled S11 is the first reset time period, the time period labeled S12 is the first writing-in time period, and the time period labeled S13 is the first light emitting time period;

The time period labeled S21 is the second reset time period, the time period labeled S22 is the second writing-in time period, and the time period labeled S23 is the second light emitting time period.

As shown in FIG. 43C, when the pixel circuit shown in FIG. 43A of the present disclosure is in operation, in the first reset time period S11 and the second reset time period S21, RST2 provides a low voltage signal and T11 is turned on to write the second initial voltage Vi2 provided by I2 into the anode of E0, so as to be able to clear the residual charge at the anode of E0 at high frequency and improve display flicker.

Based on the pixel circuit shown in FIG. 37 and the pixel circuit shown in FIG. 39, a third reset circuit can be added, and the third reset circuit can include a tenth transistor; a gate electrode of the tenth transistor is electrically connected to the second reset control terminal, a source electrode of the tenth transistor is electrically connected to the third initial voltage terminal, and a drain electrode of the tenth transistor is electrically connected to the cathode of the light emitting diode.

Figure 44:
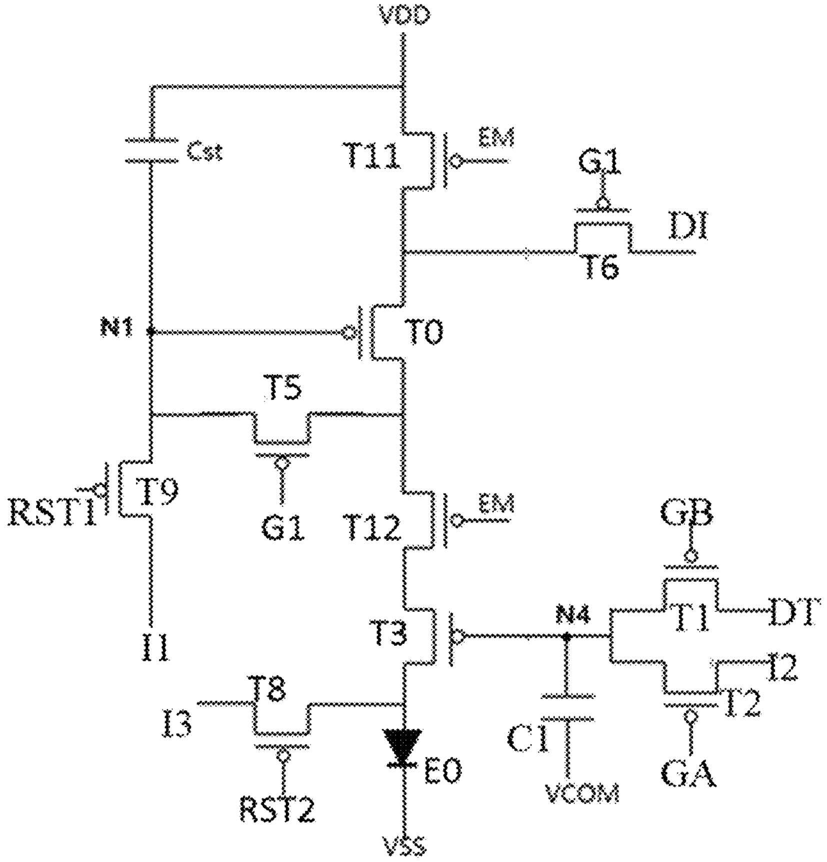
FIG. 44 is a circuit diagram of a pixel circuit according to at least one embodiment of the present disclosure.

As shown in FIG. 44, based on the pixel circuit shown in FIG. 23, the light emitting element is a light emitting diode E0;

The driving circuit includes a driving transistor T0; the energy storage circuit includes a storage capacitor Cst, the first light emitting control circuit includes an eleventh transistor T11, the second light emitting control circuit includes a twelfth transistor T12, the switch control circuit includes a third transistor T3, the compensation control circuit includes a fifth transistor T5, and the display data writing-in circuit includes a sixth transistor T6;

The first terminal of the storage capacitor Cst is electrically connected to the gate electrode of the driving transistor T0, and the second terminal of the storage capacitor Cst is electrically connected to the high voltage terminal VDD; the gate electrode of the driving transistor T0 is electrically connected to the first node N1;

The gate electrode of the eleventh transistor T11 is electrically connected to the light emitting control terminal EM, the source electrode of the eleventh transistor T11 is electrically connected to the high voltage terminal VDD, and the drain electrode of the eleventh transistor T11 is electrically connected to the source electrode of the driving transistor T0;

The gate electrode of the twelfth transistor T12 is electrically connected to the light emitting control terminal EM, the source electrode of the twelfth transistor T12 is electrically connected to the drain electrode of the driving transistor T0, and the drain electrode of the twelfth transistor T12 is electrically connected to the source electrode of the third transistor T3;

The gate electrode of the third transistor T3 is electrically connected to the switch control terminal N4, and the drain electrode of the third transistor T4 is electrically connected to the anode of the light emitting diode E0;

The gate electrode of the fifth transistor T5 is electrically connected to the scanning terminal G1, the source electrode of the fifth transistor T5 is electrically connected to the gate electrode of the driving transistor T0, and the drain electrode of the fifth transistor T5 is electrically connected to the drain electrode of the driving transistor T0;

The gate electrode of the sixth transistor T6 is electrically connected to the scanning terminal G1, the source electrode of the sixth transistor T6 is electrically connected to the second data line DI, and the drain electrode of the sixth transistor T6 is electrically connected to the source electrode of the driving transistor T0;

The first reset circuit comprises an eighth transistor T8;

The gate electrode of the eighth transistor T8 is electrically connected to the second reset control terminal RST2, the source electrode of the eighth transistor T8 is electrically connected to the third initial voltage terminal I3, and the drain electrode of the eighth transistor T8 is electrically connected to the anode of the light emitting diode E0; the third initial voltage terminal I3 is configured to provide a third initial voltage V3;

The second reset circuit includes a ninth transistor T9;

The gate electrode of the ninth transistor T9 is electrically connected to the first reset control terminal RST1, the source electrode of the ninth transistor T9 is electrically connected to the first initial voltage terminal I1, and the drain electrode of the ninth transistor T9 is electrically connected to the first node N1; the first initial voltage terminal I1 is configured to provide a first initial voltage Vi1;

The driving control circuit includes a first transistor T1, a second transistor T2 and a first capacitor C1;

The gate electrode of the first transistor T1 is electrically connected to the first control terminal GB, the source electrode of the first transistor T1 is electrically connected to the first data line DT, and the drain electrode of the first transistor T1 is electrically connected to the switch control terminal N4;

The gate electrode of the second transistor T2 is electrically connected to the second control terminal GA, the source electrode of the second transistor T2 is electrically connected to the second initial voltage terminal I2, and the drain electrode of the second transistor T2 is electrically connected to the switch control terminal N4; the second initial voltage terminal I2 is configured to provide a second initial voltage Vi2;

A first terminal of the first capacitor C1 is electrically connected to the switch control terminal N4, and a second terminal of the first capacitor C1 is electrically connected to the common electrode voltage terminal VCOM.

In the pixel circuit shown in FIG. 44, all transistors are p-type transistors, but the present invention is not limited thereto.

In the pixel circuit shown in FIG. 44, the contrast is increased and the display performance is enhanced by resetting the eighth transistor configured to reset the potential of the anode of the light emitting diode E0.

When the pixel circuit shown in FIG. 44 is working, the second control signal provided by GA can be the same as the scanning signal provided by G1, or the second control signal provided by GA can be the same as the second reset control signal provided by RST2, that is, the second initial voltage Vi2 can be written into N4 in the first reset time period S11 or the first writing-in time period S12, and GA can share the GOA (Gate On Array, a gate driving circuit arranged on the array substrate) circuit with G1 or RST; the number of control signals can be reduced, and the proportion of control signal writing-in time can be reduced.

Figure 45A:
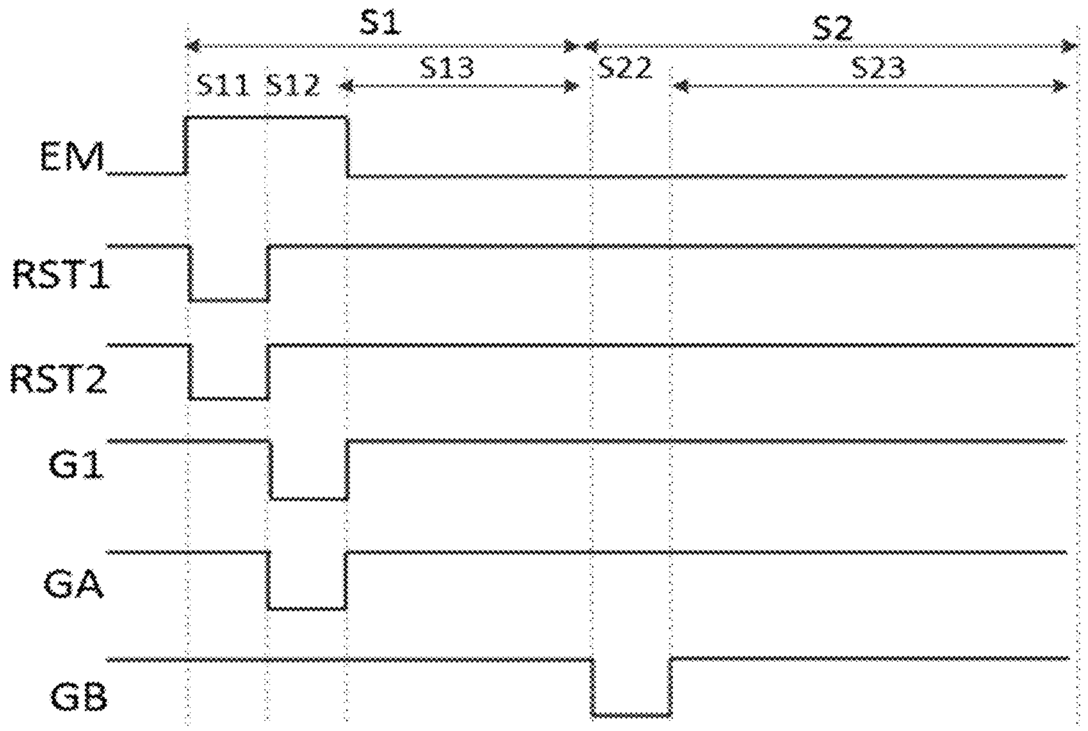
FIG. 45A is a first timing diagram of the pixel circuit shown in FIG. 44.

As shown in FIG. 45A, the pixel circuit shown in FIG. 44 is at work, the display cycle (the display cycle may be a frame of time) may include a first display phase S1 and a second display phase S2 which are successively set;

The first display phase S1 may include a first reset time period S11, a first writing-in time period S12 and a first light emitting time period S13 which are set successively; the second display phase S2 may include a second writing-in time period S22 and a second light emitting time period S23 which are set successively;

In the first reset time period S11, RST1 provides a low voltage signal, RST2 provides a low voltage signal, T9 and T8 are turned on, and the anode of the first node N1 and E0 are reset;

In the first writing-in time period S12, G1 provides a low voltage signal, T6 is turned on, DI writes the display data voltage to the first node N1, and T5 is turned on;

At the beginning of the first writing-in time period S12, T0 is turned on, and Cst is charged by display data voltage until T0 is turned off, and until the gate voltage of T0 becomes Vdd+Vth, threshold voltage compensation is performed; wherein Vdd is the voltage value of the high voltage signal provided by VDD, and Vth is the threshold voltage of T0;

In the first writing-in time period S12, GA provides a low voltage signal, T2 is turned on, the second initial voltage Vi2 provided by I2 is written into N4, and T3 is turned on;

In the first light emitting time period S13, EM provides a low voltage signal, T11 and T12 are turned on, and T0 drives E0 to emit light;

In the second writing-in time period S22, the first time t1 is delayed, GB provides a low voltage signal, T1 is turned on, and DT provides a light emitting time control data voltage Vdata_T to N4; t1 is the duration of the first light emitting time period S13;

When Vdata_T is a high voltage signal, in the second light emitting time period S23, T3 is turned off, E0 does not emit light, and a short-time light emitting is achieved, and the light emitting duration is t1;

When Vdata_T is a low voltage signal, the optimal voltage value of Vdata_T is the same as the voltage value of V2. In the second light emitting time period S23, T3 is turned on, T0 drives E0 to emit light, and E0 continues to emit light to achieve long-term light emitting. The light emitting time is t1+t2, t2 is the second time, and t2 is the duration of the second light emitting time period S23.

Figure 45B:
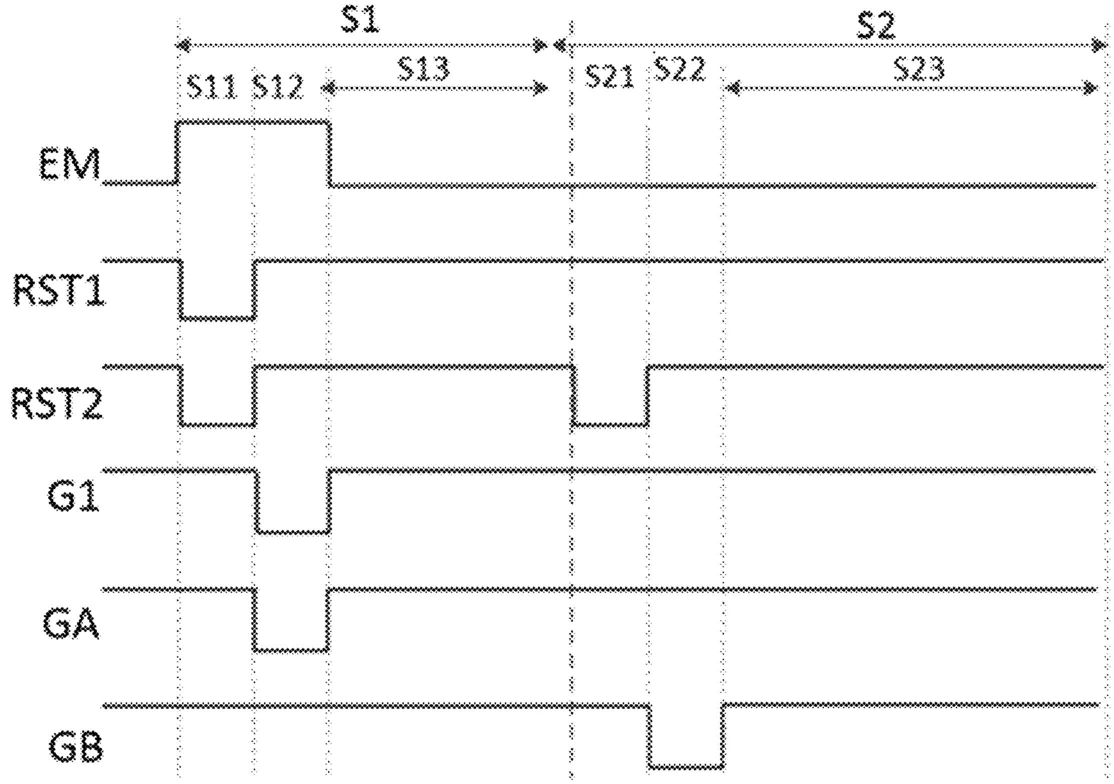
FIG. 45B is a timing diagram of the pixel circuit shown in FIG. 44.

FIG. 45B is a second timing diagram of the pixel circuit shown in FIG. 44.

In FIG. 45B, the time period labeled S21 is the second reset time period;

In the first reset time period S11 and the second reset time period S21, RST2 provides a low voltage signal and T8 is turned on to write the third initial voltage Vi3 provided by I3 into the anode of E0, so as to clear the residual charge of the anode of E0 at high frequency and improve display flicker.

Figure 46:
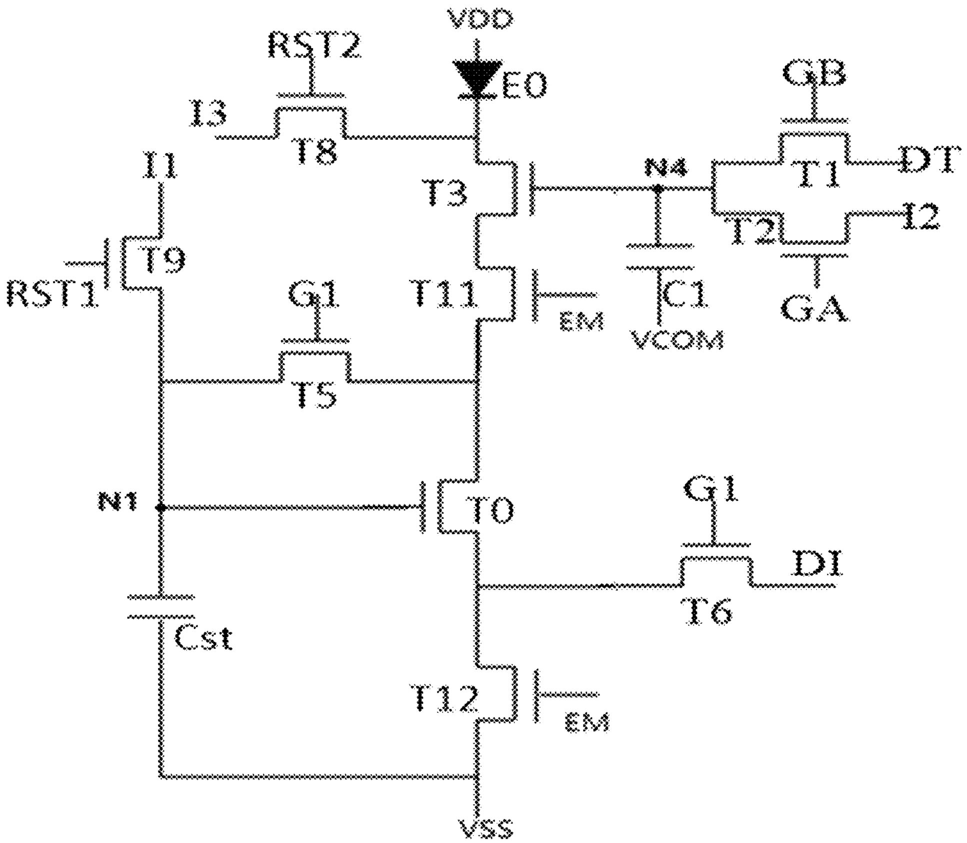
FIG. 46 is a circuit diagram of a pixel circuit according to at least one embodiment of the present disclosure.

As shown in FIG. 46, based on the pixel circuit shown in FIG. 24, the light emitting element is a light emitting diode E0;

The driving circuit includes a driving transistor T0; the energy storage circuit includes a storage capacitor Cst, the first light emitting control circuit includes an eleventh transistor T11, the second light emitting control circuit includes a twelfth transistor T12, the switch control circuit includes a third transistor T3, the compensation control circuit includes a fifth transistor T5, and the display data writing-in circuit includes a sixth transistor T6;

The anode of the light emitting diode E0 is electrically connected to the high voltage terminal VDD;

The first terminal of the storage capacitor Cst is electrically connected to the gate electrode of the driving transistor T0, and the second terminal of the storage capacitor Cst is electrically connected to the low voltage terminal VSS; the gate electrode of the driving transistor T0 is electrically connected to the first node N1;

The gate electrode of the third transistor T3 is electrically connected to the switch control terminal N4, the drain electrode of the third transistor T3 is electrically connected to the cathode of the light emitting diode E1, and the source electrode of the third transistor T3 is electrically connected to the drain electrode of the eleventh transistor T11;

The gate electrode of the eleventh transistor T11 is electrically connected to the light emitting control terminal EM, and the source electrode of the eleventh transistor T11 is electrically connected to the drain electrode of the driving transistor T0;

The gate electrode of the twelfth transistor T12 is electrically connected to the light emitting control terminal EM, the drain electrode of the twelfth transistor T12 is electrically connected to the source electrode of the driving transistor T0, and the source electrode of the twelfth transistor T12 is electrically connected to the low voltage terminal VSS;

The gate electrode of the fifth transistor T5 is electrically connected to the scanning terminal G1, the drain electrode of the fifth transistor T5 is electrically connected to the gate electrode of the driving transistor T0, and the drain electrode of the fifth transistor T5 is electrically connected to the drain electrode of the driving transistor T0;

The gate electrode of the sixth transistor T6 is electrically connected to the scanning terminal G1, the drain electrode of the sixth transistor T6 is electrically connected to the second data line DI, and the source electrode of the sixth transistor T6 is electrically connected to the source electrode of the driving transistor T0;

The first reset circuit comprises an eighth transistor T8;

The gate electrode of the eighth transistor T8 is electrically connected to the second reset control terminal RST2, the source electrode of the eighth transistor T8 is electrically connected to the third initial voltage terminal I3, and the drain electrode of the eighth transistor T8 is electrically connected to the cathode of the light emitting diode E0;

The second reset circuit includes a ninth transistor T9;

The gate electrode of the ninth transistor T9 is electrically connected to the first reset control terminal RST1, the source electrode of the ninth transistor T9 is electrically connected to the first initial voltage terminal I1, and the drain electrode of the ninth transistor T9 is electrically connected to the first node N1; the first initial voltage terminal I1 is configured to provide a first initial voltage Vi1;

The driving control circuit includes a first transistor T1, a second transistor T2 and a first capacitor C1;

The gate electrode of the first transistor T1 is electrically connected to the first control terminal GB, the source electrode of the first transistor T1 is electrically connected to the first data line DT, and the drain electrode of the first transistor T1 is electrically connected to the switch control terminal N4;

The gate electrode of the second transistor T2 is electrically connected to the second control terminal GA, the source electrode of the second transistor T2 is electrically connected to the second initial voltage terminal I2, and the drain electrode of the second transistor T2 is electrically connected to the switch control terminal N4; the second initial voltage terminal I2 is configured to provide a second initial voltage Vi2;

A first terminal of the first capacitor C1 is electrically connected to the switch control terminal N4, and a second terminal of the first capacitor C1 is electrically connected to the common electrode voltage terminal VCOM.

In the pixel circuit shown in FIG. 46, all transistors are NMOS transistors, but the present invention is not limited thereto.

Figure 47A:
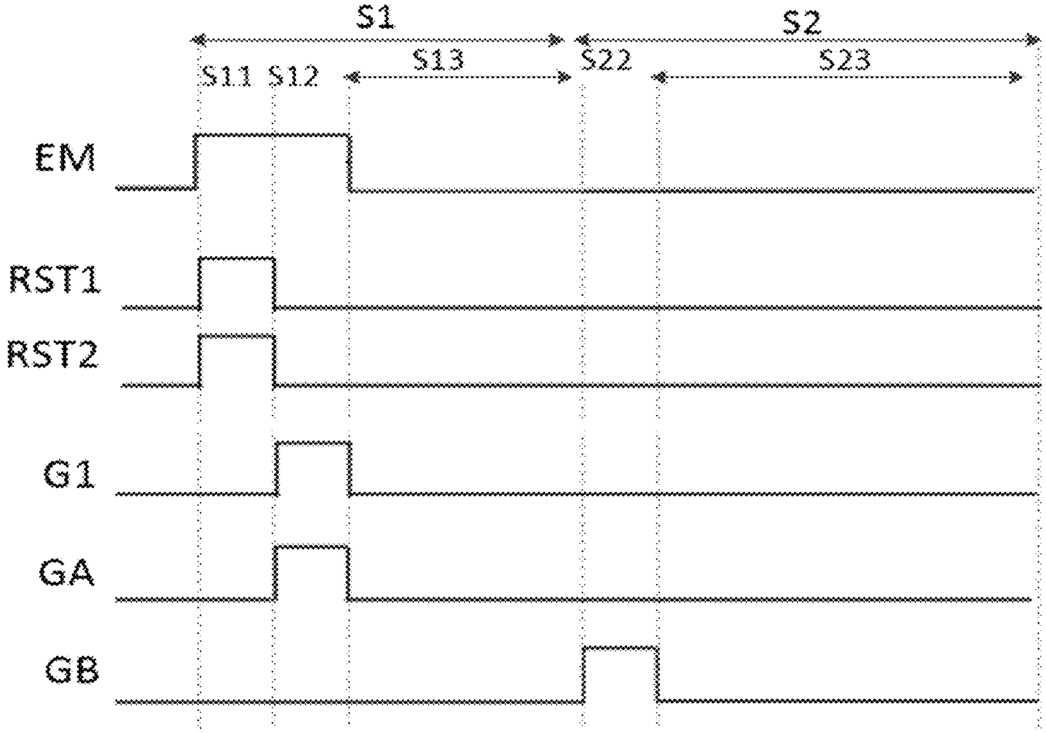
FIG. 47A is a first timing diagram of the pixel circuit shown in FIG. 46 of the present disclosure.

FIG. 47A is a first timing diagram of the pixel circuit shown in FIG. 46.

In FIG. 47A, the first display phase is labeled S1 and the second display phase is labeled S2;

The time period labeled S11 is the first reset time period, the time period labeled S12 is the first writing-in time period, and the time period labeled S13 is the first light emitting time period;

The time period labeled S22 is the second writing-in time period, and the time period labeled S23 is the second light emitting time period.

Figure 48A:
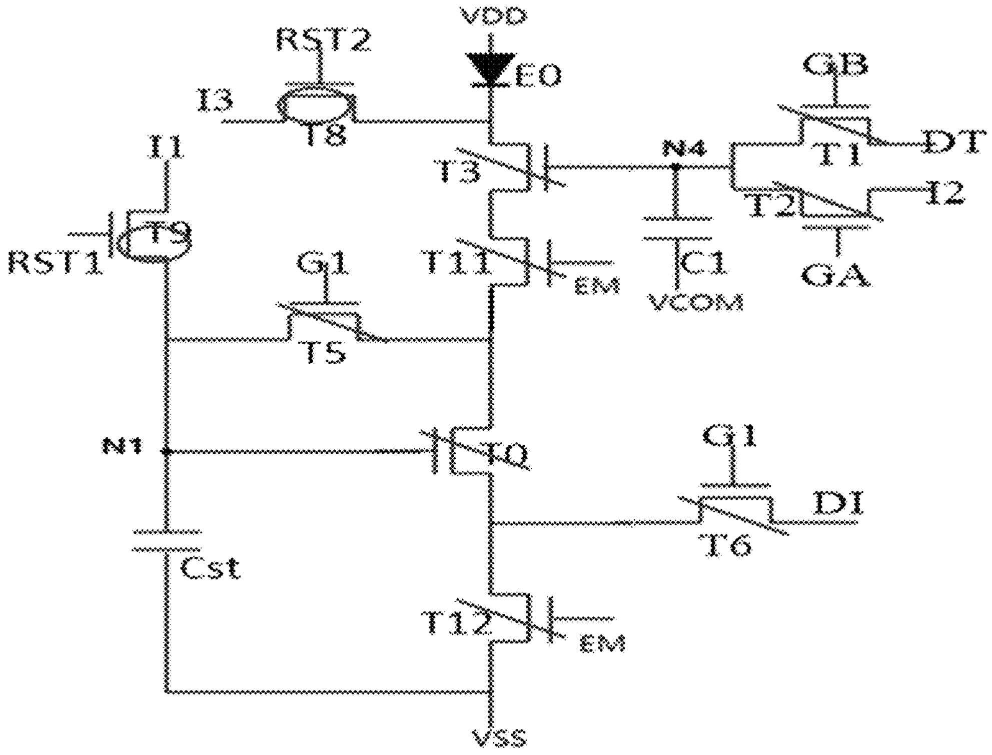
FIG. 48A is a schematic diagram showing the working state of the pixel circuit shown in FIG. 46 in a first reset time period S11.
Figure 48B:
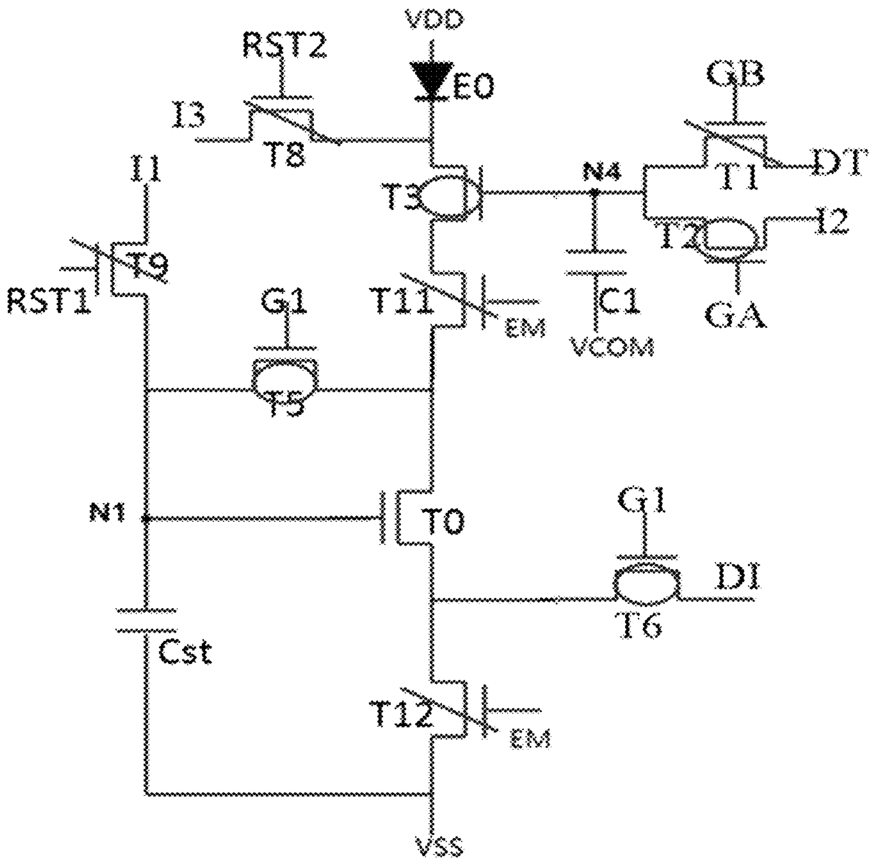
FIG. 48B is a schematic diagram showing the working state of the pixel circuit shown in FIG. 46 in the first writing-in time period S12.
Figure 48C:
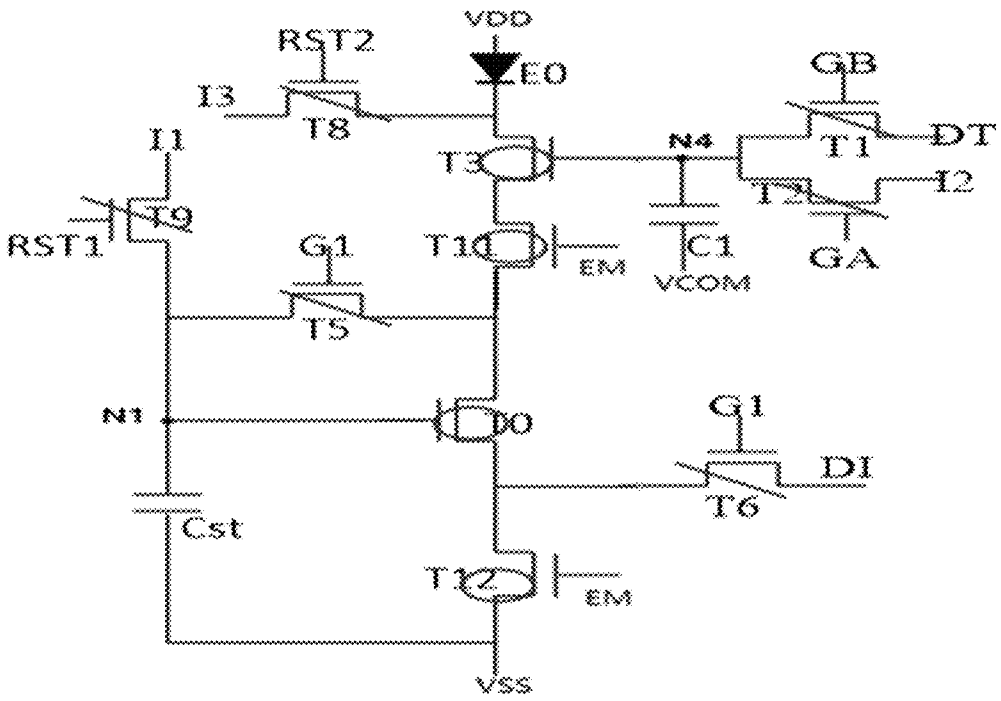
FIG. 48C is a schematic diagram showing the working state of the pixel circuit shown in FIG. 46 in the first light emitting time period S13.
Figure 48D:
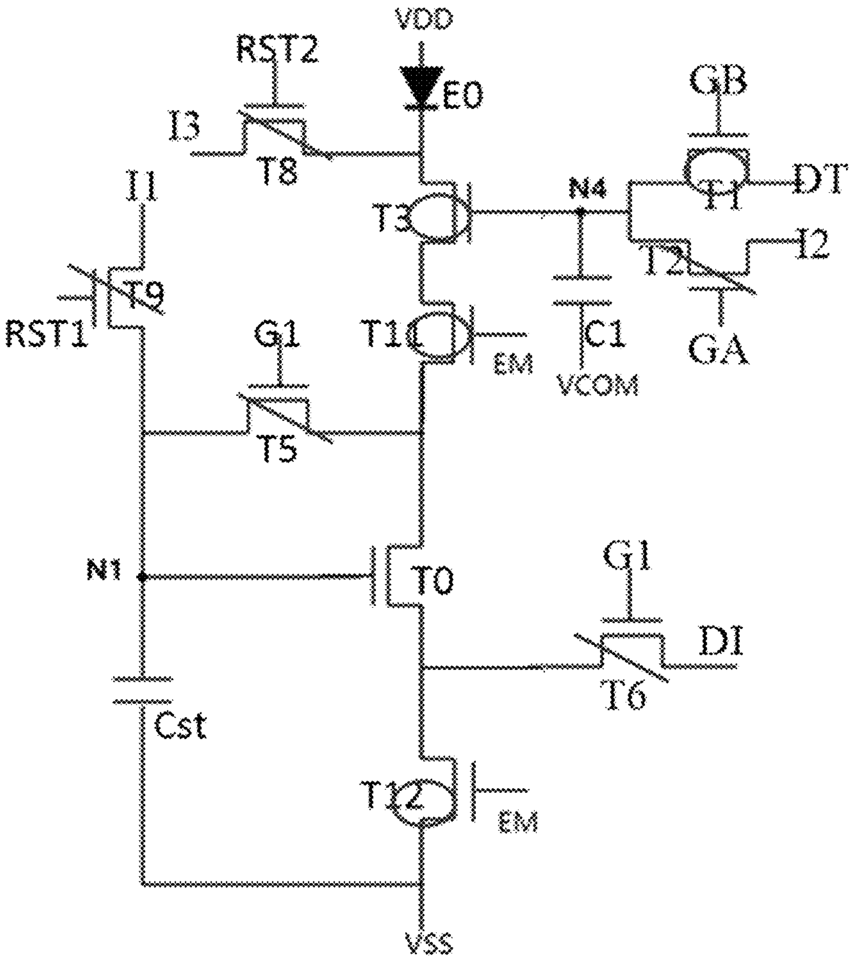
FIG. 48D is a schematic diagram showing the working state of the pixel circuit shown in FIG. 46 in the second writing-in time period S22.
Figure 48E:
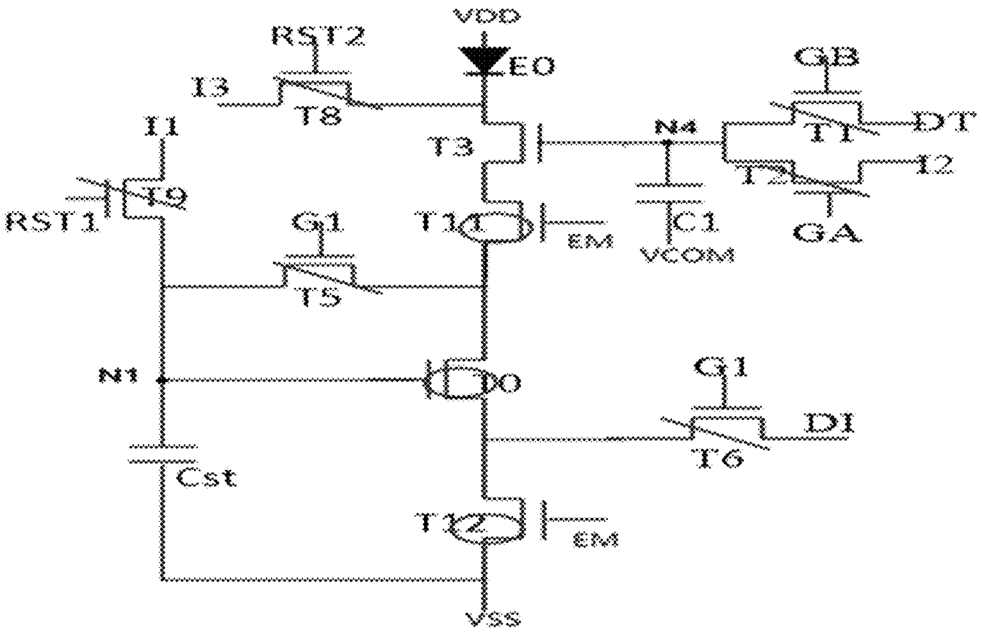
FIG. 48E is a schematic diagram of the working state of the pixel circuit shown in FIG. 46 in the second light emitting time period S23.

FIG. 48A is a schematic diagram of the working state of the pixel circuit shown in FIG. 46 in the first reset time period S11; FIG. 48B is a schematic diagram of the working state of the pixel circuit shown in FIG. 46 in the first writing-in time period S12; FIG. 48C is a schematic diagram of the working state of the pixel circuit shown in FIG. 46 in the first light emitting time period S13; FIG. 48D is a schematic diagram of the working state of the pixel circuit shown in FIG. 46 in the second writing-in time period S22; FIG. 48E is a schematic diagram of the working state of the pixel circuit shown in FIG. 46 in the second light emitting time period S23.

Figure 47B:
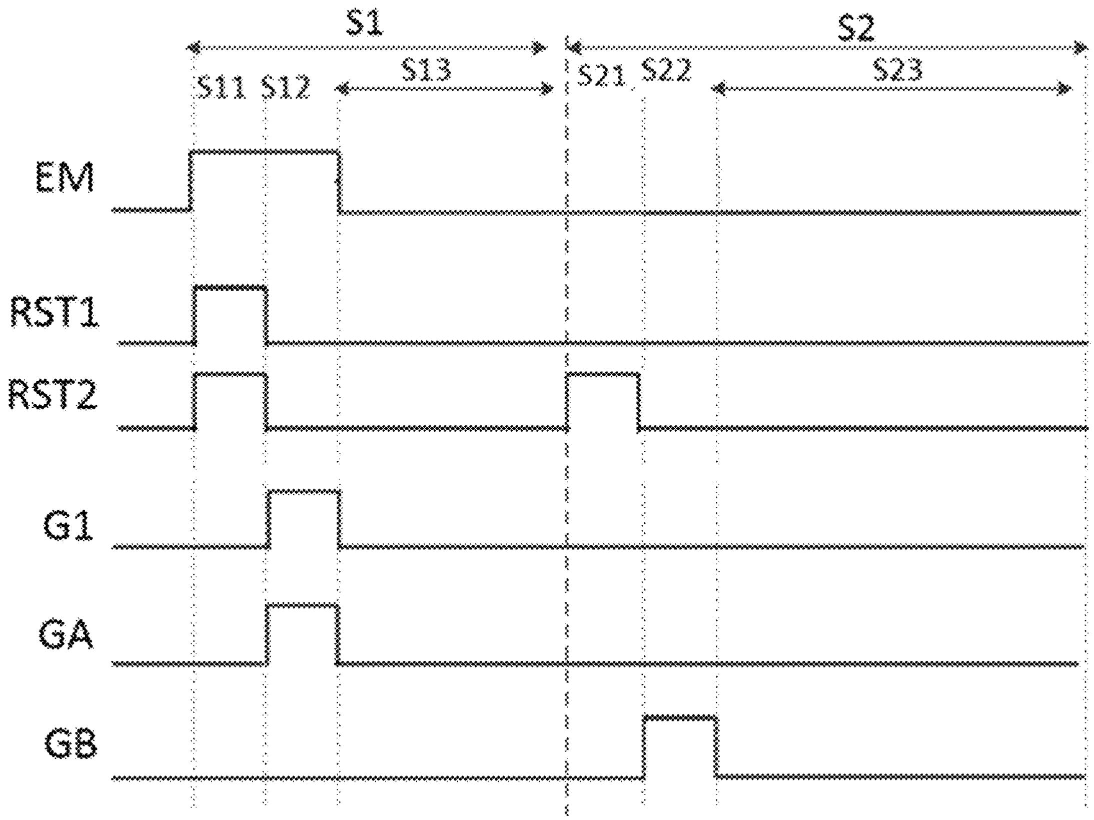
FIG. 47B is a second timing diagram of the pixel circuit shown in FIG. 46 of the present disclosure.

FIG. 47B is a first timing diagram of the pixel circuit shown in FIG. 46.

In FIG. 47B, the time period labeled S21 is the second reset time period;

In the first reset time period S11 and the second reset time period S21, RST2 provides a low voltage signal and T8 is turned on to write the third initial voltage Vi3 provided by I3 into the cathode of E0, so as to clear the residual charge of the cathode of E0 at high frequency and improve the display flicker.

In at least one embodiment of the present disclosure, when the potential of the cathode of E0 is initialized, E0 does not emit light.

Figure 49:
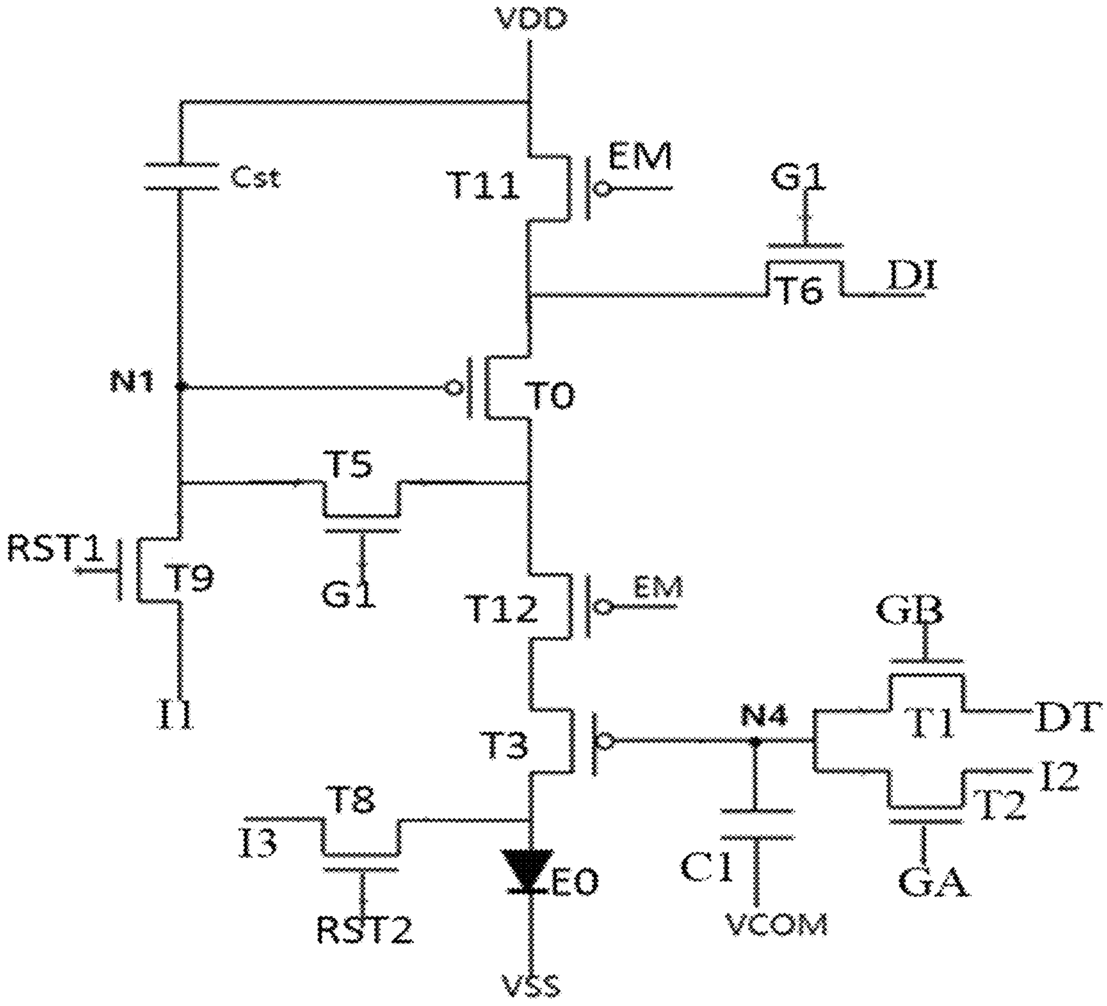
FIG. 49 is a circuit diagram of a pixel circuit according to at least one embodiment of the present disclosure.

The difference between the pixel circuit shown in FIG. 49 and the pixel circuit shown in FIG. 44 is that T9, T8, T5, T6, T1 and T2 are NMOS TFTs, T9, T8, T5, T6, T1 and T2 are oxide TFTs, and T0, T11, T12 and T3 are PMOS TFTs.

The pixel circuit shown in FIG. 49 adopts LTPO technology, takes advantage of the low leakage current of oxide TFT, reduces the leakage of the anode of the first node N1 and E0, and sets T9, T8, T5, T6, T1 and T2 as NMOS TFT; takes advantage of the high mobility of PMOS TFT, sets T0, T11, T12 and T3 as PMOS TFT, meets the threshold voltage compensation, current driving requirements and reduces the charging time, and further improves the display performance.

Figure 50A:
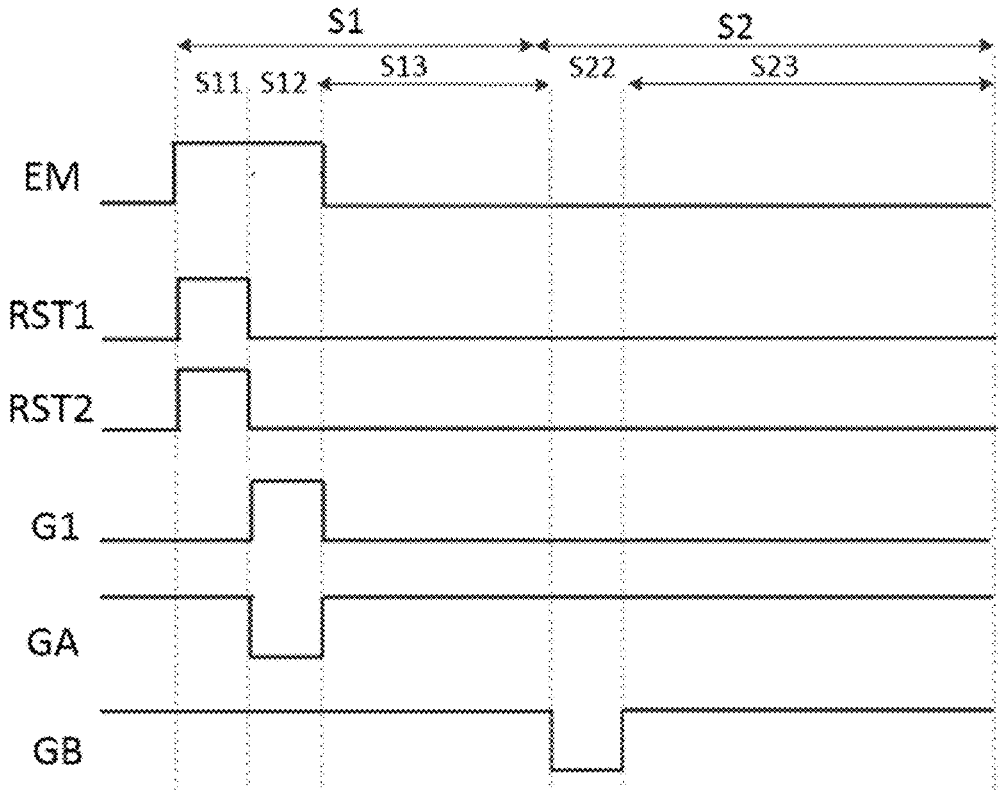
FIG. 50A is a first timing diagram of the pixel circuit shown in FIG. 49.

FIG. 50A is a first timing diagram of the pixel circuit shown in FIG. 49. In FIG. 50, the first display phase is labeled S1, and the second display phase is labeled S2;

The time period labeled S11 is the first reset time period, the time period labeled S12 is the first writing-in time period, and the time period labeled S13 is the first light emitting time period;

The time period labeled S22 is the second writing-in time period, and the time period labeled S23 is the second light emitting time period.

Figure 50B:
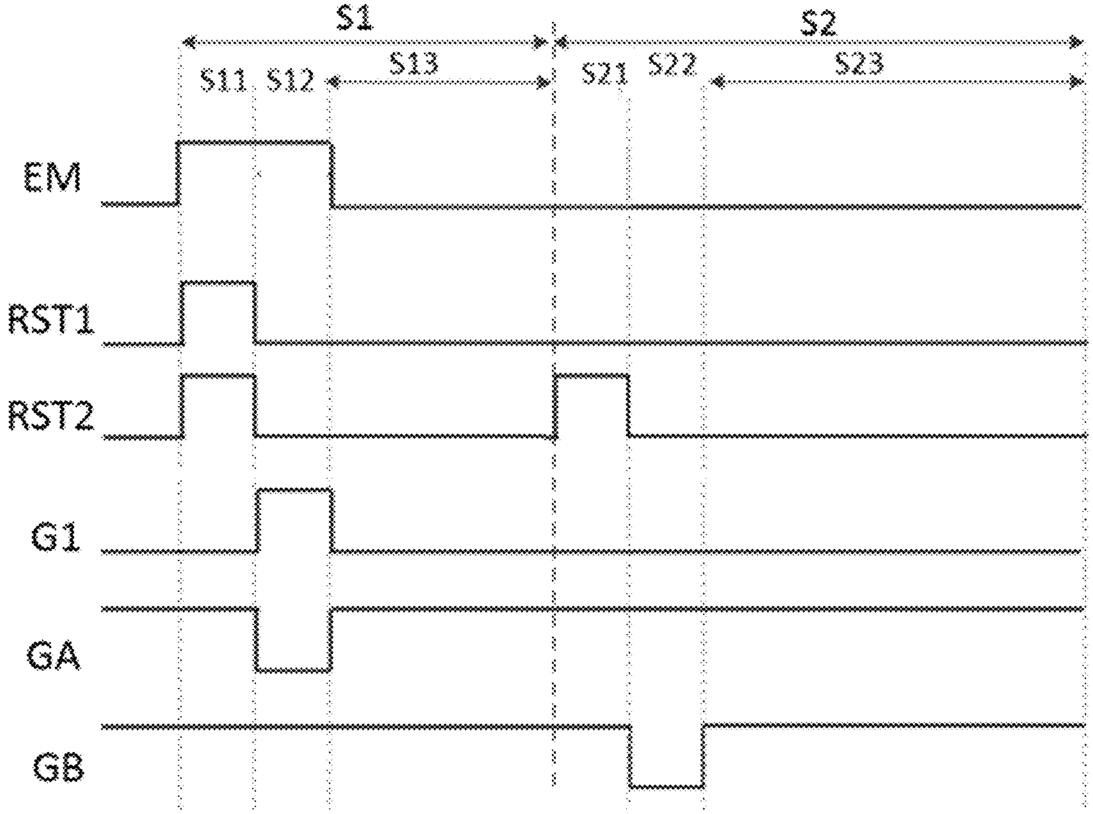
FIG. 50B is a second timing diagram of the pixel circuit shown in FIG. 49.

FIG. 50B is a second timing diagram of the pixel circuit shown in FIG. 49; in FIG. 50B, the time period labeled S21 is a second reset time period;

In the first reset time period S11 and the second reset time period S21, RST2 provides a low voltage signal and T8 is turned on to write the third initial voltage Vi3 provided by I3 into the anode of E0, so as to clear the residual charge of the anode of E0 at high frequency and improve display flicker.

Figure 51:
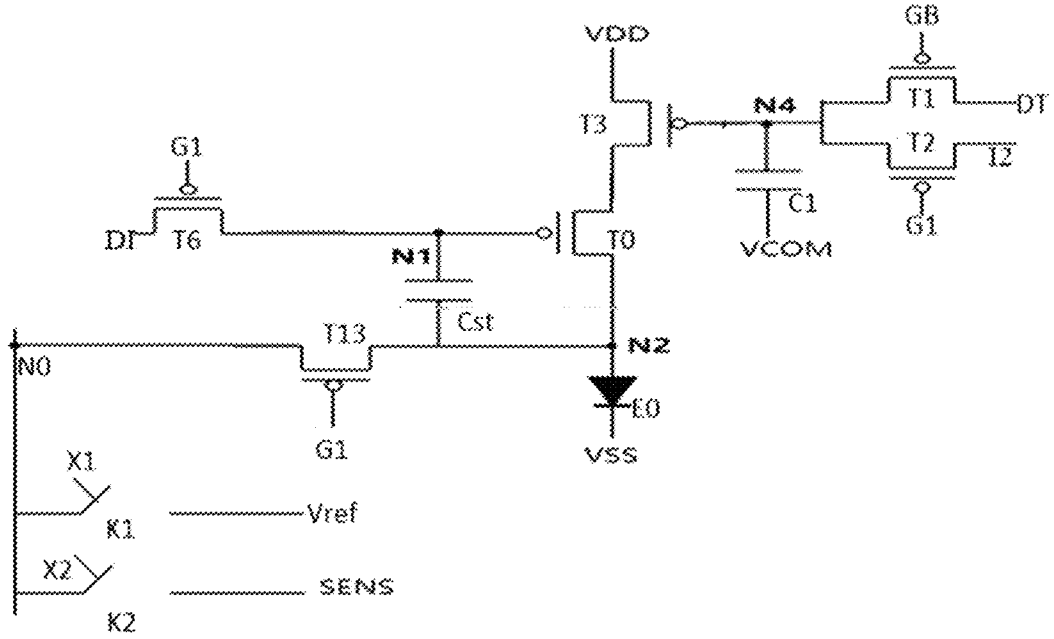
FIG. 51 is a circuit diagram of a pixel circuit according to at least one embodiment of the present disclosure.

As shown in FIG. 51, based on the pixel circuit shown in FIG. 24, the light emitting element is a light emitting diode E0;

The energy storage circuit includes a storage capacitor Cst, the compensation circuit includes a thirteenth transistor T13, the switch circuit includes a first switch K1; the driving circuit includes a driving transistor T0;

The first terminal of the storage capacitor Cst is electrically connected to the gate electrode of the driving transistor T0, and the second terminal of the storage capacitor Cst is electrically connected to the drain electrode of the driving transistor T0; the gate electrode of the driving transistor T0 is electrically connected to the first node N1; the drain electrode of the driving transistor T0 is electrically connected to the anode of E0; the anode of E0 is electrically connected to the second node N2;

The gate electrode of the thirteenth transistor T13 is electrically connected to the scanning terminal G1, the source electrode of the thirteenth transistor T13 is electrically connected to the anode of E0, and the drain electrode of the thirteenth transistor T13 is electrically connected to the control node N0;

The control terminal of the first switch K1 is electrically connected to the first selection control terminal X1, the first terminal of the first switch K1 is electrically connected to the control node N0, and the second terminal of the first switch K1 is electrically connected to a reference voltage terminal; the reference voltage terminal provides a reference voltage Vref;

The switch circuit also includes a second switch K2;

The control terminal of the second switch K2 is electrically connected to the second selection control terminal X2, the first terminal of the second switch K2 is electrically connected to the control node N0, and the second terminal of the second switch K2 is electrically connected to the compensation terminal SENS;

The display data writing-in circuit includes a sixth transistor T6;

The gate electrode of the sixth transistor T6 is electrically connected to the scanning terminal G1, the source electrode of the sixth transistor T6 is electrically connected to the second data line DI, and the drain electrode of the sixth transistor T6 is electrically connected to the gate electrode of the driving transistor T0;

The switch control circuit includes a third transistor T3;

The gate electrode of T3 is electrically connected to the switch control terminal N4, the source electrode of T4 is electrically connected to the high voltage terminal VDD, the drain electrode of T4 is electrically connected to the source electrode of T0; the cathode of E0 is electrically connected to the low voltage terminal VSS;

The driving control circuit includes a first transistor T1, a second transistor T2 and a first capacitor C1;

The gate electrode of the first transistor T1 is electrically connected to the first control terminal GB, the source electrode of the first transistor T1 is electrically connected to the first data line DT, and the drain electrode of the first transistor T1 is electrically connected to the switch control terminal N4;

The gate electrode of the second transistor T2 is electrically connected to the scanning terminal G1, the source electrode of the second transistor T2 is electrically connected to the second initial voltage terminal I2, and the drain electrode of the second transistor T2 is electrically connected to the switch control terminal N4; the second initial voltage terminal I2 is configured to provide a second initial voltage Vi2;

A first terminal of the first capacitor C1 is electrically connected to the switch control terminal N4, and a second terminal of the first capacitor C1 is electrically connected to the common electrode voltage terminal VCOM.

In the pixel circuit shown in FIG. 51, the second control terminal is the scanning terminal G1, but the present invention is not limited thereto.

In the pixel circuit shown in FIG. 51, all transistors are p-type transistors, but the present invention is not limited thereto.

In the pixel circuit shown in FIG. 51, T6, K1, and K2 form an extraction circuit for extracting Vth and Id.

Figure 52:
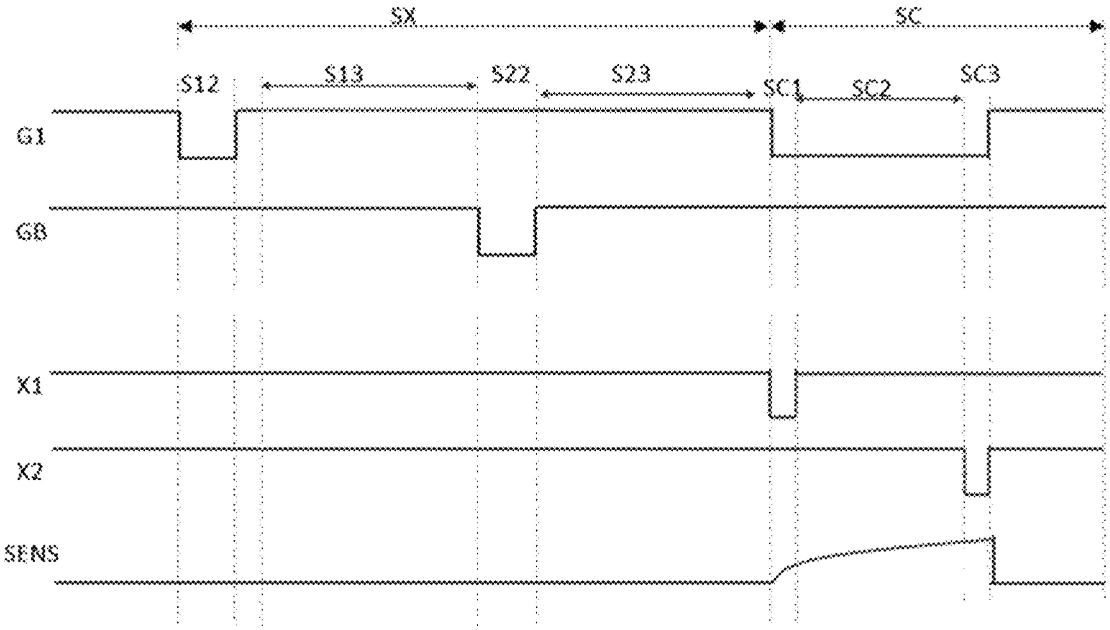
FIG. 52 is a timing diagram of the pixel circuit shown in FIG. 51.

As shown in FIG. 52, when the pixel circuit shown in FIG. 51 of the present disclosure is in operation, a display cycle may include a display phase SX and a sensing phase SC;

The display phase SX includes a first writing-in time period S12, a first light emitting time period S13, a second writing-in time period S21 and a second light emitting time period S22 which are arranged successively;

The sensing phase SC includes a reset time period SC1, a compensation time period SC2 and an extraction time period SC3 which are arranged successively;

In the first writing-in time period S12, G1 provides a low voltage signal, T6 and T2 are turned on, DI provides a display data voltage Vdata_I, Vdata_I is written into the first node N1, T0 is turned on, and the second initial voltage Vi2 provided by I2 is written into N4 through T2; T3 is turned on;

In the first light emitting time period S13, G1 provides a high voltage signal, T3 is turned on, and T0 drives E0 to emit light; the first light emitting time period S13 lasts for a first time t1;

In the second writing-in time period S21, GB provides a low voltage signal, T1 is turned on, and DT provides a light emitting control data voltage;

As shown in FIG. 52, in the second writing-in time period S21, the light emitting control data voltage provided by DT is a high voltage signal;

In the second light emitting time period S22, T3 is turned off, E0 does not emit light, and a short-time light emitting is realized, and the light emitting duration is t1;

When the light emitting control data voltage provided by DT is a low voltage signal in the second writing-in time period S21, T3 is turned on in the second light emitting time period S22, and T0 drives E0 to emit light, realizing long-time light emitting, and the light emitting time is t1+t2, where t2 is the duration of the second light emitting time period S22;

As shown in FIG. 52, in the reset time period SC1, G1 provides a low voltage signal, T13, T0, T6, T3, and T2 are turned on, K1 is turned on, and N2 is reset through Vref; DI provides a data voltage Vdata to the first node N1;

In the compensation time period SC2, K1 is turned off, Vref is less than Vdata, and Vdata is less than Vdd, Vdd is the voltage value of the high voltage signal provided by VDD, when the potential of N2 is Vdata−Vth, the gate-source voltage of T0 is equal to Vth, Vth is the threshold voltage of T0, T0 is turned off, and Vth is written into N2;

In the extraction time period SC3, K2 is turned on and the IC (integrated circuit) extracts Vth through SENS.

As shown in FIG. 52, in a time period other than the second writing-in time period, DT may provide the second initial voltage Vi2, but is not limited thereto.

Figure 53A:
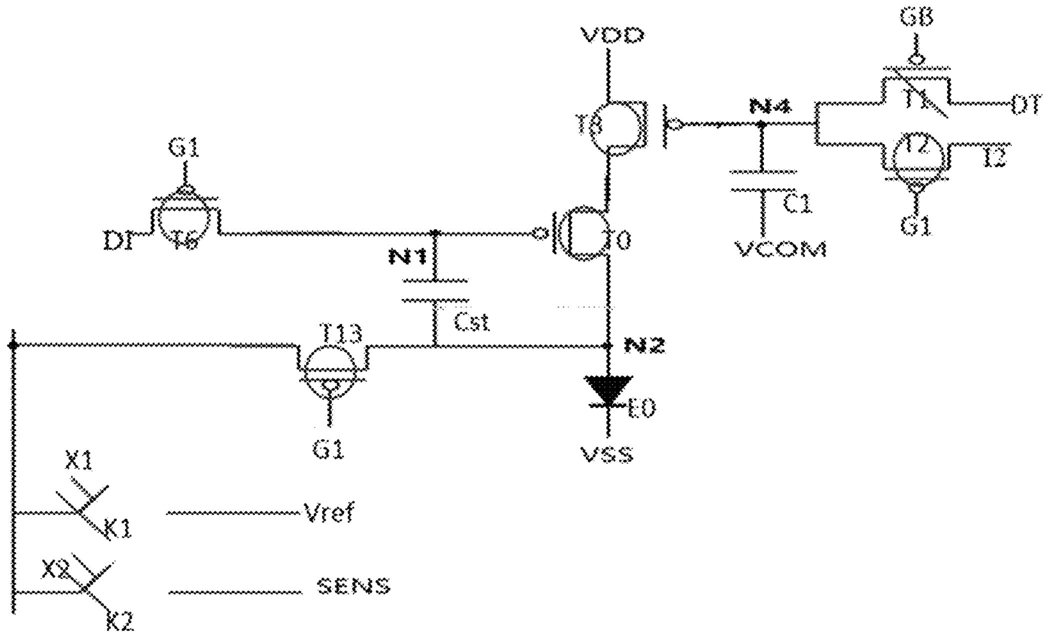
FIG. 53A is a schematic diagram showing the working state of the pixel circuit shown in FIG. 51 in the first writing-in time period S12 and the first light emitting time period S22.
Figure 53B:
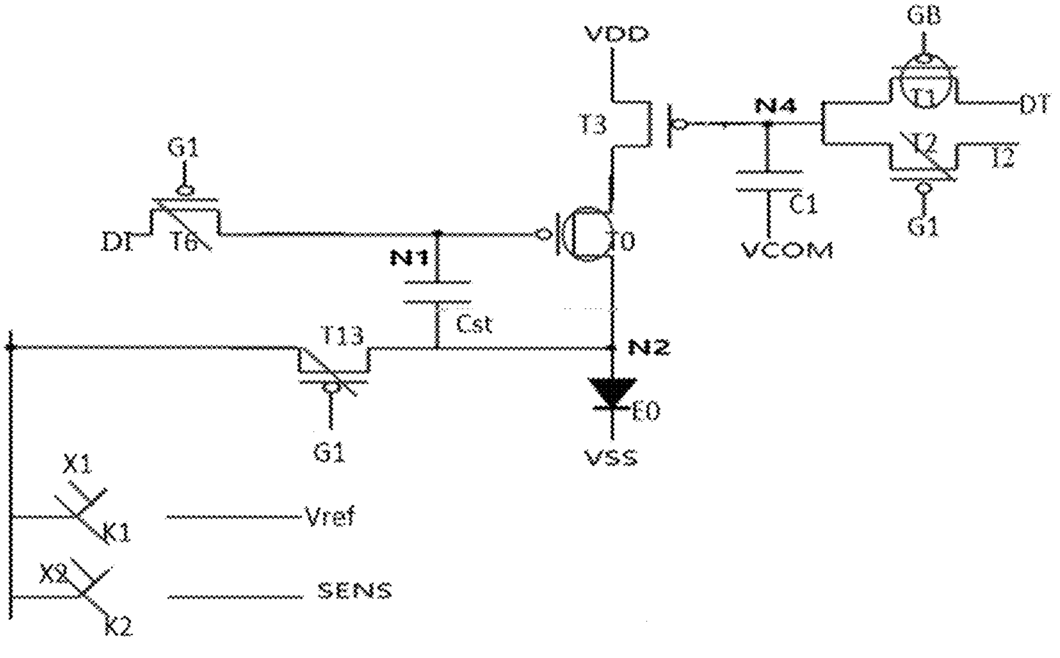
FIG. 53B is a schematic diagram showing the working state of the pixel circuit shown in FIG. 51 in a second writing-in time period S21 and a second light emitting time period S22.
Figure 53C:
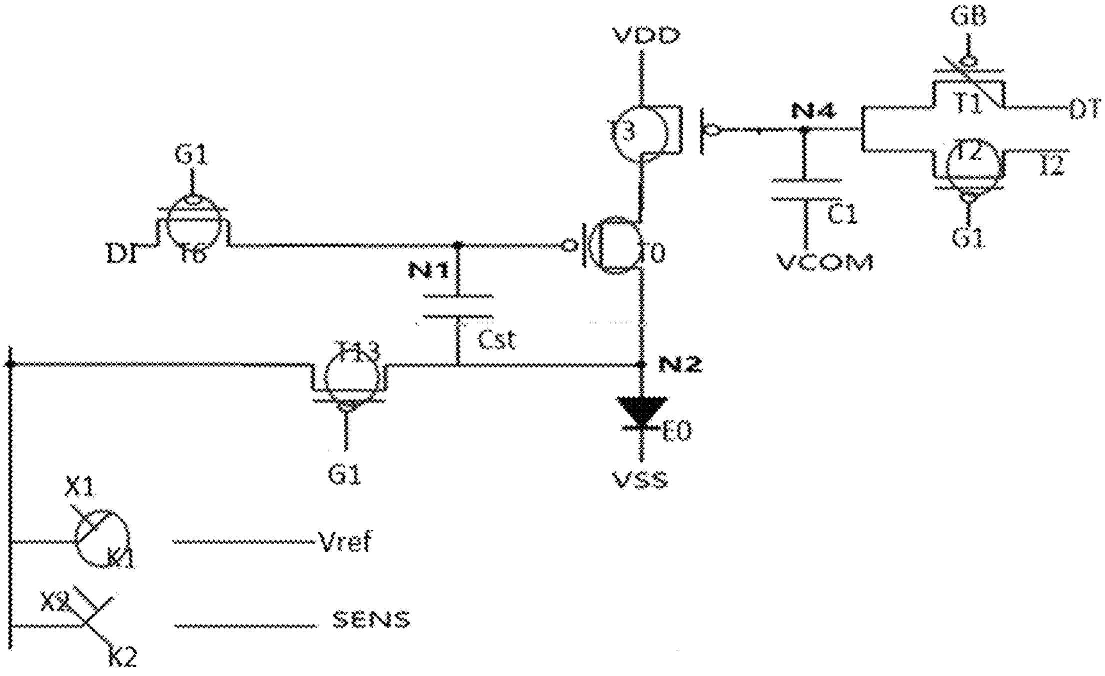
FIG. 53C is a schematic diagram of the working state of the pixel circuit shown in FIG. 51 during a reset time period SC1.
Figure 53D:
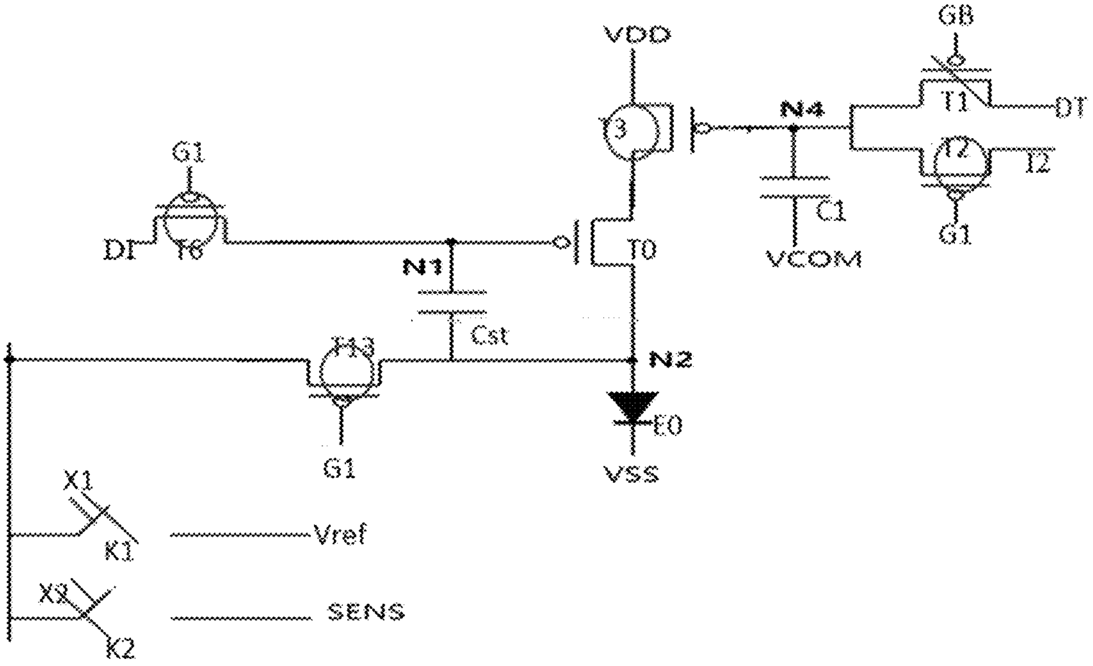
FIG. 53D is a schematic diagram showing the working state of the pixel circuit shown in FIG. 51 during the compensation time period SC2.
Figure 53E:
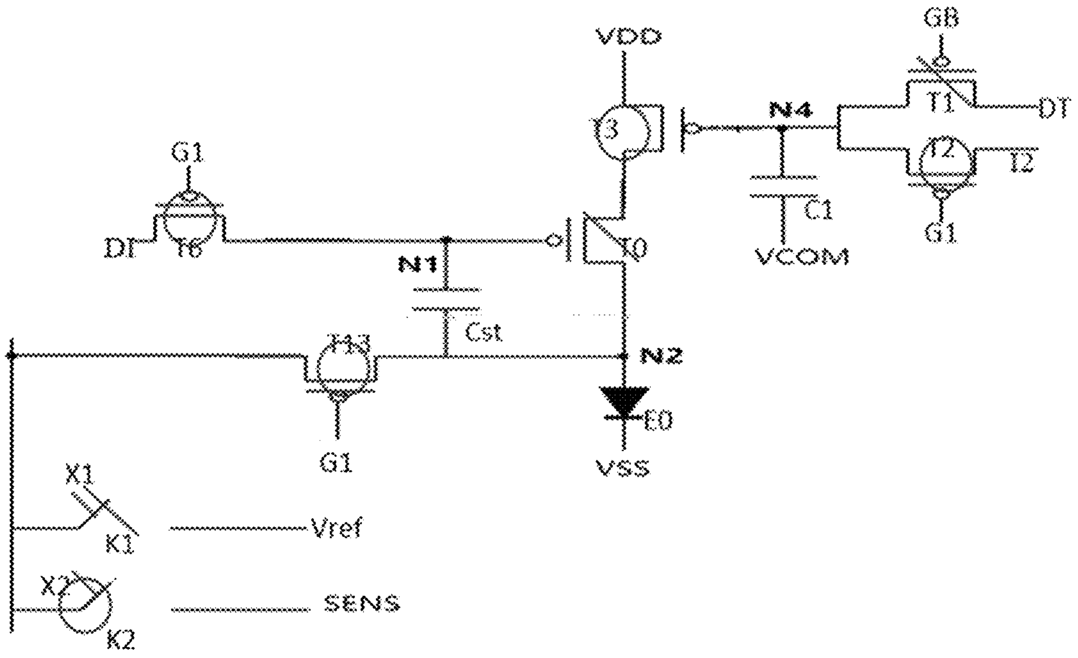
FIG. 53E is a schematic diagram of the working state of the pixel circuit shown in FIG. 51 during the extraction time period SC3.

FIG. 53A is a schematic diagram showing the working state of the pixel circuit shown in FIG. 51 in the first writing-in time period S12 and the first light emitting time period S22;

FIG. 53B is a schematic diagram showing the working state of the pixel circuit shown in FIG. 51 in a second writing-in time period S21 and a second light emitting time period S22;

FIG. 53C is a schematic diagram of the working state of the pixel circuit shown in FIG. 51 during a reset time period SC1;

FIG. 53D is a schematic diagram showing the working state of the pixel circuit shown in FIG. 51 during the compensation time period SC2;

FIG. 53E is a schematic diagram of the working state of the pixel circuit shown in FIG. 51 during the extraction time period SC3.

Figure 54A:
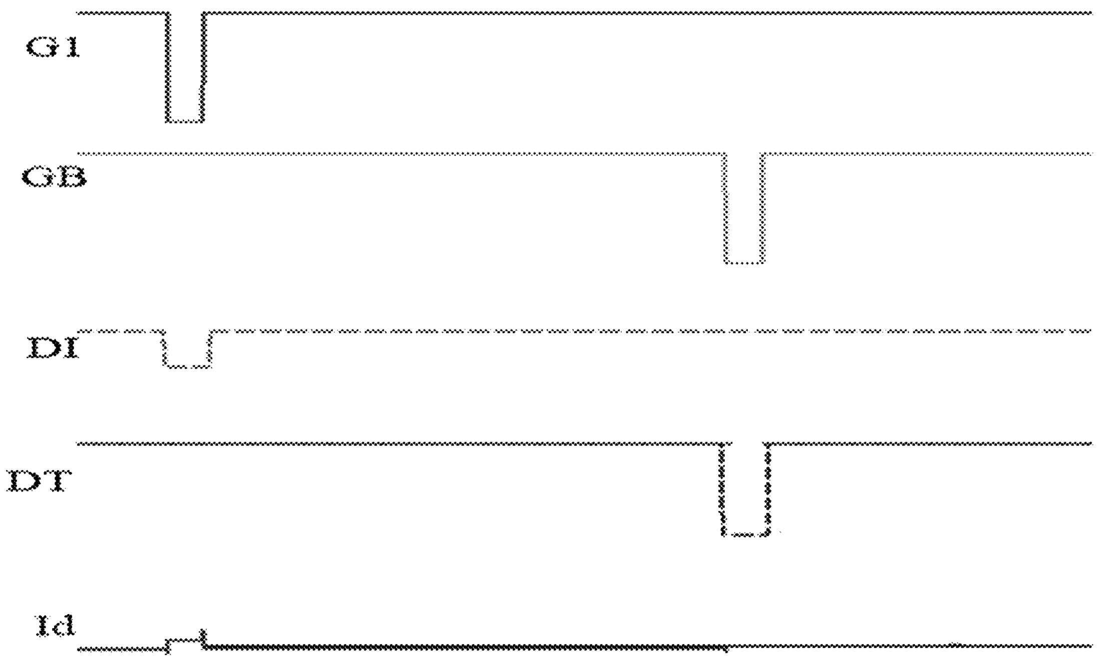
FIG. 54A is a schematic diagram showing simulation results of high grayscale display in a display phase of the pixel circuit shown in FIG. 51.
Figure 54B:
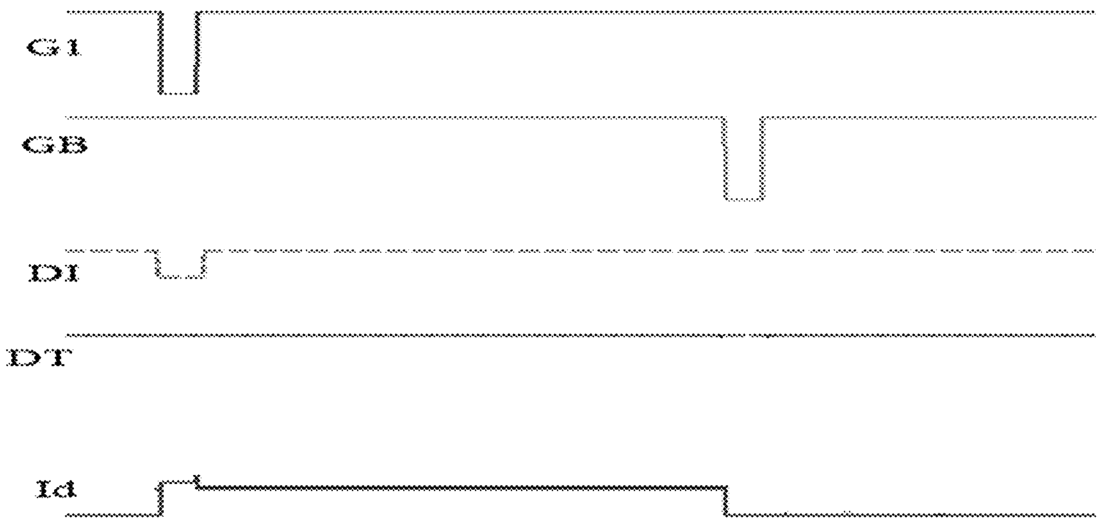
FIG. 54B is a schematic diagram of simulation results of performing low grayscale display in the display phase of the pixel circuit shown in FIG. 51.

FIG. 54A is a schematic diagram showing simulation results of high grayscale display in a display phase of the pixel circuit shown in FIG. 51;

FIG. 54B is a schematic diagram showing simulation results of low grayscale display during the display phase of the pixel circuit shown in FIG. 51.

Figure 55:
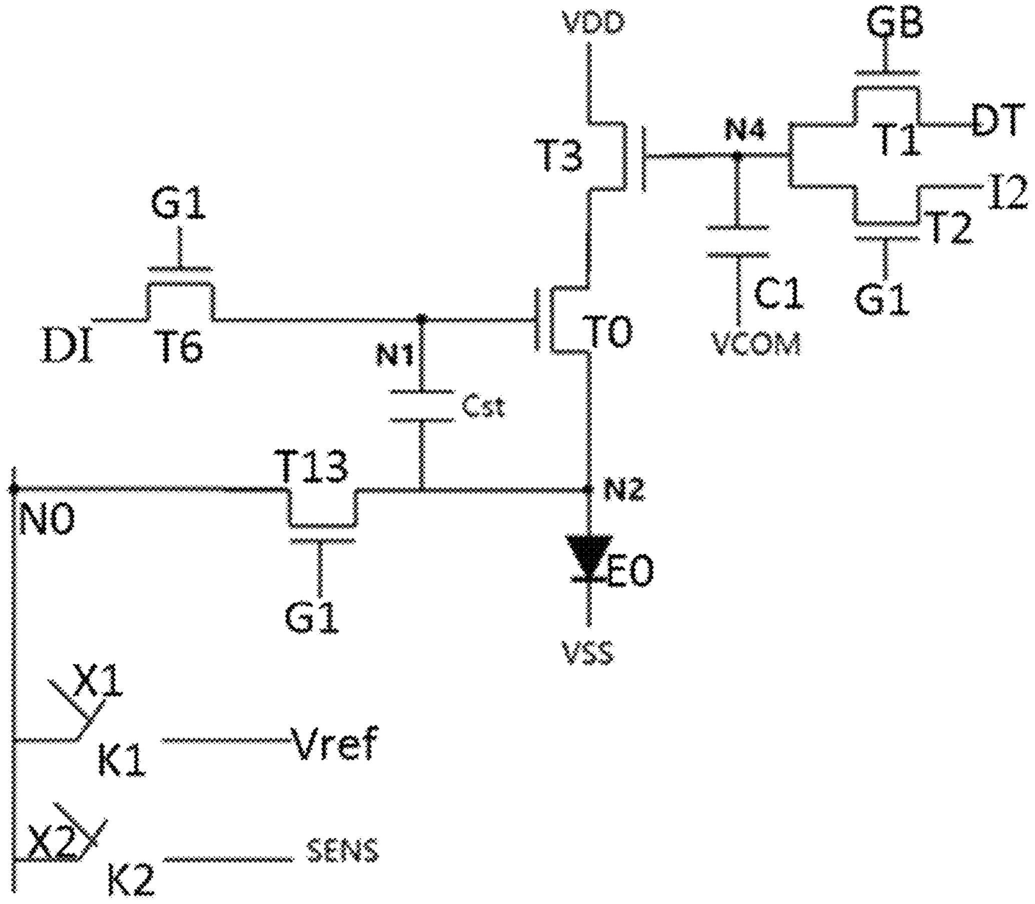
FIG. 55 is a circuit diagram of a pixel circuit according to at least one embodiment of the present disclosure.

The difference between the pixel circuit shown in FIG. 55 and the pixel circuit shown in FIG. 51 is that: all transistors are NMOS TFTs to realize a pixel circuit of driving current control+light emitting duration control;

The pixel circuit shown in FIG. 55 can be applied to oxide display products.

Figure 56:
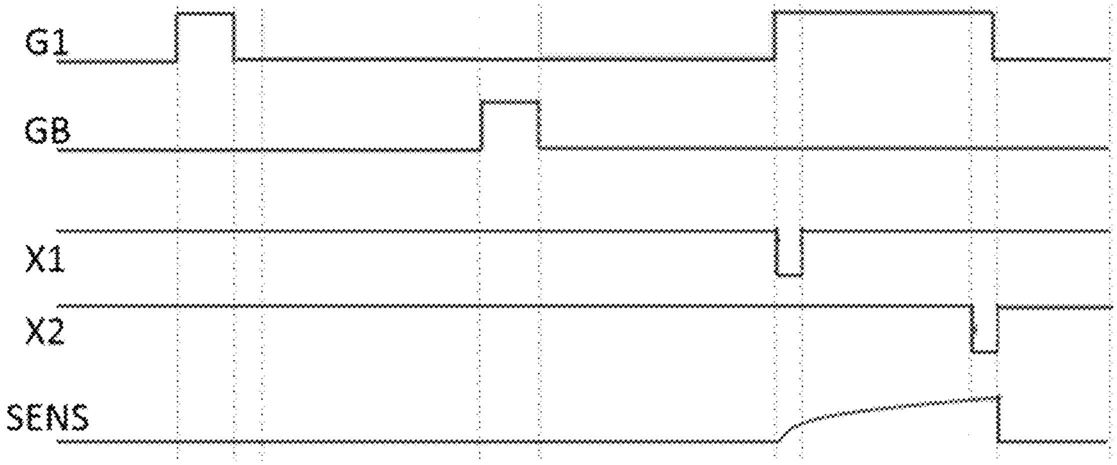
FIG. 56 is a timing diagram of the pixel circuit shown in FIG. 55.

FIG. 56 is a timing diagram of the pixel circuit shown in FIG. 55.

Figure 57:
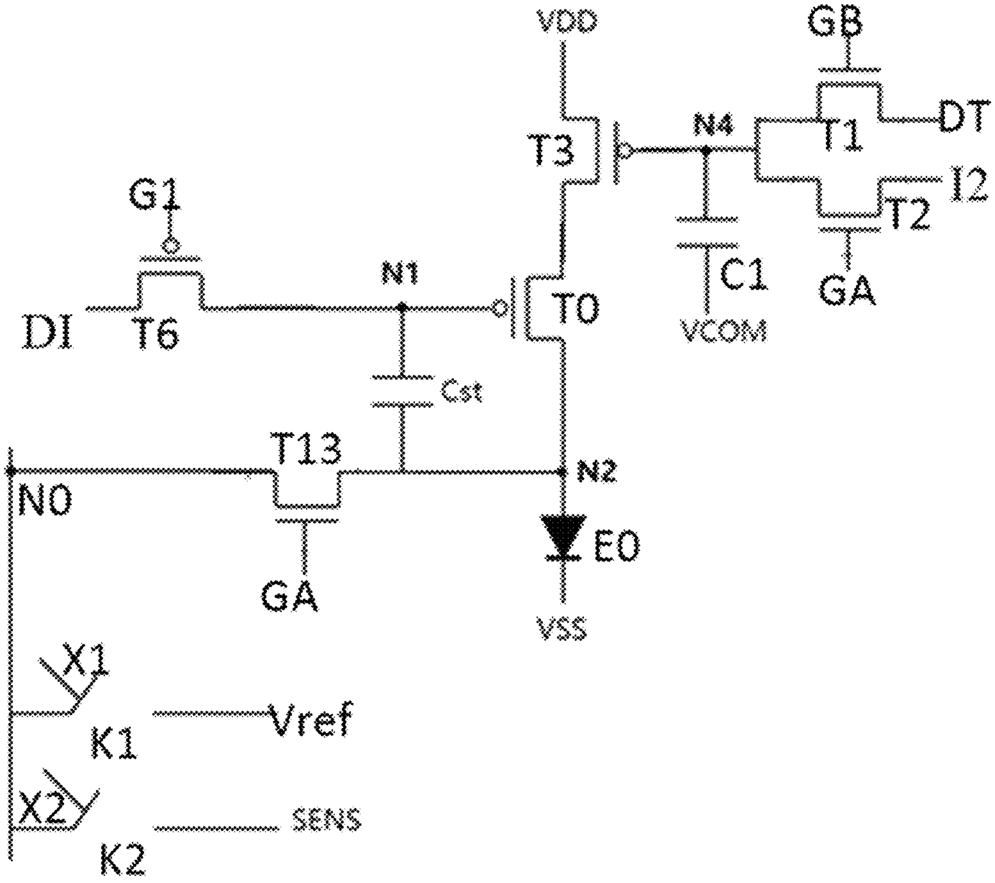
FIG. 57 is a circuit diagram of a pixel circuit according to at least one embodiment of the present disclosure.

The difference between the pixel circuit shown in FIG. 57 and the pixel circuit shown in FIG. 51 is that: T13, T1 and T2 are NMOS TFTs, T6, T0 and T3 are PMOS TFTs; the gate electrode of T2 and the gate electrode of T13 are both electrically connected to the second control terminal GA.

The pixel circuit shown in FIG. 57 is an LTPO pixel circuit, which adopts LTPO technology and utilizes the advantages of low leakage current of oxide TFT and high mobility of PMOS TFT. T13, T1 and T2 are set as NMOS TFT, and T6, T0 and T3 are set as PMOS TFT to meet threshold voltage compensation, current driving and PPI (current density) requirements, thereby further improving display performance.

Figure 58:
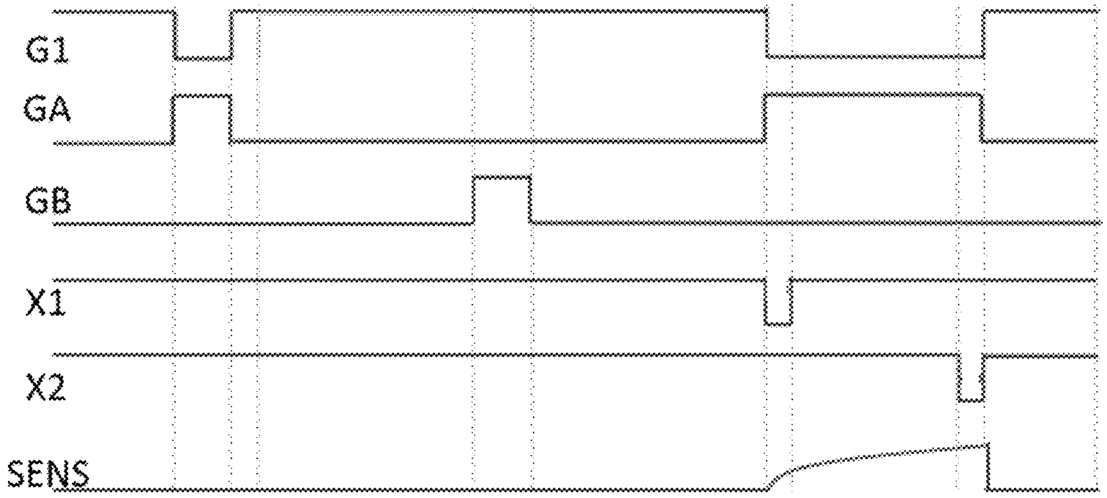
FIG. 58 is a timing diagram of the pixel circuit shown in FIG. 57.

FIG. 58 is a timing diagram of the pixel circuit shown in FIG. 57.

The pixel circuit described in the embodiment of the present disclosure includes a light emitting element, a driving circuit, a first reset circuit and a data writing-in circuit;

The control terminal of the driving circuit is electrically connected to the first node, the driving circuit is electrically connected to the first electrode of the light emitting element, and the driving circuit is configured to generate a driving current to drive the light emitting element under the control of the potential of the first node;

The data writing-in circuit is electrically connected to the writing-in control terminal and the writing-in node respectively, and is configured to sequentially provide a display data voltage and a light emitting time control data voltage to the writing-in node under the control of a writing-in control signal provided by the writing-in control terminal;

The first reset circuit is electrically connected to a first reset control terminal, a first initial voltage terminal and a first electrode of the light emitting element, respectively, and is configured to write a first initial voltage provided by the first initial voltage terminal into the first electrode of the light emitting element under the control of a first reset control signal provided by the first reset control terminal during a reset time period set between a time period for writing-in the display data voltage and a time period for writing-in the light emitting time control data voltage.

When the pixel circuit of the embodiment of the present disclosure is working, a display cycle (the display cycle may include a frame of time) includes a first display phase and a second display phase which are set successively, the first display phase includes a first writing-in time period; the second display phase includes a reset time period and a second writing-in time period which are set successively;

In the first writing-in time period, the data writing-in circuit provides a display data voltage to the writing-in node under the control of the writing-in control signal;

In the reset time period, the first reset circuit writes the first initial voltage into the first electrode of the light emitting element under the control of the first reset control signal;

In the second writing-in time period, the data writing-in circuit provides the light emitting time control data voltage to the writing-in node under the control of the writing-in control signal.

In a specific implementation, when the pixel circuit described in at least one embodiment of the present disclosure is in operation, in a reset time period set between the time period for writing-in the display data voltage and the time period for writing-in the light emitting time control data voltage, the first reset circuit writes a first initial voltage to the first electrode of the light emitting element under the control of a first reset control signal, to release the residual charge in the first electrode of the light emitting element and improve display uniformity.

When the pixel circuit according to the embodiment of the present disclosure is working, the reset time period may be a second reset time period, and the first display phase may include a first reset time period set before the first writing-in time period;

In the first reset time period, the first reset circuit writes a first initial voltage into the first electrode of the light emitting element under the control of the first reset control signal, to release residual charges in the first electrode of the light emitting element and improve display uniformity.

When the pixel circuit described in the embodiment of the present disclosure is in operation, in a first reset time period and a second reset time period, the first reset circuit writes a first initial voltage into the first electrode of the light emitting element under the control of a first reset control signal, so as to release the residual charge in the first electrode of the light emitting element at a high frequency, thereby improving display uniformity.

In at least one embodiment of the present disclosure, the first terminal of the driving circuit is electrically connected to the first electrode of the light emitting element, and the writing-in node is electrically connected to the second terminal of the driving circuit; or, the second terminal of the driving circuit is electrically connected to the first electrode of the light emitting element, and the writing-in node is electrically connected to the first terminal of the driving circuit.

Optionally, the light emitting element is an inorganic light emitting diode, and the width-to-length ratio of the transistor included in the driving circuit is greater than 0.5.

In at least one embodiment of the present disclosure, the width-to-length ratio of a transistor is a ratio of a channel width W to a channel length L of the transistor.

In a specific implementation, the light emitting element may be an inorganic light emitting diode, and the width-to-length ratio of the transistor included in the driving circuit may be greater than 0.5.

In at least one embodiment of the present disclosure, the light emitting element may be an inorganic light emitting diode, but is not limited thereto; for example, the light emitting element may be a micro light emitting diode or a mini light emitting diode.

In a specific implementation, the light emitting element may also be an organic light emitting diode.

The pixel circuit described in at least one embodiment of the present disclosure further includes a second reset circuit;

The second reset circuit is electrically connected to the second reset control terminal, the second initial voltage terminal and the first node respectively, and is configured to write the second initial voltage provided by the second initial voltage terminal into the first node during the reset time period under the control of the second reset control signal provided by the second reset control terminal.

In a specific implementation, the driving circuit may further include a second reset circuit, and in the second reset time period, the second reset circuit writes a second initial voltage into the first node under the control of a second reset control signal;

The second reset circuit also writes a second initial voltage into the first node under the control of a second reset control signal during the first reset time period;

The first display phase may further include a first light emitting time period set after the first writing-in time period, and the second display phase may further include a second light emitting time period set after the second writing-in time period, in the first light emitting time period, the driving circuit drives the light emitting element to emit light according to the display data voltage, and in the second light emitting time period, the driving circuit controls the data voltage according to the light emitting time to drive the light emitting element to emit light;

At least one embodiment of the present disclosure resets the potential of the first node N1 before a first writing-in time period and before a second writing-in time period, so that when the display data voltage and the light emitting time control data voltage have the same voltage value, the difference between the driving current generated by the driving circuit in the first light emitting time period and the driving current generated by the driving circuit in the second light emitting time period is reduced, thereby reducing the brightness difference between the first light emitting time period and the second light emitting time period in the same frame time.

Optionally, the first reset control terminal and the second reset control terminal may be the same reset control terminal, but not limited thereto; in actual operation, the first reset control terminal and the second reset control terminal may be different reset control terminals.

In at least one embodiment of the present disclosure, the writing-in control terminal includes a first control terminal and a second control terminal, and the data writing-in circuit is also electrically connected to the first data line and the second data line respectively; the display cycle of the pixel circuit includes a first writing-in time period and a second writing-in time period which are set successively;

The data writing-in circuit is configured to write the display data voltage provided by the second data line to the writing-in node under the control of the second control signal provided by the second control terminal during the first writing-in time period, and is configured to write the light emitting time control data voltage provided by the first data line to the writing-in node under the control of the first control signal provided by the first control terminal during the second writing-in time period.

In a specific implementation, the writing-in control terminal may include a first control terminal and a second control terminal. In the first writing-in time period, under the control of a second control signal, the data writing-in circuit writes the display data voltage provided by the second data line into the writing-in node. In the second writing-in time period, the data writing-in circuit writes the light emitting time control data voltage provided by the first data line into the writing-in node under the control of a first control signal.

The pixel circuit described in at least one embodiment of the present disclosure further includes a first light emitting control circuit, a second light emitting control circuit and a compensation control circuit;

The first light emitting control circuit is electrically connected to the light emitting control terminal, the first voltage terminal and the first terminal of the driving circuit respectively, and is configured to control the connection between the first voltage terminal and the first terminal of the driving circuit under the control of the light emitting control signal provided by the light emitting control terminal;

The second light emitting control circuit is electrically connected to the light emitting control terminal, the second terminal of the driving circuit and the first electrode of the light emitting element respectively, and is configured to control the second terminal of the driving circuit to be connected to the first electrode of the light emitting element under the control of the light emitting control signal; the second electrode of the light emitting element is electrically connected to the second voltage terminal;

The compensation control circuit is electrically connected to the scanning terminal, the control terminal of the driving circuit and the second terminal of the driving circuit respectively, and is configured to control the communication between the control terminal of the driving circuit and the second terminal of the driving circuit under the control of the scanning signal provided by the scanning terminal;

The first electrode of the light emitting element is a first electrode of the light emitting element.

In a specific implementation, the pixel circuit may further include a first light emitting control circuit, a second light emitting control circuit and a compensation control circuit; the first light emitting control circuit controls the connection between the first voltage terminal and the first terminal of the driving circuit under the control of a light emitting control signal; the second light emitting control circuit controls the connection between the second terminal of the driving circuit and the first electrode of the light emitting element under the control of the light emitting control signal; the compensation control circuit controls the connection between the control terminal of the driving circuit and the second terminal of the driving circuit under the control of a scanning signal to perform threshold voltage compensation.

In at least one embodiment of the present disclosure, the light emitting element is an inorganic light emitting diode, the width-to-length ratio of the transistor included in the first light emitting control circuit is greater than 1, the width-to-length ratio of the transistor included in the second light emitting control circuit is greater than 1, and the width-to-length ratio of the transistor included in the driving circuit is greater than 0.5.

In a specific implementation, the light emitting element may be an inorganic light emitting diode, the width-to-length ratio of the transistor included in the first light emitting control circuit may be greater than 1, the width-to-length ratio of the transistor included in the second light emitting control circuit may be greater than 1, and the width-to-length ratio of the transistor included in the driving circuit may be greater than 0.5.

Optionally, the first voltage terminal may be a high voltage terminal, and the second voltage terminal may be a low voltage terminal.

In at least one embodiment of the present disclosure, the pixel circuit may further include an energy storage circuit, wherein the energy storage circuit is electrically connected to the first node and is configured to store electrical energy.

Optionally, the energy storage circuit includes a storage capacitor; the light emitting element is an inorganic light emitting diode;

The capacitance value of the storage capacitor is greater than 3 times the gate-source capacitance of the transistor in the driving circuit.

In a specific implementation, the energy storage circuit may include a storage capacitor; the light emitting element may be an inorganic light emitting diode;

The capacitance value of the storage capacitor may be greater than 3 times the gate-source capacitance of the transistor in the driving circuit.

In a specific implementation, the capacitance value of the storage capacitor is set to be greater than 3 times the gate-source capacitance of the transistor in the driving circuit, so that when the source potential of the transistor in the driving circuit changes, the gate potential of the transistor in the driving circuit can be maintained to ensure display accuracy.

In at least one embodiment of the present disclosure, the gate-source capacitance of the transistor in the driving circuit may be a parasitic capacitance between the gate electrode and the source electrode of the transistor in the driving circuit, which may be calculated based on the facing area of the gate electrode and the source electrode of the transistor in the driving circuit, and a dielectric constant, wherein the dielectric constant may be calculated based on the material and thickness of the insulating layer between the gate electrode and the source electrode of the transistor in the driving circuit.

Figure 59:
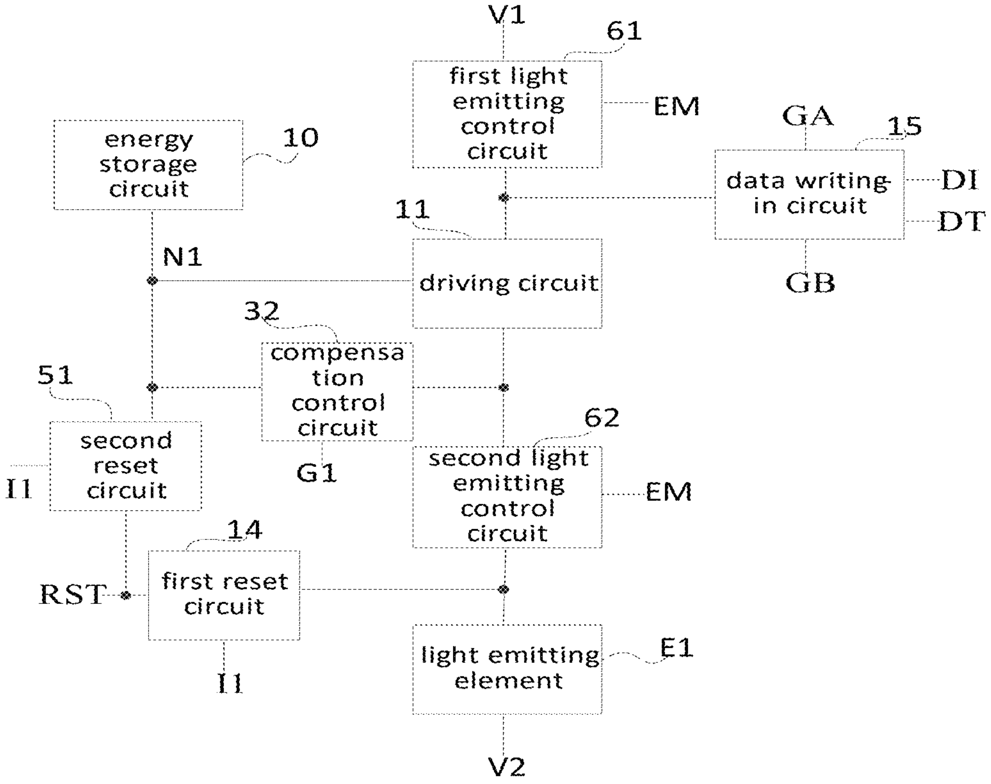
FIG. 59 is a structural diagram of a pixel circuit according to at least one embodiment of the present disclosure.

As shown in FIG. 59, the pixel circuit according to at least one embodiment of the present disclosure includes a light emitting element E1, a storage circuit 10, a driving circuit 11, a first reset circuit 14, a data writing-in circuit 15, a second reset circuit 51, a first light emitting control circuit 61, a second light emitting control circuit 62 and a compensation control circuit 32; the writing-in control terminal includes a first control terminal GB and a second control terminal GA;

The energy storage circuit 10 is electrically connected to the first node N1 and is configured to store electrical energy;

The control terminal of the driving circuit 11 is electrically connected to the first node N1, and the driving circuit 11 is configured to generate a driving current for driving the light emitting element E1 under the control of the potential of the first node N1;

The data writing-in circuit 15 is electrically connected to the first control terminal GB, the second control terminal GA, the first data line DT, the second data line DI and the first terminal of the driving circuit 11 respectively, and is configured to write the display data voltage provided by the second data line DI into the first terminal of the driving circuit 11 under the control of the second control signal provided by the second control terminal GA, and is configured to write the light emitting time control data voltage provided by the first data line DT into the first terminal of the driving circuit 11 under the control of the first control signal provided by the first control terminal GB;

The first reset circuit 14 is electrically connected to the reset control terminal RST, the first initial voltage terminal I1 and the first electrode of the light emitting element E1 respectively, and is configured to write the first initial voltage Vi1 provided by the first initial voltage terminal I1 into the first electrode of the light emitting element E1 under the control of the reset control signal provided by the reset control terminal RST during a reset time period between the time period of writing-in the display data voltage and the time period of writing-in the light emitting time control data voltage;

The first light emitting control circuit 61 is electrically connected to the light emitting control terminal EM, the first voltage terminal V1 and the first terminal of the driving circuit 11 respectively, and is configured to control the first voltage terminal V1 to be connected to the first terminal of the driving circuit 11 under the control of the light emitting control signal provided by the light emitting control terminal EM;

The second light emitting control circuit 62 is electrically connected to the light emitting control terminal EM, the second terminal of the driving circuit 11 and the first electrode of the light emitting element E1 respectively, and is configured to control the second terminal of the driving circuit 11 to be connected to the first electrode of the light emitting element E1 under the control of the light emitting control signal; the second electrode of the light emitting element 31 is electrically connected to the second voltage terminal V2;

The compensation control circuit 32 is electrically connected to the scanning terminal G1, the control terminal of the driving circuit 11 and the second terminal of the driving circuit 11 respectively, and is configured to control the control terminal of the driving circuit 11 to communicate with the second terminal of the driving circuit 11 under the control of the scanning signal provided by the scanning terminal G1;

The second reset circuit 51 is electrically connected to the reset control terminal RST, the first initial voltage terminal I1 and the first node N1, respectively, and is configured to write the first initial voltage Vi1 provided by the first initial voltage terminal I1 into the first node N1 during the reset time period under the control of the reset control signal provided by the reset control terminal RST.

In at least one embodiment of the present disclosure, the light emitting element may be a light emitting diode, the first electrode of the light emitting element may be an anode of the light emitting diode, and the second electrode of the light emitting element may be a cathode of the light emitting diode;

The light emitting diode may be an organic light emitting diode, a mini light emitting diode or a micro light emitting diode.

In the pixel circuit shown in FIG. 59, the first reset control terminal and the second reset control terminal are the same reset control terminal, the first initial voltage terminal and the second initial voltage terminal are the same initial voltage terminal, the first electrode of the light emitting element is the first electrode of the light emitting element, and the writing-in node is electrically connected to the first terminal of the driving circuit, but is not limited to this.

The pixel circuit described in at least one embodiment of the present disclosure further includes a first light emitting control circuit, a second light emitting control circuit and a compensation control circuit;

The first electrode of the light emitting element is electrically connected to the first voltage terminal;

The first light emitting control circuit is electrically connected to the light emitting control terminal, the second electrode of the light emitting element and the first terminal of the driving circuit respectively, and is configured to control the second electrode of the light emitting element to be connected to the first terminal of the driving circuit under the control of the light emitting control signal provided by the light emitting control terminal;

The second light emitting control circuit is electrically connected to the light emitting control terminal, the second terminal of the driving circuit and the second voltage terminal respectively, and is configured to control the second terminal of the driving circuit to be connected to the second voltage terminal under the control of the light emitting control signal;

The compensation control circuit is electrically connected to the scanning terminal, the control terminal of the driving circuit and the first terminal of the driving circuit respectively, and is configured to control the connection between the control terminal of the driving circuit and the first terminal of the driving circuit under the control of the scanning signal provided by the scanning terminal.

In a specific implementation, the pixel circuit may further include a first light emitting control circuit, a second light emitting control circuit and a compensation control circuit; the first light emitting control circuit controls the second electrode of the light emitting element to be connected to the first terminal of the driving circuit under the control of a light emitting control signal; the second light emitting control circuit controls the second terminal of the driving circuit to be connected to the second voltage terminal under the control of the light emitting control signal; the compensation control circuit controls the control terminal of the driving circuit to be connected to the first terminal of the driving circuit under the control of a scanning signal to perform threshold voltage compensation.

Figure 60:
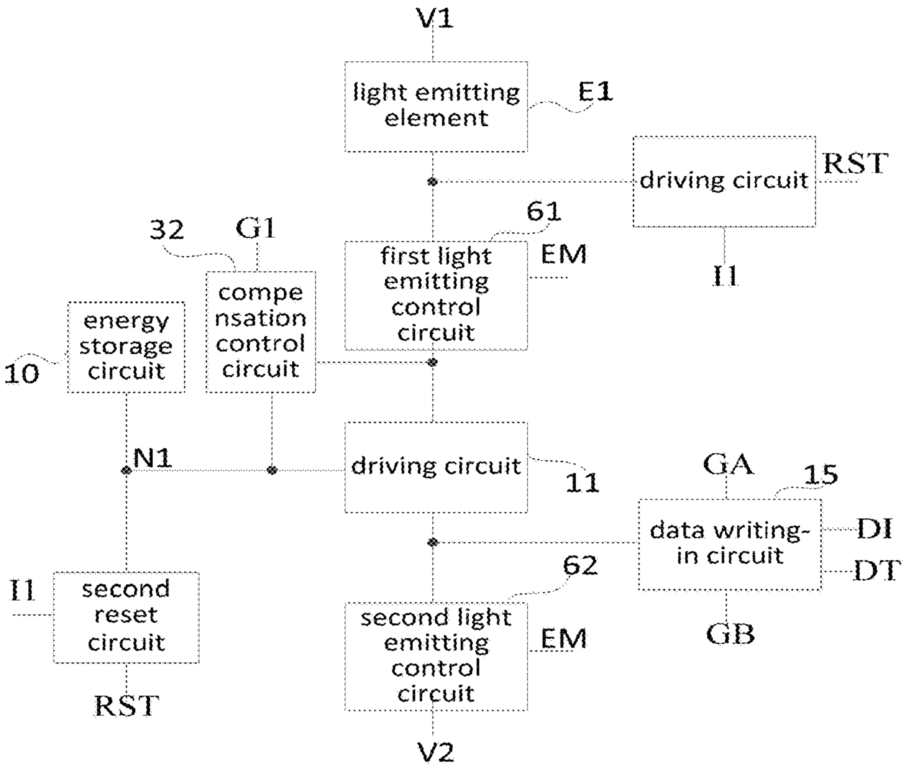
FIG. 60 is a structural diagram of a pixel circuit according to at least one embodiment of the present disclosure.

As shown in FIG. 60, the pixel circuit described in the embodiment of the present disclosure includes a light emitting element E1, a storage circuit 10, a driving circuit 11, a first reset circuit 14, a data writing-in circuit 15, a second reset circuit 51, a first light emitting control circuit 61, a second light emitting control circuit 62 and a compensation control circuit 32; the writing-in control terminal includes a first control terminal GB and a second control terminal GA;

The energy storage circuit 10 is electrically connected to the first node N1 and is configured to store electrical energy;

The first electrode of the light emitting element E1 is electrically connected to the first voltage terminal V1;

The control terminal of the driving circuit 11 is electrically connected to the first node N1, and the driving circuit 11 is electrically connected to the second electrode of the light emitting element E1 through the first light emitting control circuit 61. The driving circuit 11 is configured to generate a driving current for driving the light emitting element E1 under the control of the potential of the first node N1;

The data writing-in circuit 15 is electrically connected to the first control terminal GB, the second control terminal GA, the first data line DT, the second data line DI and the second terminal of the driving circuit 11 respectively, and is configured to write the display data voltage provided by the second data line DI into the second terminal of the driving circuit 11 under the control of the second control signal provided by the second control terminal GA, and is configured to write the light emitting time control data voltage provided by the first data line DT into the second terminal of the driving circuit 11 under the control of the first control signal provided by the first control terminal GB;

The first reset circuit 14 is electrically connected to the reset control terminal RST, the first initial voltage terminal I1 and the second electrode of the light emitting element E1 respectively, and is configured to write the first initial voltage Vi1 provided by the first initial voltage terminal I1 into the second electrode of the light emitting element E1 under the control of the reset control signal provided by the reset control terminal RST during a reset time period set between the time period for writing-in the display data voltage and the time period for writing-in the light emitting time control data voltage;

The first light emitting control circuit 61 is electrically connected to the light emitting control terminal EM, the second electrode of the light emitting element E1 and the first terminal of the driving circuit 11 respectively, and is configured to control the second electrode of the light emitting element E1 to be connected to the first terminal of the driving circuit 11 under the control of the light emitting control signal provided by the light emitting control terminal EM;

The second light emitting control circuit 62 is electrically connected to the light emitting control terminal EM, the second terminal of the driving circuit 11 and the second voltage terminal V2 respectively, and is configured to control the second terminal of the driving circuit 11 to be connected to the second voltage terminal V2 under the control of the light emitting control signal;

The compensation control circuit 32 is electrically connected to the scanning terminal G1, the control terminal of the driving circuit 11 and the first terminal of the driving circuit 11 respectively, and is configured to control the communication between the control terminal of the driving circuit 11 and the first terminal of the driving circuit 11 under the control of the scanning signal provided by the scanning terminal G1;

The second reset circuit 51 is electrically connected to the reset control terminal RST, the first initial voltage terminal I1 and the first node N1, respectively, and is configured to write the first initial voltage Vi1 provided by the first initial voltage terminal I1 into the first node N1 during the reset time period under the control of the reset control signal provided by the reset control terminal RST.

In the pixel circuit shown in FIG. 60, the first reset control terminal and the second reset control terminal are the same reset control terminal, the first initial voltage terminal and the second initial voltage terminal are the same initial voltage terminal, the first electrode of the light emitting element is the second electrode of the light emitting element, and the writing-in node is electrically connected to the second terminal of the driving circuit, but is not limited to this.

Figure 61:
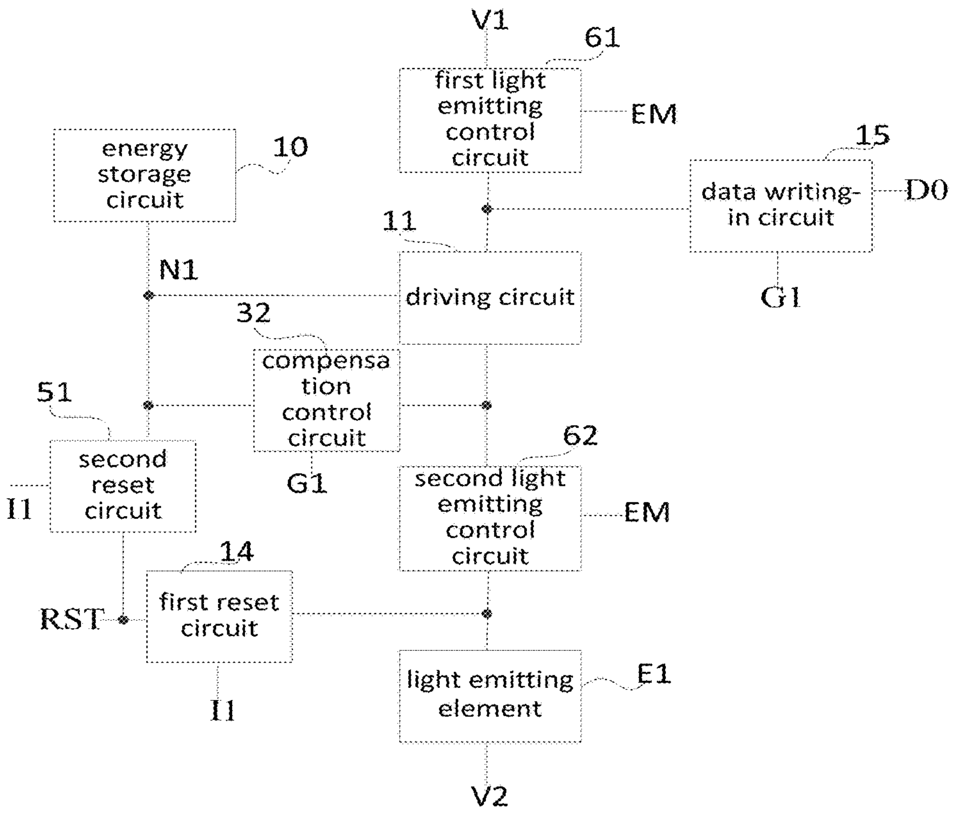
FIG. 61 is a structural diagram of a pixel circuit according to at least one embodiment of the present disclosure.

As shown in FIG. 61, the pixel circuit according to at least one embodiment of the present disclosure includes a light emitting element E1, a storage circuit 10, a driving circuit 11, a first reset circuit 14, a data writing-in circuit 15, a second reset circuit 51, a first light emitting control circuit 61, a second light emitting control circuit 62 and a compensation control circuit 32; the writing-in control terminal includes a first control terminal GB and a second control terminal GA;

The energy storage circuit 10 is electrically connected to the first node N1 and is configured to store electrical energy;

The control terminal of the driving circuit 11 is electrically connected to the first node N1, and the driving circuit 11 is configured to generate a driving current for driving the light emitting element E1 under the control of the potential of the first node N1;

The data writing-in circuit 15 is electrically connected to the scanning terminal G1, the data line D0 and the first terminal of the driving circuit 11 respectively, and is configured to write the display data voltage and the light emitting time control data voltage provided by the data line D0 into the first terminal of the driving circuit 11 in sequence under the control of the scanning signal provided by the scanning terminal G1;

The first reset circuit 14 is electrically connected to the reset control terminal RST, the first initial voltage terminal I1 and the first electrode of the light emitting element E1 respectively, and is configured to write the first initial voltage Vi1 provided by the first initial voltage terminal I1 into the first electrode of the light emitting element E1 under the control of the reset control signal provided by the reset control terminal RST during a reset time period between the time period of writing-in the display data voltage and the time period of writing-in the light emitting time control data voltage;

The first light emitting control circuit 61 is electrically connected to the light emitting control terminal EM, the first voltage terminal V1 and the first terminal of the driving circuit 11 respectively, and is configured to control the first voltage terminal V1 to be connected to the first terminal of the driving circuit 11 under the control of the light emitting control signal provided by the light emitting control terminal EM;

The second light emitting control circuit 62 is electrically connected to the light emitting control terminal EM, the second terminal of the driving circuit 11 and the first electrode of the light emitting element E1 respectively, and is configured to control the second terminal of the driving circuit 11 to be connected to the first electrode of the light emitting element E1 under the control of the light emitting control signal; the second electrode of the light emitting element 31 is electrically connected to the second voltage terminal V2;

The compensation control circuit 32 is electrically connected to the scanning terminal G1, the control terminal of the driving circuit 11 and the second terminal of the driving circuit 11 respectively, and is configured to control the control terminal of the driving circuit 11 to communicate with the second terminal of the driving circuit 11 under the control of the scanning signal provided by the scanning terminal G1;

The second reset circuit 51 is electrically connected to the reset control terminal RST, the first initial voltage terminal I1 and the first node N1, respectively, and is configured to write the first initial voltage Vi1 provided by the first initial voltage terminal I1 into the first node N1 during the reset time period under the control of the reset control signal provided by the reset control terminal RST.

In the pixel circuit shown in FIG. 61, the first reset control terminal and the second reset control terminal are the same reset control terminal, the first initial voltage terminal and the second initial voltage terminal are the same initial voltage terminal, and the first electrode of the light emitting element is the second electrode of the light emitting element.

Figure 62:
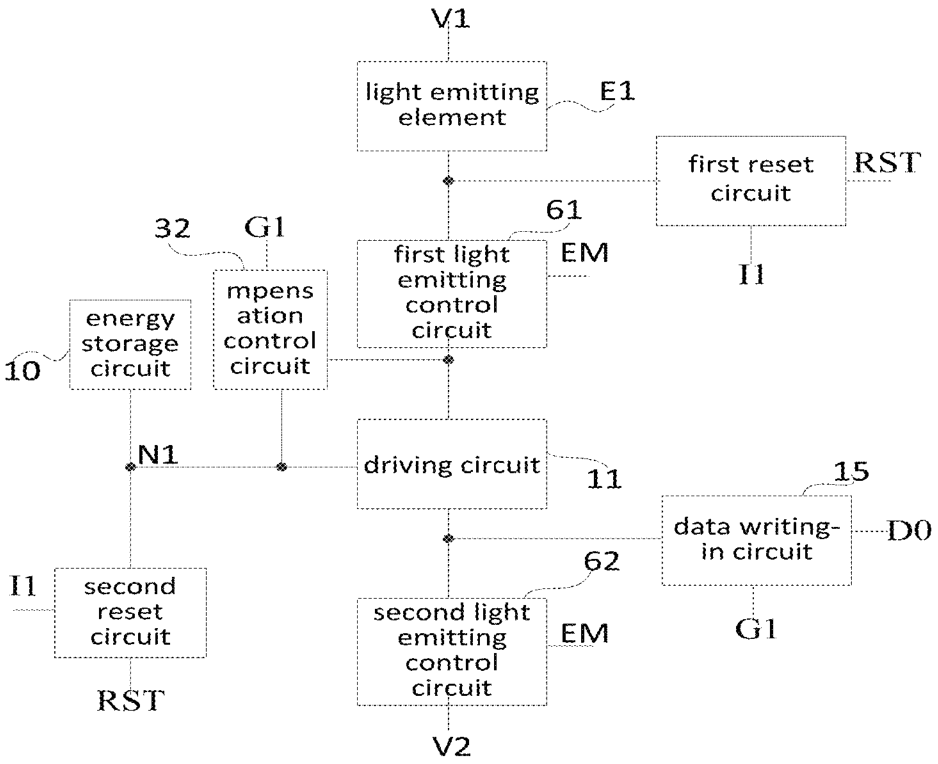
FIG. 62 is a structural diagram of a pixel circuit according to at least one embodiment of the present disclosure.

As shown in FIG. 62, the pixel circuit described in the embodiment of the present disclosure includes a light emitting element E1, a storage circuit 10, a driving circuit 11, a first reset circuit 14, a data writing-in circuit 15, a second reset circuit 51, a first light emitting control circuit 61, a second light emitting control circuit 62 and a compensation control circuit 32; the writing-in control terminal includes a first control terminal GB and a second control terminal GA;

The energy storage circuit 10 is electrically connected to the first node N1 and is configured to store electrical energy;

The first electrode of the light emitting element E1 is electrically connected to the first voltage terminal V1;

The control terminal of the driving circuit 11 is electrically connected to the first node N1, and the driving circuit 11 is electrically connected to the second electrode of the light emitting element E1 through the first light emitting control circuit 61. The driving circuit 11 is configured to generate a driving current for driving the light emitting element E1 under the control of the potential of the first node N1;

The data writing-in circuit 15 is electrically connected to the scanning terminal G1, the data line D0 and the second terminal of the driving circuit 11 respectively, and is configured to write the display data voltage and the light emitting time control data voltage provided by the data line D0 into the second terminal of the driving circuit 11 in sequence under the control of the scanning signal provided by the scanning terminal G1;

The first reset circuit 14 is electrically connected to the reset control terminal RST, the first initial voltage terminal I1 and the second electrode of the light emitting element E1 respectively, and is configured to write the first initial voltage Vi1 provided by the first initial voltage terminal I1 into the second electrode of the light emitting element E1 under the control of the reset control signal provided by the reset control terminal RST during a reset time period set between the time period for writing-in the display data voltage and the time period for writing-in the light emitting time control data voltage;

The first light emitting control circuit 61 is electrically connected to the light emitting control terminal EM, the second electrode of the light emitting element E1 and the first terminal of the driving circuit 11 respectively, and is configured to control the second electrode of the light emitting element E1 to be connected to the first terminal of the driving circuit 11 under the control of the light emitting control signal provided by the light emitting control terminal EM;

The second light emitting control circuit 62 is electrically connected to the light emitting control terminal EM, the second terminal of the driving circuit 11 and the second voltage terminal V2 respectively, and is configured to control the second terminal of the driving circuit 11 to be connected to the second voltage terminal V2 under the control of the light emitting control signal;

The compensation control circuit 32 is electrically connected to the scanning terminal G1, the control terminal of the driving circuit 11 and the first terminal of the driving circuit 11 respectively, and is configured to control the communication between the control terminal of the driving circuit 11 and the first terminal of the driving circuit 11 under the control of the scanning signal provided by the scanning terminal G1;

The second reset circuit 51 is electrically connected to the reset control terminal RST, the first initial voltage terminal I1 and the first node N1, respectively, and is configured to write the first initial voltage Vi1 provided by the first initial voltage terminal I1 into the first node N1 during the reset time period under the control of the reset control signal provided by the reset control terminal RST.

In the pixel circuit shown in FIG. 62, the first reset control terminal and the second reset control terminal are the same reset control terminal, the first initial voltage terminal and the second initial voltage terminal are the same initial voltage terminal, and the first electrode of the light emitting element is the second electrode of the light emitting element.

In the pixel circuit shown in FIG. 61 and FIG. 62, the data writing-in circuit may include a tenth transistor;

a gate electrode of the tenth transistor is electrically connected to the scanning terminal, a first electrode of the tenth transistor is electrically connected to the data line, and the tenth transistor is electrically connected to the first terminal of the driving circuit or the second terminal of the driving circuit.

In at least one embodiment of the present disclosure, the writing-in node includes a first writing-in node and a second writing-in node;

The first writing-in node is electrically connected to the first terminal of the driving circuit; the pixel circuit also includes a switch control circuit; the second terminal of the driving circuit is electrically connected to the first electrode of the light emitting element through the switch control circuit, and the switch control circuit is electrically connected to the switch control terminal, and the switch control circuit is configured to control the connection between the second terminal of the driving circuit and the first electrode of the light emitting element under the control of the potential of the switch control terminal; the second writing-in node is electrically connected to the switch control terminal.

In at least one embodiment of the present disclosure, the writing-in node includes a first writing-in node and a second writing-in node;

The first writing-in node is electrically connected to the second terminal of the driving circuit; the pixel circuit also includes a switch control circuit; the first terminal of the driving circuit is electrically connected to the first electrode of the light emitting element through the switch control circuit, and the switch control circuit is electrically connected to the switch control terminal, and the switch control circuit is configured to control the connection between the first terminal of the driving circuit and the first electrode of the light emitting element under the control of the potential of the switch control terminal; the second writing-in node is electrically connected to the switch control terminal.

Optionally, the light emitting element is an inorganic light emitting diode, the width-to-length ratio of the transistor included in the switch control circuit is greater than 1, and the width-to-length ratio of the transistor included in the driving circuit is greater than 0.5.

In a specific implementation, the light emitting element may be an inorganic light emitting diode, the width-to-length ratio of the transistor included in the switch control circuit may be greater than 1, and the width-to-length ratio of the transistor included in the driving circuit may be greater than 0.5.

In at least one embodiment of the present disclosure, the data writing-in circuit includes a first writing-in sub-circuit and a second writing-in sub-circuit; the writing-in control terminal includes a scanning terminal and a first control terminal;

The first writing-in sub-circuit is electrically connected to the first control terminal, the first data line and the second writing-in node respectively, and is configured to write the light emitting time control data voltage provided by the first data line into the second writing-in node under the control of the first control signal provided by the first control terminal;

The second writing-in sub-circuit is electrically connected to the scanning terminal, the second data line and the first writing-in node respectively, and is configured to write the display data voltage provided by the second data line into the first writing-in node under the control of the scanning signal provided by the scanning terminal.

In a specific implementation, the data writing-in circuit may include a first writing-in sub-circuit and a second writing-in sub-circuit, wherein the first writing-in sub-circuit writes the light emitting time control data voltage provided by the first data line into the second writing-in node under the control of a first control signal; and the second writing-in sub-circuit writes the display data voltage provided by the second data line into the first writing-in node under the control of the scanning signal.

The pixel circuit described in at least one embodiment of the present disclosure further includes a second reset circuit, an initialization circuit and a voltage maintenance circuit;

The second reset circuit is electrically connected to the second reset control terminal, the second initial voltage terminal and the first node respectively, and is configured to write the second initial voltage provided by the second initial voltage terminal into the first node under the control of the second reset control signal provided by the second reset control terminal;

The initialization circuit is electrically connected to the second control terminal, the third initial voltage terminal and the second writing-in node respectively, and is configured to write the third initial voltage provided by the third initial voltage terminal into the second writing-in node under the control of the second control signal provided by the second control terminal;

The voltage maintenance circuit is electrically connected to the switch control terminal and is configured to maintain the potential of the switch control terminal.

In a specific implementation, the pixel circuit may further include a second reset circuit and an initialization circuit; the second reset circuit writes the second initial voltage provided by the second initial voltage terminal into the first node under the control of a second reset control signal; the initialization circuit writes into the second writing-in node under the control of a second control signal.

Optionally, the voltage maintenance circuit may include a second capacitor;

a first terminal of the second capacitor is electrically connected to the switch control terminal, and a second terminal of the second capacitor is electrically connected to the DC voltage terminal.

In at least one embodiment of the present disclosure, the DC voltage terminal may be a common electrode voltage terminal, a low voltage terminal or a ground terminal, but is not limited thereto.

The pixel circuit described in at least one embodiment of the present disclosure further includes a first light emitting control circuit, a second light emitting control circuit and a compensation control circuit;

The first light emitting control circuit is electrically connected to the light emitting control terminal, the first voltage terminal and the first terminal of the driving circuit respectively, and is configured to control the connection between the first voltage terminal and the first terminal of the driving circuit under the control of the light emitting control signal provided by the light emitting control terminal;

The second light emitting control circuit is electrically connected to the light emitting control terminal, the second terminal of the driving circuit and the first terminal of the switch control circuit respectively, and is configured to control the second terminal of the driving circuit to be connected to the first terminal of the switch control circuit under the control of the light emitting control signal;

The second terminal of the switch control circuit is electrically connected to the first electrode of the light emitting element; the second electrode of the light emitting element is electrically connected to the second voltage terminal; the switch control circuit is configured to control the second light emitting control circuit to be connected to the first electrode of the light emitting element under the control of the potential of the switch control terminal;

The compensation control circuit is electrically connected to the scanning terminal, the control terminal of the driving circuit and the second terminal of the driving circuit respectively, and is configured to control the connection between the control terminal of the driving circuit and the second terminal of the driving circuit under the control of the scanning signal provided by the scanning terminal.

In a specific implementation, the pixel circuit may further include a first light emitting control circuit, a second light emitting control circuit and a compensation control circuit; the first light emitting control circuit controls the first voltage terminal to be connected to the first terminal of the driving circuit under the control of the light emitting control signal; the second light emitting control circuit controls the second terminal of the driving circuit to be connected to the first terminal of the switch control circuit under the control of the light emitting control signal; the switch control circuit controls the second light emitting control circuit to be connected to the first electrode of the light emitting element under the control of the potential of the switch control terminal; the compensation control circuit controls the control terminal of the driving circuit to be connected to the second terminal of the driving circuit under the control of the scanning signal to perform threshold voltage compensation.

Figure 63:
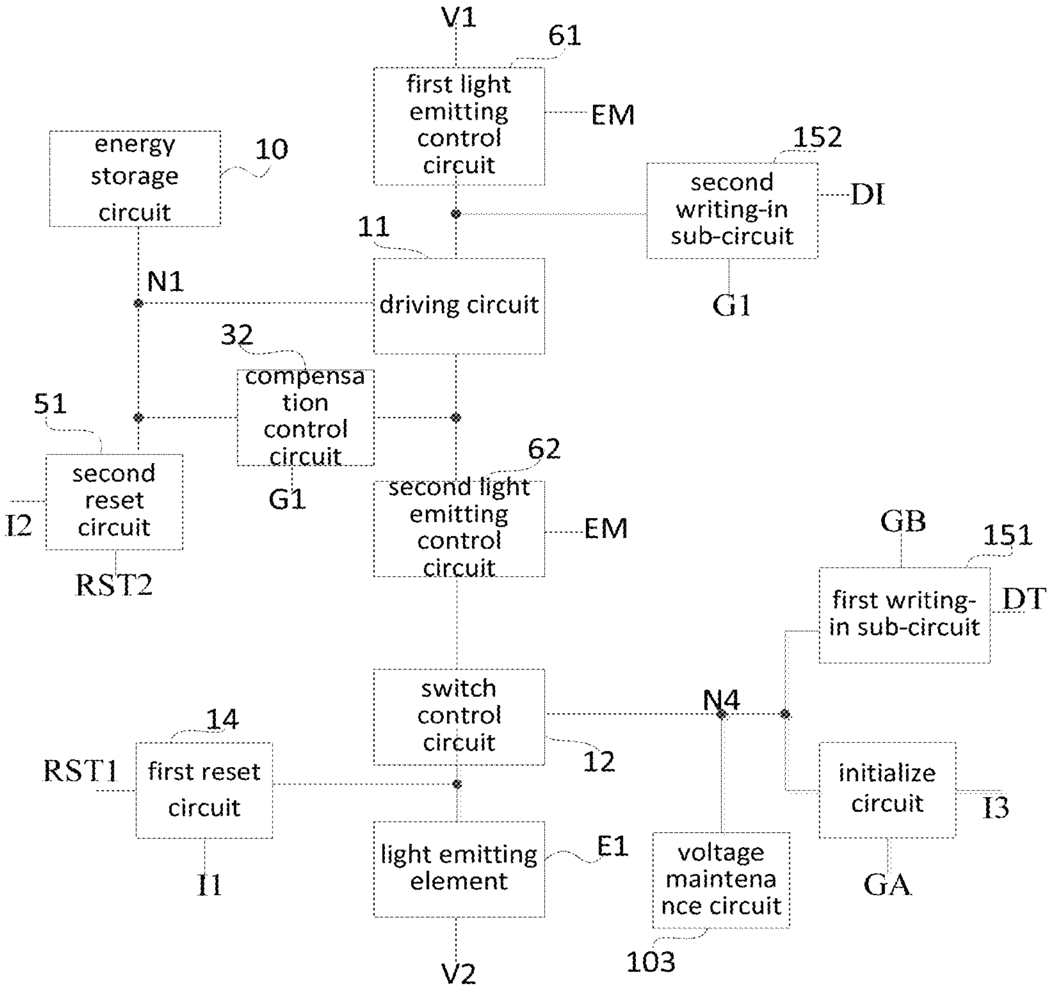
FIG. 63 is a structural diagram of a pixel circuit according to at least one embodiment of the present disclosure.

As shown in FIG. 63, the pixel circuit according to at least one embodiment of the present disclosure includes a light emitting element E1, a storage circuit 10, a driving circuit 11, a switch control circuit 12, a first reset circuit 14, a data writing-in circuit, a second reset circuit 51, an initialization circuit 50, a voltage maintenance circuit 103, a first light emitting control circuit 61, a second light emitting control circuit 62, and a compensation control circuit 32;

The first reset circuit 14 is electrically connected to the first reset control terminal RST1, the first initial voltage terminal I1 and the first electrode of the light emitting element E1 respectively, and is configured to write the first initial voltage provided by the first initial voltage terminal I1 into the first electrode of the light emitting element E1 under the control of the first reset control signal provided by the first reset control terminal RST1 during a reset time period between the time period for writing-in the display data voltage and the time period for writing-in the light emitting time control data voltage;

The data writing-in circuit includes a first writing-in sub-circuit 151 and a second writing-in sub-circuit 152; the writing-in control terminal includes a scanning terminal G1 and a first control terminal GB;

The first writing-in sub-circuit 151 is electrically connected to the first control terminal GB, the first data line DT and the switch control terminal N4 respectively, and is configured to write the light emitting time control data voltage provided by the first data line DT into the switch control terminal N4 under the control of the first control signal provided by the first control terminal GB;

The second writing-in sub-circuit 152 is electrically connected to the scanning terminal G1, the second data line DI and the first terminal of the driving circuit 11 respectively, and is configured to write the display data voltage provided by the second data line DI into the first terminal of the driving circuit 11 under the control of the scanning signal provided by the scanning terminal G1;

The second reset circuit 51 is electrically connected to the second reset control terminal RST2, the second initial voltage terminal I2 and the first node N1 respectively, and is configured to write the second initial voltage Vi2 provided by the second initial voltage terminal I2 into the first node N1 under the control of the second reset control signal provided by the second reset control terminal RST2;

The initialization circuit 50 is electrically connected to the second control terminal GA, the third initial voltage terminal I3 and the switch control terminal N4 respectively, and is configured to write the third initial voltage Vi3 provided by the third initial voltage terminal I3 into the switch control terminal N4 under the control of the second control signal provided by the second control terminal GA;

The voltage maintenance circuit 103 is electrically connected to the switch control terminal N4, and is configured to maintain the potential of the switch control terminal N4;

The first light emitting control circuit 61 is electrically connected to the light emitting control terminal EM, the first voltage terminal V1 and the first terminal of the driving circuit 11 respectively, and is configured to control the first voltage terminal V1 to be connected to the first terminal of the driving circuit 11 under the control of the light emitting control signal provided by the light emitting control terminal EM;

The second light emitting control circuit 62 is electrically connected to the light emitting control terminal EM, the second terminal of the driving circuit 11 and the first terminal of the switch control circuit 12 respectively, and is configured to control the second terminal of the driving circuit 11 to be connected to the first terminal of the switch control circuit 12 under the control of the light emitting control signal;

The control terminal of the switch control circuit 12 is electrically connected to the switch control terminal N4; the second terminal of the switch control circuit 12 is electrically connected to the first electrode of the light emitting element E1; the second electrode of the light emitting element E1 is electrically connected to the second voltage terminal V2; the switch control circuit 12 is configured to control the second light emitting control circuit 62 to be connected to the first electrode of the light emitting element E1 under the control of the potential of the switch control terminal N4;

The compensation control circuit 32 is electrically connected to the scanning terminal G1, the control terminal of the driving circuit 11 and the second terminal of the driving circuit 11 respectively, and is configured to control the control terminal of the driving circuit 11 to communicate with the second terminal of the driving circuit 11 under the control of the scanning signal provided by the scanning terminal G1;

The first electrode of the light emitting element E1 is a first electrode of the light emitting element E1.

Optionally, the light emitting element may be a light emitting diode, and the first electrode of the light emitting element may be an anode.

When the pixel circuit shown in FIG. 63 of the present disclosure is in operation, a display cycle may include a first display phase and a second display phase that are arranged in sequence;

The first display phase includes a first reset time period, a first writing-in time period and a first light emitting time period which are set in sequence, and the second display phase includes a second reset time period, a second writing-in time period and a second light emitting time period which are set in sequence;

In the first reset time period, the first reset circuit 14 writes the first initial voltage into the first electrode of the light emitting element E1 under the control of the first reset control signal; the second reset circuit 51 writes the second initial voltage Vi2 into the first node N1 under the control of the second reset control signal;

In the first writing-in time period, the second writing-in sub-circuit 152 writes the display data voltage provided by the second data line DI into the first terminal of the driving circuit 11 under the control of the scanning signal; the initialization circuit 50 writes the third initial voltage Vi3 into the switch control terminal N4 under the control of the second control signal to control the switch control circuit 12 to be turned on under the control of the potential of the switch control terminal N4; the compensation control circuit 32 controls the control terminal of the driving circuit 11 to be connected to the second terminal of the driving circuit 11 under the control of the scanning signal;

In the first light emitting time period, the first light emitting control circuit 61 is configured to control the first voltage terminal V1 to be connected to the first terminal of the driving circuit 11 under the control of the light emitting control signal; the second light emitting control circuit 62 is configured to control the second terminal of the driving circuit 11 to be connected to the first terminal of the switch control circuit 12 under the control of the light emitting control signal; the driving circuit 11 drives the light emitting element E1 to emit light;

In the second reset time period, the first reset circuit 14 writes the first initial voltage into the first electrode of the light emitting element E1 under the control of the first reset control signal;

In the second writing-in time period, the first writing-in sub-circuit 151 writes the light emitting time control data voltage provided by the first data line DT into the switch control terminal N4 under the control of the first control signal;

In the second light emitting time period, the first light emitting control circuit 61 controls the first voltage terminal V1 to be connected to the first terminal of the driving circuit 11 under the control of the light emitting control signal; the second light emitting control circuit 62 controls the second terminal of the driving circuit 11 to be connected to the first terminal of the switch control circuit 12 under the control of the light emitting control signal; the driving circuit 11 controls whether the light emitting element E1 emits light according to the light emitting time control data voltage.

When the pixel circuit described in at least one embodiment of the present disclosure is in operation, in a first reset time period and a second reset time period, the first reset circuit writes a first initial voltage into the first electrode of the light emitting element under the control of a first reset control signal, so as to release the residual charge in the first electrode of the light emitting element at a high frequency, thereby improving display uniformity.

The pixel circuit described in at least one embodiment of the present disclosure further includes a first light emitting control circuit, a second light emitting control circuit and a compensation control circuit;

The first electrode of the light emitting element is electrically connected to the first voltage terminal;

The control terminal of the switch control circuit 12 is electrically connected to the switch control terminal N4; the first terminal of the switch control circuit is electrically connected to the second electrode of the light emitting element, and the second terminal of the switch control circuit is electrically connected to the first light emitting control circuit; the switch control circuit is configured to control the second electrode of the light emitting element to be connected to the first light emitting control circuit under the control of the potential of the switch control terminal;

The first light emitting control circuit is electrically connected to the light emitting control terminal, the second terminal of the switch control circuit and the first terminal of the driving circuit respectively, and is configured to control the second terminal of the switch control circuit to be connected to the first terminal of the driving circuit under the control of the light emitting control signal provided by the light emitting control terminal;

The second light emitting control circuit is electrically connected to the light emitting control terminal, the second terminal of the driving circuit and the second voltage terminal respectively, and is configured to control the second terminal of the driving circuit to be connected to the second voltage terminal under the control of the light emitting control signal;

The compensation control circuit is electrically connected to the scanning terminal, the control terminal of the driving circuit and the first terminal of the driving circuit respectively, and is configured to control the communication between the control terminal of the driving circuit and the first terminal of the driving circuit under the control of the scanning signal provided by the scanning terminal;

The first electrode of the light emitting element E1 is the second electrode of the light emitting element E1.

Optionally, the light emitting element may be a light emitting diode, and the second electrode of the light emitting element may be a cathode.

In a specific implementation, the pixel circuit may also include a first light emitting control circuit, a second light emitting control circuit and a compensation control circuit; the switch control circuit controls the second electrode of the light emitting element to be connected to the first light emitting control circuit under the control of the potential of the switch control terminal; the first light emitting control circuit controls the second terminal of the switch control circuit to be connected to the first terminal of the driving circuit under the control of a light emitting control signal;

the second light emitting control circuit controls the second terminal of the driving circuit to be connected to the second voltage terminal under the control of the light emitting control signal; and the compensation control circuit controls the control terminal of the driving circuit to be connected to the first terminal of the driving circuit under the control of the scanning signal.

Figure 64:
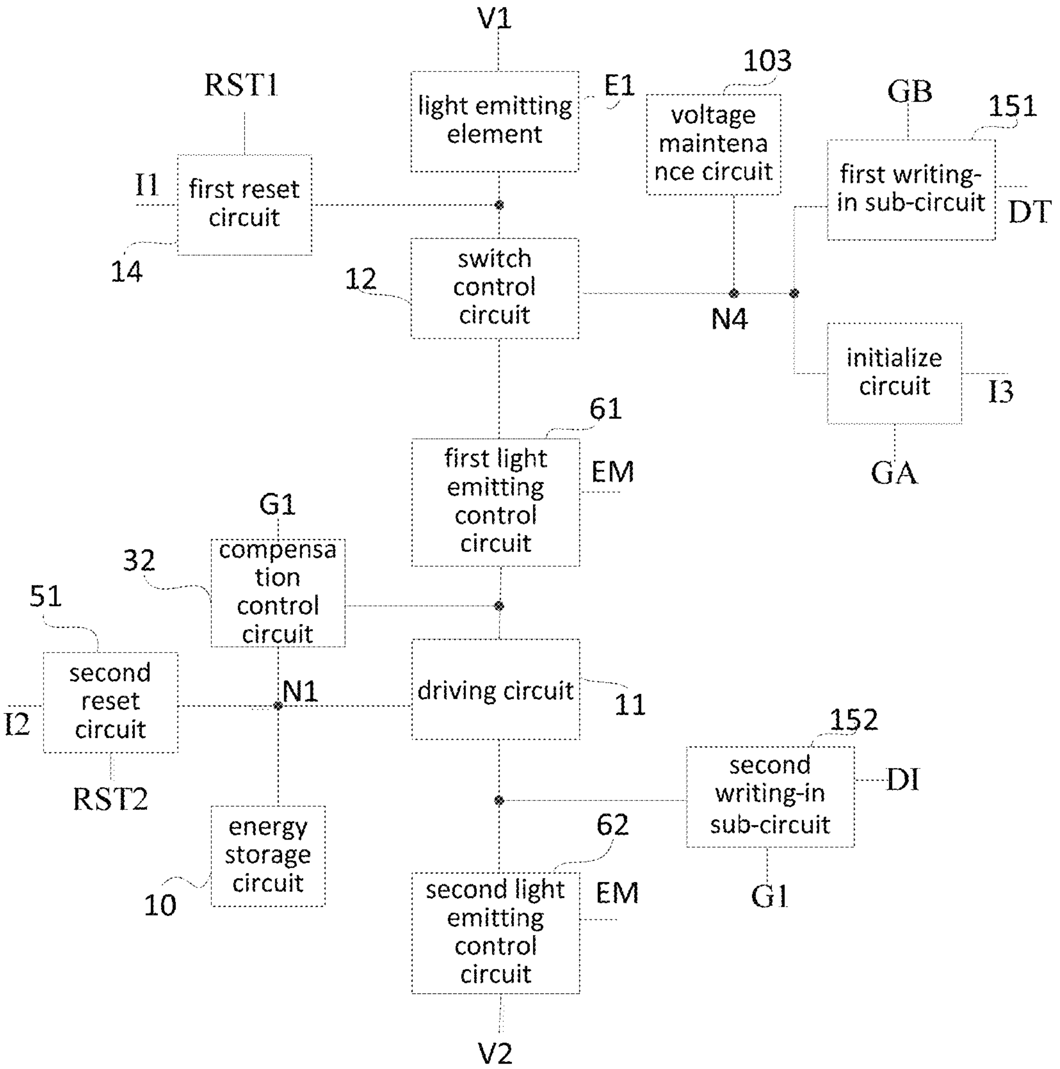
FIG. 64 is a structural diagram of a pixel circuit according to at least one embodiment of the present disclosure.

As shown in FIG. 64, the pixel circuit according to at least one embodiment of the present disclosure includes a light emitting element E1, a storage circuit 10, a driving circuit 11, a switch control circuit 12, a first reset circuit 14, a data writing-in circuit, a second reset circuit 51, an initialization circuit 50, a voltage maintenance circuit 103, a first light emitting control circuit 61, a second light emitting control circuit 62, and a compensation control circuit 32;

The first reset circuit 14 is electrically connected to the first reset control terminal RST1, the first initial voltage terminal I1 and the second electrode of the light emitting element E1 respectively, and is configured to write the first initial voltage provided by the first initial voltage terminal I1 into the second electrode of the light emitting element E1 under the control of the first reset control signal provided by the first reset control terminal RST1 during a reset time period between the time period for writing-in the display data voltage and the time period for writing-in the light emitting time control data voltage;

The data writing-in circuit includes a first writing-in sub-circuit 151 and a second writing-in sub-circuit 152; the writing-in control terminal includes a scanning terminal G1 and a first control terminal GB;

The first writing-in sub-circuit 151 is electrically connected to the first control terminal GB, the first data line DT and the switch control terminal N4 respectively, and is configured to write the light emitting time control data voltage provided by the first data line DT into the switch control terminal N4 under the control of the first control signal provided by the first control terminal GB;

The second writing-in sub-circuit 152 is electrically connected to the scanning terminal G1, the second data line DI and the second terminal of the driving circuit 11 respectively, and is configured to write the display data voltage provided by the second data line DI into the second terminal of the driving circuit 11 under the control of the scanning signal provided by the scanning terminal G1;

The second reset circuit 51 is electrically connected to the second reset control terminal RST2, the second initial voltage terminal I2 and the first node N1 respectively, and is configured to write the second initial voltage Vi2 provided by the second initial voltage terminal I2 into the first node N1 under the control of the second reset control signal provided by the second reset control terminal RST2;

The initialization circuit 50 is electrically connected to the second control terminal GA, the third initial voltage terminal I3 and the switch control terminal N4 respectively, and is configured to write the third initial voltage Vi3 provided by the third initial voltage terminal I3 into the switch control terminal N4 under the control of the second control signal provided by the second control terminal GA;

The voltage maintenance circuit 103 is electrically connected to the switch control terminal N4, and is configured to maintain the potential of the switch control terminal N4;

The first electrode of the light emitting element E1 is electrically connected to the first voltage terminal V1;

The control terminal of the switch control circuit 12 is electrically connected to the switch control terminal N4; the first terminal of the switch control circuit 12 is electrically connected to the second electrode of the light emitting element E1, and the second terminal of the switch control circuit 12 is electrically connected to the first light emitting control circuit 61; the switch control circuit 12 is configured to control the second electrode of the light emitting element E1 to be connected to the first light emitting control circuit 61 under the control of the potential of the switch control terminal N4;

The first light emitting control circuit 61 is electrically connected to the light emitting control terminal EM, the second terminal of the switch control circuit 12 and the first terminal of the driving circuit 11 respectively, and is configured to control the second terminal of the switch control circuit 12 to be connected to the first terminal of the driving circuit 11 under the control of the light emitting control signal provided by the light emitting control terminal EM;

The second light emitting control circuit 62 is electrically connected to the light emitting control terminal EM, the second terminal of the driving circuit 11 and the second voltage terminal V2 respectively, and is configured to control the second terminal of the driving circuit 11 to be connected to the second voltage terminal V2 under the control of the light emitting control signal;

The compensation control circuit 32 is electrically connected to the scanning terminal G1, the control terminal of the driving circuit 11 and the first terminal of the driving circuit 11 respectively, and is configured to control the connection between the control terminal of the driving circuit 11 and the first terminal of the driving circuit 11 under the control of the scanning signal provided by the scanning terminal G1.

When the pixel circuit shown in FIG. 64 of the present disclosure is in operation, a display cycle may include a first display phase and a second display phase that are arranged in sequence;

The first display phase includes a first reset time period, a first writing-in time period and a first light emitting time period which are set in sequence, and the second display phase includes a second reset time period, a second writing-in time period and a second light emitting time period which are set in sequence;

In the first reset time period, the first reset circuit 14 writes the first initial voltage into the second electrode of the light emitting element E1 under the control of the first reset control signal; the second reset circuit 51 writes the second initial voltage Vi2 into the first node N1 under the control of the second reset control signal;

In the first writing-in time period, the second writing-in sub-circuit 152 writes the display data voltage provided by the second data line DI into the second terminal of the driving circuit 11 under the control of the scanning signal; the initialization circuit 50 writes the third initial voltage Vi3 into the switch control terminal N4 under the control of the second control signal, to control the switch control circuit 12 to be turned on under the control of the potential of the switch control terminal N4; the compensation control circuit 32 controls the control terminal of the driving circuit 11 to be connected to the first terminal of the driving circuit 11 under the control of the scanning signal;

In the first light emitting time period, the first light emitting control circuit 61 controls the second terminal of the switch control circuit 12 to be connected to the first terminal of the driving circuit 11 under the control of the light emitting control signal provided by the light emitting control terminal EM; the second light emitting control circuit 62 controls the second terminal of the driving circuit 11 to be connected to the second voltage terminal V2 under the control of the light emitting control signal; the driving circuit 11 drives the light emitting element E1 to emit light;

In the second reset time period, the first reset circuit 14 writes the first initial voltage into the second electrode of the light emitting element E1 under the control of the first reset control signal;

In the second writing-in time period, the first writing-in sub-circuit 151 writes the light emitting time control data voltage provided by the first data line DT into the switch control terminal N4 under the control of the first control signal;

In the second light emitting time period, the first light emitting control circuit 61 controls the second terminal of the switch control circuit 12 to be connected to the first terminal of the driving circuit 11 under the control of the light emitting control signal provided by the light emitting control terminal EM; the second light emitting control circuit 62 controls the second terminal of the driving circuit 11 to be connected with the second voltage terminal V2 under the control of the light emitting control signal; the driving circuit 11 controls whether the light emitting element E1 emits light according to the light emitting time control data voltage.

When the pixel circuit described in at least one embodiment of the present disclosure is in operation, in a first reset time period and a second reset time period, the first reset circuit writes a first initial voltage into the second electrode of the light emitting element under the control of a first reset control signal, so as to release the residual charge of the first electrode of the light emitting element at a high frequency, thereby improving display uniformity.

Optionally, the first reset circuit includes a first transistor, and the second reset transistor includes a second transistor;

a gate electrode of the first transistor is electrically connected to the first reset control terminal, a first electrode of the first transistor is electrically connected to the first initial voltage terminal, and a second electrode of the first transistor is electrically connected to the first electrode of the light emitting element;

A gate electrode of the second transistor is electrically connected to the second reset control terminal, a first electrode of the second transistor is electrically connected to the second initial voltage terminal, and a second electrode of the second transistor is electrically connected to the first node.

Optionally, the data writing-in circuit includes a third transistor and a fourth transistor;

a gate electrode of the third transistor is electrically connected to the first control terminal, a first electrode of the third transistor is electrically connected to the first data line, and a second electrode of the third transistor is electrically connected to the writing-in node;

A gate electrode of the fourth transistor is electrically connected to the second control terminal, a first electrode of the fourth transistor is electrically connected to the second data line, and a second electrode of the fourth transistor is electrically connected to the writing-in node.

Optionally, the driving circuit includes a driving transistor, the first light emitting control circuit includes a fifth transistor, the second light emitting control circuit includes a sixth transistor, and the compensation control circuit includes a seventh transistor;

a gate electrode of the fifth transistor is electrically connected to the light emitting control terminal, a first electrode of the fifth transistor is electrically connected to the first voltage terminal, and a second electrode of the fifth transistor is electrically connected to the first electrode of the driving transistor;

a gate electrode of the sixth transistor is electrically connected to the light emitting control terminal, a first electrode of the sixth transistor is electrically connected to a second electrode of the driving transistor, and a second electrode of the sixth transistor is electrically connected to the first electrode of the light emitting element;

a gate electrode of the driving transistor is electrically connected to the first node;

A gate electrode of the seventh transistor is electrically connected to the scanning terminal, a first electrode of the seventh transistor is electrically connected to the first node, and a second electrode of the seventh transistor is electrically connected to a second electrode of the driving transistor.

Optionally, the driving circuit includes a driving transistor, the first light emitting control circuit includes a fifth transistor, the second light emitting control circuit includes a sixth transistor, and the compensation control circuit includes a seventh transistor;

a gate electrode of the fifth transistor is electrically connected to the light emitting control terminal, a first electrode of the fifth transistor is electrically connected to the second electrode of the light emitting element, and a second electrode of the fifth transistor is electrically connected to the first electrode of the driving transistor;

a gate electrode of the sixth transistor is electrically connected to the light emitting control terminal, a first electrode of the sixth transistor is electrically connected to the second electrode of the driving transistor, and a second electrode of the sixth transistor is electrically connected to the second voltage terminal;

a gate electrode of the driving transistor is electrically connected to the first node;

A gate electrode of the seventh transistor is electrically connected to the scanning terminal, a first electrode of the seventh transistor is electrically connected to the first node, and a second electrode of the seventh transistor is electrically connected to a first electrode of the driving transistor.

Optionally, the first writing-in sub-circuit includes a third transistor, and the second writing-in sub-circuit includes a fourth transistor;

a gate electrode of the third transistor is electrically connected to the first control terminal, a first electrode of the third transistor is electrically connected to the first data line, and a second electrode of the third transistor is electrically connected to the second writing-in node;

A gate electrode of the fourth transistor is electrically connected to the scanning terminal, a first electrode of the fourth transistor is electrically connected to the second data line, and a second electrode of the fourth transistor is electrically connected to the first writing-in node.

Optionally, the initialization circuit includes an eighth transistor;

A gate electrode of the eighth transistor is electrically connected to the second control terminal, a first electrode of the eighth transistor is electrically connected to the third initial voltage terminal, and a second electrode of the eighth transistor is electrically connected to the second writing-in node.

Optionally, the switch control circuit includes a ninth transistor; the driving circuit includes a driving transistor, the first light emitting control circuit includes a fifth transistor, the second light emitting control circuit includes a sixth transistor, and the compensation control circuit includes a seventh transistor;

a gate electrode of the fifth transistor is electrically connected to the light emitting control terminal, a first electrode of the fifth transistor is electrically connected to the first voltage terminal, and a second electrode of the fifth transistor is electrically connected to the first electrode of the driving transistor;

a gate electrode of the sixth transistor is electrically connected to the light emitting control terminal, and a first electrode of the sixth transistor is electrically connected to the second electrode of the driving transistor;

a gate electrode of the ninth transistor is electrically connected to the switch control terminal, a first electrode of the ninth transistor is electrically connected to the second electrode of the sixth transistor, and a second electrode of the ninth transistor is electrically connected to the first electrode of the light emitting element;

a gate electrode of the driving transistor is electrically connected to the first node;

A gate electrode of the seventh transistor is electrically connected to the scanning terminal, a first electrode of the seventh transistor is electrically connected to the first node, and a second electrode of the seventh transistor is electrically connected to a second electrode of the driving transistor.

Optionally, the switch control circuit includes a ninth transistor; the driving circuit includes a driving transistor, the first light emitting control circuit includes a fifth transistor, the second light emitting control circuit includes a sixth transistor, and the compensation control circuit includes a seventh transistor;

a gate electrode of the ninth transistor is electrically connected to the switch control terminal, a first electrode of the ninth transistor is electrically connected to the second electrode of the light emitting element, and a second electrode of the ninth transistor is electrically connected to the first electrode of the fifth transistor;

a gate electrode of the fifth transistor is electrically connected to the light emitting control terminal, and a second electrode of the fifth transistor is electrically connected to the first electrode of the driving transistor;

a gate electrode of the driving transistor is electrically connected to the first node, and a second electrode of the driving transistor is electrically connected to a first electrode of the sixth transistor;

a gate electrode of the sixth transistor is electrically connected to the light emitting control terminal, and a second electrode of the sixth transistor is electrically connected to the second voltage terminal;

A gate electrode of the seventh transistor is electrically connected to the scanning terminal, a first electrode of the seventh transistor is electrically connected to the first node, and a second electrode of the seventh transistor is electrically connected to a first electrode of the driving transistor.

Figure 65:
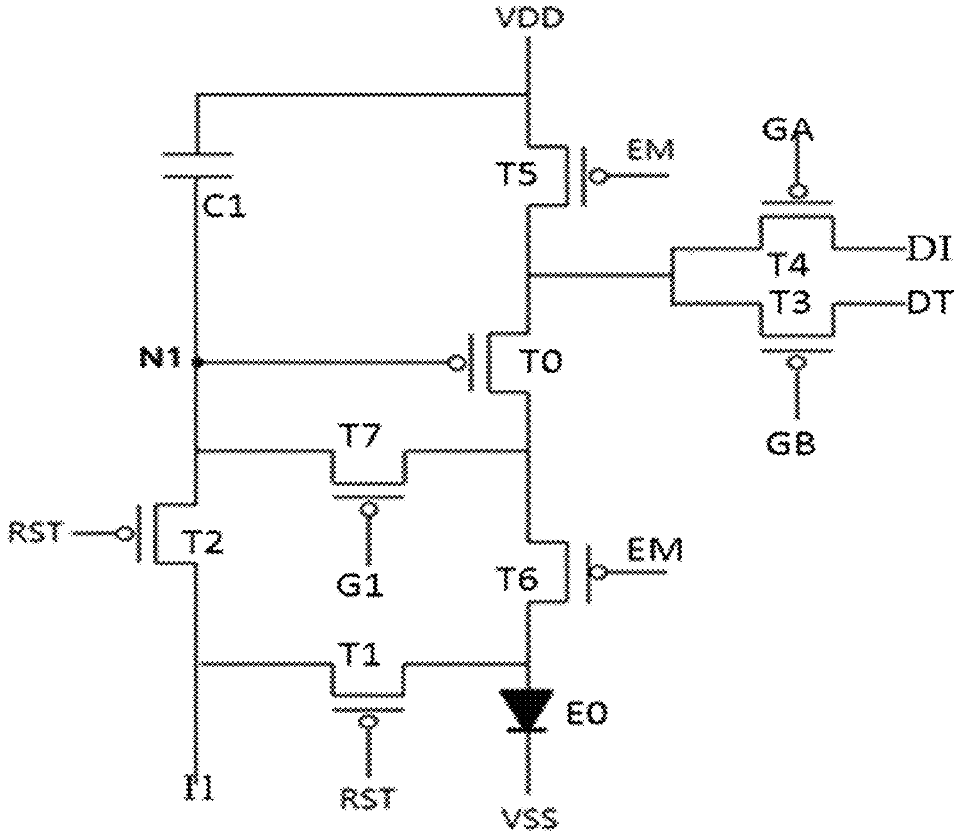
FIG. 65 is a circuit diagram of a pixel circuit according to at least one embodiment of the present disclosure.

As shown in FIG. 65, based on the pixel circuit shown in FIG. 59, the light emitting element is a light emitting diode E0; the driving circuit includes a driving transistor T0; the energy storage circuit includes a first capacitor C1;

A first terminal of the first capacitor C1 is electrically connected to the first node N1, and a second terminal of the first capacitor C1 is electrically connected to the high voltage terminal VDD;

The first reset circuit includes a first transistor T1, and the second reset transistor includes a second transistor T2;

The gate electrode of the first transistor T1 is electrically connected to the reset control terminal RST, the source electrode of the first transistor T1 is electrically connected to the first initial voltage terminal I1, the drain electrode of the first transistor T1 is electrically connected to the anode of the light emitting diode E0; the cathode of the light emitting diode E0 is electrically connected to the low voltage terminal VSS; the first initial voltage terminal I1 is configured to provide a first initial voltage Vi1;

The gate electrode of the second transistor T2 is electrically connected to the reset control terminal RST, the source electrode of the second transistor T2 is electrically connected to the first initial voltage terminal I1, and the drain electrode of the second transistor T2 is electrically connected to the first node N1;

The data writing-in circuit includes a third transistor T3 and a fourth transistor T4;

The gate electrode of the third transistor T3 is electrically connected to the first control terminal GB, the source electrode of the third transistor T3 is electrically connected to the first data line DT, and the drain electrode of the third transistor T3 is electrically connected to the source electrode of the driving transistor T0;

The gate electrode of the fourth transistor T4 is electrically connected to the second control terminal GA, the source electrode of the fourth transistor T4 is electrically connected to the second data line DI, and the drain electrode of the fourth transistor T4 is electrically connected to the source electrode of the driving transistor T0;

The first light emitting control circuit includes a fifth transistor T5, the second light emitting control circuit includes a sixth transistor T6, and the compensation control circuit includes a seventh transistor T7;

The gate electrode of the fifth transistor T5 is electrically connected to the light emitting control terminal EM, the source electrode of the fifth transistor T5 is electrically connected to the high voltage terminal VDD, and the drain electrode of the fifth transistor T5 is electrically connected to the source electrode of the driving transistor T0;

The gate electrode of the sixth transistor T6 is electrically connected to the light emitting control terminal EM, the source electrode of the sixth transistor T6 is electrically connected to the drain electrode of the driving transistor T0, the drain electrode of the sixth transistor T6 is electrically connected to the anode of the light emitting diode E0; the cathode of the light emitting diode E0 is electrically connected to the low voltage terminal VSS;

The gate electrode of the driving transistor T0 is electrically connected to the first node N1;

A gate electrode of the seventh transistor T7 is electrically connected to the scanning terminal G1, a source electrode of the seventh transistor T7 is electrically connected to the first node N1, and a drain electrode of the seventh transistor T7 is electrically connected to the drain electrode of the driving transistor T0.

In the pixel circuit shown in FIG. 65, all transistors are PMOS (P-type metal-oxide-semiconductor) TFTs (thin film transistors).

In at least one embodiment of the present disclosure, the light emitting diode may be a Micro LED, a Mini LED or an OLED (organic light emitting diode), but is not limited thereto.

Figure 66:
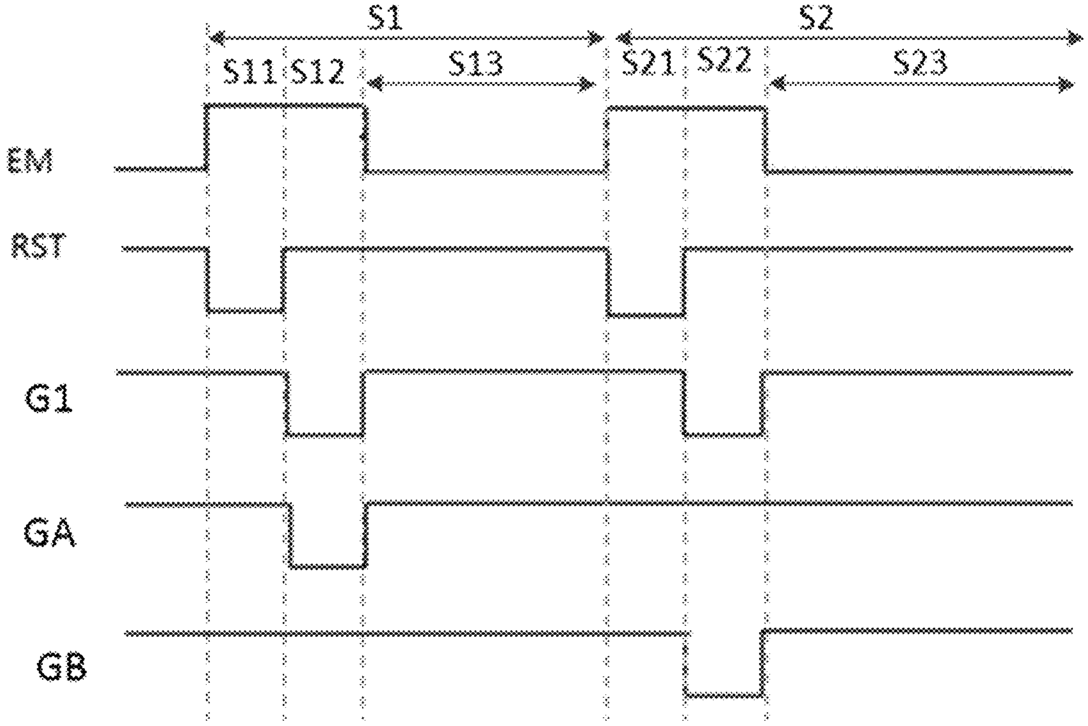
FIG. 66 is a timing diagram of the pixel circuit shown in FIG. 65.
Figure 67A:
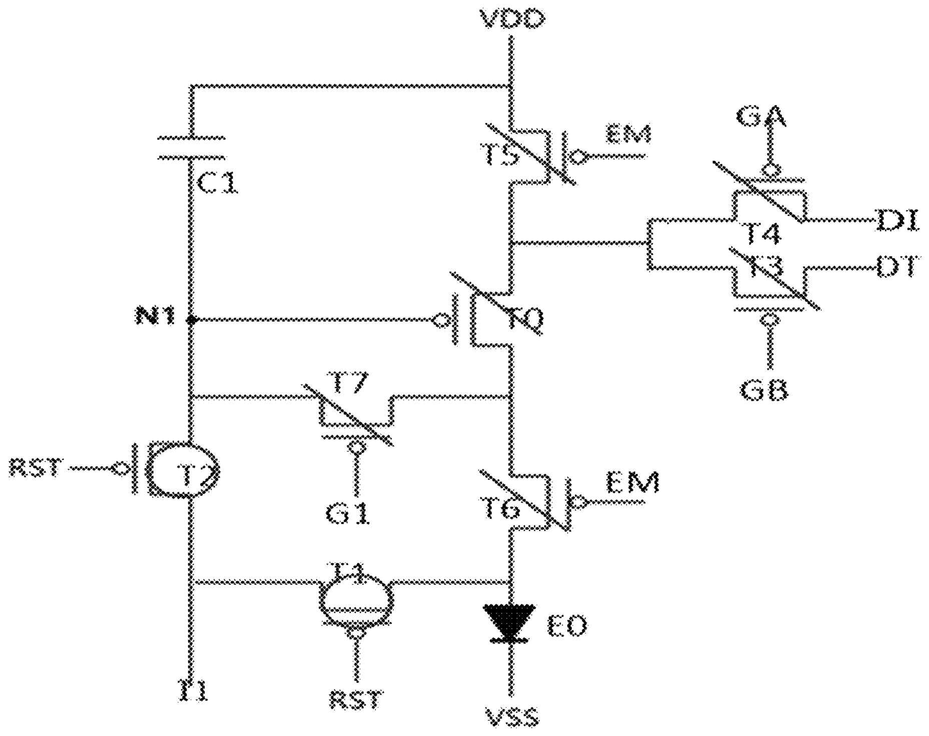
FIG. 67A is a schematic diagram showing the working state of the pixel circuit shown in FIG. 65 in a first reset time period.
Figure 67B:
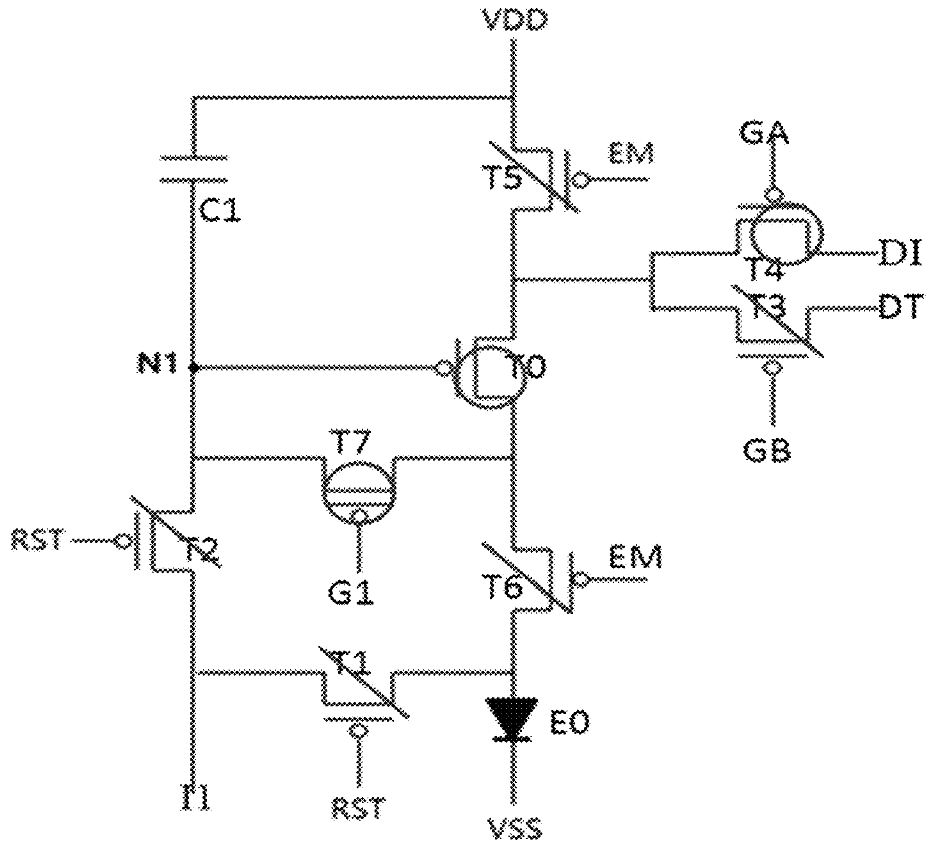
FIG. 67B is a schematic diagram showing the working state of the pixel circuit shown in FIG. 65 during a first writing-in time period.
Figure 67C:
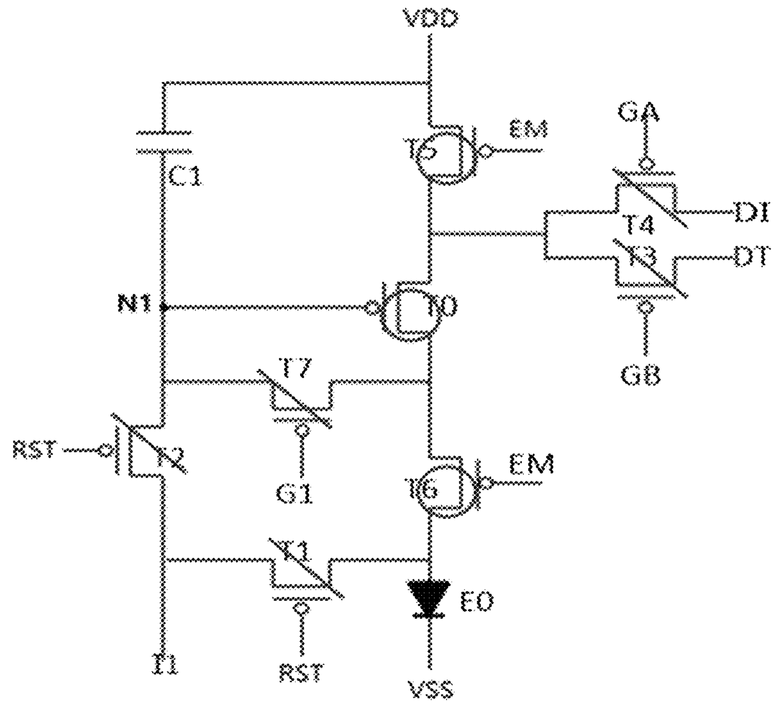
FIG. 67C is a schematic diagram showing the working state of the pixel circuit shown in FIG. 65 in the first light emitting time period.
Figure 67D:
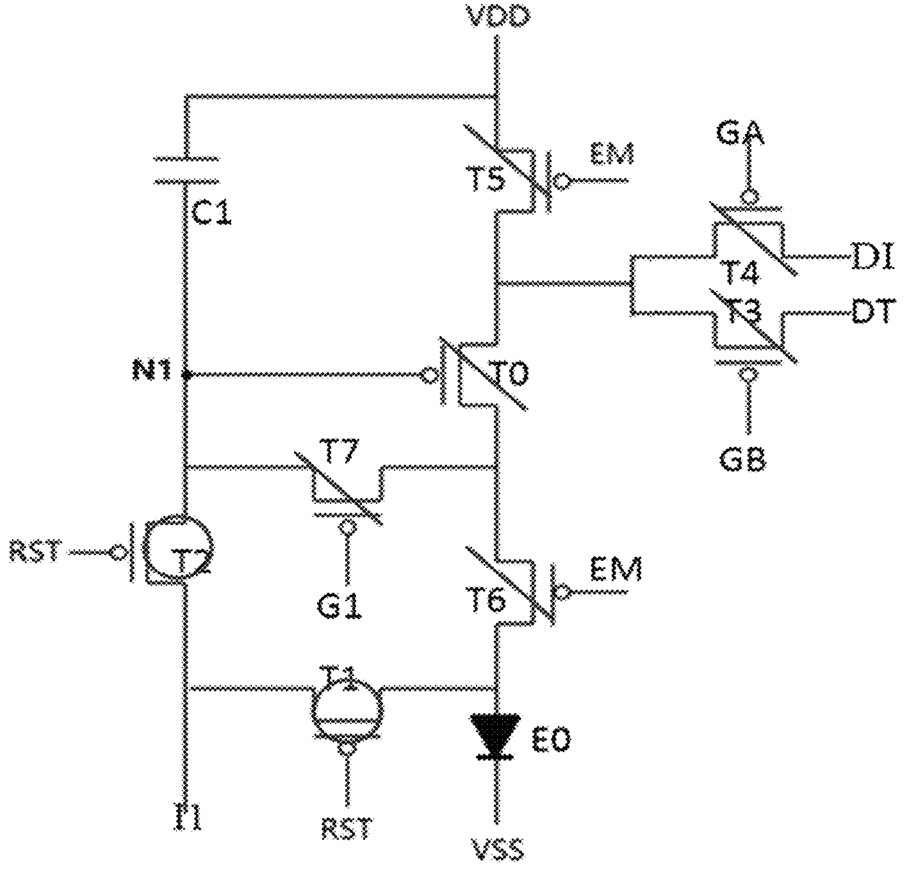
FIG. 67D is a schematic diagram showing the working state of the pixel circuit shown in FIG. 65 in a second reset time period.
Figure 67E:
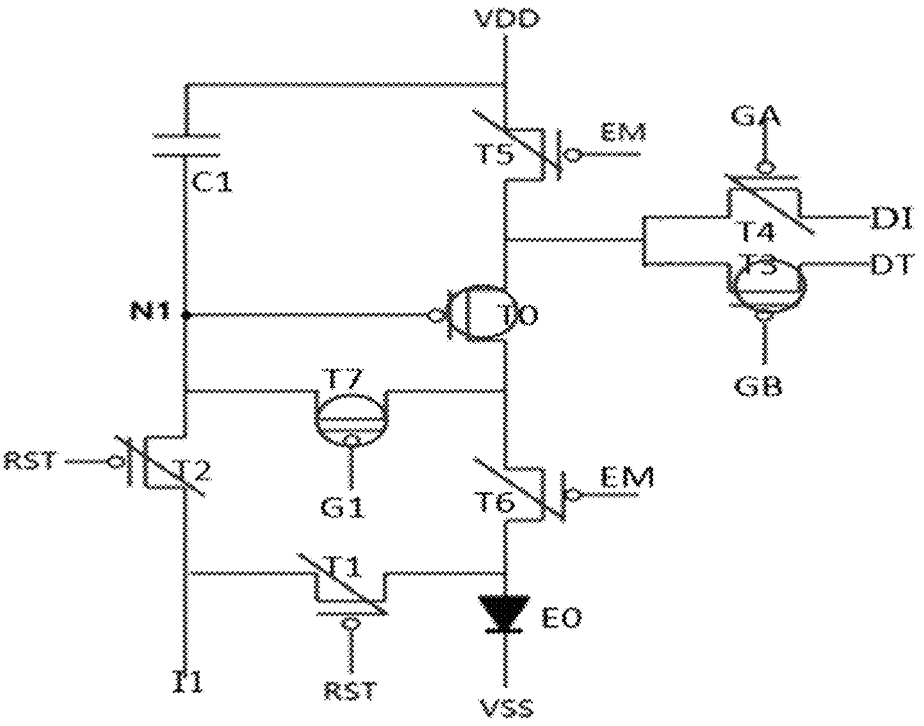
FIG. 67E is a schematic diagram showing the working state of the pixel circuit shown in FIG. 65 during a second writing-in time period.
Figure 67F:
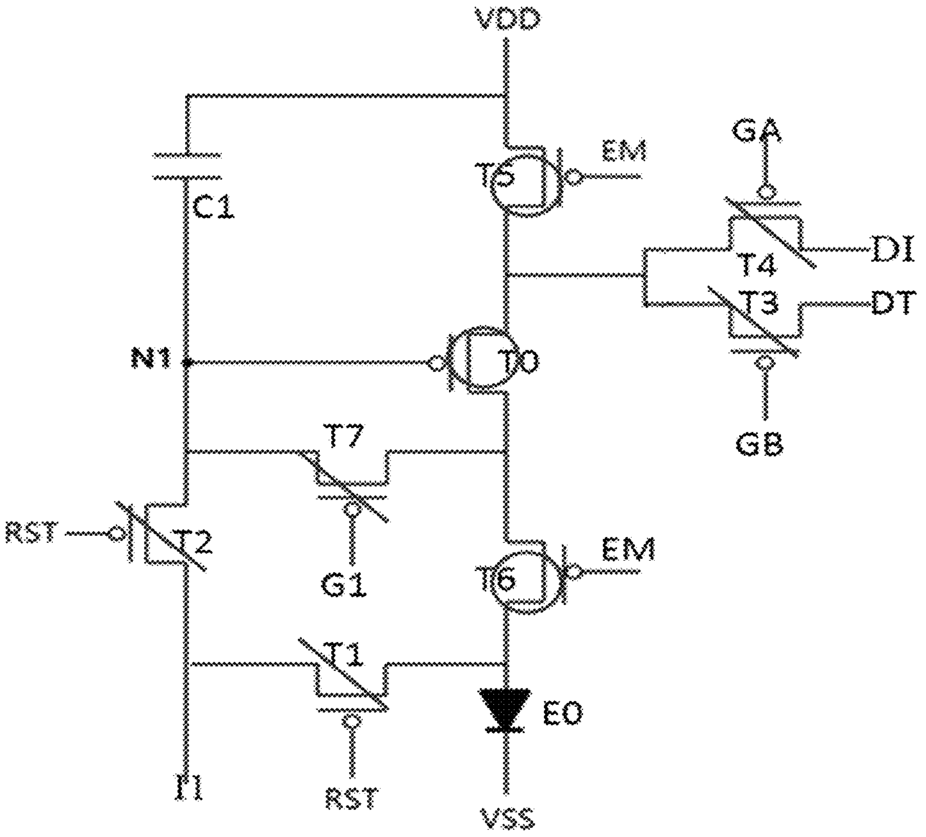
FIG. 67F is a schematic diagram showing the working state of the pixel circuit shown in FIG. 65 in the second light emitting time period.

As shown in FIG. 66, when the pixel circuit shown in FIG. 65 of the present disclosure is in operation, the display cycle includes a first display phase S1 and a second display phase S2; the first display phase S1 includes a first reset time period S11, a first writing-in time period S12 and a first light emitting time period S13 that are successively set; the second display phase S2 includes a second reset time period S21, a second writing-in time period S22 and a second light emitting time period S23 that are successively set;

In the first reset time period S11, RST provides a low voltage signal, as shown in 67A, T2 and T1 are turned on, and the gate electrode of T0 and the anode of E0 are reset through Vi1, the residual charge of the anode of E0 is cleared, and T0 can be turned on at the beginning of the first writing-in time period S12;

In the first writing-in time period S12, GA provides a low voltage signal, as shown in FIG. 67B, T4 is turned on, DI provides a display data voltage Vdata_I to the gate electrode of T0, and T7 is turned on;

At the beginning of the first writing-in time period S12, T0 is turned on to charge C1 to change the potential of N1 until the potential of N1 becomes Vdata_I+Vth, and T0 is turned off; Vth is the threshold voltage of T0;

In the first light emitting time period S13, EM outputs a low voltage signal, as shown in FIG. 67C, T5 and T6 are turned on, and T0 drives E0 to emit light;

In the second reset time period S21, after the first time t1, RST outputs a low voltage signal, as shown in FIG. 67D, T1 and T2 are turned on, the gate electrode of T0 and the anode of E0 are reset, and the residual charge of the anode of E0 is cleared, so that before the light emitting time control data voltage Vdata_T is written, the potential of the gate electrode of T0 and the anode voltage of E0 are consistent with those before the display data voltage is written, and the charging time and voltage jump difference are reduced, so that when Vdata_T and Vdata_I have the same voltage value, the driving current difference between the first light emitting time period and the second light emitting time period is reduced, and the brightness difference between the first light emitting time period and the second light emitting time period in the same frame is reduced; wherein, the first time t1 is the duration of the first light emitting time period S21;

In the second writing-in time period S22, GB provides a low voltage signal, as shown in FIG. 67E, T3 is turned on, EM outputs a high voltage signal, T5 and T6 are turned off; G1 provides a low voltage signal, T7 is turned on; DT writes the light emitting time control data voltage Vdata_T to the source electrode of T0;

At the beginning of the second writing-in time period S22, T0 is turned on, charging C1, changing the potential of N1 until the potential of N1 becomes Vdata_T+Vth, and T0 is turned off;

In the second light emitting time period S23, the EM outputs a low voltage signal, as shown in FIG. 67F, and T5 and T6 are turned on;

When Vdata_T is a high voltage signal and the gate-source voltage of T0 is greater than Vth, T0 is turned off, E0 does not emit light, and a short-time light emitting is realized, and the light emitting time is t1, so as to perform low grayscale display;

When Vdata_T is equal to Vdata_I, Vdata_I+Vth is written to the gate electrode of T0 again, as shown in FIG. 67F, T0 is turned on, and T0 drives E0 to emit light, achieving long-time light emitting for high grayscale display; the light emitting duration is t1+t2, t2 is the second time, and t2 is the duration of the second light emitting time period S23.

When the pixel circuit shown in FIG. 65 is in operation, in the first light emitting time period, the driving current Id generated by T0 is $K(Vdata\_I-Vdd+\Delta Vth)^2$; wherein K is the current coefficient of T0, ΔVth is the difference between the threshold voltage Vth of T0 during threshold voltage compensation and during light emitting, Id is greater than or equal to 0 and less than or equal to Imax, and Imax is the driving current corresponding to the highest grayscale; and Vdd is the voltage value of the high voltage signal provided by VDD.

When the pixel circuit shown in FIG. 65 is in operation,

When high grayscale display is performed, Vdata_T is equal to Vdata_I;

When low gray scale display is performed, Vdata_T may be greater than Vdd to ensure that T0 is turned off during the second light emitting time period.

In the pixel circuit shown in FIG. 65, Vi1−Vdata_I−min is less than Vth, and Vi1−Vss is less than Vled, so as to ensure that after Vi1 is written into N1, T0 can be turned on normally at the beginning of the first writing-in time period to write the display data voltage and compensate the threshold voltage. At the same time, when the anode potential of E0 is reset by Vi1, E0 does not emit light.

Wherein, Vdata_I−min is the minimum voltage value of the display data voltage, Vss is the voltage value of the low voltage signal provided by VSS, and Vled is the light emitting voltage of E0.

Figure 68A:
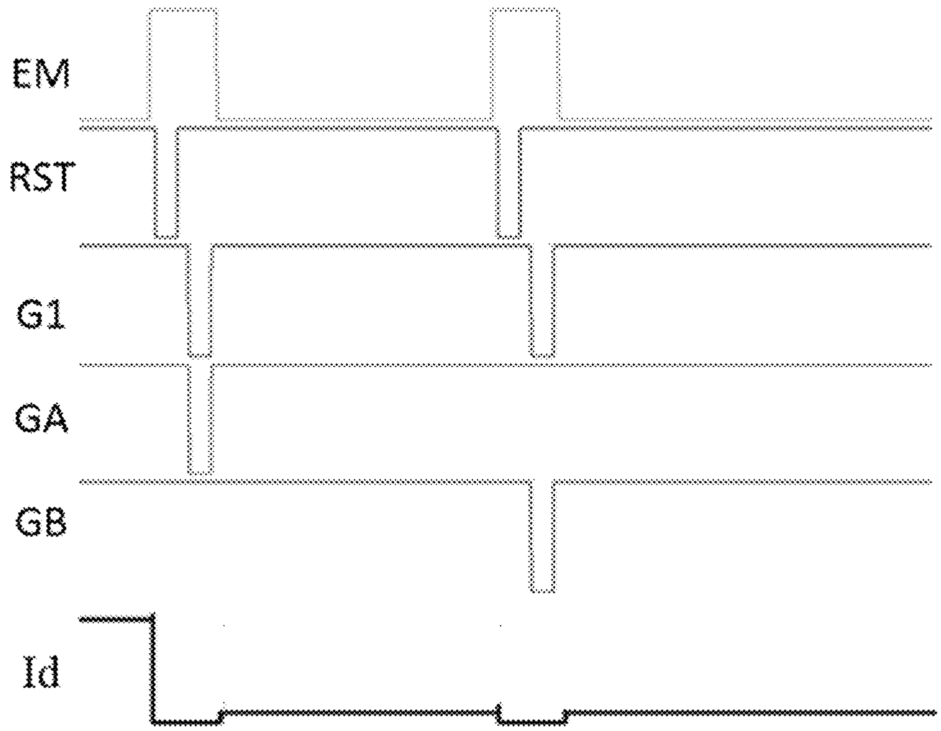
FIG. 68A is a schematic diagram showing simulation results of a the pixel circuit shown in FIG. 66 when performing high grayscale display.
Figure 68B:
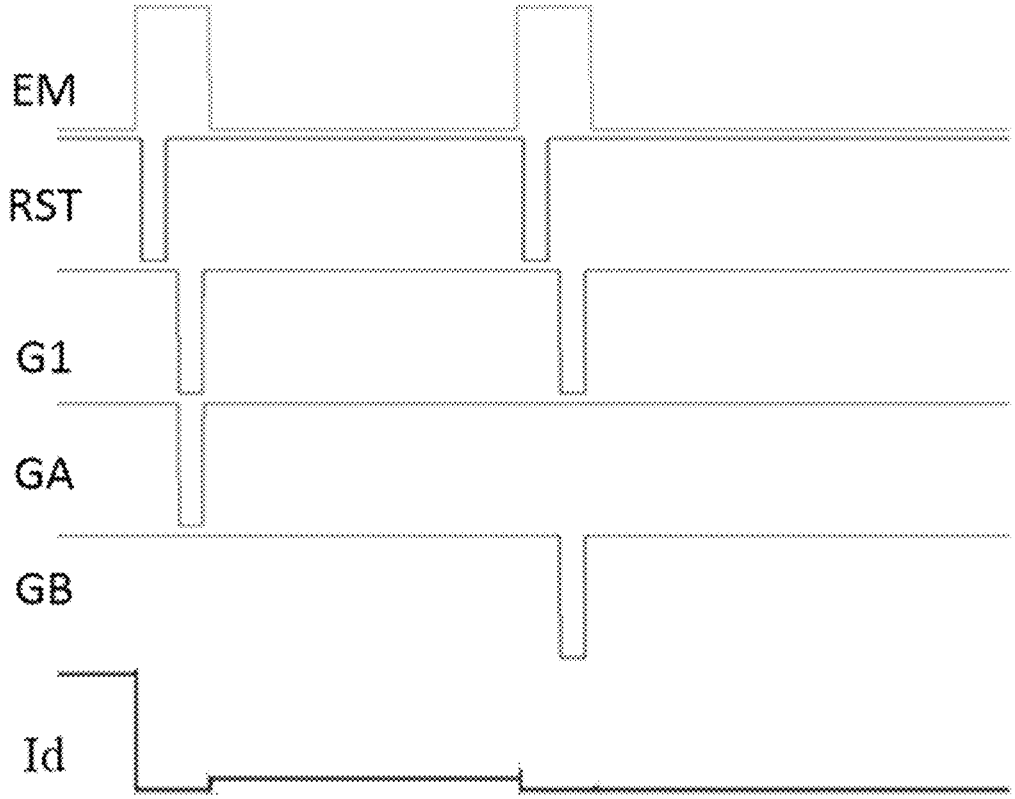
FIG. 68B is a schematic diagram showing simulation results of the pixel circuit shown in FIG. 66 when performing low grayscale display.

FIG. 68A is a schematic diagram showing simulation results of the pixel circuit shown in FIG. 66 when performing high grayscale display;

FIG. 68B is a schematic diagram of simulation results of the pixel circuit shown in FIG. 66 when performing low grayscale display.

In FIG. 68A and FIG. 68B, Id is the driving current generated at T0.

In at least one embodiment corresponding to FIG. 68A, Vdd is equal to 4.6V, Vss is equal to −3V, Vi1 is equal to −3V, Vdata_I is equal to 2V, and Vdata_T is equal to 2V;

In at least one embodiment corresponding to FIG. 68B, Vdd is equal to 4.6V, Vss is equal to −3V, Vi1 is equal to −3V, Vdata_I is equal to 2V, and Vdata_T is equal to 6V.

Figure 69:
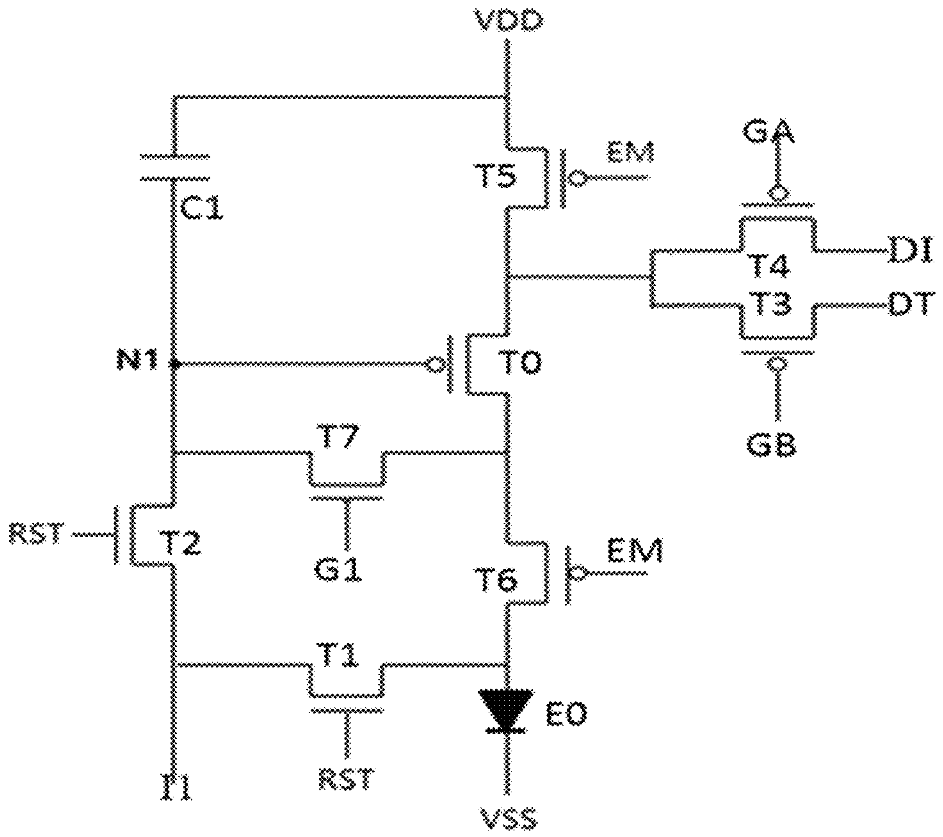
FIG. 69 is a circuit diagram of a pixel circuit according to at least one embodiment of the present disclosure.

The difference between the pixel circuit shown in FIG. 69 and the pixel circuit shown in FIG. 66 is that T7, T2, and T1 are NMOS (N-type metal-oxide-semiconductor) TFTs.

The pixel circuit shown in FIG. 69 of the present disclosure adopts LTPO (low-temperature polycrystalline oxide) technology, and utilizes the advantage of low leakage current of oxide TFT to reduce the gate leakage of T0 and the anode leakage of E0, that is, T7, T2 and T1 or part of them are changed from PMOS TFT to NMOS TFT; utilizing the advantage of high mobility of PMOS TFT, T4, T0, T5, T6 and T3 are PMOS TFTs, which meets the threshold voltage compensation, current driving requirements and reduces the charging time, thereby further improving the display performance.

Figure 70:
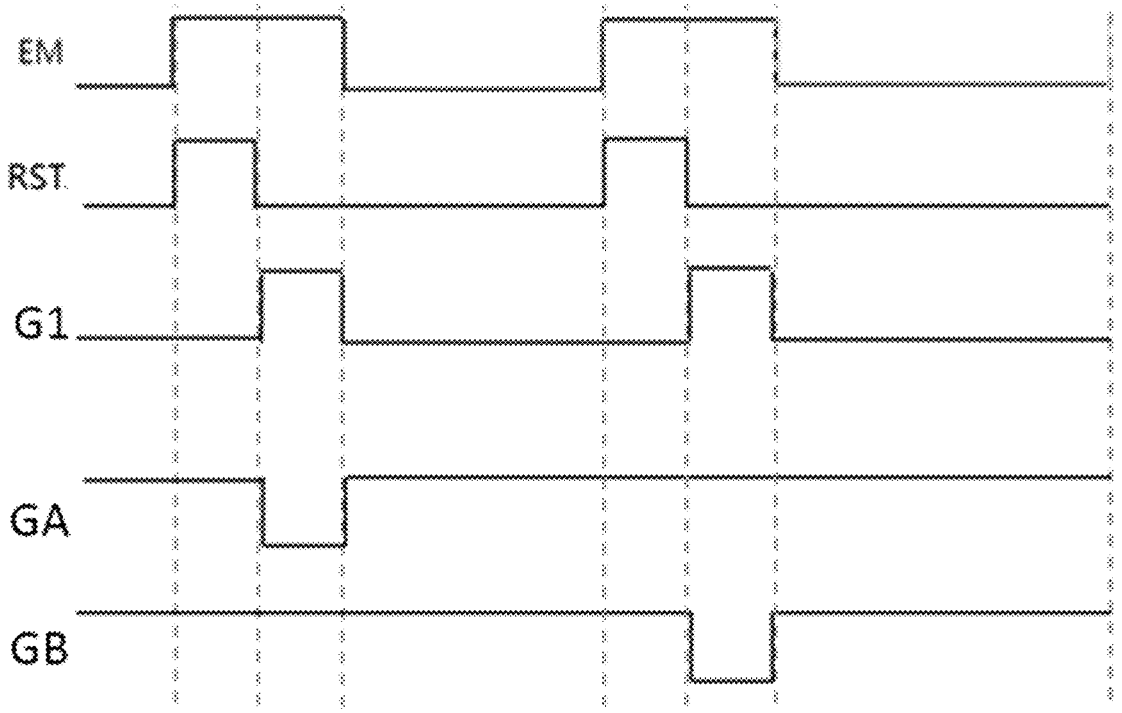
FIG. 70 is a timing diagram of the pixel circuit shown in FIG. 69.

FIG. 70 is a timing diagram of the pixel circuit shown in FIG. 69 of the present disclosure.

Figure 71:
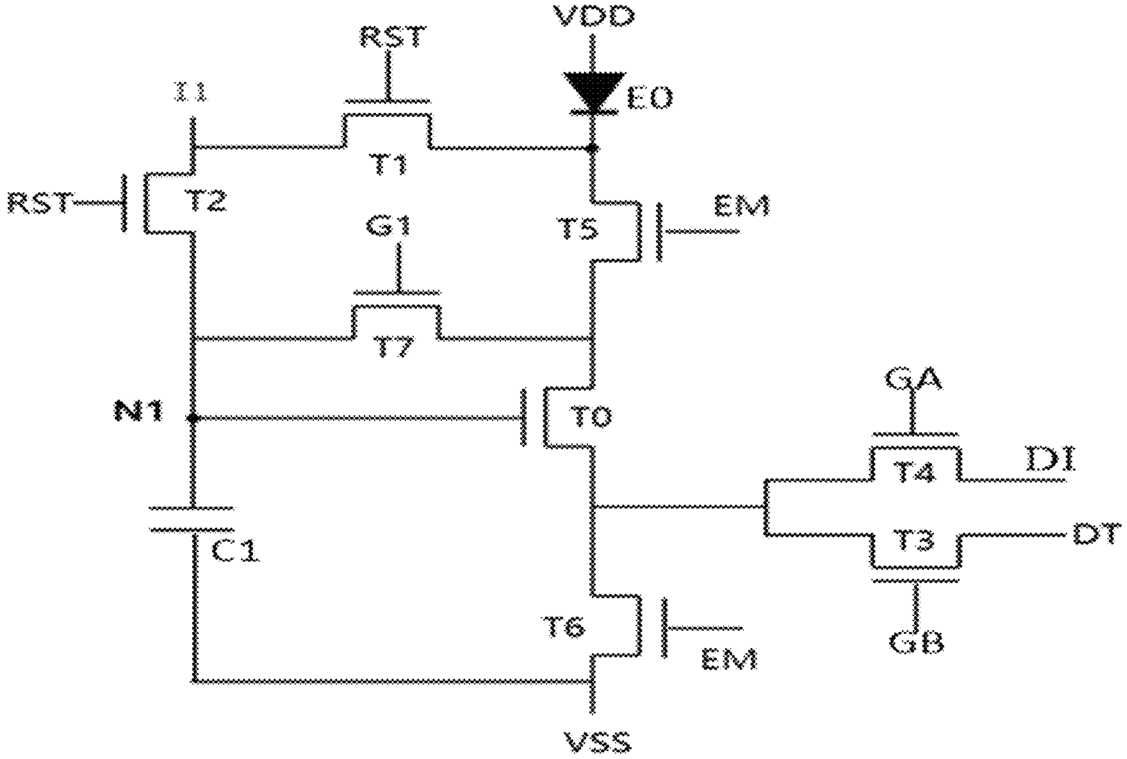
FIG. 71 is a circuit diagram of a pixel circuit according to at least one embodiment of the present disclosure.

As shown in FIG. 71, based on the pixel circuit shown in FIG. 60, the light emitting element is a light emitting diode E0; the driving circuit includes a driving transistor T0; the energy storage circuit includes a first capacitor C1;

A first terminal of the first capacitor C1 is electrically connected to the first node N1, and a second terminal of the first capacitor C1 is electrically connected to a low voltage terminal VSS;

The first reset circuit includes a first transistor T1, and the second reset transistor includes a second transistor T2;

The gate electrode of the first transistor T1 is electrically connected to the reset control terminal RST, the drain electrode of the first transistor T1 is electrically connected to the first initial voltage terminal I1, the source electrode of the first transistor T1 is electrically connected to the cathode of the light emitting diode E0; the anode of the light emitting diode E0 is electrically connected to the high voltage terminal VDD; the first initial voltage terminal I1 is configured to provide a first initial voltage Vi1;

The gate electrode of the second transistor T2 is electrically connected to the reset control terminal RST, the drain electrode of the second transistor T2 is electrically connected to the first initial voltage terminal I1, and the source electrode of the second transistor T2 is electrically connected to the first node N1;

The data writing-in circuit includes a third transistor T3 and a fourth transistor T4;

The gate electrode of the third transistor T3 is electrically connected to the first control terminal GB, the drain electrode of the third transistor T3 is electrically connected to the first data line DT, and the source electrode of the third transistor T3 is electrically connected to the source electrode of the driving transistor T0;

The gate electrode of the fourth transistor T4 is electrically connected to the second control terminal GA, the drain electrode of the fourth transistor T4 is electrically connected to the second data line DI, and the source electrode of the fourth transistor T4 is electrically connected to the source electrode of the driving transistor T0;

The first light emitting control circuit includes a fifth transistor T5, the second light emitting control circuit includes a sixth transistor T6, and the compensation control circuit includes a seventh transistor T7;

The gate electrode of the fifth transistor T5 is electrically connected to the light emitting control terminal EM, the drain electrode of the fifth transistor T5 is electrically connected to the cathode of the light emitting diode E0, and the source electrode of the fifth transistor T5 is electrically connected to the drain electrode of the driving transistor T0;

The gate electrode of the sixth transistor T6 is electrically connected to the light emitting control terminal EM, the drain electrode of the sixth transistor T6 is electrically connected to the source electrode of the driving transistor T0, and the source electrode of the sixth transistor T6 is electrically connected to the low voltage terminal VSS;

The gate electrode of the driving transistor T0 is electrically connected to the first node N1;

A gate electrode of the seventh transistor T7 is electrically connected to the scanning terminal G1, a drain electrode of the seventh transistor T7 is electrically connected to the first node N1, and a source electrode of the seventh transistor T7 is electrically connected to the drain electrode of the driving transistor T0.

When the pixel circuit shown in FIG. 71 is in operation,

Vdata_I needs to meet the grayscale requirements. In the first light emitting time period, Id is equal to $K(Vdata\_I-Vss+\Delta Vth)^2$, where Id is the driving current generated by T0, Vss is the voltage value of the low voltage signal provided by VSS, and ΔVth is the difference between the threshold voltage of T0 during threshold voltage compensation and during light emitting;

Id is greater than or equal to 0 and less than or equal to Imax, where Imax is the driving current of E0 at the highest gray scale.

When the pixel circuit shown in FIG. 71 is in operation,

When high grayscale display is performed, Vdata_T is equal to Vdata_I;

When low gray scale display is performed, Vdata_T is less than Vss to ensure that T0 is turned off during the second light emitting time period.

When the pixel circuit shown in FIG. 71 is working, Vi1−Vdata_I−max is greater than Vth, and Vdd−Vi1 is less than Vled, ensuring that after Vi1 is written into N1, at the beginning of the first writing-in time period, T0 can be normally turned on to write the display data voltage and compensate the threshold voltage. At the same time, when Vi1 is configured to reset the cathode of E0, E0 does not emit light; wherein Vdata_I−max is the maximum voltage value of the display data voltage, Vled is the start-up voltage of E0, and Vdd is the voltage value of the high voltage signal provided by VDD.

Figure 72:
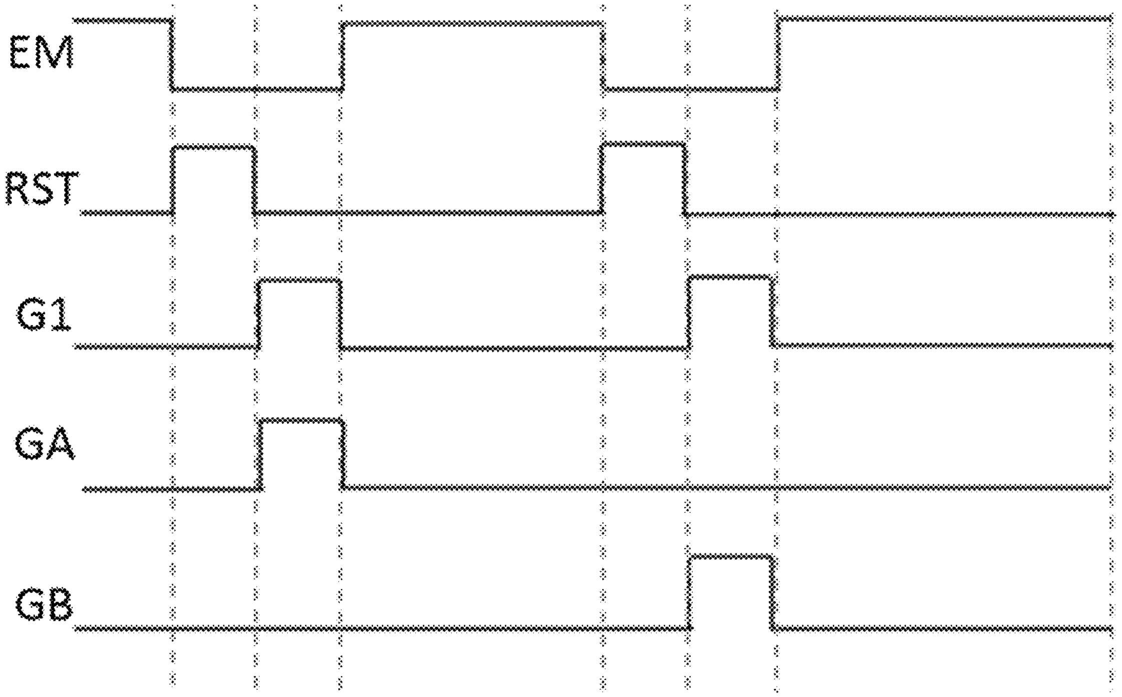
FIG. 72 is a timing diagram of the pixel circuit shown in FIG. 71.

FIG. 72 is a timing diagram of the pixel circuit shown in FIG. 71.

In the pixel circuit shown in FIG. 71, all transistors are NMOS TFTs. The pixel circuit shown in FIG. 71 of the present disclosure adopts NMOS TFT technology to realize a pixel driving circuit with driving current control+light emitting duration control, which can be applied to Oxide products.

Figure 73A:
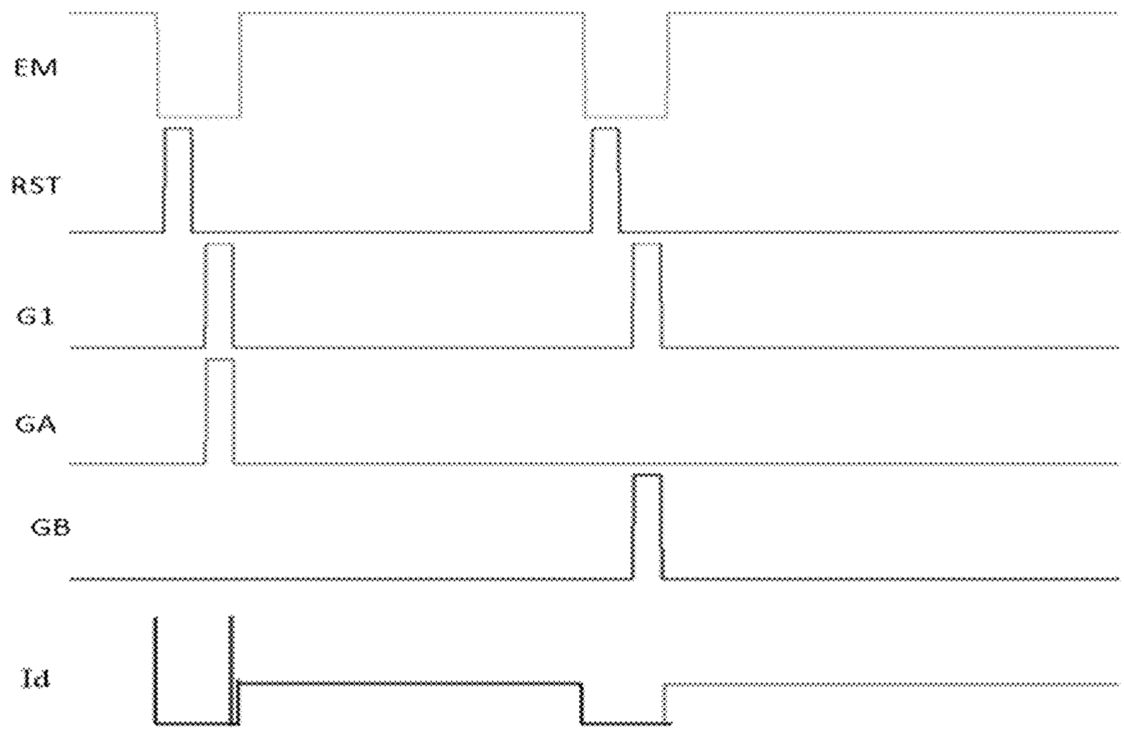
FIG. 73A is a schematic diagram showing simulation results of the pixel circuit shown in FIG. 71 when performing high grayscale display.
Figure 73B:
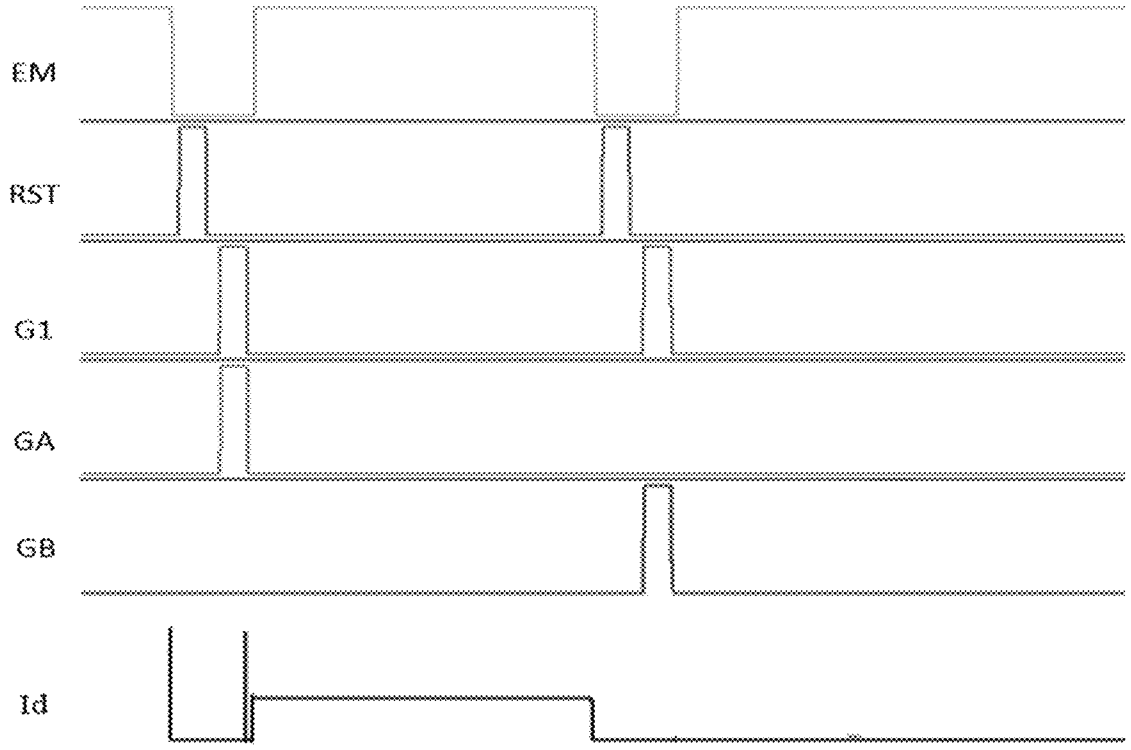
FIG. 73B is a schematic diagram showing simulation results of the pixel circuit shown in FIG. 71 when performing low grayscale display.

FIG. 73A is a schematic diagram of simulation results of the pixel circuit shown in FIG. 71 when performing high grayscale display; FIG. 73B is a schematic diagram of simulation results of the pixel circuit shown in FIG. 71 when performing low grayscale display.

In at least one embodiment corresponding to FIG. 73A, Vdd is equal to 10 V, Vss is equal to 2 V, Vi1 is equal to 10 V, Vdata_I is equal to 3.5 V, and Vdata_T is equal to 3.5 V;

In at least one embodiment corresponding to FIG. 73B, Vdd is equal to 10 V, Vss is equal to 2V, Vi1 is equal to 10 V, Vdata_I is equal to 3.5V, and Vdata_T is equal to 1V.

Figure 74:
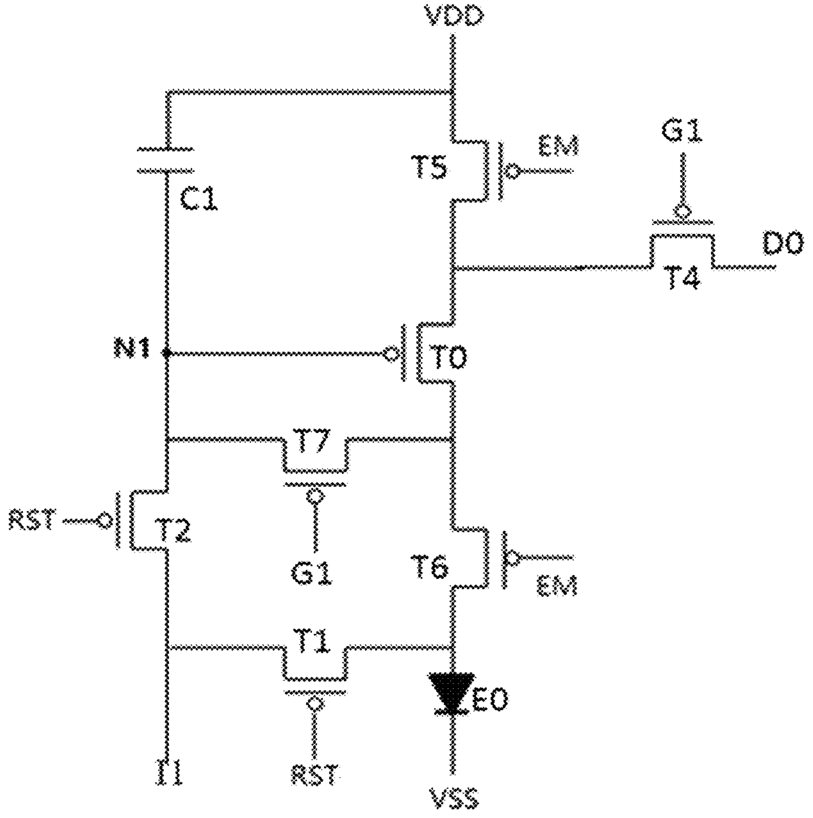
FIG. 74 is a circuit diagram of a pixel circuit according to at least one embodiment of the present disclosure.

The difference between the pixel circuit shown in FIG. 74 and the pixel circuit shown in FIG. 65 is that: T3 is not included;

The gate electrode of T4 is electrically connected to the scanning terminal G1, the source electrode of T4 is electrically connected to the data line D0, and the drain electrode of T4 is electrically connected to the source electrode of T0.

The pixel circuit shown in FIG. 74 of the present disclosure adopts a design in which the display data voltage and the light emitting time control data voltage are written in a time-division mode using the same transistor and the same data line, thereby reducing the number of TFTs, the number of data lines and the number of control terminals in the pixel circuit, and proposing a 7T1C pixel circuit solution to match the timing, divide one frame of time into multiple sub-frames, and write the display data voltage and the light emitting time control data voltage in sequence to achieve display control with different light emitting durations.

Figure 75:
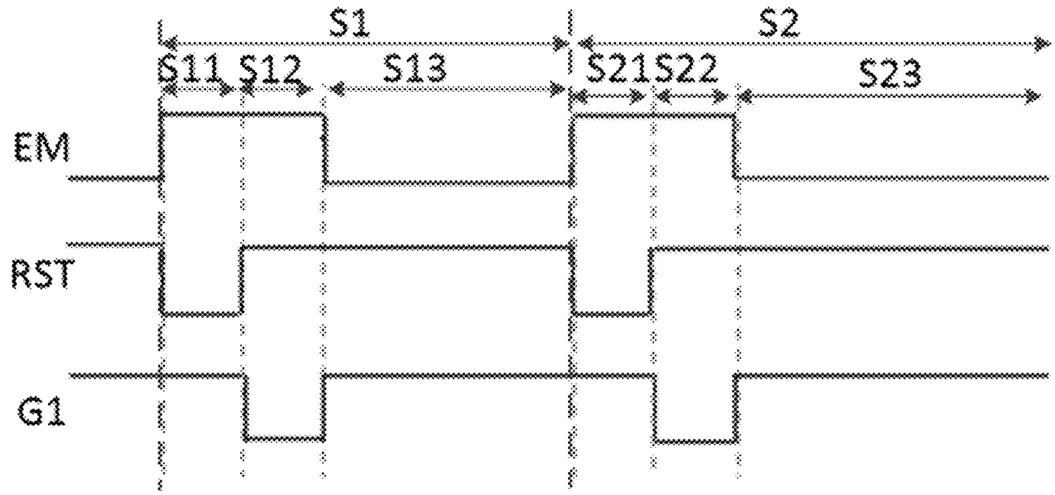
FIG. 75 is a timing diagram of the pixel circuit shown in FIG. 74.
Figure 76A:
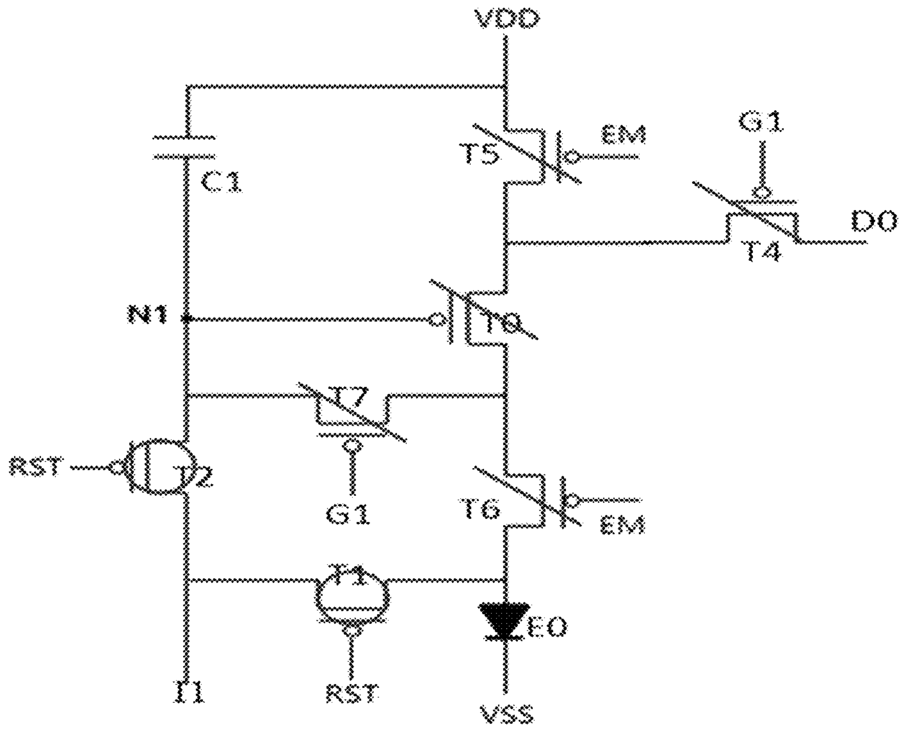
FIG. 76A is a schematic diagram showing the working state of the pixel circuit shown in FIG. 74 in a first reset time period.
Figure 76B:
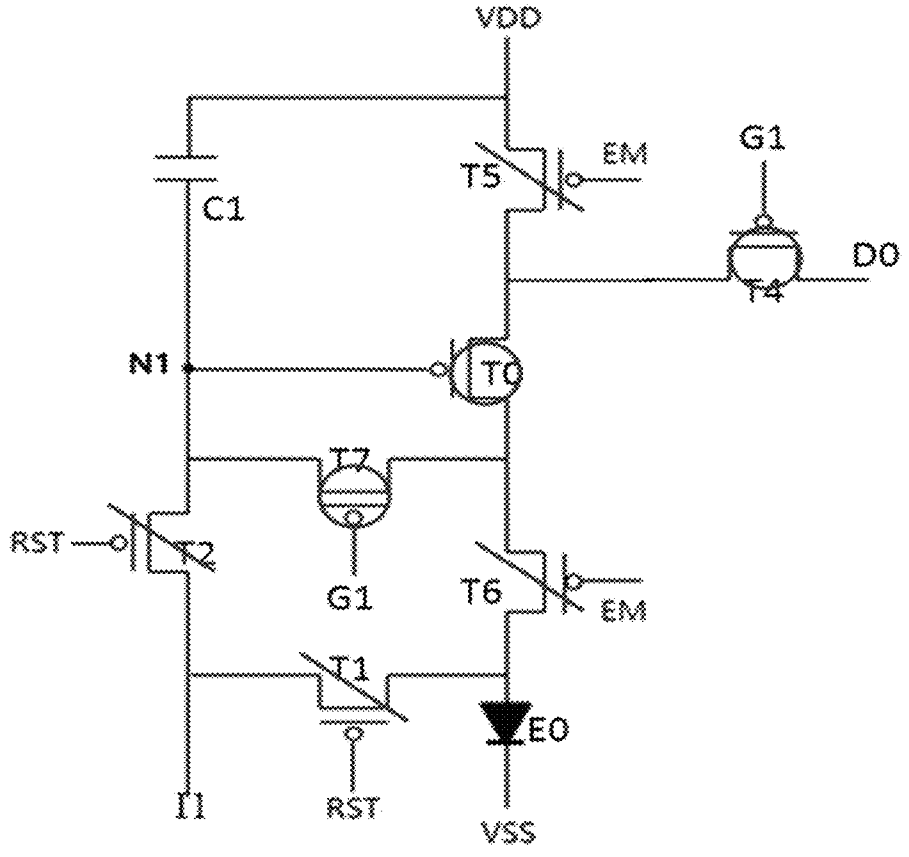
FIG. 76B is a schematic diagram showing the working state of the pixel circuit shown in FIG. 74 during a first writing-in time period.
Figure 76C:
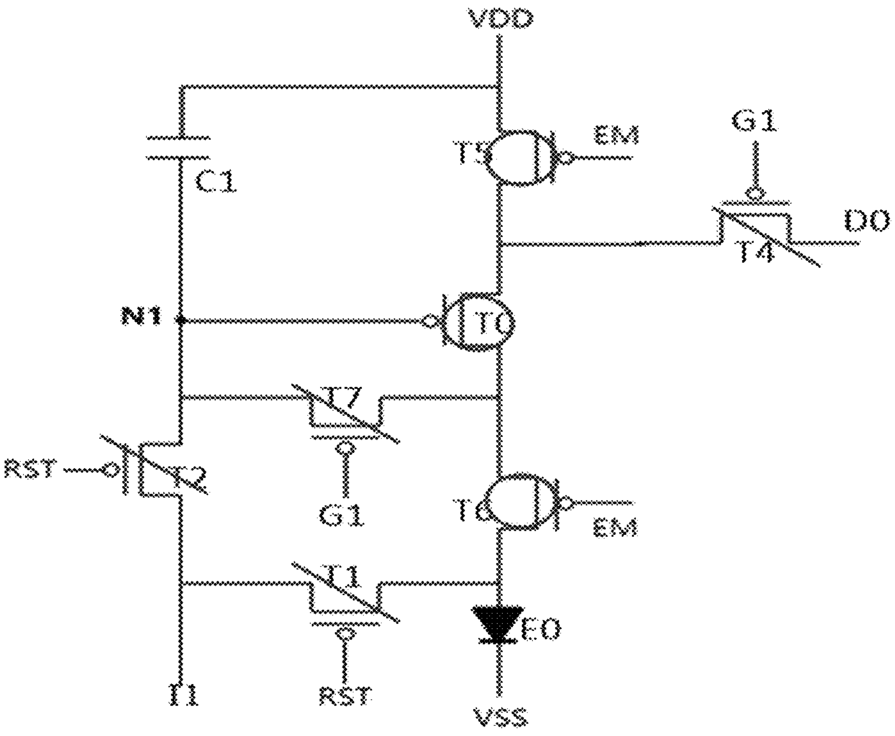
FIG. 76C is a schematic diagram showing the working state of the pixel circuit shown in FIG. 74 in the first light emitting time period.
Figure 76D:
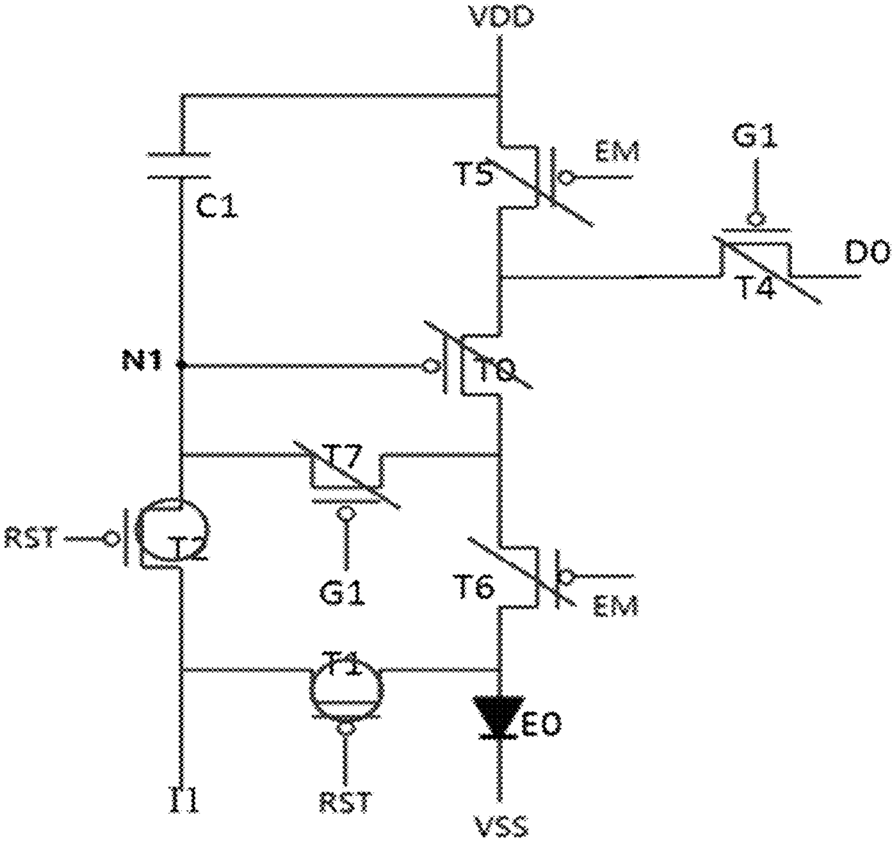
FIG. 76D is a schematic diagram showing the working state of the pixel circuit shown in FIG. 74 in a second reset time period.
Figure 76E:
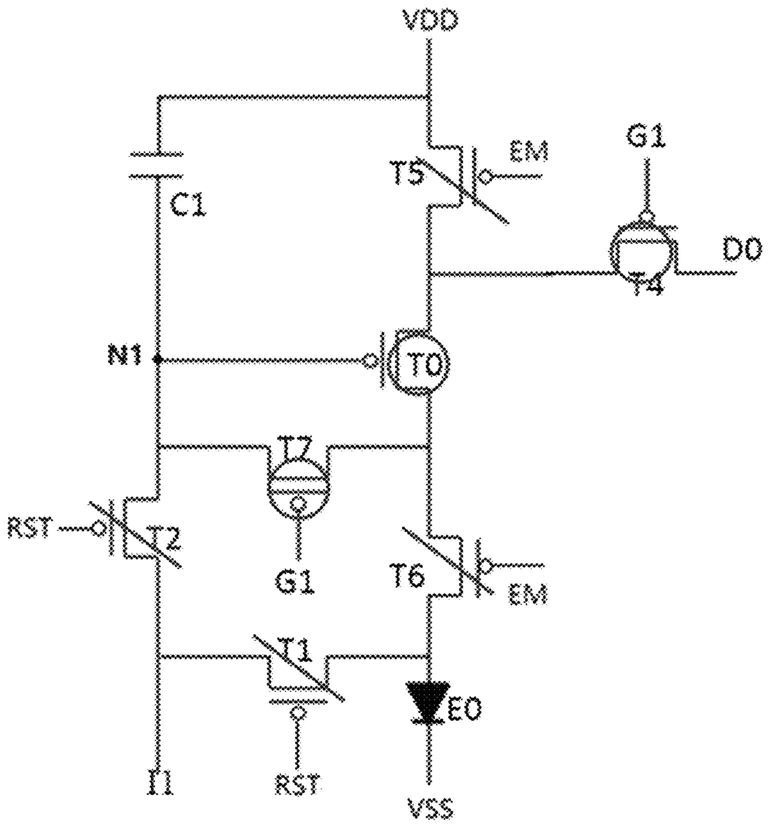
FIG. 76E is a schematic diagram showing the working state of the pixel circuit shown in FIG. 74 during a second writing-in time period.
Figure 76F:
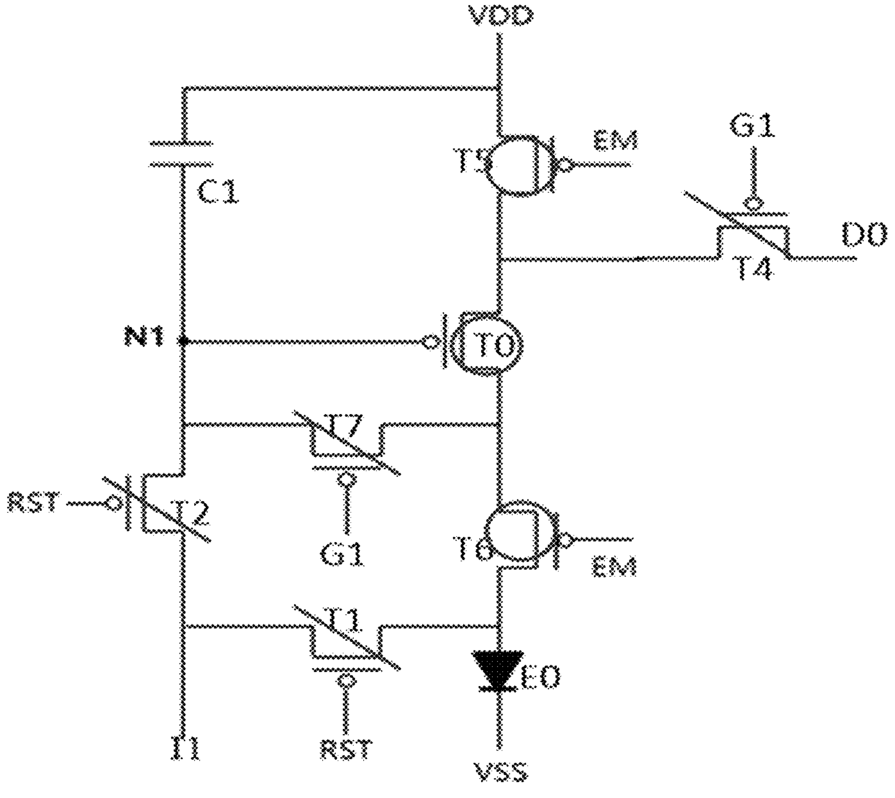
FIG. 76F is a schematic diagram showing the working state of the pixel circuit shown in FIG. 74 in the second light emitting time period.

As shown in FIG. 75, when the pixel circuit shown in FIG. 74 of the present disclosure is in operation, the display cycle includes a first display phase S1 and a second display phase S2; the first display phase S1 includes a first reset time period S11, a first writing-in time period S12, and a first light emitting time period S13 that are successively set; the second display phase S2 includes a second reset time period S21, a second writing-in time period S22, and a second light emitting time period S23 that are successively set;

In the first reset time period S11, RST provides a low voltage signal, as shown in FIG. 76A, T2 and T1 are turned on, and the gate electrode of T0 and the anode of E0 are reset through Vi1, the residual charge of the anode of E0 is cleared, and T0 can be turned on at the beginning of the first writing-in time period S12;

In the first writing-in time period S12, G1 provides a low voltage signal, as shown in FIG. 76B, T4 is turned on, D0 provides a display data voltage Vdata_I to the gate electrode of T0, and T7 is turned on;

At the beginning of the first writing-in time period S12, T0 is turned on to charge C1 to change the potential of N1 until the potential of N1 becomes Vdata_I+Vth, and T0 is turned off, Vth is the threshold voltage of T0;

In the first light emitting time period S13, EM outputs a low voltage signal, as shown in FIG. 76C, T5 and T6 are turned on, and T0 drives E0 to emit light;

In the second reset time period S21, after the first time t1, RST outputs a low voltage signal, as shown in FIG. 76D, T1 and T2 are turned on, the gate electrode of T0 and the anode of E0 are reset, and the residual charge of the anode of E0 is cleared, so that before the light emitting time control data voltage Vdata_T is written, the potential of the gate electrode of T0 and the anode voltage of E0 are consistent with those before the display data voltage is written, and the charging time and voltage jump difference are reduced, so that when Vdata_T and Vdata_I have the same voltage value, the driving current difference between the first light emitting time period and the second light emitting time period is reduced, and the brightness difference between the first light emitting time period and the second light emitting time period in the same frame is reduced; wherein, the first time t1 is the duration of the first light emitting time period S21;

In the second writing-in time period S22, G1 provides a low voltage signal, as shown in FIG. 76E, T4 is turned on, EM outputs a high voltage signal, T5 and T6 are turned off, T7 is turned on; D0 writes the light emitting time control data voltage Vdata_T to the source electrode of T0;

At the beginning of the second writing-in time period S22, T0 is turned on, charging C1, changing the potential of N1 until the potential of N1 becomes Vdata_T+Vth, and T0 is turned off, In the second light emitting time period S23, the EM outputs a low voltage signal, as shown in FIG. 76F, and T5 and T6 are turned on;

When Vdata_T is a high voltage signal and the gate-source voltage of T0 is greater than Vth, T0 is turned off, E0 does not emit light, and a short-time light emitting is realized, and the light emitting time is t1, so as to perform low grayscale display;

When Vdata_T is equal to Vdata_I, Vdata_I+Vth is written into the gate electrode of T0 again, as shown in FIG. 76F, T0 is turned on, and T0 drives E0 to emit light, achieving long-time light emitting for high grayscale display; the light emitting duration is t1+t2, t2 is the second time, and t2 is the duration of the second light emitting time period S23.

Figure 77A:
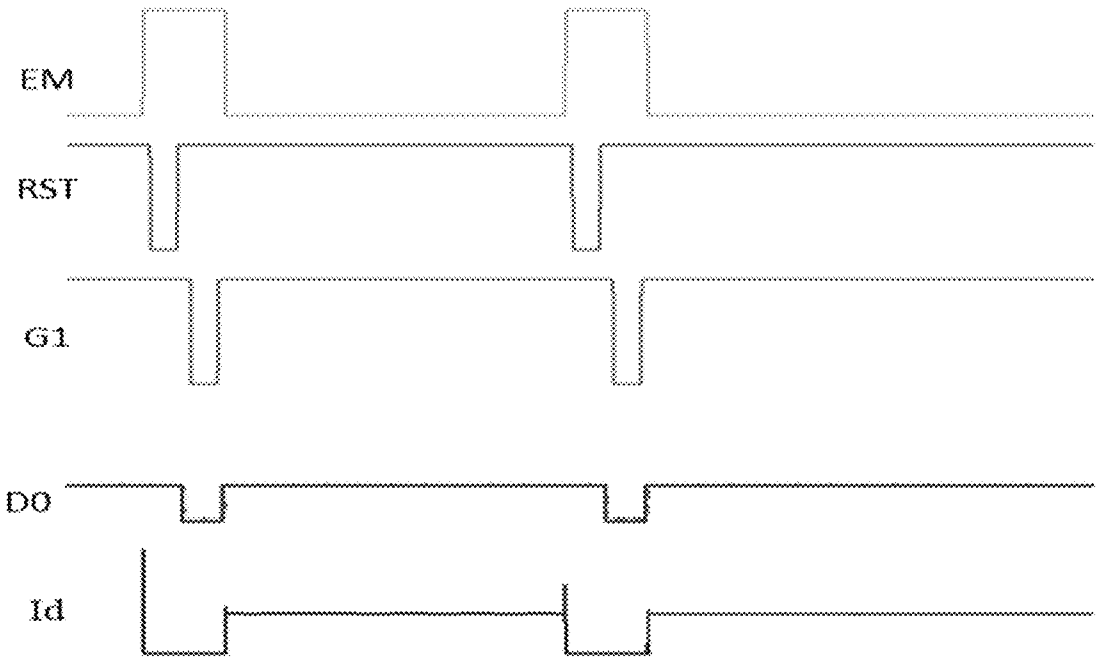
FIG. 77A is a schematic diagram showing simulation results of the pixel circuit shown in FIG. 74 when performing high grayscale display.
Figure 77B:
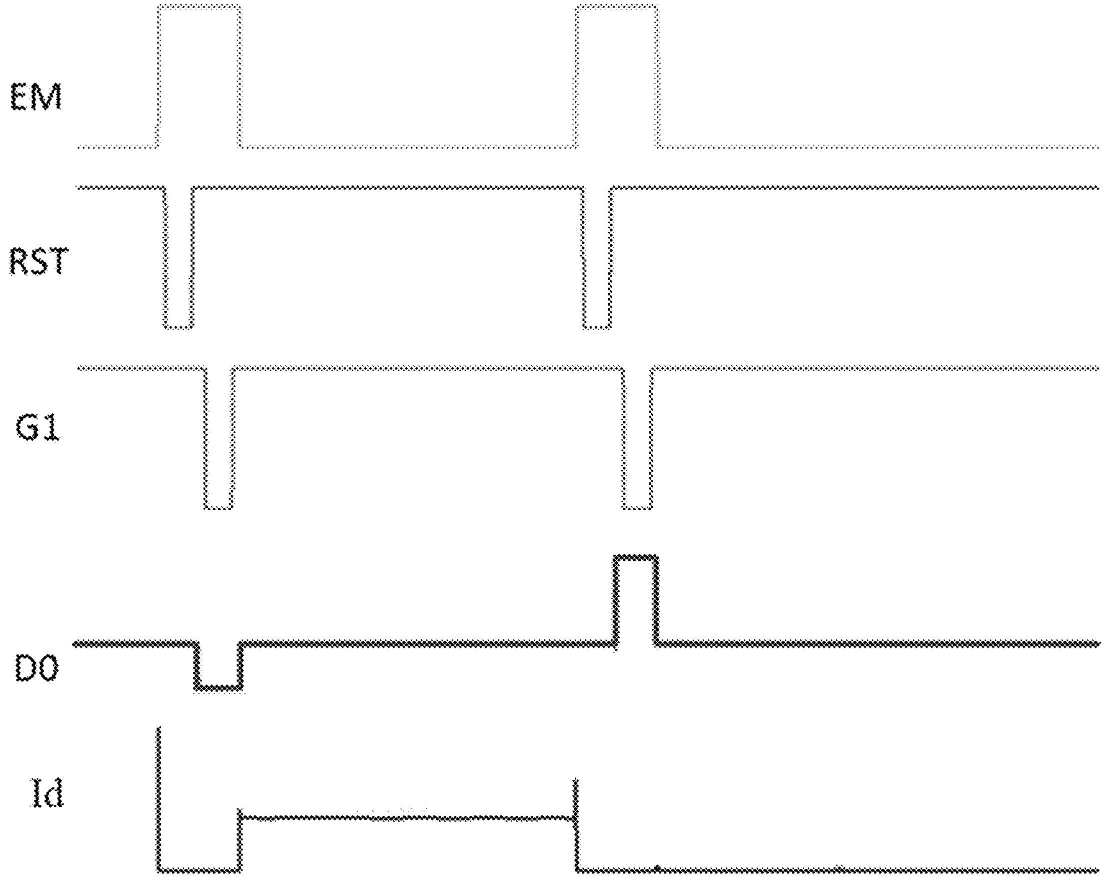
FIG. 77B is a schematic diagram showing simulation results of the pixel circuit shown in FIG. 74 when performing low grayscale display.

FIG. 77A is a schematic diagram showing simulation results of the pixel circuit shown in FIG. 74 when performing high grayscale display;

FIG. 77B is a schematic diagram of simulation results of the pixel circuit shown in FIG. 74 when performing low grayscale display.

Figure 78:
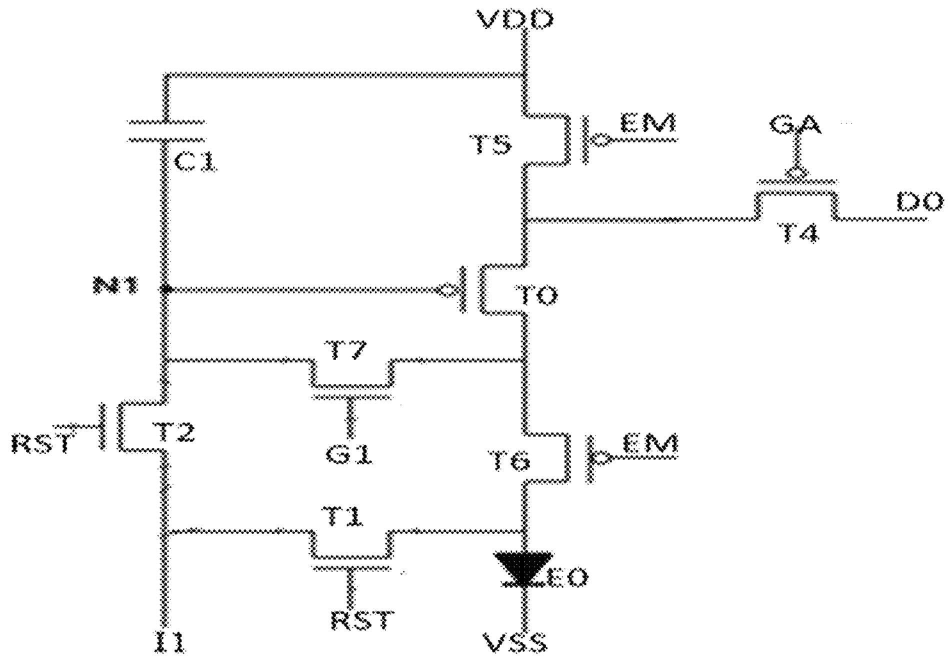
FIG. 78 is a circuit diagram of a pixel circuit according to at least one embodiment of the present disclosure.

The difference between the pixel circuit shown in FIG. 78 and the pixel circuit shown in FIG. 74 is that: the gate electrode of T4 is electrically connected to the second control terminal GA;

T2, T1 and T7 are NMOS TFTs.

The pixel circuit shown in FIG. 78 of the present disclosure adopts LTPO technology, and utilizes the advantage of low leakage current of oxide TFT to reduce the gate leakage of T0 and the anode leakage of E0, that is, T2, T1, T7 or part of them are changed from PMOS TFT to NMOS TFT; utilizing the advantage of high mobility of PMOS TFT, T4, T0, T5 and T6 are PMOS TFT, which meets the threshold voltage compensation, current driving requirements and reduces the charging time, thereby further improving the display performance.

Figure 80:
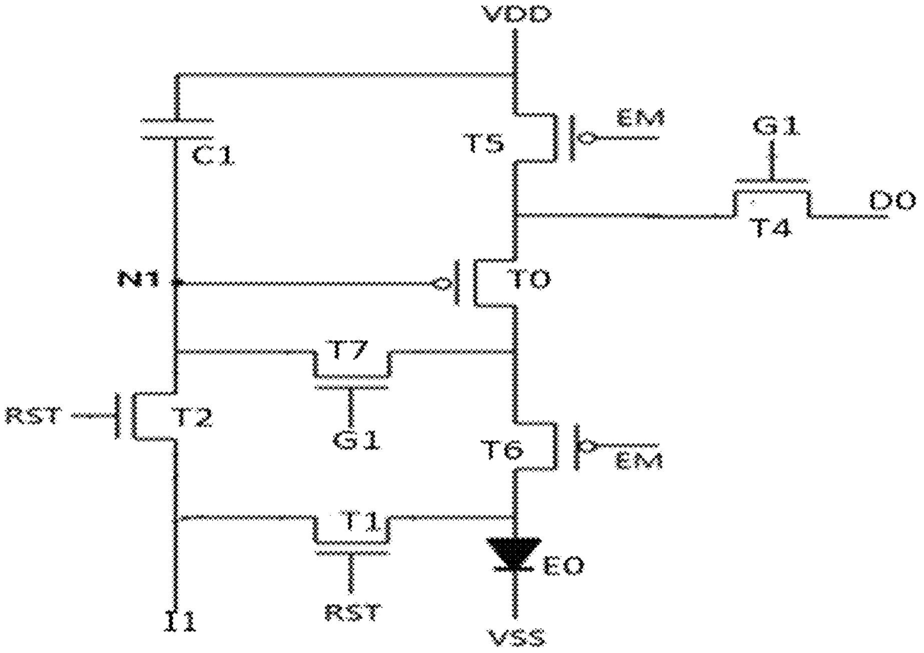
FIG. 80 is a circuit diagram of a pixel circuit according to at least one embodiment of the present disclosure.

In addition, if charging time is not a bottleneck, in order to meet the requirements of high PPI (pixel density), narrow border, etc., as shown in FIG. 80, T4 can be changed to NMOS TFT, T4 and T7 are both NMOS TFTs, and the gate electrode of T4 and the gate electrode of T7 can both be electrically connected to the scanning terminal G1.

Figure 79:
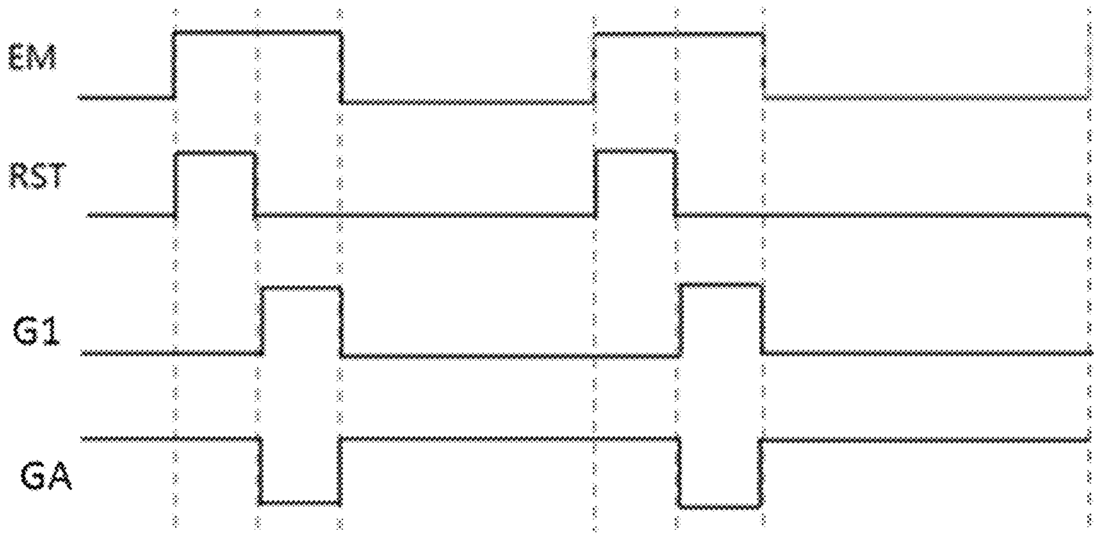
FIG. 79 is a timing diagram of the pixel circuit shown in FIG. 78.
Figure 81:
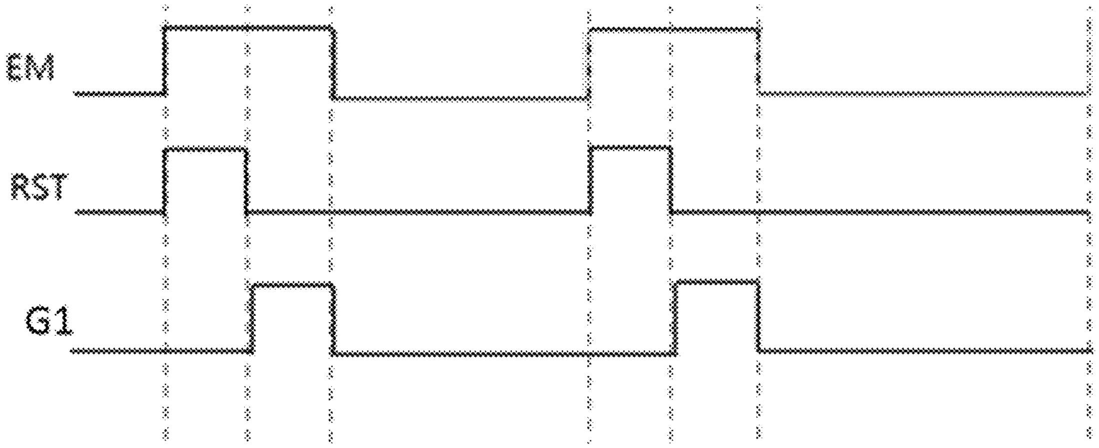
FIG. 81 is a timing diagram of the pixel circuit shown in FIG. 80.

FIG. 79 is a timing diagram of the pixel circuit shown in FIG. 78;

FIG. 81 is a timing diagram of the pixel circuit shown in FIG. 80.

Figure 82:
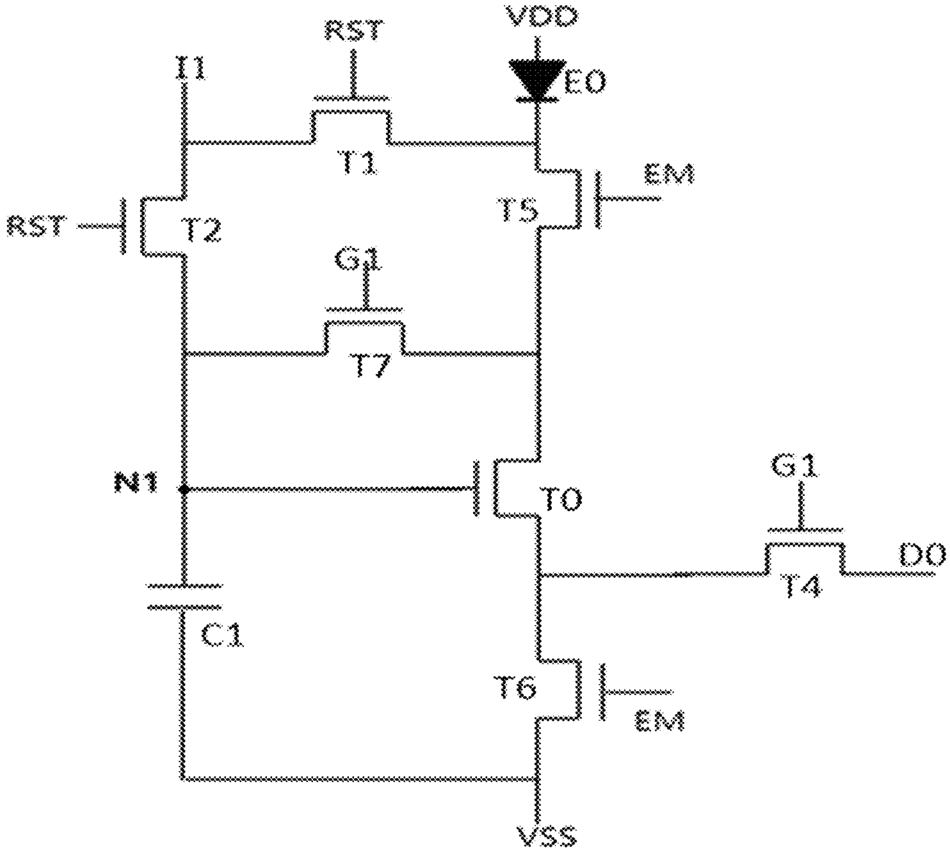
FIG. 82 is a circuit diagram of a pixel circuit according to at least one embodiment of the present disclosure.

The pixel circuit shown in FIG. 82 of the present disclosure is different from the pixel circuit shown in FIG. 71 of the present disclosure in that: T3 is not included.

The gate electrode of T4 is electrically connected to the scanning terminal G1, and the drain electrode of T4 is electrically connected to the data line D0.

The pixel circuit shown in FIG. 82 of the present disclosure adopts NMOS TFT technology to realize a pixel circuit of driving current control+light emitting duration control, which can be applied to oxide display products.

Figure 83:
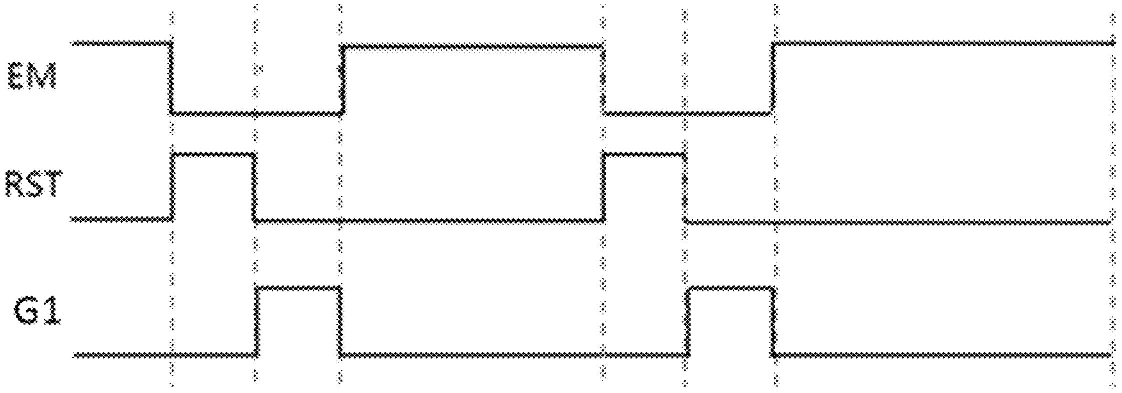

FIG. 83 is a timing diagram of the pixel circuit shown in FIG. 82 of the present disclosure.

Figure 84A:
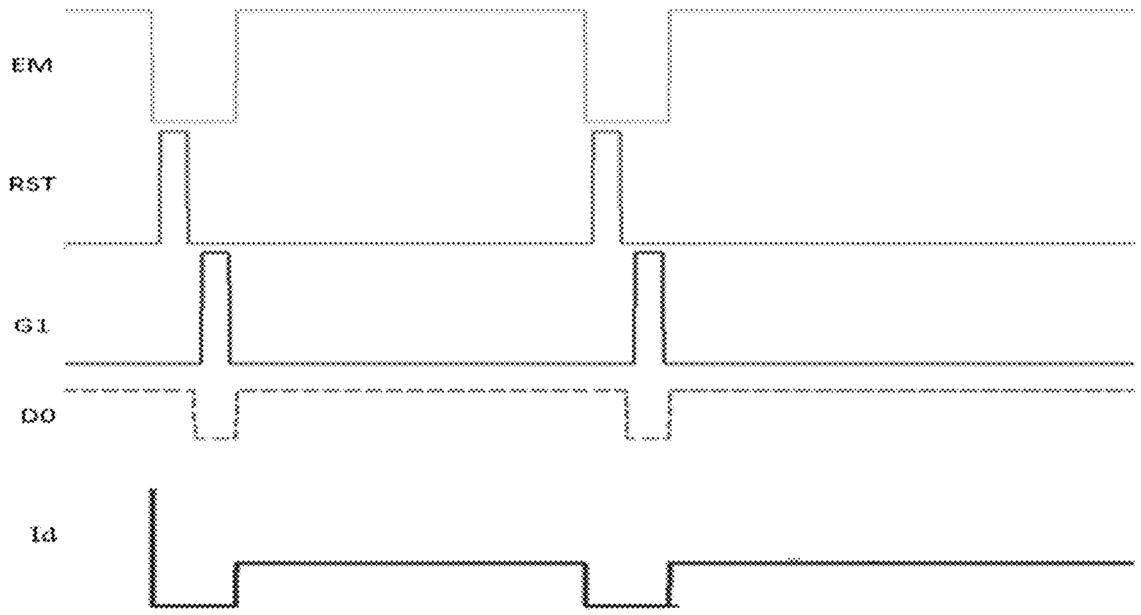
Figure 84B:
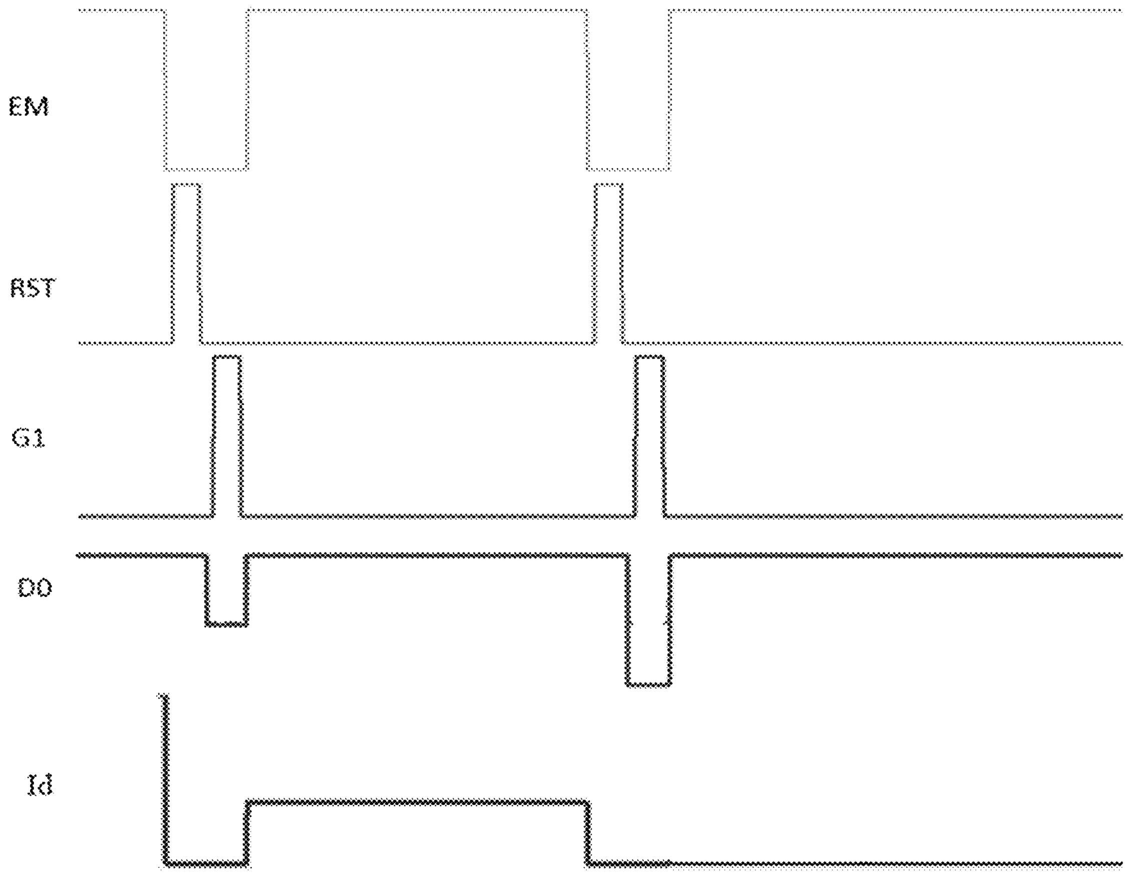

FIG. 84A is a schematic diagram showing simulation results of the pixel circuit shown in FIG. 83 when performing high grayscale display;

FIG. 84B is a schematic diagram of simulation results of the pixel circuit shown in FIG. 83 when performing low grayscale display.

Figure 85:
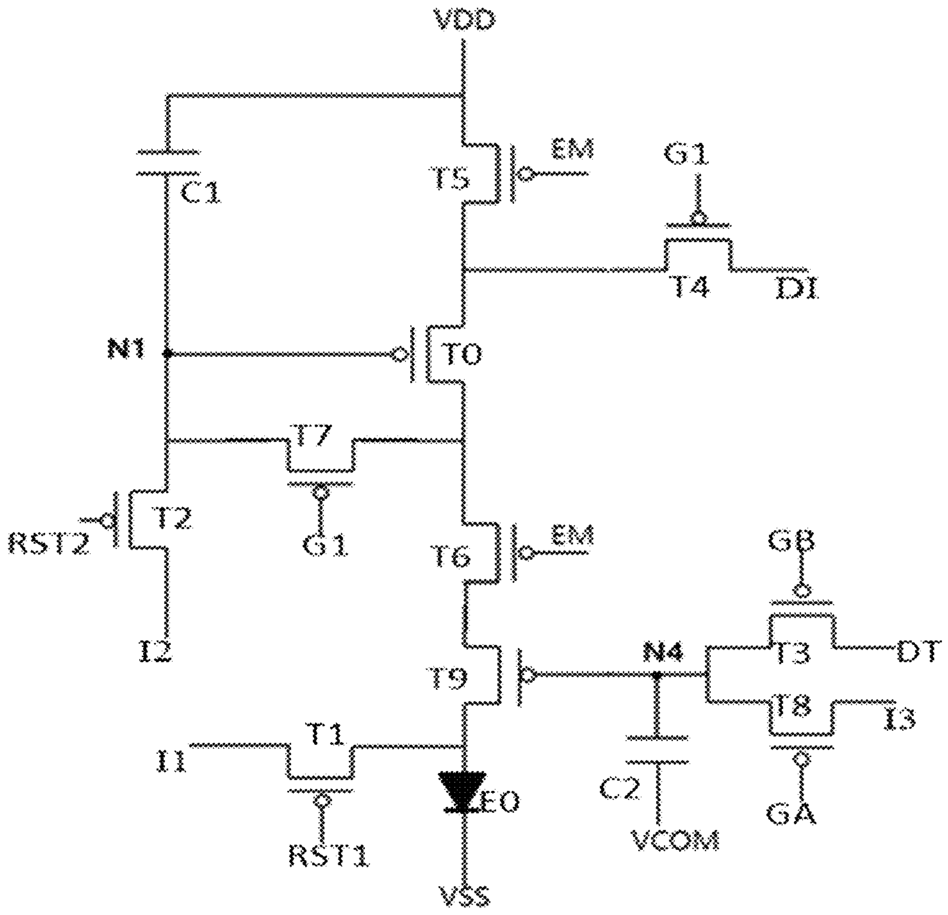

As shown in FIG. 85, based on the pixel circuit shown in FIG. 63, the light emitting element is a light emitting diode E0; the driving circuit includes a driving transistor T0;

The first reset circuit includes a first transistor T1, and the second reset transistor includes a second transistor T2;

The gate electrode of the first transistor T1 is electrically connected to the first reset control terminal RST1, the source electrode of the first transistor T1 is electrically connected to the first initial voltage terminal I1, the drain electrode of the first transistor T1 is electrically connected to the anode of the light emitting diode E0; the cathode of the light emitting diode E0 is electrically connected to the low voltage terminal VSS; the first initial voltage terminal I1 is configured to provide a first initial voltage Vi1;

The gate electrode of the second transistor T2 is electrically connected to the second reset control terminal RST2, the source electrode of the second transistor T2 is electrically connected to the second initial voltage terminal I2, and the drain electrode of the second transistor T2 is electrically connected to the first node N1;

The first light emitting control circuit includes a fifth transistor T5, the second light emitting control circuit includes a sixth transistor T6, and the compensation control circuit includes a seventh transistor T7;

The gate electrode of the fifth transistor T5 is electrically connected to the light emitting control terminal EM, the source electrode of the fifth transistor T5 is electrically connected to the high voltage terminal VDD, and the drain electrode of the fifth transistor T5 is electrically connected to the source electrode of the driving transistor T0;

The gate electrode of the sixth transistor T6 is electrically connected to the light emitting control terminal EM, the source electrode of the sixth transistor T6 is electrically connected to the drain electrode of the driving transistor T0, and the drain electrode of the sixth transistor T6 is electrically connected to the source electrode of the ninth transistor T9; the cathode of the light emitting diode E0 is electrically connected to the low voltage terminal VSS;

The gate electrode of the driving transistor T0 is electrically connected to the first node N1;

The gate electrode of the seventh transistor T7 is electrically connected to the scanning terminal G1, the source electrode of the seventh transistor T7 is electrically connected to the first node N1, and the drain electrode of the seventh transistor T7 is electrically connected to the drain electrode of the driving transistor T0;

The first writing-in sub-circuit includes a third transistor T3, and the second writing-in sub-circuit includes a fourth transistor T4;

The gate electrode of the third transistor T3 is electrically connected to the first control terminal GB, the source electrode of the third transistor T3 is electrically connected to the first data line DT, and the drain electrode of the third transistor T3 is electrically connected to the switch control terminal N4;

The gate electrode of the fourth transistor T4 is electrically connected to the scanning terminal G1, the source electrode of the fourth transistor T4 is electrically connected to the second data line DI, and the drain electrode of the fourth transistor T4 is electrically connected to the source electrode of T0;

The initialization circuit includes an eighth transistor T8;

The gate electrode of the eighth transistor T8 is electrically connected to the second control terminal GA, the source electrode of the eighth transistor T8 is electrically connected to the third initial voltage terminal I3, and the drain electrode of the eighth transistor T8 is electrically connected to the switch control terminal N4; the third initial voltage terminal I3 is configured to provide a third initial voltage Vi3;

The voltage maintenance circuit includes a second capacitor C2;

A first terminal of the second capacitor C2 is electrically connected to the switch control terminal N4, and a second terminal of the second capacitor C2 is electrically connected to the common electrode voltage terminal VCOM;

The switch control circuit includes a ninth transistor T9; the driving circuit includes a driving transistor T0;

the ninth transistor T9 is electrically connected to the switch control terminal N4, the source electrode of the ninth transistor T9 is electrically connected to the drain electrode of the sixth transistor T6, and the drain electrode of the ninth transistor T9 is electrically connected to the anode of the light emitting diode E0;

A gate electrode of the driving transistor T0 is electrically connected to the first node N1.

In the pixel circuit shown in FIG. 85, all transistors are PMOS TFTs.

Figure 86:
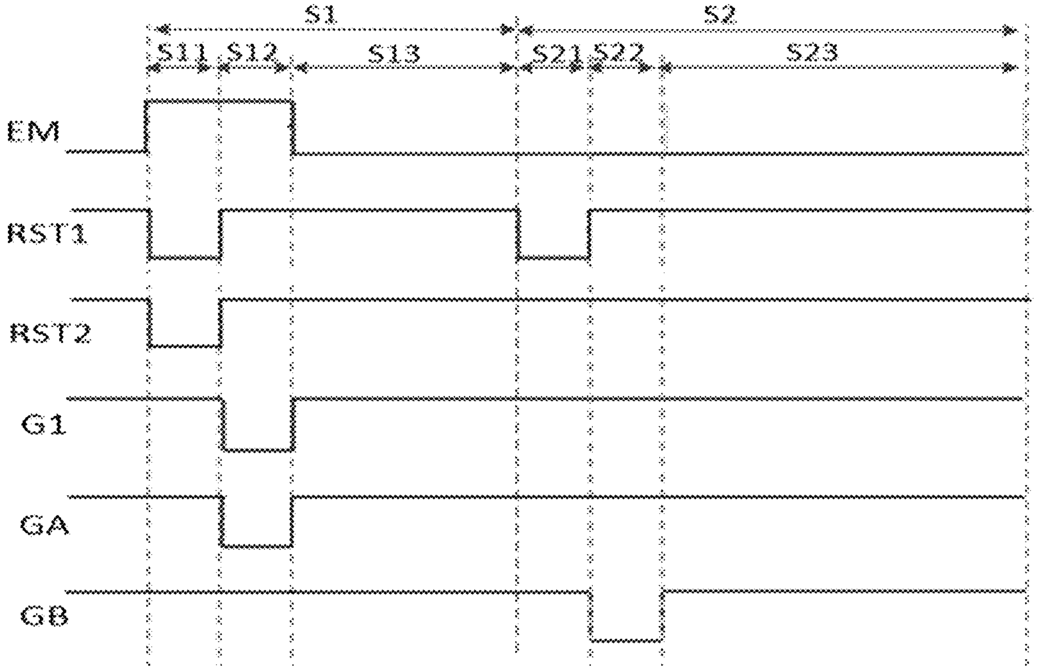

As shown in FIG. 86, when the pixel circuit shown in FIG. 85 is in operation, the display cycle includes a first display phase S1 and a second display phase which are set in sequence; the first display phase S1 includes a first reset time period S11, a first writing-in time period S12 and a first light emitting time period S13 which are set in sequence, and the second display phase S2 includes a second reset time period S21, a second writing-in time period S22 and a second light emitting time period S23 which are set in sequence;

In the first reset time period S11, RST1 and RST2 both provide low voltage signals, T1 and T2 are both turned on, and the gate electrode of T0 and the anode of E0 are reset;h;7uiy7y In the first writing-in time period S12, G1 and GB both provide low voltage signals, T4 is turned on, T8 is turned on, T7 is turned on, DI provides the display data voltage Vdata_I to be written into the source electrode of T0, and I3 writes the third initial voltage Vi3 to N4 to control T9 to be turned on;

At the beginning of the first writing-in time period S12, T0 is turned on to charge C1 and change the potential of N1 until the potential of N1 becomes Vdata_I+Vth, and T0 is turned off, Vth is the threshold voltage of T0;

In the first light emitting time period S13, EM outputs a low voltage signal, T5 and T6 are turned on, and T0 drives E0 to emit light;

In the second reset time period S21, RST1 provides a low voltage signal and T1 is turned on to reset the anode potential of E0 and clear the residual charge on the anode of E0;

In the second writing-in time period S22, GB provides a low voltage signal, T3 is turned on, and DT writes the light emitting time control data voltage Vdata_T to N4;

In the second light emitting time period S23, EM provides a low voltage signal, and T5 and T6 are turned on;

When Vdata_T is a high voltage signal, T9 is turned off, E0 does not emit light, and a short-time light emitting is achieved, and the light emitting duration is t1, t1 is the first time, and t1 is the duration of the first light emitting time period;

When Vdata_T is a low voltage signal, in the preferred case, Vdata_T is equal to V3, T9 is turned on, E0 continues to emit light, and long-duration light emitting is achieved. The light emitting duration is t1+t2, t2 is the second time, and t2Wie is the duration of the second light emitting time period.

Figure 87:
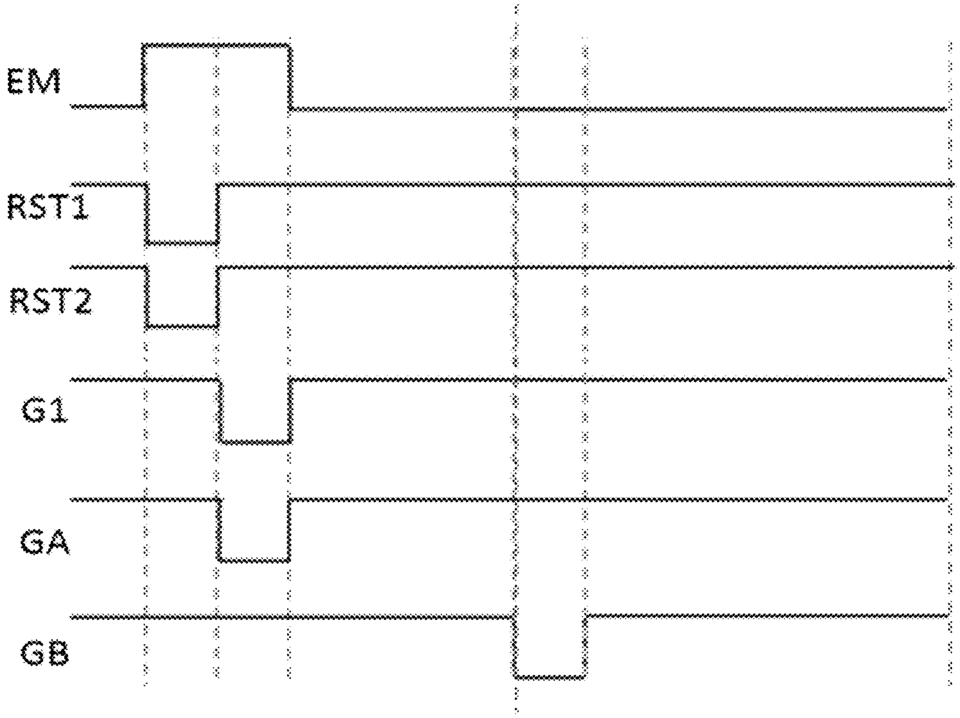

FIG. 87 is a second driving timing diagram of the pixel circuit shown in FIG. 85.

As shown in FIG. 87, the second display phase does not include the second reset time period.

When the pixel circuit shown in FIG. 87 of the present disclosure is in operation, GA can output a low voltage signal in a first reset time period to turn on T8, and can also output a low voltage signal in a first writing-in time period to turn on T8. Therefore, GA can be the same control terminal as G1, or GA can be the same control terminal as RST1, so as to reduce the number of control terminals used.

As shown in FIG. 88, based on the pixel circuit shown in FIG. 64, the light emitting element is a light emitting diode E0; the driving circuit includes a driving transistor T0;

the light emitting diode E0 is electrically connected to the high voltage terminal VDD;

The first reset circuit includes a first transistor T1, and the second reset transistor includes a second transistor T2;

The gate electrode of the first transistor T1 is electrically connected to the first reset control terminal RST1, the drain electrode of the first transistor T1 is electrically connected to the first initial voltage terminal I1, the source electrode of the first transistor T1 is electrically connected to the cathode of the light emitting diode E0; the cathode of the light emitting diode E0 is electrically connected to the low voltage terminal VSS; the first initial voltage terminal I1 is configured to provide a first initial voltage Vi1;

The gate electrode of the second transistor T2 is electrically connected to the second reset control terminal RST2, the drain electrode of the second transistor T2 is electrically connected to the second initial voltage terminal I2, and the source electrode of the second transistor T2 is electrically connected to the first node N1;

The first light emitting control circuit includes a fifth transistor T5, the second light emitting control circuit includes a sixth transistor T6, the compensation control circuit includes a seventh transistor T7; the switch control circuit includes a ninth transistor T9; the driving circuit includes a driving transistor T0;

The gate electrode of the ninth transistor T9 is electrically connected to the switch control terminal N4, the drain electrode of the ninth transistor T9 is electrically connected to the cathode of E0, and the source electrode of the ninth transistor T9 is electrically connected to the drain electrode of T5;

The gate electrode of the fifth transistor T5 is electrically connected to the light emitting control terminal EM, and the source electrode of the fifth transistor T5 is electrically connected to the drain electrode of the driving transistor T0;

The gate electrode of the sixth transistor T6 is electrically connected to the light emitting control terminal EM, the drain electrode of the sixth transistor T6 is electrically connected to the source electrode of the driving transistor T0, and the source electrode of the sixth transistor T6 is electrically connected to the low voltage terminal VSS;

The gate electrode of the driving transistor T0 is electrically connected to the first node N1;

The gate electrode of the seventh transistor T7 is electrically connected to the scanning terminal G1, the drain electrode of the seventh transistor T7 is electrically connected to the first node N1, and the source electrode of the seventh transistor T7 is electrically connected to the drain electrode of the driving transistor T0;

The first writing-in sub-circuit includes a third transistor T3, and the second writing-in sub-circuit includes a fourth transistor T4;

The gate electrode of the third transistor T3 is electrically connected to the first control terminal GB, the source electrode of the third transistor T3 is electrically connected to the first data line DT, and the drain electrode of the third transistor T3 is electrically connected to the switch control terminal N4;

The gate electrode of the fourth transistor T4 is electrically connected to the scanning terminal G1, the source electrode of the fourth transistor T4 is electrically connected to the second data line DI, and the drain electrode of the fourth transistor T4 is electrically connected to the source electrode of T0;

The initialization circuit includes an eighth transistor T8;

The gate electrode of the eighth transistor T8 is electrically connected to the second control terminal GA, the source electrode of the eighth transistor T8 is electrically connected to the third initial voltage terminal I3, and the drain electrode of the eighth transistor T8 is electrically connected to the switch control terminal N4; the third initial voltage terminal I3 is configured to provide a third initial voltage Vi3.

In the pixel circuit shown in FIG. 88, all transistors are NMOS TFTs.

The pixel circuit shown in FIG. 88 adopts NMOS TFT technology to realize a pixel circuit with driving current control+light emitting duration control, which can be applied to oxide display products.

Figure 89:
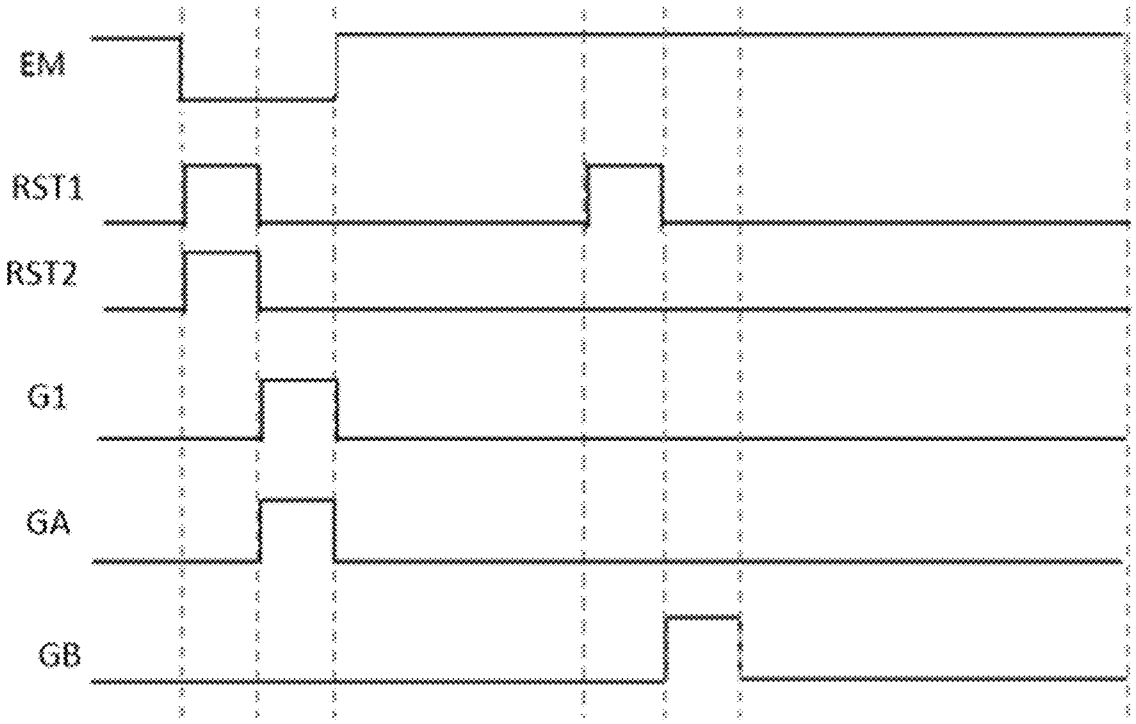
Figure 90:
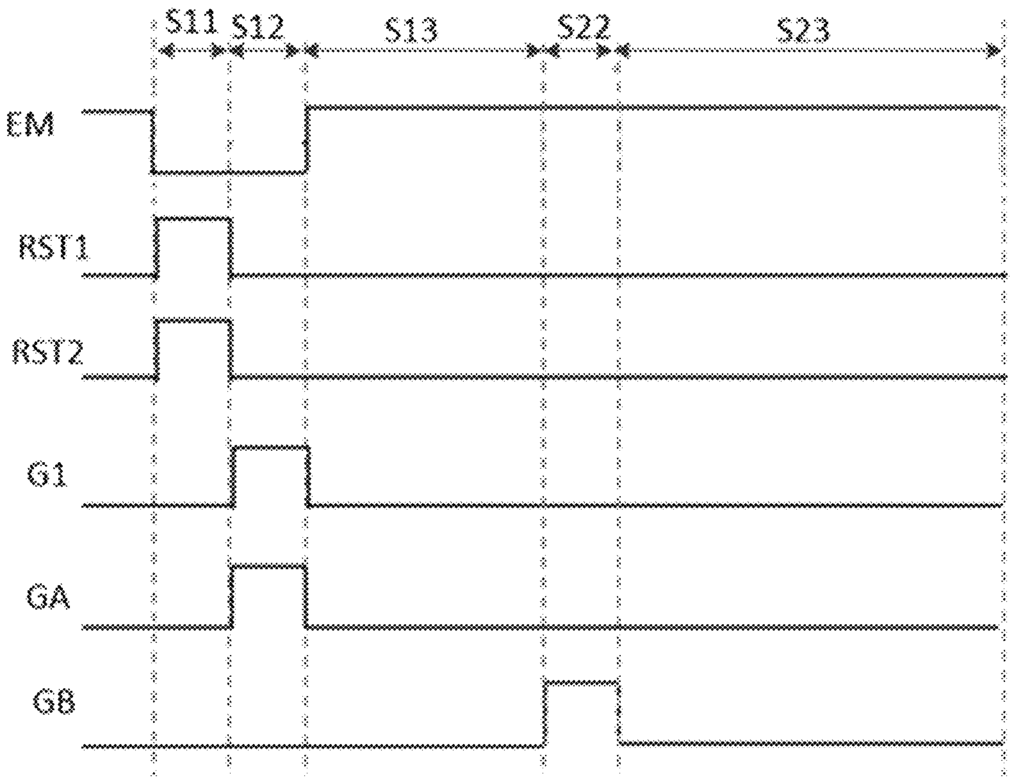

FIG. 89 is a first timing diagram of the pixel circuit shown in FIG. 88;

FIG. 90 is a second timing diagram of the pixel circuit shown in FIG. 88.

FIG. 91A is a schematic diagram of the working state of the pixel circuit shown in FIG. 88 in the first reset time period S11; FIG. 91B is a schematic diagram of the working state of the pixel circuit shown in FIG. 88 in the first writing-in time period S12; FIG. 91C is a schematic diagram of the working state of the pixel circuit shown in FIG. 88 in the first light emitting time period S13; FIG. 91D is a schematic diagram of the working state of the pixel circuit shown in FIG. 88 in the second writing-in time period S22; FIG. 91E is a schematic diagram of the working state of the pixel circuit shown in FIG. 88 in the second light emitting time period S23.

The difference between the pixel circuit shown in FIG. 92 and the pixel circuit shown in FIG. 85 is that T4, T2, T7, and T1 are all NMOS TFTs.

FIG. 93 is a first timing diagram of the pixel circuit shown in FIG. 92, and FIG. 94 is a second timing diagram of the pixel circuit shown in FIG. 92.

The pixel circuit shown in FIG. 92 adopts LTPO technology, using the advantage of low leakage current of oxide TFT to reduce the gate leakage of T0 and the anode leakage of E0, that is, T4, T2, T7, T1 or part of them are NMOS TFTs; using the advantage of high mobility of PMOS TFT, T4, T0, T5, T6 and T9 are PMOS TFTs, which meet the threshold voltage compensation, current driving requirements and reduce charging time, thereby further improving display performance.

In addition, if charging time is not a bottleneck, in order to meet the requirements of high PPI, narrow border, etc., T4 can be changed to NMOS TFT. Both T4 and T7 are NMOS TFT and can share the scanning terminal G1 driving.

The driving method described in the embodiment of the present disclosure is applied to the above-mentioned pixel circuit, wherein the display cycle includes a first display phase and a second display phase which are successively arranged, wherein the first display phase includes a first writing-in time period; and the second display phase includes a reset time period and a second writing-in time period which are successively arranged; the driving method includes:

In the first writing-in time period, the data writing-in circuit provides a display data voltage to the writing-in node under the control of the writing-in control signal;

In the reset time period, the first reset circuit writes the first initial voltage into the first electrode of the light emitting element under the control of the first reset control signal;

In the second writing-in time period, the data writing-in circuit provides the light emitting time control data voltage to the writing-in node under the control of the writing-in control signal.

In at least one embodiment of the present disclosure, the pixel circuit further includes a second reset circuit; and the driving method includes:

During the reset time period, the second reset circuit writes a second initial voltage into the first node under the control of a second reset control signal.

Optionally, the reset time period is a second reset time period, and the first display phase further includes a first reset time period set before the first writing-in time period; the driving method may further include:

In the first reset time period, the first reset circuit writes a first initial voltage into the first electrode of the light emitting element under the control of a first reset control signal, and the second reset circuit writes a second initial voltage into the first node under the control of a second reset control signal.

The pixel circuit described in the embodiment of the present disclosure includes a driving circuit, a light emitting element, an energy storage circuit and a data writing-in circuit;

The control terminal of the driving circuit is electrically connected to the first node, and the driving circuit is configured to generate a driving current to drive the light emitting element under the control of the potential of the first node;

The first terminal of the energy storage circuit is electrically connected to the first node, the second terminal of the energy storage circuit is electrically connected to the second node, and the energy storage circuit is configured to store electrical energy;

The data writing-in circuit is electrically connected to the writing-in control terminal and the writing-in node respectively, and is configured to sequentially provide a display data voltage and a light emitting time control data voltage to the writing-in node under the control of a writing-in control signal provided by the writing-in control terminal;

The writing-in node is the second node; or, the pixel circuit also includes a switch control circuit; the switch control circuit is electrically connected to the switch control terminal, the driving circuit and the light emitting element, respectively, and is configured to control the connection between the driving circuit and the light emitting element under the control of the potential of the switch control terminal; the writing-in node includes a first writing-in node and a second writing-in node; the first writing-in node is the second node, and the second writing-in node is electrically connected to the switch control terminal.

The embodiment of the present disclosure can realize a driving current+light emitting time control mode by writing-in a display data voltage and a light emitting time control data voltage in sequence, thereby improving the display effect.

In at least one embodiment of the present disclosure, the light emitting element may be an inorganic light emitting diode, for example, the light emitting element may be a micro light emitting diode or a mini light emitting diode.

In a specific implementation, the light emitting element may be an inorganic light emitting diode, and the width-to-length ratio of the transistor included in the driving circuit may be greater than 0.5.

The light emitting element is an inorganic light emitting diode, the width-to-length ratio of the transistor included in the light emitting control circuit is greater than 1, and the width-to-length ratio of the transistor included in the driving circuit is greater than 0.5.

Optionally, the energy storage circuit includes a storage capacitor; the light emitting element is an inorganic light emitting diode;

The capacitance value of the storage capacitor is greater than 3 times the gate-source capacitance of the transistor in the driving circuit.

In a specific implementation, the light emitting element may be an inorganic light emitting diode; the capacitance value of the storage capacitor may be greater than 3 times the gate-source capacitance of the transistor in the driving circuit.

In a specific implementation, the capacitance value of the storage capacitor is set to be greater than 3 times the gate-source capacitance of the transistor in the driving circuit, so that when the source potential of the transistor in the driving circuit changes, the gate potential of the transistor in the driving circuit can be maintained to ensure display accuracy.

Optionally, the light emitting element may also be an organic light emitting diode.

In at least one embodiment of the present disclosure, the gate-source capacitance of the transistor in the driving circuit may be a parasitic capacitance between the gate electrode and the source electrode of the transistor in the driving circuit, which may be calculated based on the facing area of the gate electrode and the source electrode of the transistor in the driving circuit, and a dielectric constant, wherein the dielectric constant may be calculated based on the material and thickness of the insulating layer between the gate electrode and the source electrode of the transistor in the driving circuit.

In specific implementation, the pixel circuit described in the embodiment of the present disclosure may include a driving circuit, a light emitting element, a storage circuit and a data writing-in circuit; the data writing-in circuit successively provides a display data voltage and a light emitting time control data voltage to the writing-in node under the control of a writing-in control signal provided by a writing-in control terminal;

Wherein, the writing-in node may be a second node; at this time, the data writing-in circuit may write the display data voltage and the light emitting time control data voltage into the second node in sequence;

Alternatively, the pixel circuit may further include a switch control circuit, and the writing-in node may include a first writing-in node and a second writing-in node; the data writing-in circuit may provide a display data voltage to the first writing-in node in a first writing-in time period, and provide a light emitting time control data voltage to the second writing-in node in a second writing-in time period.

In at least one embodiment of the present disclosure, the writing-in node is the second node; the pixel circuit further includes a first reset circuit and a second reset circuit;

The first reset circuit is electrically connected to the reset control terminal, the reference voltage terminal and the second node respectively, and is configured to write the reference voltage provided by the reference voltage terminal into the second node under the control of the reset control signal provided by the reset control terminal during a reset time period set between the time period for writing-in the display data voltage and the time period for writing-in the light emitting time control data voltage;

The second reset circuit is electrically connected to the reset control terminal, the first initial voltage terminal and the first node respectively, and is configured to write the first initial voltage provided by the first initial voltage terminal into the first node under the control of the reset control signal during the reset time period.

In a specific implementation, when the writing-in node is the second node, the pixel circuit may further include a first reset circuit and a second reset circuit, and the display cycle may include a first display phase and a second display phase that are set successively; the first display phase includes a first reset time period and a first writing-in time period that are set successively, and the second display phase includes a second reset time period and a second writing-in time period that are set successively;

In the first reset time period, the first reset circuit writes a reference voltage into the second node under the control of a reset control signal; the second reset circuit writes a first initial voltage into the first node under the control of the reset control signal;

In the first writing-in time period, the data writing-in circuit provides a display data voltage to the second node under the control of a writing-in control signal;

In the second reset time period, the first reset circuit writes a reference voltage into the second node under the control of a reset control signal; the second reset circuit writes a first initial voltage into the first node under the control of the reset control signal;

In the second writing-in time period, the data writing-in circuit provides a light emitting time control data voltage to the second node under the control of a writing-in control signal.

In at least one embodiment of the present disclosure, the writing-in node is the second node; the writing-in control terminal includes a first control terminal and a second control terminal; the data line includes a first data line and a second data line; the display cycle of the pixel circuit includes a first writing-in time period and a second writing-in time period which are set successively;

The data writing-in circuit is electrically connected to the first control terminal, the second control terminal, the first data line and the second data line respectively, and is configured to write the display data voltage provided by the second data line into the second node under the control of the second control signal provided by the second control terminal in the first writing-in time period, and to write the light emitting time control data voltage provided by the first data line into the second node under the control of the first control signal provided by the first control terminal in the second writing-in time period.

In a specific implementation, the writing-in control terminal may include a first control terminal and a second control terminal; the data line may include a first data line and a second data line; in a first writing-in time period, the data writing-in circuit writes the display data voltage provided by the second data line to the second node under the control of a second control signal, and in the second writing-in time period, the data writing-in circuit writes the light emitting time control data voltage provided by the first data line to the second node under the control of the first control signal.

As shown in FIG. 95, the pixel circuit according to at least one embodiment of the present disclosure includes a driving circuit 11, a light emitting element E1, an energy storage circuit 10, a data writing-in circuit 15, a first reset circuit 14 and a second reset circuit 51; the writing-in control terminal includes a first control terminal GB and a second control terminal GA; the second writing-in node is a second node N2;

The control terminal of the driving circuit 11 is electrically connected to the first node N1, and the driving circuit 11 is configured to generate a driving current for driving the light emitting element E1 under the control of the potential of the first node;

The first terminal of the energy storage circuit 10 is electrically connected to the first node N1, the second terminal of the energy storage circuit 10 is electrically connected to the second node N2, and the energy storage circuit 10 is configured to store electrical energy;

The data writing-in circuit 15 is electrically connected to the first control terminal GB, the second control terminal GA, the second node N2, the first data line DT and the second data line DI respectively, and is configured to write the display data voltage provided by the first data line DT into the second node N2 under the control of the first control signal provided by the first control terminal GB, and write the light emitting time control data voltage provided by the second data line DI into the second node N2 under the control of the second control signal provided by the second control terminal GA;

The first reset circuit 14 is electrically connected to the reset control terminal RST, the reference voltage terminal and the second node N2 respectively, and is configured to write the reference voltage Vref provided by the reference voltage terminal into the second node N2 under the control of the reset control signal provided by the reset control terminal RST in a first reset time period and a second reset time period; wherein the second reset time period is a reset time period set between the first writing-in time period and the second writing-in time period;

The second reset circuit 51 is electrically connected to the reset control terminal RST, the first initial voltage terminal I1 and the first node N1 respectively, and is configured to write the first initial voltage Vi1 provided by the first initial voltage terminal I1 into the first node N1 under the control of the reset control signal during the reset time period.

In the pixel circuit of the present disclosure as shown in FIG. 95, in the first reset time period and the second reset time period, before the first writing-in time period and before the second writing-in time period, the potential of the first node N1 and the potential of the second node N2 are reset, so that when the display data voltage and the light emitting time control data voltage have the same voltage value, in the first light emitting time period, the difference between the driving current generated by the driving circuit and the driving current generated by the driving circuit in the second light emitting time period is reduced, thereby reducing the brightness difference between the first light emitting time period and the second light emitting time period in the same frame time.

The first display phase includes a first light emitting time period set after the first writing-in time period, and the second display phase includes a second light emitting time period set after the second writing-in time period. In the first light emitting time period and the second light emitting time period, the driving circuit drives the light emitting element to emit light.

In at least one embodiment of the present disclosure, the writing-in node is the second node; the pixel circuit further includes a light emitting control circuit;

The first terminal of the driving circuit is electrically connected to the first voltage terminal, and the second terminal of the driving circuit is electrically connected to the third node; the light emitting control circuit is electrically connected to the light emitting control terminal, the third node and the first electrode of the light emitting element respectively, and is configured to control the connection between the third node and the first electrode of the light emitting element under the control of the light emitting control signal provided by the light emitting control terminal; the second electrode of the light emitting element is electrically connected to the second voltage terminal; or, The first electrode of the light emitting element is electrically connected to the first voltage terminal; the light emitting control circuit is electrically connected to the light emitting control terminal, the second electrode of the light emitting element and the first terminal of the driving circuit respectively, and is configured to control the connection between the second electrode of the light emitting element and the first terminal of the driving circuit under the control of the light emitting control signal; the second terminal of the driving circuit is electrically connected to the second voltage terminal.

In a specific implementation, when the writing-in node is the second node, the pixel circuit may further include a light emitting control circuit, and the light emitting control circuit controls a light emitting path under the control of a light emitting control signal.

Optionally, the light emitting element is an inorganic light emitting diode, the width-to-length ratio of the transistor included in the light emitting control circuit is greater than 1, and the width-to-length ratio of the transistor included in the driving circuit is greater than 0.5.

In a specific implementation, the light emitting element may be an inorganic light emitting diode. In this case, the width-to-length ratio of the transistor included in the light emitting control circuit may be greater than 1, and the width-to-length ratio of the transistor included in the driving circuit may be greater than 0.5. In at least one embodiment of the present disclosure, the width-to-length ratio of the transistor is the ratio of the channel width W to the channel length L of the transistor.

As shown in FIG. 96, based on the pixel circuit shown in FIG. 95, the pixel circuit further includes a light emitting control circuit 21;

The first terminal of the driving circuit 11 is electrically connected to the first voltage terminal V1, and the second terminal of the driving circuit 11 is electrically connected to the third node N3;

The light emitting control circuit 21 is electrically connected to the light emitting control terminal EM, the third node N3 and the first electrode of the light emitting element E1 respectively, and is configured to control the connection between the third node N3 and the first electrode of the light emitting element E1 under the control of the light emitting control signal provided by the light emitting control terminal EM;

The second electrode of the light emitting element E1 is electrically connected to the second voltage terminal V2.

As shown in FIG. 97, based on the pixel circuit shown in FIG. 95, the pixel circuit further includes a light emitting control circuit 21;

The first electrode of the light emitting element E1 is electrically connected to the first voltage terminal V1;

The first terminal of the driving circuit 11 is electrically connected to the third node N3;

The light emitting control circuit 21 is electrically connected to the light emitting control terminal EM, the second electrode of the light emitting element E1 and the first terminal of the driving circuit 11 respectively, and is configured to control the second electrode of the light emitting element E1 to be connected to the first terminal of the driving circuit 11 under the control of the light emitting control signal provided by the light emitting control terminal EM;

The second terminal of the driving circuit 11 is electrically connected to the second voltage terminal V2.

Optionally, the first voltage terminal may be a high voltage terminal, and the second voltage terminal may be a low voltage terminal, but is not limited thereto.

In at least one embodiment of the present disclosure, the pixel circuit further includes a switch control circuit; the writing-in node includes a first writing-in node and a second writing-in node; the data writing-in circuit includes a first writing-in sub-circuit and a second writing-in sub-circuit; the writing-in control terminal includes a first control terminal and a scanning terminal;

The first writing-in sub-circuit is electrically connected to the first control terminal, the first data line and the second writing-in node respectively, and is configured to write the light emitting time control data voltage provided by the first data line into the second writing-in node under the control of the first control signal provided by the first control terminal;

The second writing-in sub-circuit is electrically connected to the scanning terminal, the second data line and the first writing-in node respectively, and is configured to write the display data voltage provided by the second data line into the first writing-in node under the control of the scanning signal provided by the scanning terminal.

In a specific implementation, the pixel circuit may further include a switch control circuit, and the data writing-in circuit may include a first writing-in sub-circuit and a second writing-in sub-circuit. In a first writing-in time period, the second writing-in sub-circuit writes the display data voltage provided by the second data line into the first writing-in node under the control of a scanning signal; in a second writing-in time period, the first writing-in sub-circuit writes the light emitting time control data voltage provided by the first data line into the second writing-in node under the control of a first control signal.

Optionally, the light emitting element is an inorganic light emitting diode, the width-to-length ratio of the transistor included in the switch control circuit is greater than 1, and the width-to-length ratio of the transistor included in the driving circuit is greater than 0.5.

In a specific implementation, the light emitting element may be an inorganic light emitting diode, the width-to-length ratio of the transistor included in the switch control circuit may be greater than 1, and the width-to-length ratio of the transistor included in the driving circuit may be greater than 0.5.

In at least one embodiment of the present disclosure, the pixel circuit further includes a light emitting control circuit; the first terminal of the driving circuit is electrically connected to the first voltage terminal; the second terminal of the driving circuit is electrically connected to the third node;

The light emitting control circuit is electrically connected to the light emitting control terminal, the second terminal of the driving circuit and the switch control circuit respectively, and is configured to control the second terminal of the driving circuit to be connected to the switch control circuit under the control of the light emitting control signal provided by the light emitting control terminal;

The first terminal of the switch control circuit is electrically connected to the second terminal of the driving circuit through the light emitting control circuit, the second terminal of the switch control circuit is electrically connected to the first electrode of the light emitting element, and the switch control circuit is configured to control the connection between the light emitting control circuit and the first electrode of the light emitting element under the control of the potential of the switch control terminal;

The second electrode of the light emitting element is electrically connected to the second voltage terminal.

In a specific implementation, the pixel circuit may further include a light emitting control circuit, which may control the connection between the second terminal of the driving circuit and the switch control circuit under the control of a light emitting control signal; the switch control circuit is configured to control the connection between the light emitting control circuit and the first electrode of the light emitting element under the control of the potential of the switch control terminal.

As shown in FIG. 98, the pixel circuit according to at least one embodiment of the present disclosure includes a driving circuit 11, a light emitting element E1, an energy storage circuit 10, a data writing-in circuit 15, a first reset circuit 14, a second reset circuit 51, a switch control circuit 12, and a light emitting control circuit 21;

The control terminal of the driving circuit 11 is electrically connected to the first node N1, the first terminal of the driving circuit 11 is electrically connected to the first voltage terminal V1, and the second terminal of the driving circuit 11 is electrically connected to the third node N3;

The first terminal of the energy storage circuit 10 is electrically connected to the first node N1, the second terminal of the energy storage circuit is electrically connected to the second node N2, and the energy storage circuit 10 is configured to store electrical energy;

The writing-in node includes a first writing-in node and a second writing-in node; the data writing-in circuit includes a first writing-in sub-circuit 151 and a second writing-in sub-circuit 152; the writing-in control terminal includes a first control terminal GB and a scanning terminal G1; the first writing-in node is a second node N2; the second writing-in node is electrically connected to a switch control terminal N4;

The first writing-in sub-circuit 151 is electrically connected to the first control terminal GB, the first data line DT and the switch control terminal N4 respectively, and is configured to write the light emitting time control data voltage provided by the first data line DT into the switch control terminal N4 under the control of the first control signal provided by the first control terminal GB;

The second writing-in sub-circuit 152 is electrically connected to the scanning terminal G1, the second data line DI and the second node N2 respectively, and is configured to write the display data voltage provided by the second data line DI into the second node N2 under the control of the scanning signal provided by the scanning terminal G1;

The first reset circuit 14 is electrically connected to the reset control terminal RST, the reference voltage terminal and the second node N2 respectively, and is configured to write the reference voltage Vref provided by the reference voltage terminal into the second node N2 under the control of the reset control signal provided by the reset control terminal RST in a first reset time period and a second reset time period; wherein the second reset time period is a reset time period set between the first writing-in time period and the second writing-in time period;

The second reset circuit 51 is electrically connected to the reset control terminal RST, the first initial voltage terminal I1 and the first node N1 respectively, and is configured to write the first initial voltage Vi1 provided by the first initial voltage terminal I1 into the first node N1 under the control of the reset control signal during the reset time period;

The light emitting control circuit 21 is electrically connected to the light emitting control terminal EM, the third node N3 and the first terminal of the switch control circuit 12 respectively, and is configured to control the third node N3 to be connected to the first terminal of the switch control circuit 12 under the control of the light emitting control signal provided by the light emitting control terminal EM;

The control terminal of the switch control circuit 12 is electrically connected to the switch control terminal N4, and the second terminal of the switch control circuit 12 is electrically connected to the first electrode of the light emitting element E1. The switch control circuit 12 is configured to control the connection between the light emitting control circuit 21 and the first electrode of the light emitting element E1 under the control of the potential of the switch control terminal N4;

The second electrode of the light emitting element is electrically connected to the second voltage terminal V2.

When the pixel circuit shown in FIG. 98 of the present disclosure is working, the pixel circuit writes the display data voltage and the light emitting time control data voltage to the second node and the switch control terminal in sequence through the second writing-in sub-circuit and the second writing-in sub-circuit, to realize the driving current+light emitting time control mode and improve the display effect.

In at least one embodiment of the present disclosure, the pixel circuit further includes a light emitting control circuit; the first electrode of the light emitting element is electrically connected to the first voltage terminal; the first terminal of the driving circuit is electrically connected to the third node;

The first terminal of the switch control circuit is electrically connected to the second electrode of the light emitting element, the second terminal of the switch control circuit is electrically connected to the first terminal of the driving circuit through the light emitting control circuit, and the switch control circuit is configured to control the connection between the second electrode of the light emitting element and the light emitting control circuit under the control of the potential of the switch control terminal;

The light emitting control circuit is electrically connected to the light emitting control terminal, the switch control circuit and the first terminal of the driving circuit respectively, and is configured to control the switch control circuit to be connected to the first terminal of the driving circuit under the control of the light emitting control signal provided by the light emitting control terminal;

The second terminal of the driving circuit is electrically connected to the second voltage terminal.

In a specific implementation, the pixel circuit may further include a light emitting control circuit, wherein the switch control circuit controls the connection between the second electrode of the light emitting element and the light emitting control circuit under the control of the potential of the switch control terminal; and the light emitting control circuit controls the connection between the switch control circuit and the first terminal of the driving circuit under the control of the light emitting control signal provided by the light emitting control terminal.

As shown in FIG. 99, the pixel circuit according to at least one embodiment of the present disclosure includes a driving circuit 11, a light emitting element E1, an energy storage circuit 10, a data writing-in circuit 15, a first reset circuit 14, a second reset circuit 51, a switch control circuit 12, and a light emitting control circuit 21;

The first electrode of the light emitting element E1 is electrically connected to the first voltage terminal V1;

The control terminal of the switch control circuit 12 is electrically connected to the switch control terminal N4, the first terminal of the switch control circuit 12 is electrically connected to the second electrode of the light emitting element E1, the second terminal of the switch control circuit 12 is electrically connected to the first terminal of the light emitting control circuit 21, and the switch control circuit 12 controls the second electrode of the light emitting element E1 to be connected to the first terminal of the light emitting control circuit 21 under the control of the potential of the switch control terminal N4;

The control terminal of the light emitting control circuit 21 is electrically connected to the light emitting control terminal EM, and the second terminal of the light emitting control circuit 21 is electrically connected to the first terminal of the driving circuit 11. The light emitting control circuit 21 is configured to control the second terminal of the switch control circuit 12 to be connected to the first terminal of the driving circuit 11 under the control of the light emitting control signal provided by the light emitting control terminal EM;

The control terminal of the driving circuit 11 is electrically connected to the first node N1, and the second terminal of the driving circuit 11 is electrically connected to the second voltage terminal V2. The driving circuit 11 is configured to drive the light emitting element E1 to emit light under the control of the potential of the first node N1;

The first terminal of the energy storage circuit 10 is electrically connected to the first node N1, the second terminal of the energy storage circuit is electrically connected to the second node N2, and the energy storage circuit 10 is configured to store electrical energy;

The writing-in node includes a first writing-in node and a second writing-in node; the data writing-in circuit includes a first writing-in sub-circuit 151 and a second writing-in sub-circuit 152; the writing-in control terminal includes a first control terminal GB and a scanning terminal G1; the first writing-in node is a second node N2; the second writing-in node is electrically connected to a switch control terminal N4;

The first writing-in sub-circuit 151 is electrically connected to the first control terminal GB, the first data line DT and the switch control terminal N4 respectively, and is configured to write the light emitting time control data voltage provided by the first data line DT into the switch control terminal N4 under the control of the first control signal provided by the first control terminal GB;

The second writing-in sub-circuit 152 is electrically connected to the scanning terminal G1, the second data line DI and the second node N2 respectively, and is configured to write the display data voltage provided by the second data line DI into the second node N2 under the control of the scanning signal provided by the scanning terminal G1;

The first reset circuit 14 is electrically connected to the reset control terminal RST, the reference voltage terminal and the second node N2 respectively, and is configured to write the reference voltage Vref provided by the reference voltage terminal into the second node N2 under the control of the reset control signal provided by the reset control terminal RST in a first reset time period and a second reset time period; wherein the second reset time period is a reset time period set between the first writing-in time period and the second writing-in time period;

The second reset circuit 51 is electrically connected to the reset control terminal RST, the first initial voltage terminal I1 and the first node N1 respectively, and is configured to write the first initial voltage Vi1 provided by the first initial voltage terminal I1 into the first node N1 under the control of the reset control signal during the reset time period.

When the pixel circuit shown in FIG. 99 of the present disclosure is working, the pixel circuit writes the display data voltage and the light emitting time control data voltage to the second node and the switch control terminal in sequence through the second writing-in sub-circuit and the second writing-in sub-circuit, to realize the driving current+light emitting time control mode and improve the display effect.

The pixel circuit described in at least one embodiment of the present disclosure further includes an initialization circuit and a voltage maintenance circuit;

The initialization circuit is electrically connected to the second control terminal, the second initial voltage terminal and the second writing-in node respectively, and is configured to write the second initial voltage provided by the second initial voltage terminal into the second writing-in node under the control of the second control signal provided by the second control terminal;

The voltage maintenance circuit is electrically connected to the switch control terminal and is configured to maintain the potential of the switch control terminal.

In a specific implementation, the pixel circuit may further include an initialization circuit and a voltage maintenance circuit. The initialization circuit writes a second initial voltage into the second writing-in node under the control of a second control signal, to reset the potential of the second writing-in node, that is, to reset the potential of the switch control terminal. The voltage maintenance circuit is configured to maintain the potential of the switch control terminal.

As shown in FIG. 100, based on the pixel circuit shown in FIG. 98, the pixel circuit according to at least one embodiment of the present disclosure further includes an initialization circuit 50 and a voltage maintenance circuit 60;

The initialization circuit 50 is electrically connected to the second control terminal GA, the second initial voltage terminal I2 and the switch control terminal N4 respectively, and is configured to write the second initial voltage provided by the second initial voltage terminal I3 into the switch control terminal N4 under the control of the second control signal provided by the second control terminal GA;

The voltage maintenance circuit 60 is electrically connected to the switch control terminal N4 and is configured to maintain the potential of the switch control terminal N4.

As shown in FIG. 101, based on the pixel circuit shown in FIG. 99, the pixel circuit according to at least one embodiment of the present disclosure further includes an initialization circuit 50 and a voltage maintenance circuit 60;

The initialization circuit 50 is electrically connected to the second control terminal GA, the second initial voltage terminal I2 and the switch control terminal N4 respectively, and is configured to write the second initial voltage provided by the second initial voltage terminal I3 into the switch control terminal N4 under the control of the second control signal provided by the second control terminal GA;

The voltage maintenance circuit 60 is electrically connected to the switch control terminal N4, and is configured to maintain the potential of the switch control terminal N4;

The third node N3 is electrically connected to the first terminal of the driving circuit 11.

The pixel circuit described in at least one embodiment of the present disclosure further includes a compensation control circuit and a voltage control circuit;

The compensation control circuit is electrically connected to the scanning terminal, the first node and the third node respectively, and is configured to control the connection between the first node and the third node under the control of the scanning signal provided by the scanning terminal;

The voltage control circuit is electrically connected to the light emitting control terminal, the reference voltage terminal and the second node respectively, and is configured to write the reference voltage provided by the reference voltage terminal into the second writing-in node under the control of the light emitting control signal provided by the light emitting control terminal.

In a specific implementation, the pixel circuit may further include a compensation control circuit and a voltage control circuit. The compensation control circuit controls the connection between the first node and the third node under the control of a scanning signal; and the voltage control circuit writes the reference voltage provided by the reference voltage terminal into the second writing-in node under the control of the light emitting control signal.

As shown in FIG. 102, based on the pixel circuit shown in FIG. 96, the pixel circuit according to at least one embodiment of the present disclosure further includes a compensation control circuit 32 and a voltage control circuit 70;

The compensation control circuit 32 is electrically connected to the scanning terminal G1, the first node N1 and the third node N3 respectively, and is configured to control the connection between the first node N1 and the third node N3 under the control of the scanning signal provided by the scanning terminal G1;

The voltage control circuit 70 is electrically connected to the light emitting control terminal EM, the reference voltage terminal and the second node N2 respectively, and is configured to write the reference voltage Vref provided by the reference voltage terminal into the second node N2 under the control of the light emitting control signal provided by the light emitting control terminal EM.

As shown in FIG. 103, based on the pixel circuit shown in FIG. 97, the pixel circuit described in at least one embodiment of the present disclosure further includes a compensation control circuit 32 and a voltage control circuit 70;

The compensation control circuit 32 is electrically connected to the scanning terminal G1, the first node N1 and the third node N3 respectively, and is configured to control the connection between the first node N1 and the third node N3 under the control of the scanning signal provided by the scanning terminal G1;

The voltage control circuit 70 is electrically connected to the light emitting control terminal EM, the reference voltage terminal and the second node N2 respectively, and is configured to write the reference voltage Vref provided by the reference voltage terminal into the second node N2 under the control of the light emitting control signal provided by the light emitting control terminal EM.

As shown in FIG. 104, based on the pixel circuit shown in FIG. 100, the pixel circuit described in at least one embodiment of the present disclosure further includes a compensation control circuit 32 and a voltage control circuit 70;

The compensation control circuit 32 is electrically connected to the scanning terminal G1, the first node N1 and the third node N3 respectively, and is configured to control the connection between the first node N1 and the third node N3 under the control of the scanning signal provided by the scanning terminal G1;

The voltage control circuit 70 is electrically connected to the light emitting control terminal EM, the reference voltage terminal and the second node N2 respectively, and is configured to write the reference voltage Vref provided by the reference voltage terminal into the second node N2 under the control of the light emitting control signal provided by the light emitting control terminal EM.

As shown in FIG. 105, based on the pixel circuit shown in FIG. 101, the pixel circuit described in at least one embodiment of the present disclosure further includes a compensation control circuit 32 and a voltage control circuit 70;

The compensation control circuit 32 is electrically connected to the scanning terminal G1, the first node N1 and the third node N3 respectively, and is configured to control the connection between the first node N1 and the third node N3 under the control of the scanning signal provided by the scanning terminal G1;

The voltage control circuit 70 is electrically connected to the light emitting control terminal EM, the reference voltage terminal and the second node N2 respectively, and is configured to write the reference voltage Vref provided by the reference voltage terminal into the second node N2 under the control of the light emitting control signal provided by the light emitting control terminal EM.

Optionally, the first reset circuit includes a transistor, and the second reset circuit includes a second transistor;

a gate electrode of the first transistor is electrically connected to the reset control terminal, a first electrode of the first transistor is electrically connected to the reference voltage terminal, and a second electrode of the first transistor is electrically connected to the second node;

A gate electrode of the second transistor is electrically connected to the reset control terminal, a first electrode of the second transistor is electrically connected to the first initial voltage terminal, and a second electrode of the second transistor is electrically connected to the first node.

Optionally, the data writing-in circuit includes a third transistor and a fourth transistor;

a gate electrode of the third transistor is electrically connected to the first control terminal, a first electrode of the third transistor is electrically connected to the first data line, and a second electrode of the third transistor is electrically connected to the second node;

A gate electrode of the fourth transistor is electrically connected to the second control terminal, a first electrode of the fourth transistor is electrically connected to the second data line, and a second electrode of the fourth transistor is electrically connected to the second node.

Optionally, the data writing-in circuit includes a third transistor;

a gate electrode of the third transistor is electrically connected to the scanning terminal, a first electrode of the third transistor is electrically connected to the data line, and a second electrode of the third transistor is electrically connected to the second node;

The data lines are configured to provide display data voltage and light emitting time control data voltage in time division mode.

Optionally, the first writing-in sub-circuit includes a third transistor, and the second writing-in sub-circuit includes a fourth transistor;

a gate electrode of the third transistor is electrically connected to the first control terminal, a first electrode of the third transistor is electrically connected to the first data line, and a second electrode of the third transistor is electrically connected to the second writing-in node;

A gate electrode of the fourth transistor is electrically connected to the second control terminal, a first electrode of the fourth transistor is electrically connected to the second data line, and a second electrode of the fourth transistor is electrically connected to the first writing-in node.

Optionally, the light emitting control circuit includes a fifth transistor; the driving circuit includes a driving transistor;

a second electrode of the driving transistor is electrically connected to the third node; a gate electrode of the fifth transistor is electrically connected to the light emitting control terminal, a first electrode of the fifth transistor is electrically connected to the second electrode of the driving transistor, and a second electrode of the fifth transistor is electrically connected to the first electrode of the light emitting element; a gate electrode of the driving transistor is electrically connected to the first node, and a first electrode of the driving transistor is electrically connected to the first voltage terminal; or, The first electrode of the light emitting element is electrically connected to the first voltage terminal, the gate electrode of the fifth transistor is electrically connected to the light emitting control terminal, the first electrode of the fifth transistor is electrically connected to the second electrode of the light emitting element, and the second electrode of the fifth transistor is electrically connected to the first electrode of the driving transistor; the gate electrode of the driving transistor is electrically connected to the first node, and the second electrode of the driving transistor is electrically connected to the second voltage terminal.

Optionally, the compensation control circuit includes a sixth transistor, and the voltage control circuit includes a seventh transistor;

a gate electrode of the sixth transistor is electrically connected to the scanning terminal, a first electrode of the sixth transistor is electrically connected to the first node, and a second electrode of the sixth transistor is electrically connected to the third node;

A gate electrode of the seventh transistor is electrically connected to the light emitting control terminal, a first electrode of the seventh transistor is electrically connected to a reference voltage terminal, and a second electrode of the seventh transistor is electrically connected to the second node.

Optionally, the light emitting control circuit includes a fifth transistor; the switch control circuit includes an eighth transistor; and the driving circuit includes a driving transistor;

a gate electrode of the driving transistor is electrically connected to the first node, a first electrode of the driving transistor is electrically connected to the first voltage terminal, and a second electrode of the driving transistor is electrically connected to the third node;

a gate electrode of the fifth transistor is electrically connected to the light emitting control terminal, a first electrode of the fifth transistor is electrically connected to the third node, and a second electrode of the fifth transistor is electrically connected to the first electrode of the eighth transistor;

a gate electrode of the eighth transistor is electrically connected to the switch control terminal, and a second electrode of the eighth transistor is electrically connected to the first electrode of the light emitting element.

Optionally, the light emitting control circuit includes a fifth transistor; the switch control circuit includes an eighth transistor; and the driving circuit includes a driving transistor;

a gate electrode of the eighth transistor is electrically connected to the switch control terminal, a first electrode of the eighth transistor is electrically connected to the second electrode of the light emitting element, and a second electrode of the eighth transistor is electrically connected to the first electrode of the fifth transistor;

a gate electrode of the fifth transistor is electrically connected to the light emitting control terminal, and a second electrode of the fifth transistor is electrically connected to the first electrode of the driving transistor;

a gate electrode of the driving transistor is electrically connected to the first node, and a second electrode of the driving transistor is electrically connected to the second voltage terminal.

Optionally, the initialization circuit includes a ninth transistor, the energy storage circuit includes a first capacitor; and the voltage maintenance circuit includes a second capacitor;

a gate electrode of the ninth transistor is electrically connected to the second control terminal, a first electrode of the ninth transistor is electrically connected to the second initial voltage terminal, and a second electrode of the ninth transistor is electrically connected to the second writing-in node;

A first terminal of the first capacitor is electrically connected to the first node, and a second terminal of the first capacitor is electrically connected to the second node;

a first terminal of the second capacitor is electrically connected to the switch control terminal, and a second terminal of the second capacitor is electrically connected to the DC voltage terminal.

Optionally, the DC voltage terminal may be a common electrode voltage terminal, a high voltage terminal, a low voltage terminal or a ground terminal, but is not limited thereto.

Optionally, the light emitting element may be a light emitting diode;

The light emitting diode may be an organic light emitting diode, a Mini LED (mini light emitting diode) or a Micro LED (micro light emitting diode), but is not limited thereto.

As shown in FIG. 106, based on the pixel circuit shown in FIG. 102, the light emitting element is a light emitting diode E0; the energy storage circuit includes a first capacitor C1;

The first reset circuit includes a transistor T1, and the second reset circuit includes a second transistor T2;

A first terminal of the first capacitor C1 is electrically connected to a first node N1, and a second terminal of the first capacitor C1 is electrically connected to a second node N2;

The gate electrode of the first transistor T1 is electrically connected to the reset control terminal RST, the source electrode of the first transistor T1 is electrically connected to the reference voltage terminal, and the drain electrode of the first transistor T1 is electrically connected to the second node N2; the reference voltage terminal is configured to provide a reference voltage Vref;

The gate electrode of the second transistor T2 is electrically connected to the reset control terminal RST, the source electrode of the second transistor T2 is electrically connected to the first initial voltage terminal I1, and the drain electrode of the second transistor T2 is electrically connected to the first node N1; the first initial voltage terminal I1 is configured to provide a first initial voltage Vi1;

The data writing-in circuit includes a third transistor T3 and a fourth transistor T4;

The gate electrode of the third transistor T3 is electrically connected to the first control terminal GB, the source electrode of the third transistor T3 is electrically connected to the first data line DT, and the drain electrode of the third transistor T3 is electrically connected to the second node N2;

The gate electrode of the fourth transistor T4 is electrically connected to the second control terminal GA, the source electrode of the fourth transistor T4 is electrically connected to the second data line DI, and the drain electrode of the fourth transistor T4 is electrically connected to the second node N2;

The light emitting control circuit includes a fifth transistor T5; the driving circuit includes a driving transistor T0;

The gate electrode of the driving transistor T0 is electrically connected to the first node N1, and the drain electrode of the driving transistor T0 is electrically connected to the third node N3;

The gate electrode of the fifth transistor T5 is electrically connected to the light emitting control terminal EM, the source electrode of the fifth transistor T5 is electrically connected to the drain electrode of the driving transistor T0, the drain electrode of the fifth transistor T5 is electrically connected to the anode of the light emitting diode E0; the cathode of E0 is electrically connected to the low voltage terminal VSS;

The gate electrode of the driving transistor T0 is electrically connected to the first node N1, and the source electrode of the driving transistor T0 is electrically connected to the high voltage terminal VDD;

The compensation control circuit includes a sixth transistor T6, and the voltage control circuit includes a seventh transistor T7;

The gate electrode of the sixth transistor T6 is electrically connected to the scanning terminal G1, the source electrode of the sixth transistor T6 is electrically connected to the first node N1, and the drain electrode of the sixth transistor T6 is electrically connected to the third node N3;

A gate electrode of the seventh transistor T7 is electrically connected to the light emitting control terminal EM, a source electrode of the seventh transistor T7 is electrically connected to a reference voltage terminal, and a drain electrode of the seventh transistor T7 is electrically connected to the second node N2.

In the pixel circuit shown in FIG. 106, the light emitting element may be an organic light emitting diode, a Mini LED or a Micro LED, but is not limited thereto.

In the pixel circuit shown in FIG. 106, all transistors are PMOS (P-type metal-oxide-semiconductor) TFTs (thin film transistors), but the present invention is not limited thereto.

When the pixel circuit shown in FIG. 106 of the present disclosure is in operation, the light emitting time control data voltage and the display data voltage are written in a time-division mode through the first data line DT and the second data line DI.

When the pixel circuit shown in FIG. 106 is in operation,

When displaying at a high gray scale, Vi1−Vth is less than Vdd, Vref is less than or equal to Vdata_I, and Vdata_I is equal to Vdata_T; wherein Vth is the threshold voltage of T0, and Vdd is the voltage value of the high voltage signal provided by VDD;

In low grayscale display, Vi1−Vth is less than Vdd, Vdata_T is less than Vref, and Vref is less than or equal to Vdata_I.

As shown in FIG. 107, when the pixel circuit shown in FIG. 106 of the present disclosure is in operation, a display cycle (the display cycle may be one frame of time) includes a first display phase S1 and a second display phase S2 which are successively arranged;

The first display phase S1 includes a first reset time period S11, a first writing-in time period S12 and a first light emitting time period S13 which are arranged successively;

The second display phase S2 includes a second reset time period S21, a second writing-in time period S22 and a second light emitting time period S23 which are arranged successively;

In the first reset time period S11, EM provides a high voltage signal, RST provides a low voltage signal, G1 provides a high voltage signal, GA provides a high voltage signal, and GB provides a high voltage signal, as shown in FIG. 108A, T1 and T2 are turned on, Vref is written into the second node N2, Vi1 is written into the first node N1, and the potential of the first node N1 and the potential of the second node N2 are reset;

In the first writing-in time period S12, EM provides a high voltage signal, RST provides a high voltage signal, G1 provides a low voltage signal, GA provides a low voltage signal, GB provides a high voltage signal, as shown in FIG. 108B, T4 and T6 are turned on, and DI provides display data voltages Vdata_I to N2;

At the beginning of the first writing-in time period S12, T0 is turned on, and C1 is charged by the display data voltage Vdata_I to change the potential of N1 until the potential of N1 becomes Vdd+Vth, and T0 is turned off to perform threshold voltage compensation; wherein Vdd is the voltage value of the high voltage signal provided by VDD, and Vth is the threshold voltage of T0; at this time, the potential of N2 is Vdata_I;

In the first light emitting time period S13, EM provides a low voltage signal, RST provides a high voltage signal, G1 provides a high voltage signal, GA provides a high voltage signal, and GB provides a high voltage signal, as shown in FIG. 108C, T5 is turned on, and T0 drives E0 to emit light;

In the first light emitting time period S13, T7 is turned on, the potential of N2 is Vref, due to the coupling effect of C1, the potential of N1 becomes Vdd+Vth+Vref−Vdata_I, the gate-source voltage Vgs of T0 is equal to Vth+Vref−Vdata_I, and Id is equal to $K\times(Vgs-Vth)^2=K\times(Vref-Vdata\_I)^2$; wherein, Id is the driving current; K is the current coefficient of T0, and K is a coefficient related to the mobility, channel width-to-length ratio and capacitance of T0; the driving current is the driving current generated by T0 to drive E0 to emit light;

In FIG. 105, the first time is labeled t1, and the first time t1 is the duration of S23;

In the second reset time period S21, EM provides a high voltage signal, RST provides a low voltage signal, G1 provides a high voltage signal, GA provides a high voltage signal, and GB provides a high voltage signal, as shown in FIG. 108D, T1 and T2 are turned on, Vref is written into the second node N2, Vi1 is written into the first node N1, and the potential of the first node N1 and the potential of the second node N2 are reset;

In the second writing-in time period S22, EM provides a high voltage signal, RST provides a high voltage signal, G1 provides a low voltage signal, GB provides a low voltage signal, GA provides a high voltage signal, as shown in FIG. 108E, T3 and T6 are turned on, and DT provides a light emitting time control data voltage Vdata_T to N2;

At the beginning of the second writing-in time period S22, T0 is turned on, and the data voltage Vdata_T is controlled by the light emitting time to charge C1 to change the potential of N1 until the potential of N1 becomes Vdd+Vth, and T0 is turned off to perform threshold voltage compensation; wherein Vdd is the voltage value of the high voltage signal provided by VDD, and Vth is the threshold voltage of T0; at this time, the potential of N2 is Vdata_T;

In the second light emitting time period S23, EM provides a low voltage signal, RST provides a high voltage signal, G1 provides a high voltage signal, GA provides a high voltage signal, GB provides a high voltage signal, T5 is turned on, and T0 drives E0 to emit light;

In the second light emitting time period S23,

When low grayscale display is performed, EM outputs a low voltage signal, as shown in FIG. 108F, T5 and T7 are turned on, Vref is written to N2, and in the second writing-in time period S22, Vdata_T is the first light emitting time control data voltage Vdata_TL, Vdata_TL is a low voltage signal, at this time, the potential of N2 is Vref, due to the coupling effect of C1, the potential of N1 is Vdd+Vth+Vref−Vdata_TL, Vgs is greater than Vth, T0 is turned off, E0 does not emit light, and short-duration light emitting is achieved. In the display time period, the light emitting duration is t1;

When performing high grayscale display, EM outputs a low voltage signal, T5 and T7 are turned on, and the voltage value of the light emitting time control data voltage written by DT is the same as Vdata_I. At this time, the potential of N2 is Vref. Due to the coupling effect of C1, the potential of N1 is equal to Vdd+Vth+Vref−Vdata_I. Since Vref is less than Vdata_I, Vgs is equal to Vref−Vdata_I+Vth, Vgs is less than Vth, T0 is turned on, and E0 continues to emit light. During the display cycle, the light emitting duration is t1+t2, t2 is the second time, and t2 is the duration of the second light emitting time period S23.

FIG. 109A is a schematic diagram showing simulation results of the pixel circuit shown in FIG. 106 of the present disclosure when displaying at low grayscale;

FIG. 109B is a schematic diagram of simulation results of the pixel circuit shown in FIG. 106 of the present disclosure when displaying at high grayscale.

In at least one embodiment corresponding to FIG. 109A, Vi1 is equal to −3V, Vdd is equal to 4.6V, Vss is equal to −3V, Vdata_I is equal to Vdata_T, Vdata_I is equal to 4V, and Vref is 2V; wherein Vss is the voltage value of the low voltage signal provided by VSS;

In at least one embodiment corresponding to FIG. 109B, Vi1 is equal to −3V, Vdd is equal to 4.6V, Vss is equal to −3V, Vdata_I is equal to 4V, Vdata_T is equal to 1V, and Vref is 2V.

In at least one embodiment of the present disclosure, Id is the driving current generated at T0.

As shown in FIG. 110, when the pixel circuit shown in FIG. 106 of the present disclosure is in operation, a display cycle (the display cycle may be one frame of time) may include a first display phase and n second display phases that are arranged in sequence; in a writing-in time period in the first display phase, DI writes a display data voltage, and in a second display phase, DT writes a light emitting time control data voltage;

In FIG. 110, the first display phase is labeled S1, the first second display phase is labeled S01, the (n−1)th first display phase is labeled S0*n*−1, and the nth first display phase is labeled S0*n*; n is an integer greater than 2;

The first display phase S1 includes a first reset time period S11, a first writing-in time period S12 and a first light emitting time period S13 which are arranged successively;

The first second display phase S01 includes a first second reset time period S010, a first second writing-in time period S011 and a first second light emitting time period S012 which are successively arranged;

The (n−1)th second display phase S0*n*−1 includes the (n−1)th second reset time period S0*n*−10, the (n−1)th second writing-in time period S0*n*−11 and the (n−1)th second light emitting time period S0*n*−12 which are arranged successively;

The nth second display phase S0*n* includes an nth second reset time period S0*n*0, an nth second writing-in time period S0*n*1 and an nth second light emitting time period S0*n*2 which are arranged successively;

In the first reset time period S11, EM provides a high voltage signal, RST provides a low voltage signal, G1 provides a high voltage signal, GA provides a high voltage signal, GB provides a high voltage signal, T1 and T2 are turned on, Vref is written into the second node N2, Vi1 is written into the first node N1, and the potential of the first node N1 and the potential of the second node N2 are reset;

In the first writing-in time period S12, EM provides a high voltage signal, RST provides a high voltage signal, G1 provides a low voltage signal, GA provides a low voltage signal, GB provides a high voltage signal, T4 and T6 are turned on, and DI provides display data voltages Vdata_I to N2;

At the beginning of the first writing-in time period S12, T0 is turned on, and C1 is charged by the display data voltage Vdata_I to change the potential of N1 until the potential of N1 becomes Vdd+Vth, and T0 is turned off to perform threshold voltage compensation; wherein Vdd is the voltage value of the high voltage signal provided by VDD, and Vth is the threshold voltage of T0; at this time, the potential of N2 is Vdata_I;

In the first light emitting time period S13, EM provides a low voltage signal, RST provides a high voltage signal, G1 provides a high voltage signal, GA provides a high voltage signal, GB provides a high voltage signal, T5 is turned on, and T0 drives E0 to emit light;

In the first light emitting time period S13, T7 is turned on, the potential of N2 is Vref, due to the coupling effect of C1, the potential of N1 becomes Vdd+Vth+Vref−Vdata_I, the gate-source voltage Vgs of T0 is equal to Vth+Vref−Vdata_I, and Id is equal to $K\times(Vgs-Vth)^2=K\times(Vref-Vdata\_I)^2$; wherein, Id is the driving current; K is the current coefficient of T0, and K is a coefficient related to the mobility, channel width-to-length ratio and capacitance of T0; the driving current is the driving current generated by T0 to drive E0 to emit light;

At S010, EM provides a high voltage signal, RST provides a low voltage signal, G1 provides a high voltage signal, GA and GB provide high voltage signals, T1 and T2 are turned on, Vref is written into the second node N2, Vi1 is written into the first node N1, and the potential of the first node N1 and the potential of the second node N2 are reset;

At S011, EM provides a high voltage signal, RST provides a high voltage signal, G1 provides a low voltage signal, GA provides a high voltage signal, GB provides a low voltage signal, T6 and T3 are turned on, and DT writes the first light emitting time control data voltage Vdata_T1 into N2;

At the beginning of S011, T0 is turned on to charge C1 through Vdata_T1 to change the potential of N1 until the potential of N1 becomes Vdd+Vth, and T0 is turned off; wherein Vdd is the voltage value of the high voltage signal provided by VDD, and Vth is the threshold voltage of T0;

In S012, EM provides a low voltage signal, RST provides a high voltage signal, G1 provides a high voltage signal, GA and GB provide high voltage signals, T5 and T7 are turned on, and the potential of N2 is Vref, When DT provides a low voltage signal at S011, T3 is turned on, T4 is turned on, and T0 drives E0 to emit light at S012;

When DT provides a high voltage signal at S011, T3 is turned off at S012, and E0 does not emit light;

At S0*n*−10, EM provides a high voltage signal, RST provides a low voltage signal, G1 provides a high voltage signal, GA and GB provide high voltage signals, T1 and T2 are turned on, Vref is written into the second node N2, Vi1 is written into the first node N1, and the potential of the first node N1 and the potential of the second node N2 are reset;

At S0*n*−11, EM provides a high voltage signal, RST provides a high voltage signal, G1 provides a low voltage signal, GA provides a high voltage signal, GB provides a low voltage signal, T6 and T3 are turned on, and DT writes the (n−1)th light emitting time control data voltage Vdata_Tn−1 into N2;

At the beginning of S0*n*−11, T0 is turned on to charge C1 through Vdata_Tn−1 to change the potential of N1 until the potential of N1 becomes Vdd+Vth, and T0 is turned off; wherein Vdd is the voltage value of the high voltage signal provided by VDD, and Vth is the threshold voltage of T0;

At S0*n*−12, EM provides a low voltage signal, RST provides a high voltage signal, G1 provides a high voltage signal, GA and GB provide high voltage signals, T5 and T7 are turned on, and the potential of N2 is Vref;

When DT provides a low voltage signal at S0*n*−11, T3 is turned on at S0*n*−12, T4 is turned on, and T0 drives E0 to emit light;

When DT provides a high voltage signal at S0*n*−11, T3 is turned off at S0*n*−12, and E0 does not emit light;

At S**0*n*0, EM provides a high voltage signal, RST provides a low voltage signal, G1 provides a high voltage signal, GA and GB provide high voltage signals, T1 and T2 are turned on, Vref is written into the second node N2, Vi1 is written into the first node N1, and the potential of the first node N1 and the potential of the second node N2** are reset;

At S**0*n*1, EM provides a high voltage signal, RST provides a high voltage signal, G1 provides a low voltage signal, GA provides a high voltage signal, GB provides a low voltage signal, T6 and T3 are turned on, and DT writes the nth light emitting time control data voltage Vdata_Tn into N2**;

At the beginning of S**0*n*1, T0 is turned on to charge C1 through Vdata_Tn−1 to change the potential of N1 until the potential of N1 becomes Vdd+Vth, and T0 is turned off; wherein Vdd is the voltage value of the high voltage signal provided by VDD, and Vth is the threshold voltage of T0**;

At S**0*n*2, EM provides a low voltage signal, RST provides a high voltage signal, G1 provides a high voltage signal, GA and GB provide high voltage signals, T5 and T7 are turned on, and the potential of N2** is Vref;

When DT provides a low voltage signal at S**0*n*1, T3 is turned on at S0*n*2, T4 is turned on, and T0 drives E0** to emit light;

When DT provides a high voltage signal at S**0*n*1, T3 is turned off at S0*n*2, and E0** does not emit light.

As shown in FIG. 110, when the pixel circuit shown in FIG. 106 of the present disclosure is working, the pixel circuit writes the light emitting time control data voltage multiple times within one frame of time, writes the light emitting time control data voltage at a high frequency, divides the low grayscale short-time light emitting into multiple short-time light emitting, realizes low grayscale short-time high-frequency light emitting, reduces the continuous non-light emitting time within one frame of time, and further reduces low grayscale flicker, realizes healthy display, and improves display performance.

In specific implementation, the high-frequency writing-in of the light emitting time control data voltage can be input by multiple groups of first data lines, or a frame is divided into multiple sub-frames and a single first data line is input multiple times, or the second initial voltage and the light emitting time control data voltage can be written alternately at high frequency.

FIG. 111 is a schematic diagram of the light emitting time of the pixel circuit shown in FIG. 106 when emitting light at a high grayscale and at a low grayscale;

As shown in FIG. 111, n is equal to 10;

When high grayscale display is performed, the light emitting duration may be t1+t2+t3+t4+t5+t6+t7+t8+t9+t10+t11;

When performing low grayscale display, the light emitting duration may be t1+t4+t7+t10;

t1 is the first time, t2 is the second time, t3 is the third time, t4 is the fourth time, t5 is the fifth time, t6 is the sixth time, t7 is the seventh time, t8 is the eighth time, t9 is the ninth time, t10 is the tenth time, and t11 is the eleventh time;

t1 is the duration of the first light emitting time period, t2 is the duration of the first second light emitting time period, t3 is the duration of the second second light emitting time period, t4 is the duration of the third second light emitting time period, t5 is the duration of the fourth second light emitting time period, t6 is the duration of the fifth second light emitting time period, t7 is the duration of the sixth second light emitting time period, t8 is the duration of the seventh second light emitting time period, t9 is the duration of the eighth second light emitting time period, t10 is the duration of the ninth second light emitting time period, and t11 is the duration of the tenth second light emitting time period.

The difference between the pixel circuit shown in FIG. 112 and the pixel circuit shown in FIG. 106 is that:

T1, T2, T3, T4 and T6 are NMOS TFTs.

The pixel circuit shown in FIG. 112 of the present disclosure adopts LTPO (low-temperature polycrystalline oxide) technology, utilizing the advantage of low leakage current of oxide TFT to reduce N1 leakage and lower N2 leakage; utilizing the advantage of high mobility of PMOS TFT to meet threshold voltage compensation, current driving requirements and reduce charging time, further improving display performance.

FIG. 113 is a timing diagram of the pixel circuit shown in FIG. 112.

As shown in FIG. 114, based on the pixel circuit shown in FIG. 103, the light emitting element is a light emitting diode E0; the energy storage circuit includes a first capacitor C1;

The first reset circuit includes a first transistor T1, and the second reset circuit includes a second transistor T2;

A first terminal of the first capacitor C1 is electrically connected to a first node N1, and a second terminal of the first capacitor C1 is electrically connected to a second node N2;

The gate electrode of the first transistor T1 is electrically connected to the reset control terminal RST, the source electrode of the first transistor T1 is electrically connected to the reference voltage terminal, and the drain electrode of the first transistor T1 is electrically connected to the second node N2; the reference voltage terminal is configured to provide a reference voltage Vref;

The gate electrode of the second transistor T2 is electrically connected to the reset control terminal RST, the source electrode of the second transistor T2 is electrically connected to the first initial voltage terminal I1, and the drain electrode of the second transistor T2 is electrically connected to the first node N1; the first initial voltage terminal I1 is configured to provide a first initial voltage Vi1;

The data writing-in circuit includes a third transistor T3 and a fourth transistor T4;

The gate electrode of the third transistor T3 is electrically connected to the first control terminal GB, the source electrode of the third transistor T3 is electrically connected to the first data line DT, and the drain electrode of the third transistor T3 is electrically connected to the second node N2;

The gate electrode of the fourth transistor T4 is electrically connected to the second control terminal GA, the source electrode of the fourth transistor T4 is electrically connected to the second data line DI, and the drain electrode of the fourth transistor T4 is electrically connected to the second node N2;

The light emitting control circuit includes a fifth transistor T5; the driving circuit includes a driving transistor T0;

The anode of E0 is electrically connected to the high voltage terminal VDD;

T5 is electrically connected to the light emitting control terminal EM, the drain electrode of T5 is electrically connected to the cathode of E0, and the source electrode of T5 is electrically connected to the drain electrode of T0;

The gate electrode of T0 is electrically connected to the first node N1, and the source electrode of T0 is electrically connected to the low voltage terminal VSS;

The compensation control circuit includes a sixth transistor T6, and the voltage control circuit includes a seventh transistor T7;

The gate electrode of the sixth transistor T6 is electrically connected to the scanning terminal G1, the source electrode of the sixth transistor T6 is electrically connected to the first node N1, and the drain electrode of the sixth transistor T6 is electrically connected to the third node N3;

A gate electrode of the seventh transistor T7 is electrically connected to the light emitting control terminal EM, a source electrode of the seventh transistor T7 is electrically connected to a reference voltage terminal, and a drain electrode of the seventh transistor T7 is electrically connected to the second node N2.

In the pixel circuit shown in FIG. 114, all transistors are NMOS TFTs, but not limited thereto.

In the pixel circuit shown in FIG. 114, E0 may be a Mini LED or a Micro LED, but is not limited thereto.

When the pixel circuit shown in FIG. 114 is in operation,

When high grayscale display is performed, Vi1−Vth is greater than Vss, Vref is greater than Vdata_I, and Vdata_I is equal to Vdata_T; Vth is the threshold voltage of T0, and Vss is the voltage value of the low voltage signal provided by VSS;

When low gray scale display is performed, Vi1−Vth is greater than Vss, Vdata_T is greater than Vref, and Vref is greater than or equal to Vdata_I.

FIG. 115A is a timing diagram of the pixel circuit shown in FIG. 114.

FIG. 115B is a schematic diagram of simulation results of the pixel circuit shown in FIG. 114 when performing high grayscale display; FIG. 115C is a schematic diagram of simulation results of the pixel circuit shown in FIG. 114 when performing high grayscale display.

In at least one embodiment corresponding to FIG. 115B, Vi1 is 8V, Vdd is 4.6V, Vss is −3V, Vdata_I=Vdata_T=2V, and Vref is 6V;

In at least one embodiment corresponding to FIG. 115C, Vi1 is 8V, Vdd is 4.6V, Vss is −3V, Vdata_I is 2V, Vdata_T is 10 V, and Vref is 6V.

The difference between the pixel circuit shown in FIG. 116 and the pixel circuit shown in FIG. 106 is that:

The data writing-in circuit includes a third transistor T3;

The gate electrode of T3 is electrically connected to the scanning terminal G1, the source electrode of T3 is electrically connected to the data line D0, and the drain electrode of T0 is electrically connected to the second node N2.

In the pixel circuit shown in FIG. 116, all transistors are PMOS TFTs, but not limited thereto.

FIG. 117 is a timing diagram of the pixel circuit shown in FIG. 116.

As shown in FIG. 118, based on the pixel circuit shown in FIG. 104,

The light emitting element is a light emitting diode E0; the energy storage circuit includes a first capacitor C1;

The first reset circuit includes a transistor T1, and the second reset circuit includes a second transistor T2;

A first terminal of the first capacitor C1 is electrically connected to a first node N1, and a second terminal of the first capacitor C1 is electrically connected to a second node N2;

The gate electrode of the first transistor T1 is electrically connected to the reset control terminal RST, the source electrode of the first transistor T1 is electrically connected to the reference voltage terminal, and the drain electrode of the first transistor T1 is electrically connected to the second node N2; the reference voltage terminal is configured to provide a reference voltage Vref;

The gate electrode of the second transistor T2 is electrically connected to the reset control terminal RST, the source electrode of the second transistor T2 is electrically connected to the first initial voltage terminal I1, and the drain electrode of the second transistor T2 is electrically connected to the first node N1; the first initial voltage terminal I1 is configured to provide a first initial voltage Vi1;

The first writing-in sub-circuit includes a third transistor T3, and the second writing-in sub-circuit includes a fourth transistor T4;

The gate electrode of the third transistor T3 is electrically connected to the first control terminal GB, the source electrode of the third transistor T3 is electrically connected to the first data line DT, and the drain electrode of the third transistor T3 is electrically connected to the switch control terminal N4;

The gate electrode of the fourth transistor T4 is electrically connected to the second control terminal GA, the source electrode of the fourth transistor T4 is electrically connected to the second data line DI, and the drain electrode of the fourth transistor T4 is electrically connected to the second node N2;

The light emitting control circuit includes a fifth transistor T5; the switch control circuit includes an eighth transistor T8; the driving circuit includes a driving transistor T0;

The gate electrode of the driving transistor T0 is electrically connected to the first node N1, the source electrode of the driving transistor T0 is electrically connected to the high voltage terminal VDD, and the drain electrode of the driving transistor T0 is electrically connected to the third node N3;

The gate electrode of the fifth transistor T5 is electrically connected to the light emitting control terminal EM, the source electrode of the fifth transistor T5 is electrically connected to the third node N3, and the drain electrode of the fifth transistor T5 is electrically connected to the source electrode of the eighth transistor T8;

The gate electrode of the eighth transistor T8 is electrically connected to the switch control terminal N4, the drain electrode of the eighth transistor T8 is electrically connected to the anode of E0; the cathode of E0 is electrically connected to the low voltage terminal VSS;

The compensation control circuit includes a sixth transistor T6, and the voltage control circuit includes a seventh transistor T7;

The gate electrode of the sixth transistor T6 is electrically connected to the scanning terminal G1, the source electrode of the sixth transistor T6 is electrically connected to the first node N1, and the drain electrode of the sixth transistor T6 is electrically connected to the third node N3;

The gate electrode of the seventh transistor T7 is electrically connected to the light emitting control terminal EM, the source electrode of the seventh transistor T7 is electrically connected to the reference voltage terminal, and the drain electrode of the seventh transistor T7 is electrically connected to the second node N2; the reference voltage terminal is configured to provide a reference voltage Vref;

The initialization circuit includes a ninth transistor T9, the energy storage circuit includes a first capacitor C1; the voltage maintenance circuit includes a second capacitor C2;

The gate electrode of the ninth transistor T9 is electrically connected to the second control terminal GA, the source electrode of the ninth transistor T9 is electrically connected to the second initial voltage terminal I2, and the drain electrode of the ninth transistor T9 is electrically connected to the switch control terminal N4; the second initial voltage terminal I2 is configured to provide a second initial voltage Vi2;

A first terminal of the first capacitor C1 is electrically connected to the first node N1, and a second terminal of the first capacitor C1 is electrically connected to the second node N2;

the second capacitor C2 is electrically connected to the switch control terminal N4, and a second terminal of the second capacitor is electrically connected to the common electrode voltage terminal VCOM.

In the pixel circuit shown in FIG. 118, all transistors are PMOS TFTs, but not limited thereto.

In the pixel circuit shown in FIG. 118, the light emitting diode may be an OLED (organic light emitting diode), a Mini LED or a Micro LED, but is not limited thereto.

As shown in FIG. 119, when the pixel circuit shown in FIG. 118 is in operation, a display cycle may include a first display phase S1 and a second display phase S2 which are arranged successively;

The first display phase S1 includes a first reset time period S11, a first writing-in time period S12 and a first light emitting time period S13 which are arranged successively;

The second display phase S2 includes a second writing-in time period S22 and a second light emitting time period S23 which are arranged successively;

In the first reset time period S11, EM provides a high voltage signal, RST provides a low voltage signal, G1 provides a high voltage signal, GA provides a high voltage signal, and GB provides a high voltage signal, as shown in FIG. 120A, T1 and T2 are turned on, the potential of N1 is Vref, and the potential of N2 is Vi1, so as to reset the potentials of N1 and N2;

In the first writing-in time period S12, EM provides a high voltage signal, RST provides a high voltage signal, G1 and GA provide low voltage signals, GB provides a high voltage signal, as shown in FIG. 120B, T4 and T9 are turned on, DI provides a display data voltage Vdata_I to the second node N2, and Vi2 is written into N4, and T8 is turned on;

In the first writing-in time period S12, T6 is turned on;

At the beginning of the first writing-in time period S12, T0 is turned on, and C1 is charged through Vdata_I to change the potential of N1 until the potential of N1 becomes Vdd+Vth, and T0 is turned off to perform threshold voltage compensation; wherein Vdd is the voltage value of the high voltage signal provided by VDD, and Vth is the threshold voltage of T0;

In the first light emitting time period S13, EM provides a low voltage signal, RST provides a high voltage signal, G1, GA and GB all provide high voltage signals, as shown in FIG. 120C, T7 and T5 are turned on, and T0 drives E0 to emit light;

In the first light emitting time period S13, the potential of N2 is Vref. Due to the coupling effect of C1, the potential of N1 becomes Vdd+Vth+Vref−Vdata_I, and Vgs is equal to Vth+Vref−Vdata_I; Vgs is the gate-source voltage of T0; Id is equal to $K\times(Vref-Vdata)^2$; Id is the driving current of T0 driving E0 to emit light, and K is a coefficient related to the mobility, channel width-to-length ratio and capacitance of T0;

In the second writing-in time period S22, the first time t1 is delayed (the first time t1 is the duration of the first light emitting time period S13), GB outputs a low voltage signal, as shown in FIG. 120D, T3 is turned on, and DT writes the light emitting time control data voltage Vdata_T into N4;

In the second light emitting time period S23, when low grayscale display is performed, Vdata_T is a high voltage signal, T8 is turned off, E0 does not emit light, and short-term light emitting is achieved, and the light emitting duration is t1;

In the second light emitting time period S23, when high grayscale display is performed, Vdata_T is a low voltage signal. At this time, under preferred circumstances, the voltage value of Vdata_T is the same as the voltage value of Vi2. As shown in FIG. 120E, T8 is turned on, and E0 continues to emit light to achieve long-duration light emitting. The light emitting duration is t1+t2, and t2 is the duration of the second light emitting time period S23.

FIG. 121A is a schematic diagram of simulation results of the pixel circuit shown in FIG. 118 when performing high grayscale display, and FIG. 121B is a schematic diagram of simulation results of the pixel circuit shown in FIG. 118 when performing low grayscale display.

In the pixel circuit shown in FIG. 118, the second control signal provided by GA may be the same as the scanning signal provided by G1, or the second control signal provided by GA may be the same as the reset control signal provided by RST, that is, Vi2 may be written into N4 in the reset time period or the writing-in time period, and the second control signal may be the same control signal as the scanning signal, or the second control signal may be the same control signal as the reset control signal, so as to reduce the number of GOA (gate driving circuit provided on the array substrate) circuits, thereby facilitating the realization of a narrow border.

As shown in FIG. 122, based on the pixel circuit shown in FIG. 105,

The light emitting element is a light emitting diode E0; the energy storage circuit includes a first capacitor C1;

The first reset circuit includes a transistor T1, and the second reset circuit includes a second transistor T2;

A first terminal of the first capacitor C1 is electrically connected to a first node N1, and a second terminal of the first capacitor C1 is electrically connected to a second node N2;

The gate electrode of the first transistor T1 is electrically connected to the reset control terminal RST, the source electrode of the first transistor T1 is electrically connected to the reference voltage terminal, and the drain electrode of the first transistor T1 is electrically connected to the second node N2; the reference voltage terminal is configured to provide a reference voltage Vref;

The gate electrode of the second transistor T2 is electrically connected to the reset control terminal RST, the source electrode of the second transistor T2 is electrically connected to the first initial voltage terminal I1, and the drain electrode of the second transistor T2 is electrically connected to the first node N1; the first initial voltage terminal I1 is configured to provide a first initial voltage Vi1;

The first writing-in sub-circuit includes a third transistor T3, and the second writing-in sub-circuit includes a fourth transistor T4;

The gate electrode of the third transistor T3 is electrically connected to the first control terminal GB, the source electrode of the third transistor T3 is electrically connected to the first data line DT, and the drain electrode of the third transistor T3 is electrically connected to the switch control terminal N4;

The gate electrode of the fourth transistor T4 is electrically connected to the second control terminal GA, the source electrode of the fourth transistor T4 is electrically connected to the second data line DI, and the drain electrode of the fourth transistor T4 is electrically connected to the second node N2;

The light emitting control circuit includes a fifth transistor T5; the switch control circuit includes an eighth transistor T8; the driving circuit includes a driving transistor T0;

The anode of E0 is electrically connected to the high voltage terminal VDD;

The gate electrode of T8 is electrically connected to the switch control terminal N4, the drain electrode of T8 is electrically connected to the cathode of E0, and the source electrode of T8 is electrically connected to the drain electrode of T5;

The gate electrode of T5 is electrically connected to the light emitting control terminal EM, and the source electrode of T5 is electrically connected to the drain electrode of T0;

The gate electrode of T0 is electrically connected to the first node N1, the source electrode of T0 is electrically connected to the low voltage terminal VSS; the drain electrode of T0 is electrically connected to the third node N3;

The compensation control circuit includes a sixth transistor T6, and the voltage control circuit includes a seventh transistor T7;

The gate electrode of the sixth transistor T6 is electrically connected to the scanning terminal G1, the source electrode of the sixth transistor T6 is electrically connected to the first node N1, and the drain electrode of the sixth transistor T6 is electrically connected to the third node N3;

the seventh transistor T7 is electrically connected to the light emitting control terminal EM, the source electrode of the seventh transistor T7 is electrically connected to the reference voltage terminal, and the drain electrode of the seventh transistor T7 is electrically connected to the second node N2; the reference voltage terminal is configured to provide a reference voltage Vref;

The initialization circuit includes a ninth transistor T9, the energy storage circuit includes a first capacitor C1; the voltage maintenance circuit includes a second capacitor C2;

The gate electrode of the ninth transistor T9 is electrically connected to the second control terminal GA, the source electrode of the ninth transistor T9 is electrically connected to the second initial voltage terminal I2, and the drain electrode of the ninth transistor T9 is electrically connected to the switch control terminal N4; the second initial voltage terminal I2 is configured to provide a second initial voltage Vi2;

A first terminal of the first capacitor C1 is electrically connected to the first node N1, and a second terminal of the first capacitor C1 is electrically connected to the second node N2;

A first terminal of the second capacitor C2 is electrically connected to the switch control terminal N4, and a second terminal of the second capacitor is electrically connected to the common electrode voltage terminal VCOM.

In the pixel circuit shown in FIG. 122, all transistors are NMOS TFTs, but not limited thereto.

In the pixel circuit shown in FIG. 122, E0 may be a Mini LED or a Micro LED, but is not limited thereto.

As shown in FIG. 123, when the pixel circuit shown in FIG. 122 is in operation, a display cycle may include a first display phase S1 and a second display phase S2 that are set sequentially; the first display phase S1 includes a first reset time period S1, a first writing-in time period S12 and a first light emitting time period S13 that are set sequentially; and the second display phase S2 includes a second writing-in time period S22 and a second light emitting time period S23 that are set sequentially.

FIG. 124A is a schematic diagram of the working state of the pixel circuit shown in FIG. 122 in the first reset time period S11, FIG. 124B is a schematic diagram of the working state of the pixel circuit shown in FIG. 122 in the first writing-in time period S12, FIG. 124C is a schematic diagram of the working state of the pixel circuit shown in FIG. 122 in the first light emitting time period S13, FIG. 124D is a schematic diagram of the working state of the pixel circuit shown in FIG. 122 in the second writing-in time period S22, and FIG. 124E is a schematic diagram of the working state of the pixel circuit shown in FIG. 122 in the second light emitting time period S23.

FIG. 125A is a schematic diagram of simulation results of the pixel circuit shown in FIG. 122 when performing high grayscale display, and FIG. 125B is a schematic diagram of simulation results of the pixel circuit shown in FIG. 122 when performing low grayscale display.

The difference between the pixel circuit shown in FIG. 126 and the pixel circuit shown in FIG. 122 is that T1, T2, T3, T4, T6, and T9 are NMOS TFTs.

The pixel circuit shown in FIG. 126 of the present disclosure adopts LTPO technology, and takes advantage of the low leakage current of oxide TFT to set T1, T2, T3, T4, T6 and T9 as NMOS TFT, thereby reducing N1 leakage and N2 leakage; and takes advantage of the high mobility of PMOS TFT to meet threshold voltage compensation and current driving requirements and reduce charging time, thereby further improving display performance.

FIG. 127 is a timing diagram of the pixel circuit shown in FIG. 126.

The driving method described in the embodiment of the present disclosure is applied to the above-mentioned pixel circuit, and the driving method includes:

The driving circuit generates a driving current for driving the light emitting element;

The data writing-in circuit successively provides the display data voltage and the light emitting time control data voltage to the writing-in node under the control of the writing-in control signal provided by the writing-in control terminal.

In at least one embodiment of the present disclosure, the writing-in node is the second node; the pixel circuit further includes a first reset circuit and a second reset circuit; the display cycle of the pixel circuit includes a first display phase and a second display phase which are successively arranged, the first display phase includes a first reset time period, and the second display phase includes a second reset time period;

The driving method comprises:

In the first reset time period and the second reset time period, the first reset circuit writes the reference voltage into the second node under the control of the reset control signal, and the second reset circuit writes the first initial voltage into the first node under the control of the reset control signal.

In at least one embodiment of the present disclosure, the first display phase includes a first writing-in time period arranged after the first reset time period, and the second display time period includes a second writing-in time period arranged after the second reset time period; the driving method includes:

In the first writing-in time period, the data writing-in circuit provides a display data voltage to the second node under the control of a writing-in control signal;

In the second writing-in time period, the data writing-in circuit provides a light emitting time control data voltage to the second node under the control of a writing-in control signal.

In at least one embodiment of the present disclosure, the writing-in node is the second node; the pixel circuit further includes a first reset circuit and a second reset circuit; the display cycle includes a first display phase and A second display phases; A is an integer greater than 1, and a is a positive integer less than but equal to A; the first display phase is set before the A second display phases; the first display phase includes a first reset time period and a first writing-in time period that are set in sequence, and the ath second display phase includes an ath second reset time period and an ath second writing-in time period that are set in sequence; the driving method includes:

In the first reset time period and the ath second reset time period, the first reset circuit writes the reference voltage into the second node under the control of the reset control signal, and the second reset circuit writes the first initial voltage into the first node under the control of the reset control signal;

In a first writing-in time period, the data writing-in circuit provides a display data voltage to the second node under the control of a writing-in control signal;

In the ath second writing-in time period, the data writing-in circuit provides the ath light emitting time control data voltage to the second node under the control of the writing-in control signal.

In at least one embodiment of the present disclosure, the first display phase includes a first writing-in time period, the second display time period includes a second writing-in time period; the pixel circuit further includes a switch control circuit; the writing-in node includes a first writing-in node and a second writing-in node; the data writing-in circuit includes a first writing-in sub-circuit and a second writing-in sub-circuit; the driving method includes:

In a first writing-in time period, the second writing-in sub-circuit writes the display data voltage provided by the second data line into the first writing-in node under the control of the scanning signal;

In the second writing-in time period, the first writing-in sub-circuit writes the light emitting time control data voltage provided by the first data line into the second writing-in node under the control of the first control signal provided by the first control terminal.

The pixel circuit described in the embodiment of the present disclosure includes a light emitting element, a first energy storage circuit, a data writing-in circuit, a driving circuit and a first initialization circuit; the display cycle of the pixel circuit includes a first display phase and a second display phase which are arranged successively; the first display phase includes a first light emitting time period, and the second display phase includes a light emitting preparation time period and a second light emitting time period which are arranged successively;

The control terminal of the driving circuit 11 is electrically connected to the first node N1. The driving circuit 11 is configured to generate a driving current for driving the light emitting element to emit light according to the display data voltage in the first light emitting time period under the control of the potential of the first node N1, and to control whether to generate the driving current in the second light emitting time period according to the light emitting time control data voltage in the second light emitting time period;

A first terminal of the first energy storage circuit is electrically connected to the first node, a second terminal of the first energy storage circuit is electrically connected to the second node, and the first energy storage circuit is configured to store electrical energy;

The data writing-in circuit is electrically connected to the writing-in control terminal, the data line and the second node respectively, and is configured to write the data voltage provided by the data line into the second node under the control of the writing-in control signal provided by the writing-in control terminal;

The driving circuit is electrically connected to the first electrode of the light emitting element or the second electrode of the light emitting element, the first initialization circuit is electrically connected to the first reset control terminal and the first initial voltage terminal respectively, and the first initialization circuit is also electrically connected to the first electrode of the light emitting element or the second electrode of the light emitting element, and is configured to write the first initial voltage provided by the first initial voltage terminal into the first electrode of the light emitting element or the second electrode of the light emitting element under the control of the first reset control signal provided by the first reset control terminal during a partial time period set in the light emitting preparation time period.

In at least one embodiment of the present disclosure, the light emitting element may be an inorganic light emitting diode, for example, the light emitting element may be a micro light emitting diode or a mini light emitting diode.

Optionally, the light emitting element may also be an organic light emitting diode.

When the pixel circuit described in the embodiment of the present disclosure is working, the display cycle (the display cycle can be one frame of time) includes a first display phase and a second display phase which are set in sequence; the first display phase includes a first light emitting preparation time period and a first light emitting time period which are set in sequence, and the second display phase includes a second light emitting preparation time period and a second light emitting time period which are set in sequence;

During a partial time period included in the first light emitting preparation time period and a partial time period included in the second light emitting preparation time period, the first initialization circuit writes a first initial voltage into the first electrode of the light emitting element or the second electrode of the light emitting element under the control of a first reset control signal;

In the first light emitting time period, the driving circuit generates a driving current for driving the light emitting element to emit light according to the display data voltage;

In the second light emitting time period, the driving circuit controls the data voltage according to the light emitting time, and controls whether to generate a driving current for driving the light emitting element to emit light.

When the pixel circuit described in the embodiment of the present disclosure is working, the light emitting time control data voltage can be delayed and written into the pixel circuit, so as to control the pixel circuit with the driving current+light emitting time, thereby improving the display effect of the light emitting element.

When the pixel circuit described in the embodiment of the present disclosure is working, in a partial time period included in the first light emitting preparation time period and a partial time period included in the second light emitting preparation time period, the first initialization circuit writes the first initial voltage into the first electrode of the light emitting element or the second electrode of the light emitting element under the control of the first reset control signal, so as to release the residual charge of the light emitting element at a high frequency, thereby improving the display effect and reducing flickering and other phenomena.

In at least one embodiment of the present disclosure, the driving circuit and the first initialization circuit are both electrically connected to the first electrode of the light emitting element; the pixel circuit further includes a first light emitting control circuit;

a first terminal of the driving circuit is electrically connected to the first voltage terminal; a second terminal of the driving circuit is electrically connected to the third node;

The first light emitting control circuit is electrically connected to the first light emitting control terminal, the second terminal of the driving circuit and the first electrode of the light emitting element respectively, and is configured to control the second terminal of the driving circuit to be connected to the first electrode of the light emitting element under the control of the first light emitting control signal provided by the first light emitting control terminal;

The second electrode of the light emitting element is electrically connected to the second voltage terminal.

In a specific implementation, the driving circuit and the first initialization circuit can be electrically connected to the first electrode of the light emitting element, and the pixel circuit can also include a first light emitting control circuit, which controls the connection between the second terminal of the driving circuit and the first electrode of the light emitting element under the control of a first light emitting control signal.

In at least one embodiment of the present disclosure, the light emitting element is an inorganic light emitting diode, the width-to-length ratio of the transistor included in the first light emitting control circuit is greater than 1, and the width-to-length ratio of the transistor included in the driving circuit is greater than 0.5.

In a specific implementation, the light emitting element may be an inorganic light emitting diode, the width-to-length ratio of the transistor included in the first light emitting control circuit may be greater than 1, and the width-to-length ratio of the transistor included in the driving circuit may be greater than 0.5.

In at least one embodiment of the present disclosure, the width-to-length ratio of a transistor is a ratio of a channel width W to a channel length L of the transistor.

Optionally, the first voltage terminal may be a high voltage terminal, and the second voltage terminal may be a low voltage terminal, but is not limited thereto.

In at least one embodiment of the present disclosure, the data writing-in circuit is configured to write the display data voltage and the light emitting time control data voltage into the second node in a time-division mode under the control of the writing-in control signal.

In a specific implementation, the data writing-in circuit can write the display data voltage and the light emitting time control data voltage into the second node under the control of the writing-in control signal.

In at least one embodiment of the present disclosure, the writing-in control terminal includes a first control terminal and a second control terminal; the data line includes a first data line and a second data line;

The data writing-in circuit is electrically connected to the second node, the first control terminal, the second control terminal, the first data line and the second data line respectively, and is configured to write the light emitting time control data voltage provided by the first data line into the second node under the control of the first control signal provided by the first control terminal, and to write the display data voltage provided by the second data line into the second node under the control of the second control signal provided by the second control terminal.

In a specific implementation, the writing-in control terminal may include a first control terminal and a second control terminal. The data writing-in circuit may write the light emitting time control data voltage into the second node under the control of a first control signal, and write the display data voltage into the second node under the control of a second control signal.

In at least one embodiment of the present disclosure, the writing-in control terminal includes M first control terminals and second control terminals; M is an integer greater than 1; the data line includes M first data lines and second data lines;

The data writing-in circuit is electrically connected to the second node, the M first control terminals, the second control terminal, the M first data lines and the second data line respectively, and is configured to write the display data voltage provided by the second data line into the second node under the control of the second control signal provided by the second control terminal, and write the mth light emitting time control data voltage provided by the mth second data line into the second node under the control of the mth first control signal provided by the mth first control terminal;

m is a positive integer less than or equal to M.

In a specific implementation, the writing-in control terminal may include M first control terminals and second control terminals; the data writing-in circuit may write the display data voltage into the second node under the control of the second control signal, and write the mth light emitting time control data voltage into the second node under the control of the mth first control signal.

As shown in FIG. 128, the pixel circuit according to at least one embodiment of the present disclosure includes a light emitting element E1, a first energy storage circuit 101, a data writing-in circuit 15, a driving circuit 11, and a first initialization circuit 20; the display cycle of the pixel circuit includes a first display phase and a second display phase which are successively arranged; the first display phase includes a first light emitting time period, and the second display phase includes a light emitting preparation time period and a second light emitting time period which are successively arranged;

The pixel circuit further includes a first light emitting control circuit 61;

The first terminal of the driving circuit 11 is electrically connected to the first voltage terminal V1; the second terminal of the driving circuit 11 is electrically connected to the third node N3;

The first light emitting control circuit 61 is electrically connected to the first light emitting control terminal EM1, the second terminal of the driving circuit 11 and the first electrode of the light emitting element E1 respectively, and is configured to control the second terminal of the driving circuit 11 to be connected to the first electrode of the light emitting element E1 under the control of the first light emitting control signal provided by the first light emitting control terminal EM1;

The second electrode of the light emitting element E1 is electrically connected to the second voltage terminal V2;

The control terminal of the driving circuit 11 is electrically connected to the first node N1. The driving circuit 11 is configured to generate a driving current for driving the light emitting element E1 to emit light according to the display data voltage in the first light emitting time period under the control of the potential of the first node N1, and to control whether to generate the driving current in the second light emitting time period according to the light emitting time control data voltage in the second light emitting time period;

The first terminal of the first energy storage circuit 101 is electrically connected to the first node N1, the second terminal of the first energy storage circuit 101 is electrically connected to the second node N2, and the first energy storage circuit 101 is configured to store electrical energy;

The writing-in control terminal includes a first control terminal GB and a second control terminal GA; the data line includes a first data line DT and a second data line DI;

The data writing-in circuit 15 is electrically connected to the second node N2, the first control terminal GB, the second control terminal GA, the first data line DT and the second data line DI respectively, and is configured to write the light emitting time control data voltage provided by the first data line DT into the second node N2 under the control of the first control signal provided by the first control terminal GB, and write the display data voltage provided by the second data line DI into the second node N2 under the control of the second control signal provided by the second control terminal GA;

The first initialization circuit 20 is electrically connected to the first reset control terminal RST1 and the first initial voltage terminal I1, respectively. The first initialization circuit 20 is also electrically connected to the first electrode of the light emitting element E1, and is configured to write the first initial voltage Vi1 provided by the first initial voltage terminal I1 into the first electrode of the light emitting element E1 under the control of the first reset control signal provided by the first reset control terminal RST1 during a partial time period set in the light emitting preparation time period.

When the pixel circuit shown in FIG. 128 of the present disclosure is in operation, the first light emitting preparation time period includes a first writing-in time period, and the second light emitting preparation time period includes a second writing-in time period;

In the first writing-in time period, the data writing-in circuit 15 writes the display data voltage provided by the second data line DI into the second node N2 under the control of the second control signal;

In the second writing-in time period, the data writing-in circuit 15 writes the light emitting time control data voltage provided by the first data line DT into the second node N2 under the control of the first control signal;

During a partial time period included in the first light emitting preparation time period and a partial time period included in the second light emitting preparation time period, the first initialization circuit 20 writes the first initialization voltage Vi1 into the first electrode of the light emitting element E1 under the control of the first reset control signal.

As shown in FIG. 129, the pixel circuit described in at least one embodiment of the present disclosure includes a light emitting element E1, a first energy storage circuit 101, a data writing-in circuit 15, a driving circuit 11, and a first initialization circuit 20; the display cycle of the pixel circuit includes a first display phase and three second display phases that are successively arranged; the first display phase includes a first light emitting time period, and the second display phase includes a light emitting preparation time period and a second light emitting time period that are successively arranged;

The pixel circuit further includes a first light emitting control circuit 61;

The first terminal of the driving circuit 11 is electrically connected to the first voltage terminal V1; the second terminal of the driving circuit 11 is electrically connected to the third node N3;

The first light emitting control circuit 61 is electrically connected to the first light emitting control terminal EM1, the second terminal of the driving circuit 11 and the first electrode of the light emitting element E1 respectively, and is configured to control the second terminal of the driving circuit 11 to be connected to the first electrode of the light emitting element E1 under the control of the first light emitting control signal provided by the first light emitting control terminal EM1;

The second electrode of the light emitting element E1 is electrically connected to the second voltage terminal V2;

The control terminal of the driving circuit 11 is electrically connected to the first node N1. The driving circuit 11 is configured to generate a driving current for driving the light emitting element E1 to emit light according to the display data voltage in the first light emitting time period under the control of the potential of the first node N1, and to control whether to generate the driving current in the second light emitting time period according to the light emitting time control data voltage in the second light emitting time period;

The first terminal of the first energy storage circuit 101 is electrically connected to the first node N1, the second terminal of the first energy storage circuit 101 is electrically connected to the second node N2, and the first energy storage circuit 101 is configured to store electrical energy;

The writing-in control terminal includes a first first control terminal GB1, a second first control terminal GB2, a third first control terminal GB3 and a second control terminal GA; the data line includes a first first data line DT1, a second first data line DT2, a third first data line DT3 and a second data line DI;

The data writing-in circuit 15 is electrically connected to the second node N2, the first first control terminal GB1, the second first control terminal GB2, the third first control terminal GB3, the second control terminal GA, the first first data line DT1, the second first data line DT2, the third first data line DT3 and the second data line DI, respectively, and is configured to write the display data voltage provided by the second data line DI into the second node N2 under the control of the second control signal provided by the second control terminal GA, write the first light emitting time control data voltage provided by the first second data line DT1 into the second node N2 under the control of the first first control signal provided by the first first control terminal GB1, write the second light emitting time control data voltage provided by the second second data line DT2 into the second node N2 under the control of the second first control signal provided by the second first control terminal GB2, and write the third light emitting time control data voltage provided by the third second data line DT3 into the second node N2 under the control of the third first control signal provided by the third first control terminal GB3;

The first initialization circuit 20 is electrically connected to the first reset control terminal RST1 and the first initial voltage terminal I1, respectively. The first initialization circuit 20 is also electrically connected to the first electrode of the light emitting element E1, and is configured to write the first initial voltage Vi1 provided by the first initial voltage terminal I1 into the first electrode of the light emitting element E1 under the control of the first reset control signal provided by the first reset control terminal RST1 during a partial time period set in the light emitting preparation time period.

In the pixel circuit shown in FIG. 129, M is taken as 3 as an example.

When the pixel circuit shown in FIG. 129 of the present disclosure is in operation, the display cycle of the pixel circuit includes a first display phase and three second display phases that are set in sequence; the first display phase includes a first light emitting time period, the first second display phase includes a first light emitting preparation time period and a first second light emitting time period that are set in sequence; the second second display phase includes a second light emitting preparation time period and a second second light emitting time period that are set in sequence; the third second display phase includes a third light emitting preparation time period and a third second light emitting time period that are set in sequence;

The first light emitting preparation time period includes a first writing-in time period, the first second light emitting preparation time period includes a first second writing-in time period, the second second light emitting preparation time period includes a second second writing-in time period, and the third second light emitting preparation time period includes a third second writing-in time period;

In the first writing-in time period, the data writing-in circuit 15 writes the display data voltage provided by the second data line DI into the second node N2 under the control of the second control signal;

In the first second writing-in time period, the data writing-in circuit 15 writes the first light emitting time control data voltage into the second node N2 under the control of the first first control signal provided by the first first control terminal GB1;

In the second second writing-in time period, the data writing-in circuit 15 writes the second light emitting time control data voltage into the second node N2 under the control of the second first control signal provided by the second first control terminal GB2;

In the third second writing-in time period, the data writing-in circuit 15 writes the third light emitting time control data voltage into the second node N2 under the control of the third first control signal provided by the third first control terminal GB3.

In at least one embodiment of the present disclosure, the driving circuit and the first initialization circuit are both electrically connected to the second electrode of the light emitting element; the pixel circuit further includes a first light emitting control circuit;

The first electrode of the light emitting element is electrically connected to the first voltage terminal; the first terminal of the driving circuit is electrically connected to the third node;

The first light emitting control circuit is electrically connected to the first light emitting control terminal, the second electrode of the light emitting element and the first terminal of the driving circuit respectively, and is configured to control the second electrode of the light emitting element to be connected to the first terminal of the driving circuit under the control of the first light emitting control signal;

The second terminal of the driving circuit is electrically connected to the second voltage terminal.

In a specific implementation, the driving circuit and the first initialization circuit may both be electrically connected to the second electrode of the light emitting element, and the pixel circuit may further include a first light emitting control circuit; the first light emitting control circuit controls the connection between the second electrode of the light emitting element and the first terminal of the driving circuit under the control of the first light emitting control signal.

As shown in FIG. 130, the pixel circuit according to at least one embodiment of the present disclosure includes a light emitting element E1, a first energy storage circuit 101, a data writing-in circuit 15, a driving circuit 11, and a first initialization circuit 20; the display cycle of the pixel circuit includes a first display phase and a second display phase which are successively arranged; the first display phase includes a first light emitting time period, and the second display phase includes a light emitting preparation time period and a second light emitting time period which are successively arranged;

The pixel circuit further includes a first light emitting control circuit 61;

The first electrode of the light emitting element E1 is electrically connected to the first voltage terminal V1; the first terminal of the driving circuit 11 is electrically connected to the third node N3;

The first light emitting control circuit 61 is electrically connected to the first light emitting control terminal EM1, the second electrode of the light emitting element E1 and the first terminal of the driving circuit 11 respectively, and is configured to control the second electrode of the light emitting element E1 to be connected to the first terminal of the driving circuit 11 under the control of the first light emitting control signal;

The control terminal of the driving circuit 11 is electrically connected to the first node N1, and the second terminal of the driving circuit 11 is electrically connected to the second voltage terminal V2. The driving circuit 11 is configured to generate a driving current for driving the light emitting element E1 to emit light according to the display data voltage in the first light emitting time period under the control of the potential of the first node N1, and to control whether to generate the driving current in the second light emitting time period according to the light emitting time control data voltage in the second light emitting time period;

The first terminal of the first energy storage circuit 101 is electrically connected to the first node N1, the second terminal of the first energy storage circuit 101 is electrically connected to the second node N2, and the first energy storage circuit 101 is configured to store electrical energy;

The writing-in control terminal includes a first control terminal GB and a second control terminal GA; the data line includes a first data line DT and a second data line DI;

The data writing-in circuit 15 is electrically connected to the second node N2, the first control terminal GB, the second control terminal GA, the first data line DT and the second data line DI respectively, and is configured to write the light emitting time control data voltage provided by the first data line DT into the second node N2 under the control of the first control signal provided by the first control terminal GB, and write the display data voltage provided by the second data line DI into the second node N2 under the control of the second control signal provided by the second control terminal GA;

The first initialization circuit 20 is electrically connected to the first reset control terminal RST1 and the first initial voltage terminal I1, respectively. The first initialization circuit 20 is also electrically connected to the second electrode of the light emitting element E1, and is configured to write the first initial voltage Vi1 provided by the first initial voltage terminal I1 into the second electrode of the light emitting element E1 under the control of the first reset control signal provided by the first reset control terminal RST1 during a partial time period set in the light emitting preparation time period.

When the pixel circuit shown in FIG. 130 of the present disclosure is in operation, the display cycle of the pixel circuit includes a first display phase and a second display phase which are set in sequence; the first display phase includes a first light emitting preparation time period and a first light emitting time period which are set in sequence, and the second display phase includes a second light emitting preparation time period and a second light emitting time period which are set in sequence;

The first light emitting preparation time period includes a first writing-in time period, and the second light emitting preparation time period includes a second writing-in time period;

In the first writing-in time period, the data writing-in circuit 15 writes the display data voltage provided by the second data line DI into the second node N2 under the control of the second control signal;

In the second writing-in time period, the data writing-in circuit 15 writes the light emitting time control data voltage provided by the first data line DT into the second node N2 under the control of the first control signal;

During a partial time period included in the first light emitting preparation time period and a partial time period included in the second light emitting preparation time period, the first initialization circuit 20 writes the first initialization voltage Vi1 into the second electrode of the light emitting element E1 under the control of the first reset control signal.

The pixel circuit described in at least one embodiment of the present disclosure further includes a first reset circuit and a second reset circuit;

The first reset circuit is electrically connected to the scanning terminal, the first reference voltage terminal and the second node respectively, and is configured to write the first reference voltage provided by the first reference voltage terminal into the second node under the control of the scanning signal provided by the scanning terminal during a part of the light emitting preparation time period;

The second reset circuit is electrically connected to the second reset control terminal, the second initial voltage terminal and the first node, respectively, and is configured to write the second initial voltage provided by the second initial voltage terminal into the first node during a partial time period in the light emitting preparation time period under the control of a second reset control signal provided by the second reset control terminal.

In a specific implementation, the pixel circuit may further include a first reset circuit and a second reset circuit; the first reset circuit writes a first reference voltage into the second node under the control of a scanning signal during a partial time period of the light emitting preparation time period; the second reset circuit writes a second initial voltage to the first node under the control of a second reset control signal during a partial time period of the light emitting preparation time period.

When the pixel circuit described in at least one embodiment of the present disclosure is in operation, a display cycle may include a first display phase and a second display phase, the first display phase includes a first light emitting preparation time period and a first light emitting time period which are successively arranged, and the second display phase includes a second light emitting preparation time period and a second light emitting time period which are successively arranged;

During a partial time period included in the first light emitting preparation time period and a partial time period included in the second light emitting preparation time period, the first reset circuit writes a first reference voltage into the second node under the control of a scanning signal; the second reset circuit writes a second initial voltage into the first node under the control of a second reset control signal, and resets the potential of the first node N1 and the potential of the second node N2, so that when the display data voltage and the light emitting time control data voltage have the same voltage value, in the first light emitting time period, the difference between the driving current generated by the driving circuit and the driving current generated by the driving circuit in the second light emitting time period is reduced, thereby reducing the brightness difference between the first light emitting time period and the second light emitting time period under the same frame of time.

As shown in FIG. 131, based on the pixel circuit shown in FIG. 128, the pixel circuit described in at least one embodiment of the present disclosure may further include a first reset circuit 14 and a second reset circuit 51;

The first reset circuit 14 is electrically connected to the scanning terminal G1, the first reference voltage terminal and the second node N2 respectively, and is configured to write the first reference voltage Vref1 provided by the first reference voltage terminal into the second node N2 under the control of the scanning signal provided by the scanning terminal G1 during a part of the light emitting preparation time period;

The second reset circuit 51 is electrically connected to the second reset control terminal RST2, the second initial voltage terminal I2 and the first node N1, respectively, and is configured to write the second initial voltage Vi2 provided by the second initial voltage terminal I2 into the first node under the control of the second reset control signal provided by the second reset control terminal RST2 during a partial time period of the light emitting preparation time period.

As shown in FIG. 132, based on the pixel circuit shown in FIG. 129, the pixel circuit described in at least one embodiment of the present disclosure may further include a first reset circuit 14 and a second reset circuit 51;

The first reset circuit 14 is electrically connected to the scanning terminal G1, the first reference voltage terminal and the second node N2 respectively, and is configured to write the first reference voltage Vref1 provided by the first reference voltage terminal into the second node N2 under the control of the scanning signal provided by the scanning terminal G1 during a partial time period of the light emitting preparation time period;

The second reset circuit 51 is electrically connected to the second reset control terminal RST2, the second initial voltage terminal I2 and the first node N1, respectively, and is configured to write the second initial voltage Vi2 provided by the second initial voltage terminal I2 into the first node under the control of the second reset control signal provided by the second reset control terminal RST2 during a partial time period of the light emitting preparation time period.

As shown in FIG. 133, based on the pixel circuit shown in FIG. 130, the pixel circuit described in at least one embodiment of the present disclosure may further include a first reset circuit 14 and a second reset circuit 51;

The first reset circuit 14 is electrically connected to the scanning terminal G1, the first reference voltage terminal and the second node N2 respectively, and is configured to write the first reference voltage Vref1 provided by the first reference voltage terminal into the second node N2 under the control of the scanning signal provided by the scanning terminal G1 during a partial time period of the light emitting preparation time period;

The second reset circuit 51 is electrically connected to the second reset control terminal RST2, the second initial voltage terminal I2 and the first node N1, respectively, and is configured to write the second initial voltage Vi2 provided by the second initial voltage terminal I2 into the first node N1 during a partial time period in the light emitting preparation time period under the control of the second reset control signal provided by the second reset control terminal RST2.

The pixel circuit described in at least one embodiment of the present disclosure further includes a third reset circuit;

The third reset circuit is electrically connected to the second reset control terminal, the first reference voltage terminal and the second node respectively, and is configured to write the first reference voltage into the second node under the control of the second reset control signal during a partial time period of the light emitting preparation time period.

In a specific implementation, the pixel circuit may further include a third reset circuit, which writes the first reference voltage into the second node under the control of the second reset control signal during a partial time period in the light emitting preparation time period.

The pixel circuit in the present disclosure may further include a third reset circuit. In the first light emitting preparation time period and the second light emitting preparation time period, while the second reset circuit 51 resets the potential of the first node N1, the third reset circuit can write the first reference voltage into the second node under the control of the second reset control signal, so as to simultaneously reset the potential of the first node N1 and the potential of the second node N2.

As shown in FIG. 134, based on the pixel circuit shown in FIG. 131, the pixel circuit described in at least one embodiment of the present disclosure further includes a third reset circuit 81;

The third reset circuit 81 is electrically connected to the second reset control terminal RST2, the first reference voltage terminal and the second node N2 respectively, and is configured to write the first reference voltage Vref1 into the second node N2 under the control of the second reset control signal during a partial time period of the light emitting preparation time period.

As shown in FIG. 135, based on the pixel circuit shown in FIG. 132, the pixel circuit described in at least one embodiment of the present disclosure further includes a third reset circuit 81;

The third reset circuit 81 is electrically connected to the second reset control terminal RST2, the first reference voltage terminal and the second node N2 respectively, and is configured to write the first reference voltage Vref1 into the second node N2 under the control of the second reset control signal during a partial time period of the light emitting preparation time period.

As shown in FIG. 136, based on the pixel circuit shown in FIG. 133, the pixel circuit described in at least one embodiment of the present disclosure further includes a third reset circuit 81;

The third reset circuit 81 is electrically connected to the second reset control terminal RST2, the first reference voltage terminal and the second node N2 respectively, and is configured to write the first reference voltage Vref1 into the second node N2 under the control of the second reset control signal during a partial time period of the light emitting preparation time period.

The pixel circuit described in at least one embodiment of the present disclosure further includes a second energy storage circuit;

The first terminal of the second energy storage circuit is electrically connected to the second node, the second terminal of the second energy storage circuit is electrically connected to the first DC voltage terminal, and the second energy storage circuit is configured to store electrical energy.

In a specific implementation, the pixel circuit may further include a second energy storage circuit, and the second energy storage circuit may be configured to maintain the potential of the second node.

Optionally, the first DC voltage terminal may be a second reference voltage terminal, a common electrode voltage terminal, a high voltage terminal, a low voltage terminal or a ground terminal, but is not limited thereto.

The pixel circuit described in at least one embodiment of the present disclosure further includes a sixth reset circuit;

The sixth reset circuit is electrically connected to the first reset control terminal, the third initial voltage terminal and the first terminal of the driving circuit respectively, and is configured to write the third initial voltage provided by the third initial voltage terminal into the first terminal of the driving circuit during a partial time period in the light emitting preparation time period under the control of the first reset control signal provided by the first reset control terminal.

In a specific implementation, the pixel circuit may further include a sixth reset circuit, which writes a third initial voltage into the first terminal of the driving circuit under the control of a first reset control signal during a partial time period in the light emitting preparation time period.

When at least one embodiment of the present disclosure is in operation, during a partial time period in the light emitting preparation time period, the sixth reset circuit writes a third initial voltage into the first terminal of the driving circuit under the control of the first reset control signal, and writes a bias voltage into the first terminal of the driving circuit, and before the light emitting time period, the driving transistor included in the driving circuit is turned on and biased, thereby reducing image flicker and afterimage caused by the hysteresis characteristics of the driving transistor.

As shown in FIG. 137, based on the pixel circuit shown in FIG. 131, the pixel circuit described in at least one embodiment of the present disclosure further includes a second energy storage circuit 102;

The first terminal of the second energy storage circuit 102 is electrically connected to the second node N2, and the second terminal of the second energy storage circuit 102 is electrically connected to the second reference voltage terminal. The second energy storage circuit 102 is configured to store electrical energy; and the second reference voltage terminal is configured to provide a second reference voltage Vref2.

As shown in FIG. 138, based on the pixel circuit shown in FIG. 132, the pixel circuit described in at least one embodiment of the present disclosure further includes a second energy storage circuit 102;

The first terminal of the second energy storage circuit 102 is electrically connected to the second node N2, and the second terminal of the second energy storage circuit 102 is electrically connected to the second reference voltage terminal. The second energy storage circuit 102 is configured to store electrical energy; and the second reference voltage terminal is configured to provide a second reference voltage Vref2.

The pixel circuit described in at least one embodiment of the present disclosure further includes a sixth reset circuit;

The sixth reset circuit is electrically connected to the first reset control terminal, the third initial voltage terminal and the second terminal of the driving circuit respectively, and is configured to write the third initial voltage provided by the third initial voltage terminal into the second terminal of the driving circuit during a partial time period in the light emitting preparation time period under the control of the first reset control signal provided by the first reset control terminal.

In a specific implementation, the pixel circuit may further include a sixth reset circuit, which writes a third initial voltage into the second terminal of the driving circuit under the control of the first reset control signal during a partial time period in the light emitting preparation time period.

When at least one embodiment of the present disclosure is in operation, during a partial time period in the light emitting preparation time period, the sixth reset circuit writes a third initial voltage into the second terminal of the driving circuit under the control of the first reset control signal, and writes a bias voltage into the second terminal of the driving circuit, and before the light emitting time period, the driving transistor included in the driving circuit is turned on and biased, thereby reducing image flicker and afterimage caused by the hysteresis characteristics of the driving transistor.

As shown in FIG. 139, based on the pixel circuit shown in FIG. 133, the pixel circuit described in at least one embodiment of the present disclosure further includes a second energy storage circuit 102;

The first terminal of the second energy storage circuit 102 is electrically connected to the second node N2, and the second terminal of the second energy storage circuit 102 is electrically connected to the second reference voltage terminal. The second energy storage circuit 102 is configured to store electrical energy; and the second reference voltage terminal is configured to provide a second reference voltage Vref2.

In at least one embodiment of the present disclosure, the first energy storage circuit includes a first capacitor and a second capacitor;

a first terminal of the first capacitor is electrically connected to the first node, a second terminal of the first capacitor is electrically connected to the fourth node, a first terminal of the second capacitor is electrically connected to the fourth node, and a second terminal of the second capacitor is electrically connected to the second node;

The pixel circuit further includes a first reset circuit, a second reset circuit, a fourth reset circuit and a fifth reset circuit;

The first reset circuit is electrically connected to the scanning terminal, the second reference voltage terminal and the fourth node respectively, and is configured to write the second reference voltage provided by the second reference voltage terminal into the fourth node in partial time period of the light emitting preparation time period under the control of the scanning signal provided by the scanning terminal;

The second reset circuit is electrically connected to the second reset control terminal, the second initial voltage terminal and the first node respectively, and is configured to write the second initial voltage provided by the second initial voltage terminal into the first node under the control of the second reset control signal provided by the second reset control terminal in a part time period of the light emitting preparation time period;

The fourth reset circuit is electrically connected to the second reset control terminal, the second reference voltage terminal and the fourth node respectively, and is configured to write the second reference voltage into the fourth node under the control of the second reset control signal provided by the second reset control terminal during a partial time period of the light emitting preparation time period;

The fifth reset circuit is electrically connected to the first light emitting control terminal, the first reference voltage terminal and the second node, respectively, and is configured to write the first reference voltage provided by the first reference voltage terminal into the second node in the first light emitting time period and the second light emitting time period under the control of the first light emitting control signal provided by the first light emitting control terminal.

In a specific implementation, the first energy storage circuit may include a first capacitor and a second capacitor; the first reset circuit writes a second reference voltage into the fourth node under the control of a scanning signal in a partial time period of the light emitting preparation time period; the pixel circuit may also include a first reset circuit, a fourth reset circuit and a fifth reset circuit;

The display cycle may include a first display phase and a second display phase which are arranged successively, wherein the first display phase includes a first light emitting preparation time period and a first light emitting time period which are arranged successively, and the second display phase includes a second light emitting preparation time period and a second light emitting time period which are arranged successively;

During a partial time period included in the first light emitting preparation time period and a partial time period included in the second light emitting preparation time period, the first reset circuit writes the second reference voltage into the fourth node under the control of the scanning signal to reset the potential of the fourth node;

During a partial time period included in the first light emitting preparation time period and a partial time period included in the second light emitting preparation time period, the second reset circuit writes a second initial voltage into the first node under the control of a second reset control signal to reset the potential of the first node; the fourth reset circuit writes the second reference voltage into the fourth node under the control of the second reset control signal to reset the potential of the fourth node;

During a partial time period included in the first light emitting preparation time period and a partial time period included in the second light emitting preparation time period, the fifth reset circuit writes the second reference voltage into the fourth node under the control of the second reset control signal to reset the potential of the fourth node;

During the first light emitting time period and the second light emitting time period, the fifth reset circuit writes the first reference voltage into the second node under the control of the first light emitting control signal.

When the pixel circuit described in at least one embodiment of the present disclosure is in operation, before the first light emitting time period and before the second light emitting time period, the potential of the first node and the potential of the fourth node are reset, the charge written into the first node and the fourth node in the previous frame or performed by the capacitive coupling is discharged, and when the grayscale of the next frame is written, the voltage starts from the same reset voltage, which can prevent defects such as Mura (uneven display) or cross talk.

Optionally, the light emitting element is an inorganic light emitting diode;

The capacitance value of the first capacitor is greater than 3 times the gate-source capacitance of the transistor in the driving circuit.

In a specific implementation, the capacitance value of the first capacitor is set to be greater than 3 times the gate-source capacitance of the transistor in the driving circuit, so that when the source potential of the transistor in the driving circuit changes, the gate potential of the transistor in the driving circuit can be maintained to ensure display accuracy.

In at least one embodiment of the present disclosure, the gate-source capacitance of the transistor in the driving circuit may be a parasitic capacitance between the gate electrode and the source electrode of the transistor in the driving circuit, which may be calculated based on the facing area of the gate electrode and the source electrode of the transistor in the driving circuit, and a dielectric constant, wherein the dielectric constant may be calculated based on the material and thickness of the insulating layer between the gate electrode and the source electrode of the transistor in the driving circuit.

As shown in FIG. 140, the pixel circuit described in at least one embodiment of the present disclosure includes a light emitting element E1, a first energy storage circuit, a data writing-in circuit 15, a driving circuit 11, and a first initialization circuit 20; the display cycle of the pixel circuit includes a first display phase and a second display phase that are successively arranged; the first display phase includes a first light emitting time period, and the second display phase includes a light emitting preparation time period and a second light emitting time period that are successively arranged;

The pixel circuit further includes a first light emitting control circuit 61;

The first terminal of the driving circuit 11 is electrically connected to the first voltage terminal V1; the second terminal of the driving circuit 11 is electrically connected to the third node N3;

The first light emitting control circuit 61 is electrically connected to the first light emitting control terminal EM1, the second terminal of the driving circuit 11 and the first electrode of the light emitting element E1 respectively, and is configured to control the second terminal of the driving circuit 11 to be connected to the first electrode of the light emitting element E1 under the control of the first light emitting control signal provided by the first light emitting control terminal EM1;

The second electrode of the light emitting element E1 is electrically connected to the second voltage terminal V2;

The control terminal of the driving circuit 11 is electrically connected to the first node N1. The driving circuit 11 is configured to generate a driving current for driving the light emitting element E1 to emit light according to the display data voltage in the first light emitting time period under the control of the potential of the first node N1, and to control whether to generate the driving current in the second light emitting time period according to the light emitting time control data voltage in the second light emitting time period;

The writing-in control terminal includes a first control terminal GB and a second control terminal GA; the data line includes a first data line DT and a second data line DI;

The data writing-in circuit 15 is electrically connected to the second node N2, the first control terminal GB, the second control terminal GA, the first data line DT and the second data line DI respectively, and is configured to write the light emitting time control data voltage provided by the first data line DT into the second node N2 under the control of the first control signal provided by the first control terminal GB, and write the display data voltage provided by the second data line DI into the second node N2 under the control of the second control signal provided by the second control terminal GA;

The first initialization circuit 20 is electrically connected to the first reset control terminal RST1 and the first initial voltage terminal I1 respectively, and the first initialization circuit 20 is also electrically connected to the first electrode of the light emitting element E1, and is configured to write the first initial voltage Vi1 provided by the first initial voltage terminal I1 into the first electrode of the light emitting element E1 under the control of the first reset control signal provided by the first reset control terminal RST1 during a partial time period in the light emitting preparation time period;

The first energy storage circuit includes a first capacitor C1 and a second capacitor C2;

The first terminal of the first capacitor C1 is electrically connected to the first node N1, the second terminal of the first capacitor C1 is electrically connected to the fourth node NJ4, the first terminal of the second capacitor C2 is electrically connected to the fourth node NJ4, and the second terminal of the second capacitor C2 is electrically connected to the second node N2;

The pixel circuit further includes a first reset circuit 14, a second reset circuit 51, a fourth reset circuit 801 and a fifth reset circuit 802;

The first reset circuit 14 is electrically connected to the scanning terminal G1, the second reference voltage terminal and the fourth node NJ4 respectively, and is configured to write the second reference voltage Vref2 provided by the second reference voltage terminal into the fourth node NJ4 under the control of the scanning signal provided by the scanning terminal G1 during a partial time period of the light emitting preparation time period;

The second reset circuit 51 is electrically connected to the second reset control terminal RST2, the second initial voltage terminal I2 and the first node N1 respectively, and is configured to write the second initial voltage Vi2 provided by the second initial voltage terminal I2 into the first node N1 under the control of the second reset control signal provided by the second reset control terminal RST2 during a partial time period of the light emitting preparation time period;

The fourth reset circuit 801 is electrically connected to the second reset control terminal RST2, the second reference voltage terminal and the fourth node NJ4 respectively, and is configured to write the second reference voltage Vref2 into the fourth node NJ4 under the control of the second reset control signal provided by the second reset control terminal RST2 during a partial time period of the light emitting preparation time period;

The fifth reset circuit 802 is electrically connected to the first light emitting control terminal EM1, the first reference voltage terminal and the second node N2, respectively, and is configured to write the first reference voltage Vref1 provided by the first reference voltage terminal into the second node N2 in the first light emitting time period and the second light emitting time period under the control of the first light emitting control signal provided by the first light emitting control terminal EM1.

As shown in FIG. 141, the pixel circuit according to at least one embodiment of the present disclosure includes a light emitting element E1, a first energy storage circuit 101, a data writing-in circuit 15, a driving circuit 11, and a first initialization circuit 20; the display cycle of the pixel circuit includes a first display phase and a second display phase which are successively arranged; the first display phase includes a first light emitting time period, and the second display phase includes a light emitting preparation time period and a second light emitting time period which are successively arranged;

The pixel circuit further includes a first light emitting control circuit 61;

The first electrode of the light emitting element E1 is electrically connected to the first voltage terminal V1; the first terminal of the driving circuit 11 is electrically connected to the third node N3;

The first light emitting control circuit 61 is electrically connected to the first light emitting control terminal EM1, the second electrode of the light emitting element E1 and the first terminal of the driving circuit 11 respectively, and is configured to control the second electrode of the light emitting element E1 to be connected to the first terminal of the driving circuit 11 under the control of the first light emitting control signal;

The control terminal of the driving circuit 11 is electrically connected to the first node N1, and the second terminal of the driving circuit 11 is electrically connected to the second voltage terminal V2. The driving circuit 11 is configured to generate a driving current for driving the light emitting element E1 to emit light according to the display data voltage in the first light emitting time period under the control of the potential of the first node N1, and to control whether to generate the driving current in the second light emitting time period according to the light emitting time control data voltage in the second light emitting time period;

The writing-in control terminal includes a first control terminal GB and a second control terminal GA; the data line includes a first data line DT and a second data line DI;

The data writing-in circuit 15 is electrically connected to the second node N2, the first control terminal GB, the second control terminal GA, the first data line DT and the second data line DI respectively, and is configured to write the light emitting time control data voltage provided by the first data line DT into the second node N2 under the control of the first control signal provided by the first control terminal GB, and write the display data voltage provided by the second data line DI into the second node N2 under the control of the second control signal provided by the second control terminal GA;

The first initialization circuit 20 is electrically connected to the first reset control terminal RST1 and the first initial voltage terminal I1 respectively, and the first initialization circuit 20 is also electrically connected to the second electrode of the light emitting element E1, and is configured to write the first initial voltage Vi1 provided by the first initial voltage terminal I1 into the second electrode of the light emitting element E1 under the control of the first reset control signal provided by the first reset control terminal RST1 during a partial time period in the light emitting preparation time period;

The first energy storage circuit includes a first capacitor C1 and a second capacitor C2;

The first terminal of the first capacitor C1 is electrically connected to the first node N1, the second terminal of the first capacitor C1 is electrically connected to the fourth node NJ4, the first terminal of the second capacitor C2 is electrically connected to the fourth node NJ4, and the second terminal of the second capacitor C2 is electrically connected to the second node N2;

The pixel circuit further includes a first reset circuit 14, a second reset circuit 51, a fourth reset circuit 801 and a fifth reset circuit 802;

The first reset circuit 14 is electrically connected to the scanning terminal G1, the second reference voltage terminal and the fourth node NJ4 respectively, and is configured to write the second reference voltage Vref2 provided by the second reference voltage terminal into the fourth node NJ4 under the control of the scanning signal provided by the scanning terminal G1 during a partial time period of the light emitting preparation time period;

The second reset circuit 51 is electrically connected to the second reset control terminal RST2, the second initial voltage terminal I2 and the first node N1 respectively, and is configured to write the second initial voltage Vi2 provided by the second initial voltage terminal I2 into the first node N1 under the control of the second reset control signal provided by the second reset control terminal RST2 during a partial time period of the light emitting preparation time period;

The fourth reset circuit 801 is electrically connected to the second reset control terminal RST2, the second reference voltage terminal and the fourth node NJ4 respectively, and is configured to write the second reference voltage Vref2 into the fourth node NJ4 under the control of the second reset control signal provided by the second reset control terminal RST2 during a partial time period of the light emitting preparation time period;

The fifth reset circuit 802 is electrically connected to the first light emitting control terminal EM1, the first reference voltage terminal and the second node N2, respectively, and is configured to write the first reference voltage Vref1 provided by the first reference voltage terminal into the second node N2 in the first light emitting time period and the second light emitting time period under the control of the first light emitting control signal provided by the first light emitting control terminal EM1.

Optionally, the data writing-in circuit includes a first transistor and a second transistor;

a gate electrode of the first transistor is electrically connected to the second control terminal, a first electrode of the first transistor is electrically connected to the second data line, and a second electrode of the first transistor is electrically connected to the second node;

A gate electrode of the second transistor is electrically connected to the first control terminal, a second electrode of the first transistor is electrically connected to the first data line, and a second electrode of the second transistor is electrically connected to the second node.

Optionally, the data writing-in circuit includes a first transistor and M second transistors;

a gate electrode of the first transistor is electrically connected to the second control terminal, a first electrode of the first transistor is electrically connected to the second data line, and a second electrode of the first transistor is electrically connected to the second node;

A gate electrode of the mth second transistor is electrically connected to the mth first control terminal, a first electrode of the mth second transistor is electrically connected to the mth first data line, and a second electrode of the mth second transistor is electrically connected to the second node.

Optionally, the data writing-in circuit includes a first transistor;

A gate electrode of the first transistor is electrically connected to the writing-in control terminal, a first electrode of the first transistor is electrically connected to the data line, and a second electrode of the first transistor is electrically connected to the second node.

The pixel circuit described in at least one embodiment of the present disclosure further includes a second light emitting control circuit;

The second light emitting control circuit is electrically connected to the second light emitting control terminal, the first voltage terminal and the first terminal of the driving circuit respectively, and is configured to control the connection between the first voltage terminal and the first terminal of the driving circuit under the control of a second light emitting control signal provided by the second light emitting control terminal.

In a specific implementation, the pixel circuit may further include a second light emitting control circuit, and the second light emitting control circuit controls the connection between the first voltage terminal and the first terminal of the driving circuit under the control of a second light emitting control signal.

The pixel circuit described in at least one embodiment of the present disclosure further includes a second light emitting control circuit;

The second light emitting control circuit is electrically connected to the second light emitting control terminal, the second terminal of the driving circuit and the second voltage terminal respectively, and is configured to control the connection between the second terminal of the driving circuit and the second voltage terminal under the control of a second light emitting control signal provided by the second light emitting control terminal.

In a specific implementation, the pixel circuit may further include a second light emitting control circuit, and the second light emitting control circuit controls the connection between the second terminal of the driving circuit and the second voltage terminal under the control of a second light emitting control signal.

Optionally, the light emitting element is an inorganic light emitting diode, the width-to-length ratio of the transistor included in the first light emitting control circuit is greater than 1, the width-to-length ratio of the transistor included in the second light emitting control circuit is greater than 1, and the width-to-length ratio of the transistor included in the driving circuit is greater than 0.5.

In a specific implementation, the light emitting element may be an inorganic light emitting diode, the width-to-length ratio of the transistor included in the first light emitting control circuit may be greater than 1, the width-to-length ratio of the transistor included in the second light emitting control circuit may be greater than 1, and the width-to-length ratio of the transistor included in the driving circuit may be greater than 0.5.

The pixel circuit described in at least one embodiment of the present disclosure further includes a compensation control circuit;

The compensation control circuit is electrically connected to the scanning terminal, the first node and the third node respectively, and is configured to control the connection between the first node and the third node under the control of the scanning signal provided by the scanning terminal.

In a specific implementation, the pixel circuit may further include a compensation control circuit, and the compensation control circuit controls the connection between the first node and the third node to perform threshold voltage compensation under the control of a scanning signal.

As shown in FIG. 142, based on the pixel circuit shown in FIG. 137, the pixel circuit described in at least one embodiment of the present disclosure further includes a sixth reset circuit 90, a second light emitting control circuit 62, and a compensation control circuit 32;

The sixth reset circuit 90 is electrically connected to the first reset control terminal RST1, the third initial voltage terminal I3 and the first terminal of the driving circuit 11 respectively, and is configured to write the third initial voltage Vi3 provided by the third initial voltage terminal I3 into the first terminal of the driving circuit 11 under the control of the first reset control signal provided by the first reset control terminal RST1 during a partial time period of the light emitting preparation time period;

The second light emitting control circuit 62 is electrically connected to the second light emitting control terminal EM2, the first voltage terminal V1 and the first terminal of the driving circuit 11 respectively, and is configured to control the connection between the first voltage terminal V1 and the first terminal of the driving circuit 11 under the control of the second light emitting control signal provided by the second light emitting control terminal EM2;

The second terminal of the driving circuit 11 is electrically connected to the third node N3;

The compensation control circuit 32 is electrically connected to the scanning terminal G1, the first node N1 and the third node N3 respectively, and is configured to control the connection between the first node N1 and the third node N3 under the control of the scanning signal provided by the scanning terminal G1.

As shown in FIG. 143, based on the pixel circuit shown in FIG. 138, the pixel circuit described in at least one embodiment of the present disclosure further includes a sixth reset circuit 90, a second light emitting control circuit 62, and a compensation control circuit 32;

The sixth reset circuit 90 is electrically connected to the first reset control terminal RST1, the third initial voltage terminal I3 and the first terminal of the driving circuit 11 respectively, and is configured to write the third initial voltage Vi3 provided by the third initial voltage terminal I3 into the first terminal of the driving circuit 11 under the control of the first reset control signal provided by the first reset control terminal RST1 during a partial time period of the light emitting preparation time period;

The second light emitting control circuit 62 is electrically connected to the second light emitting control terminal EM2, the first voltage terminal V1 and the first terminal of the driving circuit 11 respectively, and is configured to control the connection between the first voltage terminal V1 and the first terminal of the driving circuit 11 under the control of the second light emitting control signal provided by the second light emitting control terminal EM2;

The second terminal of the driving circuit 11 is electrically connected to the third node N3;

The compensation control circuit 32 is electrically connected to the scanning terminal G1, the first node N1 and the third node N3 respectively, and is configured to control the connection between the first node N1 and the third node N3 under the control of the scanning signal provided by the scanning terminal G1.

As shown in FIG. 144, based on the pixel circuit shown in FIG. 139, the pixel circuit described in at least one embodiment of the present disclosure further includes a sixth reset circuit 90, a second light emitting control circuit 62, and a compensation control circuit 32;

The sixth reset circuit 90 is electrically connected to the first reset control terminal RST1, the third initial voltage terminal I3 and the second terminal of the driving circuit 11 respectively, and is configured to write the third initial voltage Vi3 provided by the third initial voltage terminal I3 into the second terminal of the driving circuit 11 under the control of the first reset control signal provided by the first reset control terminal RST1 during a partial time period of the light emitting preparation time period;

The second light emitting control circuit 62 is electrically connected to the second light emitting control terminal EM2, the second terminal of the driving circuit 11 and the second voltage terminal V2 respectively, and is configured to control the second terminal of the driving circuit 11 to be connected to the second voltage terminal V2 under the control of the second light emitting control signal provided by the second light emitting control terminal EM2;

The first terminal of the driving circuit 11 is electrically connected to the third node N3;

The compensation control circuit 32 is electrically connected to the scanning terminal G1, the first node N1 and the third node N3 respectively, and is configured to control the connection between the first node N1 and the third node N3 under the control of the scanning signal provided by the scanning terminal G1.

As shown in FIG. 145, based on the pixel circuit shown in FIG. 140, the pixel circuit described in at least one embodiment of the present disclosure further includes a compensation control circuit 32;

The second terminal of the driving circuit 11 is electrically connected to the third node N3;

The compensation control circuit 32 is electrically connected to the scanning terminal G1, the first node N1 and the third node N3 respectively, and is configured to control the connection between the first node N1 and the third node N3 under the control of the scanning signal provided by the scanning terminal G1.

As shown in FIG. 146, based on the pixel circuit shown in FIG. 141, the pixel circuit described in at least one embodiment of the present disclosure further includes a compensation control circuit 32;

The first terminal of the driving circuit 11 is electrically connected to the third node N3;

The compensation control circuit 32 is electrically connected to the scanning terminal G1, the first node N1 and the third node N3 respectively, and is configured to control the connection between the first node N1 and the third node N3 under the control of the scanning signal provided by the scanning terminal G1.

In at least one embodiment of the present disclosure, the data line includes a second data line; the writing-in control terminal includes a second control terminal; the data writing-in circuit is electrically connected to the second data line, and is configured to write the display data voltage provided by the second data line into the second node under the control of a second control signal provided by the second control terminal;

The pixel circuit further includes a switch control circuit and a driving control circuit; the control terminal of the switch control circuit is electrically connected to the switch control terminal;

The driving control circuit is electrically connected to the first control terminal, the first data line and the switch control terminal respectively, and is configured to write the light emitting time control data voltage provided by the first data line into the switch control terminal under the control of the first control signal provided by the first control terminal;

The switch control circuit is also electrically connected to the first light emitting control circuit and the first electrode of the light emitting element, respectively, and is configured to control the connection between the first light emitting control circuit and the first electrode of the light emitting element under the control of the potential of the switch control terminal; or, the switch control circuit is also electrically connected to the second terminal of the driving circuit and the first light emitting control circuit, respectively, and is configured to control the connection between the second terminal of the driving circuit and the first light emitting control circuit under the control of the potential of the switch control terminal; or, the switch control circuit is also electrically connected to the first voltage terminal and the first terminal of the driving circuit, respectively, and is configured to control the connection between the first voltage terminal and the first terminal of the driving circuit under the control of the potential of the switch control terminal.

In a specific implementation, the pixel circuit may further include a switch control circuit and a driving control circuit. The driving control circuit writes a light emitting time control data voltage into a switch control terminal under the control of a first control signal. The switch control circuit controls to connect or disconnect the light emitting path under the control of the potential of the switch control terminal.

In at least one embodiment of the present disclosure, the data line includes a first data line; the writing-in control terminal includes a second control terminal; the data writing-in circuit is electrically connected to the second data line, and is configured to write the display data voltage provided by the second data line into the second node under the control of a second control signal provided by the second control terminal;

The pixel circuit further includes a switch control circuit and a driving control circuit; the control terminal of the switch control circuit is electrically connected to the switch control terminal;

The driving control circuit is electrically connected to the first control terminal, the first data line and the switch control terminal respectively, and is configured to write the light emitting time control data voltage provided by the first data line into the switch control terminal under the control of the first control signal provided by the first control terminal;

The switch control circuit is also electrically connected to the second electrode of the light emitting element and the first light emitting control circuit, respectively, and is configured to control the connection between the second electrode of the light emitting element and the first light emitting control circuit under the control of the potential of the switch control terminal; or, the switch control circuit is also electrically connected to the first light emitting control circuit and the first terminal of the driving circuit, respectively, and is configured to control the connection between the first light emitting control circuit and the first terminal of the driving circuit under the control of the potential of the switch control terminal; or, the switch control circuit is also electrically connected to the second terminal and the second voltage terminal of the driving circuit, respectively, and is configured to control the connection between the second terminal and the second voltage terminal of the driving circuit under the control of the potential of the switch control terminal.

In a specific implementation, the pixel circuit may further include a switch control circuit and a driving control circuit. The driving control circuit writes the light emitting time control data voltage into the switch control terminal under the control of the first control signal. The switch control circuit controls to connect or disconnect the light emitting path under the control of the potential of the switch control terminal. In at least one embodiment of the present disclosure, the light emitting element is an inorganic light emitting diode, the width-to-length ratio of the transistor included in the switch control circuit is greater than 1, and the width-to-length ratio of the transistor included in the driving circuit is greater than 0.5.

In a specific implementation, the light emitting element may be an inorganic light emitting diode, the width-to-length ratio of the transistor included in the switch control circuit may be greater than 1, and the width-to-length ratio of the transistor included in the driving circuit may be greater than 0.5.

In at least one embodiment of the present disclosure, the driving control circuit is also electrically connected to the first reset control terminal, the fourth initial voltage terminal and the switch control terminal, respectively, and is configured to write the fourth initial voltage provided by the fourth initial voltage terminal into the switch control terminal under the control of the first reset control signal provided by the first reset control terminal, and to maintain the potential of the switch control terminal.

In a specific implementation, the driving control circuit may also write a fourth initial voltage into the switch control terminal under the control of the first reset control signal, and be configured to maintain the potential of the switch control terminal.

In at least one embodiment of the present disclosure, the driving control circuit is also electrically connected to the second control terminal, the third initial voltage terminal and the switch control terminal, respectively, and is configured to write the third initial voltage provided by the third initial voltage terminal into the switch control terminal under the control of the second control signal provided by the second control terminal, and to maintain the potential of the switch control terminal.

In a specific implementation, the driving control circuit can also write a third initial voltage into the switch control terminal under the control of the second control signal, and is configured to maintain the potential of the switch control terminal.

As shown in FIG. 147, the pixel circuit according to at least one embodiment of the present disclosure includes a light emitting element E1, a first energy storage circuit 101, a second energy storage circuit 102, a data writing-in circuit 15, a driving circuit 11, a first initialization circuit 20, a first reset circuit 14, a second reset circuit 51, a first light emitting control circuit 61, a second light emitting control circuit 62, a switch control circuit 12, a driving control circuit 13, a sixth reset circuit 90, and a compensation control circuit 32;

The display cycle of the pixel circuit includes a first display phase and a second display phase which are arranged successively; the first display phase includes a first light emitting time period, and the second display phase includes a light emitting preparation time period and a second light emitting time period which are arranged successively;

The second terminal of the driving circuit 11 is electrically connected to the third node N3;

The first light emitting control circuit 61 is electrically connected to the first light emitting control terminal EM1, the second terminal of the driving circuit 11 and the switch control circuit 12 respectively, and is configured to control the second terminal of the driving circuit 11 to be connected to the switch control circuit 12 under the control of the first light emitting control signal provided by the first light emitting control terminal EM1;

The switch control circuit 12 is electrically connected to the switch control terminal N4, the first light control circuit 61 and the first electrode of the light emitting element E1 respectively, and is configured to control the first light control circuit 61 to be connected to the first electrode of the light emitting element E1 under the control of the potential of the switch control terminal N4;

The second electrode of the light emitting element E1 is electrically connected to the second voltage terminal V2;

The second light emitting control circuit 62 is electrically connected to the second light emitting control terminal, the first voltage terminal V1 and the first terminal of the driving circuit 11 respectively, and is configured to control the first voltage terminal V1 to be connected to the first terminal of the driving circuit 11 under the control of the second light emitting control signal provided by the second light emitting control terminal;

The control terminal of the driving circuit 11 is electrically connected to the first node N1. The driving circuit 11 is configured to generate a driving current for driving the light emitting element E1 to emit light according to the display data voltage in the first light emitting time period under the control of the potential of the first node N1, and to control whether to generate the driving current in the second light emitting time period according to the light emitting time control data voltage in the second light emitting time period;

The first terminal of the first energy storage circuit 101 is electrically connected to the first node N1, the second terminal of the first energy storage circuit 101 is electrically connected to the second node N2, and the first energy storage circuit 101 is configured to store electrical energy;

The first terminal of the second energy storage circuit 102 is electrically connected to the second node N2, the second terminal of the second energy storage circuit 102 is electrically connected to the second reference voltage terminal, and the second energy storage circuit 102 is configured to store electric energy; the second reference voltage terminal is configured to provide a second reference voltage Vref2;

The data writing-in circuit 15 is electrically connected to the second node N2, the second control terminal GA and the second data line DI respectively, and is configured to write the display data voltage provided by the second data line DI into the second node N2 under the control of the second control signal provided by the second control terminal GA;

The first initialization circuit 20 is electrically connected to the first reset control terminal RST1 and the first initial voltage terminal I1, respectively. The first initialization circuit 20 is also electrically connected to the first electrode of the light emitting element E1, and is configured to write the first initial voltage Vi1 provided by the first initial voltage terminal I1 into the first electrode of the light emitting element E1 under the control of the first reset control signal provided by the first reset control terminal RST1 during a partial time period in the light emitting preparation time period;

The first reset circuit 14 is electrically connected to the scanning terminal G1, the first reference voltage terminal and the second node N2 respectively, and is configured to write the first reference voltage Vref1 provided by the first reference voltage terminal into the second node N2 under the control of the scanning signal provided by the scanning terminal G1 during a partial time period of the light emitting preparation time period;

The second reset circuit 51 is electrically connected to the second reset control terminal RST2, the second initial voltage terminal I2 and the first node N1 respectively, and is configured to write the second initial voltage Vi2 provided by the second initial voltage terminal I2 into the first node under the control of the second reset control signal provided by the second reset control terminal RST2 during a partial time period of the light emitting preparation time period;

The sixth reset circuit 90 is electrically connected to the first reset control terminal RST1, the third initial voltage terminal I3 and the first terminal of the driving circuit 11 respectively, and is configured to write the third initial voltage Vi3 provided by the third initial voltage terminal I3 into the first terminal of the driving circuit 11 in a partial time period of the light emitting preparation time period under the control of the first reset control signal provided by the first reset control terminal RST1;

The driving control circuit 13 is electrically connected to the first control terminal GB, the first data line DT, the first reset control terminal RST1, the fourth initial voltage terminal I4 and the switch control terminal N4 respectively, and is configured to write the light emitting time control data voltage provided by the first data line DT into the switch control terminal N4 under the control of the first control signal provided by the first control terminal GB, write the fourth initial voltage Vi4 provided by the fourth initial voltage terminal I4 into the switch control terminal N4 under the control of the first reset control signal provided by the first reset control terminal RST1, and maintain the potential of the switch control terminal N4;

The second terminal of the driving circuit 11 is electrically connected to the third node N3;

The compensation control circuit 32 is electrically connected to the scanning terminal G1, the first node N1 and the third node N3 respectively, and is configured to control the connection between the first node N1 and the third node N3 under the control of the scanning signal provided by the scanning terminal G1.

As shown in FIG. 148, the pixel circuit described in at least one embodiment of the present disclosure includes a light emitting element E1, a first energy storage circuit 101, a second energy storage circuit 102, a data writing-in circuit 15, a driving circuit 11, a first initialization circuit 20, a first reset circuit 14, a second reset circuit 51, a first light emitting control circuit 61, a second light emitting control circuit 62, a switch control circuit 12, a driving control circuit 13, a sixth reset circuit 90, and a compensation control circuit 32;

The display cycle of the pixel circuit includes a first display phase and a second display phase which are arranged successively; the first display phase includes a first light emitting time period, and the second display phase includes a light emitting preparation time period and a second light emitting time period which are arranged successively;

The second terminal of the driving circuit 11 is electrically connected to the third node N3;

The first light emitting control circuit 61 is electrically connected to the first light emitting control terminal EM1, the second terminal of the driving circuit 11 and the first electrode of the light emitting element E1 respectively, and is configured to control the second terminal of the driving circuit 11 to be connected to the first electrode of the light emitting element E1 under the control of the first light emitting control signal provided by the first light emitting control terminal EM1;

The switch control circuit 12 is electrically connected to the switch control terminal N4, the first voltage terminal V1 and the second light emitting control circuit 62 respectively, and is configured to control the connection between the first voltage terminal V1 and the second light emitting control circuit 62 under the control of the potential of the switch control terminal N4;

The second light emitting control circuit 62 is electrically connected to the second light emitting control terminal EM2, the switch control circuit 12 and the first terminal of the driving circuit 11 respectively, and is configured to control the connection between the switch control circuit 12 and the first terminal of the driving circuit 11 under the control of the second light emitting control signal provided by the second light emitting control terminal EM2;

The second electrode of the light emitting element E1 is electrically connected to the second voltage terminal V2;

The control terminal of the driving circuit 11 is electrically connected to the first node N1. The driving circuit 11 is configured to generate a driving current for driving the light emitting element E1 to emit light according to the display data voltage in the first light emitting time period under the control of the potential of the first node N1, and to control whether to generate the driving current in the second light emitting time period according to the light emitting time control data voltage in the second light emitting time period;

The first terminal of the first energy storage circuit 101 is electrically connected to the first node N1, the second terminal of the first energy storage circuit 101 is electrically connected to the second node N2, and the first energy storage circuit 101 is configured to store electrical energy;

The first terminal of the second energy storage circuit 102 is electrically connected to the second node N2, the second terminal of the second energy storage circuit 102 is electrically connected to the second reference voltage terminal, and the second energy storage circuit 102 is configured to store electric energy; the second reference voltage terminal is configured to provide a second reference voltage Vref2;

The data writing-in circuit 15 is electrically connected to the second node N2, the second control terminal GA and the second data line DI respectively, and is configured to write the display data voltage provided by the second data line DI into the second node N2 under the control of the second control signal provided by the second control terminal GA;

The first initialization circuit 20 is electrically connected to the first reset control terminal RST1 and the first initial voltage terminal I1, respectively. The first initialization circuit 20 is also electrically connected to the first electrode of the light emitting element E1, and is configured to write the first initial voltage Vi1 provided by the first initial voltage terminal I1 into the first electrode of the light emitting element E1 under the control of the first reset control signal provided by the first reset control terminal RST1 during a partial time period in the light emitting preparation time period;

The first reset circuit 14 is electrically connected to the scanning terminal G1, the first reference voltage terminal and the second node N2 respectively, and is configured to write the first reference voltage Vref1 provided by the first reference voltage terminal into the second node N2 under the control of the scanning signal provided by the scanning terminal G1 during a partial time period of the light emitting preparation time period;

The second reset circuit 51 is electrically connected to the second reset control terminal RST2, the second initial voltage terminal I2 and the first node N1 respectively, and is configured to write the second initial voltage Vi2 provided by the second initial voltage terminal I2 into the first node under the control of the second reset control signal provided by the second reset control terminal RST2 during a partial time period of the light emitting preparation time period;

The sixth reset circuit 90 is electrically connected to the first reset control terminal RST1, the third initial voltage terminal I3 and the first terminal of the driving circuit 11 respectively, and is configured to write the third initial voltage Vi3 provided by the third initial voltage terminal I3 into the first terminal of the driving circuit 11 in a partial time period of the light emitting preparation time period under the control of the first reset control signal provided by the first reset control terminal RST1;

The driving control circuit 13 is electrically connected to the first control terminal GB, the first data line DT, the first reset control terminal RST1, the fourth initial voltage terminal I4 and the switch control terminal N4 respectively, and is configured to write the light emitting time control data voltage provided by the first data line DT into the switch control terminal N4 under the control of the first control signal provided by the first control terminal GB, write the fourth initial voltage Vi4 provided by the fourth initial voltage terminal I4 into the switch control terminal N4 under the control of the first reset control signal provided by the first reset control terminal RST1, and maintain the potential of the switch control terminal N4;

The compensation control circuit 32 is electrically connected to the scanning terminal G1, the first node N1 and the third node N3 respectively, and is configured to control the connection between the first node N1 and the third node N3 under the control of the scanning signal provided by the scanning terminal G1.

As shown in FIG. 149, the pixel circuit according to at least one embodiment of the present disclosure includes a light emitting element E1, a first energy storage circuit 101, a second energy storage circuit 102, a data writing-in circuit 15, a driving circuit 11, a first initialization circuit 20, a first reset circuit 14, a second reset circuit 51, a third reset circuit 81, a first light emitting control circuit 61, a switch control circuit 12, a driving control circuit 13, and a compensation control circuit 32;

The display cycle of the pixel circuit includes a first display phase and a second display phase which are arranged successively; the first display phase includes a first light emitting time period, and the second display phase includes a light emitting preparation time period and a second light emitting time period which are arranged successively;

The first terminal of the driving circuit 11 is electrically connected to the first voltage terminal V1, and the second terminal of the driving circuit 11 is electrically connected to the third node N3;

The first light emitting control circuit 61 is electrically connected to the first light emitting control terminal EM1, the second terminal of the driving circuit 11 and the switch control circuit 12 respectively, and is configured to control the second terminal of the driving circuit 11 to be connected to the switch control circuit 12 under the control of the first light emitting control signal provided by the first light emitting control terminal EM1;

The switch control circuit 12 is electrically connected to the switch control terminal N4, the first light control circuit 61 and the first electrode of the light emitting element E1 respectively, and is configured to control the first light control circuit 61 to be connected to the first electrode of the light emitting element E1 under the control of the potential of the switch control terminal N4;

The second electrode of the light emitting element E1 is electrically connected to the second voltage terminal V2;

The control terminal of the driving circuit 11 is electrically connected to the first node N1. The driving circuit 11 is configured to generate a driving current for driving the light emitting element E1 to emit light according to the display data voltage in the first light emitting time period under the control of the potential of the first node N1, and to control whether to generate the driving current in the second light emitting time period according to the light emitting time control data voltage in the second light emitting time period;

The first terminal of the first energy storage circuit 101 is electrically connected to the first node N1, the second terminal of the first energy storage circuit 101 is electrically connected to the second node N2, and the first energy storage circuit 101 is configured to store electrical energy;

The first terminal of the second energy storage circuit 102 is electrically connected to the second node N2, the second terminal of the second energy storage circuit 102 is electrically connected to the second reference voltage terminal, and the second energy storage circuit 102 is configured to store electric energy; the second reference voltage terminal is configured to provide a second reference voltage Vref2;

The data writing-in circuit 15 is electrically connected to the second node N2, the second control terminal GA and the second data line DI respectively, and is configured to write the display data voltage provided by the second data line DI into the second node N2 under the control of the second control signal provided by the second control terminal GA;

The first initialization circuit 20 is electrically connected to the first reset control terminal RST1 and the first initial voltage terminal I1, respectively. The first initialization circuit 20 is also electrically connected to the first electrode of the light emitting element E1, and is configured to write the first initial voltage Vi1 provided by the first initial voltage terminal I1 into the first electrode of the light emitting element E1 under the control of the first reset control signal provided by the first reset control terminal RST1 during a partial time period in the light emitting preparation time period;

The first reset circuit 14 is electrically connected to the scanning terminal G1, the first reference voltage terminal and the second node N2 respectively, and is configured to write the first reference voltage Vref1 provided by the first reference voltage terminal into the second node N2 under the control of the scanning signal provided by the scanning terminal G1 during a partial time period of the light emitting preparation time period;

The second reset circuit 51 is electrically connected to the second reset control terminal RST2, the second initial voltage terminal I2 and the first node N1 respectively, and is configured to write the second initial voltage Vi2 provided by the second initial voltage terminal I2 into the first node under the control of the second reset control signal provided by the second reset control terminal RST2 during a partial time period of the light emitting preparation time period;

The third reset circuit 81 is electrically connected to the second reset control terminal RST2, the first reference voltage terminal and the second node N2 respectively, and is configured to write the first reference voltage Vref1 into the second node N2 under the control of the second reset control signal in a partial time period of the light emitting preparation time period;

The driving control circuit 13 is electrically connected to the first control terminal GB, the first data line DT, the second control terminal GA, the third initial voltage terminal I3 and the switch control terminal N4 respectively, and is configured to write the light emitting time control data voltage provided by the first data line DT into the switch control terminal N4 under the control of the first control signal provided by the first control terminal GB, write the third initial voltage Vi3 provided by the third initial voltage terminal I3 into the switch control terminal N4 under the control of the second control signal provided by the second control terminal GA, and maintain the potential of the switch control terminal N4;

The compensation control circuit 32 is electrically connected to the scanning terminal G1, the first node N1 and the third node N3 respectively, and is configured to control the connection between the first node N1 and the third node N3 under the control of the scanning signal provided by the scanning terminal G1.

As shown in FIG. 150, the pixel circuit according to at least one embodiment of the present disclosure includes a light emitting element E1, a first energy storage circuit 101, a second energy storage circuit 102, a data writing-in circuit 15, a driving circuit 11, a first initialization circuit 20, a first reset circuit 14, a second reset circuit 51, a first light emitting control circuit 61, a switch control circuit 12, a driving control circuit 13, and a compensation control circuit 32;

The display cycle of the pixel circuit includes a first display phase and a second display phase which are arranged successively; the first display phase includes a first light emitting time period, and the second display phase includes a light emitting preparation time period and a second light emitting time period which are arranged successively;

The second terminal of the driving circuit 11 is electrically connected to the third node N3;

The first light emitting control circuit 61 is electrically connected to the first light emitting control terminal EM1, the second terminal of the driving circuit 11 and the first electrode of the light emitting element E1 respectively, and is configured to control the second terminal of the driving circuit 11 to be connected to the first electrode of the light emitting element E1 under the control of the first light emitting control signal provided by the first light emitting control terminal EM1;

The switch control circuit 12 is electrically connected to the switch control terminal N4, the first voltage terminal V1 and the first terminal of the driving circuit 11 respectively, and is configured to control the connection between the first voltage terminal V1 and the first terminal of the driving circuit 11 under the control of the potential of the switch control terminal N4;

The second electrode of the light emitting element E1 is electrically connected to the second voltage terminal V2;

The control terminal of the driving circuit 11 is electrically connected to the first node N1. The driving circuit 11 is configured to generate a driving current for driving the light emitting element E1 to emit light according to the display data voltage in the first light emitting time period under the control of the potential of the first node N1, and to control whether to generate the driving current in the second light emitting time period according to the light emitting time control data voltage in the second light emitting time period;

The first terminal of the first energy storage circuit 101 is electrically connected to the first node N1, the second terminal of the first energy storage circuit 101 is electrically connected to the second node N2, and the first energy storage circuit 101 is configured to store electrical energy;

The first terminal of the second energy storage circuit 102 is electrically connected to the second node N2, the second terminal of the second energy storage circuit 102 is electrically connected to the second reference voltage terminal, and the second energy storage circuit 102 is configured to store electric energy; the second reference voltage terminal is configured to provide a second reference voltage Vref2;

The data writing-in circuit 15 is electrically connected to the second node N2, the second control terminal GA and the second data line DI respectively, and is configured to write the display data voltage provided by the second data line DI into the second node N2 under the control of the second control signal provided by the second control terminal GA;

The first initialization circuit 20 is electrically connected to the first reset control terminal RST1 and the first initial voltage terminal I1, respectively. The first initialization circuit 20 is also electrically connected to the first electrode of the light emitting element E1, and is configured to write the first initial voltage Vi1 provided by the first initial voltage terminal I1 into the first electrode of the light emitting element E1 under the control of the first reset control signal provided by the first reset control terminal RST1 during a partial time period in the light emitting preparation time period;

The first reset circuit 14 is electrically connected to the scanning terminal G1, the first reference voltage terminal and the second node N2 respectively, and is configured to write the first reference voltage Vref1 provided by the first reference voltage terminal into the second node N2 under the control of the scanning signal provided by the scanning terminal G1 during a partial time period of the light emitting preparation time period;

The second reset circuit 51 is electrically connected to the second reset control terminal RST2, the second initial voltage terminal I2 and the first node N1 respectively, and is configured to write the second initial voltage Vi2 provided by the second initial voltage terminal I2 into the first node under the control of the second reset control signal provided by the second reset control terminal RST2 during a partial time period of the light emitting preparation time period;

The driving control circuit 13 is electrically connected to the first control terminal GB, the first data line DT, the second control terminal GA, the third initial voltage terminal I3 and the switch control terminal N4 respectively, and is configured to write the light emitting time control data voltage provided by the first data line DT into the switch control terminal N4 under the control of the first control signal provided by the first control terminal GB, write the third initial voltage Vi3 provided by the third initial voltage terminal I3 into the switch control terminal N4 under the control of the second control signal provided by the second control terminal GA, and maintain the potential of the switch control terminal N4;

The compensation control circuit 32 is electrically connected to the scanning terminal G1, the first node N1 and the third node N3 respectively, and is configured to control the connection between the first node N1 and the third node N3 under the control of the scanning signal provided by the scanning terminal G1.

Optionally, the driving circuit includes a driving transistor, the first initialization circuit includes a third transistor, and the first light emitting control circuit includes a fourth transistor;

a gate electrode of the third transistor is electrically connected to the first reset control terminal, a first electrode of the third transistor is electrically connected to the first initial voltage terminal, and a second electrode of the third transistor is electrically connected to the first electrode of the light emitting element;

a gate electrode of the fourth transistor is electrically connected to the first light emitting control terminal, a first electrode of the fourth transistor is electrically connected to the second electrode of the driving transistor, and a second electrode of the fourth transistor is electrically connected to the first electrode of the light emitting element;

a gate electrode of the driving transistor is electrically connected to the first node, and a first electrode of the driving transistor is electrically connected to the first voltage terminal.

Optionally, the driving circuit includes a driving transistor, the first initialization circuit includes a third transistor, and the first light emitting control circuit includes a fourth transistor;

a gate electrode of the third transistor is electrically connected to the first reset control terminal, a first electrode of the third transistor is electrically connected to the first initial voltage terminal, and a second electrode of the third transistor is electrically connected to the second electrode of the light emitting element;

a gate electrode of the fourth transistor is electrically connected to the first light emitting control terminal, a first electrode of the fourth transistor is electrically connected to the second electrode of the light emitting element, and a second electrode of the fourth transistor is electrically connected to the first electrode of the driving transistor;

a gate electrode of the driving transistor is electrically connected to the first node, and the second electrode of the driving transistor is electrically connected to the second voltage terminal.

Optionally, the first reset circuit includes a fifth transistor, and the second reset circuit includes a sixth transistor;

a gate electrode of the fifth transistor is electrically connected to the scanning terminal, a first electrode of the fifth transistor is electrically connected to the first reference voltage terminal, and a second electrode of the fifth transistor is electrically connected to the second node;

A gate electrode of the sixth transistor is electrically connected to the second reset control terminal, a first electrode of the sixth transistor is electrically connected to the second initial voltage terminal, and a second electrode of the sixth transistor is electrically connected to the first node.

Optionally, the third reset circuit includes a seventh transistor;

A gate electrode of the seventh transistor is electrically connected to the second reset control terminal, a first electrode of the seventh transistor is electrically connected to the first reference voltage terminal, and a second electrode of the seventh transistor is electrically connected to the second node.

Optionally, the first reset circuit includes a fifth transistor, the fourth reset circuit includes a seventh transistor, and the fifth reset circuit includes an eighth transistor;

a gate electrode of the fifth transistor is electrically connected to the scanning terminal, a first electrode of the fifth transistor is electrically connected to the second reference voltage terminal, and a second electrode of the fifth transistor is electrically connected to the fourth node;

a gate electrode of the seventh transistor is electrically connected to the second reset control terminal, a first electrode of the seventh transistor is electrically connected to the second reference voltage terminal, and a second electrode of the seventh transistor is electrically connected to the fourth node;

A gate electrode of the eighth transistor is electrically connected to the first light emitting control terminal, a first electrode of the eighth transistor is electrically connected to the first reference voltage terminal, and a second electrode of the eighth transistor is electrically connected to the second node.

Optionally, the sixth reset circuit includes a ninth transistor;

a gate electrode of the ninth transistor is electrically connected to the first reset control terminal, a first electrode of the ninth transistor is electrically connected to the third initial voltage terminal, and a second electrode of the ninth transistor is electrically connected to the first terminal of the driving circuit.

Optionally, the second light emitting control circuit includes a tenth transistor;

a gate electrode of the tenth transistor is electrically connected to the second light emitting control terminal, a first electrode of the tenth transistor is electrically connected to the first voltage terminal, and a second electrode of the tenth transistor is electrically connected to the first terminal of the driving circuit.

Optionally, the sixth reset circuit includes a ninth transistor;

a gate electrode of the ninth transistor is electrically connected to the first reset control terminal, a first electrode of the ninth transistor is electrically connected to the initial voltage terminal, and a second electrode of the ninth transistor is electrically connected to the second terminal of the driving circuit.

Optionally, the second light emitting control circuit includes a tenth transistor;

a gate electrode of the tenth transistor is electrically connected to the second light emitting control terminal, a first electrode of the tenth transistor is electrically connected to the second terminal of the driving circuit, and a second electrode of the tenth transistor is electrically connected to the second voltage terminal.

Optionally, the compensation control circuit includes an eleventh transistor;

A gate electrode of the eleventh transistor is electrically connected to the scanning terminal, a first electrode of the eleventh transistor is electrically connected to the first node, and a second electrode of the eleventh transistor is electrically connected to the third node.

Optionally, the switch control circuit includes a twelfth transistor, and the driving control circuit includes a thirteenth transistor;

a gate electrode of the twelfth transistor is electrically connected to the switch control terminal;

a first electrode of the twelfth transistor is electrically connected to the first light emitting control circuit, and a second electrode of the twelfth transistor is electrically connected to the first electrode of the light emitting element; or, the first electrode of the twelfth transistor is electrically connected to the second terminal of the driving circuit, and the second electrode of the twelfth transistor is electrically connected to the first light emitting control circuit; or, the first electrode of the twelfth transistor is connected to the first voltage terminal, and the second electrode of the twelfth transistor is electrically connected to the first terminal of the driving circuit;

A gate electrode of the thirteenth transistor is electrically connected to the first control terminal, a first electrode of the thirteenth transistor is electrically connected to the first data line, and a second electrode of the thirteenth transistor is electrically connected to the switch control terminal.

Optionally, the switch control circuit includes a twelfth transistor, and the driving control circuit includes a thirteenth transistor;

a gate electrode of the twelfth transistor is electrically connected to the switch control terminal;

a first electrode of the twelfth transistor is electrically connected to the second electrode of the light emitting element, and a second electrode of the twelfth transistor is electrically connected to the first light emitting control circuit; or, the first electrode of the twelfth transistor is electrically connected to the first light emitting control circuit, and the second electrode of the twelfth transistor is electrically connected to the first terminal of the driving circuit; or, the first electrode of the twelfth transistor is connected to the second terminal of the driving circuit, and the second electrode of the twelfth transistor is electrically connected to the second voltage terminal;

A gate electrode of the thirteenth transistor is electrically connected to the first control terminal, a first electrode of the thirteenth transistor is electrically connected to the first data line, and a second electrode of the thirteenth transistor is electrically connected to the switch control terminal.

Optionally, the driving circuit further includes a fourteenth transistor and a third capacitor;

a gate electrode of the fourteenth transistor is electrically connected to the first reset control terminal, a first electrode of the fourteenth transistor is electrically connected to the fourth initial voltage terminal, and a second electrode of the fourteenth transistor is electrically connected to the switch control terminal;

a first terminal of the third capacitor is electrically connected to the switch control terminal, and a second terminal of the third capacitor is electrically connected to the second DC voltage terminal.

Optionally, the driving circuit further includes a fourteenth transistor and a third capacitor;

a gate electrode of the fourteenth transistor is electrically connected to the second control terminal, a first electrode of the fourteenth transistor is electrically connected to the third initial voltage terminal, and a second electrode of the fourteenth transistor is electrically connected to the switch control terminal;

a first terminal of the third capacitor is electrically connected to the switch control terminal, and a second terminal of the third capacitor is electrically connected to the second DC voltage terminal.

As shown in FIG. 151, based on the pixel circuit shown in FIG. 142, the light emitting element is a light emitting diode E0;

The driving circuit includes a driving transistor T0, the first initialization circuit includes a third transistor T3, and the first light emitting control circuit includes a fourth transistor T4;

The data writing-in circuit includes a first transistor T1 and a second transistor T2;

The gate electrode of the first transistor T1 is electrically connected to the second control terminal GA, the source electrode of the first transistor T1 is electrically connected to the second data line DI, and the drain electrode of the first transistor T1 is electrically connected to the second node N2;

The gate electrode of the second transistor T2 is electrically connected to the first control terminal GB, the source electrode of the second transistor T2 is electrically connected to the first data line DT, and the drain electrode of the second transistor T2 is electrically connected to the second node N2;

The gate electrode of the third transistor T3 is electrically connected to the first reset control terminal RST1, the source electrode of the third transistor T3 is electrically connected to the first initial voltage terminal I1, the drain electrode of the third transistor T3 is electrically connected to the anode of the light emitting diode E0; the cathode of the light emitting diode E0 is electrically connected to the low voltage terminal VSS;

The gate electrode of the fourth transistor T4 is electrically connected to the first light emitting control terminal EM1, the source electrode of the fourth transistor T4 is electrically connected to the drain electrode of the driving transistor T0, and the drain electrode of the fourth transistor T4 is electrically connected to the anode of the light emitting diode E0;

The gate electrode of the driving transistor T0 is electrically connected to the first node N1;

The first reset circuit includes a fifth transistor T5, and the second reset circuit includes a sixth transistor T6;

The gate electrode of the fifth transistor T5 is electrically connected to the scanning terminal G1, the source electrode of the fifth transistor is electrically connected to the first reference voltage terminal, and the drain electrode of the fifth transistor T5 is electrically connected to the second node N2; the first reference voltage terminal is configured to provide a first reference voltage Vref1;

The gate electrode of the sixth transistor T6 is electrically connected to the second reset control terminal RST2, the source electrode of the sixth transistor T6 is electrically connected to the second initial voltage terminal I2, and the drain electrode of the sixth transistor T6 is electrically connected to the first node N1; the second initial voltage terminal I2 is configured to provide a second initial voltage Vi2;

The sixth reset circuit comprises a ninth transistor T9;

The gate electrode of the ninth transistor T9 is electrically connected to the first reset control terminal RST1, the source electrode of the ninth transistor T9 is electrically connected to the third initial voltage terminal I3, and the drain electrode of the ninth transistor T9 is electrically connected to the source electrode of the driving transistor T0; the third initial voltage terminal I3 is configured to provide a third initial voltage Vi3;

The second light emitting control circuit comprises a tenth transistor T10;

The gate electrode of the tenth transistor T10 is electrically connected to the second light emitting control terminal EM2, the source electrode of the tenth transistor T10 is electrically connected to the high voltage terminal VDD, and the drain electrode of the tenth transistor T10 is electrically connected to the source electrode of the driving transistor T0;

The compensation control circuit comprises an eleventh transistor T11;

The gate electrode of the eleventh transistor T11 is electrically connected to the scanning terminal G1, the source electrode of the eleventh transistor T11 is electrically connected to the first node N1, and the drain electrode of the eleventh transistor T11 is electrically connected to the third node N3;

The first energy storage circuit includes a first capacitor C1, and the second energy storage circuit includes a second capacitor C2;

A first terminal of C1 is electrically connected to a first node N1, and a second terminal of C1 is electrically connected to a second node N2;

A first terminal of C2 is electrically connected to the second node N2, and a second terminal of C2 is electrically connected to a second reference voltage terminal, the second reference voltage terminal is configured to provide a second reference voltage Vref2.

In the pixel circuit shown in FIG. 151, all transistors are PMOS (P-type metal-oxide-semiconductor) TFTs (thin film transistors).

In the pixel circuit shown in FIG. 151, the light emitting diode may be an OLED (organic light emitting diode), a Mini LED (mini light emitting diode) or a Micro LED (micro light emitting diode), but is not limited thereto.

The pixel circuit shown in FIG. 151 of the present disclosure realizes PAM (pulse amplitude modulation)+PWM (pulse width modulation) driving control by delayed writing-in of two data lines during operation.

In the pixel circuit shown in FIG. 151 of the present disclosure, Vdata_I is less than Vref1, Vi1−Vth is less than Vdd, and Vi1−Vss is less than Vled; wherein Vth is the threshold voltage of T0, Vdd is the voltage value of the high voltage signal provided by VDD, Vss is the voltage value of the low voltage signal provided by VSS, and Vled is the light-on voltage of E0;

When displaying at a high grayscale, Vdata_T is equal to Vdata_I, and when displaying at a low grayscale, Vdata_T is greater than Vref1;

Vref2 is a DC voltage; Vref2 may be equal to Vdd, or Vref2 may be equal to Vss, or Vref2 may be equal to Vi2, or Vref2 may be equal to Vi3; but not limited thereto.

As shown in FIG. 152, when the pixel circuit shown in FIG. 151 of the present disclosure is in operation, a display cycle (the display cycle may be one frame of time) includes a first display phase S1 and a second display phase S2 which are successively arranged;

The first display phase S1 includes a first light emitting preparation time period S01 and a first light emitting time period S15 which are arranged successively;

The second display phase S2 includes a second light emitting preparation time period S02 and a second light emitting time period S25 which are arranged successively;

The first light emitting preparation time period S01 includes a first reset time period S11, a first compensation time period S12, a first writing-in time period S13 and a second reset time period S14 which are arranged successively;

The second light emitting preparation time period S02 includes a third reset time period S21, a second compensation time period S22, a second writing-in time period S23 and a fourth reset time period S24 which are arranged successively;

In the first reset time period S11, G1 and RST2 provide low voltage signals, as shown in FIG. 153A, T5, T11 and T6 are turned on, N1, N2 and N3 are reset, the potential of N1 and the potential of N3 are Vi2, and the potential of N2 is Vref1;

In the first compensation time period S12, G1 and EM2 provide low voltage signals, as shown in FIG. 153B, and T5, T11, and T10 are turned on;

At the beginning of the first compensation time period S12, since Vi2 is less than Vdd, Vdd is the voltage value of the high voltage signal provided by VDD, T0 is turned on, and the capacitor is charged by the high voltage signal provided by VDD to increase the potential of N1 until the potential of N1 becomes Vdd+Vth, where Vth is the threshold voltage of T0, and the potential of N2 is Vref1;

In the first writing-in time period S13, GA provides a low voltage signal, as shown in FIG. 153C, T1 is turned on, DI writes the display data voltage Vdata_I to N2, and the potential of N1 jumps along with the potential of N2 due to capacitive coupling, and the potential of N1 becomes Vdd+Vth+Vdata_I−Vref1, and the potential of N2 is Vdata_I;

In the second reset time period S14, RST1 provides a low voltage signal, as shown in FIG. 153D, T3 and T9 are turned on, the anode potential of E0 is reset, the potential of the source electrode of T0 is reset, the source voltage of T0 is V13, and the bias voltage is written to the source electrode of T0. Before the first light emitting time period S15, T0 is turned on and biased to reduce image flicker and afterimage caused by the hysteresis characteristics of T0; in a preferred case, Vi3 is greater than Vdd, and Vdd is the voltage value of the high voltage signal provided by VDD;

In the first light emitting time period S15, EM1 and EM2 provide low voltage signals, as shown in FIG. 153E, T10, T0 and T4 are turned on, and T0 drives E0 to emit light;

In the third reset time period S21, G1 and RST2 provide low voltage signals, as shown in FIG. 153F, T5, T11 and T6 are turned on, N1, N2 and N3 are reset, the potential of N1 and the potential of N3 are Vi2, and the potential of N2 is Vref1;

In the second compensation time period S22, G1 and EM2 provide low voltage signals, as shown in FIG. 153G, and T5, T11, and T10 are turned on;

At the beginning of the second compensation time period S22, since Vi2 is less than Vdd, Vdd is the voltage value of the high voltage signal provided by VDD, T0 is turned on, and the capacitor is charged by the high voltage signal provided by VDD to increase the potential of N1 until the potential of N1 becomes Vdd+Vth, where Vth is the threshold voltage of T0, and the potential of N2 is Vref1;

In the second writing-in time period S23, GB provides a low voltage signal, as shown in FIG. 153H, T2 is turned on, DT writes the light emitting time control data voltage Vdata_T into N2, and the potential of N1 jumps along with the potential of N2 due to capacitive coupling, and the potential of N1 becomes Vdd+Vth+Vdata_T−Vref1, and the potential of N2 is Vdata_T;

In the fourth reset time period S24, RST1 provides a low voltage signal, as shown in FIG. 153I, T3 and T9 are turned on, the anode potential of E0 is reset, the potential of the source electrode of T0 is reset, the source voltage of T0 is Vi3, and the bias voltage is written to the source electrode of T0. Before the first light emitting time period S15, T0 is turned on and biased to reduce image flicker and afterimage caused by the hysteresis characteristics of T0; in a preferred case, Vi3 is greater than Vdd, and Vdd is the voltage value of the high voltage signal provided by VDD;

In the second light emitting time period S25, both EM1 and EM2 provide low voltage signals, as shown in FIG. 153J, and T10 and T4 are turned on;

When Vdata_T is a high voltage signal in the second writing-in time period S23 and Vdata_T is greater than Vref1, in the second light emitting time period S25, T0 is turned off and E0 does not emit light, achieving short-term light emitting, and the light emitting duration is t1; t1 is the duration of the first light emitting time period S15;

When Vdata_T is equal to Vdata_I in the second writing-in time period S23, T0 is turned on in the second light emitting time period S25, and the driving current of T0 is the same as the driving current of T0 in the first light emitting time period S15. E0 continuously emits light to achieve long-term light emitting. The light emitting time is t1+t2, and t2 is the duration of the second light emitting time period S25.

FIG. 154A is a schematic diagram showing simulation results of the pixel circuit shown in FIG. 151 of the present disclosure when performing high grayscale display;

FIG. 154B is a schematic diagram of simulation results of the pixel circuit shown in FIG. 151 of the present disclosure when performing low grayscale display.

In at least one embodiment corresponding to FIG. 154A and FIG. 154B, Vref1 is equal to Vdd, Vref1 is equal to Vi3, Vref1 may be 6V, Vss is −3V, Vi1 is −5V, Vi2 is −3V, and Vdata_I may be equal to 2V;

The high voltage value of each control signal may be 10 V, and the low voltage value of each control signal may be −7V;

In FIG. 154B, Vdata_I is 2V and Vdata_T is 8V.

In at least one embodiment of the present disclosure, Id is the driving current generated at T0.

As shown in FIG. 155, based on the pixel circuit shown in FIG. 143, the light emitting element is a light emitting diode E0;

The driving circuit includes a driving transistor T0, the first initialization circuit includes a third transistor T3, and the first light emitting control circuit includes a fourth transistor T4;

The data writing-in circuit includes a first transistor T1 and a first second transistor T21, a second second transistor T22 and a third second transistor T23;

The gate electrode of the first transistor T1 is electrically connected to the second control terminal GA, the source electrode of the first transistor T1 is electrically connected to the second data line DI, and the drain electrode of the first transistor T1 is electrically connected to the second node N2;

The gate electrode of the first second transistor T21 is electrically connected to the first first control terminal GB1, the source electrode of the first second transistor T21 is electrically connected to the first first data line DT1, and the drain electrode of the first second transistor T21 is electrically connected to the second node N2;

The gate electrode of the second second transistor T22 is electrically connected to the second first control terminal GB2, the source electrode of the second second transistor T22 is electrically connected to the second first data line DT2, and the drain electrode of the second second transistor T22 is electrically connected to the second node N2;

The gate electrode of the third second transistor T23 is electrically connected to the third first control terminal GB3, the source electrode of the third second transistor T23 is electrically connected to the third first data line DT3, and the drain electrode of the third second transistor T23 is electrically connected to the second node N2;

The gate electrode of the third transistor T3 is electrically connected to the first reset control terminal RST1, the source electrode of the third transistor T3 is electrically connected to the first initial voltage terminal I1, the drain electrode of the third transistor T3 is electrically connected to the anode of the light emitting diode E0; the cathode of the light emitting diode E0 is electrically connected to the low voltage terminal VSS;

The gate electrode of the fourth transistor T4 is electrically connected to the first light emitting control terminal EM1, the source electrode of the fourth transistor T4 is electrically connected to the drain electrode of the driving transistor T0, and the drain electrode of the fourth transistor T4 is electrically connected to the anode of the light emitting diode E0;

The gate electrode of the driving transistor T0 is electrically connected to the first node N1;

The first reset circuit includes a fifth transistor T5, and the second reset circuit includes a sixth transistor T6;

The gate electrode of the fifth transistor T5 is electrically connected to the scanning terminal G1, the source electrode of the fifth transistor is electrically connected to the first reference voltage terminal, and the drain electrode of the fifth transistor T5 is electrically connected to the second node N2; the first reference voltage terminal is configured to provide a first reference voltage Vref1;

The gate electrode of the sixth transistor T6 is electrically connected to the second reset control terminal RST2, the source electrode of the sixth transistor T6 is electrically connected to the second initial voltage terminal I2, and the drain electrode of the sixth transistor T6 is electrically connected to the first node N1; the second initial voltage terminal I2 is configured to provide a second initial voltage Vi2;

The sixth reset circuit comprises a ninth transistor T9;

The gate electrode of the ninth transistor T9 is electrically connected to the first reset control terminal RST1, the source electrode of the ninth transistor T9 is electrically connected to the third initial voltage terminal I3, and the drain electrode of the ninth transistor T9 is electrically connected to the source electrode of the driving transistor T0; the third initial voltage terminal I3 is configured to provide a third initial voltage Vi3;

The second light emitting control circuit comprises a tenth transistor T10;

The gate electrode of the tenth transistor T10 is electrically connected to the second light emitting control terminal EM2, the source electrode of the tenth transistor T10 is electrically connected to the high voltage terminal VDD, and the drain electrode of the tenth transistor T10 is electrically connected to the source electrode of the driving transistor T0;

The compensation control circuit comprises an eleventh transistor T11;

The gate electrode of the eleventh transistor T11 is electrically connected to the scanning terminal G1, the source electrode of the eleventh transistor T11 is electrically connected to the first node N1, and the drain electrode of the eleventh transistor T11 is electrically connected to the third node N3;

The first energy storage circuit includes a first capacitor C1, and the second energy storage circuit includes a second capacitor C2;

A first terminal of C1 is electrically connected to a first node N1, and a second terminal of C1 is electrically connected to a second node N2;

A first terminal of C2 is electrically connected to the second node N2, and a second terminal of C2 is electrically connected to a second reference voltage terminal, where the second reference voltage terminal is configured to provide a second reference voltage Vref2.

In the pixel circuit shown in FIG. 155, all transistors are p-type transistors, but the present invention is not limited thereto.

FIG. 156 is a timing diagram of the pixel circuit shown in FIG. 155.

As shown in FIG. 156, when the pixel circuit shown in FIG. 155 of the present disclosure is in operation, within one frame of time, three groups of light emitting time control data voltages are delayed in writing-in to realize multiple groups of pulse width control display, while realizing high-frequency display light emitting, reducing flicker defects, and realizing healthy display.

As shown in FIG. 156, the display cycle includes a first display phase S1 and m second display phases;

In FIG. 156, the first second display phase is labeled S012, and the mth second display phase is labeled S**0*m*2**; m is an integer greater than 1;

The first display phase S1 includes a first reset time period S11, a first compensation time period S12, a first writing-in time period S13, a second reset time period S14 and a first light emitting time period S15;

The first second display phase S012 includes a third reset time period S21, a second compensation time period S22, a second writing-in time period S23, a fourth reset time period S24 and a second light emitting time period S25;

The mth second display phase S0*m*2 includes a (2m+1)th reset time period S31, an (m+1)th compensation time period S32, an (m+1)th writing-in time period S33, a (2m+2)th reset time period S34 and an (m+1)th light emitting time period S35;

In the first reset time period S11, G1 and RST2 provide low voltage signals, T5, T11 and T6 are turned on, N1, N2 and N3 are reset, the potential of N1 and the potential of N3 are Vi2, and the potential of N2 is Vref1;

In the first compensation time period S12, G1 and EM2 provide low voltage signals, and T5, T11 and T10 are turned on;

At the beginning of the first compensation time period S12, since Vi2 is less than Vdd, Vdd is the voltage value of the high voltage signal provided by VDD, T0 is turned on, and the capacitor is charged by the high voltage signal provided by VDD to increase the potential of N1 until the potential of N1 becomes Vdd+Vth, where Vth is the threshold voltage of T0, and the potential of N2 is Vref1;

In the first writing-in time period S13, GA provides a low voltage signal, T1 is turned on, DI writes the display data voltage Vdata_I to N2, and the potential of N1 jumps along with the potential of N2 due to capacitive coupling, and the potential of N1 becomes Vdd+Vth+Vdata_I−Vref1, and the potential of N2 is Vdata_I;

In the second reset time period S14, RST1 provides a low voltage signal, T3 and T9 are turned on, the anode potential of E0 is reset, the potential of the source electrode of T0 is reset, the source voltage of T0 is V13, and the bias voltage is written to the source electrode of T0. Before the first light emitting time period S15, T0 is turned on and biased to reduce image flicker and afterimage caused by the hysteresis characteristics of T0; in a preferred case, Vi3 is greater than Vdd, and Vdd is the voltage value of the high voltage signal provided by VDD;

In the first light emitting time period S15, EM1 and EM2 provide low voltage signals, T10, T0 and T4 are turned on, and T0 drives E0 to emit light;

In the third reset time period S21, G1 and RST2 provide low voltage signals, T5, T11 and T6 are turned on, N1, N2 and N3 are reset, the potential of N1 and the potential of N3 are Vi2, and the potential of N2 is Vref1;

In the second compensation time period S22, G1 and EM2 provide low voltage signals, and T5, T11 and T10 are turned on;

At the beginning of the second compensation time period S22, since Vi2 is less than Vdd, Vdd is the voltage value of the high voltage signal provided by VDD, T0 is turned on, and the capacitor is charged by the high voltage signal provided by VDD to increase the potential of N1 until the potential of N1 becomes Vdd+Vth, where Vth is the threshold voltage of T0, and the potential of N2 is Vref1;

In the second writing-in time period S23, GB provides a low voltage signal, T2 is turned on, and DT writes the first light emitting time control data voltage Vdata_T1 into N2. The potential of N1 jumps with the potential of N2 due to capacitive coupling, and the potential of N1 becomes Vdd+Vth+Vdata_T1−Vref1, and the potential of N2 is Vdata_T1.

In the fourth reset time period S24, RST1 provides a low voltage signal, T3 and T9 are turned on, the anode potential of E0 is reset, the potential of the source electrode of T0 is reset, the source voltage of T0 is V13, the source electrode of T0 is written with a bias voltage, and before the second light emitting time period S25, T0 is turned on and biased to reduce image flicker and afterimage caused by the hysteresis characteristics of T0; in a preferred case, Vi3 is greater than Vdd, and Vdd is the voltage value of the high voltage signal provided by VDD;

In the second light emitting time period S25, EM1 and EM2 both provide low voltage signals, and T10 and T4 are turned on;

When Vdata_T1 is a high voltage signal in the second writing-in time period S23 and Vdata_T1 is greater than Vref1, E0 does not emit light in the second light emitting time period S25;

When Vdata_T2 is equal to Vdata_I in the second writing-in time period S23, T0 is turned on in the third light emitting time period S35, and the driving current of T0 is the same as the driving current of T0 in the first light emitting time period S15, and E0 continues to emit light;

In the (2m+1)th reset time period S31, G1 and RST2 provide low voltage signals, T5, T11 and T6 are turned on, N1, N2 and N3 are reset, the potential of N1 and the potential of N3 are Vi2, and the potential of N2 is Vref1;

In the (m+1)th compensation time period S32, G1 and EM2 provide low voltage signals, and T5, T11, and T10 are turned on;

At the beginning of the (m+1)th compensation time period S32, since Vi2 is less than Vdd, Vdd is the voltage value of the high voltage signal provided by VDD, T0 is turned on, and the capacitor is charged by the high voltage signal provided by VDD to increase the potential of N1 until the potential of N1 becomes Vdd+Vth, where Vth is the threshold voltage of T0, and the potential of N2 is Vref1;

In the (m+1)th writing-in time period S33, GB provides a low voltage signal, T2 is turned on, DT writes the second light emitting time control data voltage Vdata_T2 into N2, and the potential of N1 jumps with the potential of N2 due to capacitive coupling, and the potential of N1 becomes Vdd+Vth+Vdata_T2−Vref1, and the potential of N2 is Vdata_T2;

In the (2m+2)th reset time period S34, RST1 provides a low voltage signal, T3 and T9 are turned on, the anode potential of E0 is reset, the potential of the source electrode of T0 is reset, the source voltage of T0 is V13, and the bias voltage is written to the source electrode of T0. Before the third light emitting time period S35, T0 is turned on and biased to reduce image flicker and afterimage caused by the hysteresis characteristics of T0; in a preferred case, Vi3 is greater than Vdd, and Vdd is the voltage value of the high voltage signal provided by VDD;

In the (m+1)th light emitting time period S35, EM1 and EM2 both provide low voltage signals, and T10 and T4 are turned on;

When Vdata_T2 is a high voltage signal in the (m+1)th writing-in time period S33 and Vdata_T2 is greater than Vref1, T0 is turned off and E0 does not emit light in the third light emitting time period S35;

When Vdata_T2 is equal to Vdata_I in the (m+1)th writing-in time period S33, T0 is turned on in the third light emitting time period S35, and the driving current of T0 is the same as the driving current of T0 in the first light emitting time period S15, and E0 continues to emit light.

The difference between the pixel circuit shown in FIG. 157 of the present disclosure and the pixel circuit shown in FIG. 151 of the present disclosure is that T9 is not provided.

As shown in FIG. 158, the pixel circuit shown in FIG. 157 of the present disclosure is in operation.

In the second reset time period S14 and the fourth reset time period S24, EM1 provides a low voltage signal, T10 is turned on, and the source electrode of T0 is reset using VDD, that is, a bias voltage is written to the source electrode of T0. Before emitting light, T0 is turned on and biased to reduce image flickering and afterimage caused by the hysteresis characteristics of T0.

The pixel circuit shown in FIG. 157 of the present disclosure reduces the number of transistors used, thereby facilitating the realization of a high PPI (pixel density).

As shown in FIG. 159, based on the pixel circuit shown in FIG. 144,

The light emitting element is a light emitting diode E0;

The driving circuit includes a driving transistor T0, the first initialization circuit includes a third transistor T3, and the first light emitting control circuit includes a fourth transistor T4;

The data writing-in circuit includes a first transistor T1 and a second transistor T2;

The gate electrode of the first transistor T1 is electrically connected to the second control terminal GA, the source electrode of the first transistor T1 is electrically connected to the second data line DI, and the drain electrode of the first transistor T1 is electrically connected to the second node N2;

The gate electrode of the second transistor T2 is electrically connected to the first control terminal GB, the source electrode of the second transistor T2 is electrically connected to the first data line DT, and the drain electrode of the second transistor T2 is electrically connected to the second node N2;

The anode of the light emitting diode E0 is electrically connected to the high voltage terminal VDD;

The gate electrode of the third transistor T3 is electrically connected to the first reset control terminal RST1, the source electrode of the third transistor T3 is electrically connected to the first initial voltage terminal I1, and the drain electrode of the third transistor T3 is electrically connected to the cathode of the light emitting diode E0;

The gate electrode of the fourth transistor T4 is electrically connected to the first light emitting control terminal EM1, the drain electrode of the fourth transistor T4 is electrically connected to the cathode of the light emitting diode E0, the source electrode of the fourth transistor T4 is electrically connected to the drain electrode of T0; the drain electrode of T0 is electrically connected to the third node N3;

The gate electrode of the driving transistor T0 is electrically connected to the first node N1;

The first reset circuit includes a fifth transistor T5, and the second reset circuit includes a sixth transistor T6;

The gate electrode of the fifth transistor T5 is electrically connected to the scanning terminal G1, the source electrode of the fifth transistor is electrically connected to the first reference voltage terminal, and the drain electrode of the fifth transistor T5 is electrically connected to the second node N2; the first reference voltage terminal is configured to provide a first reference voltage Vref1;

The gate electrode of the sixth transistor T6 is electrically connected to the second reset control terminal RST2, the source electrode of the sixth transistor T6 is electrically connected to the second initial voltage terminal I2, and the drain electrode of the sixth transistor T6 is electrically connected to the first node N1; the second initial voltage terminal I2 is configured to provide a second initial voltage Vi2;

The sixth reset circuit comprises a ninth transistor T9;

The gate electrode of the ninth transistor T9 is electrically connected to the first reset control terminal RST1, the source electrode of the ninth transistor T9 is electrically connected to the third initial voltage terminal I3, and the drain electrode of the ninth transistor T9 is electrically connected to the source electrode of the driving transistor T0; the third initial voltage terminal I3 is configured to provide a third initial voltage Vi3;

The second light emitting control circuit comprises a tenth transistor T10;

The gate electrode of the tenth transistor T10 is electrically connected to the second light emitting control terminal EM2, the drain electrode of the tenth transistor T10 is electrically connected to the source electrode of T0, and the source electrode of the tenth transistor T0 is electrically connected to the low voltage terminal VSS;

The compensation control circuit comprises an eleventh transistor T11;

The gate electrode of the eleventh transistor T11 is electrically connected to the scanning terminal G1, the source electrode of the eleventh transistor T11 is electrically connected to the first node N1, and the drain electrode of the eleventh transistor T11 is electrically connected to the third node N3;

The first energy storage circuit includes a first capacitor C1, and the second energy storage circuit includes a second capacitor C2;

A first terminal of C1 is electrically connected to a first node N1, and a second terminal of C1 is electrically connected to a second node N2;

A first terminal of C2 is electrically connected to the second node N2, and a second terminal of C2 is electrically connected to a second reference voltage terminal, where the second reference voltage terminal is configured to provide a second reference voltage Vref2.

In the pixel circuit shown in FIG. 159 of the present disclosure, all transistors are NMOS (N-type metal-oxide-semiconductor) TFTs (thin film transistors).

The pixel circuit shown in FIG. 159 of the present disclosure adopts NMOS TFT technology to realize a current control+duration control pixel circuit, which can be applied to oxide display products.

In the pixel circuit shown in FIG. 159 of the present disclosure, the light emitting diode E0 may be a Mini LED (mini light emitting diode) or a Micro LED (micro light emitting diode), but is not limited thereto;

When the pixel circuit adopts NMOS TFT, the light emitting diode E0 can be placed between T0 and VDD.

In the pixel circuit shown in FIG. 159 of the present disclosure, since T0 becomes an NMOS TFT, in the second writing-in time period, when the light emitting time control data voltage Vdata_T written by DT is less than Vref1, T0 drives E0 to emit light.

FIG. 160 is a timing diagram of the pixel circuit shown in FIG. 159 of the present disclosure.

The difference between the pixel circuit shown in FIG. 161 of the present disclosure and the pixel circuit shown in FIG. 151 of the present disclosure is that: T5, T1, T2, T6 and T11 are NMOS TFTs, which utilize the advantage of low leakage current of oxide TFTs to reduce the leakage of the drain electrode of N1 and N2; utilizing the advantage of high mobility of PMOS TFTs, T0, T4 and T10 are all PMOS TFTs, which is beneficial to threshold voltage compensation and compensation time reduction, current driving requirements and reducing the area occupied by the first capacitor, thereby further improving display performance.

FIG. 162 is a timing diagram of the pixel circuit shown in FIG. 161 of the present disclosure.

The pixel circuit shown in FIG. 163 of the present disclosure and the pixel circuit shown in FIG. 151 of the present disclosure is that: T5, T1, T2, T6, T11, T9 and T3 are NMOS TFTs, which utilize the advantage of low leakage current of oxide TFTs to reduce the leakage of the drain electrode of N1 and N2; utilizing the advantage of high mobility of PMOS TFTs, T0, T4 and T10 are all PMOS TFTs, which is beneficial to threshold voltage compensation and compensation time reduction, current driving requirements and reducing the area occupied by the first capacitor, thereby further improving display performance.

FIG. 164 is a timing diagram of the pixel circuit shown in FIG. 163 of the present disclosure.

As shown in FIG. 165, based on the pixel circuit shown in FIG. 147, the light emitting element is a light emitting diode E0;

The driving circuit includes a driving transistor T0, the first initialization circuit includes a third transistor T3, and the first light emitting control circuit includes a fourth transistor T4;

The data writing-in circuit includes a first transistor T1;

The gate electrode of the first transistor T1 is electrically connected to the second control terminal GA, the source electrode of the first transistor T1 is electrically connected to the second data line DI, and the drain electrode of the first transistor T1 is electrically connected to the second node N2;

The gate electrode of the third transistor T3 is electrically connected to the first reset control terminal RST1, the source electrode of the third transistor T3 is electrically connected to the first initial voltage terminal I1, the drain electrode of the third transistor T3 is electrically connected to the anode of the light emitting diode E0; the cathode of the light emitting diode E0 is electrically connected to the low voltage terminal VSS;

The gate electrode of the fourth transistor T4 is electrically connected to the first light emitting control terminal EM1, and the source electrode of the fourth transistor T4 is electrically connected to the drain electrode of the driving transistor T0;

The gate electrode of the driving transistor T0 is electrically connected to the first node N1;

The first reset circuit includes a fifth transistor T5, and the second reset circuit includes a sixth transistor T6;

The gate electrode of the fifth transistor T5 is electrically connected to the scanning terminal G1, the source electrode of the fifth transistor is electrically connected to the first reference voltage terminal, and the drain electrode of the fifth transistor T5 is electrically connected to the second node N2; the first reference voltage terminal is configured to provide a first reference voltage Vref1;

The gate electrode of the sixth transistor T6 is electrically connected to the second reset control terminal RST2, the source electrode of the sixth transistor T6 is electrically connected to the second initial voltage terminal I2, and the drain electrode of the sixth transistor T6 is electrically connected to the first node N1; the second initial voltage terminal I2 is configured to provide a second initial voltage Vi2;

The sixth reset circuit comprises a ninth transistor T9;

The gate electrode of the ninth transistor T9 is electrically connected to the first reset control terminal RST1, the source electrode of the ninth transistor T9 is electrically connected to the third initial voltage terminal I3, and the drain electrode of the ninth transistor T9 is electrically connected to the source electrode of the driving transistor T0; the third initial voltage terminal I3 is configured to provide a third initial voltage V3;

The second light emitting control circuit comprises a tenth transistor T10;

The gate electrode of the tenth transistor T10 is electrically connected to the second light emitting control terminal EM2, the source electrode of the tenth transistor T10 is electrically connected to the high voltage terminal VDD, and the drain electrode of the tenth transistor T10 is electrically connected to the source electrode of the driving transistor T0;

The compensation control circuit comprises an eleventh transistor T11;

The gate electrode of the eleventh transistor T11 is electrically connected to the scanning terminal G1, the source electrode of the eleventh transistor T11 is electrically connected to the first node N1, and the drain electrode of the eleventh transistor T11 is electrically connected to the third node N3;

The first energy storage circuit includes a first capacitor C1, and the second energy storage circuit includes a second capacitor C2;

A first terminal of C1 is electrically connected to a first node N1, and a second terminal of C1 is electrically connected to a second node N2;

A first terminal of C2 is electrically connected to a second node N2, and a second terminal of C2 is electrically connected to a second reference voltage terminal, wherein the second reference voltage terminal is configured to provide a second reference voltage Vref2;

The switch control circuit includes a twelfth transistor T12, the driving control circuit includes a thirteenth transistor T13;

The gate electrode of the twelfth transistor T12 is electrically connected to the switch control terminal N4;

The source electrode of the twelfth transistor T12 is electrically connected to the drain electrode of the fourth transistor T4, and the drain electrode of the twelfth transistor T12 is electrically connected to the anode of the light emitting diode E0;

The gate electrode of the thirteenth transistor T13 is electrically connected to the first control terminal GB, the source electrode of the thirteenth transistor T13 is electrically connected to the first data line DT, and the drain electrode of the thirteenth transistor T13 is electrically connected to the switch control terminal N4;

The driving control circuit also includes a fourteenth transistor T14 and a third capacitor C3;

The gate electrode of the fourteenth transistor T14 is electrically connected to the first reset control terminal RST1, the source electrode of the fourteenth transistor T14 is electrically connected to the fourth initial voltage terminal I4, and the drain electrode of the fourteenth transistor T14 is electrically connected to the switch control terminal N4; the fourth initial voltage terminal I4 is configured to provide a fourth initial voltage Vi4;

A first terminal of the third capacitor C3 is electrically connected to the switch control terminal N4, and a second terminal of the third capacitor C3 is electrically connected to a third reference voltage terminal; the third reference voltage terminal is configured to provide a third reference voltage.

In the pixel circuit shown in FIG. 165, the first DC voltage terminal is the second reference voltage terminal, and the second DC voltage terminal is the third reference voltage terminal, but this is not limited to.

In the pixel circuit shown in FIG. 165, all transistors are PMOS TFTs, but not limited thereto.

In the pixel circuit shown in FIG. 165, a PWM (pulse width modulation) control module (the PWM control module includes T12, T13, T14 and C3) for controlling the light emitting time and delaying the writing-in of the data voltage is arranged on the current path to control the conduction and cutoff of the current in the current path.

As shown in FIG. 166, when the pixel circuit shown in FIG. 165 of the present disclosure is in operation, the display cycle includes a first display phase S1 and a second display phase S2 which are set in sequence; the first display cycle includes a first reset time period S11, a first compensation time period S12, a first writing-in time period S13, a second reset time period S14 and a first light emitting time period S15 which are set in sequence; the second display cycle includes a second writing-in time period S23 and a second light emitting time period S25 which are set in sequence;

In the first reset time period S11, RST2 provides a low voltage signal, G1 and RST2 provide a low voltage signal, T5, T11 and T6 are turned on, N1, N2 and N3 are reset, the potential of N1 and the potential of N3 are Vi2, and the potential of N2 is Vref1;

In the first compensation time period S12, G1 and EM2 provide low voltage signals, and T5, T11 and T10 are turned on;

At the beginning of the first compensation time period S12, since Vi2 is less than Vdd, Vdd is the voltage value of the high voltage signal provided by VDD, T0 is turned on, and the capacitor is charged by the high voltage signal provided by VDD to increase the potential of N1 until the potential of N1 becomes Vdd+Vth, where Vth is the threshold voltage of T0, and the potential of N2 is Vref1;

In the first writing-in time period S13, GA provides a low voltage signal, T1 is turned on, DI writes the display data voltage Vdata_I to N2, and the potential of N1 jumps along with the potential of N2 due to capacitive coupling, and the potential of N1 becomes Vdd+Vth+Vdata_I−Vref1, and the potential of N2 is Vdata_I;

In the second reset time period S14, RST1 provides a low voltage signal, T3 and T9 are turned on, the anode potential of E0 is reset, the potential of the source electrode of T0 is reset, the source voltage of T0 is V13, and the bias voltage is written to the source electrode of T0. Before the first light emitting time period S15, T0 is turned on and biased to reduce image flicker and afterimage caused by the hysteresis characteristics of T0; in a preferred case, Vi3 is greater than Vdd, and Vdd is the voltage value of the high voltage signal provided by VDD;

In the second reset time period S14, RST1 provides a low voltage signal, T14 is turned on, the fourth initial voltage Vi4 provided by I4 is a low voltage signal, N4 is connected to Vi4, and T12 is turned on;

In the first light emitting time period S15, EM1 and EM2 provide low voltage signals, T12, T10, T0 and T4 are turned on, and T0 drives E0 to emit light;

In the second writing-in time period S23, GB provides a low voltage signal, T13 is turned on, and DT writes the light emitting time control data voltage Vdata_T to N4;

In the second light emitting time period S25, EM1 and EM2 provide low voltage signals, and T4 and T10 are turned on;

When Vdata_T is a high voltage signal, T12 is turned off, and the light emitting duration is the first time t1, where t1 is the duration of the first light emitting time period S15;

When Vdata_T is a low voltage signal, in the preferred case, Vdata_T is equal to V14; T12 is turned on, the light emitting duration is t1+t2, t2 is the second time, and t2 is the duration of the second light emitting time period S25, so as to achieve long-duration light emitting and high grayscale display.

As shown in FIG. 167, when the pixel circuit shown in FIG. 165 of the present disclosure is in operation, the display cycle includes a first display phase S1 and a second display phase S2 which are set in sequence; the first display cycle includes a first reset time period S11, a first compensation time period S12, a first writing-in time period S13, a second reset time period S14 and a first light emitting time period S15 which are set in sequence; the second display cycle includes a third reset time period S21, a second writing-in time period S23 and a second light emitting time period S25 which are set in sequence;

In the first reset time period S11, RST2 provides a low voltage signal, G1 and RST2 provide a low voltage signal, T5, T11 and T6 are turned on, N1, N2 and N3 are reset, the potential of N1 and the potential of N3 are Vi2, and the potential of N2 is Vref1;

In the first compensation time period S12, G1 and EM2 provide low voltage signals, and T5, T11 and T10 are turned on;

At the beginning of the first compensation time period S12, since Vi2 is less than Vdd, Vdd is the voltage value of the high voltage signal provided by VDD, T0 is turned on, and the capacitor is charged by the high voltage signal provided by VDD to increase the potential of N1 until the potential of N1 becomes Vdd+Vth, where Vth is the threshold voltage of T0, and the potential of N2 is Vref1;

In the first writing-in time period S13, GA provides a low voltage signal, T1 is turned on, DI writes the display data voltage Vdata_I to N2, and the potential of N1 jumps along with the potential of N2 due to capacitive coupling, and the potential of N1 becomes Vdd+Vth+Vdata_I−Vref1, and the potential of N2 is Vdata_I;

In the second reset time period S14, RST1 provides a low voltage signal, T3 and T9 are turned on, the anode potential of E0 is reset, the potential of the source electrode of T0 is reset, the source voltage of T0 is V3, and the bias voltage is written to the source electrode of T0. Before the first light emitting time period S15, T0 is turned on and biased to reduce image flicker and afterimage caused by the hysteresis characteristics of T0; in a preferred case, Vi3 is greater than Vdd, and Vdd is the voltage value of the high voltage signal provided by VDD;

In the second reset time period S14, RST1 provides a low voltage signal, T14 is turned on, the fourth initial voltage Vi4 provided by I4 is a low voltage signal, N4 is connected to V4, and T12 is turned on;

In the first light emitting time period S15, EM1 and EM2 provide low voltage signals, T12, T10, T0 and T4 are turned on, and T0 drives E0 to emit light;

In the third reset time period S21, RST1 provides a low voltage signal, T3 is turned on, to reset the anode potential of E0, and to clear the residual charge of the anode of E0 before the second light emitting time period S25;

In the third reset time period S21, RST1 provides a low voltage signal, T9 is turned on, Vi3 is written into the source electrode of T0, T14 is turned on, Vi4 is written into N4;

In the second writing-in time period S23, GB provides a low voltage signal, T13 is turned on, and DT writes the light emitting time control data voltage Vdata_T to N4;

In the second light emitting time period S25, EM1 and EM2 provide low voltage signals, and T4 and T10 are turned on;

When Vdata_T is a high voltage signal, T12 is turned off, and the light emitting duration is the first time t1, where t1 is the duration of the first light emitting time period S15;

When Vdata_T is a low voltage signal, in the preferred case, Vdata_T is equal to V14; T12 is turned on, the light emitting duration is t1+t2, t2 is the second time, and t2 is the duration of the second light emitting time period S25, so as to achieve long-duration light emitting and high grayscale display.

In the pixel circuit shown in FIG. 165 of the present disclosure, all transistors may be PMOS TFTs, or some transistors may be PMOS TFTs and other transistors may be NMOS TFTs.

As shown in FIG. 168, based on the pixel circuit shown in FIG. 148, the light emitting element is a light emitting diode E0;

The driving circuit includes a driving transistor T0, the first initialization circuit includes a third transistor T3, and the first light emitting control circuit includes a fourth transistor T4;

The data writing-in circuit comprises a first transistor T1;

The gate electrode of the first transistor T1 is electrically connected to the second control terminal GA, the source electrode of the first transistor T1 is electrically connected to the second data line DI, and the drain electrode of the first transistor T1 is electrically connected to the second node N2;

The gate electrode of the third transistor T3 is electrically connected to the first reset control terminal RST1, the source electrode of the third transistor T3 is electrically connected to the first initial voltage terminal I1, the drain electrode of the third transistor T3 is electrically connected to the anode of the light emitting diode E0; the cathode of the light emitting diode E0 is electrically connected to the low voltage terminal VSS;

The gate electrode of the fourth transistor T4 is electrically connected to the first light emitting control terminal EM1, the source electrode of the fourth transistor T4 is electrically connected to the drain electrode of the driving transistor T0, and the drain electrode of the fourth transistor T4 is electrically connected to the anode of the light emitting diode E0;

the driving transistor T0 is electrically connected to the first node N1;

The first reset circuit includes a fifth transistor T5, and the second reset circuit includes a sixth transistor T6;

The gate electrode of the fifth transistor T5 is electrically connected to the scanning terminal G1, the source electrode of the fifth transistor is electrically connected to the first reference voltage terminal, and the drain electrode of the fifth transistor T5 is electrically connected to the second node N2; the first reference voltage terminal is configured to provide a first reference voltage Vref1;

The gate electrode of the sixth transistor T6 is electrically connected to the second reset control terminal RST2, the source electrode of the sixth transistor T6 is electrically connected to the second initial voltage terminal I2, and the drain electrode of the sixth transistor T6 is electrically connected to the first node N1; the second initial voltage terminal I2 is configured to provide a second initial voltage Vi2;

The sixth reset circuit comprises a ninth transistor T9;

The gate electrode of the ninth transistor T9 is electrically connected to the first reset control terminal RST1, the source electrode of the ninth transistor T9 is electrically connected to the third initial voltage terminal I3, and the drain electrode of the ninth transistor T9 is electrically connected to the source electrode of the driving transistor T0; the third initial voltage terminal I3 is configured to provide a third initial voltage V3;

The second light emitting control circuit includes a tenth transistor T10; the switch control circuit includes a twelfth transistor T12;

The gate electrode of the tenth transistor T10 is electrically connected to the second light emitting control terminal EM2, the source electrode of the tenth transistor T10 is electrically connected to the drain electrode of the twelfth transistor T12, and the drain electrode of the tenth transistor T10 is electrically connected to the source electrode of the driving transistor T0;

The compensation control circuit comprises an eleventh transistor T11;

The gate electrode of the eleventh transistor T11 is electrically connected to the scanning terminal G1, the source electrode of the eleventh transistor T11 is electrically connected to the first node N1, the drain electrode of the eleventh transistor T11 is electrically connected to the third node N3; the drain electrode of T0 is electrically connected to the third node N3;

The first energy storage circuit includes a first capacitor C1, and the second energy storage circuit includes a second capacitor C2;

A first terminal of C1 is electrically connected to a first node N1, and a second terminal of C1 is electrically connected to a second node N2;

A first terminal of C2 is electrically connected to a second node N2, and a second terminal of C2 is electrically connected to a second reference voltage terminal, wherein the second reference voltage terminal is configured to provide a second reference voltage Vref2;

The driving control circuit includes a thirteenth transistor T13;

The gate electrode of the twelfth transistor T12 is electrically connected to the switch control terminal N4;

The source electrode of the twelfth transistor T12 is electrically connected to the high voltage terminal VDD;

The gate electrode of the thirteenth transistor T13 is electrically connected to the first control terminal GB, the source electrode of the thirteenth transistor T13 is electrically connected to the first data line DT, and the drain electrode of the thirteenth transistor T13 is electrically connected to the switch control terminal N4;

The driving control circuit also includes a fourteenth transistor T14 and a third capacitor C3;

The gate electrode of the fourteenth transistor T14 is electrically connected to the first reset control terminal RST1, the source electrode of the fourteenth transistor T14 is electrically connected to the fourth initial voltage terminal I4, and the drain electrode of the fourteenth transistor T14 is electrically connected to the switch control terminal N4; the fourth initial voltage terminal I4 is configured to provide a fourth initial voltage Vi4;

the third capacitor C3 is electrically connected to the switch control terminal N4, and a second terminal of the third capacitor C3 is electrically connected to a third reference voltage terminal; the third reference voltage terminal is configured to provide a third reference voltage.

FIG. 169 is a first timing diagram of the pixel circuit shown in FIG. 168, and FIG. 170 is a second timing diagram of the pixel circuit shown in FIG. 168.

The difference between the pixel circuit shown in FIG. 171 of the present disclosure and the pixel circuit shown in FIG. 151 of the present disclosure is that:

T10 and T9 are not included, and a seventh transistor T7 is included;

The gate electrode of the seventh transistor T7 is electrically connected to the second reset control terminal RST2, the source electrode of the seventh transistor T7 is electrically connected to the first reference voltage terminal, and the drain electrode of the seventh transistor T7 is electrically connected to the second node N2;

The first reference voltage terminal is configured to provide a first reference voltage Vref1.

In the pixel circuit shown in FIG. 171, all transistors are PMOS TFTs, but the present invention is not limited thereto.

As shown in FIG. 172, when the pixel circuit shown in FIG. 171 of the present disclosure is in operation, a display cycle includes a first display phase and a second display phase which are arranged in sequence;

The first display phase includes a first light emitting preparation time period and a first light emitting time period S15 which are set successively, and the first light emitting preparation time period includes a first reset time period S11, a first compensation time period S12 and a first writing-in time period S13 which are set successively;

The second display phase includes a second light emitting preparation time period and a second light emitting time period S25 which are set successively, and the second light emitting preparation time period includes a second reset time period S21, a second compensation time period S22 and a second writing-in time period S23 which are set successively;

In the first reset time period S11, RST1 and RST2 both provide low voltage signals, as shown in FIG. 173A, T7, T0, T6 and T3 are turned on, the anode of E0, N1, N2 and N3 are reset, the potential of N1 is Vi2, the potential of N2 is Vref1, the potential of N3 is Vdd, and the potential of N4 is Vi1; Vdd is the voltage value of the high voltage signal provided by VDD; the anode of E0 is reset to clear the residual charge of the anode of E0;

In the first compensation time period S12, G1 provides a low voltage signal, as shown in FIG. 173B, T5 and T11 are turned on, Vi2 is less than Vdd, T0 is turned on, and the capacitor is charged by Vdd until the potential of N1 becomes Vdd+Vth, T0 is turned off, and Vth is the threshold voltage of T0; the potential of N2 is Vref1;

In the first writing-in time period S13, GA provides a low voltage signal, as shown in FIG. 173C, T1 is turned on, and the display data voltage Vdata_I provided by DI is written into N2, Vdata_I is less than Vref1, the potential of N1 becomes Vdd+Vth+Vdata_I−Vref1, and the potential of N2 is Vdata_I;

In the first light emitting time period S15, EM1 provides a low voltage signal, as shown in FIG. 173D, T4 is turned on, T0 is turned on, and T0 drives E0 to emit light. At this time, the potential of N1 is Vdd+Vth+Vdata_I−Vref1, the potential of N2 is Vdata_I, the gate-source voltage Vgs of T0 is Vth+Vdata_I−Vref1, and Id is equal to $K\times(Vdata\_I-Vref1)^2$; wherein Id is the driving current generated by T0, and K is the current coefficient of T0;

In the second reset time period S21, both RST1 and RST2 provide low voltage signals, as shown in FIG. 173E, T7, T0, T6 and T3 are turned on, the anode of E0, N1, N2 and N3 are reset, the potential of N1 is Vi2, the potential of N2 is Vref1, the potential of N3 is Vdd, and the potential of N4 is Vi1; Vdd is the voltage value of the high voltage signal provided by VDD; the anode of E0 is reset to clear the residual charge of the anode of E0;

In the second compensation time period S22, G1 provides a low voltage signal, as shown in FIG. 173F, T5 and T11 are turned on, Vi2 is less than Vdd, T0 is turned on, and the capacitor is charged by Vdd until the potential of N1 becomes Vdd+Vth, T0 is turned off, and Vth is the threshold voltage of T0; the potential of N2 is Vref1;

In the second writing-in time period S23, GB provides a low voltage signal as shown in FIG. 173G, T2 is turned on, and DT provides a light emitting time control data voltage Vdata_T to N2;

In the second light emitting time period S25, EM1 provides a low voltage signal, as shown in FIG. 173H, and T4 is turned on;

When Vdata_T is a high voltage signal and Vdata_T is greater than Vref1, in the second light emitting time period S25, T0 is turned off, E0 does not emit light, and the light emitting duration is the first time t1, where t1 is the duration of the first light emitting time period S15;

When Vdata_T is equal to Vdata_I, in the second light emitting time period S25, T0 is turned on, and the driving current of T0 is equal to the driving current of T0 in the first light emitting time period S15. E0 continues to emit light to achieve long-term light emitting. The light emitting time is t1+t2, t2 is the second time, and the second time t2 is the duration of the second light emitting time period S25.

FIG. 174A is a schematic diagram of simulation results of the pixel circuit shown in FIG. 171 when performing high grayscale display, and FIG. 174B is a schematic diagram of simulation results of the pixel circuit shown in FIG. 171 when performing low grayscale display.

The difference between the pixel circuit shown in FIG. 175 and the pixel circuit shown in FIG. 171 is that: all transistors are NMOS TFTs; E0 and T4 are arranged above T0, and the drain electrode of T3 is electrically connected to the cathode of E0;

The anode of E0 is electrically connected to the high voltage terminal VDD;

The drain electrode of T4 is electrically connected to the cathode of E0, and the source electrode of T4 is electrically connected to the drain electrode of T0;

The source electrode of T0 is electrically connected to the low voltage terminal VSS.

In the pixel circuit shown in FIG. 175, the third node N3 is electrically connected to the drain electrode of T0.

The pixel circuit shown in FIG. 175 of the present disclosure adopts NMOS TFT technology to realize a current control+duration control pixel driving circuit, which can be applied to oxide display products.

When the pixel circuit shown in FIG. 175 of the present disclosure is in operation, since T0 becomes an NMOS TFT, in the second writing-in time period, the light emitting time control data voltage Vdata_T provided by DT is a low voltage signal or Vdata_I, and when Vdata_T is a low voltage signal, Vdata_T is less than Vref1, and when in the second writing-in time period, Vdata_T is a low voltage signal and Vdata_T is less than Vref1, T0 is turned off and short-time light emitting is performed.

FIG. 176 is a timing diagram of the pixel circuit shown in FIG. 175 of the present disclosure.

The pixel circuit shown in FIG. 177 and the pixel circuit shown in FIG. 175 are as follows:

T1, T2, T7, T5, T6, T11 and T3 are all NMOS TFTs.

The pixel circuit shown in FIG. 177 of the present disclosure adopts LTPO (low-temperature polycrystalline oxide) technology, and utilizes the advantage of low leakage current of oxide TFT to reduce anode leakage of N1, N2 and E0; and utilizes the advantage of high mobility of PMOS TFT to facilitate threshold voltage compensation and compensation time reduction, current driving requirements and reduce the area of the first capacitor, thereby further improving display performance.

FIG. 178 is a timing diagram of the pixel circuit shown in FIG. 177 of the present disclosure.

The difference between the pixel circuit shown in FIG. 179 and the pixel circuit shown in FIG. 165 is that:

T10 and T9 are not included;

It also includes a seventh transistor T7; the gate electrode of the seventh transistor T7 is electrically connected to the second reset control terminal RST2, the source electrode of the seventh transistor M7 is electrically connected to the first reference voltage terminal, and the drain electrode of the seventh transistor M7 is electrically connected to the second node N2;

The first reference voltage terminal is configured to provide a first reference voltage Vref1.

FIG. 180 is a first timing diagram of the pixel circuit shown in FIG. 179 of the present disclosure, and FIG. 181 is a second timing diagram of the pixel circuit shown in FIG. 179 of the present disclosure.

In the pixel circuit shown in FIG. 179 of the present disclosure, a PWM (pulse width modulation) control module (the PWM control module includes T12, T13, T14 and C3) for controlling the light emitting time and delaying the writing-in of data voltage is arranged on the current path to control the conduction and cutoff of the current in the current path.

As shown in FIG. 180, when the pixel circuit shown in FIG. 179 of the present disclosure is in operation, the display cycle includes a first display phase S1 and a second display phase S2, the first display phase S1 includes a first reset time period S11, a first compensation time period S12, a first writing-in time period S13 and a first light emitting time period S15 which are successively set, and the second display phase S2 includes a second writing-in time period S23 and a second light emitting time period S25 which are successively set;

In the first reset time period S11, RST1 and RST2 both provide low voltage signals, T14 is turned on, V4 is a low voltage signal, N4 is connected to V4, and T12 is turned on;

In the first light emitting time period S15, T12 is turned on and E0 emits light;

In the second writing-in time period S23, GB provides a low voltage signal, DT provides a light emitting time control data voltage Vdata_T to N4;

In the second light emitting time period S25, EM1 provides a low voltage signal and T4 is turned on;

When Vdata_T is a high voltage signal, T12 is turned off, and the light emitting duration is the first time t1, where t1 is the duration of the first light emitting time period S15;

When Vdata_T is a low voltage signal, in the preferred case, Vdata_T is equal to V14; T12 is turned on, the light emitting duration is t1+t2, t2 is the second time, and t2 is the duration of the second light emitting time period S25, so as to achieve long-duration light emitting and high grayscale display.

As shown in FIG. 181, when the pixel circuit shown in FIG. 179 of the present disclosure is in operation, the display cycle includes a first display phase S1 and a second display phase S2, the first display phase S1 includes a first reset time period S11, a first compensation time period S12, a first writing-in time period S13 and a first light emitting time period S15 which are successively set, and the second display phase S2 includes a third reset time period S21, a second writing-in time period S23 and a second light emitting time period S25 which are successively set;

In the third reset time period S21, RST1 provides a low voltage signal, T3 is turned on, to reset the anode potential of E0, and to clear the residual charge of the anode of E0 before the second light emitting time period S25;

In the third reset time period S21, RST1 provides a low voltage signal, T14 is turned on, Vi4 is written into N4, so that T12 is turned on, and the LED continues to emit light.

In the second light emitting time period S25, EM1 provides a low voltage signal and T4 is turned on;

When Vdata_T is a high voltage signal, T12 is turned off, and the light emitting duration is the first time t1, where t1 is the duration of the first light emitting time period S15;

When Vdata_T is a low voltage signal, in the preferred case, Vdata_T is equal to Vi4; T12 is turned on, the light emitting duration is t1+t2, t2 is the second time, and t2 is the duration of the second light emitting time period S25, so as to achieve long-duration light emitting and high grayscale display.

The difference between the pixel circuit shown in FIG. 182 of the present disclosure and the pixel circuit shown in FIG. 179 of the present disclosure is that:

T12, T13, T14 and C3 are all set above T0;

The source electrode of T12 is electrically connected to the high voltage terminal VDD, and the drain electrode of T12 is electrically connected to the source electrode of T0;

The drain electrode of T4 is electrically connected to the anode of E0.

In at least one embodiment of the present disclosure, N3 is the third node.

In the pixel circuit shown in FIG. 182 of the present disclosure, all transistors are PMOS TFTs, but not limited thereto.

FIG. 183 is a first timing diagram of the pixel circuit shown in FIG. 182 of the present disclosure, and FIG. 184 is a second timing diagram of the pixel circuit shown in FIG. 182 of the present disclosure.

As shown in FIG. 185, based on the pixel circuit shown in FIG. 145,

The first reset circuit includes a fifth transistor T5, the fourth reset circuit includes a seventh transistor T7, and the fifth reset circuit includes an eighth transistor T8;

The gate electrode of the fifth transistor T5 is electrically connected to the scanning terminal G1, the source electrode of the fifth transistor T5 is electrically connected to the second reference voltage terminal, and the drain electrode of the fifth transistor T5 is electrically connected to the fourth node NJ4; the second reference voltage terminal is configured to provide a second reference voltage Vref2;

The gate electrode of the seventh transistor T7 is electrically connected to the second reset control terminal RST2, the source electrode of the seventh transistor T7 is electrically connected to the second reference voltage terminal, and the drain electrode of the seventh transistor T7 is electrically connected to the fourth node NJ4;

The gate electrode of the eighth transistor T8 is electrically connected to the first light emitting control terminal EM1, the first electrode of the eighth transistor is electrically connected to the first reference voltage terminal, and the second electrode of the eighth transistor is electrically connected to the second node N2; the first reference voltage terminal is configured to provide a first reference voltage Vref1;

The driving circuit includes a driving transistor T0, the first initialization circuit includes a third transistor T3, and the first light emitting control circuit includes a fourth transistor T4;

The data writing-in circuit includes a first transistor T1 and a second transistor T2;

The gate electrode of the first transistor T1 is electrically connected to the second control terminal GA, the source electrode of the first transistor T1 is electrically connected to the second data line DI, and the drain electrode of the first transistor T1 is electrically connected to the second node N2;

The gate electrode of the second transistor T2 is electrically connected to the first control terminal GB, the source electrode of the second transistor T2 is electrically connected to the first data line DT, and the drain electrode of the second transistor T2 is electrically connected to the second node N2;

The gate electrode of the third transistor T3 is electrically connected to the first reset control terminal RST1, the source electrode of the third transistor T3 is electrically connected to the first initial voltage terminal I1, the drain electrode of the third transistor T3 is electrically connected to the anode of the light emitting diode E0; the cathode of the light emitting diode E0 is electrically connected to the low voltage terminal VSS;

The gate electrode of the fourth transistor T4 is electrically connected to the first light emitting control terminal EM1, the source electrode of the fourth transistor T4 is electrically connected to the drain electrode of the driving transistor T0, and the drain electrode of the fourth transistor T4 is electrically connected to the anode of the light emitting diode E0;

The gate electrode of the driving transistor T0 is electrically connected to the first node N1;

The second reset circuit includes a sixth transistor T6;

The gate electrode of the sixth transistor T6 is electrically connected to the second reset control terminal RST2, the source electrode of the sixth transistor T6 is electrically connected to the second initial voltage terminal I2, and the drain electrode of the sixth transistor T6 is electrically connected to the first node N1; the second initial voltage terminal I2 is configured to provide a second initial voltage Vi2;

The source electrode of T0 is electrically connected to the high voltage terminal VDD, and the drain electrode of T0 is electrically connected to the third node N3;

The compensation control circuit comprises an eleventh transistor T11;

A gate electrode of the eleventh transistor T11 is electrically connected to the scanning terminal G1, a source electrode of the eleventh transistor T11 is electrically connected to the first node N1, and a drain electrode of the eleventh transistor T11 is electrically connected to the third node N3.

In the pixel circuit shown in FIG. 185, all transistors are PMOS TFTs, but the present invention is not limited thereto.

As shown in FIG. 186, when the pixel circuit shown in FIG. 185 is in operation, a display cycle includes a first display phase S1 and a second display phase S2 which are arranged successively;

The first display phase S1 includes a first reset time period S11, a first compensation time period S12 and a first light emitting time period S15 which are arranged successively;

The second display phase S2 includes a third reset time period S21, a second compensation time period S22 and a second light emitting time period S25 which are successively arranged;

In the first reset time period S11, RST1, RST2 and GA all provide low voltage signals, as shown in FIG. 187A, T7, T0, T1, T6 and T3 are turned on, the anodes of N1, N3, NJ4 and E0 are reset, the residual charge of the anode of E0 is cleared, DI writes the display data voltage Vdata_I to N2, the potential of N1 is Vi2, the potential of N2 is Vdata_I, the potential of N3 is Vdd, and the potential of NJ4 is Vref2; Vdd is the voltage value of the high voltage signal provided by VDD;

In the first compensation time period S12, G1 provides a low voltage signal, as shown in FIG. 187B, T5 and T11 are both turned on, Vi2 is less than Vdd, and T0 is turned on; VDD charges the capacitor to change the potential of N1, the potential of N1 becomes Vdd+Vth, and T0 is turned off; Vth is the threshold voltage of T0; the potential of N2 is Vdata_I, and the potential of NJ4 is Vref2;

In the first light emitting time period S15, EM1 provides a low voltage signal, Vref1 is less than Vdata_I, as shown in FIG. 187C, T8, T4 and T0 are turned on, and T0 drives E0 to emit light; the potential of N1 is Vdd+Vth+Vref1−Vdata_I, the potential of N2 is Vref1, the gate-source voltage Vgs of T0 is equal to Vth3+Vref1−Vdata_I, and Id is equal to $K\times(Vref1-Vdata\_I)^2$; Id is the driving current generated by T0, and K is the current coefficient of T0;

In the third reset time period S21, RST1, RST2 and GB all provide low voltage signals, as shown in FIG. 187D, T7, T0, T2, T6 and T3 are turned on, the anodes of N1, N3, NJ4 and E0 are reset, the residual charge of the anode of E0 is cleared, DI writes the light emitting time control data voltage Vdata_T to N2, the potential of N1 is Vi2, the potential of N2 is Vdata_T, the potential of N3 is Vdd, and the potential of NJ4 is Vref2; Vdd is the voltage value of the high voltage signal provided by VDD;

In the second compensation time period S22, G1 provides a low voltage signal, as shown in FIG. 187E, T5 and T11 are turned on, Vi2 is less than Vdd, T0 is turned on, VDD charges the capacitor to change the potential of N1, the potential of N1 becomes Vdd+Vth, and T0 is turned off; Vth is the threshold voltage of T0; the potential of N2 is Vdata_T, and the potential of NJ4 is Vref2;

In the second light emitting time period S25, EM1 provides a low voltage signal, as shown in FIG. 187F, and T4 is turned on;

When Vdata_T is a low voltage signal and Vdata_T is less than Vref1 in the third reset time period S21, T0 is turned off and E0 does not emit light in the second light emitting time period S25, so that short-duration light emitting is realized, and the light emitting time period is the first time t1, and t1 is the duration of the first light emitting time period S15;

When Vdata_T is equal to Vdata_I in the third reset time period S21, T0 is turned on in the second light emitting time period S25, and the driving current generated by T0 is the same as the driving current generated by T0 in the first light emitting time period S15. E0 continues to emit light to achieve long-term light emitting. The light emitting time is t1+t2, t2 is the second time, and t2 is the duration of the second light emitting time period S25.

FIG. 188A is a schematic diagram of simulation results of the pixel circuit shown in FIG. 185 when performing high grayscale display, and FIG. 188B is a schematic diagram of simulation results of the pixel circuit shown in FIG. 185 when performing low grayscale display.

As shown in FIG. 189, based on the pixel circuit shown in FIG. 146,

The first reset circuit includes a fifth transistor T5, the fourth reset circuit includes a seventh transistor T7, and the fifth reset circuit includes an eighth transistor T8;

The gate electrode of the fifth transistor T5 is electrically connected to the scanning terminal G1, the source electrode of the fifth transistor T5 is electrically connected to the second reference voltage terminal, and the drain electrode of the fifth transistor T5 is electrically connected to the fourth node NJ4; the second reference voltage terminal is configured to provide a second reference voltage Vref2;

The gate electrode of the seventh transistor T7 is electrically connected to the second reset control terminal RST2, the source electrode of the seventh transistor T7 is electrically connected to the second reference voltage terminal, and the drain electrode of the seventh transistor T7 is electrically connected to the fourth node NJ4;

The gate electrode of the eighth transistor T8 is electrically connected to the first light emitting control terminal EM1, the first electrode of the eighth transistor is electrically connected to the first reference voltage terminal, and the second electrode of the eighth transistor is electrically connected to the second node;

The driving circuit includes a driving transistor T0, the first initialization circuit includes a third transistor T3, and the first light emitting control circuit includes a fourth transistor T4;

The data writing-in circuit includes a first transistor T1 and a second transistor T2;

The gate electrode of the first transistor T1 is electrically connected to the second control terminal GA, the source electrode of the first transistor T1 is electrically connected to the second data line DI, and the drain electrode of the first transistor T1 is electrically connected to the second node N2;

The gate electrode of the second transistor T2 is electrically connected to the first control terminal GB, the source electrode of the second transistor T2 is electrically connected to the first data line DT, and the drain electrode of the second transistor T2 is electrically connected to the second node N2;

The gate electrode of the third transistor T3 is electrically connected to the first reset control terminal RST1, the source electrode of the third transistor T3 is electrically connected to the first initial voltage terminal I1, the drain electrode of the third transistor T3 is electrically connected to the cathode of the light emitting diode E0; the anode of the light emitting diode E0 is electrically connected to the high voltage terminal VDD;

The gate electrode of the fourth transistor T4 is electrically connected to the first light emitting control terminal EM1, the drain electrode of the fourth transistor T4 is electrically connected to the cathode of the light emitting diode E0, and the source electrode of the fourth transistor T4 is electrically connected to the drain electrode of the driving transistor T0;

The gate electrode of the driving transistor T0 is electrically connected to the first node N1; the source electrode of the driving transistor T0 is electrically connected to the low voltage terminal VSS; the drain electrode of T0 is electrically connected to the third node N3;

The second reset circuit includes a sixth transistor T6;

The gate electrode of the sixth transistor T6 is electrically connected to the second reset control terminal RST2, the source electrode of the sixth transistor T6 is electrically connected to the second initial voltage terminal I2, and the drain electrode of the sixth transistor T6 is electrically connected to the first node N1; the second initial voltage terminal I2 is configured to provide a second initial voltage Vi2;

The compensation control circuit comprises an eleventh transistor T11;

A gate electrode of the eleventh transistor T11 is electrically connected to the scanning terminal G1, a source electrode of the eleventh transistor T11 is electrically connected to the first node N1, and a drain electrode of the eleventh transistor T11 is electrically connected to the third node N3.

In the pixel circuit shown in FIG. 189, all transistors are NMOS TFTs, but not limited thereto.

The pixel circuit shown in FIG. 189 of the present disclosure adopts NMOS TFT technology to realize a current control+duration control pixel driving circuit, which can be applied to oxide display products.

When the pixel circuit shown in FIG. 189 of the present disclosure is in operation, since T0 is an NMOS TFT, when Vdata_T written by DT is a high voltage signal in the third reset time period S21 and Vdata_T is greater than Vref1, T0 is turned off in the second light emitting time period S25 to achieve short-duration light emitting.

FIG. 190 is a timing diagram of the pixel circuit shown in FIG. 189 of the present disclosure.

The difference between the pixel circuit shown in FIG. 191 of the present disclosure and the pixel circuit shown in FIG. 185 of the present disclosure is that:

T8, T1, T2, T7, T5, T11, T6 and T3 are all NMOS TFTs.

The pixel circuit shown in FIG. 191 of the present disclosure adopts LTPO technology, utilizing the advantage of low leakage current of oxide TFT to reduce anode leakage of N1, N2, NJ4 and E0; utilizing the advantage of high mobility of PMOS TFT, it is beneficial to reduce threshold voltage compensation and compensation time, current driving requirements and reduce the plate electrode area of the first capacitor, thereby further improving display performance.

FIG. 192 is a timing diagram of the pixel circuit shown in FIG. 191 of the present disclosure.

In the pixel circuit shown in FIG. 185, FIG. 189 and FIG. 191, a PWM control module may also be placed on the current path to control the conduction and cutoff of the current in the current path.

When the pixel circuit shown in FIGS. 185, 189 and 191 of the present disclosure is in operation, the data voltage writing-in and threshold voltage compensation time periods are separated, which helps to achieve high-frequency driving above 120 Hz, separates the gate reset of T0 and the anode reset of E0, and in variable frequency display (low frequency+high frequency), in the low frequency display phase, the anode of E0 can still be reset at high frequency to reduce flicker defects.

It should be noted that Vdata_I and Vdata_T may share a data line, and the data line is configured to write the display data voltage and the light emitting time control data voltage in a time-division mode.

The pixel circuit described in at least one embodiment of the present disclosure is not only applicable to MLED (micro light emitting diode) display, but also applicable to OLED display pixel driving. Compared with OLED display, the driving current of MLED display products is at the uA level, which is larger than the driving current of OLED display products. Therefore, the width-to-length ratio of T0 is larger, which can provide a larger driving current.

The driving method described in the embodiment of the present disclosure is applied to the above-mentioned pixel circuit, wherein the display cycle includes a first display phase and a second display phase which are arranged successively; the first display phase includes a first light emitting time period, and the second display phase includes a light emitting preparation time period and a second light emitting time period which are arranged successively;

In the first light emitting time period, the driving circuit generates a driving current for driving the light emitting element to emit light according to the display data voltage under the control of the potential of the first node;

In a partial time period set in the light emitting preparation time period, the first initialization circuit writes a first initial voltage into the first electrode of the light emitting element or the second electrode of the light emitting element under the control of a first reset control signal;

In the second light emitting time period, the driving circuit controls the data voltage according to the light emitting time to control whether to generate the driving current.

The pixel circuit described in the embodiment of the present disclosure includes a light emitting element, a driving circuit, a data writing-in circuit, a first energy storage circuit, a compensation circuit and a switch circuit; the control terminal of the driving circuit is electrically connected to the first node;

The first terminal of the driving circuit is electrically connected to the first voltage terminal, the second terminal of the driving circuit is electrically connected to the first electrode of the light emitting element, and the second electrode of the light emitting element is electrically connected to the second voltage terminal; the second terminal of the driving circuit is electrically connected to the second node; or the first electrode of the light emitting element is electrically connected to the first voltage terminal, the first terminal of the driving circuit is electrically connected to the second electrode of the light emitting element, and the second terminal of the driving circuit is electrically connected to the second voltage terminal; the first terminal of the driving circuit is electrically connected to the second node;

The data writing-in circuit is electrically connected to the writing-in control terminal, the data line and the first node respectively, and is configured to write the data voltage provided by the data line into the first node under the control of the writing-in control signal provided by the writing-in control terminal;

A first terminal of the first energy storage circuit is electrically connected to the first node, a second terminal of the first energy storage circuit is electrically connected to the second node, and the first energy storage circuit is configured to store electrical energy;

The compensation circuit is electrically connected to the scanning terminal, the second node and the control node respectively, and is configured to control the connection between the second node and the control node under the control of the scanning signal provided by the scanning terminal;

The switch circuit is respectively connected to the selection control terminal, the control node, the reference voltage terminal and the compensation terminal, and is configured to write the reference voltage provided by the reference voltage terminal into the control node under the control of the selection control signal provided by the selection control terminal, or to control the connection between the control node and the compensation terminal.

In at least one embodiment of the present disclosure, the selection control terminal may include a first selection control terminal and a second selection control terminal, and the switching circuit is configured to provide the reference voltage to the control node under the control of a first selection control signal provided by the first selection control terminal, and to control the connection between the control node and the compensation terminal under the control of a second selection control signal provided by the second selection control terminal.

When the pixel circuit described in the embodiment of the present disclosure is in operation, the display cycle includes a display phase;

The display phase includes a first writing-in time period, a first light emitting time period, a second writing-in time period, and a second light emitting time period which are arranged in sequence, and the driving method includes:

In a first writing-in time period, the data writing-in circuit writes a first display data voltage into the first node under the control of a writing-in control signal;

In a first light emitting time period, the driving circuit drives the light emitting element to emit light according to the first display data voltage;

In the second writing-in time period, the data writing-in circuit writes the light emitting time control data voltage into the first node under the control of the writing-in control signal;

In the second light emitting time period, the driving circuit controls the data voltage according to the light emitting time to control whether the light emitting element emits light.

The pixel circuit described in the embodiment of the present disclosure writes the display data voltage and the light emitting time control data voltage in a time-division mode through the data writing-in circuit, thereby realizing a driving current+light emitting time control mode and improving the display effect.

In a specific implementation, the light emitting element is an inorganic light emitting diode, and the width-to-length ratio of the transistor included in the driving circuit is greater than 0.5.

Optionally, the light emitting element may be an inorganic light emitting diode, for example, the light emitting element may be a micro light emitting diode or a mini light emitting diode.

In a specific implementation, the light emitting element may also be an organic light emitting diode.

In at least one embodiment of the present disclosure, the width-to-length ratio of a transistor is a ratio of a channel width W to a channel length L of the transistor.

Optionally, the first voltage terminal may be a high voltage terminal, and the second voltage terminal may be a low voltage terminal, but is not limited thereto.

In at least one embodiment of the present disclosure, the display cycle of the pixel circuit includes a display phase; the display phase includes a first writing-in time period and a second writing-in time period which are set successively;

The data writing-in circuit is configured to write a first display data voltage into the first node under the control of a writing-in control signal in a first writing-in time period, and write a light emitting time control data voltage into the first node under the control of a writing-in control signal in a second writing-in time period;

The compensation circuit is configured to control the connection between the first node and the control node under the control of the scanning signal in the first writing-in time period and the second writing-in time period;

The switch circuit is configured to provide a reference voltage to the control node under the control of a selection control signal in a first writing-in time period and a second writing-in time period.

In at least one embodiment of the present disclosure, the data line includes a first data line and a second data line, and the writing-in control terminal includes a first control terminal and a second control terminal;

The data writing-in circuit is configured to write the light emitting time control data voltage provided by the first data line into the first node under the control of the first control signal provided by the first control terminal, and to write the display data voltage provided by the second data line into the first node under the control of the second control signal provided by the second control terminal.

In a specific implementation, the data writing-in circuit can write the light emitting time control data voltage provided by the first data line into the first node under the control of the first control signal, and write the display data voltage provided by the second data line into the first node under the control of the second control signal.

In at least one embodiment of the present disclosure, the writing-in control terminal includes a first control terminal and a second control terminal;

The data writing-in circuit is configured to write the light emitting time control data voltage provided by the data line into the first node under the control of the first control signal provided by the first control terminal, and to write the display data voltage provided by the data line into the first node under the control of the second control signal provided by the second control terminal.

In a specific implementation, the data writing-in circuit can write the light emitting time control data voltage provided by the data line into the first node under the control of the first control signal, and write the display data voltage provided by the data line into the first node under the control of the second control signal.

In at least one embodiment of the present disclosure, the data writing-in circuit is configured to write the light emitting time control data voltage provided by the data line and the display data voltage provided by the data line into the first node in a time-division mode under the control of the writing-in control signal provided by the writing-in control terminal.

In a specific implementation, the data writing-in circuit can write the light emitting time control data voltage provided by the data line and the display data voltage provided by the data line into the first node in a time-division mode under the control of a writing-in control signal.

As shown in FIG. 193, the pixel circuit according to the embodiment of the present disclosure includes a light emitting element E1, a driving circuit 11, a data writing-in circuit 15, a first energy storage circuit 101, a compensation circuit 21 and a switch circuit 22; the control terminal of the driving circuit 11 is electrically connected to the first node N1; the writing-in control terminal includes a first control terminal GB and a second control terminal GB;

The first terminal of the driving circuit 11 is electrically connected to the first voltage terminal V1, the second terminal of the driving circuit 11 is electrically connected to the first electrode of the light emitting element E1, the second electrode of the light emitting element E1 is electrically connected to the second voltage terminal V2; the second terminal of the driving circuit 11 is electrically connected to the second node N2;

The data writing-in circuit 15 is electrically connected to the first control terminal GB, the second control terminal GA, the first data line DT, the second data line DI and the first node N1 respectively, and is configured to write the light emitting time control data voltage provided by the first data line DT into the first node N1 under the control of the first control signal provided by the first control terminal GB, and write the display data voltage provided by the second data line DI into the first node N1 under the control of the second control signal provided by the second control terminal GA;

A first terminal of the first energy storage circuit 101 is electrically connected to the first node N1, a second terminal of the first energy storage circuit 101 is electrically connected to the second node N2, and the first energy storage circuit 101 is configured to store electrical energy;

The compensation circuit 21 is electrically connected to the scanning terminal G1, the second node N2 and the control node N0 respectively, and is configured to control the second node N2 to be connected to the control node N0 under the control of the scanning signal provided by the scanning terminal G1;

The switch circuit 22 is respectively connected to the first selection control terminal X1, the second selection control terminal X2, the control node N0, the reference voltage terminal and the compensation terminal SENS, and is configured to write the reference voltage Vref provided by the reference voltage terminal into the control node N0 under the control of the first selection control signal provided by the first selection control terminal X1, and control the connection between the control node N0 and the compensation terminal SENS under the control of the second selection control signal provided by the second selection control terminal X2.

As shown in FIG. 194, the pixel circuit according to the embodiment of the present disclosure includes a light emitting element E1, a driving circuit 11, a data writing-in circuit 15, a first energy storage circuit 101, a compensation circuit 21 and a switch circuit 22; the control terminal of the driving circuit 11 is electrically connected to the first node N1; the writing-in control terminal includes a first control terminal GB and a second control terminal GB;

The first terminal of the driving circuit 11 is electrically connected to the first voltage terminal V1, the second terminal of the driving circuit 11 is electrically connected to the first electrode of the light emitting element E1, the second electrode of the light emitting element E1 is electrically connected to the second voltage terminal V2; the second terminal of the driving circuit 11 is electrically connected to the second node N2;

The data writing-in circuit 15 is electrically connected to the first control terminal GB, the second control terminal GA, the data line D0 and the first node N1 respectively, and is configured to write the light emitting time control data voltage provided by the data line D0 into the first node N1 under the control of the first control signal provided by the first control terminal GB, and write the display data voltage provided by the data line D0 into the first node N1 under the control of the second control signal provided by the second control terminal GA;

A first terminal of the first energy storage circuit 101 is electrically connected to the first node N1, a second terminal of the first energy storage circuit 101 is electrically connected to the second node N2, and the first energy storage circuit 101 is configured to store electrical energy;

The compensation circuit 21 is electrically connected to the scanning terminal G1, the second node N2 and the control node N0 respectively, and is configured to control the second node N2 to be connected to the control node N0 under the control of the scanning signal provided by the scanning terminal G1;

The switch circuit 22 is respectively connected to the first selection control terminal X1, the second selection control terminal X2, the control node N0, the reference voltage terminal and the compensation terminal SENS, and is configured to write the reference voltage Vref provided by the reference voltage terminal into the control node N0 under the control of the first selection control signal provided by the first selection control terminal X1, and control the connection between the control node N0 and the compensation terminal SENS under the control of the second selection control signal provided by the second selection control terminal X2.

As shown in FIG. 195, the pixel circuit according to the embodiment of the present disclosure includes a light emitting element E1, a driving circuit 11, a data writing-in circuit 15, a first energy storage circuit 101, a compensation circuit 21 and a switch circuit 22; the control terminal of the driving circuit 11 is electrically connected to the first node N1; the writing-in control terminal includes a first control terminal GB and a second control terminal GB;

The first terminal of the driving circuit 11 is electrically connected to the first voltage terminal V1, the second terminal of the driving circuit 11 is electrically connected to the first electrode of the light emitting element E1, the second electrode of the light emitting element E1 is electrically connected to the second voltage terminal V2; the second terminal of the driving circuit 11 is electrically connected to the second node N2;

The data writing-in circuit 15 is electrically connected to the second control terminal GA, the data line D0 and the first node N1 respectively, and is configured to write the light emitting time control data voltage and the display data voltage provided by the data line D0 into the first node N1 in a time-division mode under the control of the second control signal provided by the second control terminal GA;

A first terminal of the first energy storage circuit 101 is electrically connected to the first node N1, a second terminal of the first energy storage circuit 101 is electrically connected to the second node N2, and the first energy storage circuit 101 is configured to store electrical energy;

The compensation circuit 21 is electrically connected to the scanning terminal G1, the second node N2 and the control node N0 respectively, and is configured to control the second node N2 to be connected to the control node N0 under the control of the scanning signal provided by the scanning terminal G1;

The switch circuit 22 is respectively connected to the first selection control terminal X1, the second selection control terminal X2, the control node N0, the reference voltage terminal and the compensation terminal SENS, and is configured to write the reference voltage Vref provided by the reference voltage terminal into the control node N0 under the control of the first selection control signal provided by the first selection control terminal X1, and control the connection between the control node N0 and the compensation terminal SENS under the control of the second selection control signal provided by the second selection control terminal X2.

In at least one embodiment of the present disclosure, the pixel circuit further includes a second energy storage circuit;

A first terminal of the second energy storage circuit is electrically connected to the first node, a second terminal of the second energy storage circuit is electrically connected to a DC voltage terminal, and the second energy storage circuit is configured to store electrical energy.

Optionally, the DC voltage terminal may be a first voltage terminal or a second voltage terminal, but is not limited thereto.

As shown in FIG. 196, based on the pixel circuit shown in FIG. 193, the pixel circuit described in at least one embodiment of the present disclosure further includes a second energy storage circuit 102;

A first terminal of the second energy storage circuit 102 is electrically connected to the first node N1, a second terminal of the second energy storage circuit 102 is electrically connected to the first voltage terminal V1, and the second energy storage circuit 102 is configured to store electrical energy.

As shown in FIG. 197, the pixel circuit according to the embodiment of the present disclosure includes a light emitting element E1, a driving circuit 11, a data writing-in circuit 15, a first energy storage circuit 101, a compensation circuit 21 and a switch circuit 22; the control terminal of the driving circuit 11 is electrically connected to the first node N1; the writing-in control terminal includes a first control terminal GB and a second control terminal GB;

The first electrode of the light emitting element E1 is electrically connected to the first voltage terminal V1;

The first terminal of the driving circuit 11 is electrically connected to the second electrode of the light emitting element E1, and the second terminal of the driving circuit 11 is electrically connected to the second voltage terminal V2; the first terminal of the driving circuit 11 is electrically connected to the second node N2;

The data writing-in circuit 15 is electrically connected to the first control terminal GB, the second control terminal GA, the first data line DT, the second data line DI and the first node N1 respectively, and is configured to write the light emitting time control data voltage provided by the first data line DT into the first node N1 under the control of the first control signal provided by the first control terminal GB, and write the display data voltage provided by the second data line DI into the first node N1 under the control of the second control signal provided by the second control terminal GA;

A first terminal of the first energy storage circuit 101 is electrically connected to the first node N1, a second terminal of the first energy storage circuit 101 is electrically connected to the second node N2, and the first energy storage circuit 101 is configured to store electrical energy;

The compensation circuit 21 is electrically connected to the scanning terminal G1, the second node N2 and the control node N0 respectively, and is configured to control the second node N2 to be connected to the control node N0 under the control of the scanning signal provided by the scanning terminal G1;

The switch circuit 22 is respectively connected to the first selection control terminal X1, the second selection control terminal X2, the control node N0, the reference voltage terminal and the compensation terminal SENS, and is configured to write the reference voltage Vref provided by the reference voltage terminal into the control node N0 under the control of the first selection control signal provided by the first selection control terminal X1, and control the connection between the control node N0 and the compensation terminal SENS under the control of the second selection control signal provided by the second selection control terminal X2.

As shown in FIG. 198, the pixel circuit according to the embodiment of the present disclosure includes a light emitting element E1, a driving circuit 11, a data writing-in circuit 15, a first energy storage circuit 101, a compensation circuit 21 and a switch circuit 22; the control terminal of the driving circuit 11 is electrically connected to the first node N1; the writing-in control terminal includes a first control terminal GB and a second control terminal GB;

The first electrode of the light emitting element E1 is electrically connected to the first voltage terminal V1;

The first terminal of the driving circuit 11 is electrically connected to the second electrode of the light emitting element E1, and the second terminal of the driving circuit 11 is electrically connected to the second voltage terminal V2; the first terminal of the driving circuit 11 is electrically connected to the second node N2;

The data writing-in circuit 15 is electrically connected to the first control terminal GB, the second control terminal GA, the data line D0 and the first node N1 respectively, and is configured to write the light emitting time control data voltage provided by the data line D0 into the first node N1 under the control of the first control signal provided by the first control terminal GB, and write the display data voltage provided by the data line D0 into the first node N1 under the control of the second control signal provided by the second control terminal GA;

A first terminal of the first energy storage circuit 101 is electrically connected to the first node N1, a second terminal of the first energy storage circuit 101 is electrically connected to the second node N2, and the first energy storage circuit 101 is configured to store electrical energy;

The compensation circuit 21 is electrically connected to the scanning terminal G1, the second node N2 and the control node N0 respectively, and is configured to control the second node N2 to be connected to the control node N0 under the control of the scanning signal provided by the scanning terminal G1;

The switch circuit 22 is respectively connected to the first selection control terminal X1, the second selection control terminal X2, the control node N0, the reference voltage terminal and the compensation terminal SENS, and is configured to write the reference voltage Vref provided by the reference voltage terminal into the control node N0 under the control of the first selection control signal provided by the first selection control terminal X1, and control the connection between the control node N0 and the compensation terminal SENS under the control of the second selection control signal provided by the second selection control terminal X2.

As shown in FIG. 199, the pixel circuit according to the embodiment of the present disclosure includes a light emitting element E1, a driving circuit 11, a data writing-in circuit 15, a first energy storage circuit 101, a compensation circuit 21 and a switch circuit 22; the control terminal of the driving circuit 11 is electrically connected to the first node N1; the writing-in control terminal includes a first control terminal GB and a second control terminal GB;

The first electrode of the light emitting element E1 is electrically connected to the first voltage terminal V1;

The first terminal of the driving circuit 11 is electrically connected to the second electrode of the light emitting element E1, and the second terminal of the driving circuit 11 is electrically connected to the second voltage terminal V2; the first terminal of the driving circuit 11 is electrically connected to the second node N2;

The data writing-in circuit 15 is electrically connected to the second control terminal GA, the data line D0 and the first node N1 respectively, and is configured to write the light emitting time control data voltage and the display data voltage provided by the data line D0 into the first node N1 in a time-division mode under the control of the second control signal provided by the second control terminal GA;

A first terminal of the first energy storage circuit 101 is electrically connected to the first node N1, a second terminal of the first energy storage circuit 101 is electrically connected to the second node N2, and the first energy storage circuit 101 is configured to store electrical energy;

The compensation circuit 21 is electrically connected to the scanning terminal G1, the second node N2 and the control node N0 respectively, and is configured to control the second node N2 to be connected to the control node N0 under the control of the scanning signal provided by the scanning terminal G1;

The switch circuit 22 is respectively connected to the first selection control terminal X1, the second selection control terminal X2, the control node N0, the reference voltage terminal and the compensation terminal SENS, and is configured to write the reference voltage Vref provided by the reference voltage terminal into the control node N0 under the control of the first selection control signal provided by the first selection control terminal X1, and control the connection between the control node N0 and the compensation terminal SENS under the control of the second selection control signal provided by the second selection control terminal X2.

As shown in FIG. 200, based on the pixel circuit shown in FIG. 197, the pixel circuit described in at least one embodiment of the present disclosure further includes a second energy storage circuit 102;

A first terminal of the second energy storage circuit 102 is electrically connected to the first node N1, a second terminal of the second energy storage circuit 102 is electrically connected to the second voltage terminal V2, and the second energy storage circuit 102 is configured to store electrical energy.

Optionally, the data writing-in circuit includes a first transistor and a second transistor;

a gate electrode of the first transistor is electrically connected to the first control terminal, a first electrode of the first transistor is electrically connected to the first data line, and a second electrode of the first transistor is electrically connected to the first node;

A gate electrode of the second transistor is electrically connected to the second control terminal, a first electrode of the second transistor is electrically connected to the second data line, and a second electrode of the second transistor is electrically connected to the first node.

Optionally, the data writing-in circuit includes a first transistor and a second transistor;

a gate electrode of the first transistor is electrically connected to the first control terminal, a first electrode of the first transistor is electrically connected to the data line, and a second electrode of the first transistor is electrically connected to the first node;

a gate electrode of the second transistor is electrically connected to the second control terminal, a first electrode of the second transistor is electrically connected to the data line, and a second electrode of the second transistor is electrically connected to the first node;

The data line is used for providing a light emitting time control data voltage and a display data voltage in a time-division mode.

Optionally, the data writing-in circuit includes a first transistor;

a gate electrode of the first transistor is electrically connected to the writing-in control terminal, a first electrode of the first transistor is electrically connected to the data line, and a second electrode of the first transistor is electrically connected to the first node;

The data line is used for providing a light emitting time control data voltage and a display data voltage in a time-division mode.

The pixel circuit described in at least one embodiment of the present disclosure further includes a reset circuit;

The reset circuit is electrically connected to the reset control terminal, the initial voltage terminal and the first node respectively, and is configured to write the initial voltage provided by the initial voltage terminal into the first node under the control of the reset control signal provided by the reset control terminal.

As shown in FIG. 201, in the pixel circuit shown in FIG. 193, the pixel circuit described in at least one embodiment of the present disclosure further includes a reset circuit 90;

The reset circuit 90 is electrically connected to the reset control terminal RST, the initial voltage terminal I0 and the first node N1 respectively, and is configured to write the initial voltage Vi provided by the initial voltage terminal I0 into the first node N1 under the control of the reset control signal provided by the reset control terminal RST.

As shown in FIG. 202, in the pixel circuit shown in FIG. 197, the pixel circuit described in at least one embodiment of the present disclosure further includes a reset circuit 90;

The reset circuit 90 is electrically connected to the reset control terminal RST, the initial voltage terminal I0 and the first node N1 respectively, and is configured to write the initial voltage Vi provided by the initial voltage terminal I0 into the first node N1 under the control of the reset control signal provided by the reset control terminal RST.

Optionally, the first energy storage circuit includes a first capacitor;

A first terminal of the first capacitor is electrically connected to the first node, and a second terminal of the first capacitor is electrically connected to the second node.

In at least one embodiment of the present disclosure, the light emitting element is an inorganic light emitting diode;

The capacitance value of the first capacitor is greater than 3 times the gate-source capacitance of the transistor in the driving circuit.

In a specific implementation, the capacitance value of the first capacitor is set to be greater than 3 times the gate-source capacitance of the transistor in the driving circuit, so that when the source potential of the transistor in the driving circuit changes, the gate potential of the transistor in the driving circuit can be maintained to ensure display accuracy.

In at least one embodiment of the present disclosure, the gate-source capacitance of the transistor in the driving circuit may be a parasitic capacitance between the gate electrode and the source electrode of the transistor in the driving circuit, which may be calculated based on the facing area of the gate electrode and the source electrode of the transistor in the driving circuit, and a dielectric constant, wherein the dielectric constant may be calculated based on the material and thickness of the insulating layer between the gate electrode and the source electrode of the transistor in the driving circuit.

Optionally, the second energy storage circuit includes a second capacitor;

A first terminal of the second capacitor is electrically connected to the first node, and a second terminal of the second capacitor is electrically connected to the DC voltage terminal.

In at least one embodiment of the present disclosure, the switch circuit includes a first switch and a second switch;

The selection control terminal includes a first selection control terminal and a second selection control terminal;

a control terminal of the first switch is electrically connected to the first selection control terminal, a first terminal of the first switch is electrically connected to the control node, and a second terminal of the first switch is electrically connected to the reference voltage terminal;

a control terminal of the second switch is electrically connected to the second selection control terminal, a first terminal of the second switch is electrically connected to the control node, and a second terminal of the second switch is electrically connected to the compensation terminal.

Optionally, the compensation circuit includes a third transistor;

A gate electrode of the third transistor is electrically connected to the scanning terminal, a first electrode of the third transistor is electrically connected to the second node, and a second electrode of the third transistor is electrically connected to the control node.

Optionally, the reset circuit includes a fourth transistor;

A gate electrode of the fourth transistor is electrically connected to the reset control terminal, a first electrode of the fourth transistor is electrically connected to the initial voltage terminal, and a second electrode of the fourth transistor is electrically connected to the first node.

As shown in FIG. 203, in the pixel circuit shown in FIG. 193, the light emitting element is a light emitting diode E0;

The data writing-in circuit includes a first transistor T1 and a second transistor T2;

The gate electrode of the first transistor T1 is electrically connected to the first control terminal GB, the drain electrode of the first transistor T1 is electrically connected to the first data line DT, and the source electrode of the first transistor T1 is electrically connected to the first node N1;

The gate electrode of the second transistor T2 is electrically connected to the second control terminal GA, the drain electrode of the second transistor T2 is electrically connected to the second data line DI, and the source electrode of the second transistor T2 is electrically connected to the first node N1;

The driving circuit includes a driving transistor T0;

The gate electrode of T0 is electrically connected to the first node N1, the drain electrode of T0 is electrically connected to the high voltage terminal VDD, and the source electrode of T0 is electrically connected to the second node N2; the anode of E0 is electrically connected to the second node N2, and the cathode of E0 is electrically connected to the low voltage terminal VSS;

The first energy storage circuit includes a first capacitor C1;

A first terminal of the first capacitor C1 is electrically connected to the first node N1, and a second terminal of the first capacitor C1 is electrically connected to the second node N2;

The switch circuit includes a first switch K1 and a second switch K2;

The selection control terminal includes a first selection control terminal X1 and a second selection control terminal X2;

The control terminal of the first switch K1 is electrically connected to the first selection control terminal X1, the first terminal of the first switch K1 is electrically connected to the control node N0, and the second terminal of the first switch K1 is electrically connected to a reference voltage terminal; the reference voltage terminal is configured to provide a reference voltage Vref;

The control terminal of the second switch K2 is electrically connected to the second selection control terminal X2, the first terminal of the second switch K2 is electrically connected to the control node N0, and the second terminal of the second switch K2 is electrically connected to the compensation terminal SENS;

The compensation circuit includes a third transistor T3;

A gate electrode of the third transistor T3 is electrically connected to the scanning terminal G1, a drain electrode of the third transistor T3 is electrically connected to the second node N2, and a source electrode of the third transistor T3 is electrically connected to the control node N0.

In the pixel circuit shown in FIG. 203, all transistors are NMOS (N-type metal-oxide-semiconductor) TFTs (thin film transistors), but not limited thereto.

In at least one embodiment of the present disclosure, the light emitting diode may be an OLED (organic light emitting diode), a Mini LED (mini light emitting diode) or a MicroLED (micro light emitting diode), but is not limited thereto.

In the pixel circuit shown in FIG. 203, in the high grayscale light emitting display and sensing phase, Vref is less than or equal to Vdata_I, Vdata_I is equal to Vdata_T, Vdata_I is less than Vdd, Vref−Vss is less than Vled, wherein Vdd is the voltage value of the high voltage signal provided by VDD, Vss is the voltage value of the low voltage signal provided by VSS, and Vled is the light-on voltage of E0;

In the low grayscale light emitting display and sensing phase, Vref is less than or equal to Vdata_I, Vdata_I is less than Vdd, Vreff−Vss is less than Vled, and Vdata_T is less than Vref.

As shown in FIG. 204, when the pixel circuit shown in FIG. 203 is in operation, a display cycle may include a display phase SD and a sensing phase SS which are arranged in sequence;

The display phase SD includes a first writing-in time period S11, a first light emitting time period S12, a second writing-in time period S13 and a second light emitting time period S14 which are arranged successively;

The sensing stage SS includes a sensing reset time period S21, a compensation time period S22 and an extraction time period S23 which are arranged successively;

In the first writing-in time period S11, GA provides a high voltage signal, GB provides a low voltage signal, G1 provides a high voltage signal, X1 provides a high voltage signal, and X2 provides a low voltage signal, as shown in FIG. 205A, T2 is turned on, DI provides the first display data voltage Vdata_I1 to the first node N1; T3 and K1 are turned on, and N2 is connected to the reference voltage Vref to reset the potential of N2, so that T0 can be turned on;

In the first light emitting time period S12, GA provides a low voltage signal, GB provides a low voltage signal, G1 provides a low voltage signal, X1 provides a low voltage signal, X2 provides a low voltage signal, and the potential of N1 is maintained at Vdata_I1. As shown in FIG. 205B, T0 drives E0 to emit light under the control of Vdata_I1;

The first light emitting time period S12 lasts for a first time t1;

In the second writing-in time period S13, GB provides a high voltage signal, GA provides a low voltage signal, G1 provides a high voltage signal, X1 provides a high voltage signal, and X2 provides a low voltage signal, as shown in FIG. 205C, T1 is turned on, DT provides a light emitting time control data voltage Vdata_T to N1; T3 and K1 are turned on, and N2 is connected to the reference voltage Vref to reset the potential of N2, so that T0 can be turned on;

In the second light emitting time period S14, GA provides a low voltage signal, GB provides a low voltage signal, G1 provides a low voltage signal, X1 provides a low voltage signal, X2 provides a low voltage signal, and the potential of N1 is maintained at Vdata_T;

When Vdata_T is a low voltage signal and the difference between Vdata_T and Vref is less than Vth, in the second light emitting time period S14, T0 is turned off, E0 does not emit light, and a short-term light emitting is achieved, and the light emitting time is t1; Vth is the threshold voltage of T0;

When Vdata_T is the same as Vdata_I1, as shown in FIG. 205D, in the second light emitting time period S14, T0 drives E1 to emit light, realizing long-time light emitting, and the light emitting time is t1+t2, where t2 is the second time, and t2 is the duration of the second light emitting time period S14;

In the sensing reset time period S21, GA and G1 provide high voltage signals, T2 is turned on, DI provides the second display data voltage Vdata_I2 to N1, X1 provides a high voltage signal, as shown in FIG. 205E, K1 is turned on, T3 is turned on, and the reference voltage Vref is written into N2; Vdata_I2 is greater than Vref;

In the compensation time period S22, GA and G1 provide high voltage signals, X1 provides low voltage signals, as shown in FIG. 205F, K1 is turned off, T2 and T3 are turned on, and since Vdata_I2 is greater than Vref, at the beginning of the compensation time period S22, T0 is turned on to charge C1 to change the potential of N2, and when the potential of N2 becomes Vdata_I2−Vth, T0 is turned off, wherein Vth is the threshold voltage of T0;

In the extraction time period S23, GA and G1 provide a high voltage signal, X1 provides a low voltage signal, and X2 provides a high voltage signal, as shown in FIG. 205G, T3 and K2 are turned on to control the connection between N2 and SENS to write Vdata_I2−Vth into SENS and extract Vth to compensate Vth to the display data voltage in the display phase.

In a specific implementation, during the sensing phase, T1 can also be configured to reset the potential of N1, charge N2, and extract Vth;

In the sensing phase, the pixel circuit in at least one embodiment of the present disclosure can be configured to extract the current coefficient K and the driving current, thereby achieving compensation for the current coefficient K or the driving current.

FIG. 206A is a schematic diagram showing simulation results of the pixel circuit shown in FIG. 203 when performing high grayscale display;

FIG. 206B is a schematic diagram of simulation results of the pixel circuit shown in FIG. 203 when performing low grayscale display.

In FIGS. 206A and 206B, Id is the driving current generated at T0.

In FIG. 206A, Vref is 0V, Vdata_I and Vdata_T are both 6V, and Vdd−Vss is equal to 8V;

In FIG. 206B, Vref is 0V, Vdata_I is 6V, Vdata_T is 0V, and Vdd−Vss is equal to 8V.

When the pixel circuit shown in FIG. 203 is working, Vdd is greater than the voltage value of the display data voltage provided by DI, and the voltage value of the display data voltage provided by DI is greater than Vref; wherein Vdd is the voltage value of the high voltage signal provided by VDD.

When the pixel circuit shown in FIG. 203 is in operation, since the voltage value of the display data voltage, the magnitude relationship between Vdd and Vref are fixed in the display phase and the sensing phase, when T0 is an n-type transistor, E0 is preferably arranged below T0, that is, the anode of E0 is electrically connected to the source electrode of T0, and the cathode of E0 is electrically connected to the low voltage terminal VSS.

The difference between the pixel circuit of the pixel circuit shown in FIG. 207 and the pixel circuit shown in FIG. 203 is that: all transistors are PMOS (P-type metal-oxide-semiconductor) TFTs;

The source electrode of T0 is electrically connected to the high voltage terminal VDD, and the drain electrode of T0 is electrically connected to the anode of E0.

As shown in FIG. 208, when the pixel circuit shown in FIG. 207 is in operation, a display cycle may include a display phase SD and a sensing phase SS which are arranged in sequence;

The display phase SD includes a first writing-in time period S11, a first light emitting time period S12, a second writing-in time period S13 and a second light emitting time period S14 which are arranged successively;

The sensing stage SS includes a sensing reset time period S21, a compensation time period S22 and an extraction time period S23 which are arranged successively;

In the first writing-in time period S11, GA provides a low voltage signal, GB provides a high voltage signal, X1 and X2 both provide high voltage signals, as shown in FIG. 209A, T2 is turned on, DI provides the first display data voltage Vdata_I1 to N1, and T0 is turned on;

In the first light emitting time period S12, GA provides a high voltage signal, GB provides a high voltage signal, and X1 and X2 both provide high voltage signals, as shown in FIG. 209B, so T0 is turned on, and T0 drives E0 to emit light;

In the second writing-in time period S13, GA provides a high voltage signal, GB provides a low voltage signal, X1 and X2 provide a high voltage signal, as shown in FIG. 209C, T1 is turned on, and DT provides a light emitting time control data voltage Vdata_T to N1;

In the second light emitting time period S14, GA provides a high voltage signal, GB provides a high voltage signal, and X1 and X2 provide a high voltage signal;

When the difference between Vdata_T and Vdd is greater than Vth, T0 is turned off, E0 does not emit light, and short-term light emitting is achieved, and the light emitting time is t1; t1 is the first time, and t1 is the duration of the first light emitting time period S12; Vth is the threshold voltage of T0, and Vdd is the voltage value of the high voltage signal provided by VDD;

When Vdata_T is equal to Vdata_I1, as shown in FIG. 209D, T0 is turned on, T0 drives E0 to emit light, and E0 continues to emit light, realizing long-time light emitting, and the light emitting time is t1+t2, where t2 is the second time, and t2 is the duration of the second light emitting time period S14;

In the sensing reset time period S21, GA and G1 both output low voltage signals, as shown in FIG. 209E, T2 and T3 are turned on, X1 provides a low voltage signal, X2 provides a high voltage signal, K1 is turned on, N2 is connected to Vref, and DI provides a second display data voltage Vdata_I2 to N1;

In the compensation time period S22, GA and G1 both output low voltage signals, as shown in FIG. 209F, T2 and T3 are turned on, X1 and X2 both provide high voltage signals, and K1 is turned off, At the beginning of the compensation time period S22, T0 is turned on to charge C1 and change the potential of N2 until T0 is turned off, at which time the potential of N2 is Vdata_I2−Vth;

In the extraction time period S23, GA and G1 both output low voltage signals, as shown in FIG. 209G, T2 and T3 are turned on, X1 provides a high voltage signal, X2 provides a low voltage signal, K2 is turned on, and controls the conduction between N2 and SENS to extract Vdata_I2−Vth to SENS.

FIG. 210A is a schematic diagram of simulation results of the pixel circuit shown in FIG. 207 when performing high grayscale display, and FIG. 210B is a schematic diagram of simulation results of the pixel circuit shown in FIG. 207 when performing low grayscale display.

When the pixel circuit shown in FIG. 207 is in operation,

In the first light emitting time period, the gate-source voltage Vgs of T0 is equal to Vdata_I1−Vdd, Vdd is the voltage value of the high voltage signal provided by VDD, Vdata_I1 is less than or equal to Vdd−Vth, wherein Vth is the threshold voltage of T0, Vdata_I1 is greater than Vss, and Vss is the voltage value of the low voltage signal provided by VSS;

During the extraction time period, Vdata_I2 is greater than Vdd−Vth, Vdata is less than Vref−Vth, N2 can write Vdata_I2−Vth, and Vref−Vss is less than Vled, where Vled is the light-on voltage of E0 to prevent E0 from emitting light;

Since the magnitude relationships among the display data voltage, Vdd and Vref are inconsistent in the first light emitting time period and the extraction time period, there is a difference between Vth during extraction and display and the timing is complicated.

The difference between the pixel circuit shown in FIG. 211 and the pixel circuit shown in FIG. 203 is that: a second energy storage circuit is further included;

The second energy storage circuit includes a second capacitor C2;

A first terminal of the second capacitor C2 is electrically connected to the first node N1, and a second terminal of the second capacitor C2 is electrically connected to the high voltage terminal VDD.

The pixel circuit shown in FIG. 211 can effectively reduce the influence of voltage jump capacitor coupling on N1, thereby reducing the off-state current in the display phase and improving the display effect.

FIG. 212 is an operating timing diagram of the pixel circuit shown in FIG. 211.

FIG. 213A is a schematic diagram of simulation results of the pixel circuit shown in FIG. 211 when performing high grayscale display, and FIG. 213B is a schematic diagram of simulation results of the pixel circuit shown in FIG. 211 when performing low grayscale display.

The difference between the pixel circuit shown in FIG. 214 and the pixel circuit shown in FIG. 203 is that T0 is a PMOS TFT.

FIG. 215 is a timing diagram of the pixel circuit shown in FIG. 214.

The pixel circuit shown in FIG. 214 adopts LTPO (low temperature polycrystalline oxide) technology, taking advantage of the low leakage current of oxide TFT to reduce the leakage of N1 and N2; taking advantage of the high mobility of PMOS TFT, T0 is PMOS TFT, which is beneficial to reduce the charging time of N2 and the current driving requirements during the sensing phase and reduce the area of C1, thereby further improving the display performance.

The difference between the pixel circuit shown in FIG. 216 and the pixel circuit shown in FIG. 11 is that T0, T1, and T2 are PMOS TFTs.

FIG. 217 is a timing diagram of the pixel circuit shown in FIG. 216.

The pixel circuit shown in FIG. 217 adopts LTPO (low temperature polycrystalline oxide) technology, taking advantage of the low leakage current of oxide TFT to reduce the leakage of N1 and N2; taking advantage of the high mobility of PMOS TFT, T0, T1 and T2 are PMOS TFT, which is beneficial to reduce the charging time of N2 and the current driving requirements and reduce the area of C1 during the sensing phase, thereby further improving the display performance.

The difference between the pixel circuit shown in FIG. 218 and the pixel circuit shown in FIG. 203 is that T1 and T2 are PMOS TFTs.

FIG. 219 is a timing diagram of the pixel circuit shown in FIG. 218.

The pixel circuit shown in FIG. 219 adopts LTPO technology, and both T0 and T3 are set as oxide TFTs. The source electrode of T0 and the source electrode of T3 are electrically connected to the anode of E0. The source electrode of T0 and the source electrode of T3 are set on the same layer, which can reduce the anode connection via holes, which is beneficial to reducing the pixel pitch and achieving high PPI (pixel density).

The difference between the pixel circuit shown in FIG. 220 and the pixel circuit shown in FIG. 207 is that: a reset circuit is further included;

The reset circuit includes a fourth transistor T4;

The gate electrode of T4 is electrically connected to the reset control terminal RST, the source electrode of T4 is electrically connected to the initial voltage terminal 10, and the drain electrode of T4 is electrically connected to the first node N1;

The initial voltage terminal I0 is configured to provide an initial voltage Vi.

In the pixel circuit shown in FIG. 220, all transistors are PMOS TFTs.

As shown in FIG. 221, when the pixel circuit shown in FIG. 220 is in operation, The display phase further includes a first reset time period Sir before the first writing-in time period S11, and a second reset time period S1*r*2 between the first light emitting time period S12 and the second writing-in time period S13;

In the first reset time period Sr1 and the second reset time period S1*r*2, RST provides a low voltage signal and I0 provides an initial voltage Vi to N1, so that the charging initial potentials of Vdata_I1 and Vdata_T are the same, reducing the difference in driving current between the first light emitting time period and the second light emitting time period, thereby improving display performance.

In the first reset time period Sir and the second reset time period S1*r*2, I0 provides an initial voltage to N1, preferably turning off the driving transistor, and after the data voltage is written, turning the driving transistor from off to on.

The difference between the pixel circuit shown in FIG. 222 and the pixel circuit shown in FIG. 203 is that: a reset circuit is further included;

The reset circuit includes a fourth transistor T4;

The gate electrode of T4 is electrically connected to the reset control terminal RST, the drain electrode of T4 is electrically connected to the initial voltage terminal 10, and the source electrode of T4 is electrically connected to the first node N1;

The initial voltage terminal I0 is configured to provide an initial voltage Vi.

In the pixel circuit shown in FIG. 222, all transistors are NMOS TFTs.

When the pixel circuit shown in FIG. 222 is in operation,

The display phase further includes a first reset time period set before the first writing-in time period, and a second reset time period set between the first light emitting time period and the second writing-in time period;

In the first reset time period and the second reset time period, RST provides a low voltage signal, and I0 provides an initial voltage Vi to N1, so that the initial charging potentials of Vdata_I1 and Vdata_T are the same, reducing the difference in driving current between the first light emitting time period and the second light emitting time period, thereby improving display performance.

In the first reset time period Sir and the second reset time period S1*r*2, I0 provides an initial voltage to N1, preferably turning off the driving transistor, and after the data voltage is written, turning the driving transistor from off to on.

The difference between the pixel circuit shown in FIG. 223 and the pixel circuit shown in FIG. 207 is that:

The source electrode of T1 and the source electrode of T2 are both electrically connected to the data line D0;

The data line D0 is configured to provide a first display data voltage Vdata_I1 in a first writing-in time period, provide a light emitting time control data voltage Vdata_T in a second writing-in time period, and provide a second display data voltage Vdata_I2 in a sensing phase.

FIG. 224 is an operating timing diagram of the pixel circuit shown in FIG. 223.

In the pixel circuit shown in FIG. 31 of the present disclosure, T1 and T2 share a data line D0, which reduces the number of data lines used, reduces the difference in N1 charging voltage caused by the different capacitances of the two data lines, reduces the current difference between the first light emitting time period and the second light emitting time period, and thereby improves display performance.

The difference between the pixel circuit shown in FIG. 225 and the pixel circuit shown in FIG. 207 is that:

a first transistor is not included;

The source electrode of T2 is electrically connected to the data line D0;

The data line D0 is configured to provide a first display data voltage Vdata_I1 in a first writing-in time period, provide a light emitting time control data voltage Vdata_T in a second writing-in time period, and provide a second display data voltage Vdata_I2 in a sensing phase.

FIG. 226 is a timing diagram of the pixel circuit shown in FIG. 225.

In the pixel circuit shown in FIG. 225 of the present disclosure, one data line D0 is configured to reduce the number of data lines used, thereby reducing the difference in N1 charging voltage caused by the different capacitances of the two data lines, reducing the current difference between the first light emitting time period and the second light emitting time period, and thereby improving display performance.

As shown in FIG. 227, based on the pixel circuit shown in FIG. 197, the light emitting element is a light emitting diode E0;

The data writing-in circuit includes a first transistor T1 and a second transistor T2;

The gate electrode of the first transistor T1 is electrically connected to the first control terminal GB, the drain electrode of the first transistor T1 is electrically connected to the first data line DT, and the source electrode of the first transistor T1 is electrically connected to the first node N1;

The gate electrode of the second transistor T2 is electrically connected to the second control terminal GA, the drain electrode of the second transistor T2 is electrically connected to the second data line DI, and the source electrode of the second transistor T2 is electrically connected to the first node N1;

The driving circuit includes a driving transistor T0;

The gate electrode of T0 is electrically connected to the first node N1;

The anode of E0 is electrically connected to the high voltage terminal VDD, the source electrode of T0 is electrically connected to the second node N2; the cathode of E0 is electrically connected to the second node N2; the drain electrode of T0 is electrically connected to the low voltage terminal VSS;

The first energy storage circuit includes a first capacitor C1;

A first terminal of the first capacitor C1 is electrically connected to the first node N1, and a second terminal of the first capacitor C1 is electrically connected to the second node N2;

The switch circuit includes a first switch K1 and a second switch K2;

The selection control terminal includes a first selection control terminal X1 and a second selection control terminal X2;

The control terminal of the first switch K1 is electrically connected to the first selection control terminal X1, the first terminal of the first switch K1 is electrically connected to the control node N0, and the second terminal of the first switch K1 is electrically connected to a reference voltage terminal; the reference voltage terminal is configured to provide a reference voltage Vref;

The control terminal of the second switch K2 is electrically connected to the second selection control terminal X2, the first terminal of the second switch K2 is electrically connected to the control node N0, and the second terminal of the second switch K2 is electrically connected to the compensation terminal SENS;

The compensation circuit includes a third transistor T3;

A gate electrode of the third transistor T3 is electrically connected to the scanning terminal G1, a drain electrode of the third transistor T3 is electrically connected to the second node N2, and a source electrode of the third transistor T3 is electrically connected to the control node N0.

In the pixel circuit shown in FIG. 227, all transistors are PMOS TFTs.

As shown in FIG. 228, the pixel circuit shown in FIG. 227 of the present disclosure is in operation.

The display cycle may include a display phase SD and a sensing phase SS arranged in sequence;

The display phase SD includes a first writing-in time period S11, a first light emitting time period S12, a second writing-in time period S13 and a second light emitting time period S14 which are arranged successively;

The sensing stage SS includes a sensing reset time period S21, a compensation time period S22 and an extraction time period S23 which are arranged successively;

In the first writing-in time period S11, GA provides a low voltage signal, GB provides a high voltage signal, G1 provides a low voltage signal, X1 provides a low voltage signal, and X2 provides a high voltage signal, as shown in FIG. 229A, T2 is turned on, DI provides the first display data voltage Vdata_I1 to the first node N1; T3 and K1 are turned on, N2 is connected to the reference voltage Vref to reset the potential of N2, so that T0 can be turned on; Vdd−Vref is less than Vled, and Vled is the light-on voltage of E0; the gate-source voltage Vgs of T0 is equal to Vdata_I1−Vref; Vdd is the voltage value of the high voltage signal provided by VDD;

In the first light emitting time period S12, GA provides a high voltage signal, GB provides a high voltage signal, G1 provides a high voltage signal, X1 provides a high voltage signal, X2 provides a high voltage signal, and the potential of N1 is maintained at Vdata_I1. As shown in FIG. 229B, T0 drives E0 to emit light under the control of Vdata_I1;

The first light emitting time period S12 lasts for a first time t1;

In the second writing-in time period S13, GB provides a low voltage signal, GA provides a high voltage signal, G1 provides a low voltage signal, X1 provides a low voltage signal, and X2 provides a high voltage signal, as shown in FIG. 229C, T1 is turned on, DT provides a light emitting time control data voltage Vdata_T to N1; T3 and K1 are turned on, N2 is connected to the reference voltage Vref to reset the potential of N2, so that T0 can be turned on; Vdd−Vref is less than Vled;

In the second light emitting time period S14, GA provides a high voltage signal, GB provides a high voltage signal, G1 provides a high voltage signal, X1 provides a high voltage signal, X2 provides a high voltage signal, and the potential of N1 is maintained at Vdata_T;

When Vdata_T is a high voltage signal, in the second light emitting time period S14, T0 is turned off, E0 does not emit light, and a short-term light emitting is achieved, and the light emitting time is t1; Vth is the threshold voltage of T0;

When Vdata_T is the same as Vdata_I1, as shown in FIG. 229D, in the second light emitting time period S14, T0 drives E1 to emit light, realizing long-time light emitting, and the light emitting time is t1+t2, where t2 is the second time, and t2 is the duration of the second light emitting time period S14;

In the sensing reset time period S21, GA and G1 provide low voltage signals, T2 is turned on, DI provides the second display data voltage Vdata_I2 to N1, X1 provides a low voltage signal, as shown in FIG. 229E, K1 is turned on, T3 is turned on, and the reference voltage Vref is written into N2, so that T0 can be turned on at the beginning of the compensation time period S22; Vss−Vth is less than Vdata_I2, Vdata_I2 is less than Vref−Vth, Vdd−Vref is less than Vled, Vled is the light-on voltage of E0, Vth is the threshold voltage of T0, Vss is the voltage value of the low voltage signal provided by VSS, and Vdd is the voltage value of the high voltage signal provided by VDD;

In the compensation time period S22, GA and G1 provide low voltage signals, X1 provides high voltage signals, as shown in FIG. 229F, K1 is turned off, T2 and T3 are turned on, and at the beginning of the compensation time period S22, T0 is turned on to charge C1 to change the potential of N2, and when the potential of N2 becomes Vdata_I2−Vth, T0 is turned off, wherein Vth is the threshold voltage of T0;

In the extraction time period S23, GA and G1 provide low voltage signals, X1 provides a high voltage signal, and X2 provides a low voltage signal, as shown in FIG. 229G, T3 and K2 are turned on to control the connection between N2 and SENS to write Vdata_I2−Vth into SENS and extract Vth to compensate Vth to the display data voltage in the display phase.

When the pixel circuit shown in FIG. 227 of the present disclosure is in operation, the relationship among the voltage value of the display data voltage, Vss and Vref are consistent in the display phase and the sensing phase. Therefore, when E0 is set above T0, T0 is preferably a PMOS TFT.

The difference between the pixel circuit shown in FIG. 230 and the pixel circuit shown in FIG. 35 is that: a second energy storage circuit is further included;

The second energy storage circuit includes a second capacitor C2;

A first terminal of the second capacitor C2 is electrically connected to the first node N1, and a second terminal of the second capacitor C2 is electrically connected to the low voltage terminal VSS.

The difference between the pixel circuit shown in FIG. 231 and the pixel circuit shown in FIG. 227 is that: a reset circuit is further included;

The reset circuit includes a fourth transistor T4;

The gate electrode of T4 is electrically connected to the reset control terminal RST, the source electrode of T4 is electrically connected to the initial voltage terminal 10, and the drain electrode of T4 is electrically connected to the first node N1;

The initial voltage terminal I0 is configured to provide an initial voltage Vi.

When the pixel circuit shown in FIG. 231 is in operation,

The display phase further includes a first reset time period set before the first writing-in time period, and a second reset time period set between the first light emitting time period and the second writing-in time period;

In the first reset time period and the second reset time period, T4 is turned on and I0 provides the initial voltage Vi to N1 so that the charging initial potential of the first display data voltage and the light emitting time control data voltage are the same, reducing the difference in driving current between the first light emitting time period and the second light emitting time period, thereby improving the display performance.

The driving method described in the embodiment of the present disclosure is applied to the above-mentioned pixel circuit, the display cycle includes a display phase; the display phase includes a first writing-in time period, a first light emitting time period, a second writing-in time period and a second light emitting time period which are successively arranged, and the driving method includes:

In a first writing-in time period, the data writing-in circuit writes a first display data voltage into the first node under the control of a writing-in control signal;

In a first light emitting time period, the driving circuit drives the light emitting element to emit light according to the first display data voltage;

In the second writing-in time period, the data writing-in circuit writes the light emitting time control data voltage into the first node under the control of the writing-in control signal;

In the second light emitting time period, the driving circuit controls the data voltage according to the light emitting time to control whether the light emitting element emits light.

In at least one embodiment of the present disclosure, the driving method further includes:

In the first writing-in time period and the second writing-in time period, the compensation circuit controls the connection between the first node and the control node under the control of the scanning signal, and the switch circuit provides the reference voltage to the control node under the control of the selection control signal.

In at least one embodiment of the present disclosure, the display cycle further includes a sensing phase arranged after the display phase; the sensing phase includes a sensing reset time period, a compensation time period and an extraction time period arranged in sequence; the driving method further includes:

In the sensing reset time period, the data writing-in circuit writes the second display data voltage into the first node under the control of the writing-in control signal, the compensation circuit controls the second node to be connected to the control node under the control of the scanning signal, and the switch circuit provides the reference voltage to the control node under the control of the selecting control signal;

During the extraction time period, the data writing-in circuit writes the second display data voltage into the first node under the control of the writing-in control signal, the compensation circuit controls the connection between the second node and the control node under the control of the scanning signal, and the switch circuit controls the connection between the control node and the compensation terminal under the control of the selection control signal.

In at least one embodiment of the present disclosure, the pixel circuit further includes a reset circuit; the display phase further includes a first reset time period set before the first writing-in time period, and a second reset time period set between the first light emitting time period and the second writing-in time period; the driving method further includes:

In the first reset time period and the second reset time period, the reset circuit writes the initial voltage provided by the initial voltage terminal into the first node under the control of the reset control signal provided by the reset control terminal.

A display device described in at least one embodiment of the present disclosure includes the above-mentioned pixel circuit.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A pixel circuit comprising a light emitting element, a driving circuit, a first reset circuit and a data writing-in circuit; wherein a control terminal of the driving circuit is electrically connected to a first node, the driving circuit is electrically connected to a first electrode of the light emitting element, and the driving circuit is configured to generate a driving current to drive the light emitting element under the control of a potential of the first node;

the data writing-in circuit is electrically connected to a writing-in control terminal and a writing-in node respectively, and is configured to sequentially provide a display data voltage and a light emitting time control data voltage to the writing-in node under the control of a writing-in control signal provided by the writing-in control terminal;

the first reset circuit is electrically connected to a first reset control terminal, a first initial voltage terminal and the first electrode of the light emitting element, respectively, and is configured to write a first initial voltage provided by the first initial voltage terminal into the first electrode of the light emitting element under the control of a first reset control signal provided by the first reset control terminal during a reset time period set between a time period for writing the display data voltage and a time period for writing the light emitting time control data voltage.

2. The pixel circuit according to claim 1, wherein the first terminal of the driving circuit is electrically connected to the first electrode of the light emitting element, and the writing-in node is electrically connected to the second terminal of the driving circuit; or the second terminal of the driving circuit is electrically connected to the first electrode of the light emitting element, and the writing-in node is electrically connected to the first terminal of the driving circuit.

3. The pixel circuit according to claim 1, wherein the writing-in node comprises a first writing-in node and a second writing-in node;

the first writing-in node is electrically connected to the first terminal of the driving circuit; the pixel circuit also includes a switch control circuit; the second terminal of the driving circuit is electrically connected to the first electrode of the light emitting element through the switch control circuit, and the switch control circuit is electrically connected to a switch control terminal, and the switch control circuit is configured to control the connection between the second terminal of the driving circuit and the first electrode of the light emitting element under the control of a potential of the switch control terminal; the second writing-in node is electrically connected to the switch control terminal.

4. The pixel circuit according to claim 1, wherein the writing-in node comprises a first writing-in node and a second writing-in node;

the first writing-in node is electrically connected to the second terminal of the driving circuit; the pixel circuit also includes a switch control circuit; the first terminal of the driving circuit is electrically connected to the first electrode of the light emitting element through the switch control circuit, and the switch control circuit is electrically connected to the switch control terminal, and the switch control circuit is configured to control the connection between the first terminal of the driving circuit and the first electrode of the light emitting element under the control of the potential of the switch control terminal; the second writing-in node is electrically connected to the switch control terminal.

5. The pixel circuit according to claim 2, further comprising a second reset circuit; wherein the second reset circuit is electrically connected to a second reset control terminal, a second initial voltage terminal and the first node respectively, and is configured to write a second initial voltage provided by the second initial voltage terminal into the first node during the reset time period under the control of the second reset control signal provided by the second reset control terminal.

6. The pixel circuit according to claim 5, wherein the first reset control terminal and the second reset control terminal are a same reset control terminal.

7. The pixel circuit according to claim 5, wherein the writing-in control terminal comprises a first control terminal and a second control terminal, the data writing-in circuit is also electrically connected to a first data line and a second data line respectively; the display cycle of the pixel circuit comprises a first writing-in time period and a second writing-in time period which are set successively;

the data writing-in circuit is configured to write a display data voltage provided by the second data line to the writing-in node under the control of a second control signal provided by the second control terminal during the first writing-in time period, and is configured to write the light emitting time control data voltage provided by the first data line into the writing-in node under the control of the first control signal provided by the first control terminal during the second writing-in time period.

8. The pixel circuit according to claim 5, further comprising a first light emitting control circuit, a second light emitting control circuit and a compensation control circuit;

the first light emitting control circuit is electrically connected to the light emitting control terminal, the first voltage terminal and the first terminal of the driving circuit respectively, and is configured to control the connection between the first voltage terminal and the first terminal of the driving circuit under the control of the light emitting control signal provided by the light emitting control terminal;

the second light emitting control circuit is electrically connected to the light emitting control terminal, the second terminal of the driving circuit and the first electrode of the light emitting element respectively, and is configured to control the second terminal of the driving circuit to be connected to the first electrode of the light emitting element under the control of the light emitting control signal; the second electrode of the light emitting element is electrically connected to the second voltage terminal;

the compensation control circuit is electrically connected to a scanning terminal, the control terminal of the driving circuit and the second terminal of the driving circuit respectively, and is configured to control the communication between the control terminal of the driving circuit and the second terminal of the driving circuit under the control of a scanning signal provided by the scanning terminal;

the first electrode of the light emitting element is the first electrode of the light emitting element.

9. The pixel circuit according to claim 5, further comprising a first light emitting control circuit, a second light emitting control circuit and a compensation control circuit; the first electrode of the light emitting element is electrically connected to the first voltage terminal;

the first light emitting control circuit is electrically connected to the light emitting control terminal, the second electrode of the light emitting element and the first terminal of the driving circuit respectively, and is configured to control the second electrode of the light emitting element to be connected to the first terminal of the driving circuit under the control of the light emitting control signal provided by the light emitting control terminal;

the second light emitting control circuit is electrically connected to the light emitting control terminal, the second terminal of the driving circuit and the second voltage terminal respectively, and is configured to control the second terminal of the driving circuit to be connected to the second voltage terminal under the control of the light emitting control signal;

the compensation control circuit is electrically connected to the scanning terminal, the control terminal of the driving circuit and the first terminal of the driving circuit respectively, and is configured to control the communication between the control terminal of the driving circuit and the first terminal of the driving circuit under the control of the scanning signal provided by the scanning terminal;

the first electrode of the light emitting element is the second electrode of the light emitting element.

10. The pixel circuit according to claim 3, wherein the data writing-in circuit comprises a first writing-in sub-circuit and a second writing-in sub-circuit; the writing-in control terminal comprises a scanning terminal and a first control terminal;

the first writing-in sub-circuit is electrically connected to the first control terminal, the first data line and the second writing-in node respectively, and is configured to write the light emitting time control data voltage provided by the first data line into the second writing-in node under the control of the first control signal provided by the first control terminal;

the second writing-in sub-circuit is electrically connected to the scanning terminal, the second data line and the first writing-in node respectively, and is configured to write the display data voltage provided by the second data line into the first writing-in node under the control of the scanning signal provided by the scanning terminal, wherein the pixel circuit further includes a second reset circuit, an initialization circuit and a voltage maintenance circuit;

the second reset circuit is electrically connected to a second reset control terminal, a second initial voltage terminal and the first node respectively, and is configured to write a second initial voltage provided by the second initial voltage terminal into the first node under the control of the second reset control signal provided by the second reset control terminal;

the initialization circuit is electrically connected to a second control terminal, a third initial voltage terminal and a second writing-in node respectively, and is configured to write a third initial voltage provided by the third initial voltage terminal into the second writing-in node under the control of a second control signal provided by the second control terminal;

the voltage maintaining circuit is electrically connected to the switch control terminal and is configured to maintain the potential of the switch control terminal.

11. The pixel circuit according to claim 3, further comprising a first light emitting control circuit, a second light emitting control circuit and a compensation control circuit;

the first light emitting control circuit is electrically connected to the light emitting control terminal, the first voltage terminal and the first terminal of the driving circuit respectively, and is configured to control the connection between the first voltage terminal and the first terminal of the driving circuit under the control of the light emitting control signal provided by the light emitting control terminal;

the second light emitting control circuit is electrically connected to the light emitting control terminal, the second terminal of the driving circuit and the first terminal of the switch control circuit respectively, and is configured to control the second terminal of the driving circuit to be connected to the first terminal of the switch control circuit under the control of the light emitting control signal;

the second terminal of the switch control circuit is electrically connected to the first electrode of the light emitting element; the second electrode of the light emitting element is electrically connected to the second voltage terminal; the switch control circuit is configured to control the second light emitting control circuit to be connected to the first electrode of the light emitting element under the control of the potential of the switch control terminal;

the compensation control circuit is electrically connected to the scanning terminal, the control terminal of the driving circuit and the second terminal of the driving circuit respectively, and is configured to control the connection between the control terminal of the driving circuit and the second terminal of the driving circuit under the control of the scanning signal provided by the scanning terminal.

12. The pixel circuit according to claim 4, further comprising a first light emitting control circuit, a second light emitting control circuit and a compensation control circuit;

the first electrode of the light emitting element is electrically connected to the first voltage terminal;

the first terminal of the switch control circuit is electrically connected to the second pole of the light emitting element, and the second terminal of the switch control circuit is electrically connected to the first light emitting control circuit; the switch control circuit is configured to control the second electrode of the light emitting element to be connected to the first light emitting control circuit under the control of the potential of the switch control terminal;

the first light emitting control circuit is electrically connected to the light emitting control terminal, the second terminal of the switch control circuit and the first terminal of the driving circuit respectively, and is configured to control the second terminal of the switch control circuit to be connected to the first terminal of the driving circuit under the control of the light emitting control signal provided by the light emitting control terminal;

the second light emitting control circuit is electrically connected to the light emitting control terminal, the second terminal of the driving circuit and the second voltage terminal respectively, and is configured to control the second terminal of the driving circuit to be connected to the second voltage terminal under the control of the light emitting control signal;

the compensation control circuit is electrically connected to the scanning terminal, the control terminal of the driving circuit and the first terminal of the driving circuit respectively, and is configured to control the connection between the control terminal of the driving circuit and the first terminal of the driving circuit under the control of the scanning signal provided by the scanning terminal.

13. The pixel circuit according to claim 5, wherein the first reset circuit comprises a first transistor, and the second reset circuit comprises a second transistor;

a gate electrode of the first transistor is electrically connected to the first reset control terminal, a first electrode of the first transistor is electrically connected to the first initial voltage terminal, and a second electrode of the first transistor is electrically connected to the first electrode of the light emitting element;

a gate electrode of the second transistor is electrically connected to the second reset control terminal, a first electrode of the second transistor is electrically connected to the second initial voltage terminal, and a second electrode of the second transistor is electrically connected to the first node.

14. The pixel circuit according to claim 7, wherein the data writing-in circuit comprises a third transistor and a fourth transistor;

a gate electrode of the third transistor is electrically connected to the first control terminal, a first electrode of the third transistor is electrically connected to the first data line, and a second electrode of the third transistor is electrically connected to the writing-in node;

a gate electrode of the fourth transistor is electrically connected to the scanning terminal, a first electrode of the fourth transistor is electrically connected to the second data line, and a second electrode of the fourth transistor is electrically connected to the writing-in node.

15. The pixel circuit according to claim 8, wherein the driving circuit comprises a driving transistor, the first light emitting control circuit comprises a fifth transistor, the second light emitting control circuit comprises a sixth transistor, and the compensation control circuit comprises a seventh transistor;

a gate electrode of the fifth transistor is electrically connected to the light emitting control terminal, a first electrode of the fifth transistor is electrically connected to the first voltage terminal, and a second electrode of the fifth transistor is electrically connected to the first electrode of the driving transistor;

a gate electrode of the sixth transistor is electrically connected to the light emitting control terminal, a first electrode of the sixth transistor is electrically connected to the second electrode of the driving transistor, and a second electrode of the sixth transistor is electrically connected to the first electrode of the light emitting element;

a gate electrode of the driving transistor is electrically connected to the first node;

a gate electrode of the seventh transistor is electrically connected to the scanning terminal, a first electrode of the seventh transistor is electrically connected to the first node, and a second electrode of the seventh transistor is electrically connected to a second electrode of the driving transistor.

16. The pixel circuit according to claim 9, wherein the driving circuit comprises a driving transistor, the first light emitting control circuit comprises a fifth transistor, the second light emitting control circuit comprises a sixth transistor, and the compensation control circuit comprises a seventh transistor;

a gate electrode of the fifth transistor is electrically connected to the light emitting control terminal, a first electrode of the fifth transistor is electrically connected to the second electrode of the light emitting element, and a second electrode of the fifth transistor is electrically connected to the first electrode of the driving transistor;

a gate electrode of the sixth transistor is electrically connected to the light emitting control terminal, a first electrode of the sixth transistor is electrically connected to the second electrode of the driving transistor, and a second electrode of the sixth transistor is electrically connected to the second voltage terminal;

a gate electrode of the driving transistor is electrically connected to the first node;

a gate electrode of the seventh transistor is electrically connected to the scanning terminal, a first electrode of the seventh transistor is electrically connected to the first node, and a second electrode of the seventh transistor is electrically connected to the first electrode of the driving transistor.

17. The pixel circuit according to claim 10, wherein the first writing-in sub-circuit comprises a third transistor, and the second writing-in sub-circuit comprises a fourth transistor;

a gate electrode of the third transistor is electrically connected to the first control terminal, a first electrode of the third transistor is electrically connected to the first data line, and a second electrode of the third transistor is electrically connected to the second writing-in node;

a gate electrode of the fourth transistor is electrically connected to the second control terminal, a first electrode of the fourth transistor is electrically connected to the second data line, and a second electrode of the fourth transistor is electrically connected to the first writing-in node.

18. A driving method, applied to the pixel circuit according to claim 1, wherein a display cycle comprises a first display phase and a second display phase which are arranged successively, the first display phase comprises a first writing-in time period; and the second display phase comprises a reset time period and a second writing-in time period which are arranged successively; the driving method comprises:

in the first writing-in period, providing, by the data writing-in circuit, the display data voltage to the writing-in node under the control of the writing-in control signal;

in the reset time period, writing, by the first reset circuit, the first initial voltage into the first electrode of the light emitting element under the control of the first reset control signal;

in the second writing-in period, providing, by the data writing-in circuit, the light emitting time control data voltage to the writing-in node under the control of the writing-in control signal.

19. The driving method according to claim 18, wherein the pixel circuit further comprises a second reset circuit; the driving method further comprises:

in the reset period, writing, by the second reset circuit, the second initial voltage into the first node under the control of a second reset control signal, wherein the reset time period is a second reset time period, the first display stage further comprises a first reset time period arranged before the first writing-in time period; the driving method further comprises:

in the first reset period, writing, by the first reset circuit, the first initial voltage into the first electrode of the light emitting element under the control of the first reset control signal, and writing, by the second reset circuit, the second initial voltage into the first node under the control of the second reset control signal.

20. A display device comprising the pixel circuit according to claim 1.

* * * * *